US006061809A

United States Patent [19]
Glaser et al.
[11] Patent Number: 6,061,809
[45] Date of Patent: May 9, 2000

[54] PROCESS CONTROL INTERFACE SYSTEM HAVING TRIPLY REDUNDANT REMOTE FIELD UNITS

[75] Inventors: Robert S. Glaser; Robert S. Hoy; G. Paul Fernandez, all of Midland; Timothy J. Grai, Saginaw, all of Mont.

[73] Assignee: The Dow Chemical Company, Midland, Mich.

[21] Appl. No.: 08/769,915

[22] Filed: Dec. 19, 1996

Related U.S. Application Data

[60] Continuation of application No. 08/484,995, Jun. 7, 1995, abandoned, which is a division of application No. 07/864, 931, Mar. 31, 1992, Pat. No. 5,428,769.

[51] Int. Cl.[7] .................................................. G06F 11/00

[52] U.S. Cl. ................ 714/11; 395/182.08; 395/182.21; 395/183.19; 395/183.2

[58] Field of Search ......................... 395/182.09, 182.08, 395/183.19, 183.2, 182.21, 185.01; 364/228.3, 230, 229, 229.4, 944.2, 228.4, 228.5, 228.6, 230.6; 371/37.9

[56] References Cited

U.S. PATENT DOCUMENTS

| | | | |
|---|---|---|---|
| Re. 33,521 | 1/1991 | Mori et al. | 364/229.4 |
| 3,377,623 | 4/1968 | Reut | 340/172.5 |

(List continued on next page.)

FOREIGN PATENT DOCUMENTS

| | | |
|---|---|---|
| 186613 | 7/1986 | European Pat. Off. . |
| 186832 | 7/1986 | European Pat. Off. . |

(List continued on next page.)

OTHER PUBLICATIONS

David Halliday, *Fundamentals of Physics*, Second Edition, pp. 533–534.

Walter G. Jung, *IC OP–Amp Cookbook*, $2^{nd}$ Edition pp. 313–315.

*ISA Transacations*, vol. 30, No. 4, 1991, Pittsburgh U.S., pp. 97–106, Tony Frederickson et al. "Comparison Of Fault Tolerant Controllers Used In Safety Applications".

The Ninth Annual International Symposium on Fault–Tolerant Computing, Jun. 22, 1979, Madison, Wisconsin, pp. 17–24, Jacob J. Wolf et al. "Design Of A Distributed Fault–Tolerant Loop Network".

Proceedings of IEEE 1985 National Aerospace and Electronics Conference NAECON 1985, May 24, 1985, Dayton Convention Center, pp. 91–94, R. Jerome Folmar, "Distributed Memory Network: An 8 Gigabit Fiber Optic Tightly Coupled System".

(List continued on next page.)

*Primary Examiner*—Robert W. Beausoliel, Jr.
*Assistant Examiner*—Trinh Le Tu
*Attorney, Agent, or Firm*—William J. Coughlin; Dale H. Schultz

[57] ABSTRACT

A process control interface system having a network of distributed triply redundant input/output field computer units. The system includes a plurality of self-contained remotely located triply redundant field computer units connected to decision making redundant process control computers through a bi-directional communication network having at least two concurrently active communication channels. Each of the field computer units include a set of at least redundant field computers for arbitrating both input and output signals. The input arbitration method enables a plurality of selectable default input conditions, such as select HIGH and select LOW, in the event that a majority agreement cannot be reached among valid input signals. The output arbitration method includes a plurality of selectable default output conditions, such as fail SAFE and fail LAST. Each of the default input and output conditions may be rapidly adjusted through software selection. The field computer units also include individual abort circuits for each output signal to be transmitted to a device which affects the operation of the physical process. These abort circuits effectively enforce the output value signals arbitrated independently through each of the three redundant field computers using a voting procedure.

8 Claims, 209 Drawing Sheets

U.S. PATENT DOCUMENTS

| | | | |
|---|---|---|---|
| 3,593,307 | 7/1971 | Gouge et al. | 340/172.5 |
| 3,636,331 | 1/1972 | Amrehn | 235/151.12 |
| 3,665,173 | 5/1972 | Bouricius et al. | 235/153 |
| 3,681,578 | 8/1972 | Stevens | 235/153 |
| 3,735,356 | 5/1973 | Yates | 340/172.5 |
| 3,783,250 | 1/1974 | Fletcher | 235/153 AK |
| 3,845,356 | 10/1974 | Bullard et al. | 317/210 |
| 3,895,223 | 7/1975 | Neuner | 235/153 AE |
| 3,898,621 | 8/1975 | Zelinski | 340/172.5 |
| 3,921,149 | 11/1975 | Kreis | 340/172.5 |
| 4,015,246 | 3/1977 | Hopkins | 340/172.5 |
| 4,032,757 | 6/1977 | EccLes | 235/150.2 |
| 4,049,957 | 9/1977 | Kera | 235/153 |
| 4,099,234 | 7/1978 | Woods | 364/200 |
| 4,101,958 | 7/1978 | Patterson | 364/200 |
| 4,105,900 | 8/1978 | Martin et al. | 307/219 |
| 4,133,027 | 1/1979 | Hogan | 364/119 |
| 4,153,198 | 5/1979 | Eki | 235/303.3 |
| 4,159,444 | 6/1979 | Bartlett et al. | 318/568 |
| 4,198,678 | 4/1980 | Maatje | 364/426 |
| 4,228,496 | 10/1980 | Katzman | 364/200 |
| 4,251,873 | 2/1981 | Joby | 364/741 |
| 4,270,168 | 5/1981 | Murphy | 364/200 |
| 4,270,715 | 6/1981 | Norton | 246/5 |
| 4,271,505 | 6/1981 | Menot et al. | 370/85.1 |
| 4,276,648 | 6/1981 | Tomlinson | 371/68 |
| 4,277,832 | 7/1981 | Wong | 364/510 |
| 4,304,001 | 12/1981 | Cope | 371/8 |
| 4,342,083 | 7/1982 | Freedman | 364/200 |
| 4,345,327 | 8/1982 | Thuy | 371/9.1 |
| 4,347,563 | 8/1982 | Paredes | 364/137 |
| 4,347,564 | 8/1982 | Sugano et al. | 364/132 |
| 4,352,103 | 9/1982 | Slater | 340/825.01 |
| 4,356,546 | 10/1982 | Whiteside et al. | 395/182.08 |
| 4,358,823 | 11/1982 | McDonald | 364/200 |
| 4,371,754 | 2/1983 | De | 371/9.1 |
| 4,375,683 | 3/1983 | Wensley | 371/36 |
| 4,392,199 | 7/1983 | Schmitter | 364/200 |
| 4,412,280 | 10/1983 | Murphy | 364/200 |
| 4,424,559 | 1/1984 | Lorincz | 364/131 |
| 4,443,861 | 4/1984 | Slater | 364/900 |
| 4,472,806 | 9/1984 | Blair | 371/68 |
| 4,517,639 | 5/1985 | Ferrel et al. | 371/9.1 |
| 4,517,673 | 5/1985 | Brown | 371/36 |
| 4,530,045 | 7/1985 | Petroff | 364/138 |
| 4,532,630 | 7/1985 | Corney | 371/68 |
| 4,562,575 | 12/1985 | Townsend | 371/36 |
| 4,580,248 | 4/1986 | Imaizumi | 365/229 |
| 4,583,224 | 4/1986 | Ishii et al. | 371/36 |
| 4,610,013 | 9/1986 | Long | 371/66 |
| 4,616,312 | 10/1986 | Uebel | 364/200 |
| 4,617,475 | 10/1986 | Reinschmidt | 307/441 |
| 4,622,667 | 11/1986 | Yount | 371/9 |
| 4,631,693 | 12/1986 | Neri | 364/550 |
| 4,634,110 | 1/1987 | Julich | 371/11 |
| 4,635,184 | 1/1987 | Schuss | 364/187 |
| 4,639,852 | 1/1987 | Motomiya | 364/138 |
| 4,644,538 | 2/1987 | Cooper et al. | 371/9.1 |
| 4,656,475 | 4/1987 | Miller et al. | 340/825.06 |
| 4,663,704 | 5/1987 | Jones | 364/188 |
| 4,665,522 | 5/1987 | Lala | 371/36 |
| 4,667,284 | 5/1987 | Asami | 364/187 |
| 4,672,530 | 6/1987 | Schuss | 364/133 |
| 4,683,105 | 7/1987 | Hager | 376/259 |
| 4,685,053 | 8/1987 | Hattori | 364/184 |
| 4,692,932 | 9/1987 | Denhez | 375/107 |
| 4,695,952 | 9/1987 | Howland | 364/200 |
| 4,713,832 | 12/1987 | Hutson | 377/45 |
| 4,726,026 | 2/1988 | Hilford | 371/25 |
| 4,748,594 | 5/1988 | Iida | 365/200 |
| 4,752,869 | 6/1988 | Miller et al. | 371/36 |
| 4,774,709 | 9/1988 | Tulplue | 371/11 |
| 4,794,601 | 12/1988 | Kikuchi | 371/36 |
| 4,797,884 | 1/1989 | Yalowitz | 371/9.1 |
| 4,799,140 | 1/1989 | Dietz | 371/36 |
| 4,817,091 | 3/1989 | Katzman | 371/9.1 |
| 4,823,256 | 4/1989 | Bishop | 364/200 |
| 4,841,232 | 6/1989 | Graham et al. | 324/73 R |
| 4,858,101 | 8/1989 | Stewart | 364/131 |
| 4,868,826 | 9/1989 | Smith | 371/68.1 |
| 4,868,851 | 9/1989 | Trinidad | 371/36 |
| 4,872,106 | 10/1989 | Slater | 364/200 |
| 4,872,213 | 10/1989 | Sebald | 364/180 |
| 4,897,640 | 1/1990 | Rapoen | 340/825.16 |
| 4,916,612 | 4/1990 | Chin | 364/424.01 |
| 4,916,695 | 4/1990 | Ossfeldt | 371/68.3 |
| 4,926,364 | 5/1990 | Brothenton | 364/581 |
| 4,933,940 | 6/1990 | Walter | 371/16.5 |
| 4,955,020 | 9/1990 | Stone | 370/85.9 |
| 4,958,270 | 9/1990 | McLaughlin | 364/187 |
| 4,959,768 | 9/1990 | Gerhart | 364/187 |
| 4,965,745 | 10/1990 | Economy | 364/518 |
| 4,967,347 | 10/1990 | Smith et al. | 364/200 |
| 4,975,931 | 12/1990 | Cosand | 377/52 |
| 4,995,040 | 2/1991 | Best | 371/36 |
| 4,998,194 | 3/1991 | Okamoto et al. | 364/133 |
| 5,008,805 | 4/1991 | Fiebig | 371/9.1 |
| 5,271,023 | 12/1993 | Norman | 371/68.3 |
| 5,276,823 | 1/1994 | Cutts, Jr. et al. | 395/575 |
| 5,442,620 | 8/1995 | Kremer | 370/16.1 |
| 5,452,443 | 9/1995 | Oyamada et al. | 395/182.08 |

FOREIGN PATENT DOCUMENTS

| | | |
|---|---|---|
| 200704 | 11/1986 | European Pat. Off. . |
| 229559 | 7/1987 | European Pat. Off. . |
| 239662 | 10/1987 | European Pat. Off. . |
| 275362 | 7/1988 | European Pat. Off. . |
| 299323 | 1/1989 | European Pat. Off. . |
| 342846 | 11/1989 | European Pat. Off. . |
| 358785 | 3/1990 | European Pat. Off. . |
| 411295 | 2/1991 | European Pat. Off. . |
| 437129 | 7/1991 | European Pat. Off. . |
| 440204 | 8/1991 | European Pat. Off. . |
| 457201 | 11/1991 | European Pat. Off. . |
| 2303828 | 8/1974 | Germany . |
| 3310585 | 10/1984 | Germany . |
| 3522220 | 1/1987 | Germany . |
| 2079997 | 1/1982 | United Kingdom . |
| 2149939 | 6/1985 | United Kingdom . |
| 8204345 | 12/1982 | WIPO . |
| 8707967 | 12/1987 | WIPO . |
| 8902124 | 3/1989 | WIPO . |
| 8905551 | 6/1989 | WIPO . |

OTHER PUBLICATIONS

Figures 1, 2A–2B and 3A–3B as discussed in the Dow Chemical Art.

Gadi Kaplan, "The X–29: Is It Coming or Going?", IEEE Spectrum, Jun. 1985, pp. 54–60.

Gary R. Strickler, "Chemical Engineering Progress", Dec. 1986, pp. 50–56, Control of Pilot Plants & Laboratories Using Microcomputers.

Camile™ Brochures on Data Acquisition and Control.

N. Najafi, "An Architecture and Interface for VLSI Sensors", IEEE 1988, pp. 76–77.

808
GU11
GU13
GU14
GU8
GU3
GU10
R48
R39
C28
C23
C24
C36
Y1
CR5
CR6
CR7
J2
J3
J6
J7
J8
J9
TS1
+5V
P0
P1
P2
AD
RPDBUG
ALE
/EPROM
/PSEN
/XRAM
/RAM-WR
/IO
/ROM-WR
(WR-SELECT)
/DFSET
/DAC_LCD
/KEYBRD
/START_STOP
/FA
RESET
RXDATA
TXDATA
/RAD-26R
/RAD-26L
/WR
/RD

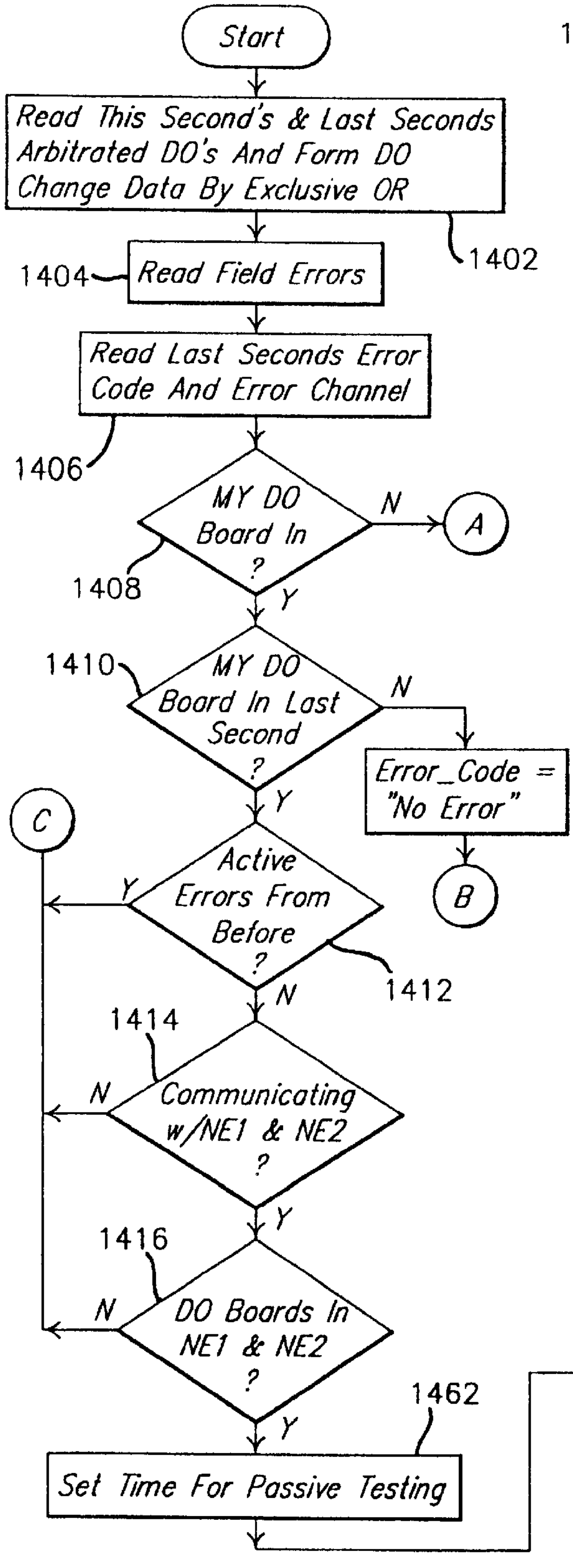
FIG. 19A
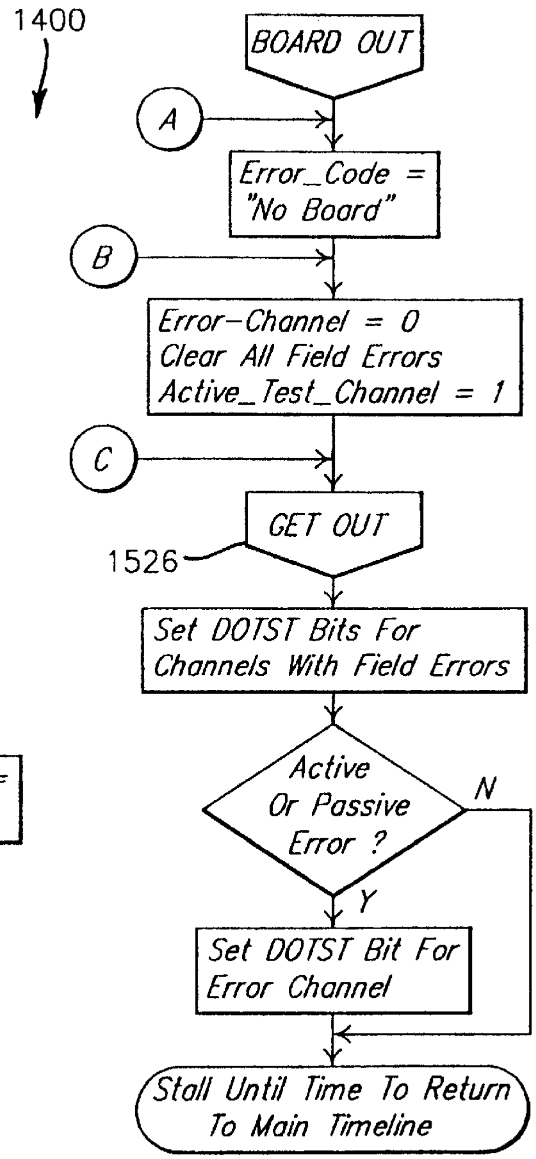
FIG. 19B
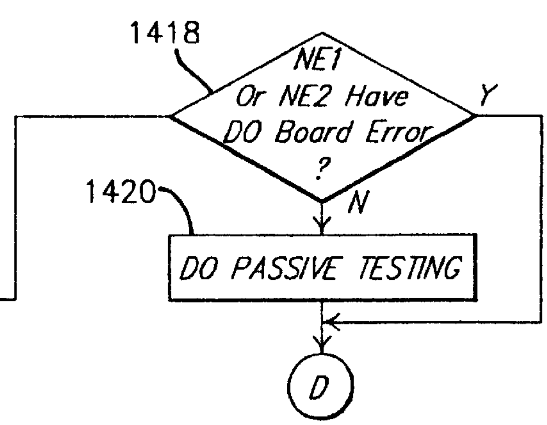

FIG. 21K
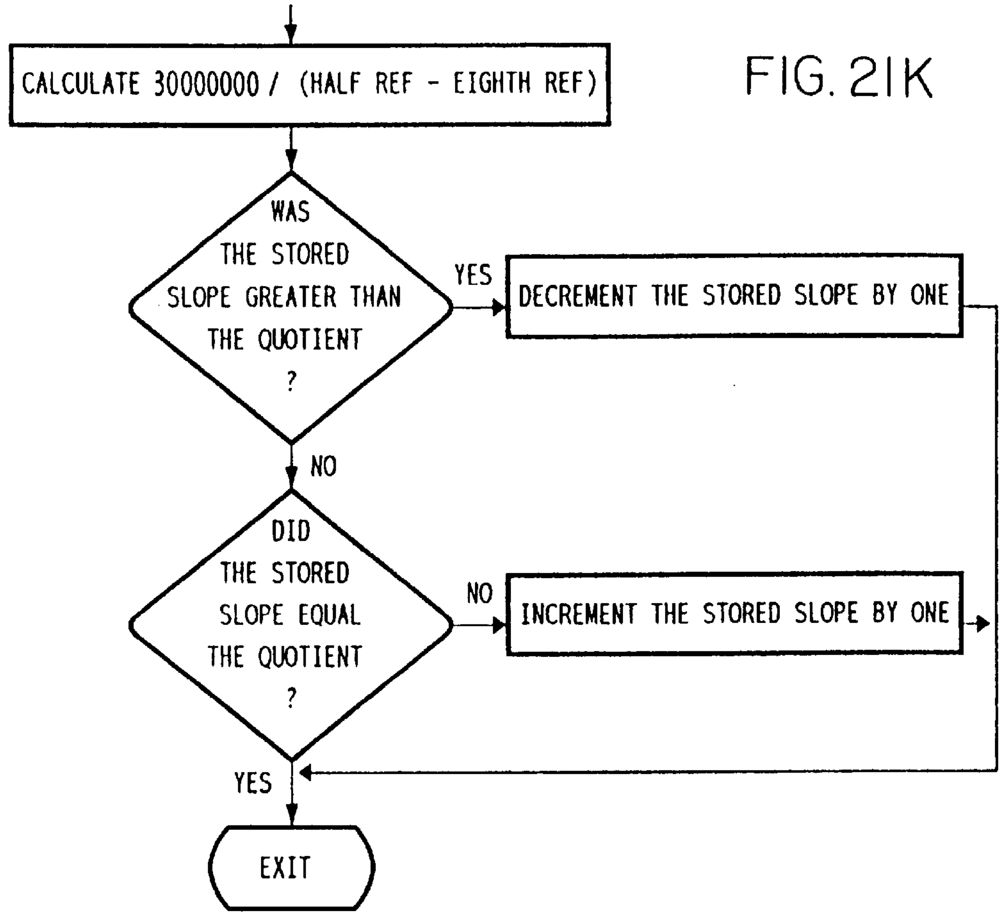
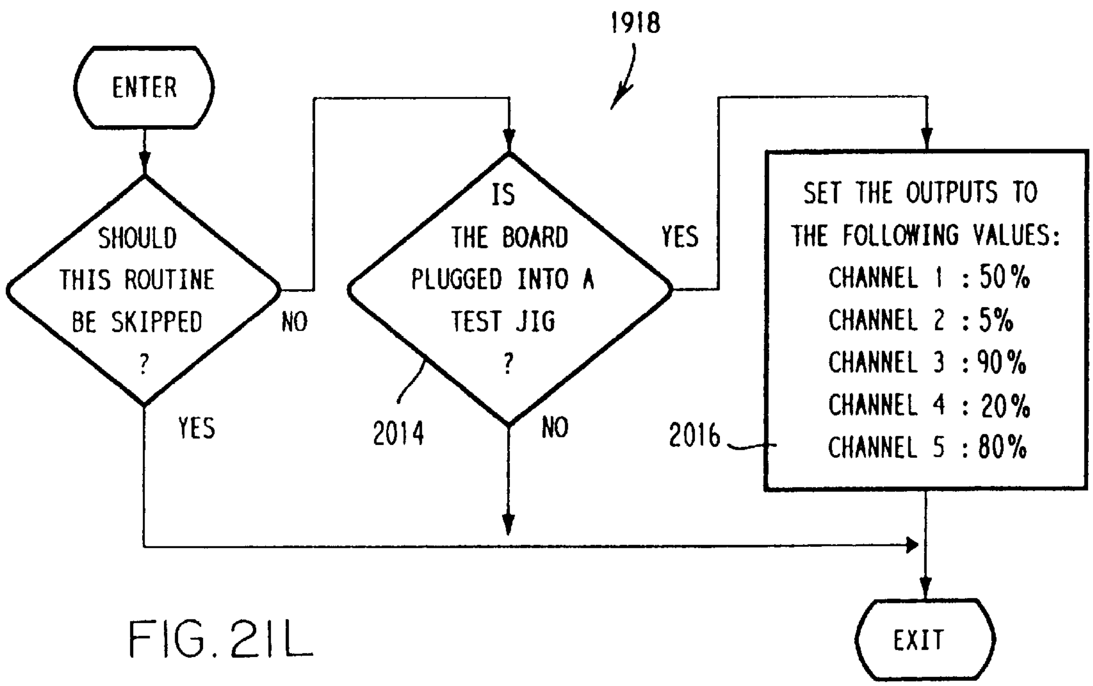
FIG. 21L

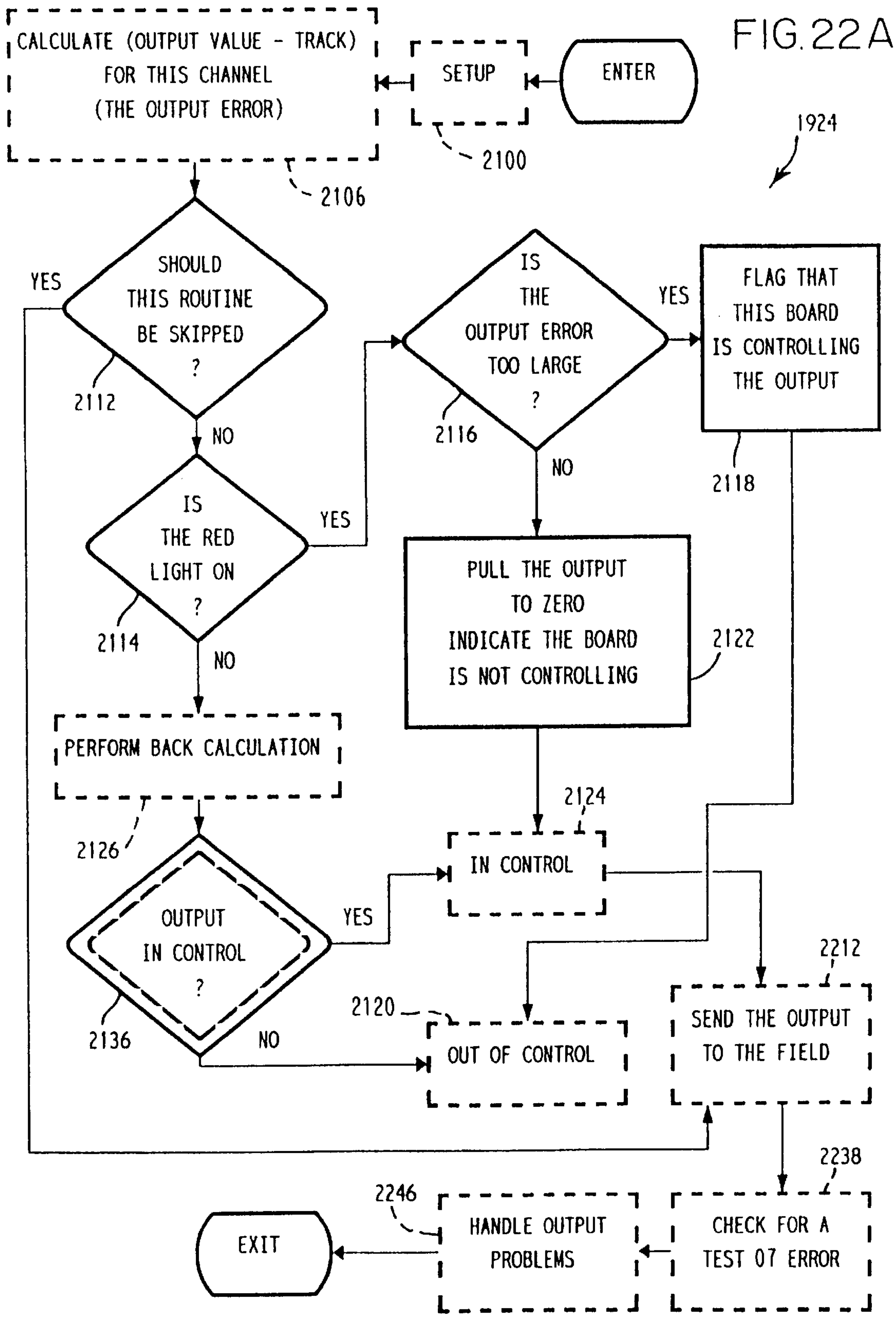
FIG.22A
1924
ENTER
SETUP
2100
CALCULATE (OUTPUT VALUE - TRACK) FOR THIS CHANNEL (THE OUTPUT ERROR)
2106
SHOULD THIS ROUTINE BE SKIPPED ?
YES
NO
2112
IS THE RED LIGHT ON ?
YES
NO
2114
IS THE OUTPUT ERROR TOO LARGE ?
YES
NO
2116
FLAG THAT THIS BOARD IS CONTROLLING THE OUTPUT
2118
PULL THE OUTPUT TO ZERO INDICATE THE BOARD IS NOT CONTROLLING
2122
PERFORM BACK CALCULATION
2126
OUTPUT IN CONTROL ?
YES
NO
2136
2124
IN CONTROL
2120
OUT OF CONTROL
2212
SEND THE OUTPUT TO THE FIELD
2238
CHECK FOR A TEST 07 ERROR
2246
HANDLE OUTPUT PROBLEMS
EXIT 2398
IS THE VOLTAGE HIGH ENOUGH ?
NO
YES
2400
DIABLE THE PROPER OUTPUT OP-AMP
G
SET THE DAC TO OUTPUT THE DEADMAN TEST VOLTAGE
2402
MEASURE THE OP-AMP TRACK VOLTAGE
2404
SET THE DAC TO OUTPUT THE ABORT TEST VOLTAGE
2406
ENABLE THE PROPER OUTPUT OP-AMP
IS THE VOLTAGE TOO LARGE ?
YES
2408
NO
E
EXIT

FEMMAI

BCOMM

FNEIGH_COMM

FIO_DOWN_LD

NETMAIN

GET_ONE

GET_CODE

2506

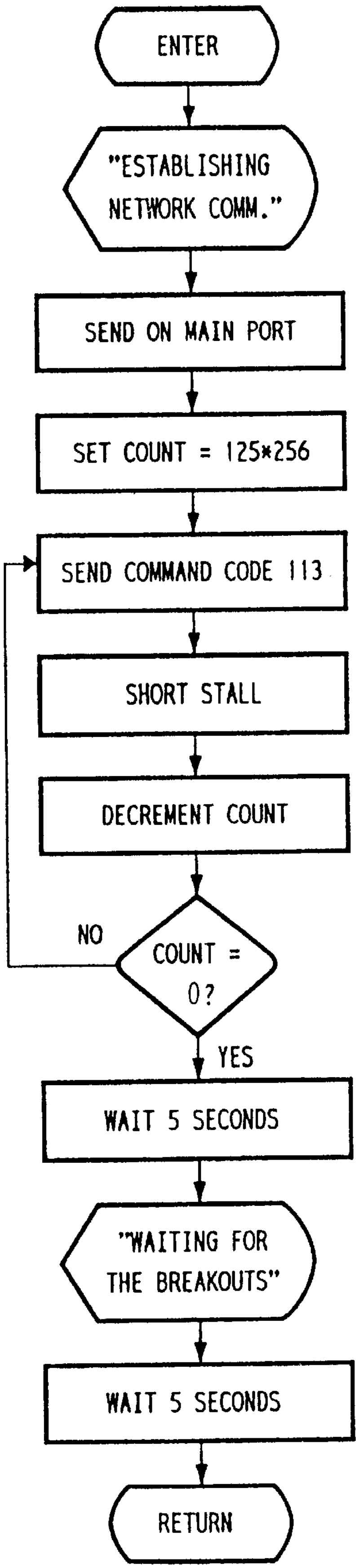
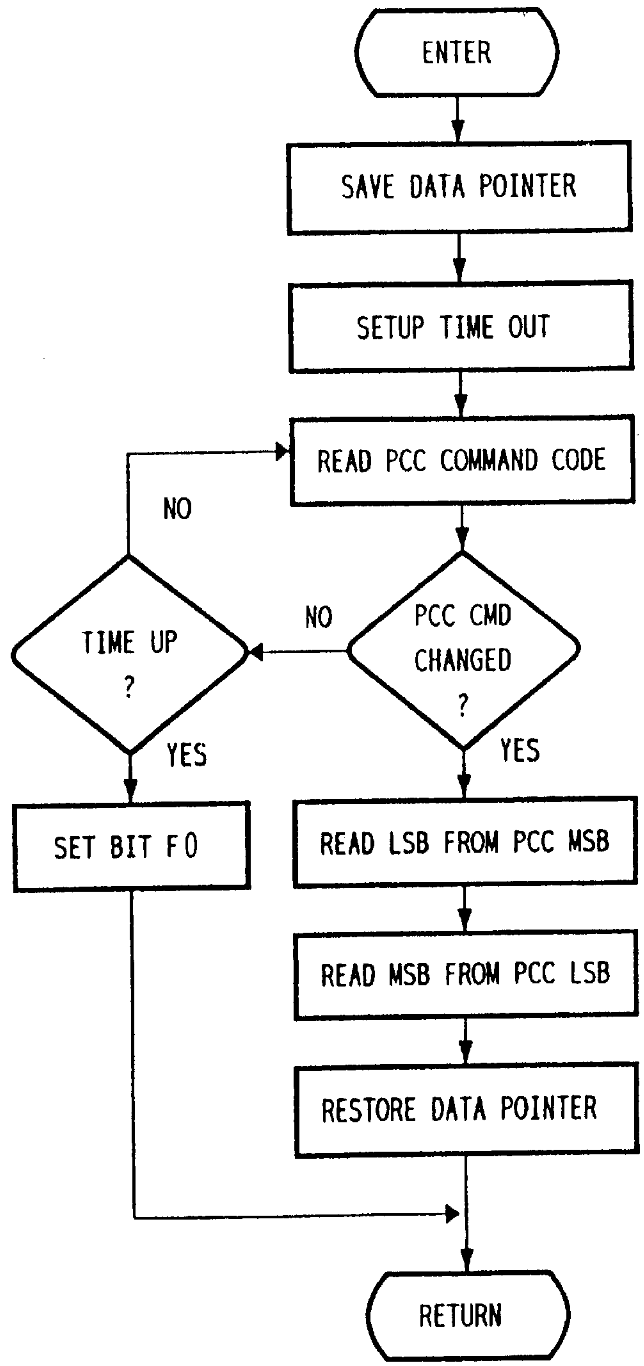
FIG.25G
GET_CODE/RECEIVE2BYTES
FIG.25H
GET_CODE/JUMPOUT

GET_CODE/NEW PROGRAM

GET_CODE/OLD PROGRAM

GET_CODE/VERIFY DOWNLOADED PROGRAM

VERIFY

NCOMM

NCOMM/SEND COMMAND

CHECK_MID

BRK DOWN LD

BRK DOWN LD/CHECK_SUMS

BRK DOWN LD/
RECEIVE/
DOWN_LOAD

BRK DOWN LD/
GET_ONE

2608

BRK DOWN LD/
JUMPOUT

BRK DOWN LD/
TELLALL

REPROG

REPROG/READ A BLOCK

REPROG/WRITE A BLOCK

FIO DOWN LD/ RECEIVE

FIO DOWN LD/ NEIGHBOR

FIO DOWN LD/NEIGHBOR/
SEND_NEIGH

FIO DOWN LD/NEW PROGRAM/LJMP REPROG

FIO DOWN LD/NEIGHBOR/
SEND_NEIGH/SEND_BYTE

FIO DOWN LD/
NEW PROGRAM

FIO DOWN LD/NEW PROGRAM/LJMP REPROG/BLOCK_READ

FIO DOWN LD/
NEW PROGRAM/
LJMP REPROG/
BLOCK WRITE

SIDE LOAD

SIDE LOAD/
VERIFY

MY SIDE REV

MY SIDE RCV/ NEIGHBOR

MY SIDE RCV/COMMAND
2658
ENTER
RECEIVED A BYTE?
NO
YES
CLEAR RECEIVE INTERUPT
READ SERIAL PORT BUFFER
COMMAND ?
NO
YES
CMD 122 ?
NO
YES
RECEIVED A BYTE?
NO
YES
COMPLEMENT OF CMD?
NO
YES
ENABLE PRAM WRITE
RESTORE DATA POINTER
B
RECEIVED A BYTE?
NO
YES
READ SERIAL PORT BUFFER
SAVE IT
DATA ?
NO
DISPLAY UPDATE
YES
RECOVER DPH
DPTR = :8000 ?
NO
YES
BANK ON
RECOVER DATA
A

MY SIDE RCV/
DISPLAY

MY SIDE RCV/MAIN

MY SIDE RCV/BANK ON

GET_CODE/CLEAR RAM

GET CODE/
VERIFY DOWNLOADED PROGRAM/
RCV_INIT

CHECK_MID/CALL NUMBERS

CHECK_MID/CALL GIT_BIT

BRK DOWN LD/
RCV_INIT

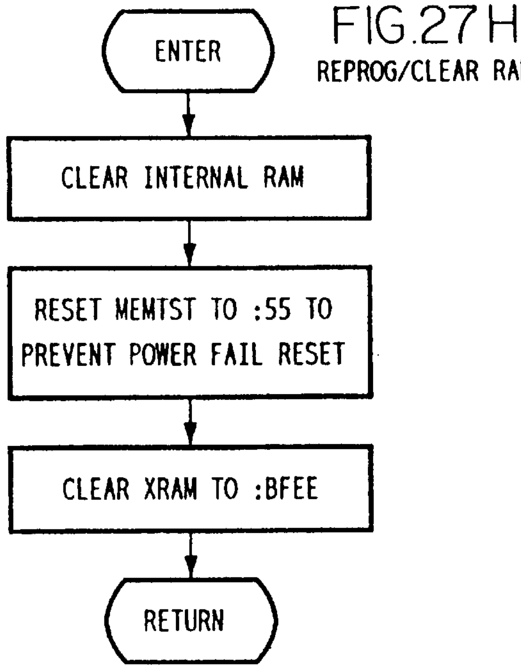
FIG.27H
REPROG/CLEAR RAM
FIG.27J
FIO DOWN LD/VXRAM/SKIP
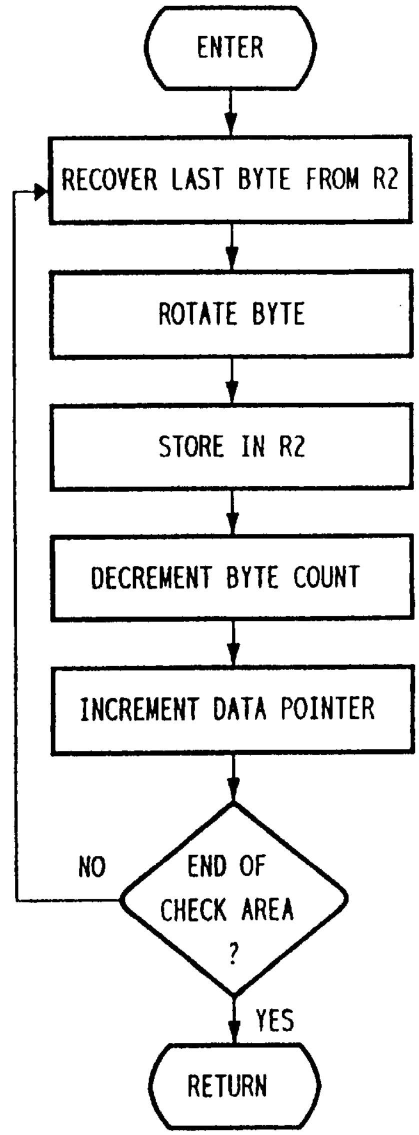
FIG.27I
FIO DOWN LD/OLD PROGRAM
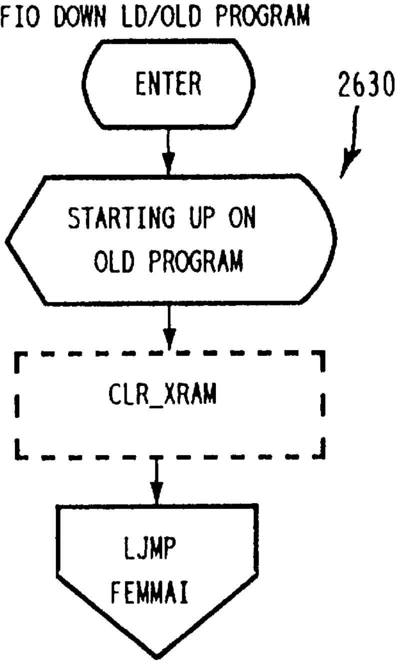
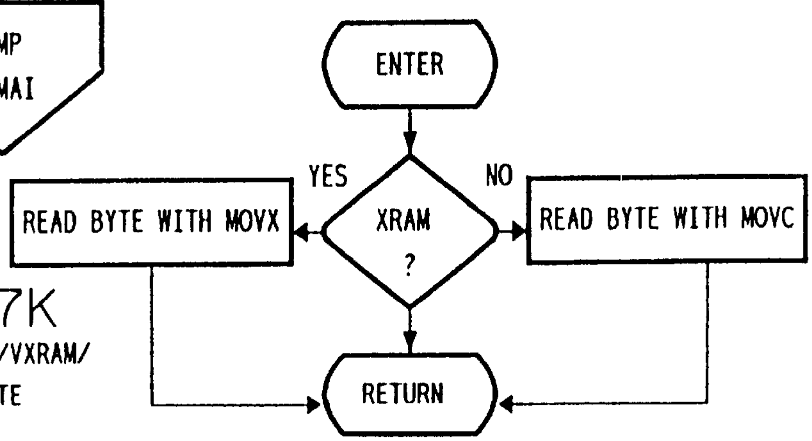
FIG.27K
FIO DOWN LD/VXRAM/
READ_BYTE

PROCESS CONTROL INTERFACE SYSTEM HAVING TRIPLY REDUNDANT REMOTE FIELD UNITS

CROSS-REFERENCE TO RELATED APPLICATION

This is a continuation of application Ser. No. 08/484,995, filed Jun. 7, 1995, now abandoned which is a division of U.S. patent application Ser. No. 07/864,931, filed Mar. 31, 1992, now U.S. Pat. No. 5,428,769.

BACKGROUND OF THE INVENTION

The present invention generally relates to the interface between a process control computer and its remotely located field instrumentation. More specifically, the present invention relates to a process control interface system which is comprised of a distributed network of triply redundant remote field units that communicate with redundant process control computers over redundant fiber optic paths.

One of the most difficult and elusive goals to achieve in the design of any automated process control system is to provide an accurate, fast and yet highly reliable control system which is capable of withstanding the rugged demands of controlling a physical process non-stop for years at a time, if possible. This is particularly true for the process control applications in a chemical plant where the cost of shutting down a complex large-scale process for computer system repairs may be enormous due to the time, effort and waste incurred in attempting to bring such a process back on line.

In order to achieve maximum economic efficiency and optimum product quality, the demands for more comprehensive process control automation have continued to increase in both quantity and sophistication. As the reliance on computer-based control for the operation of a chemical process increases, it is clear that a number of computers are required to work together in order to accomplish all of the desired control tasks. This, of course, adds further complexity to a control system for which maximum fault tolerance is desired.

In order to increase the reliability of a process control computer system, many attempts have been made to provide a backup computer for one or more of the computers being used to actively control the process. However, a rapid hand-off of control from an active computer to a backup computer is difficult to achieve if the goal is to provide a seamless or transparent transfer to the devices which affect the operation of the physical process. Additionally, the conditions under which a transfer of control should be made may be complex and consume needed processor time during normal operations.

Another approach to this problem is to provide triple redundancy with three actively operating computers. While the provision of three computer processors certainly increases the overall cost of the control system, it does permit the use of "majority voting" for decision making. The benefit of majority voting not only adds to the ability of the computer system to withstand a fault in one of the computers, it also helps to ensure that the decisions being made are accurate. In other words, the agreement of two out of three computers on any particular decision increases the likelihood that the decision is ultimately correct.

Nevertheless, even when triply redundant control is found to be desirable, a myriad of design problems must first be confronted in order to achieve a truly effective triply redundant control system, including the handling of internal failures within different areas of the triply redundant control system. While there have been a number of attempts to appropriately manage the interrelationships between a set of three or more computers, there is still considerable room for advancement in this art, particularly as it relates to large scale chemical process control applications.

Accordingly, it is a principal objective of the present invention to provide a distributed network of triply redundant field computer units which communicate with redundant process control computers to maximize both accuracy and the overall system's tolerance to faults in the process control system that could affect the physical process being controlled.

It is another objective of the present invention to provide a distributed network of triply redundant field computer units which enables broadcast downloading of updated software to each of these units without affecting the process being continuously controlled.

It is a further objective of the present invention to provide a triply redundant field computer unit which permits circuit boards in one of the computers contained in the unit to be replaced without affecting the process being controlled or requiring control to be forced to one or the other of the remaining computers.

It is an additional objective of the present invention to provide a triply redundant field control unit which enables a unique arbitration process of field inputs and outputs to be achieved.

It is also an objective of the present invention to provide a triply redundant field computer unit which is capable of automatically aborting potentially erroneous output signals.

It is yet another objective of the present invention to provide a triply redundant field computer unit which enables any two computers contained in the unit to temporarily reset, and if necessary, more permanently reset the remaining computer.

It is still an additional objective of the present invention to provide a triply redundant field computer unit which includes one or more "smart" multi-function input circuits for interpreting raw sensor information and one or more "smart" output circuits for independently determining the manner in which a desired output value is achieved.

It is still a further objective of the present invention to provide a method of testing both digital and analog output circuits which is non-intrusive to the process being continuously controlled.

It is yet another objective of the present invention to provide a triply redundant field computer unit which includes a high current output power supply circuit and a battery backup that may be periodically tested under load conditions.

SUMMARY OF THE INVENTION

To achieve the foregoing objectives, the present invention provides a plurality of self-contained remotely located triply redundant field computer units which are connected to decision making redundant process control computers through a bi-directional communication network having at least two concurrently active communication channels. Each of the field computer units include a set of at least three redundant field computers for converting raw analog and digital input signals into arbitrated input value signals at predetermined times. The input arbitration method provided by the redundant field computers enables a plurality of selectable default input conditions for each input signal, such as select HIGH and select LOW, in the event that a majority agreement cannot be reached among valid input signals.

Messages containing these arbitrated input value signals are transmitted to the redundant process control computers from each of the field computer units over a multi-level fiber optic network. The fiber optic network is designed to permit substantial communication testing, and enable the direction of signal transmission on the primary level of signal distribution to be reversed in the event of a communication fault. Once the appropriate process control decisions are made, the field computer units receive output value signals from the redundant process control computers over the fiber optic network.

The field computer units also include a set of individual abort circuits for each output signal to be transmitted to a device which affects the operation of the physical process. These abort circuits effectively enforce the output value signals arbitrated independently through each of the three redundant field computers. The software arbitration process involves using a tiered voting procedure which includes a plurality of selectable default output conditions, such as fail SAFE and fail LAST. Each of the default input and output conditions are determined through software implementation, such as at the redundant process control computers. With the software implementation according to the present invention, each of the default input and output conditions may be rapidly changed in response to changing process conditions.

Additional features and advantages of the present invention will become more fully apparent from a reading of the detailed description of the preferred embodiment and the accompanying drawings in which:

BRIEF DESCRIPTION OF THE DRAWINGS

FIGS. 8F–8Q comprise a series of flow charts associated with the operation of the multiple-mode pulse input circuit of FIGS. 8A–8E.

FIGS. 19A–19M comprise a set of flow charts which illustrate the method of non-intrusively testing the digital output circuits shown in FIG. 10A.

FIGS. 24A–24G, 25A–25Z, 26A–26Z and 27A–27M comprise a set of flow charts which illustrate the method of downloading software in accordance with the present invention.

DETAILED DESCRIPTION OF THE PREFERRED EMBODIMENTS

Figure 1:
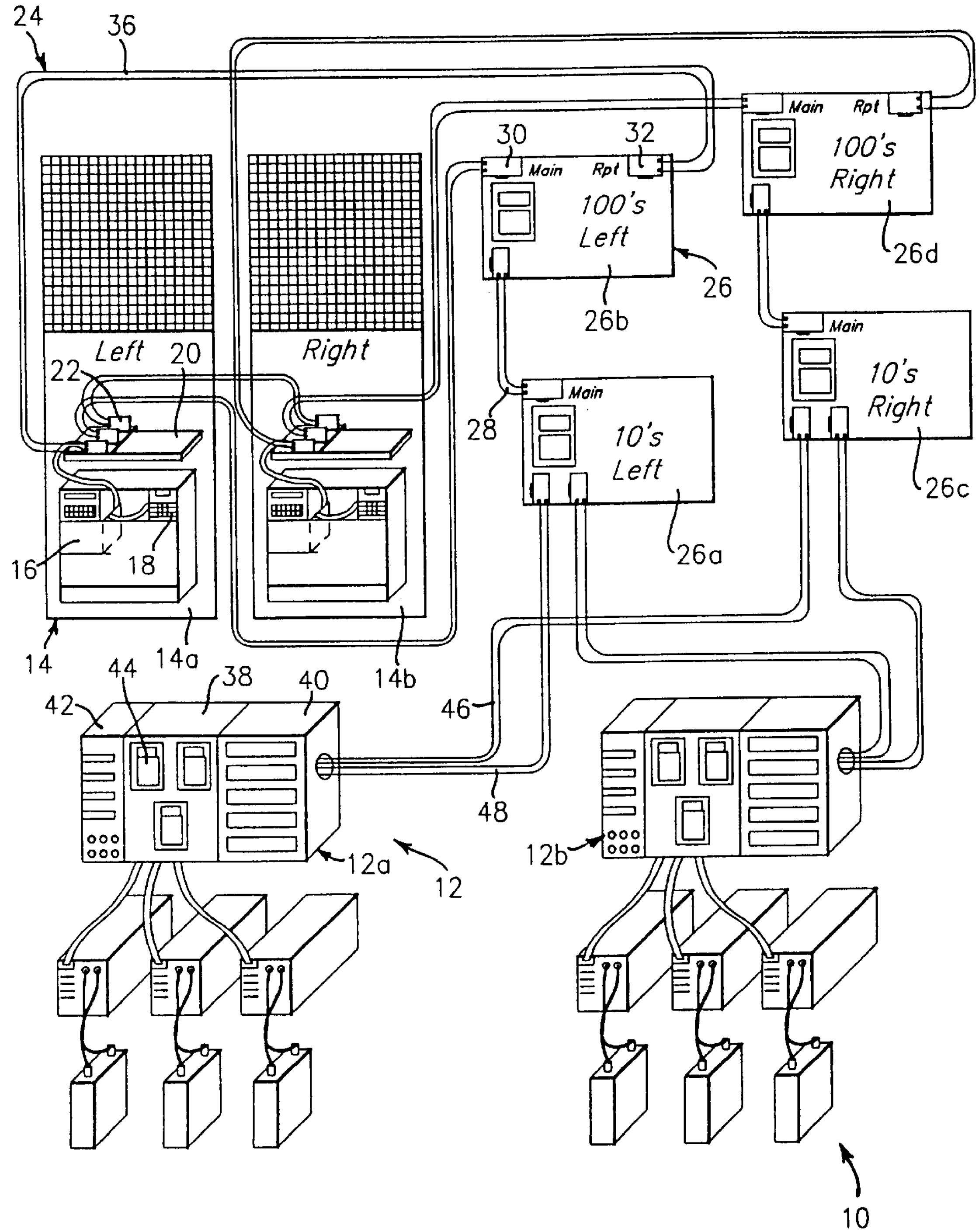
FIG. 1 is a diagrammatic view of a process control interface system according to the present invention.

Referring to FIG. 1, a process control interface system 10 having a network of distributed triply redundant input/output field computer units 12 is shown. In this regard, it should be appreciated that FIG. 1 includes only two field computer units 12 for purposes of illustration, and that the interface system 10 has the capability of handling a significant number of field computer units. For example, in one embodiment according to the present invention, the interface system 10 is capable of utilizing a maximum of sixty four field computer units 12.

The field computer units 12 serve as the primary interface between the field instrumentation and a centralized process control computer system. In the embodiment discussed herein, the centralized process control computer system is generally comprised of a pair of redundant process control computers, which are generically referred to by reference number 14. While the redundancy of two concurrently operating process control computers has certain fault tolerance advantages over a single decision making process control computer, it should be understood that the principles of the present invention are not limited to any particular process control computer design or configuration. Thus, for example, it may be desirable to employ only one or even three process control computers in the place of the two process control computers 14 shown in FIG. 1 under the appropriate circumstances.

In the present embodiment, the redundant process control computers 14 preferably operate concurrently on all of the signals transmitted from the field computer units 12. In other words, each of the process control computers 14 are capable of making independent decisions based upon the data received by these redundant computers from the field computer units 12. The decisions made by the process control computers 14 determine the output signal values which are ultimately directed to specific output devices (e.g., valves, pump motors and reactor heaters) by the appropriate field computer units 12. While the output signal values are preferably reconciled at least to some extent between the two process control computers 14 before the transmission of these signals to the proper field computer units 12, it should be understood that two independent sets of output signal values could be communicated to the field computer units. In this regard, the input values received from a field computer unit 12 could be arbitrated at the process control computers 14, which should make it unnecessary to reconcile or arbitrate output values. This is because both of the process control computers would then be working from the same set of arbitrated input values.

As an example of a preferred form of possible value reconciliation, corresponding output value tables in each of the process control computers 14 could be compared during a preset time period, and one of the values could be chosen for each output value signal to be transmitted to the field computer units 12. This selection of output control values could be made on a suitable criteria to the process being controlled, such as the use of the value determined by the Left process control computer 14*a* when the value determined by the Right process control computer 14*b* is within a certain predetermined percentage limit (e.g., 2.5%). Otherwise, the distinct output control values of both the Left and Right process control computers 14 could each be sent to the proper field computer units 12 when these values are found to be outside the predetermined percentage limit. Alternatively, the selection of different output control values from the Left and Right process control computers could be made on the basis of a software implemented preference. Thus, for example, under certain process conditions, it may be considered more appropriate to select either the high or low value for transmission to the field computer unit 12, regardless of whether the value was determined by the Left or Right process control computer.

Each of the process control computers 14 preferably include a network controller 16, a debug panel 18 for the network controller, and a tray 20 upon which to support the fiber mount boards 22 to which various fiber optic conduits 24 are connected. As will be more fully discussed in connection with FIGS. 13A–13D, the network controller 16 is used to direct communication traffic both to and from the process control computers 14 via the fiber optic conduits 24. The debug panel 18 includes both a display and a set of numeric/function keys in order to provide a window into specific operations of the network controller 16.

As will be discussed more fully in connection with FIGS. 15A–15B, each of the fiber mount boards 22 contain the transmission circuit required to convert electrical signals to optical signals, as well as the receiver circuit required to convert optical signals to electrical signals. As for the fiber optic conduits themselves, these conventional light conductors may be made of either glass or plastic. However, it should be appreciated that the use of glass fibers permit significantly greater transmission distances to be achieved. While it is preferred that fiber optic conduits be employed to convey messages between the field computer units 12 and the process control computers 14 for their high speed throughput and substantial security, it should be understood that other suitable communication mediums could be used in the appropriate applications.

As illustrated in FIG. 1, the fiber optic network which connects each of the process control computers 14 with each of the field computer units 12 includes a set of breakout circuits 26 for each of the redundant process control computers. As will be more fully discussed in connection with FIGS. 14A–14E, each of the breakout circuits are designed to facilitate multiplexed serial communication between a plurality of field computer units 12 and one of the redundant process control computers 14.

Thus, for example, the breakout circuit 26*a* is configured to provide multiplexed serial communication between the Left process control computer 14*a* and up to ten field computer units 12. The breakout circuit 26*a* is in turn connected via fiber optic conduits 28 to the breakout circuit 26*b* which is configured to provide multiplexed serial communication between the Left process control computer 14*a* and several groups of field computer units 12. In this regard, the breakout circuit 26*a* represents one group of field computer units 12 to the breakout circuit 26*b*.

It should be noted that the breakout circuit 26*b* is connected to the Left process control computer 14*a* through both a main port 30 and a repeat port 32. Specifically, the fiber optic conduits 34 provide a connection between the main port 30 of the breakout circuit 26*b* and the Left process control computer 14*a,* while the fiber optic conduits 36 provide a connection between the repeat port 32 of the breakout circuit and the Left process control computer. The fiber optic conduits 34–36 thereby form a ring around the Left process control computer 14*a* and the breakout circuit 26*b*. As will be discussed in more detail below, the breakout circuits are designed to be multi-functional in that they have the capability of not only multiplexing communication, but also conveying messages that are received at the main port 30 out to the repeat port 32. This ability to repeat messages also enables the network to extend for great distances, as will be described in connection with FIG. 4.

Additionally, the network controller 16 also has the ability to direct that messages be transmitted from the process control computer 14*a* to the repeat port 32 of the breakout circuit 26*b*. This important feature permits communication to continue without significant interruption in the event that communication cannot proceed through the fiber optic conduits 34. In other words, the direction of signal communication on the ring between the process control computer 14*b* and the breakout circuit 26*b* may be reversed in the event of a communication fault.

Additionally, it should be appreciated through FIG. 1 that a substantially identical communication network between the Right process control computer 14*b* and each of the field computer units 12 is provided by the breakout circuits 26*c*–26*d* and their associated fiber optic conduits. Thus, it should be appreciated that the capability to change the direction of signal flow at the primary (or first) level of signal distribution is provided for each of the network communication rings connected to the Left and Right process control computers through their respective network controllers 16.

In accordance with the present invention, the integrity of each of these network communication rings is tested before any signals are transmitted to the field computer units 12. Indeed, it may be possible with the present invention for the integrity of the entire network to be periodically tested as a preliminary part of the signal communication process. Thus, for example, with an overall process and communication cycle of one second, the integrity of at least the primary network communication rings is preferably tested each second, as this integrity check will help to avoid wasted or incomplete communication efforts.

Specifically with reference to FIG. 1, a synchronization pulse (e.g., a 1 byte message) is transmitted from the network controller 16 to, and around, the ring formed by fiber optic conduits 34, breakout circuit 26*b* and fiber optic conduits 36. The purpose of this synchronization pulse is to permit the Left process control computer to determine whether or not signals may be successfully transmitted in this counterclockwise direction. In this regard, a reception of the synchronization pulse from the repeat port 32 of the breakout circuit 26*b* via fiber optic conduits 36 within a predetermined amount of time (e.g., a timeout of 300 micro seconds) will indicate that there are no breaks in the communication path or circuit faults which would interfere with the proper transmission of signals on this portion of the network. A similar synchronization pulse will then be transmitted from the network controller 16 in the opposite direction, namely around the ring formed by fiber optic conduits 36, breakout circuit 26*b,* and fiber optic conduits 34, to determine whether or not signals may be successfully transmitted in this clockwise direction.

Figure 2:
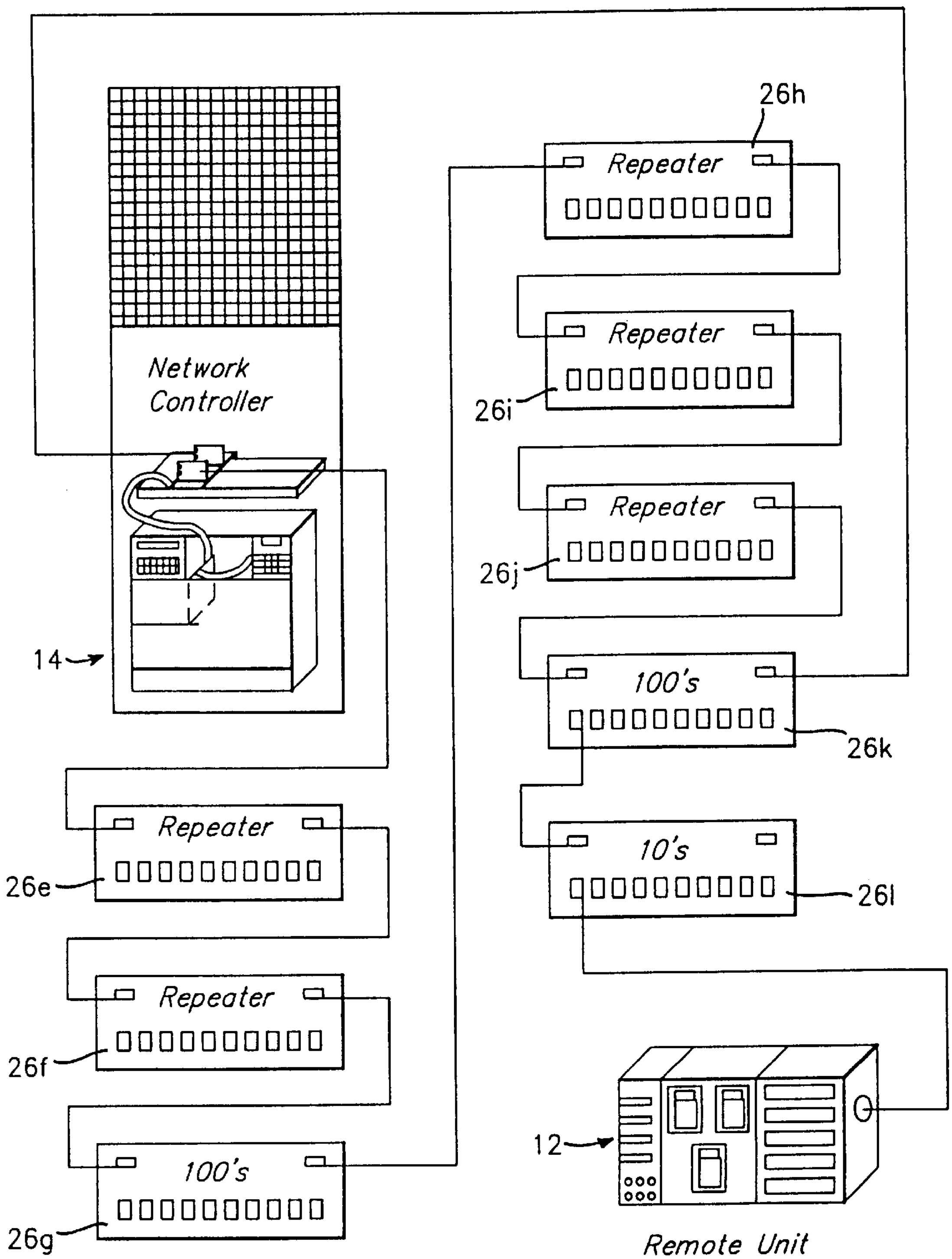
FIG. 2 is a diagrammatic representation of a portion of the fiber optic communication network shown in FIG. 1 which particularly illustrates the multi-function breakout circuits of the network.

As will be more fully appreciated from FIG. 2, it will be seen that a plurality of breakout circuits 26 may be connected in series to provide the primary level of signal distribution for the network. In this regard, the successful circulation of the first synchronization pulse around the ring shown will establish that each of the breakout circuits 26*e*–26*k* were able to receive and repeat this pulse. More specifically, each of the breakout circuits 26 preferably respond to the synchronization pulse by transmitting a signal which identifies itself to the network controller 16. However, if for example, breakout circuit 26*k* did not repeat this synchronization pulse back to the network controller 16, then the subsequent transmission of a synchronization pulse in the opposite direction will help to establish not only where the signal interruption occurred, but will enable the process control computer 14 and its network controller 16 to determine the path required to transmit signals to or receive signals from each breakout circuit 26 on the primary level of signal distribution. As a result of the integrity testing process, the network controller 16 will store the path information necessary to transmit or receive signals from each of the field computer units 12 in random access memory ("RAM"). In other words, signals directed to some of the field computer units 12 may be transmitted via fiber optic conduits 34, while signals directed to other field computer units 12 may be transmitted via fiber optic conduits 36 in the same overall timing cycle (e.g., one second) period.

FIG. 2 also serves to point out that the breakout circuits 26 may serve to function as signal repeaters, such as breakout circuits 26*e*–26*f* and 26*h*–26*j*. Thus, where the field computer units 12 are located at significant distances from the process control computer (e.g., one mile), then one or more of the breakout circuits 26 may be used to provide the signal re-transmission necessary to permit an accurate signal reception at such remote field computer units.

Referring again to FIG. 1, each of the field computer units 12 are shown to include a processor chassis 38, a DC chassis 40 and an expanded DC chassis 42. The processor chassis 38 includes three redundant computer circuits, which may also be referred to as field I/O controllers, and their associated analog input ("AI"), analog output ("AO") and digital output ("DO") processing circuits. In one form of the present invention, the digital input ("DI") circuits may be contained on the field I/O controller circuit boards. As illustrated in FIG. 1, the processor chassis provides a debug panel 44 for each of the redundant computer circuits in the field computer unit 12 to enable a technician to view selective internal operations of these circuits. The DC chassis 40 generally provides three functions. The primary function of the DC chassis 40 is to provide a connection point for DC field instrumentation. Additionally, the DC chassis 40 provides a mounting location for the fiber mount board utilized for terminating the fiber optic conduits 46 and 48 of the communication network. The DC chassis also provides a mounting location for a passive element board, which is used to provide protection to circuit elements of the field computer unit 12 from high energy surges that may be encountered in the field (e.g., lightening). The passive element board includes a passive element circuit for each analog and digital input signal. These passive element circuits include positive temperature coefficient (PTC) resistors and zener diodes in conventional circuit protection configuration. The expanded DC chassis 42 provides a mounting location for additional DI and AI circuits and passive element circuits in the event that the not all of the DIs and AIs may be accommodated by the DC chassis 40.

FIG. 1 also shows that each of the redundant computer circuits in the processor chassis 38 is preferably connected to a separate power supply 50. The circuit for these power supplies 50 will be discussed in connection with FIGS. 16A–16G. Each of these power supplies 50 is preferably provided with its own backup battery 52. The batteries 52 facilitate uninterrupted operation by the field computer unit 12 in the event that the source of alternating current normally provided for the power supplies becomes temporarily unavailable. Thus, it should be appreciated that a fault at any one of the power supplies 50 or even an interruption in the supply of alternating current power to the field computer unit 12 will not affect the underlying physical process being controlled by the field computer unit 12. Alternatively, it should be appreciated that a conventional uninterruptable power supply could be used as an option to avoid a potential loss of electrical power.

Figure 3:
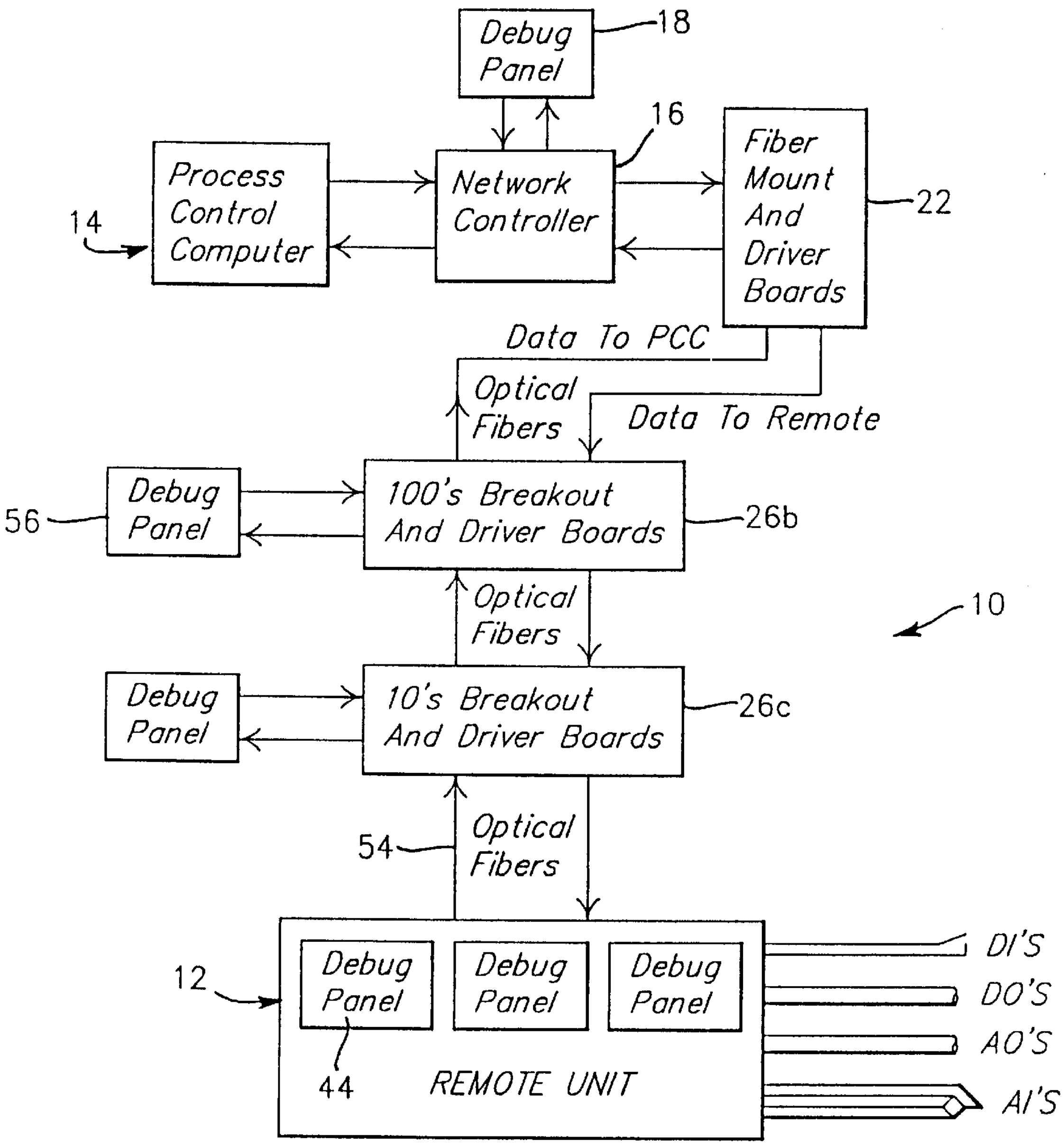
FIG. 3 is a block diagram of the process control interface system shown in FIG. 1.

Referring to FIG. 3, a block diagram of the distributed interface system 10 is shown. In this regard, FIG. 3 serves to point out the bi-directional nature of the flow of signal communication through the use of the arrows 54 which are pointed in opposite directions. Additionally, FIG. 3 illustrates that each of the breakout circuits 26 is preferably provided with a debug panel 56. Each of the debug panels discussed herein, namely debug panels 18, 44 and 56, are simply provided to assist a field technician during the maintenance or repair of the various circuits to which these debug panels are attached. Furthermore, FIG. 3 illustrates generic devices for the DI's, DO's, AI's and AO's which are connected to the field computer unit 12. However, as will be appreciated from the discussions below, each of the field computer units 12 is capable of handling a substantial number of such field instrumentation inputs and outputs.

Figure 4:
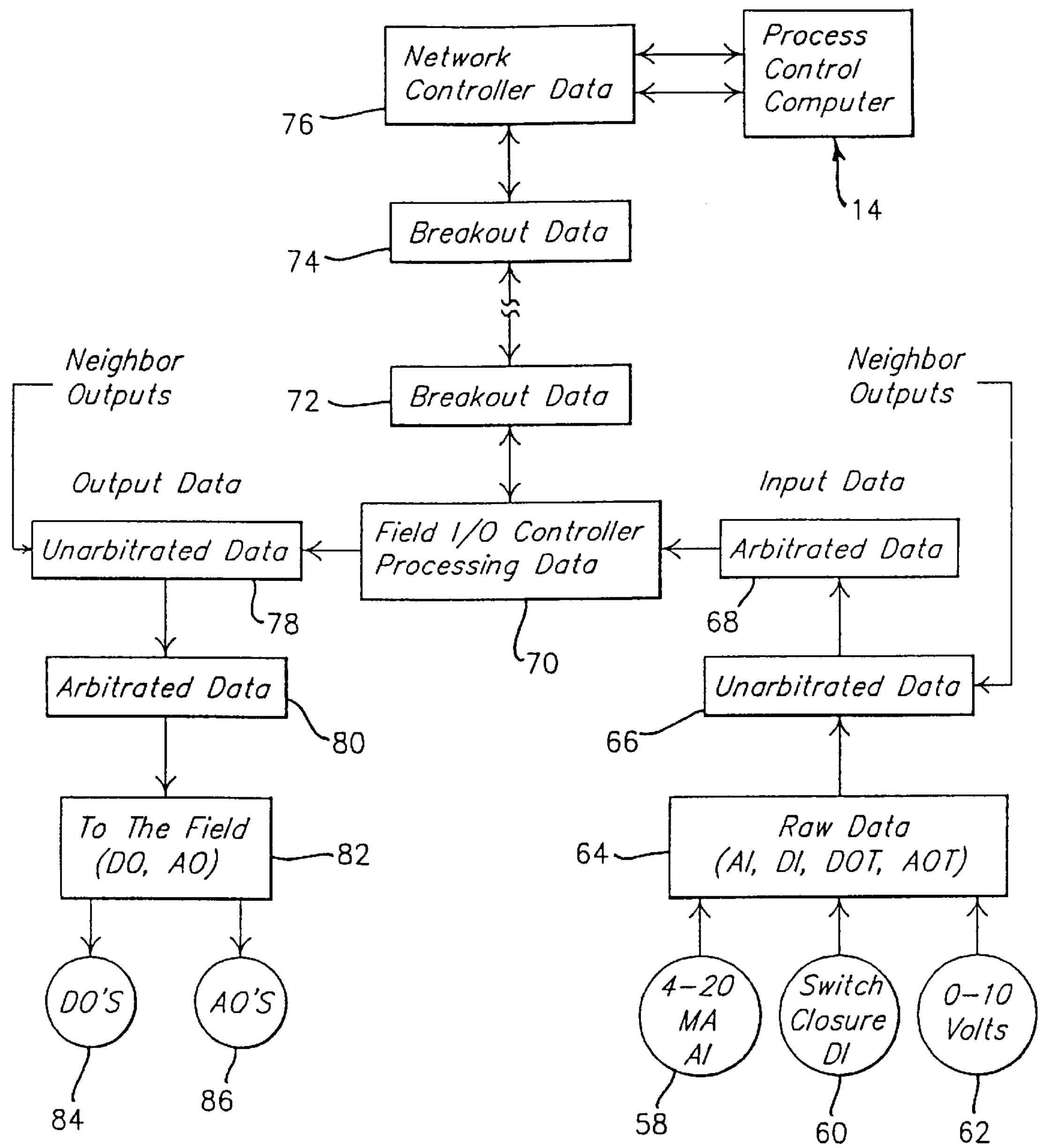
FIG. 4 is a block diagram which illustrates the flow of data communication in the process control interface system of FIG. 1.

Referring to FIG. 4, a block diagram of the flow of data/command/program signal communication for the interface system 10 is shown. In this regard, three circles 58–62 are used to illustrate exemplary signal inputs to the field computer unit 12. Thus, an exemplary AI signal 58 may be comprised of a 4–20 ma current signal input, while an exemplary DI signal 60 may be comprised of a signal which is indicative of the closure or non-closure of a switch. When these signals are received by the field computer unit 12, they are referred to as "raw data" (block 64), and it should be understood that all of the raw data signals are read by each of the redundant computer circuits in the field computer unit 12. While each of the redundant computer circuits in the field computer unit 12 could be provided with its own set of corresponding input sensors, it is preferred that each of the redundant computer circuits receive the same input signals. In the event that it is desirable to provide two or more sensors to detect a particular process condition, it is still preferred that each of the redundant computer circuits receive the input signals from each of these corresponding sensors. In such a case, the redundant computer circuits would process each of these corresponding signals as a separate input signal. In other words, if three flow meters were used to detect the flow rate of a fluid at the same location in a fluid stream, then each of the three redundant computer circuits would process each of these three input signals and share these three input signals with each other through neighbor to neighbor communications. In this way, the full power of these redundant computer circuits may be utilized to enable the best opportunity for accurate decisions to ultimately be made. It should also be noted that block 64 indicates that the raw data signals includes DOT and AOT values. These values are feedback or track signals which are used to permit the appropriate circuits and software in the field computer unit 12 to determine if the output values sent to the field instrumentation are in accordance with commanded values received from the process control computers **14*a*–14*b*. These feedback or track signals are also transmitted to the process control computers 14*a*–14*b*** for possible use as an assurance that the output is in the desired state.

Once the raw data signals have been received, each of the redundant computer circuits will independently determine whether or not the data is valid (block 66). This initial validity check helps to prevent the transmission of inaccurate input data, such as could occur if an input board was not properly plugged in or it was inoperative. Each of the redundant computer circuits will also exchange the data that they have read from the field. In the case of analog input signals, each of the redundant computer circuits compares the difference between its input data signal and the input data signal from its neighbors, on a channel by channel basis, against a predetermined tolerance boundary to determine if the signal is within both a relatively broad range and a relatively narrow range of acceptable levels.

The validated signals for each input are independently arbitrated by the redundant computer circuits (block 68), as will be more fully discussed in connection with the flow charts of FIGS. 17A–17E and 18A–18N. Once the validated data signals have been arbitrated in software, the redundant computer circuits have effectively selected the specific input value to be transmitted to the process control computers **14*a*–14*b* via the fiber optic conduits 46–48 (block 70). In this regard, it should be understood that three redundant computer circuits are included in the field computer unit 12, while only two sets of fiber optic conduits 46–48 are employed in this embodiment to convey signals. Accordingly, it should be appreciated that the arbitrated data signals will be concomitantly transmitted from two of the three redundant computer circuits to the process control computers 14*a*–14*b* via the breakout circuits 26 (blocks 72–74) and the network controller 16 (block 76**).

Once the process control computers **14*a*–14*b* make their process control decisions, then the (independent or reconciled) output value signals will be transmitted concomitantly to the appropriate field computer units 12 via both the Left and Right network rings. In accordance with the present invention, it is not necessary for the output value signals to be simultaneously transmitted to the appropriate field computer units 12 through both the Left and Right network branches. Specifically, it should be noted at this point that the network controllers 16 for the Left and Right process control computers 14*a*–14*b* operate under their own clocks, even though the timing of these clocks are preferably adjusted in software once per second to a clock signal in their respective process control computers. In a similar way, one of the process control computers (e.g., computer 14*b*) preferably adjusts its clock signal to the clock signal of the other process control computer (e.g., computer 14*a*). Likewise, the clocks for each of the redundant computer circuits in the field computer unit 12 preferably adjust themselves to one of their clocks (e.g., the Left computer circuit) with each process control cycle. Accordingly, it should be appreciated that the clocks in each of the process control computers 14*a*–14*b*, the network controllers 16** and the field computer units may undergo a periodic adjustment in order to maintain the clock signals within a desired tolerance (e.g., 4 milliseconds).

In any event, when the output value signals are received at a field computer unit 12, they are communicated to each of the redundant computer circuits, and are referred to as Unarbitrated Data in block 78. Then, in accordance with the present invention, each of the redundant computer circuits independently arbitrate these output value signals in software (block 80). Finally, each of the redundant computer circuits transmit each of the arbitrated output value signals to the field DO devices 84 and the field AO devices 86 (block 82) through a set of abort circuits which will be discussed below in connection FIGS. 10A and 10B. However, at this juncture it should be noted that the abort circuits enforce the decisions made via software arbitration by each of the redundant computer circuits.

Figure 5:
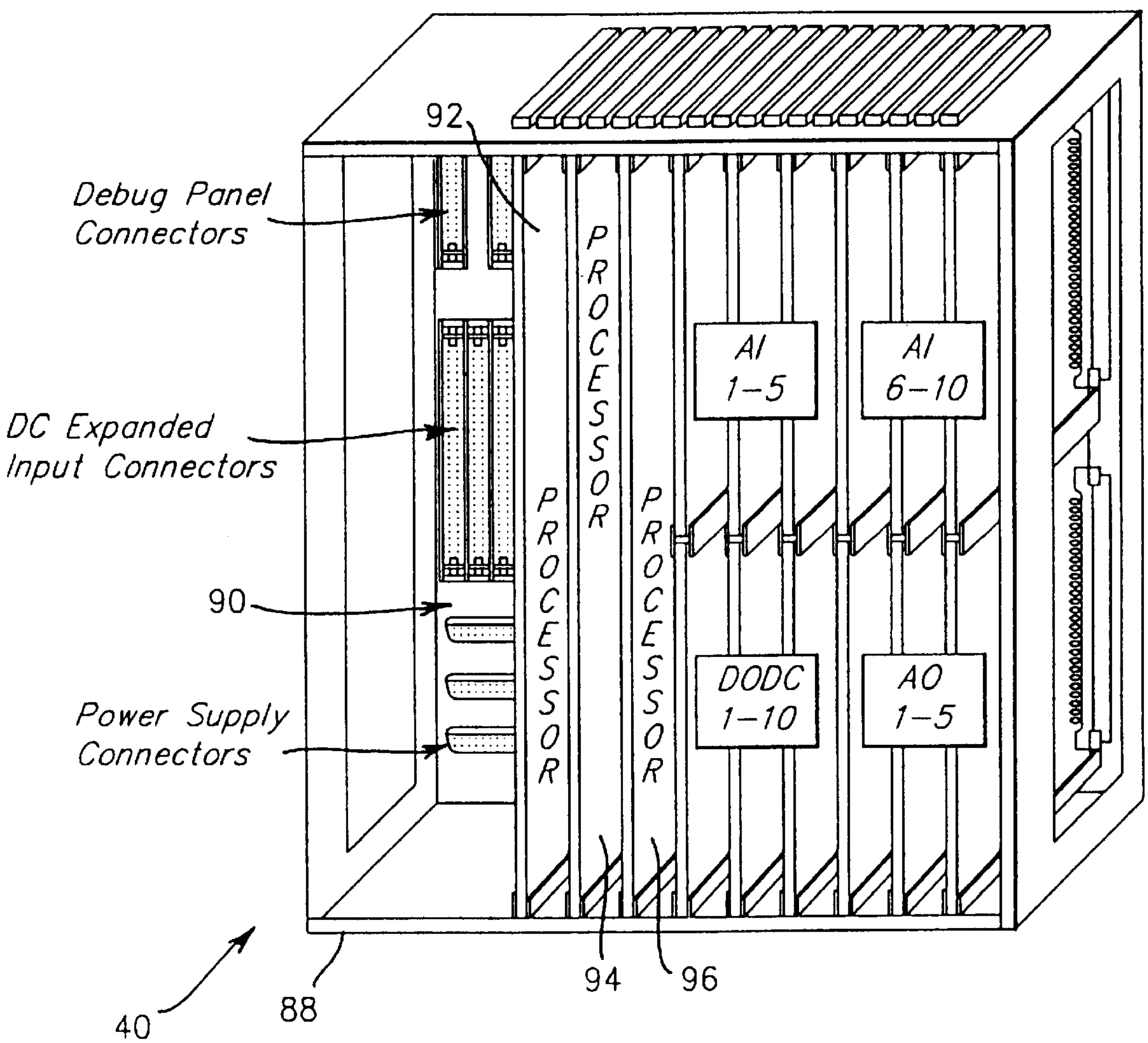
FIG. 5 is a perspective view of the processor chassis for the triply redundant field computer unit shown in FIG. 1.

Referring to FIG. 5, a perspective view of the processor chassis 40 is shown. The processor chassis 40 generally includes a metal housing 88 and a mother board 90. The mother board 90 may be referred to as a backplane board, as it is vertically supported against the back wall of the housing 88. The backplane board 90 includes the necessary connectors and conductors for interconnecting the various circuit boards which are mounted to the backplane board. In this regard, FIG. 5 shows that an individual circuit board is provided for each of the three redundant computer circuits 92–96 contained in the field computer unit 12. In this way, it should be appreciated that any of these individual computer circuit boards 92–96 may be quickly removed and replaced without affecting the operation of the remaining computer circuit boards. Indeed, one of these computer circuit boards 92–96 may simply be pulled from the processor chassis 40 for repair or replacement. However, it is preferred that electrical power for this computer circuit board be temporarily shut down while it is being removed or re-installed into the processor chassis 40. Nevertheless, no other command or software changes need to be made during replacement, even though the physical process is continuing to be controlled by the output signals from the field computer unit being serviced.

FIG. 5 also illustrates that individual AI, DO and AO circuit boards are also mounted to the backplane board 90. Each of these input and output circuit boards is capable of handling a plurality of different signal inputs or outputs as the case may be. It should also be noted that a high speed analog input circuit board could also be contained in one of chassis locations within the field computer unit 12 for measuring electrical parameters in an alternating waveform power system. A description of this high speed power analyzer may be found in the commonly assigned Glazer et. al. patent application Ser. No. 502,050, entitled "High Speed Power Analyzer", filed on Mar. 30, 1990. This U.S. patent application is hereby incorporated by reference.

Figure 6A:
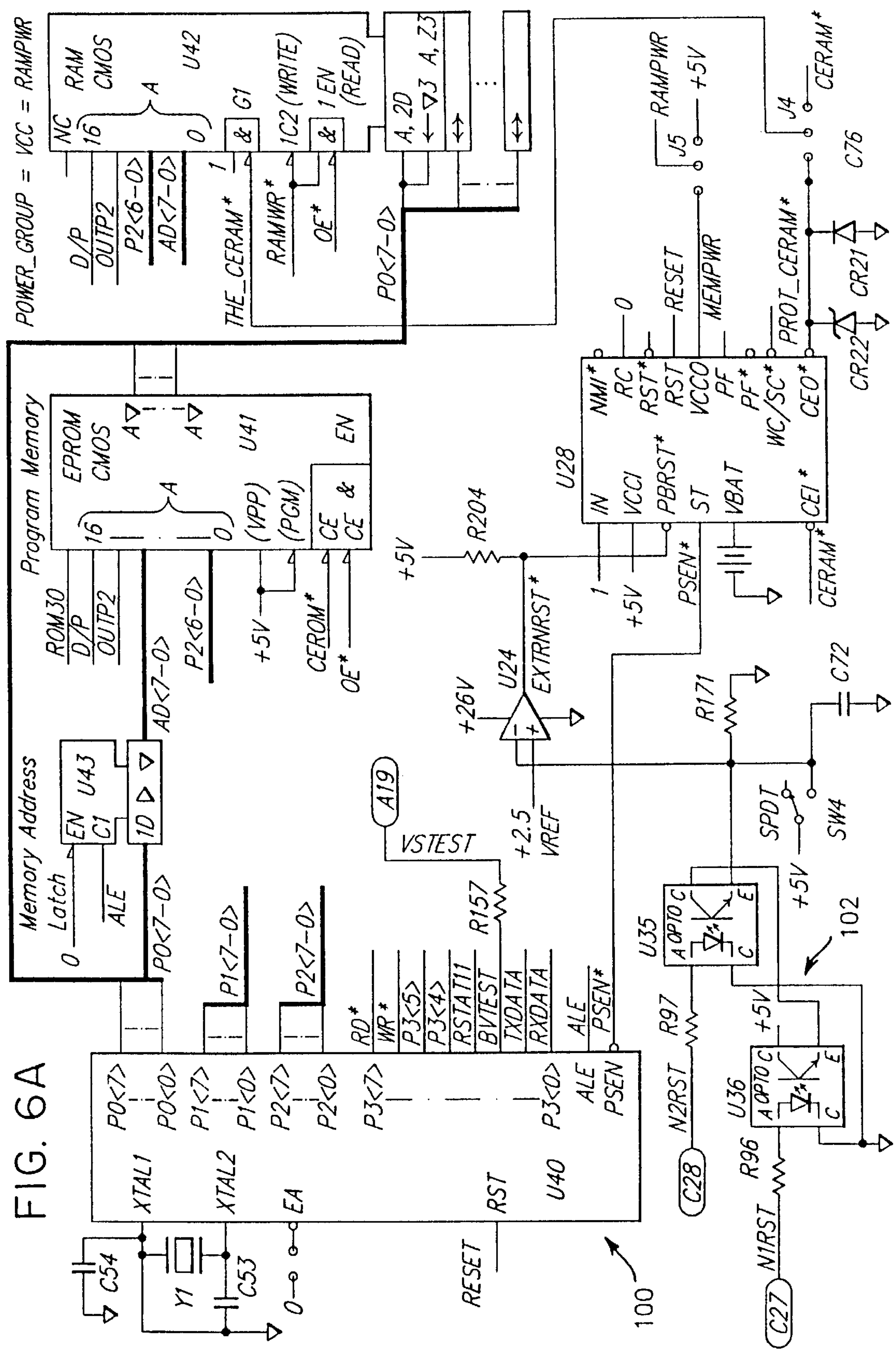
FIGS. 6A–6U comprise a schematic diagram for one of the triply redundant field computers shown in FIG. 5.
Figure 6B:
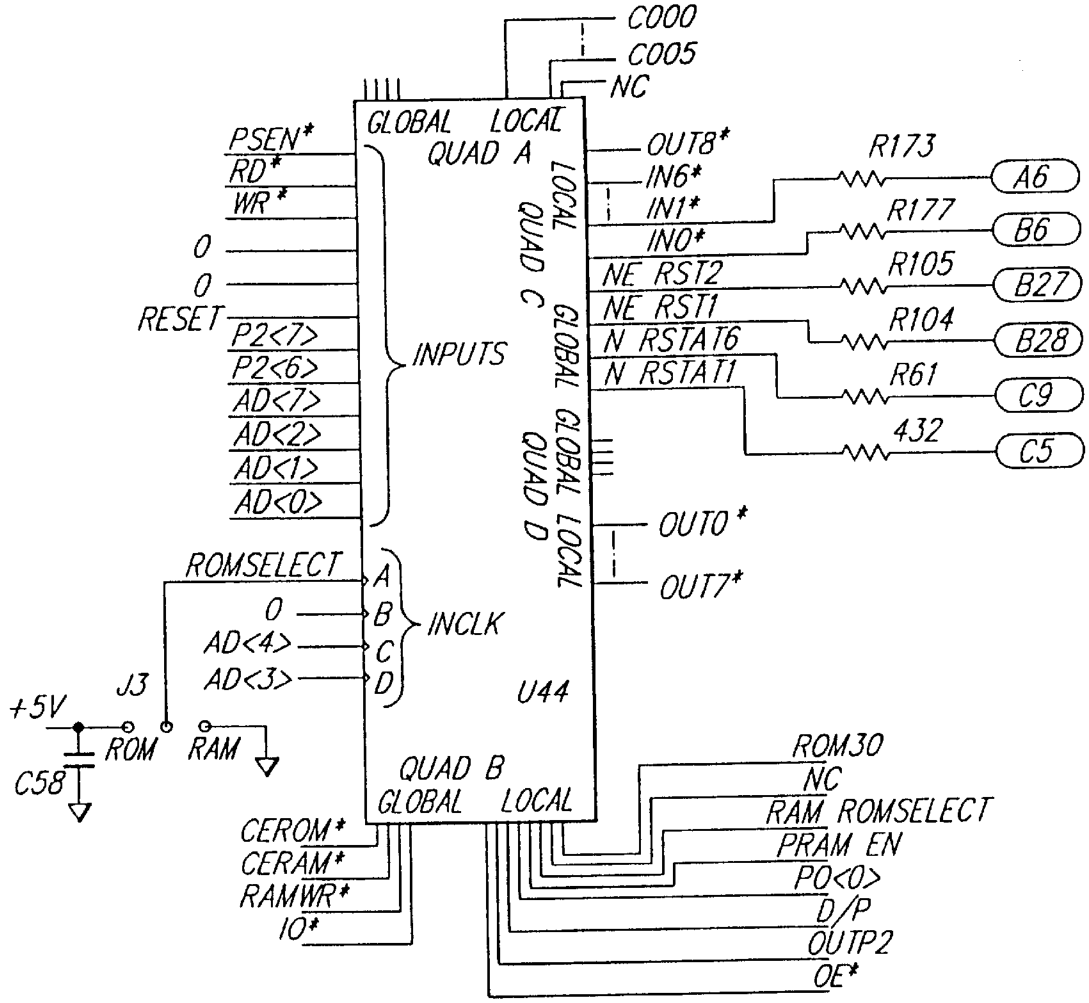
Figure 6D:
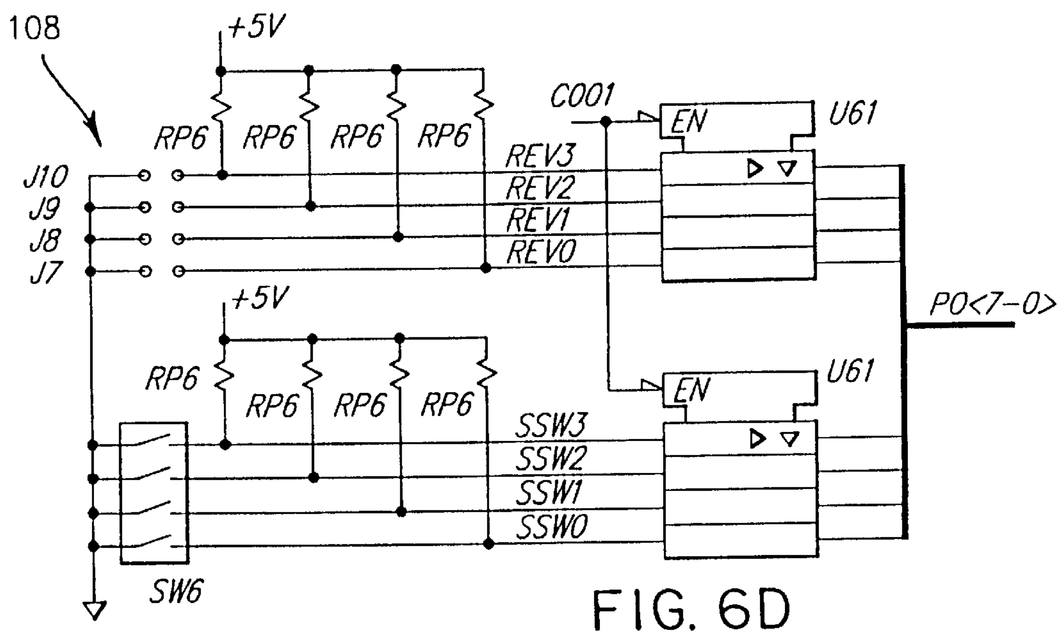
Figure 6C:
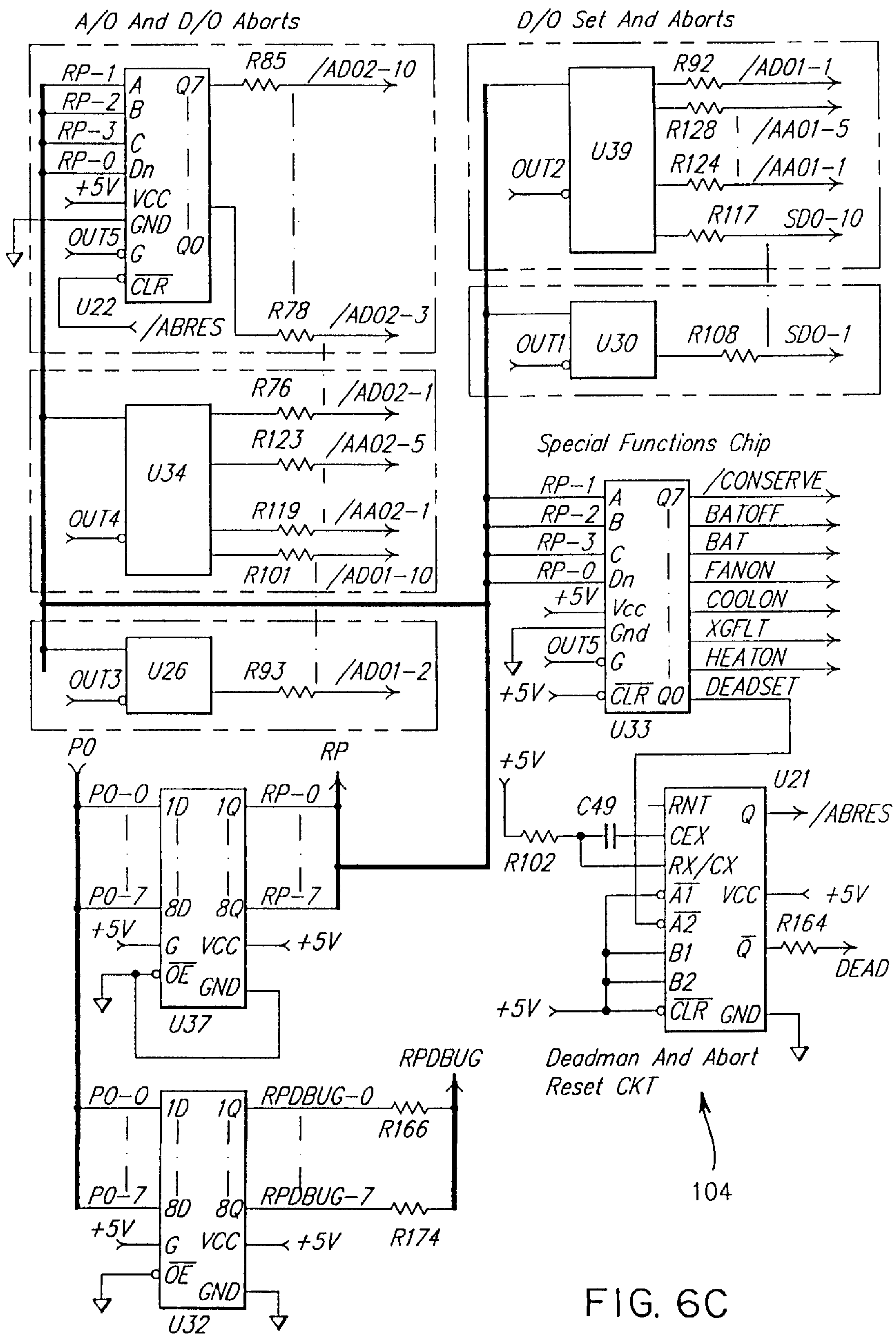
Figure 6E:
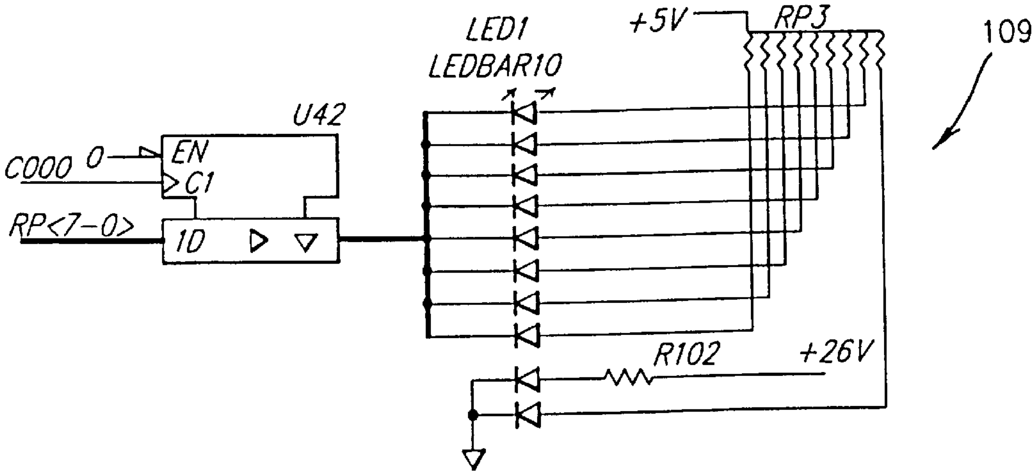
Figure 6F:
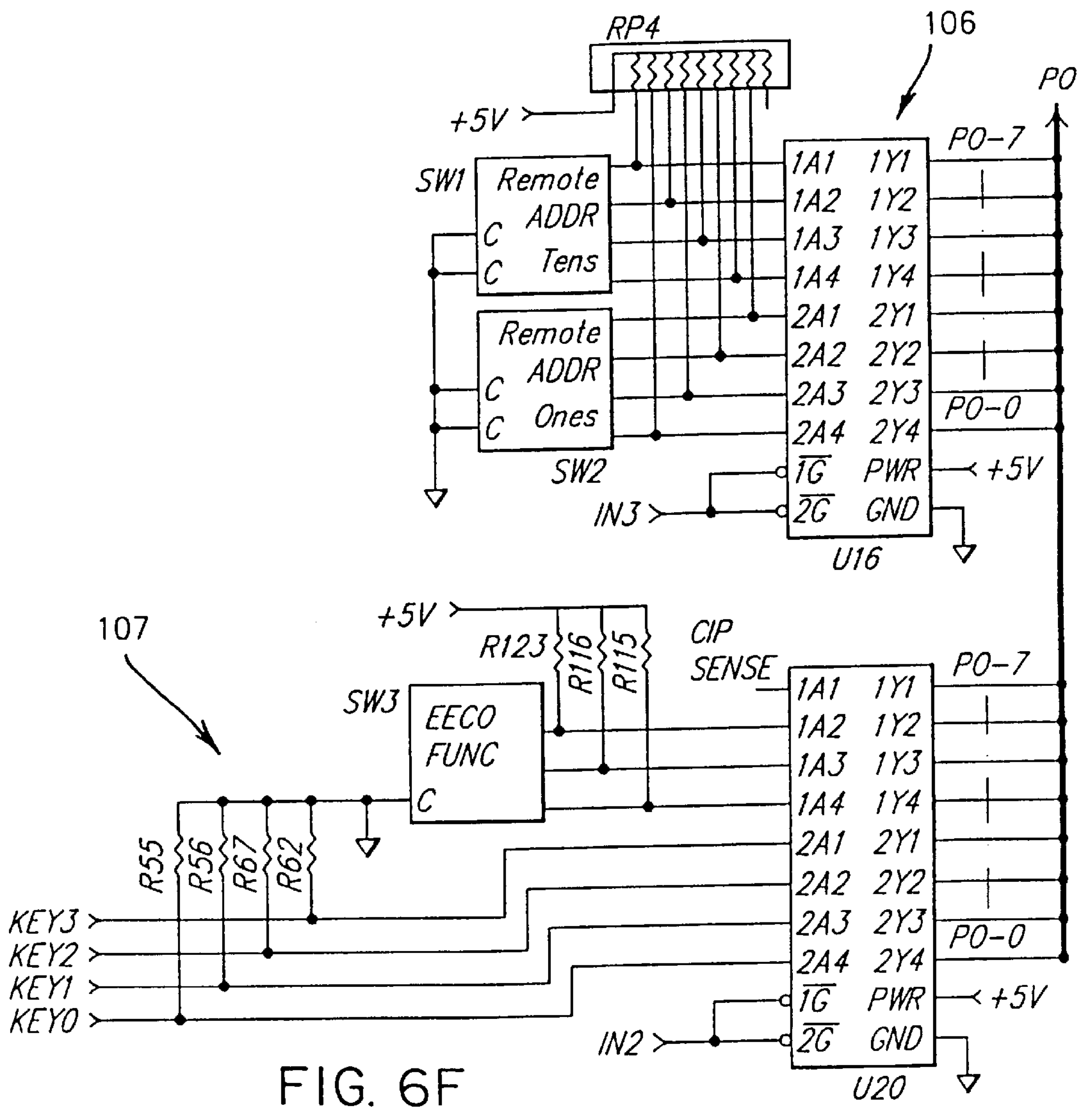
Figure 6G:
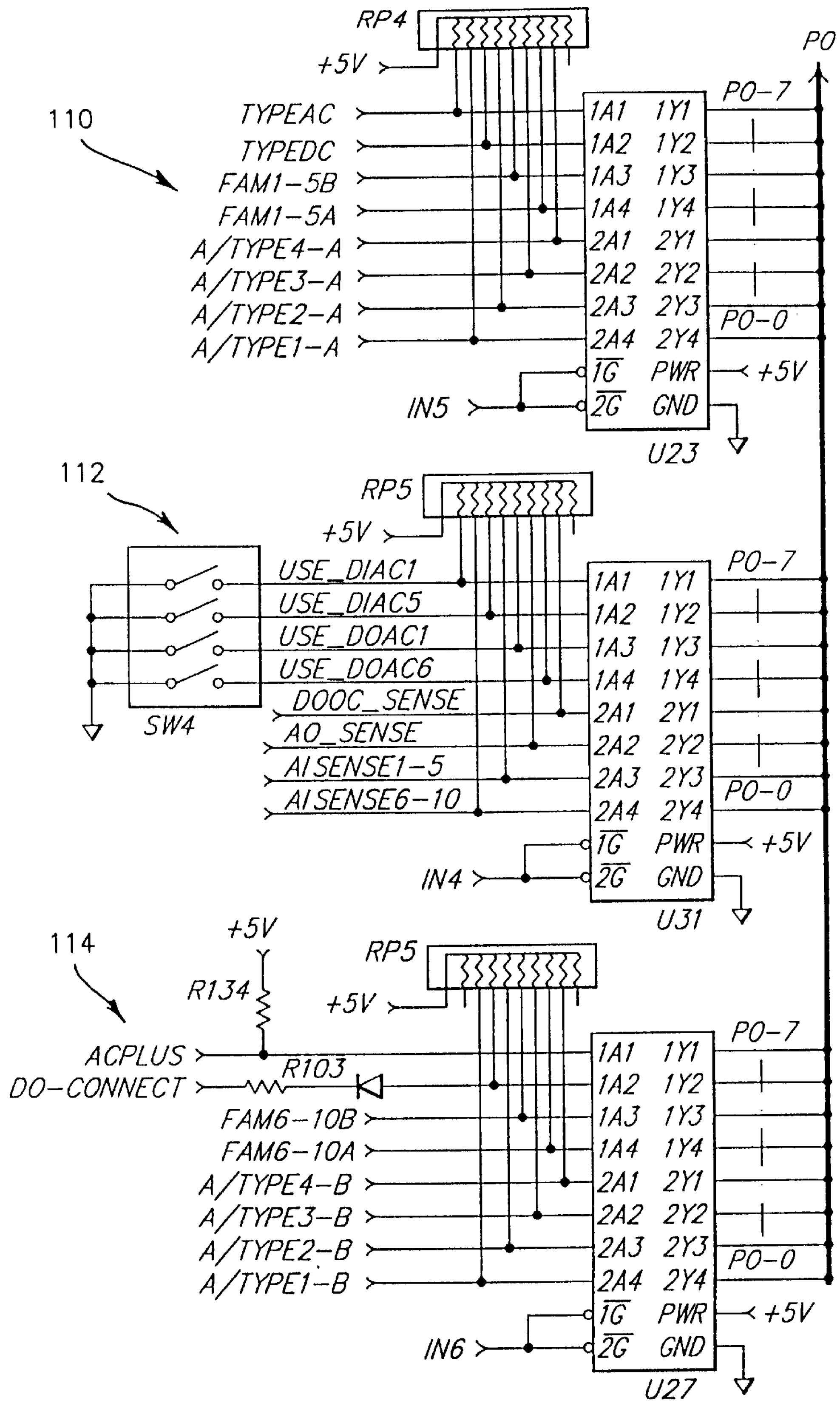
Figure 6I:
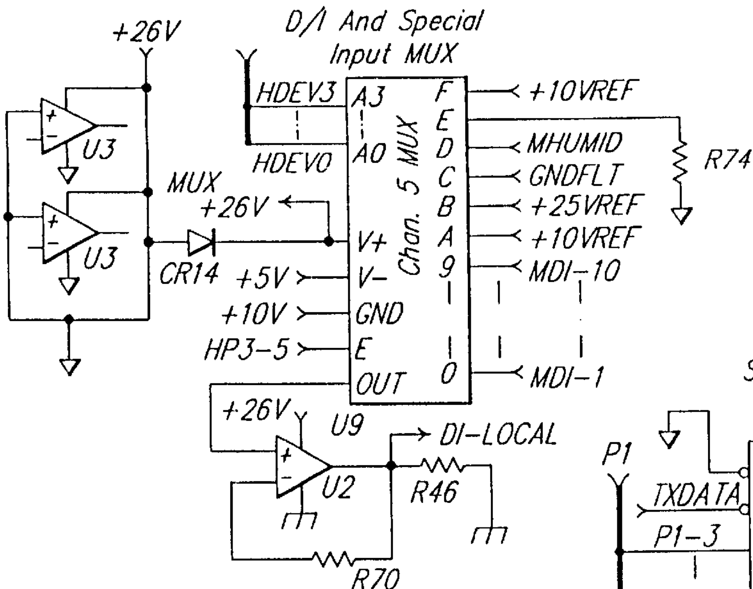
Figure 6H:
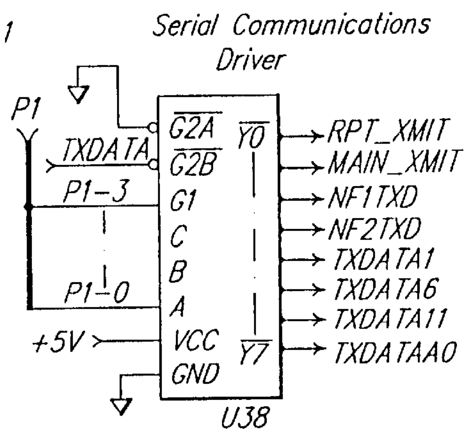
Figure 6J:
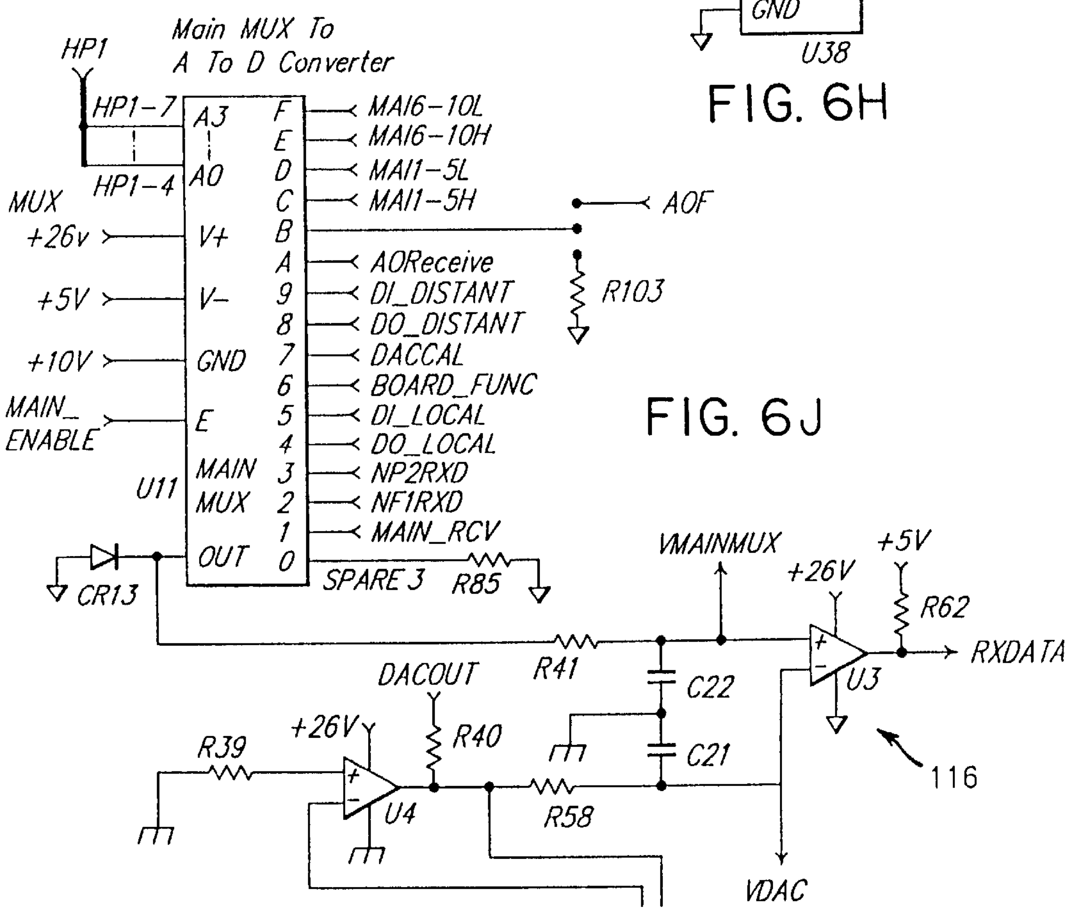
Figure 6K:
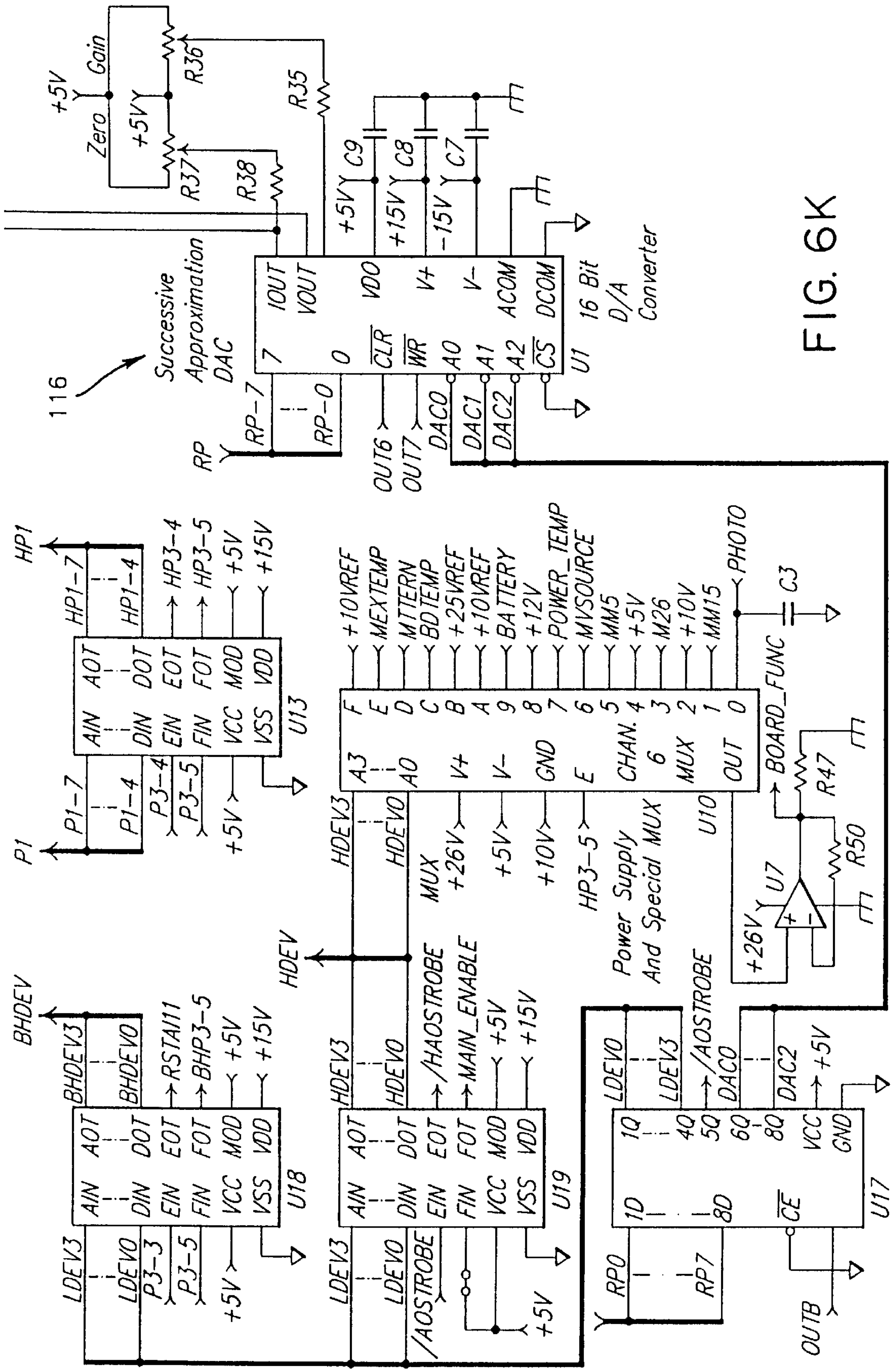
Figure 6L:
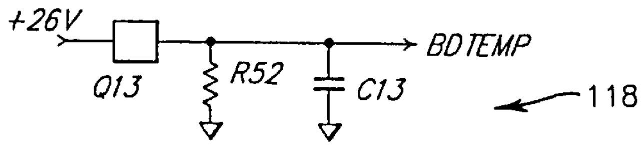
Figure 6M:
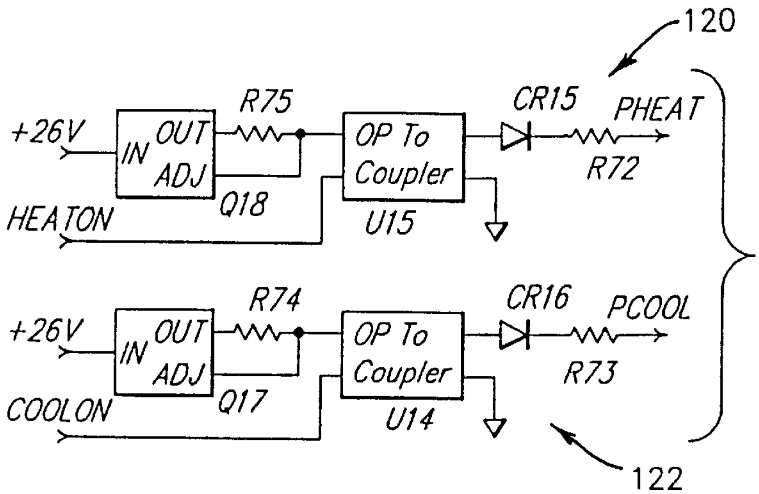
Figure 6N:
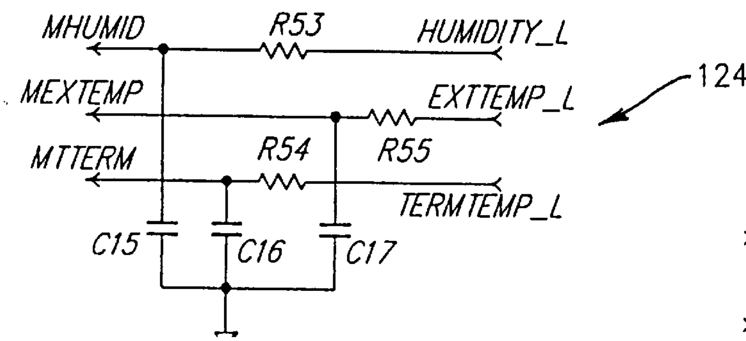
Figure 6O:
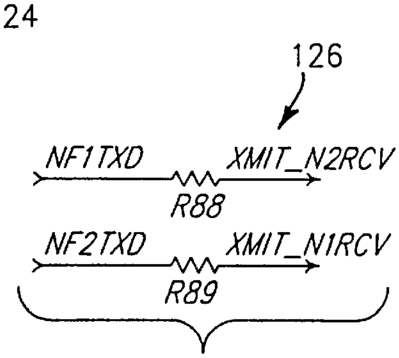
Figure 6P:
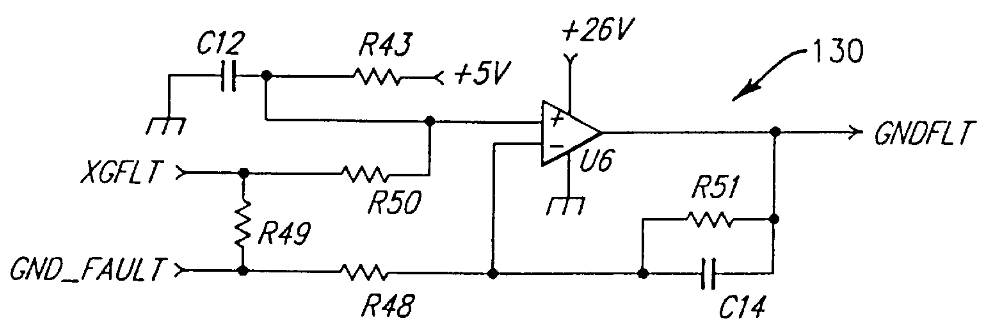
Figure 6Q:
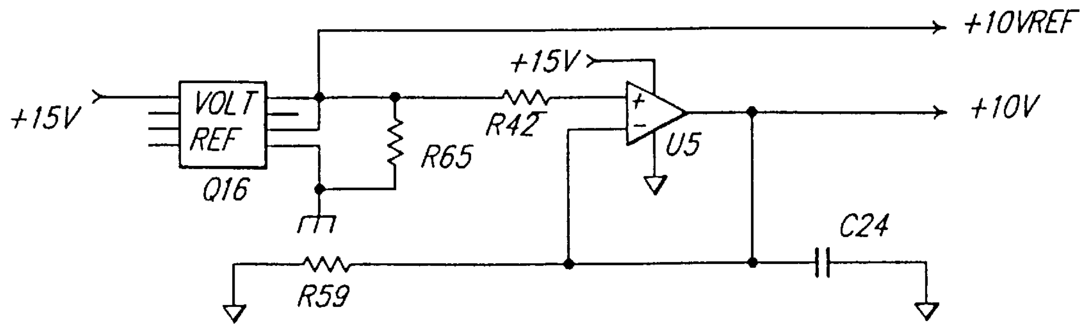
Figure 6R:
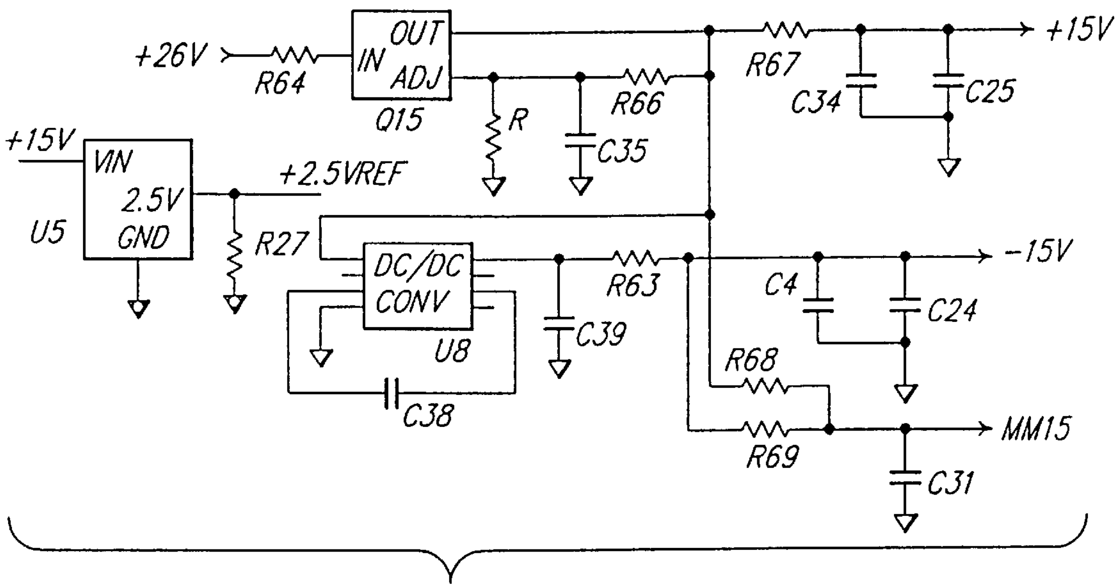
Figure 6S:
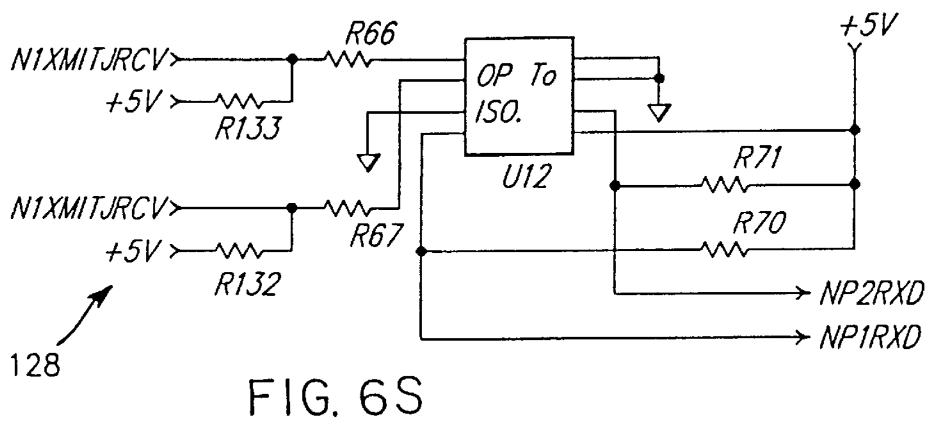
Figure 6T:
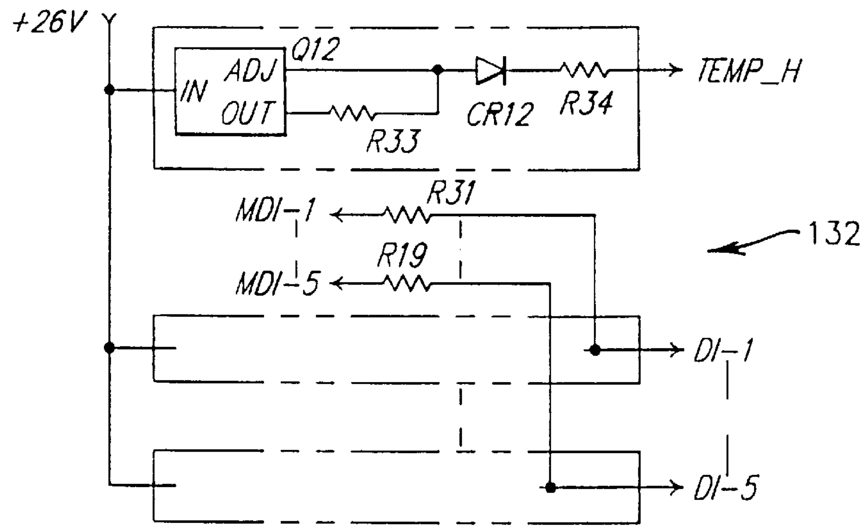
Figure 6U:
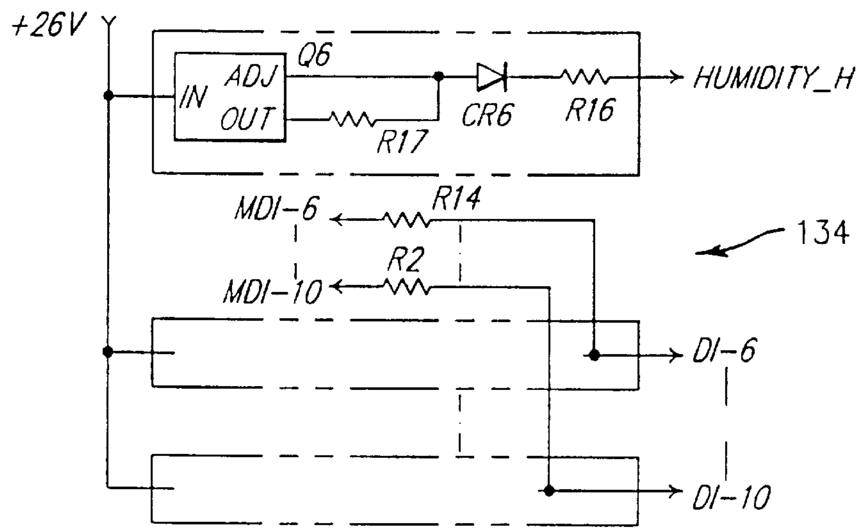

Referring to FIGS. 6A–6U, a schematic diagram for one of the redundant computer circuits will now be discussed. For sake of simplicity, this redundant computer circuit or field I/O controller will be generically referred to herein as controller 100. It should also be understood that in this embodiment, the controller 100 will be replicated for each of the redundant computer circuits 92–96. However, it should be appreciated that other suitable redundant computer circuits may be employed in the appropriate application, and that one or more of these circuits could be replaced with an updated circuit without necessarily requiring the replacement of all of the redundant computer circuits.

FIG. 6A shows that the controller 100 includes a microprocessor circuit chip U40. While in one form of the present invention, the microprocessor U40 is comprised of a 80C31BH-1 microprocessor chip manufactured by Intel, it should be understood that other suitable chips may be used for this or any of the other circuit chips identified herein as the application or technological advance may warrant. The microcomputer kernel for the controller 100 also includes a 128K×8 EPROM memory (58255P-551) U41, a 128K×8 battery-backed RAM memory (58255P-551) U42, and a memory address latch (74HC573). The microcomputer kernel for the controller 100 also includes a memory controller (EP1810) U44, which is shown if FIG. 6B. In this embodiment, the program for the controller could be stored in either the EPROM circuit or the battery-backed RAM circuit. The use of a battery-backed RAM is particularly advantageous in at least one respect. Namely, the battery-backed RAM U42 helps to permit an updated program to be downloaded to the controller 100 from the process control computers 14*a*–14*b* through the fiber optic network at any available communication time slot without having to electrically configure the memory device for a change in the information stored therein.

Importantly, it should be noted that the process of downloading an updated program to one or more of the field computer units 12 does not interfere with the ongoing operation of the physical process being controlled. More specifically, the program for only one controller 100 is updated at a time, so that the other two remaining controllers may continue under their existing programs to process field inputs and outputs. In one form of the present invention, the RAM U42 has a storage capacity of 128K bytes, even though the actual program storage requirement does not exceed 64K. This is to permit both data and program memory to be stored on the same chip. The doubling of memory capacity allows an updated program to be loaded and verified, while the controller is not doing process control, without disturbing the current contents of the program memory. After this validity check is completed, then the updated program is moved to the lower 64K memory locations of the RAM U42 for use on the next program cycle.

Once the updated program has been properly downloaded into the RAM U42 for one of the controllers 100 in a field computer unit 12, it is successively loaded into the RAM U42 for each of the other controllers 100 in turn. As will be discussed below, each of the controllers 100 include neighbor to neighbor serial communication links which will permit, among other things, an updated program sent to one of the controllers to be copied to the RAM memory U42 of another controller in the field computer unit 12. Such neighbor to neighbor links also enable one of the controllers to completely restore the program memory in another controller should such an action be required. Thus, each of the field computer units 12 in the distributed interface system 10 may be provided with updated application programs without any manual steps needed to be taken at the field computer units or any interruption required in the physical process itself. Indeed, it is also possible for a broadcast downloading operation to be employed with the fiber optic network in which some or all of the field computer units 12 concomitantly receive an updated program through a generally addressed network message. In other words, the process control computers 14*a*–14*b* could transmit an updated program to as many field computer units 12 as appropriate in the distributed interface system 10 by setting the addresses to each of the corresponding breakout circuits 26 in the broadcast message to direct the message to the selected field computer units.

The RAM memory U42 and the ROM (and bootstrap) memory U41 share a multiplexed address/data bus "P0" (pins P0-1 . . . P0-7), as well as a common address bus "P2" (pins P2-0 . . . P2-7). In this regard, it should be appreciated that the memory address latch U43 creates an address bus "AD" (pins AD-0 . . . AD-7) from the multiplexed address/data bus for use by various components in the controller 100. In other words, the memory address latch U43 will capture an address or partial address on pins P0-1 . . . P0-7 for subsequent use by components such as the EPROM memory U41. For example, pins AD-0 . . . AD-3 and AD-7 are directed to the memory controller U44, which is a programmable logic device. Depending upon the digital state of these address pins and other needed input pins (such as "/WR"), the memory controller will generate an output signal in accordance with the internal software configuration for the chip. As an example of one such output, the memory controller will generate a "/RAM" signal which is directed to the "/CE" port of the RAM memory U42. This particular signal from the memory controller U44 will enable the RAM memory chip U42 to read or write data in combination with other associated signals, such as the "/RAM-WR" signal generated by the memory controller.

FIG. 6A also shows a manually actuated reset switch "SW4", which may be conveniently located on the front panel of the field computer unit 12 in order to permit a technician to reset microprocessor U40 of the controller 100. However, in accordance with the present invention, a neighbor controlled reset circuit 102 is also provided which will enable any two controllers in the field computer unit 12 to reset the remaining controller without operator intervention. The reset circuit 102 has two input signals, namely "N1RST" and "N2RST". Each of these signals represents a reset request to the controller from one of the other neighbor controllers. The N1RST signal is directed to the opto-coupler (MOC8021) U36, while the N2RST signal is directed to the opto-coupler U35. The output of opto-coupler U36 is connected to the other input to opto-coupler U35, so that the reset circuit 102 requires the combination of both the N1RST and N2RST signals to produce a high output "RESET" signal for transmission to the RST port of the microcomputer U40 through comparator (LM339) U24 and micro manager (DS1236-5) U28. The comparator U24 is employed to produce a Low "EXTRNRST" signal when the microprocessor U40 is to be reset. The micro manager circuit U28 will respond to the Low EXTRNRST signal by producing the High RESET signal.

Thus, for example, where two of the controllers in the field computer unit do not receive communication from the remaining controller within a predetermined period of time, then each of the other controllers may independently arrive at a decision that the non-responsive or otherwise errant controller should be temporarily reset or permanently shut down. Nevertheless, the reset circuit 102 requires the concurrence of both of the other neighboring controllers to temporarily reset or shut down the remaining controller by causing a reset condition (and holding this controller in the reset condition when it is to be permanently shut down). A permanent reset condition at the microprocessor level will disable the operation of the controller until at least one of its neighboring controllers changes the digital state of its reset request signal. In accordance with the method of operation under the present invention, the non-responsive controller is temporarily reset before a decision is made to permanently reset the controller. The initial decision to temporarily reset the non-responsive controller is preferably made after valid input and output communication messages have not been received for two consecutive process control cycles (e.g., 2 seconds). Accordingly, it should be appreciated that this method allows for a fault tolerance for communications between neighboring controllers of at least one process control cycle. If the non-responsive controller does not begin communicating with its neighbors within a predetermined period of time after being temporarily reset (e.g., 20 seconds), then its neighboring controllers will independently request a permanent reset of the non-responsive controller. Once the non-responsive controller has been replaced or repaired, then the permanent reset condition may be terminated through a software value change in the appropriate data table location of a neighboring controller to re-activate the previously non-responsive controller. Additionally, each of the controllers 100 preferably maintains a count of the number of times that they have requested a reset condition of a neighboring controller, so that a record may be available for health and welfare analysis as needed.

It should be noted that each of the controllers preferably communicates three times it a process control cycle (e.g., one second) with its neighboring controllers. Specifically, each of the controllers will communicate the following signals to neighboring controllers: the input signals received from the field, the output signals received from one of the process controller computers, and various diagnostic signals to be discussed more fully below. In one form of the present invention, each of these communications may take place during predetermined time windows (e.g., 8 milliseconds each).

The micro manager circuit U28 also monitors the voltage level of the normally +5 volt VCC power line. This monitoring function enables a temporary reset condition to be applied in the event that the VCC power line drops momentarily below a predetermined level (e.g., +3 volts). Additionally, the micro manager circuit U28 is adapted to switch the supply of electrical power for the RAM memory U42 to the lithium backup battery B1 in the event that the VCC power line drops to zero. The micro manager circuit U28 controls the PROT-CERAM signal. This signal usually follows the CERAM signal, but is latched high during battery backed conditions. Importantly, this procedure will disable these memory circuits from writing any new data into their respective memory locations. This procedure is employed to prevent potential corruption of the data contained in RAM memory due to an interruption in electrical power.

It should also be pointed out that the opto-couplers U35–U36 electrically isolate the controller 100 from both of its neighbors. In this particular embodiment, opto-couplers are used on the reception end to isolate all of the communication paths between the redundant controllers 100, in order to prevent an electrical fault in one of the controllers from affecting the operation of its neighboring controllers.

Neighbor to neighbor signal transmissions from the microprocessor U40 of FIG. 6A are facilitated through the serial communications driver (74H138) U38 of FIG. 6H. As illustrated in FIG. 6H, the "TXDATA" signal from the serial output port of the microprocessor U40 is coupled to the "/G2B" input port of the serial communication driver U38. Accordingly, it should be appreciated that the serial communication driver U38 is used to direct the TXDATA signal from the microprocessor U40 to one or more of a plurality of different communication paths. These communication paths include the "NF1TXD" and "NF2TXD" signals, which each represent a serial communication signal to a different neighboring controller 100. Four additional serial communication output signal streams are also provided, namely "TXDATAAO", "TXDATA1", "TXDATA6" and "TXDATA11". The TXDATAAO signal is directed to the analog output circuits in the field computer unit 12 to convey analog output values and direct the non-intrusive testing to be described below. In this regard, it should be appreciated that the analog output value signals which are transmitted from the process control computers 14*a*–14*b* to the field computer unit 12 are subsequently processed (e.g., software arbitration) by the microprocessor U40 of the controller 100 and directed to the appropriate analog output circuit boards of the field computer unit through the serial communication driver U38. Additionally, it should be noted that the arbitrated analog output value signals are not transmitted to any neighboring controllers, as there is no need to do so in accordance with the present invention. Thus, it should be appreciated at this juncture that none of the other controllers are aware of specific analog output value signals transmitted to their respective analog output circuits. The other three serial communication signals (TXDATA1, TXDATA6 and TXDATA11) are directed to specific analog input circuits for requesting value and configuration data.

The last two remaining output signals of the serial communication driver U38 of FIG. 6H are the "MAIN_XMIT" and "RPT_XMIT" signals. The MAIN_XMIT signal is directed to a transmitter circuit, such as that shown in FIG. 15B, for communication with one of the process control computers 14*a*–14*b* through the fiber optic network. In this regard, the MAIN_XMIT signal is directed to the appropriate port of breakout circuit 26 connected to the field computer unit 12. The RPT_XMIT signal simply provides additional communication capacity if desired. With respect to the controller 100 which is mounted in the Middle slot of the field computer unit 12 between the Left and Right controllers, there is no connection provided for the MAIN_XMIT and RPT_XMIT signals in this particular embodiment. However, it should be appreciated that the fiber optic network could be modified to provide a set of fiber optic conduits for each of the controllers 100 contained in the field computer unit 12, particularly when three redundant process control computers 14 are provided.

FIG. 6C illustrates a signal distribution circuit 104 which is coupled to the multiplexed data/address bus P0 of the microprocessor U40. The signals directed to the distribution circuit 104 from the microprocessor U40 are buffered by a pair of octal D type latch circuits (74HC573) U37 and U32. Latch circuit U32 is used to transmit signals to the debug panel 44 for the controller 100, while latch circuit U37 creates a distribution bus "RP" (pins RP-0 . . . RP-7) for use by several other circuit chips. Each of the circuit chips connected to the RP bus in FIG. 6C are comprised of an 8-bit addressable latch circuit (75HC259).

The latch circuit U30 and a portion of the latch circuit U39 are used to transmit individual "set" digital output signals (pins SDO-1 . . . SDO-10) to specific digital output circuits which are connected to the controller 100 through the backplane board 90. Accordingly, it should be appreciated that the digital output value signals which are transmitted from the process control computers 14*a*–14*b* to the field computer unit 12 are subsequently processed (e.g., software arbitration) by the microprocessor U40 of the controller 100 and directed to the appropriate digital output circuit boards of the field computer unit through the latch circuits U30 and U39.

The latch circuits U22, U26, U34 and U39 are used to transmit abort analog output signals "AAO" and abort digital output signals "ADO" to the analog output circuits and digital output circuits, respectively, of neighboring controllers. For example, latch circuit U22 generates abort digital output signals ADO2-3 . . . ADO2-10, while latch circuit U26 generates abort digital output signals ADO1-2 . . . ADO1-9. This notation means that all of the abort digital output signals from latch circuit U22 are directed to the digital output circuits for the controller 100 designated as "neighbor 2" relative to this particular controller circuit. Similarly, all of the abort digital output signals from latch circuit U26 are directed to digital output circuits for the controller designated as "neighbor 1". Additionally, the specific signals with corresponding final digits, such as ADO1-9 and ADO2-9, refer to the same digital output channel. Thus, it should be appreciated that a series of corresponding abort digital output signals are sent to the digital output circuits for the neighboring controllers within the field computer unit 12.

With respect to the abort analog output signals, it should be understood that these signals are not analog in nature. Rather, as in the case of the abort digital output signals, the abort analog output signals are either in a High digital state (logical "1") or a Low digital state (logical "0"). Additionally, a corresponding notation is employed for both the abort digital and abort analog output signals. Accordingly, it should be appreciated that a series of individual abort analog output signals are sent to the analog output circuits for each of the neighboring controllers within the field computer unit 12. As will become more clear from the discussion of the analog and digital output circuits below (e.g., FIGS. 10A–10B), these "abort" output signals are used to enforce the software arbitration decisions made by each of the controllers 100. These arbitration decisions are represented by the "set" digital output signals and the analog output signals already discussed above.

The signal distribution circuit 104 of FIG. 6C also includes a latch circuit U33 which is used for various functions of the controller 100. For example, several temperature control signals are shown, such as "FANON", "COOLON" and "HEATON", for maintaining the field computer unit interior within an acceptable temperature range. As the signal names imply, the field computer unit 12 may be provided with one or more fans, a heater and/or an air cooling device in the event that the field computer unit is located in an environment where such measures would be desirable. The "BAT" signal is used to turn off a charger for the batteries 52 in order to begin a load test to be described in connection with the power supply circuit 50. The "BATTOFF" signal is used to shut down a +5 volt power supply line to the field computer unit when the batteries 52 are drained of power. Similarly, the "/CONSERVE" signal is used to turn off a +26 volt power line to the field computer unit in order to conserve battery power. The "XGFLT" signal is used to control the circuitry that tests for a difference between the ground potential of the field computer unit and the true ground.

The "DEADSET" signal is directed to a retriggerable monostable multivibrator circuit (74LS122) U21 which is used as deadman timer and abort opening circuit. In this regard, the capacitor C49 and the resistor R102 determine a basic pulse time, and the DEADSET signal is used to prevent the "/ABRES" and "DEAD" output signals from switching to their shutdown states. As illustrated in FIG. 6C, the /ABRES signal is directed to the /CLR port of the latch circuits U22, U26, U30, U34 and U39. Accordingly, the /ABRES signal serves to simultaneously reset all of these identified latch circuits when the DEADSET strobe is not received from the microprocessor U40 to a retrigger a timer in multivibrator circuit U21. The DEADSET signal is transmitted once each process control cycle when the microprocessor U40 is functioning properly. The DEAD signal is directed to the analog output circuits in order to prevent them from sending power to the field.

FIG. 6B also illustrates that the PLD circuit U44 generates demultiplexed output signals (OUT0 . . . OUT7) which are directed to the enable port for several of the circuit chips that have been discussed above. For example, the OUT5 signal is transmitted to latch circuit U22 to enable this latch circuit to capture the HIGH/LOW data signal on line RP-0 and direct it to the output port addressed by lines RP-1 . . . RP-3. Additionally, the OUT6 and OUT7 signals are directed to a digital to analog converter circuit U1 which will discussed in connection with FIG. 6K.

The PLD circuit U44 also generates demultiplexed output signals (IN0–IN6), which are directed to the various "read" circuits shown in FIGS. 6F and 6G. Thus, for example, the IN3 signal from PLD circuit U44 is directed to the enable ports (/1G and /2G) of the tri-state buffer circuit (74HC244) U16 of the "read" remote address circuit 106 shown in FIG. 6F. In this regard, switches SW1 and SW2 (230034G) determine the field address of the controller 100, which may be read by the microprocessor U40 from bus P0 when it is desired to receive a message from or form a message to one of the process control computers 14*a*–14B. FIG. 6F also includes a read function circuit 107 similar to the read remote address circuit 106. The read function circuits 107 includes a switch SW3 which is set to inform the microprocessor U40 of the power supply configuration for the controller and/or other hardware specific settings. Additionally, the read function circuit 107 includes a set of KEY0 . . . KEY3 signals which respond to the keys depressed on the debug panel 44. These keys include a function key, a key to read an element of memory and a key to put a value into a memory location.

FIG. 6D shows another read circuit 108. This read circuit includes a set of jumpers "J7–J10", which may be used to permit the microprocessor U40 to know which hardware version or revision is being utilized for the controller 100. Additionally, a switch "SW6" is employed in order to provide space for future enhancements. The signals provided by the jumpers J7–J10 and the switch SW6 are captured by the tri-state buffer circuit (74HC244) U61 and transmitted to the P0 bus of the microprocessor U40.

FIG. 6E shows a display circuit 109, which is comprised of an octal flip-flop circuit U62 and an LED bank (LEDBAR10) "LED1". This display circuit is employed on the controller circuit board to permit a technician to readily see various health and welfare indicia for the controller during maintenance.

Turning to FIG. 6G, a set of three read circuits 110–114 are shown. These read circuits are used to inform the microprocessor U40 as to how to interpret the data being read from a plurality of analog signal input circuits, such as those shown in FIGS. 7A–7C and 8A–8F. For example, the "TYPEAC" and "TYPEDC" signals inform the microprocessor U40 whether the input signals from the left expansion chassis 42 represent alternating current "A.C." or direct current "D.C." signals. Additionally, signals such as "FAM1-5A" and "FAM1-5B" transmitted to buffer circuits U23–U27, respectively, provide digital indications of broad linearization routines that should be employed by the microprocessor U40. For example, these signals indicate whether a particular signal received by the microprocessor U40 has been transmitted from a smart input circuit board or a standard input circuit board. The "AITYPE1-A" and "AITYPE3-B" signals indicate specific linearization routines that should be employed by the microprocessor U40 (e.g., type-J v. type-S thermocouples).

The buffer circuit U31 receives signals, such as "AISENSE1-5", which inform the microprocessor U40 as to which input and output circuit boards are installed in the field computer unit 12. The switch SW4 is used to configure signals, such as "USE-DOAC1", which inform the microprocessor U40 whether the controller 100 is being used as a Left, Middle or Right controller.

FIG. 6I illustrates a sixteen channel multiplexor circuit (506A) U9 which is configured to direct a plurality of digital input signals to the main multiplexor circuit (506) U11 shown in FIG. 6J. Specifically, the digital input signals are labeled "MDI-1 . . . MDI-10". These signals are derived from the pull down circuits shown in FIGS. 6T and 6U. Address lines "HDEV0 . . . HDEV3" are used to select one of these digital input signals for output to the main multiplexor circuit U11. The output port of the multiplexor U9 is connected to an operational amplifier (3140A), which is configured as a voltage follower, in order to generate the "DI-LOCAL" signal for transmission to the main multiplexor U11.

The main multiplexor U11 of FIG. 6J is used to individually select one of a plurality of different input signals for transmission in a successive pattern to the microprocessor U40 through a successive approximation circuit 116. These input signals include the analog level or analog serial input signals (e.g., "MAI6-10L"), analog output status and track signals (e.g., "AOT"), serial communication signals from neighboring controllers (e.g., "NP2RXD"), and serial communication signals from the fiber optic network (e.g., "MAIN_RCV"). Additionally, the main multiplexor circuit U11 receives a "DI_DISTANT" signal which represents a plurality of multiplexed analog voltage level signals from digital inputs circuits in the left expansion chassis 42, and a "DO_DISTANT" signal which represents a plurality of multiplexed analog voltage level signals from analog input circuits in the left chassis. The "DACCAL" signal is a signal which could be used to provide external calibration of the DAC circuit Ul. The "BOARD_FUNC" signal represents a plurality of multiplexed signals from the multiplexor circuit U10 of FIG. 6K. The "DO_LOCAL" signal represents a plurality of multiplexed informational signals from one or more digital output circuit boards, such as track values and return values from non-intrusive testing.

The successive approximation circuit 116 receives the multiplexed output from the main multiplexor U11 through the resistor R41. The successive approximation circuit 116 enables the microprocessor U40 to determine the voltage level of a signal output from the multiplexor U11. In this regard, the output from the main multiplexor U11 provides one input to a comparator (LM339) U3. The other input to the comparator U3 is provided by a digital to analog converter "DAC" circuit (DAC708KH) U1, shown in FIG. 6K as a continuation of the successive approximation circuit 116. Specifically, the successive approximation circuit permits the microprocessor U40 to receive a plurality of both digital and analog input signals through a single input line "RXDATA". This is achieved through the toggling of the comparator U3 output in response to a changing "VOUT" signal level from the DAC circuit U1. The microprocessor U40 transmits a series of different digital voltage levels to the DAC circuit U1 via the RP bus until such time as the comparator U3 changes output states. In this regard, the microprocessor U40 preferably performs a binary search by starting with a digital voltage level in the middle of the acceptable range, determining if this value is high or low, and then stepping up or down from that point. The microprocessor U40 then determines the voltage level output from the main multiplexor U11 through its knowledge of the last digital voltage level transmitted to the DAC circuit U1. Accordingly, it should be appreciated that the combination of this successive approximation procedure and the use of multiplexors substantially reduces the number of input pins that would otherwise be required to read all of the digital and analog inputs signals being gathered by the field computer unit 12.

FIG. 6K also shows that the DAC circuit U1 is addressed through an octal D flip-flop circuit (74HC374) U17, which creates the address lines "DAC0 . . . DAC2" from the RP bus. Additionally, this flip-flop circuit also creates address lines "LDEV0 . . . LDEV3", which are directed to level shifting buffer circuits (NC14504B) U18 and U19. The LDEV address lines are shifted from a 0/5 volt signal to a 0/15 volt signal, as required by the configuration desired for the multiplexor circuits U9, U10 and U11. Similarly, the address lines P1-4 . . . P1-7 are shifted by the buffer circuit (MC14504B) U13 to generate address lines HP1-4 . . . HP1-7 for the multiplexor U11. In this regard, it should be noted that the ground "GND" potential of these multiplexor circuits is set to 10 volts rather than 0 volts. This is because the particular multiplexor chip chosen (506) limits the potential difference between V+ and GND to 22 volts. However, with the GND potential set to 10 volts, the V+ potential may be set to 25.2 volts and the V− potential set to −5 volts, thereby allowing the multiplexor circuits to operate from a ±15 volt supply. In such a configuration, it is necessary to shift the level of the LDEV address signals in order to permit the multiplexor chip to operate properly.

As indicated in FIG. 6K, the multiplexor circuit U10 receives several diverse input signals for selection and transmission to the main multiplexor U11 via the "BOARD_FUNC" signal. These input signals include the present status of reference voltage levels (e.g., "+10VREF"), and various temperature levels (e.g., "BDTEMP").

FIG. 6L illustrates a simple temperature sensor circuit 118 which is used to provide an indication of the temperature at or near the controller circuit board. This temperature is sensed by the transducer circuit formed by (AD502) Q13 and resistor R52, and filtered by capacitor C13.

FIG. 6M illustrates two temperature control output circuits 120–122. The output circuit 120 is responsive to a "HEATON" signal from the latch circuit U33 of FIG. 6C, while the output circuit 122 is responsive to a "COOLON" signal from this latch circuit. Opto-couplers U14–U15 are used to galvanically isolate the controller 100 from the external heating and cooling devices through the transmission of optical signals "PHEAT" and "PCOOL" respectively. These opto-couplers are driven by current sources (TI317C) Q17–Q18 and the concurrence of either of the HEATON or COOLON signals.

FIG. 6N illustrates a filter circuit 124 for the identified humidity and temperature signals. For example, the "EXTEMP_1" external temperature signal input is labeled "MEXTEMP" at the output, which is then transmitted to the multiplexor circuit U10 of FIG. 6K. This external temperature signal may be used as a redundant cold reference junction temperature signal. The humidity signal "HUMITY_1" may be derived from a sensor within the field computer unit housing 88. One or more of these temperature signals may be used by the microprocessor U40 to determine whether the PHEAT or PCOOL signals should be generated. In one form of the present invention, it is preferred that the interior environment of the field computer unit 12 be maintained within a temperature range between 10 and 50 degrees Celsius.

FIG. 60 is a very simple impedance circuit 126 which operates in conjunction with the serial communication driver circuit U38 of FIG. 6H for communicating with neighboring controllers. Specifically, the circuit 126 receives the "NF1TXD" and "NF2TXD" signals, which each represent a serial communication signal to one of the neighboring controllers. This impedance protects driver circuit U38 from damage in the event that a short occurs on a signal line outside of the controller 100. It should also be noted that FIG. 6S provides a serial communication receiver circuit 128 for accepting communication from neighboring controllers. These neighbor signals are passed through to the opto-coupler circuit U12 for optical isolation. These signals are then transmitted to the main multiplexor circuit U11 as the signals "NP2RXD" and "NP1RXD".

As mentioned earlier, the neighboring communication paths may be used to convey input and output value signals, as well as updated or revised program data. Accordingly, it should be appreciated that the combination of serial communication transmitter and receiver circuits between the three controllers 100 in the field computer unit 12 provide the field computer unit with the ability to arbitrate both incoming and outgoing data through the mutual exchange of such data by the controllers. Thus, when the Left controller board 92 receives output value signals for the field instrumentation via fiber optic conduits 48, these signals are also transmitted by the Left controller board to the Middle controller board 94 and the Right controller board 96. Similarly, when the Right controller board 96 receives output value signals for the field instrumentation via fiber optic conduits 46, these signals are also transmitted by the Right controller board to the Middle controller board 94 and the Left controller board 92. In this way, each of the three controller boards 92–96 are provided with three sets of output value signals which may be used for independent arbitration in software. In one form of the present invention, the Middle controller 94 receives output value signals from both the Left controller board 92 or the Right controller board 96. A further discussion of the arbitration procedure for output values will be provided in connection with FIGS. 17F–17I and 18O–18T.

FIG. 6P illustrates a ground fault circuit 130, which is used to inform the microprocessor U40 that a ground fault condition has occurred through the signal "GNDFLT" and multiplexor U9. In this regard, the "XGFLT" signal is derived from the latch circuit U33 of FIG. 6C, while the "GND_FAULT" signal is derived from the field through the backplane board 90. A ground fault condition occurs when there is a very low potential difference between the chassis ground and the FLTGND terminal. The microprocessor U40 may respond to this condition by setting an error bit that is available to the process control computer 14.

FIGS. 6Q and 6R are shown simply to illustrate two representative power conditioning circuits which are contained on the controller 100. The "MM15" output signal shown in FIG. 6R is used to permit monitoring of the −15 volt power line. Similar power conditioning circuits are also contained on other circuit boards in the field computer unit 12. As should be appreciated from the above discussions, the controller 100 requires several different voltage levels to drive the circuit chips forming part of the controller, and these power conditioning circuits are adapted to produce the desired voltage levels.

FIGS. 6T and 6U illustrate digital input pull down circuits 132 and 134 respectively. In this regard, each of these circuits include a current source circuit (TL317), such as Q12, which is set to drive 2.5 milliamps through a current loop associated with each of the indicated digital input signal lines (e.g, DI-1 . . . DI-5). These digital input lines may be used, for example, to sense the opening or closing of a set of switch contacts. When one of these switches is open, the current source will unsuccessfully attempt to push 2.5 milliamps into an essentially infinite load, so the voltage level measured from the sensing line (e.g., MDI-1) will be in excess of 20 volts. When one these switches closes, the associated digital input line will be pulled to ground through a low impedance path, and its connected sensing line (e.g., MDI-1) will transmit a signal level to the multiplexor U9 on the order between 2.5–7.5 volts. This voltage level will depend upon how many controller boards are connected to the particular signal input to the field computer unit 12. In this regard, it should be noted that if the voltage level sensed is below 1.5 volts, then the microprocessor U40 will assume that a field short condition has occurred, as the resistance in the sensing circuit is below that which would otherwise be available if the digital input circuit was operating properly.

Figure 7C:
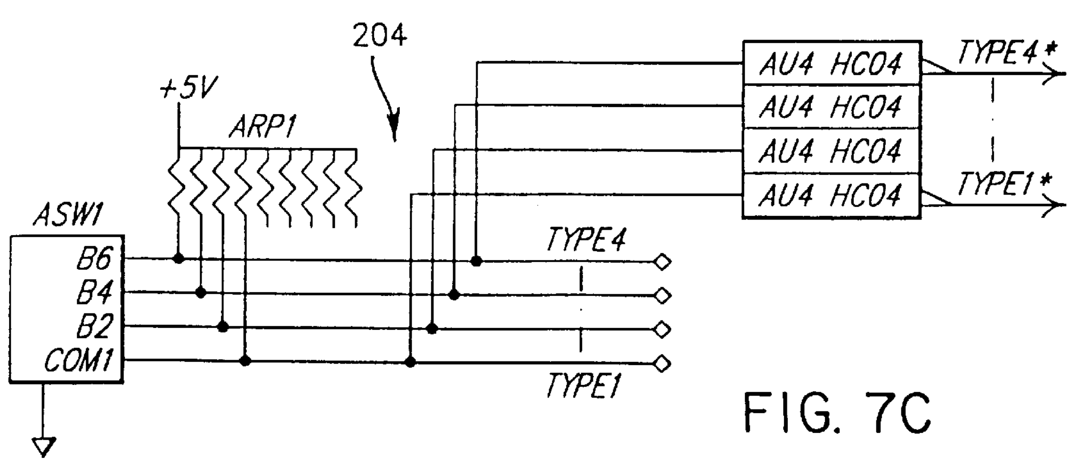
FIGS. 7A–7C comprise a schematic diagram for a smart serial input circuit according to the present invention.
Figures 7A, 7B:
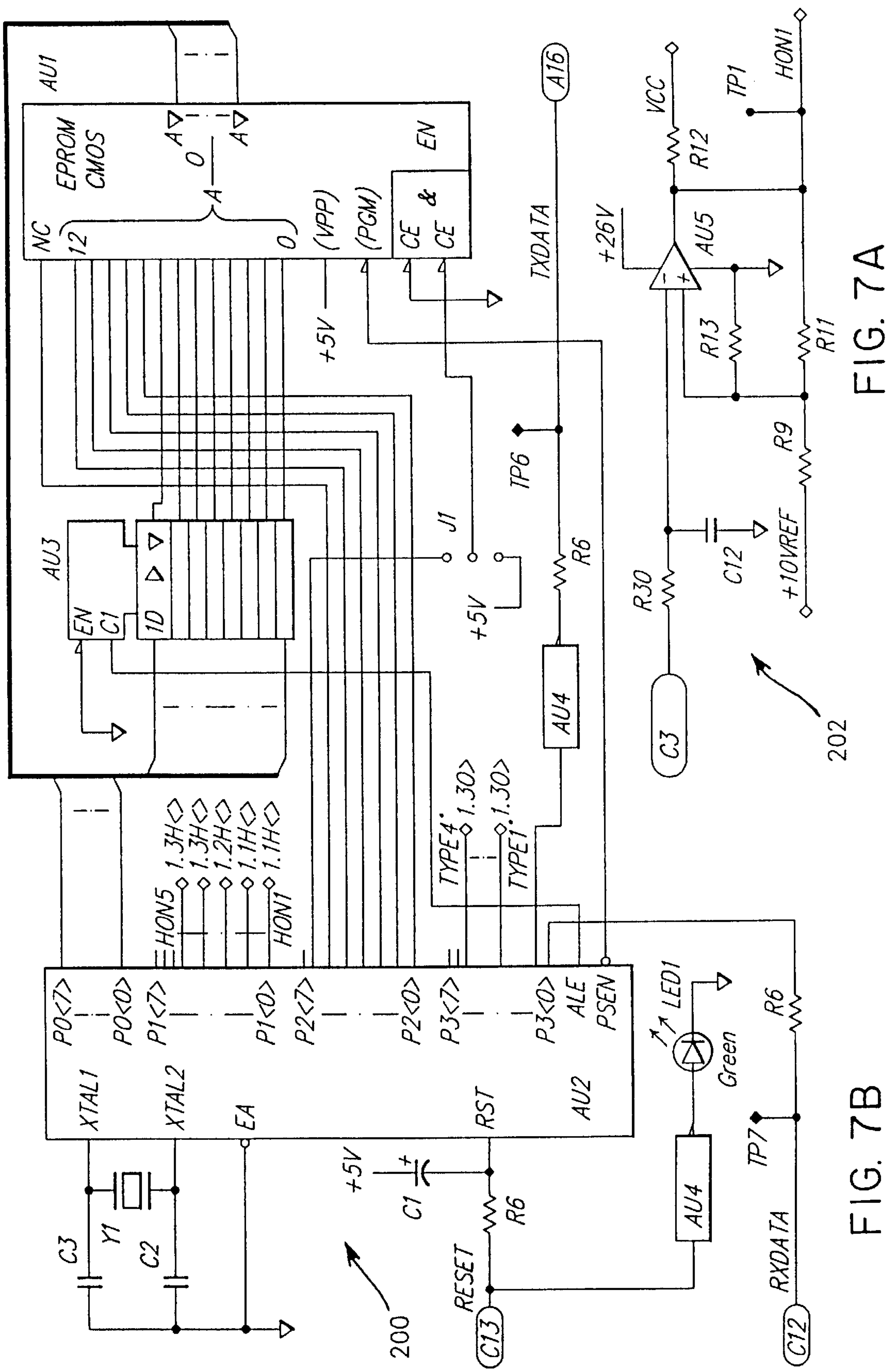

Referring now to FIGS. 7A–7C, a schematic diagram for a smart serial input circuit 200 for processing analog signal information is shown. The input circuit 200 is capable of asynchronously processing the signals received on 5 separate serial input channels. Each of these channels are adapted to receive a digital signal stream which is representative of analog input signal information. In one form of the present invention, the field computer unit 12 may employ three such "analog" input circuits for each of the three redundant computer circuits 92–96. In this regard, the input circuit 200 will be mounted in one of the card slots shown in the processor chassis 40 of FIG. 5 (e.g., AI1-5 and AI6-10). While not shown in FIG. 5, a slot is also provided for an "AI11-20" analog input circuit. Thus, it should be appreciated that the field computer unit 12 is capable of handling up to twenty distinct analog input signals.

The input circuit 200 is designed to operate in conjunction with a suitable transmitter device which will generate the appropriate digital stream. Preferably, a Honeywell transmitter is employed to read the analog signal and generate a digital stream or message therefrom, such as a (Series 100, 200 or 300) Smart Pressure Transmitter, a Smart Temperature Transmitter or a Smart MAGNEW Flow Transmitter. These Honeywell transmitters generate a three part digital message approximately three times each second. Specifically, the digital message includes the transmitter status, the primary analog value sensed, and configuration/status data. The digital message may also include a secondary variable value, such as head temperature.

The input circuit 200 is referred to as being a "smart" circuit in that it is capable of doing considerably more than merely sending on to the controller 100 the raw data that it receives from the transmitters. In this regard, input circuit 200 decodes the serial data stream from the transmitters and converts these streams to a format which is compatible with the controller 100 (that will ultimately be transmitted to the process control computer 14 as a 16-bit signed integer percent of full value). The input circuit 200 also provides for various error bits that the controller may utilize to interpret the data or otherwise transmit informed error messages. For example, these error bits include a "No Xmitter" bit, a "Parity Error" bit, and a "Comm Error" bit. The No Xmitter bit is set when the transmitter has failed to send a serial data stream to the input circuit 200 within a predetermined time period (e.g., 382 msec.). The Parity Error bit is set when: (a) an input signal is detected less than 48.9 msec. after the completion of the previous message, (b) the current byte being assembled from the serial transmission fails the parity test, or (c) the binary value of the start/stop bits are wrong. The input circuit 200 also formulates a message to the controller 100 which permits the controller to perform a "checksum" verification of the message it receives from the input circuit. The debug panel 44 for the controller 100 may also be utilized to examine the status bytes which contain the above identified error bits at the field computer unit 12. For example, the technician may use the debug panel to enter the memory address for the particular status byte in question, and the contents of this byte will be presented for visual inspection on the display device of the debug panel.

FIG. 7A shows a receiver circuit 202 for the input circuit 200. While only one receiver circuit 202 is shown, it should be appreciated that the input circuit 200 should include an individual receiver circuit for each transmitter. The connector pin "C3" is used as the entry point of the circuit to convey the digital signal stream from a transmitter to the receiver circuit 202. The receiver circuit 202 then employs a comparator (LM339) AU5 to produce an appropriate digital signal level input "HON1" (e.g., High +5 volts, Low 0 volts) for further processing. The comparator AU5 is preferably set in an inverting mode to trigger at 0.9 volts with a hysterisis band of 0.42 volts, so that a logic "0" is detected when the voltage input to the circuit exceeds 1.25 volts, and a logic "1" is detected when the voltage input to the board is below 0.83 volts.

The HON1 signal is directed to the "P1" port of a 16 MHz microprocessor (80C31) AU2, which is shown in FIG. 7B. An 8K×8 EPROM (27HC64) chip AU1 is used to store the program employed by the microprocessor AU2. The EPROM chip AU1 is directly connected to the "P2" port of the microprocessor AU2 and indirectly connected to the "P0" port of the microprocessor through memory address latch (HC573) AU3. The multiplexed data output from the microprocessor AU2 is transmitted to the controller 100 through the "TXDATA" signal. The TXDATA signal corresponds to one of the "MAI" prefix signals connected to the main multiplexor U11 of the controller 100. The microprocessor AU2 also receives signals from the controller 100 through the "RXDATA" signal line stemming from connector pin "C12".

FIG. 7C shows a configuration circuit 204 for the input circuit 200. The configuration circuit 204 includes a switch "ASW1" which has four output lines (TYPE1 . . . TYPE4). A pull up resistor is connected to each of these lines through resistor bank chip "ARP1". Additionally, an inverter from hex inverter circuit (HC04) AU4 is connected to each of the output lines from the switch ASW1 to provide an isolated set of configuration lines to the microprocessor AU2. The switch position for each of these lines is used to inform the microprocessor AU2 (through the "P3" bus) of the type of transmitter device connected to each of the receiver circuits by employing a suitable four bit code. The switch output lines are also directed to the controller 100. These output lines correspond to the "AITYPE" prefix signals shown on FIG. 6G.

Figure 7D:
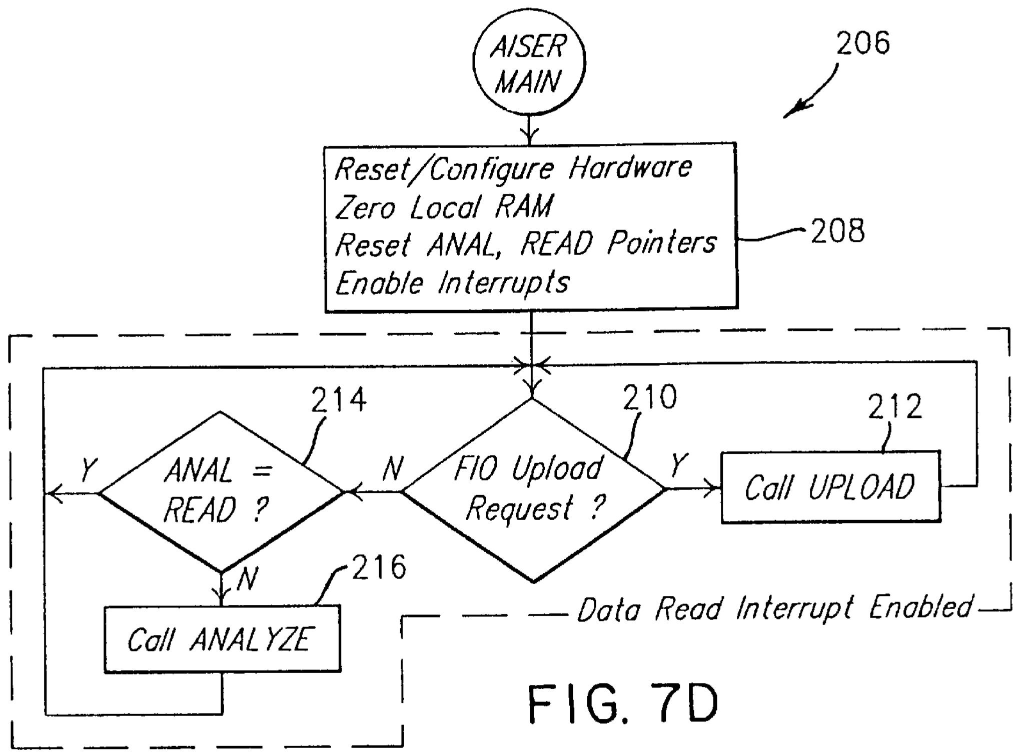
FIGS. 7D–7M comprise a series of flow charts associated with the operation of the smart serial input circuit of FIGS. 7A–7C.
Figure 7F:
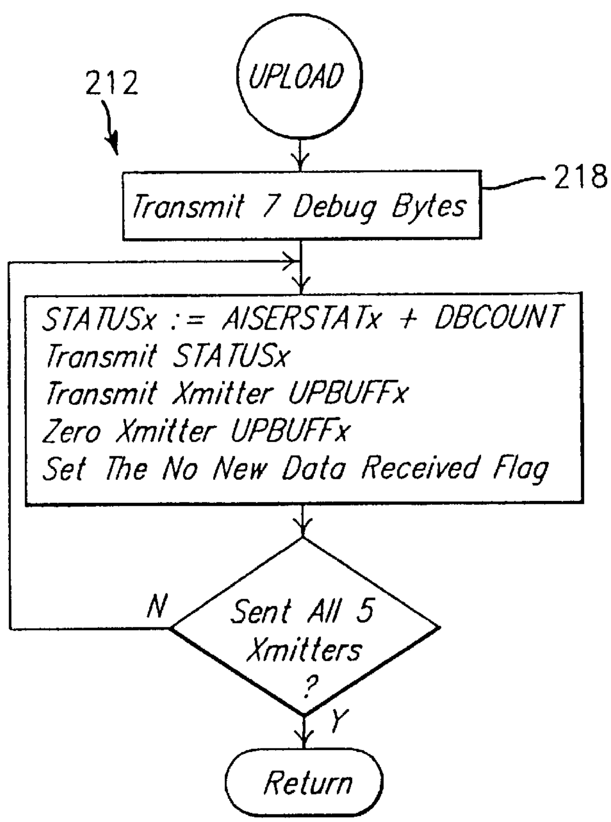
Figure 7G:
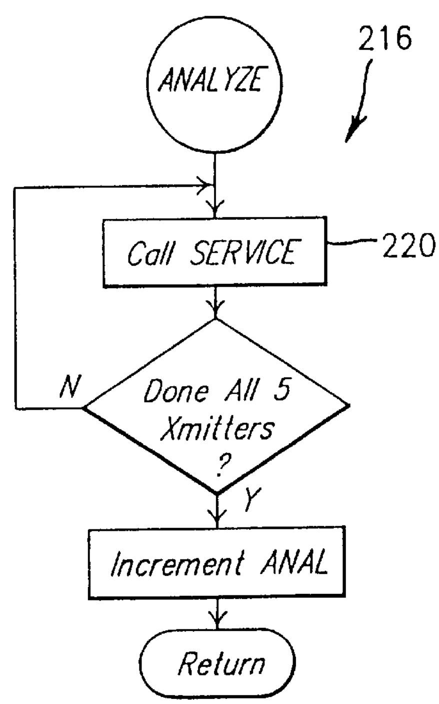
Figure 7E:
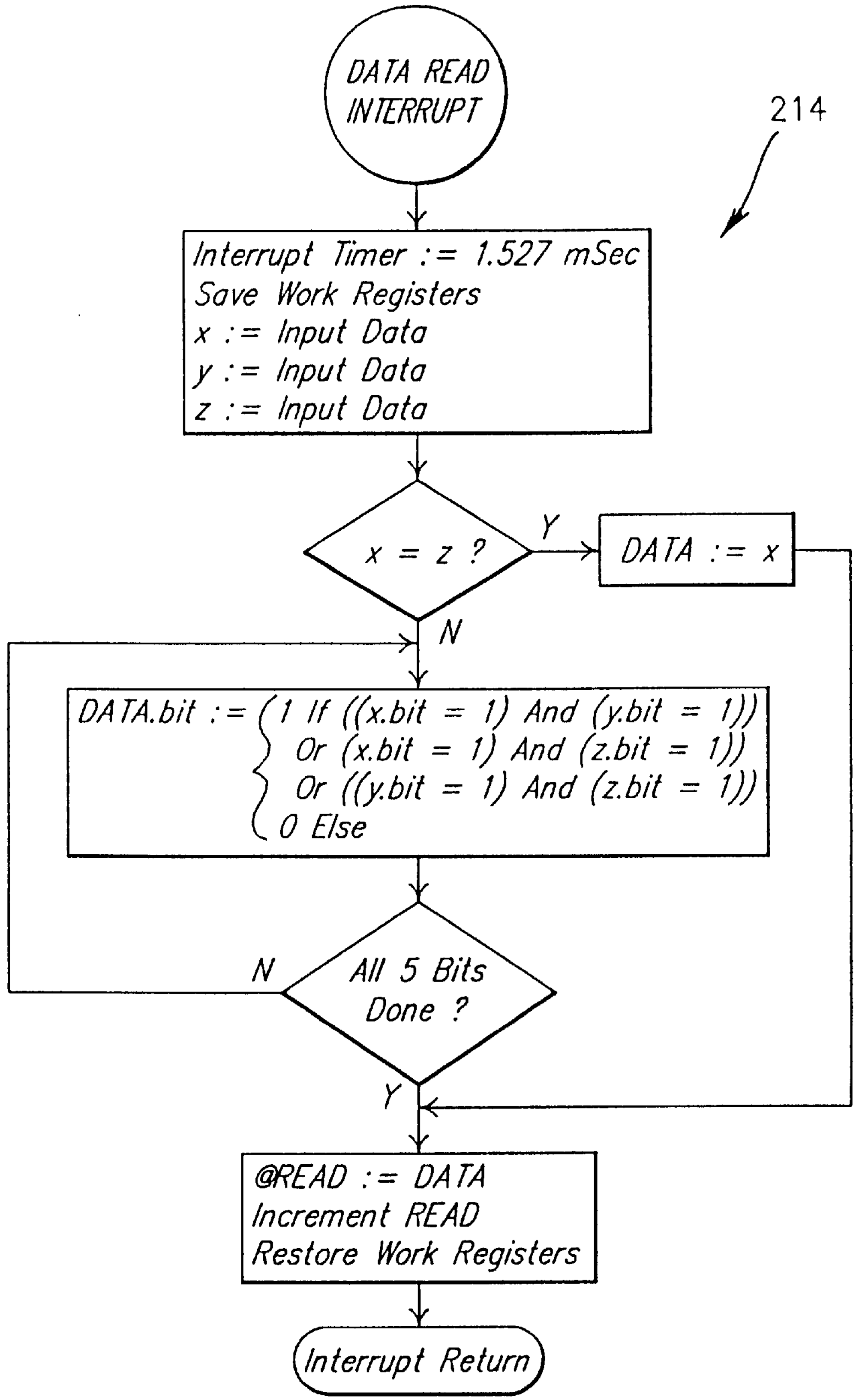

Referring to FIGS. 7D–7M, a series of flow charts associated with the operation of the smart serial input circuit 200 are shown. In this regard, FIG. 7D provides an overall flow chart 206 entitled "AISER MAIN". The flow chart 206 includes an initialization block 208 which ends with the enablement of one or more interrupts. Program flow control is then passed to diamond 210, which determines whether or not a request for data has been sent by the controller 100, referred to here as "FIO". If data has been requested, then the UPLOAD routine is called (block 212). The UPLOAD routine is shown in FIG. 7F. If an upload request is not present, then the microprocessor AU2 determines if all of the data read through the flow chart of FIG. 7E has been analyzed (diamond 214). If the data received in response to a series of data interrupts has not been analyzed, then the ANALYZE routine of FIG. 7G is called (block 216).

FIG. 7F indicates that the UPLOAD routine 212 includes the transmission of seven debug bytes to the controller 100 (block 218). These bytes are preferably stored in the internal RAM memory of the microprocessor AU2, and they may be accessed through the debug panel 44 for the controller.

Figure 7H:
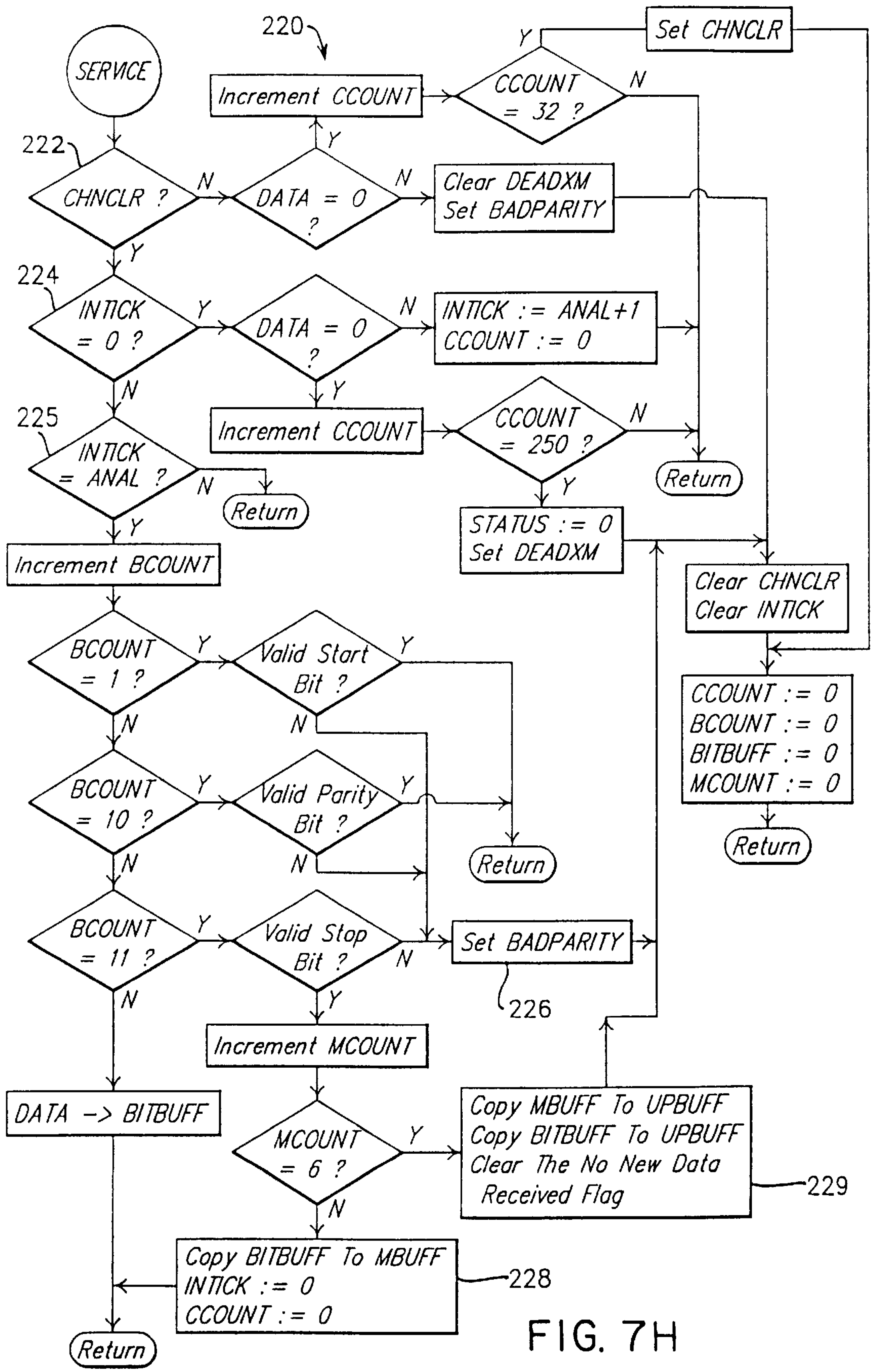

FIG. 7G indicates that the ANALYZE routine calls the SERVICE routine 220 shown in FIG. 7H for each of the analog input signals received. The ANALYZE routine performs a variety of validity checks on the digital signal stream from a transmitter. For example, the flow chart 220 includes a diamond 222 which determines whether the channel is clear (CHNCLR), and a diamond 224 which determines whether the channel is in the process of assembling a byte of information from the serial data stream. If a byte is being assembled, then diamond 225 determines if the information being processed is from the proper interrupt. A bit count is then used to determine if valid start, parity and stop bits have been received. If the answer is negative for any of these questions, then the BADPARITY bit is set (block 226). Assuming that the data passes these checks, then the contents of the bit buffer "BITBUFF" are copied into the memory buffer "MBUFF" (block 228) for subsequent transfer to the upload buffer "UPBUFF" (block 229). The contents of the upload buffer are then transmitted to the controller 100 in response to an upload request.

Figures 7I, 7J:
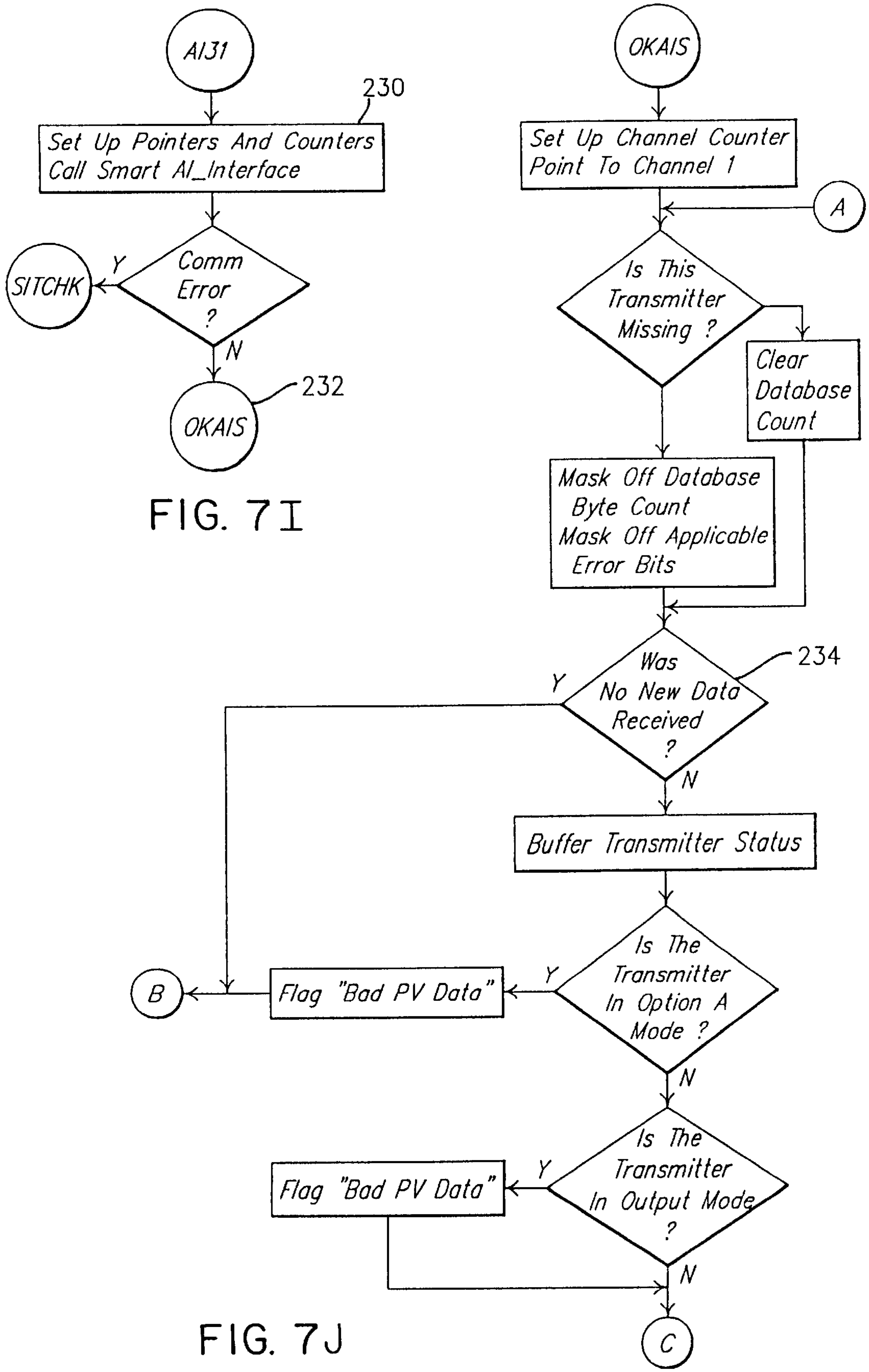
Figure 7K:
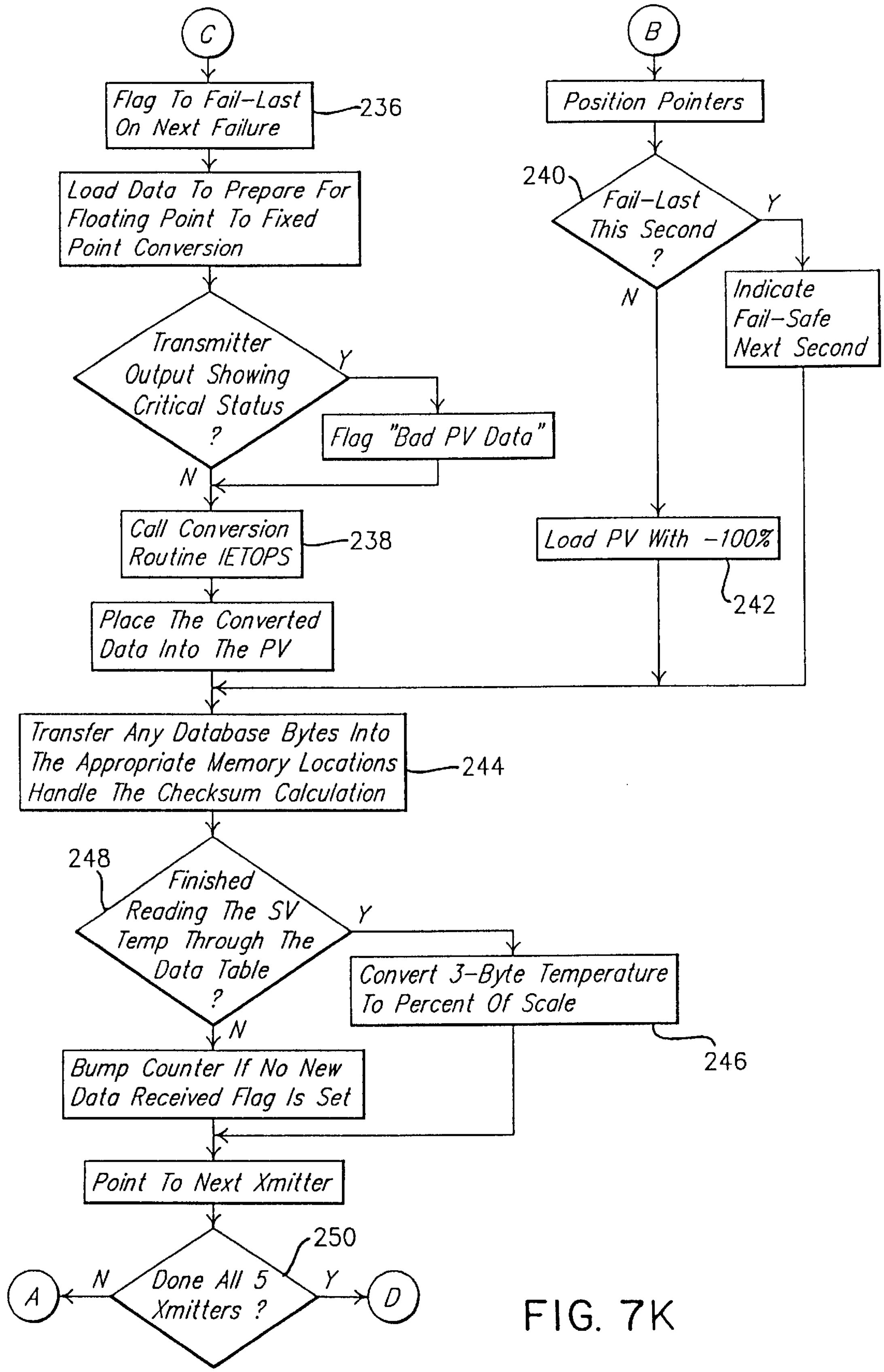
Figure 7L:
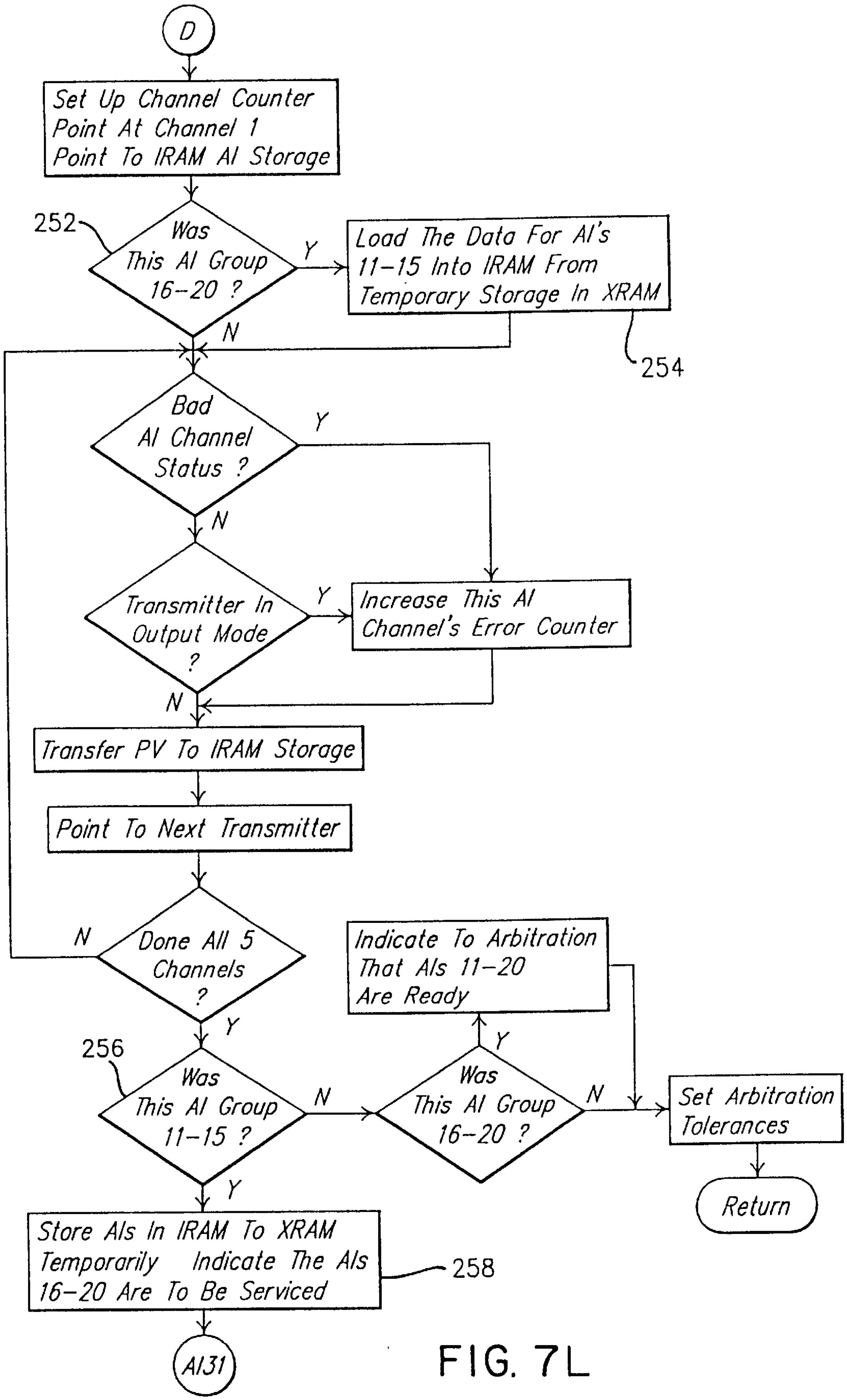
Figure 7M:
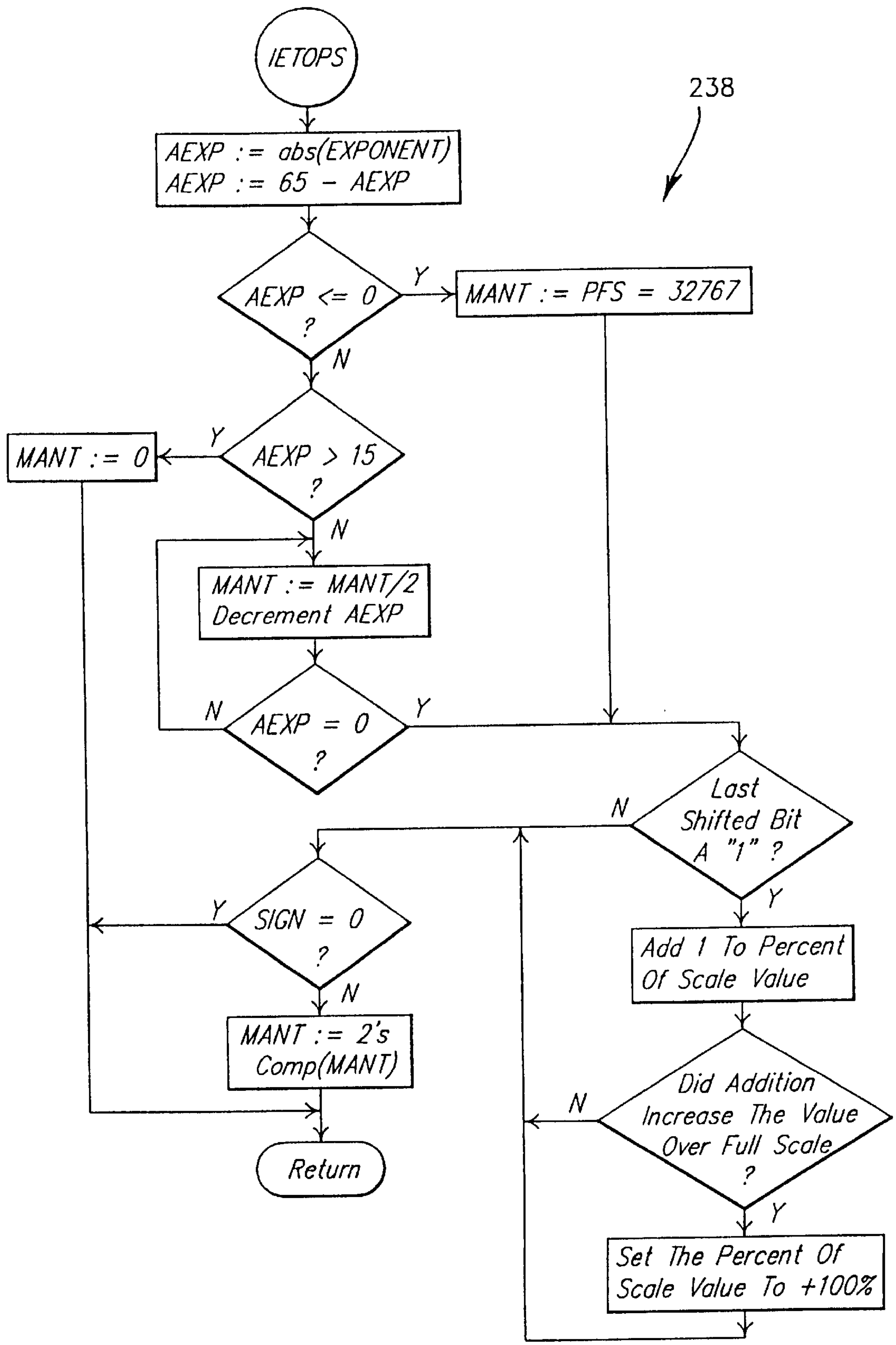

FIGS. 7I–7M illustrate flow charts for programs associated with the interpretation of signals received by the controller 100 from the input circuit 200. In this regard, the "AI31" flow chart includes a set up block 230 which calls a Smart AI_Interface routine. The Smart AI_Interface routine provides a timeout of 5 msec. within which a upload response must be received and checked for communication errors. If a communication error was detected, then the status check routine "STCHK" is called. The STCHK routine sets one or more specific error bits depending upon the detected error (e.g., a bad parity bit or a bad checksum bit). If no communication errors were detected, then a jump is made to the "OKAIS" routine of FIGS. 7J–7L is made (block 232).

As indicated by block 234 of FIG. 7J, the OKAIS routine determines if a primary variable value was contained in the message sent from the input circuit 200. If the primary value is determined to be good, then a flag will be set which will cause a Fail-Last value to be sent to the process control computer 14 on the next failure (block 236 of FIG. 7K). Then, the "IETOPS" routine of FIG. 7M will be called (block 238) to convert the primary value to a fixed point value and store it as a percent of the maximum scale value of an acceptable input. In the event that a bad primary value was received, diamond 240 will determine whether a Fail-Last condition was set for this process control cycle. If it was, then the last known good primary value will be sent to the process control computer 14 and a flag will be set to not Fail-Last in the next process control cycle. However, if a Fail-Last condition was not requested, then the primary value will be loaded with a number corresponding to −100% of the maximum acceptable value (block 242).

Blocks 244–246 and diamond 248 indicate that if a secondary value is present (e.g., temperature), then it will be converted to a percent of full scale. Diamond 250 then shows that this part of the OKAIS procedure will be implemented for all five analog inputs being sensed. Diamond 252 indicates that the controller 100 will then load the primary variables for channels 11–15, that were stored by block 258, into the proper IRAM locations. Block 254, diamond 256 and block 258 combine to temporarily store the primary variables for channels 11–15 and re-execute the routine to collect the data for channels 16–20. This allows one call of the routine to process 10 channels of data. The conclusion of the OKAIS routine is an indication that the analog input signals are now available for subsequent software arbitration by the field computer unit controllers.

Referring to FIGS. 8A–8E, a schematic diagram for a multiple-mode pulse input circuit 300 according to the present invention is shown. The input circuit 300 is also referred to herein as the pulse train board "PTB" circuit. The PTB circuit 300 is a five channel analog input "daughter" circuit board that may be used to measure frequency (1 Hz to 65 kHz) with a high degree of accuracy (e.g., 0.075% of the measurement) and/or count pulses (1 to 32767 pulses per second). Since the PTB circuit 300 has three different modes of operation, the controller 100 has two different methods of processing data (i.e., pulse or frequency), and three methods of outputting this analog data (i.e., only pulses, only frequency or both), even though the controller uses the same data to calculate both frequencies and count pulses. In the frequency mode, the frequency value stored in the AI table of the controller 100 is in a pseudo-floating point format, as will be discussed further below. This form is preferred in order to ensure that the floating point conversion would introduce no more than 0.025% of error into the final value to be transmitted to the process control computer 14. In the pulse counting mode, a true integer number is stored in the AI table. The number of pulses received since the last reported value is reported to the process control computer 14 as an integer stored in the AI table. In the event that the values received by the PTB circuit 300 are over their respective ranges, then the controller 100 preferably reports a full range value.

Since the field computer unit 12 preferably reports all of its input data to the process control computers 14*a*–14*b* each second, it should be appreciated that measured frequency values lower than 1 Hz present a special problem, as the field computer unit will not be able to update the measurement once per second. Accordingly, the PTB 300 is adapted to report a frequency of 1 Hz in the time intervals that a pulse was detected. It no pulse was detected within the reported second, then a zero value will be transmitted to the process control computer 14. In the case where a pulse train starts after a period of zero input, and the PTB circuit 300 is in the frequency mode, the first second will not be used to report a frequency value. Rather, this first second will be used to report the total number of pulses received in that second. Only in the next second will the data be a true frequency value. This procedure is utilized to permit a summation of the total pulses over a known time interval. If no pulses are received over a second, the PTB circuit 300 will be unable to measure the time interval.

Figure 8A:
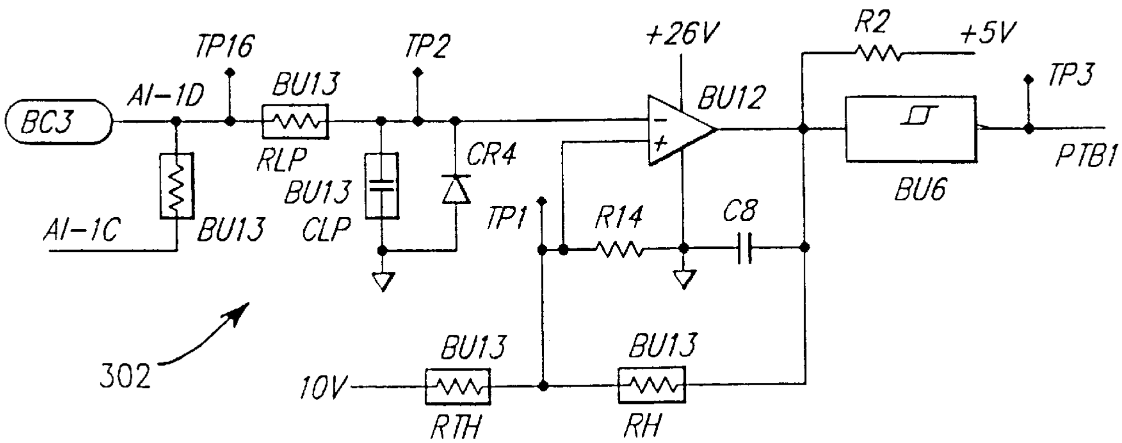
FIGS. 8A–8E comprise a schematic diagram for a multiple-mode pulse input circuit according to the present invention.

FIG. 8A illustrates a receiver circuit 302 for the PTB circuit 300. In this regard, it should be understood that a receiver circuit 302 should be provided for each of the input pulse signal channels connected to the PTB circuit 300. The receiver circuit 302 includes a connector "BC3" which is used to couple the circuit to a pulse emitting transducer, such as a Hall Effect device, through the protection provided on the passive element board. The receiver circuit 302 also includes a signal line labeled "AI-1C" which provides a path to ground through a PTC resistor, such as resistor "VR3" shown in FIG. 8D. The receiver circuit also includes a low pass filter, which is comprised of resistor "RLP" and capacitor "CLP". This low pass filter effectively removes any high frequency noise that may otherwise be induced in the field wiring. It should also be noted that the resistor RLP and the capacitor CLP are derived from a function module chip "BU13" which contains several of the other passive components in the receiver circuit 302. The capacitor CLP is connected in parallel with a diode (1N5819) "CR4" which clamps the negative going portions of the pulse signal to GND in order to prevent the comparator (LM339) "BU12" from being saturated.

The comparator BU12 receives the filtered pulse signal input and a reference voltage potential derived from a ten volt source. The reference voltage potential is set by voltage divider network comprised of the threshold resistor "RTH", a 10K resistor "R14" and the hysterisis resistor "RH". When the pulse signal is above the reference voltage potential, the output of comparator BU12 is pulled to GND. The low output from the comparator BU12, in effect, puts the resistor R14 in parallel with the resistor RH. This effect lowers the threshold resistance and allows the comparator output to stay low longer. This substantially eliminates unwanted oscillation that could be caused by low level noise on the input pulse signal.

The values for the passive components RTH, RH, RLP and CLP are preferably determined in accordance with the following approximation equations for large signal applications:

$$RTH=(100{,}000/Vth)-10{,}000$$

where Vth=(0.30)×Amax where Amax is maximum amplitude of the signal $$RH=((1/Vh)-1/5)\times 50{,}000$$

where Vh=2×(peak to peak noise level)

$$RLP\times CLP=T$$

where T=(1/Fmax)×(duty cycle of input)/3.14,
where T=(1/Fmax)×(1−duty cycle)/3.14, depending upon whichever is smaller, and Fmax=the maximum frequency of the signal In this regard, it should be noted that Vth is the threshold voltage where the comparator BU12 will decide that an input has a great enough voltage to be considered a high input. The value of the hysterisis resistor RH should be selected to allow the proper amount of hysterisis to be placed in the receiver or detector circuit 302. In this context, hysterisis is the difference between the threshold point and the point at which the comparator BU12 determines that the signal has dropped enough to be considered low. The provision of hysterisis in the receiver circuit 302 is useful in preventing mid-frequency, low-amplitude noise from affecting the output of the comparator BU12. The value of "T" is the period of the fastest component in Fmax. This calculation is useful as most signals are not on and off for equal periods of time (e.g., a 50% duty cycle). Thus, to allow a pulse of 20% duty cycle to pass, the low pass filter must be capable of handling a frequency 1/(2×0.2) or 2.5 times greater than the true Fmax. Conversely, if the duty cycle is greater than 50%, the low pass filter must be capable of handling the zero part of the signal that is at a higher frequency than expected by a 50% duty cycle Fmax. Thus, for example, a pulse signal with a duty cycle of 75% should have a filter designed for 1/(2×(1−0.75)) or 2 times Fmax. In this regard, it is preferred that the value for CLP be chosen to enable the value of RLP to stay in the range between 1 ohm and 10K ohms. Where the frequency of the input signal is relatively low (e.g., 50 Hz), the following values may be provided through the function module BU13: RTH=10k, RH=100K, RLP=2.7k and CLP=100 pf.

In large signal applications, the error induced in the approximations by RH is small, and thereby making the calculation for Vth a standard voltage divider. However, for small pulse signals, the error may be significant. Accordingly, for hysterisis levels greater than 1% of Vth, the following equations should be employed:

$$RTH=\frac{10000\times RH}{\dfrac{(100000+(10\times RH)-(10000\times Vhc))}{(10-Vth)}-RH-10000}$$

where Vhc is the high value output from the comparator BU12 (e.g., 5 volts)

To use this formula, the value of RH must be known. In this regard, the value of RH may be approximated according to the following formula:

$$RH=\frac{(5-Vh)\times 50000}{5\times Vh}$$

Once the pulse signal passes through the comparator BU12, it is an inverted 0/5 volt signal with a relatively slow rise time due to the capacitor (0.001 micron) "C8". To speed up signal transitions and shape the signal into a more precise digital form, an inverter gate with hysterisis (74LS14) "BU6" is used. The inverter gate BU6 improves the rise time of the signal and inverts the output pulse signal "PTB1" to the original orientation of the pulse train received by the circuit.

Figure 8C:
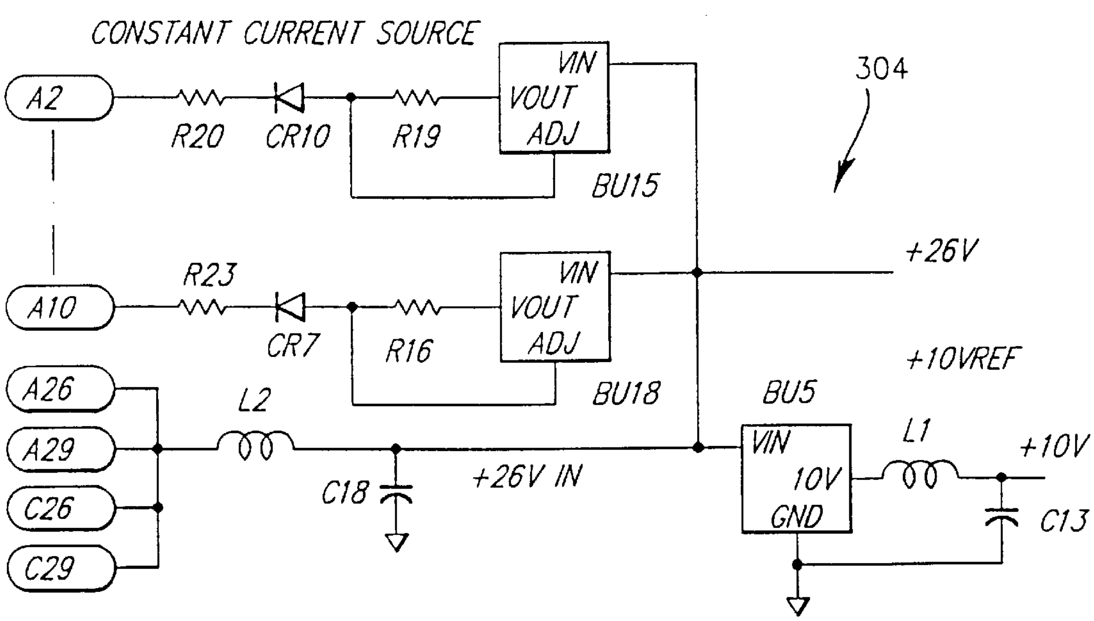
Figure 8B:
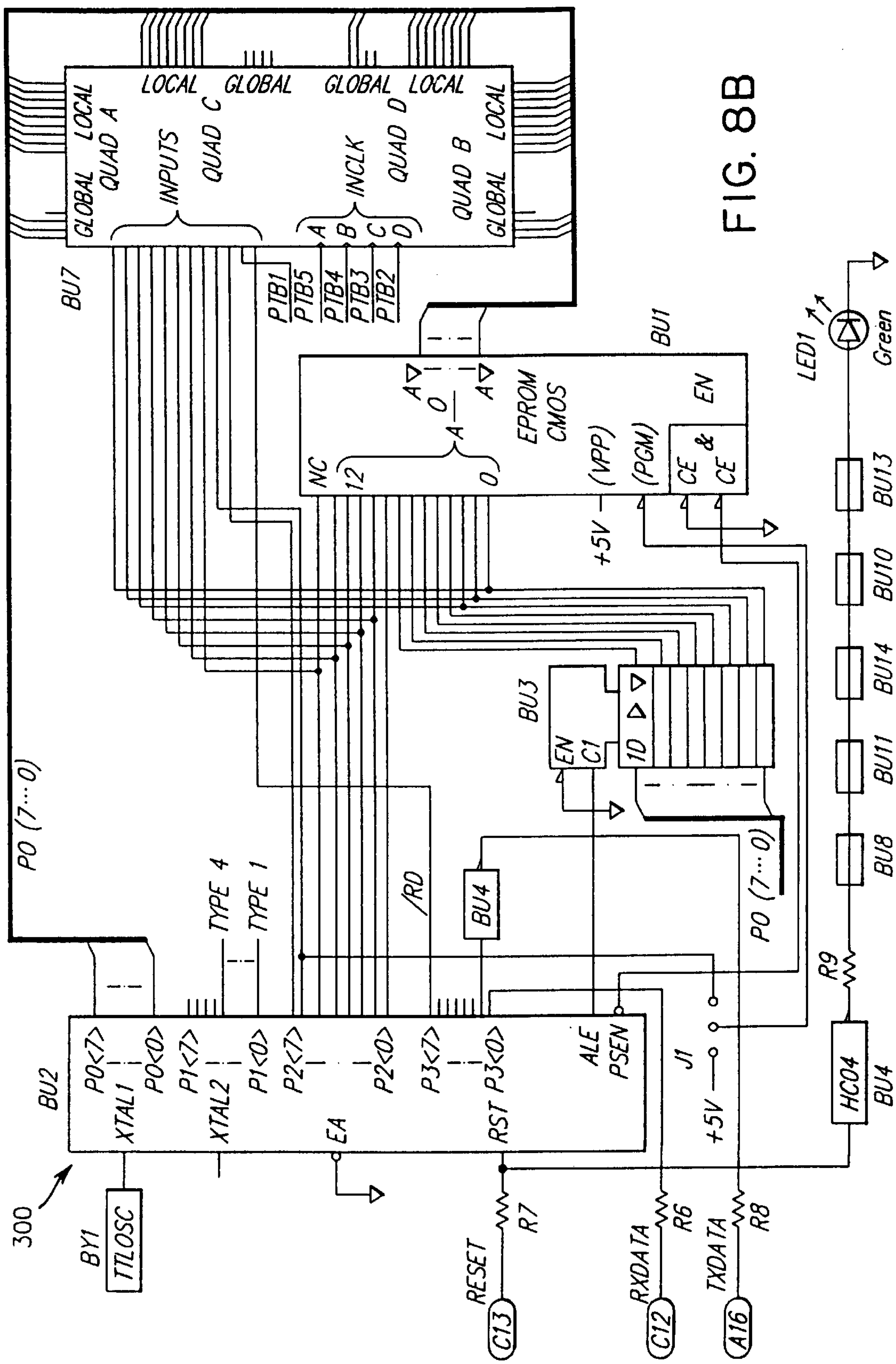
Figure 8D:
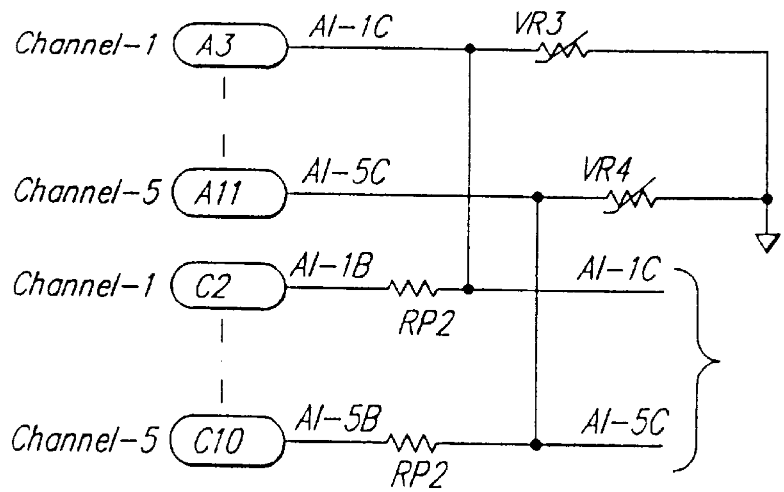

As indicated in FIG. 8B, the pulse signal output from each of the receiver circuits 302 (PTB1 . . . PTB5) are coupled to a programmable logic device (Altera 1810) "BU7". The programmable logic device BU7 is set to provide five internal counters (one for each input pulse channel), and the associated internal addressing is set to permit it to be addressed as a memory mapped I/O device. In this regard, the internal configuration for the programmable logic device BU7 looks like five individual eight bit counters with their output control lines being set by logic driven by the address lines. The necessary multiplexing function for the programmable logic device outputs is accomplished by using tri-state buffers internal to the device. The internal counters permit pulses with a frequency greater than one-half the sample rate (i.e., the Nyquist limit) to be measured.

FIG. 8B also indicates that the PTB circuit 300 includes a microprocessor (80C31) "BU2", a memory address latch (HC573) "BU3" and an 8K×8 EPROM chip "BU1". The jumper "J1" is set between pins 1–2 for EPROMs up to 256K, and the jumper J1 is set between pins 2–3 for EPROMs that are 256K or larger. The 16 MHz crystal oscillator "BY1" used to create the microprocessor clock signal is preferably accurate to ±0.005% in order to minimize the measurement error of the PTB circuit. When the microprocessor BU2 accesses a counter in the programmable logic device BU7, it reads the counter value and determines the number of pulses that have elapsed by subtracting the previous count from the current count. This procedure allows up to 255 pulses to occur between sample periods. It should also be noted that the PTB circuit 300 includes a light emitting diode "LED1", which will be on when the circuit is functioning properly, as an aid to troubleshooting in the field. A flashing green light will indicate that the controller 100 is attempting to reset the PTB circuit 300. The debug panel 44 may be used to view the contents of an error byte for the PTB circuit 300. For example, individual bits of this error byte will indicate whether there has been a communication failure between the controller 100 and the PTB circuit 300, or whether a read error has occurred on a particular input pulse channel.

In terms of communication with the controller 100, the "RXDATA" signal line connected to the microprocessor BU2 is used to receive signals from the controller 100, such as a request to send data to the controller. Conversely, the "TXDATA" signal line is used to transmit the processed pulse data to the controller 100.

FIG. 8C illustrates a current driver circuit 404, which is used for those pulse transducers which need to receive their electrical power from the PTB circuit 300. The current driver circuit is designed to provide a 25 milliamp current source to the field device at approximately 17 volts. A similar current driver circuit may also be employed in other input circuit boards, such as the input circuit 200 discussed above. As illustrated in FIG. 8C, each of the pulse transducers may receive their electrical power through an individual current driver, such as current driver (LM317) "BU15".

Figure 8E:
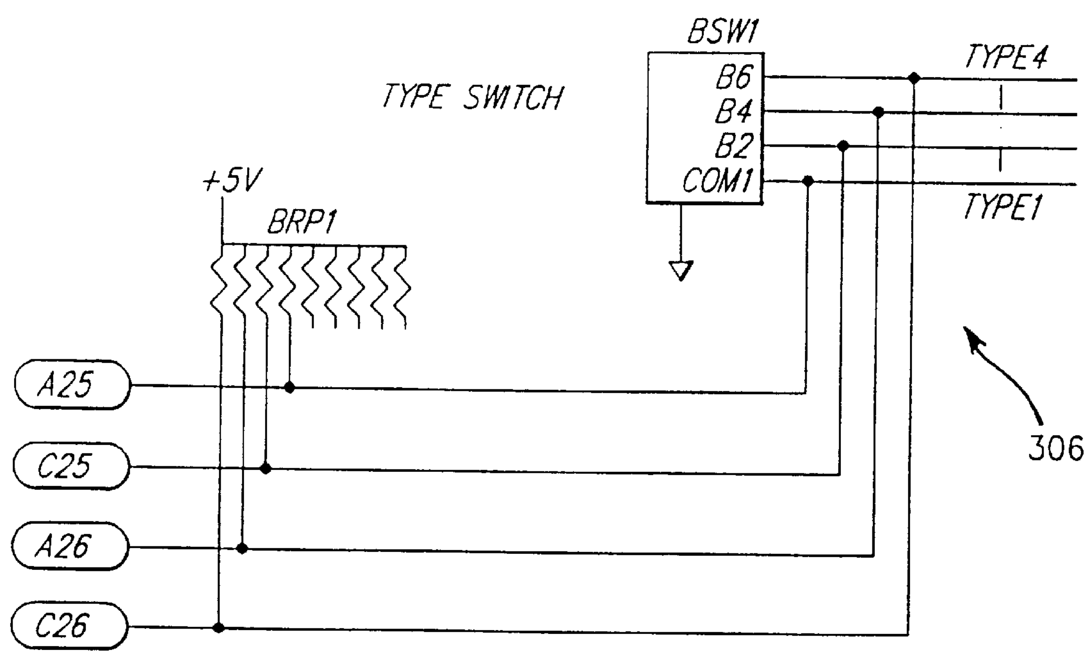

FIG. 8E illustrates a switch circuit 306, which is used to set the operating mode of the PTB circuit 300. In this regard, the switch "BSW1" sets the function for all five channels on the PTB circuit 300. For example, a selection of "0" may be used for the frequency mode, while a selection of "3" may be used for the pulse counting mode. Additionally, a selection of "4" may be used to enable both the frequency and pulse counting modes to be employed. In this regard, the controller 100 will transmit a set of both frequency and pulse counting data to the process control computer 14 for each of the channels contained on the PTB circuit 300. The output lines of the switch BSW1 are coupled to the "P1" port of the microprocessor BU2 shown in FIG. 8B. Thus, it should be appreciated that the switch circuit permits the PTB circuit 300 to be configured in the field, while also providing a way for the controller 100 to know how the data should ultimately be processed.

Referring to FIGS. 8F–8Q, a series of flow charts associated with the operation of the PTB circuit 300 are shown. FIGS. 8F–8J relate to software resident on the PTB circuit 300 itself, while FIGS. 8K–8Q relate to software resident on the controller 100. More specifically, the software represented by FIGS. 8F–8J is responsible for sampling the 1–5 pulse signal inputs, totaling the number of pulses received, measuring the elapsed time, and communicating this data back to the controller 100. In contrast, the software represented by FIGS. 8K–8Q is responsible for taking the data delivered from the PTB circuit 300, converting it into a frequency value and a total pulse count, and then sending these values to the process controller computer 14 upon request.

Figure 8F:
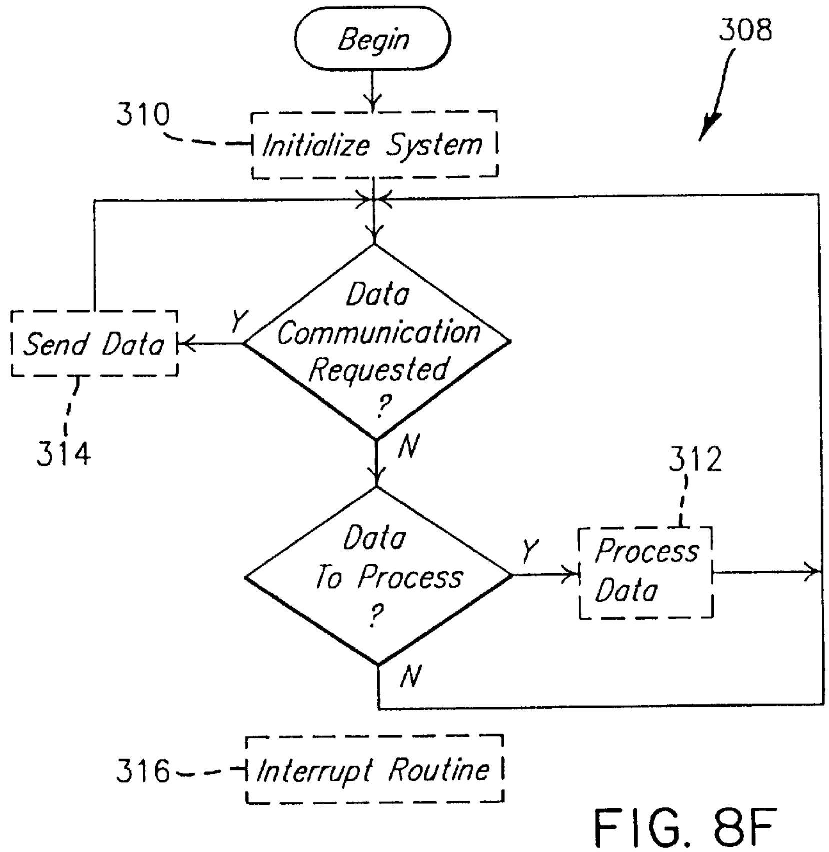
Figure 8G:
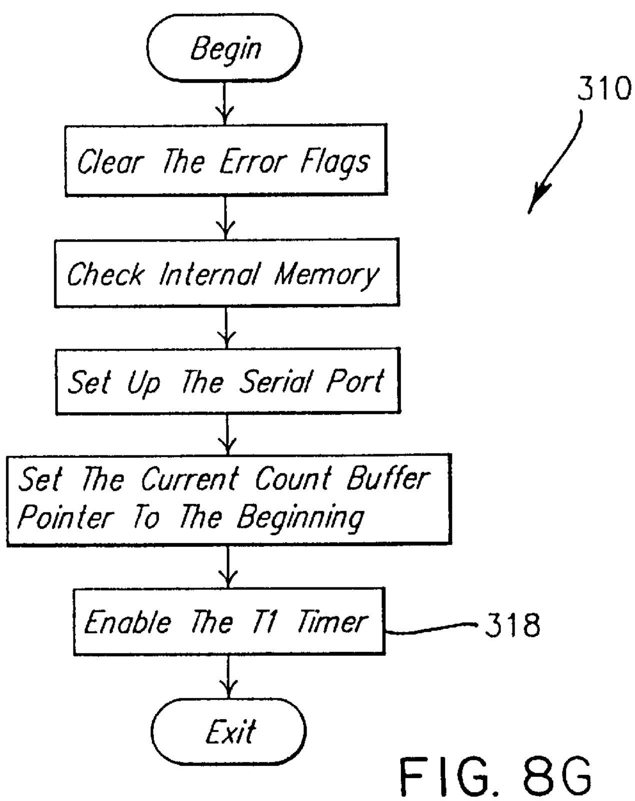
Figure 8H:
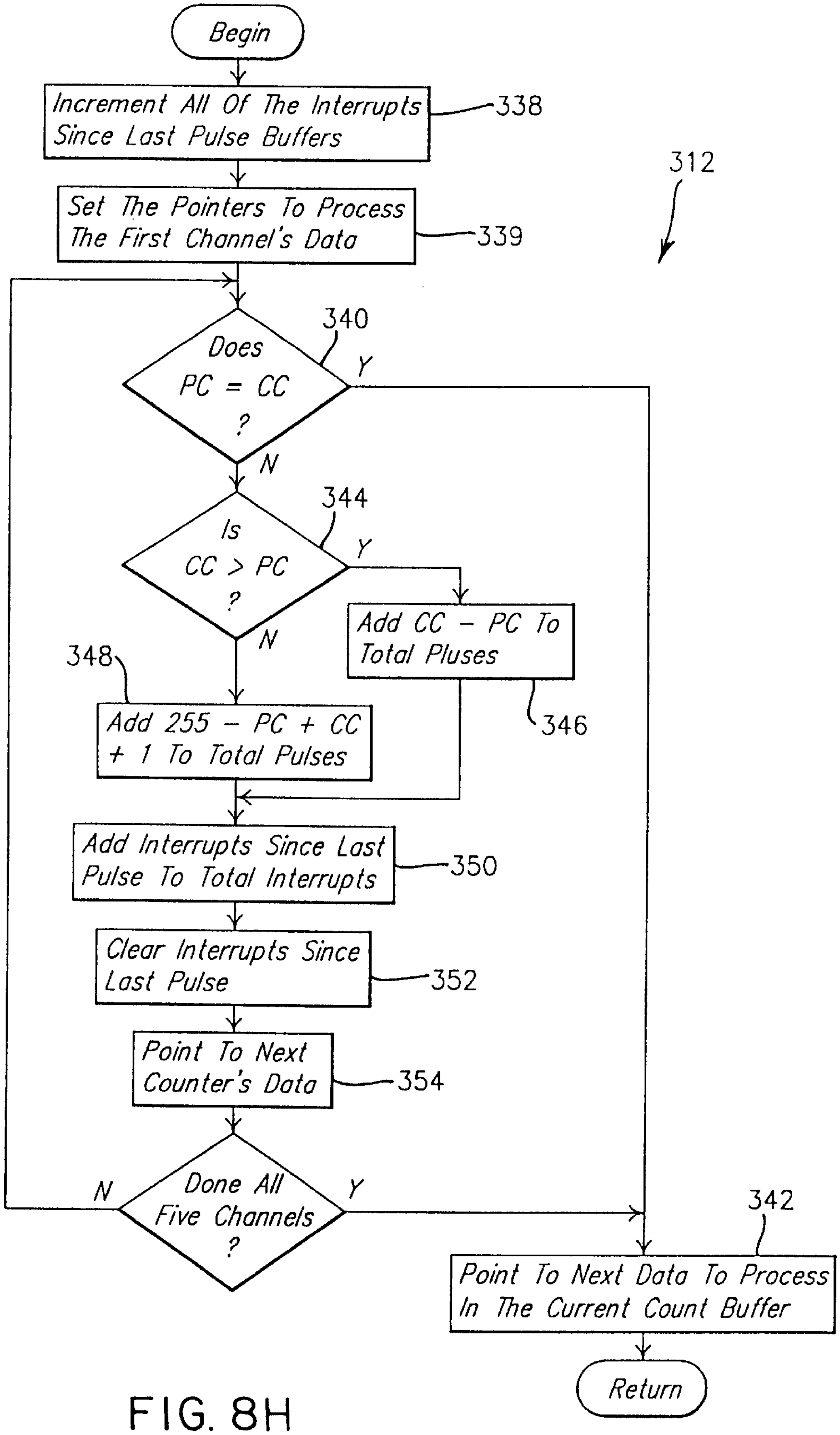
Figure 8I:
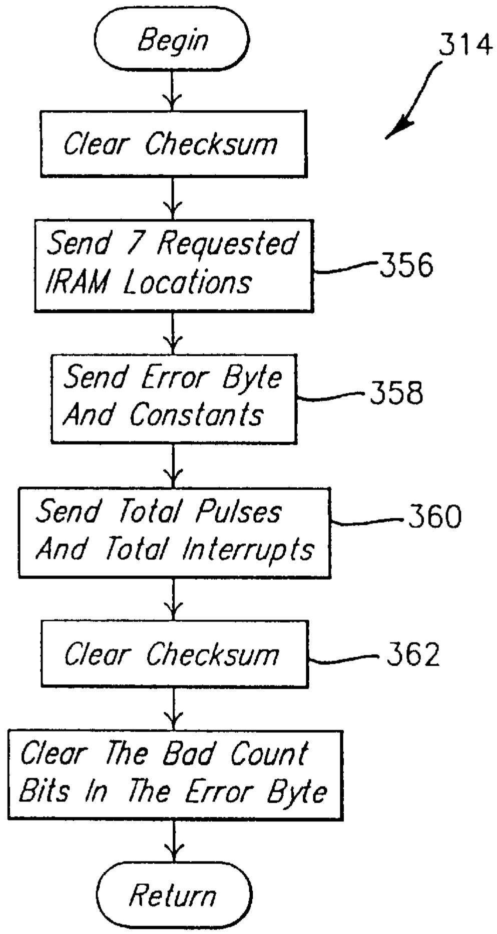

FIG. 8F shows an overall flow chart 308 for the PTB circuit 300. The flow chart 300 includes a system initialization routine (block 310), which is illustrated in FIG. 8G. After initialization has been completed, the program for the microprocessor BU2 of the PTB circuit 300 checks to see if data communication has been requested by the controller 100. If the answer is no, then the program checks to see if there is data to process. If pulse data has been received, then program control is directed to the process data routine (block 312), which is shown in FIG. 8H. Once all of the data has been processed, then the program control returns to check for a communication request. If the controller 100 has made a request for data, then the send data routine is called (block 314). The send data routine is shown in FIG. 8I.

Figure 8K:
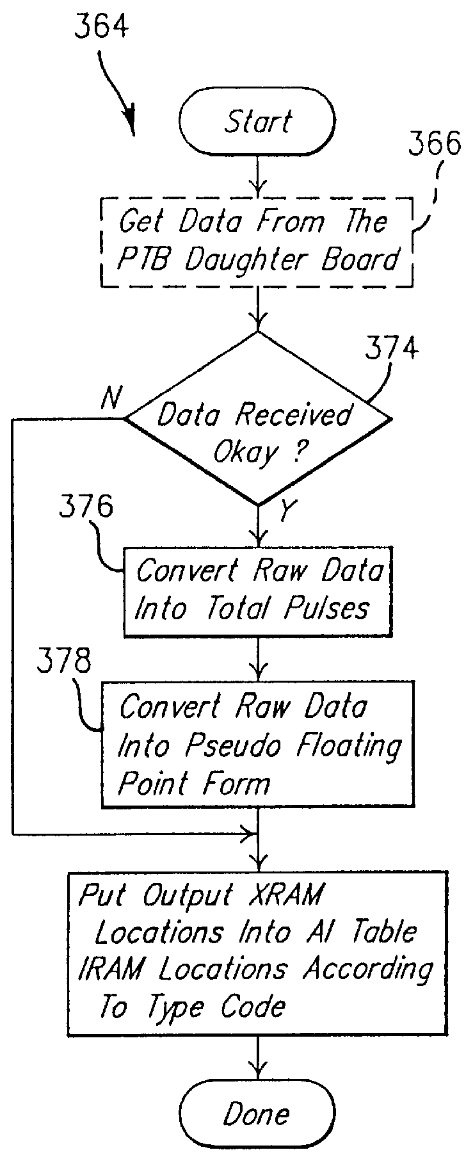
Figure 8J:
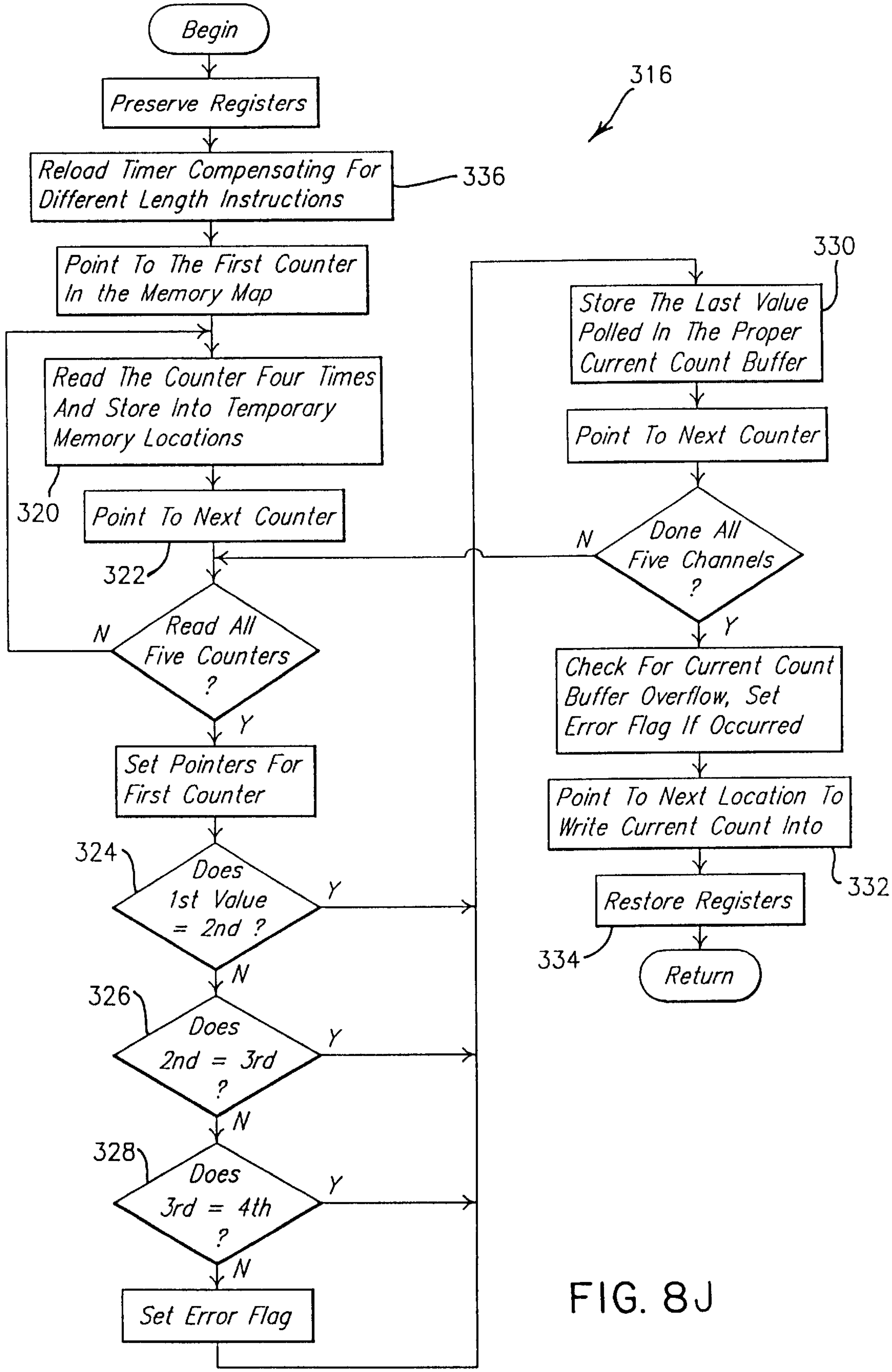

FIG. 8F also shows an interrupt or sampling routine (block 316), which is shown in FIG. 8J. The interrupt routine is not shown to be connected to any other program control block, as it is clock controlled to ensure the accuracy of the sampling rate. Specifically, the interrupt routine is controlled by the "T1" clock signal of the microprocessor BU2 (see block 318 of FIG. 8G). This interrupt preferably has priority over all of the other programmed functions of the PTB circuit 300 in order to ensure that sampling occurs at precise time intervals. In one form of the present invention, the sampling rate has an interval of 1/1999 sec. This particular sampling rate is considered advantageous due to the ability to evenly divide this rate into the maximum number of instructions/second (1,333,333) of the microprocessor BU2 and its ability to maintain a maximum error of 0.05%. As will be discussed further below, this sampling rate is preferably compensated for the length of time required to execute different instructions.

The function of the interrupt routine 316 shown in FIG. 8J is to sample the counters in the programmable logic device BU7 and store the data in a buffer for later analysis. This is accomplished by reading each of the five internal counters four successive times (i.e., read counter for channel 1 four times, then read counter for channel 2 four times, etc.), and then storing the data in a temporary buffer of the microprocessor BU2. This procedure is illustrated by blocks 320–322 in FIG. 8J. The interrupt routine 316 then sorts through the readings to find the first two consecutive readings that were equal for each channel in order to prove the validity of the data read (e.g., diamonds 324–328). The routine then starts filling up a buffer of data (e.g., blocks 330–332) to be used by the process data routine 312, which runs in the spare time between interrupts.

The responsibility of the process data routine 312 shown in FIG. 8H is to look at the data in the buffer, decide if a pulse has arrived, and then act on this decision. In order to accomplish this, five registers (blocks 338–339) are kept in the microprocessor BU2 for each channel of the PTB circuit 300. These registers are referred to as: Total Pulses, Total Interrupts, Number of Interrupts, Interrupts Since Last Pulse, and Previous Counter Reading. The Total Pulses register contains the number of pulses counted since the last transmission to the controller 100 (during the one second interval). This is the actual value transmitted to the process control computer 14 when the PTB circuit 300 is in the pulse counting mode. The Total Interrupts register contains the number of interrupts that have elapsed between the first and last pulses in the Total Pulses register. In other words, the Total Interrupts register provides an interval timer which is started by the last pulse received (leading edge) before the previous transmission to the controller 100 and ended by the last pulse received before this transmission to the controller. The Number of Interrupts Since Last Pulse register is used for pulse trains that are slower than 2 kHz (i.e., pulse trains under the sample rate). This register stores the number of interrupts that have occurred since the last pulse was detected and allows the Total Interrupts register to truly reflect the number of interrupts that have elapsed while the microprocessor BU2 was reading the Total Pulses register. The Previous Counter Reading register stores the last counter reading taken from the programmable logic device BU7, and it is used to determine how many pulses were received between samples.

Before proceeding to discuss the process data routine 312, it should be noted that the interrupt routine 316 includes a block 336 for controlling the timer controlled by the T1 clock. As the instruction set for the microprocessor BU2 includes instructions which may take one or two bus cycles to execute, a problem is presented when writing software that must be interrupted after a precise time interval. This is because this particular microprocessor will not service an interrupt until it is finished with the current instruction. The preferred solution to this problem is to load the T1 "count up" counter register of the microprocessor BU2 with the value of "FFFF" minus the number of bus cycles to elapse before an interrupt is to occur. The T1 counter will then count up until it hits "0000", and then the interrupt would occur. Thus, for example, with a one bus cycle instruction, the interrupt routine would begin with a T1 value of 6 (to allow for the time needed to process the interrupt call), while an interrupt at the beginning of a two bus cycle instruction would enter the interrupt routine with the T1 counter having a value of 7. By adding the value of T1 to the appropriate constant and loading this value into the T1 counter register, it is possible to allow the average time between interrupts to be constant. This constant is determined by the number of bus cycles needed between interrupts and the number of bus cycles between the value of the timer and loading the timer. Thus, for example, where an interrupt is desired every 1/1999 sec. (or every 667 bus cycles), and it takes 5 bus cycles between the reading and loading operations, the value loaded into the T1 register would be: FD69=FFFF−666 dec+5 dec.

As illustrated in FIG. 8H, the process data routine 312 works by first incrementing all of the Number of Interrupts Since Last Pulse registers (block 338). Next, the current count "CC" from the buffer created by the interrupt routine 316 is compared with the Previous Counter Reading value "PC" to determine if a pulse has been received (diamond 340). If a pulse has not been received, the routine will move on to process the data from the next channel (block 342). If a pulse was received, then the number of pulses would be added to the corresponding Total Pulses register (blocks 344–348). The Number of Interrupts Since Last Pulse would also be added to the Total Interrupts register (block 350), the Number of Interrupts Since Last Pulse would be zeroed (block 352), and the processing would move on to the next channel (block 354).

FIG. 8I shows the send data routine 314 which is called in response to a data request from the controller 100. In this regard, the PTB circuit 300 first sends the controller 100 the contents of seven bytes of debug data (block 356). Then, the error byte and constants, such as the sampling rate, are sent (block 358). Subsequently, the Total Pulses read in the last second and the Number of Interrupts that elapsed while reading the Total Pulses are sent for each of the input channels in turn (block 360). Finally, an Exclusive OR sum of all the transmitted bytes "XSUM", excluding the XSUM byte, is sent (block 362).

Figure 8L:
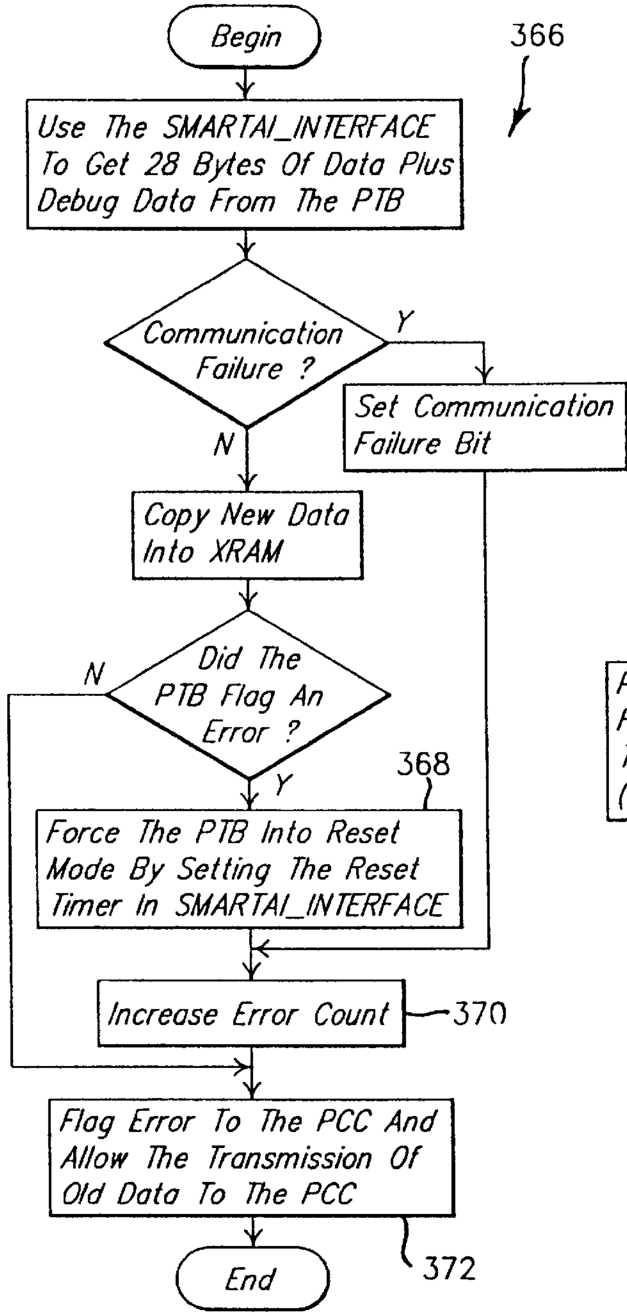

FIG. 8K shows an overall flow diagram 364 for the software used in the controller 100 for processing the data received from the PTB circuit 300. The flow chart 364 begins with a get data routine (block 366), which is shown in FIG. 8L. If the controller 100 is unable to obtain data from the PTB circuit 300, the controller will place the PTB circuit into a reset mode for three seconds (block 368), increase the error count by one (block 370), and send the previous second's data to the process control computer 14 with a flag to indicate that this group of analog inputs has bad data (block 372).

Figure 8M:
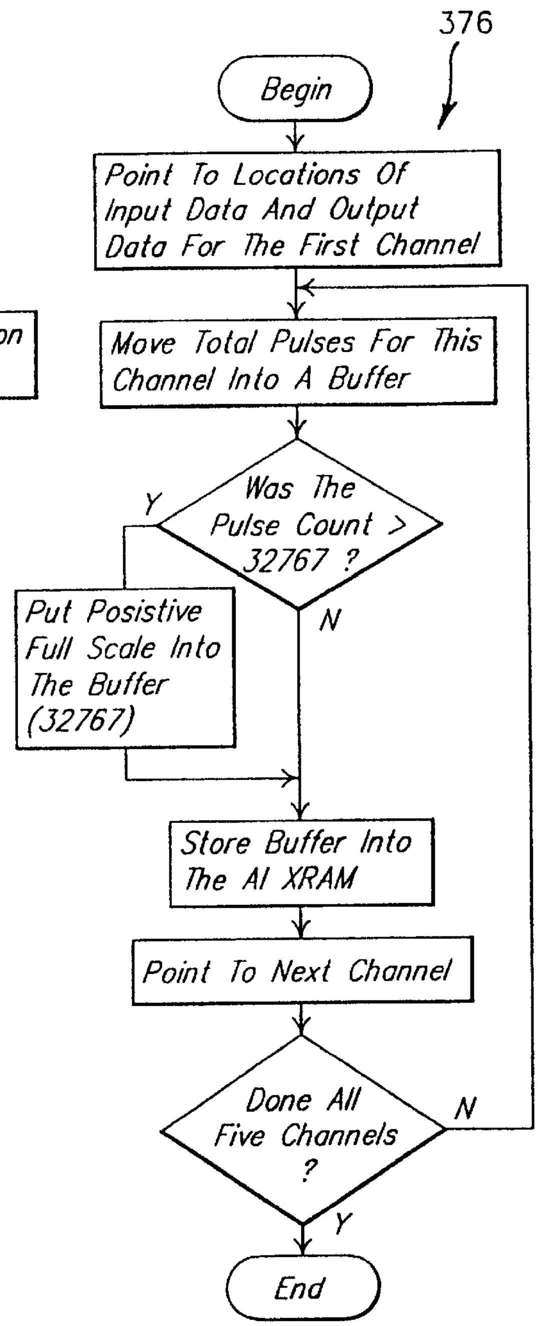

Assuming that the data has been received without error (diamond 374), the program will then convert the raw data into both total pulses (block 376) and a pseudo-floating point form (block 378). For the total pulse counting mode, the program takes the number of pulses received and places this value into the analog input table "AI XRAM" (block 376). This conversion routine is shown in FIG. 8M. For the frequency mode (block 378), mathematical manipulations are performed to convert the Total Pulses and Total Interrupts data into a pseudo-floating point value. This is a two part process which begins by forming a 24 bit intermediate result, and then is completed by converting this result to a 16 bit pseudo-floating point form used to encode frequency. The pseudo-floating point number is a 16 bit value comprised of a power of four exponent and a fractional mantissa. The exponent represents the smallest power of four that can be divided into the original frequency (while maintaining a fraction) less one. This prevents the representation of numbers less than one, since fractions of one are not allowed. However, this procedure allows numbers up to 65535 to be represented. For example, given a frequency of 7692 Hz, the smallest power of four that can be divided into this frequency value and still retain a fraction is $4^7=16384$. Since the exponent of the power of four is stored in a "less one" format, the value of the exponent stored in the upper 3 bits of the floating point number is six. The mantissa value is the frequency as a fraction of the power-of-four value stored in the exponent. It is a 13 bit integer that is a fraction of 8191 (1FFFh, where "h" stands for hexadecimal). In other words, dividing the value in the mantissa by 8191 and multiplying the answer by four raised to the exponent plus one power will result in the original frequency. Thus, for the example shown above, the fractional mantissa would be:

$$\frac{7692}{16384}=.4694824$$

This fractional mantissa would be stored in the 13 available bits as 3845 decimal or 0F05h. Therefore, the final pseudo-floating point value produced for a frequency of 7692 Hz would be:

$$1100111100000101=CF05$$

Figure 8N:
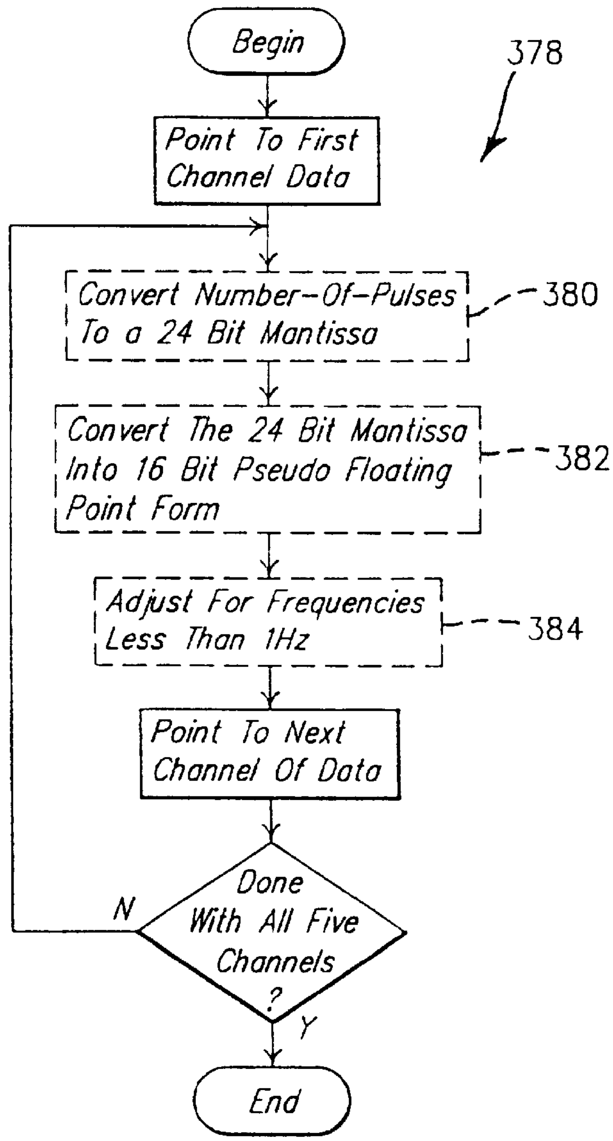
Figure 8Q:
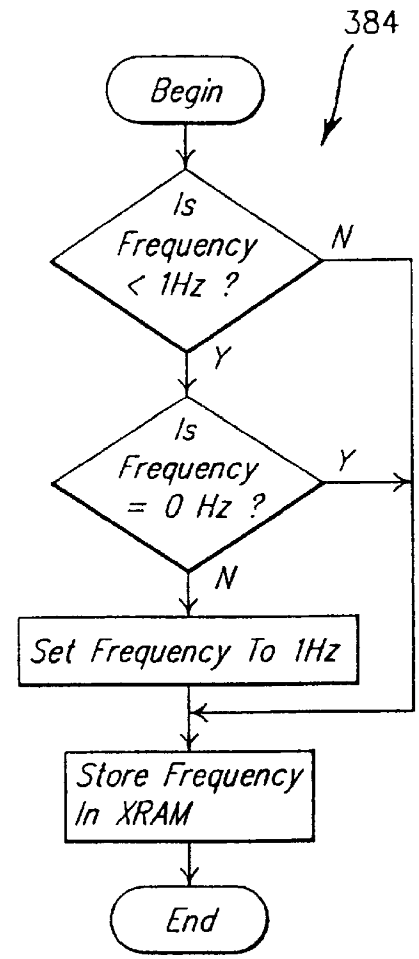
Figure 80:
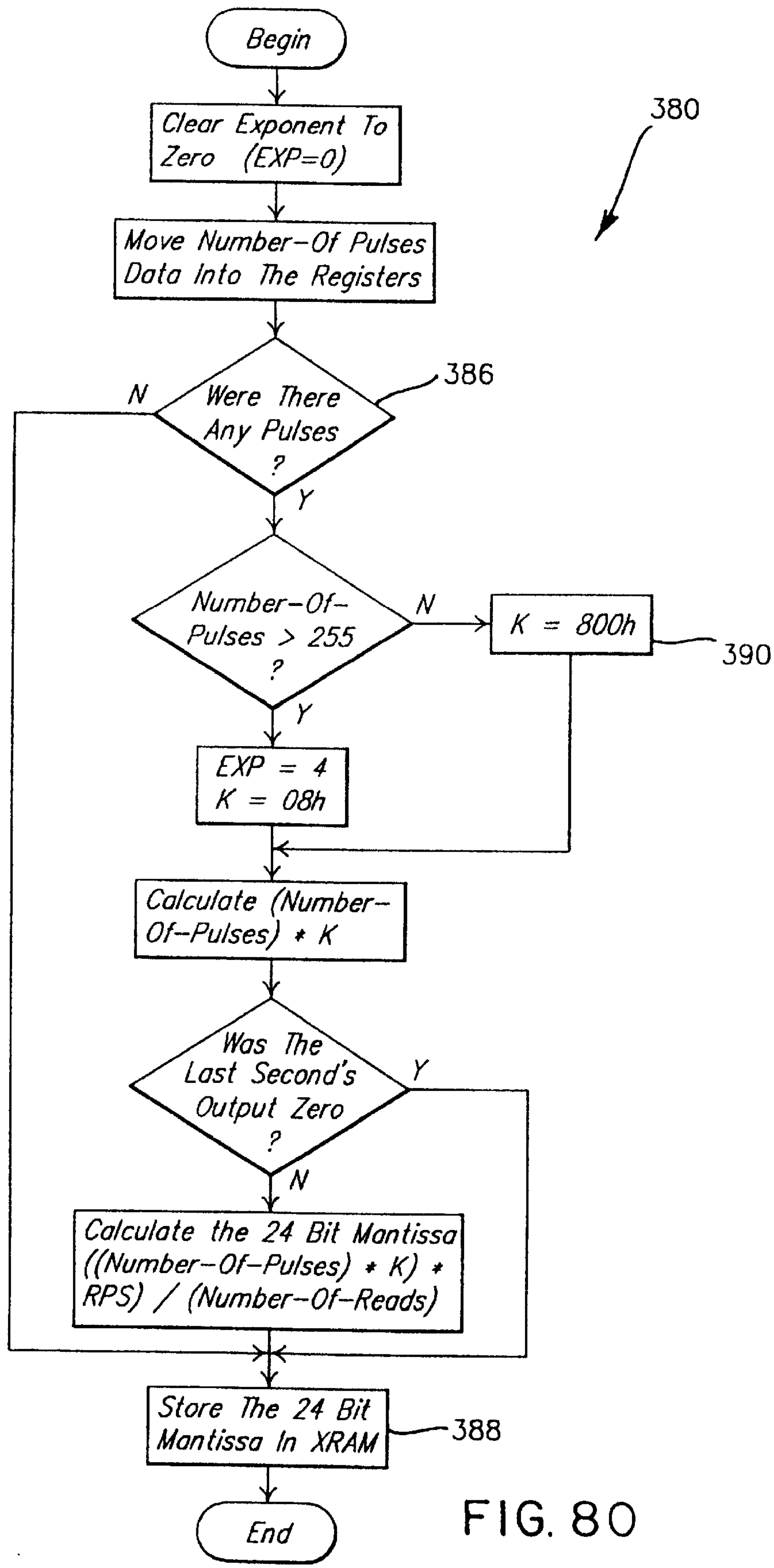
Figure 8P:
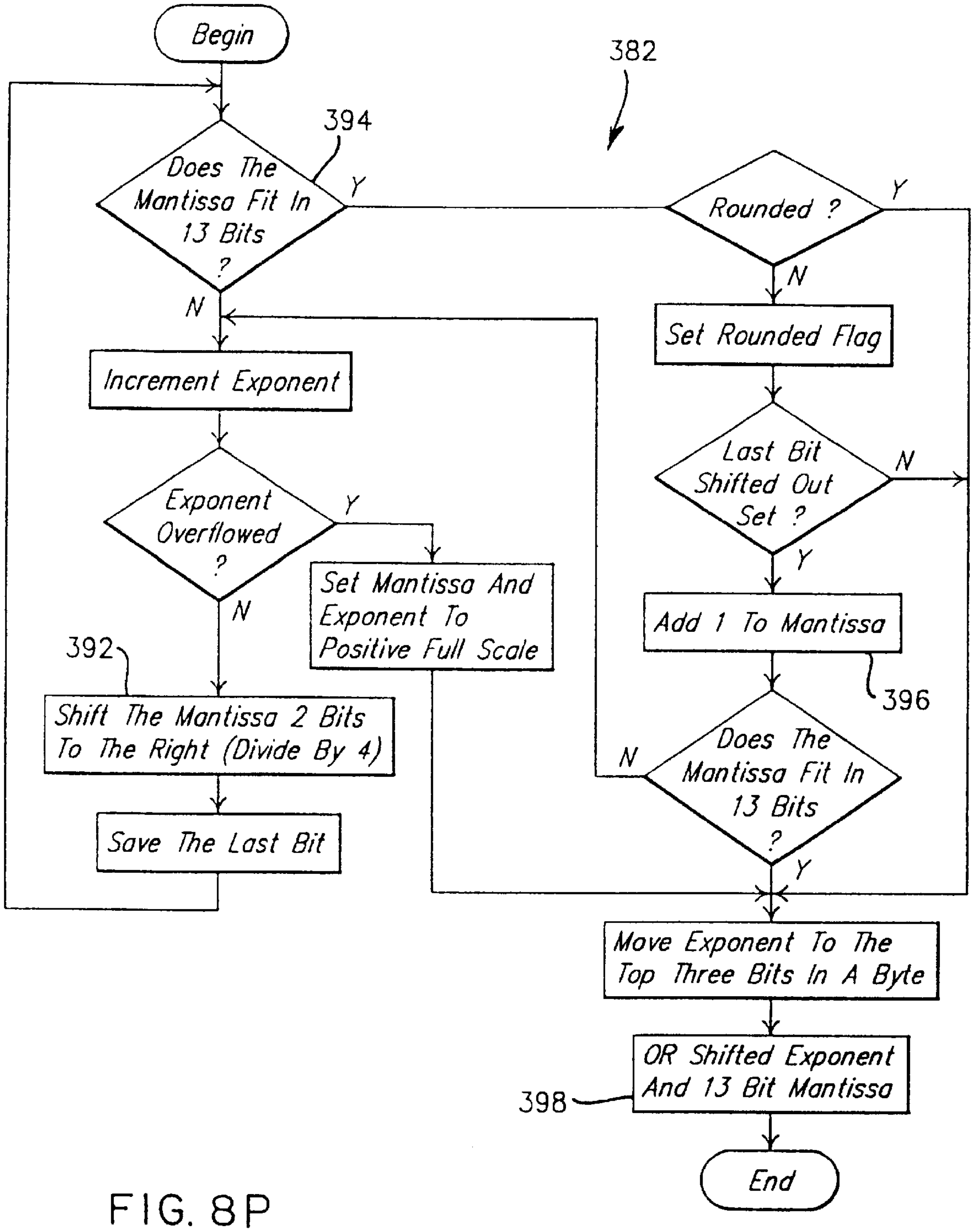

An overview of this pseudo-floating point conversion process is shown in FIG. 8N. In this regard, FIG. 8O provides a detailed flow chart of the block 380 for converting number of pulses data to a 24 bit mantissa. Similarly, FIG. 8P provides a detailed flow chart of the block 382 for converting the 24 bit mantissa to the 16 bit pseudo-floating point form. Finally, FIG. 8Q illustrates a flow chart of the block 384 for making an adjustment when the frequency value is less than 1 Hz.

With respect to FIG. 8O, the following should be noted. If there were not any pulses (block 386), then the 24 bit frequency mantissa value is stored as zero (block 388). If the number of pulses (i.e., Total Pulses) is less than 255, than the exponent value "EXP" is set to zero, and the constant "K" is set to 800h (block 390). The variable "RPS" stands for Reads Per Second, and this is the number of interrupts that occur every second (i.e., 1999 dec). The constants 800h and 08h are necessary to slide the 24 bit answer to the proper position so that no resolution is lost when doing the conversion to the 16 bit pseudo-floating point value. These constants will slide the value of 1 out of the 12th bit position where it belongs in the 16 bit pseudo-floating point value. The use of these constants also has the added advantage of allowing greater precision since more bits are calculated before they exceed the limits of the divide routine.

As illustrated in the flow chart 382 of FIG. 8P, the conversion to the pseudo-floating point value is accomplished by polling the 14th and higher bits of the 24 bit result. If any of them are not zero, the result is shifted to the right by two places (i.e., divided by four), and the exponent is increased by one (block 392). This shifting process is continued until bits 14, 15 and 16 are zero. Once the result is reduced to 13 bits (block 394), the final bit shifted off is rounded back into the 13 bits. When the bit is one, a one is added to the 13 bit mantissa (block 396). This reduces the error of the pseudo-floating point number to 0.025%. Finally, the exponent is ORed into the upper 3 bits (16, 15, 14) of the 16 bit frequency value (block 398). If the final result is greater than 65535, the output is forced to positive full value, 65535. If the final result is less than one, the output is forced to the representation of one, as indicated by the flow chart 384 of FIG. 8Q. The process control computer 14 may then average the pulses over many seconds in order to obtain a true frequency value.

Figure 9A:
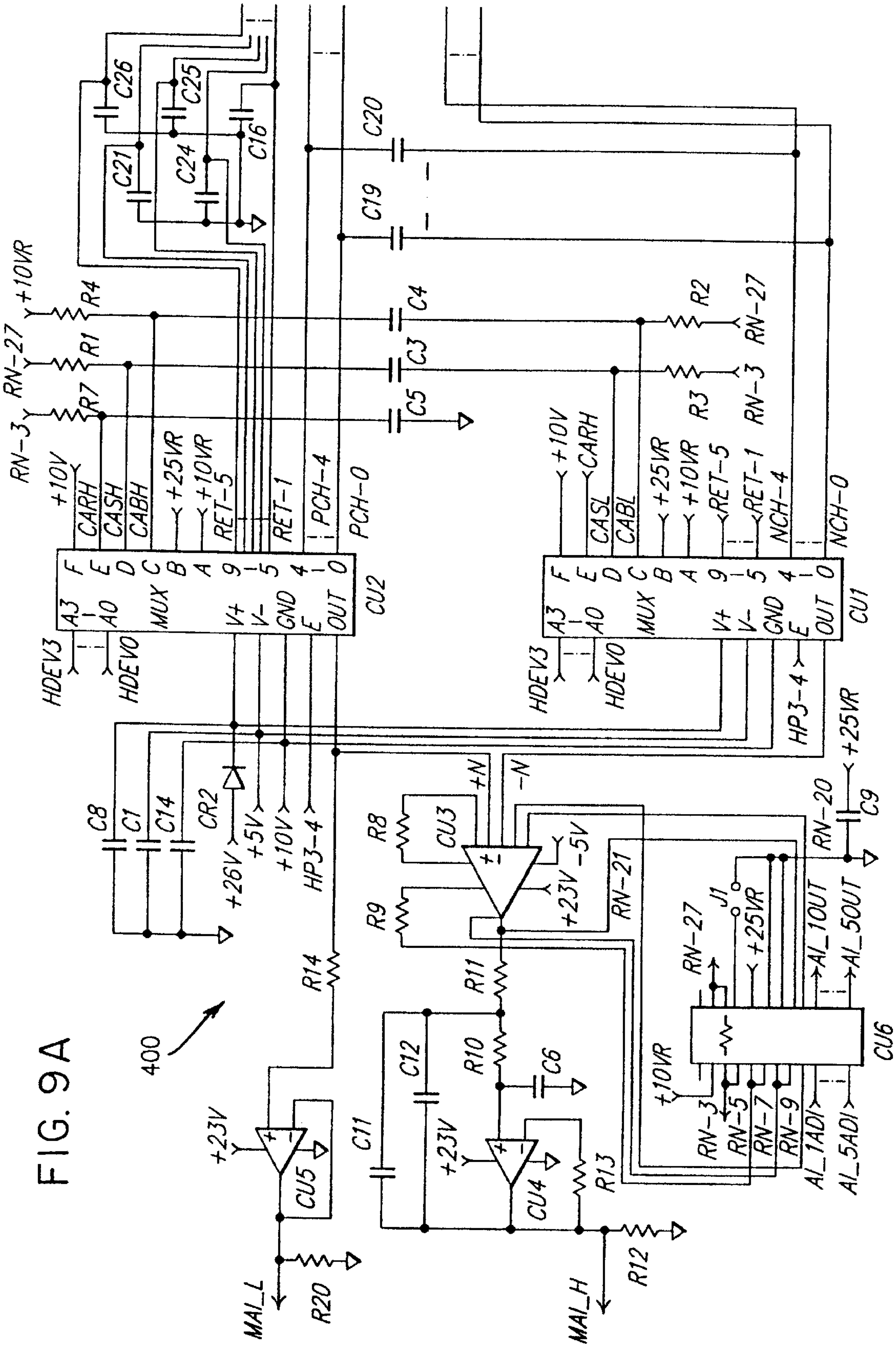
FIGS. 9A–9D comprise a schematic diagram for resistance measurement circuit according to the present invention.
Figure 9B:
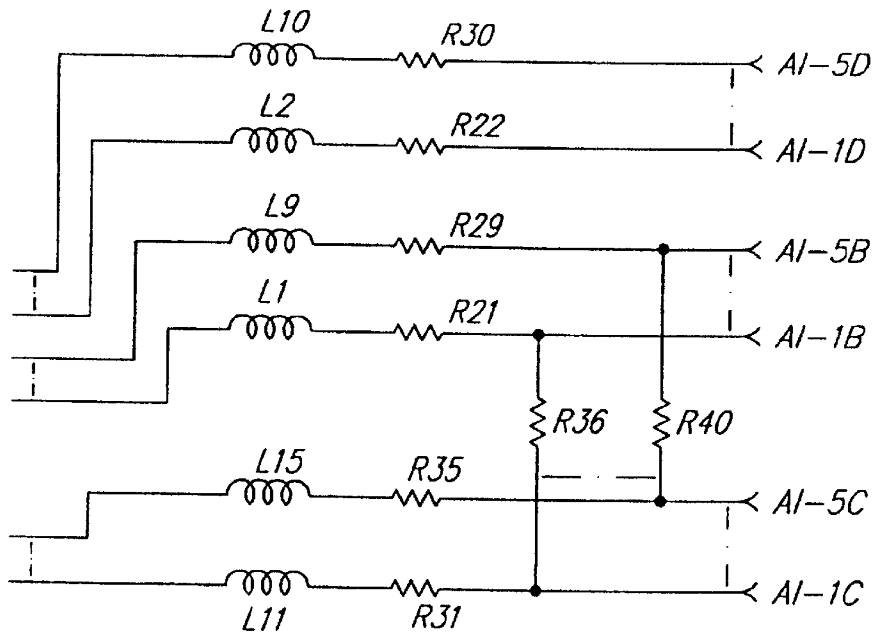
Figure 9C:
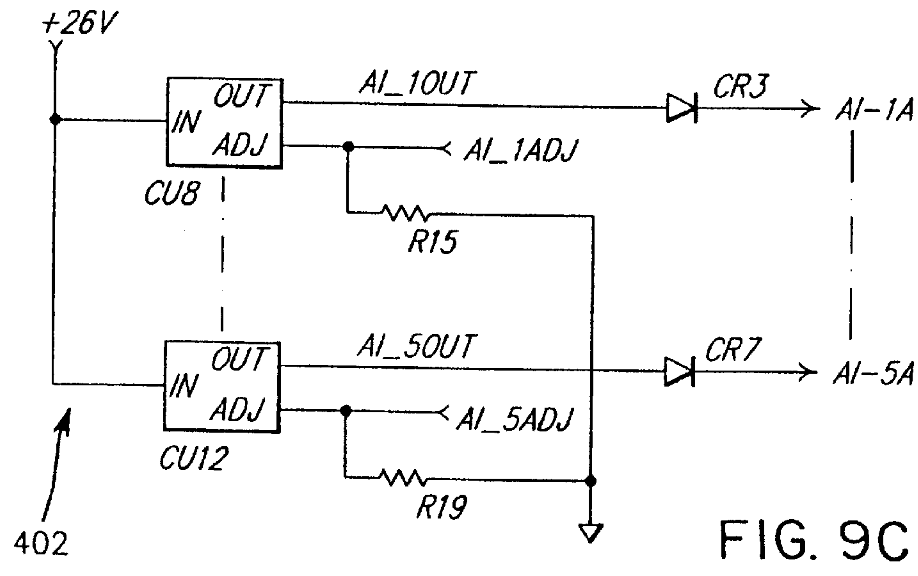
Figure 9D:
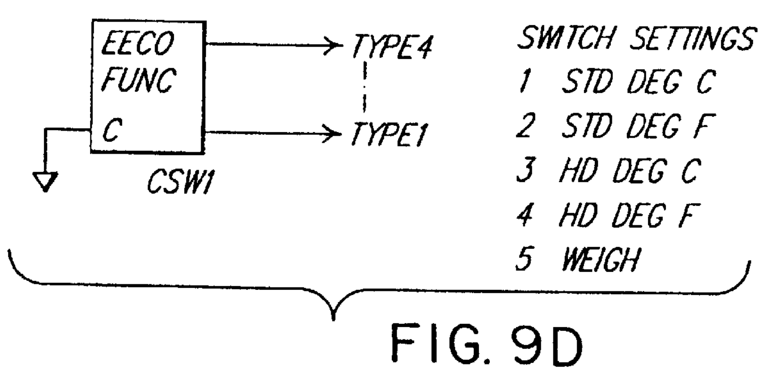

Referring to FIGS. 9A–9D, a schematic diagram for a multi-functional bridge circuit 400 according to the present invention is shown. The bridge circuit 400 may be used to measure 5 individual temperature or weight values. Specifically, the bridge circuit 400 is designed to accept standard platinum resistance temperature devices "RTDs" or heavy duty RTD's when the circuit is placed in the temperature measuring configuration using the switch "CSW1" of FIG. 9D. Additionally, when the bridge circuit 400 is placed in the weight measuring configuration, the circuit will accept the wire terminations of a weight cell (e.g., A–D excitation, and B–C mv input with B positive). As indicated in FIG. 9D, the switch setting also permits the bridge circuit 400 to inform the controller 100 that the temperature should be recorded in a Celsius or Fahrenheit format.

FIG. 9C shows a voltage source circuit 402 for providing electrical power to the temperature/weight transducers. FIG. 9B shows the multiple-wire input signal filtering provided to the bridge circuit for each of these transducers. As shown in FIG. 9A, these input signals are directed to multiplexors (506A) "CU1–CU2". The output signal from multiplexor CU2 is coupled to an operational amplifier (3140A) "CU5", which is shown to be in a voltage follower configuration. The output signal "MAI-L" from the operational amplifier CU5 is transmitted to the main multiplexor U11 of controller 100.

The output signal from the multiplexor CU2 also provides one input to the differential amplifier circuit (AD521) "CU3". The other input to the differential amplifier circuit CU3 is received from the multiplexor CU1. The output from the differential amplifier CU3 is amplified via operational amplifier (3140A) CU4 and directed to the main multiplexor U11 of controller 100 as signal "MAI-H". FIG. 8A also shows a precision resistor assembly (S2CH) "CU6", which is comprised of a set of resistors used for calibration and gain purposes.

Figure 10A:
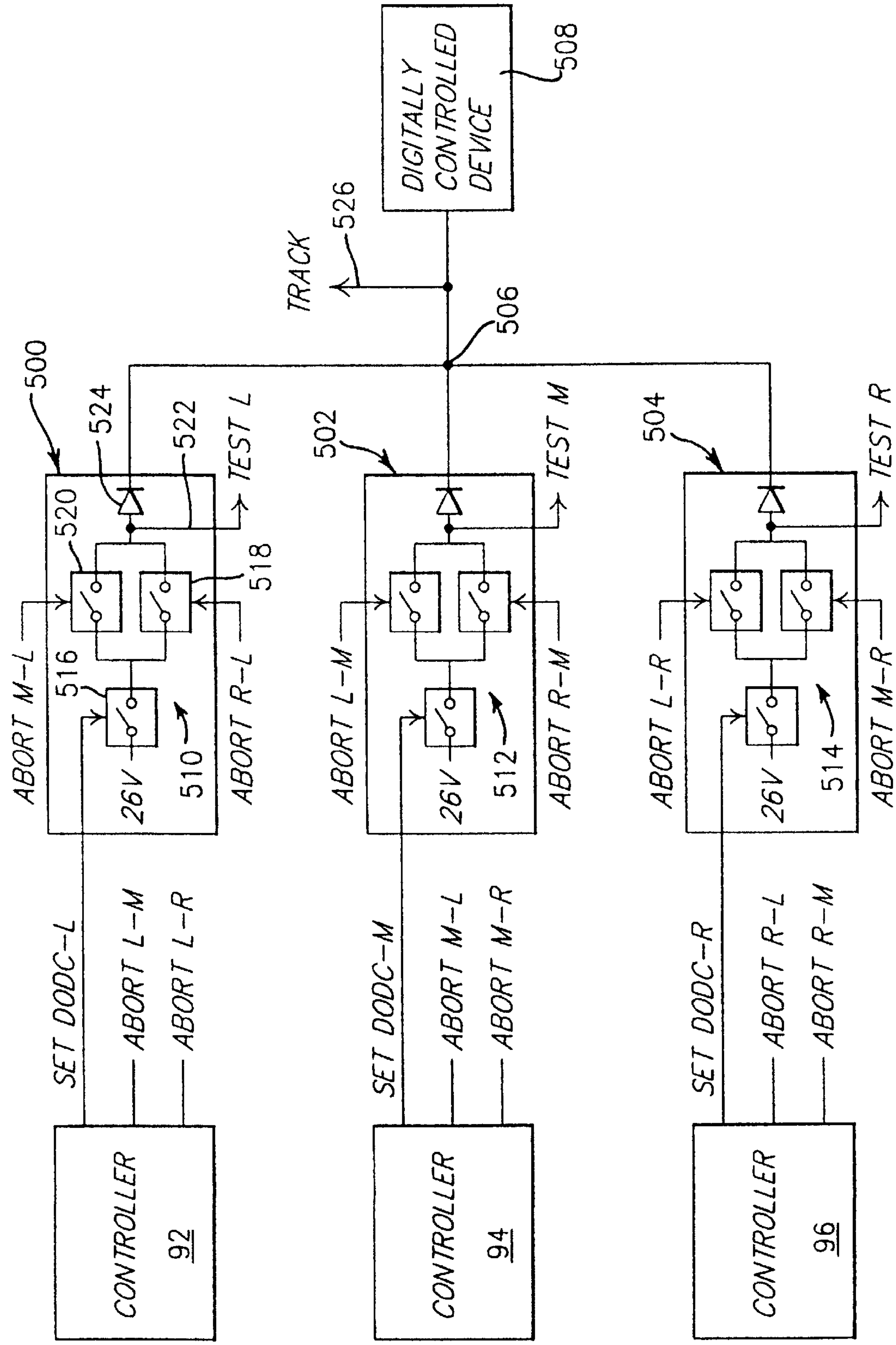
FIG. 10A is a block diagram of a portion of the triply redundant field computer which particularly illustrates the abort circuits for the digital output signals.

Referring to FIG. 10A, a simplified block diagram of a portion of the triply redundant field computer is shown to particularly illustrate the abort circuits for the digital output signals. In this regard, a set of abort circuits are located on each of the digital output circuits 500–504. As should be appreciated from FIG. 10A, each of the controllers 92–96 is provided with its own digital output circuit. Accordingly, it should be understood that a field computer unit 12 contains a set of three redundant digital output circuits 500–504 whenever digital output signals are to be sent to the field. While each of these redundant digital output circuits preferably has a plurality of output signal channels (e.g., 1–10 individual output signal channels), only one such channel is shown in FIG. 10A for illustration purposes.

Each of the controllers 92–96 transmits a "SET DODC" signal to their respective digital output circuits 500–504 for each digital output signal to be sent to the field. Each of these SET DODC signals represents the result of an arbitration process which is individually performed at each of the controllers 92–96. As indicated above, the digital output value signals received by the field computer unit 12 from the process control computers 14*a*–14*b* are shared with each of the redundant controllers 92–96. Assuming that the transmission of any particular digital output signal value (i.e., a High or Low value) has been completely successful and all of the controllers 92–96 have correctly processed this value, then the "SET DODC-L", "SET DODC-M" and "SET DODC-R" signals will be identical. The "L", "M" and "R" suffix is simply used herein to indicate that the signal originated from the Left, Middle or Right controller. However, there may be instances when these SET DODC signals are not the same. Additionally, there may be instances when it is desirable for the digital output signal from a particular digital output circuit to be prevented from being transmitted to the field.

As indicated by FIG. 10A, the output conductors from each of the digital output circuits 500–504 are tied together at a common node 506, which is connected to a digitally controlled device 508 (e.g., a solenoid). This means that if the output signal from any one of the digital output circuits 500–504 is High, then the device 508 could receive a High input signal, even though the other two digital output circuits are generating Low output signals. However, such a situation is prevented from occurring in accordance with the present invention through the combined use of redundant abort circuits 510–514.

As shown in FIG. 10A, each of the abort circuits 510–514 includes a set of three electronically controlled switches 516–520 (e.g., MOSFET devices). The switch 516 is controlled by the SET DODC signal. However, even though the switch 516 may be closed, a High output signal (e.g., 26 volts) cannot be transmitted to the device 508 unless at least one of the switches 518–520 is also closed. The switches 518–520 are controlled from the "ABORT" signals generated by the other two neighboring controllers. For example, in the case of the abort circuit 510, the switch 518 is controlled by the "ABORT R-L" signal from controller 96, and the switch 520 is controlled by the "ABORT M-L" signal from the controller 94. As illustrated in FIG. 6C, these ABORT signals are determined individually by the microprocessor U40 of each controller.

Thus, it should be appreciated that in order for the controller 92 to transmit a High SET DODC-L signal to the field, it needs the concurrence or agreement of either the controller 94 (through a High ABORT M-L signal) or the controller 96 (through a High ABORT R-L signal). In this way, the software arbitration decisions by the controllers 92–96 are enforced in the digital output circuits 500–504 through the abort circuits 510–514. If the controllers 94–96 determine that a particular digital output signal from controller 92 should be prevented from being transmitted to the field, then each of the controllers 94–96 will generate a Low ABORT signal for that particular digital output signal, which will open the abort switches 518–520.

Each of the digital output circuits 500–504 includes a "TEST" line, such as the TEST line 522 for digital output circuit 500. A diode, such as diode 524, is also included to isolate the digital output circuit (and hence the TEST line) from the common voltage seen by the device 508. A TRACK feedback line 526 is also provided in order to permit each of the controllers 92–96 to see the actual digital state presented as an input to the device 508. As will be more fully described in connection with FIGS. 11A–11C, the digital output circuits 500–504 are designed to facilitate non-intrusive testing. The method of non-intrusively testing the digital output circuits 500–504 will be discussed in connection with FIGS. 19A–19M.

Figure 10B:
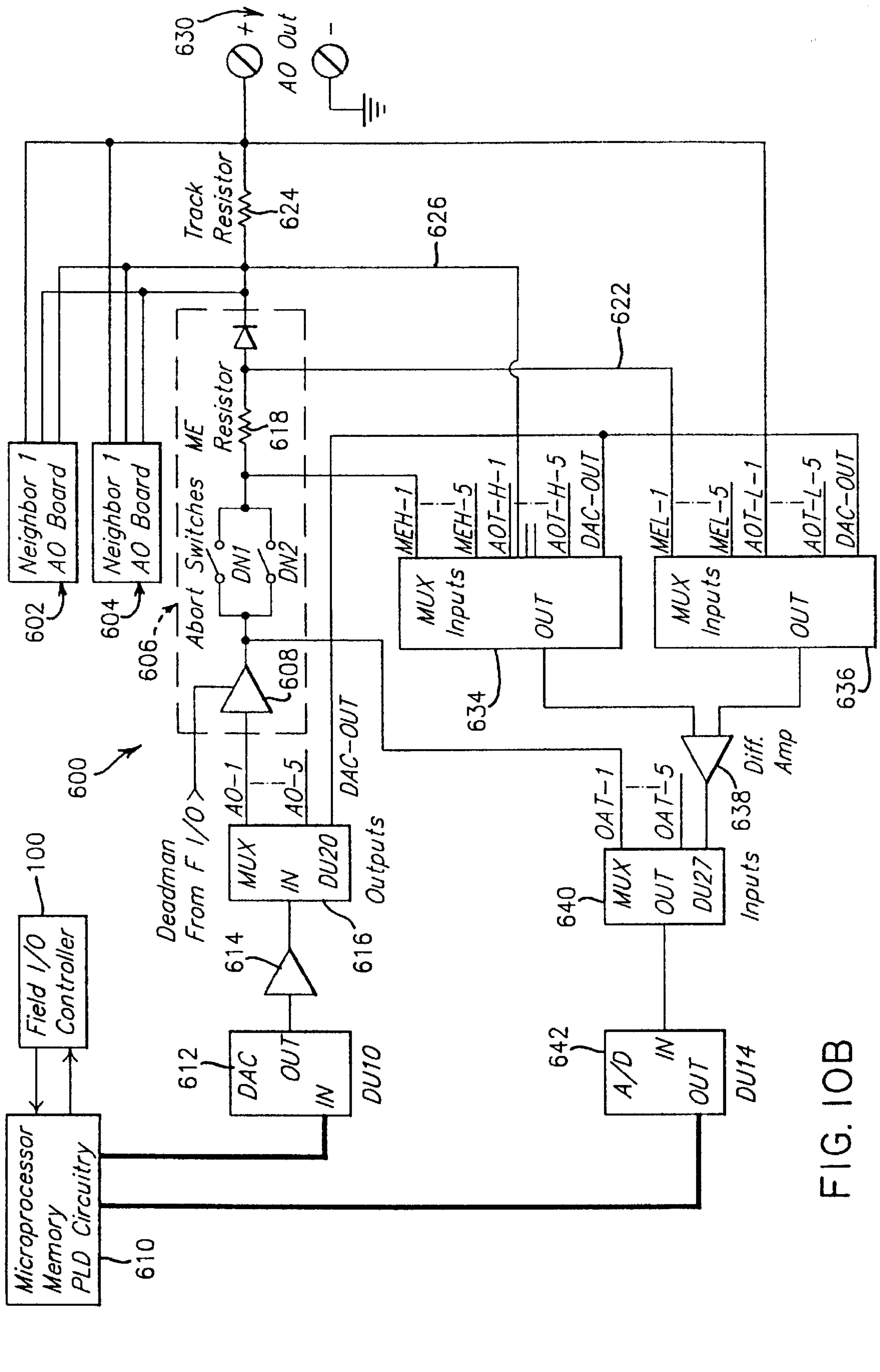
FIG. 10B is a similar block diagram which particularly illustrates the abort circuits for the analog output signals.

Referring to FIG. 10B, a block diagram is shown of the redundant analog output circuits 600–604 according to the present invention. In this regard, a detailed block diagram is presented for the analog output circuit 600, while a single block is used to illustrate the identical analog output circuits 602–604 for neighboring controllers. Due to the detail presented in the block diagram for analog output circuit 600, the discussion of the schematic diagram for this circuit, as shown in FIGS. 12A–12G may be somewhat abbreviated. In any event, FIG. 10B illustrates that the analog output circuit 600 includes an abort circuit 606 for each analog output signal channel contained in the analog output circuit (e.g., 5 independent channels). The abort circuit 606 is similar to the abort circuit 510 discussed above, insofar as the abort switches DN1–DN2 correspond generally in placement to the switches 520–518. However, an amplifier is used in the place of the switch 516, as an analog signal rather than a digital signal is to be transmitted to the field. Additionally, opto-isolators are used as the abort switches instead of MOSFETs. Accordingly, it should be appreciated that each of the redundant analog output circuits 600–604 are provided with an abort circuit for the same reason that an abort circuit is provided in the digital output circuits 500–504.

The analog output circuit 600 receives instructions from its controller, which is generically indicated in FIG. 10B as controller 100. In this regard, the analog output circuit 600 receives a desired output value for each channel from its controller, and the analog output circuit is left by the controller to determine how this output value is to be achieved. For this reason and for the analog output circuit's ability to conduct non-intrusive testing on its own, the analog output circuit is considered to be a "smart" circuit that frees the controller 100 to perform other needed functions in the meantime. In order to achieve these goals, the analog output circuit 600 is provided with a microprocessor and the necessary support circuitry to operate with relative independence from the controller 100, as indicated by block 610.

The capacity for intelligent independence in accordance with the present invention is also important from the standpoint of determining how a common field device should be driven from three concurrently operating analog output circuits to a common output value. This is a particularly difficult problem where, as here, a rapid response to changing conditions is desired. In this regard, each of the analog output circuits 600–604 will be commanded by their respective controllers 92–96 to achieve a desired output value on each channel. Accordingly, each of the analog output circuits 600–604 will want to drive the field device in response to a goal output value independently given to them by their own controller once each process control cycle (e.g., one second). Thus, an unstable output could result, since it is also desired that the analog output circuits operate with relative independence from each other during the process control cycle for fault tolerance purposes. However, in accordance with the present invention, intelligent, yet independent methods of controlling the output are provided for each of the analog output circuits through the microcomputer control circuit 610. In accordance with these methods, not only is output level sharing optimally achieved, but each of the analog output circuits is able to respond at high speed to changing conditions.

The microprocessor for the analog output circuit digitally transmits multiplexed output signal voltage values for each of the actively operating output channels to a digital to analog converter circuit 612. The analog output values from the digital to analog converter circuit 612 are then sequentially processed through an amplifier circuit 614, and forwarded to a multiplexor circuit 616. The multiplexor circuit 616 then directs the amplified analog output signals to the appropriate abort circuits, such as the abort circuit 606 for the "AO-1" signal.

As in the case of the abort circuits 510–514 for the digital output circuits 500–504, each of the abort circuits for the analog output circuits include a provision for creating a feedback signal. With respect to the abort circuit 606, this feedback provision is shown to be comprised of a resistor 618 and a pair of signal lines 620–622. The signal line 620 provides a high feedback signal "MEH-1" on the upstream side of the resistor 618, and the signal line 622 provides a low feedback signal "MEL-1" on the downstream side of the resistor 618. Additionally, a Track resistor 624 and a pair of signal lines 626–628 are provided by the field computer unit 12 in order to permit each of the analog output circuits 600–604 to see the actual analog output signal value being received at an analog controlled output device 630. The signal line 626 provides a high track signal "AOT-H-1" on the upstream side of the Track resistor 624, and the signal line 628 provides a low track signal "AOT-L-1" on the downstream side of the resistor 624. Additionally, the abort circuit 606 is also shown to include a signal line 632 which provides a feedback signal "OAT-1" immediately following the amplifier 608. In this way, the operability of the analog output circuit 600 up to this point may be tested with both of the abort switches DN1–DN2 in an open condition in accordance with the non-intrusive testing method to be described below.

As illustrated in FIG. 10B, the analog output circuit 600 includes a pair of multiplexor circuits 634–636 which feed a differential amplifier 638. The multiplexor circuits 634–636 operate under the address instructions from the microprocessor of the analog output circuit to successively pair corresponding High/Low signals as an input to the differential amplifier 638 to produce a signal indicative of the voltage drop across the feedback and track resistors, which is directly proportional to the output being sent to the field. Thus, for example, the MEH-1 signal would be presented at the output of the multiplexor 634 at the same time that the MEL-1 signal is presented at the output of the multiplexor 636. After an amplification step, a final multiplexor 640 is then employed to successively transmit these differential voltage signals, the "OAT-1 . . . OAT-5" signals, or the mulitplexor outputs referenced to ground to an analog to digital converter circuit 642. The analog to digital converter circuit 642 is in turn connected to the microprocessor block 610 for analysis.

The analog output circuit 600 is preferably a 5 channel (0–22 ma) circuit device which is capable of testing it's outputs in such a way that the testing is non-intrusive to the field. The analog output circuit 600 is also designed to be a high speed device, so that if one of the three redundant analog output circuits 600–604 fails, then the other analog output circuits will pick up the additional load within a relatively short period of time (e.g., 80 msec.). The operation of the analog output circuit 600 may best be described as providing a proportional integral "PI" control loop, as the circuit responds to an output value (e.g., a setpoint) received from the controller 100. This output value is preferably a fraction or percentage of the maximum output capability (e.g., 22 ma). As mentioned above, the actual field output is measured by each of the redundant analog output circuits 600–604 across the Track resistor 624, which is located on the passive element board of the field computer unit 12. In order to filter out any noise that might appear on the Track signal, one fourth of the difference between the last Track value and this measurement is added to the last Track value. If the difference is greater than 8%, the old Track value is completely replaced in order to speed the system's response to large errors.

The software control loop of the analog output circuit 600 involves a comparison between the voltage across the Track resistor 624 and the desired output value. A fraction of the error between the desired output and measured Track values (up to one fourth) is then added to the desired digital to analog output value (i.e., the integral value), which is stored in the memory of the microprocessor for the analog output circuit 600. This enhanced value is then transmitted to the digital to analog converter circuit 612 and processed through the multiplexor 616 to the designated abort circuit (e.g., abort circuit 606). The analog output circuit 600 then determines its contribution to the total output provided to the field device 630 by measuring the voltage drop across the "ME" feedback resistor 618. This is done to assure that the analog output circuit 600 is contributing 100% of the output to the field device 630 during the non-intrusive testing method described below. The analog output circuit 600 also compares the OAT signal to the output of the digital to analog converter circuit 616 (via its "DAC-OUT" signal shown in FIG. 10B), to determine whether or not the operational amplifier 608 is operating properly. For example, if too much power is being transmitted to the field device 630, and this channel's output should be zero, but the OAT measurement says that it is not zero, the analog output circuit 600 disables this channel and flags an "OAT<>DAC" signal to the controller 100.

The analog output circuit 600 also provides for the automated application of abort switches (e.g., abort switches DN1–DN2) in the event of a failure which sends too much power to the field. The primary path for opening an abort switch is a zero output ensurance mechanism which forces the abort switches open for a channel when that channel is commanded to have a zero output. The secondary path for opening the abort switches is derived from a request of one or more of the analog output circuits 600–604. For example, in the event that a particular output channel for an analog output circuit is 2% too high, according to the analog output circuit's own analysis, then this analog output circuit will request its controller to have the offending output channel be aborted by opening either of the abort switches DN1–DN2. However, as these abort switches are responsive to the neighboring controllers, an exchange of abort request information is required at the controller level. In accordance with one form of the present invention, the exchange of abort requests between each of the controllers 92–96 takes place during the next output communication cycle (e.g., in the next process control cycle). If any two controllers 92–96 agree that a particular channel for one of the analog output circuits 600–604 should be disabled, then these controllers will generate the necessary signals to open both of the abort switches DN1–DN2 on the offending analog output circuit. If an analog output circuit requests an abort on a particular output channel, and neither of the neighboring controllers have requested an abort on the same channel, then an abort disagreement has occurred. These disagreements are preferably handled by counting the number of sequential disagreements on a particular channel and flagging an error to the process control computers 14*a*–14*b* when the count exceeds a predetermined value (e.g., 32 decimal, 20 hex). When there is no abort disagreement on a particular channel, the counter for that channel is zeroed. It should be appreciated that the secondary path for opening the abort switches enforces the arbitration decisions made by each of the controllers 100. Accordingly, it is not necessary for any of the three analog output circuits 600–604 to know the arbitrated output values that were sent to the other analog output circuits by neighboring controllers.

Additionally, if an analog output circuit is determined to be dead, the neighboring controllers will open the abort switches for all of the channels on the dead analog output circuit to isolate this circuit from the field. In this regard, an analog output circuit will be considered dead if the smart analog output board is not communicating, if a memory test of the circuit has failed, if a test of the digital to analog converter circuit 612 has failed, or if a test of the analog to digital converter circuit 642 has failed. The controller 100 responsible for the "dead" analog output circuit will not open the abort switches of the neighboring analog output circuits due to a loss of its own analog output circuit. Rather, this controller will examine the controller to controller communications to determine if the opening of these other abort switches is warranted. This will permit a 3-2-1 failure scenario, rather than a 3-2-0 failure procedure. Accordingly, in the event that only one working analog output circuit remains, then no aborts on the operating channels for that analog output circuit will be opened, unless an output is commanded to zero.

In the event of a controller to controller communication failure, the abort switches for the analog output circuit corresponding to the controller 100 that did not communicate will not be opened. This procedure permits the fail SAFE/LAST mechanism described below to work properly. The two remaining controllers that are able to communicate will then act as a dual redundant field computer unit, where only one abort request is needed to open an abort circuit. If both neighboring controllers fail to communicate, then an abort request will not be serviced, and the fail SAFE/LAST selections in software arbitration will control the outputs from the field computer unit for all of the analog outputs.

Once a pair of abort switches have been opened due to an excessively high output, it is preferred that these abort switches be closed only after a replacement of the analog output circuit is sensed or the controller 100 for that analog output circuit is restarted. The exception to this procedure occurs in the case where there is a triple abort request for a particular output channel. In such an occurrence, all of the abort switches for this channel are reclosed to prevent a total loss of power to the field.

From the above discussion, it should be appreciated that a failure associated with one or more output channels may take two process control cycles to open the appropriate abort switches DN1–DN2. Thus, for example, where an overall process cycle of one second is provided, then a one second period will be used to communicate an abort request to the controllers from the analog output circuits, and then another one second period will be used to permit controller to controller communication. Nevertheless, an abort on zero output to the field will take place in the same cycle that the controllers 92–96 receive a zero output value from the process control computers 14*a*–14*b*.

Figures 11A, 11C:
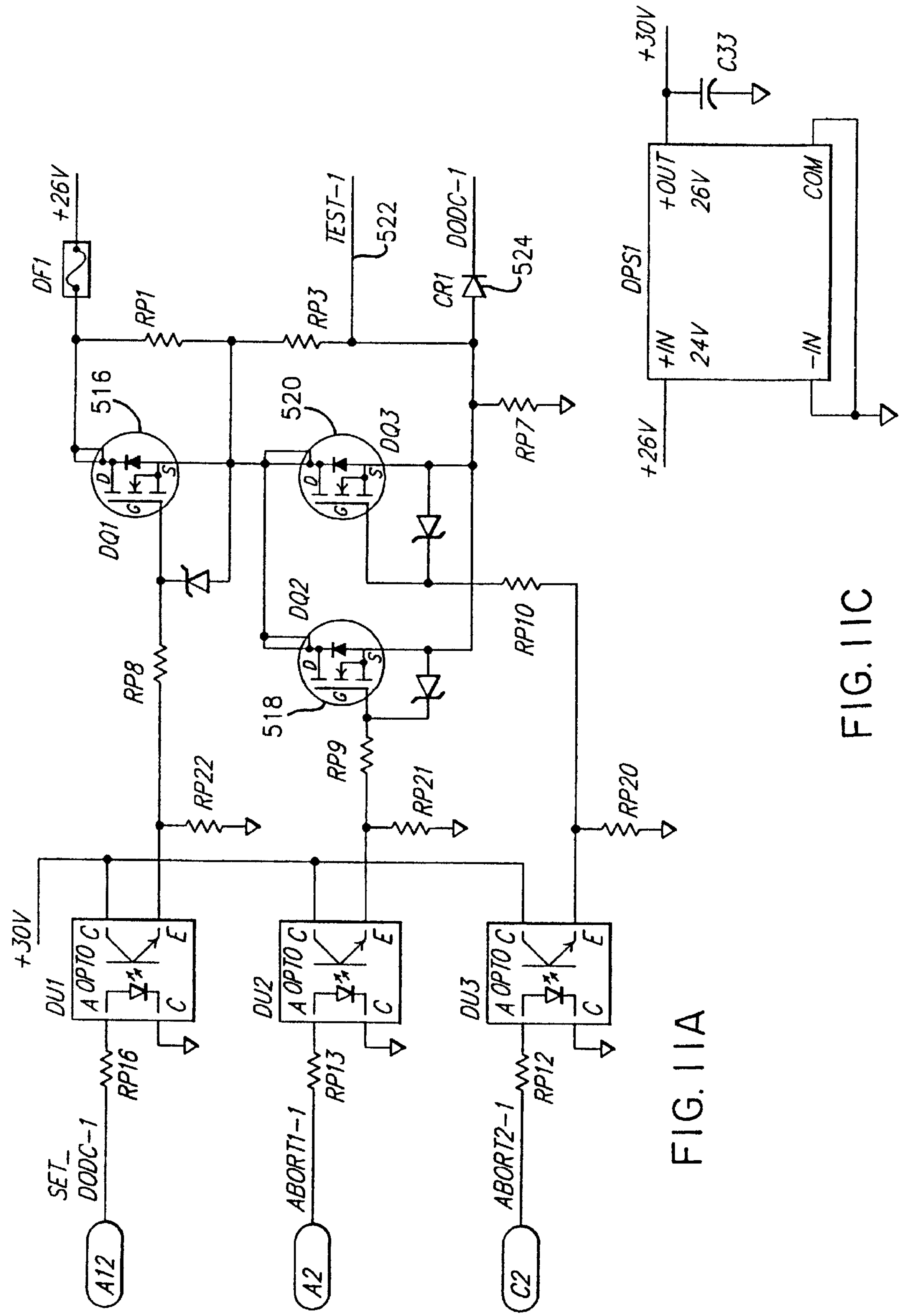
FIGS. 11A–11C comprise a schematic diagram for a digital output circuit capable of non-intrusive testing.
Figure 11B:
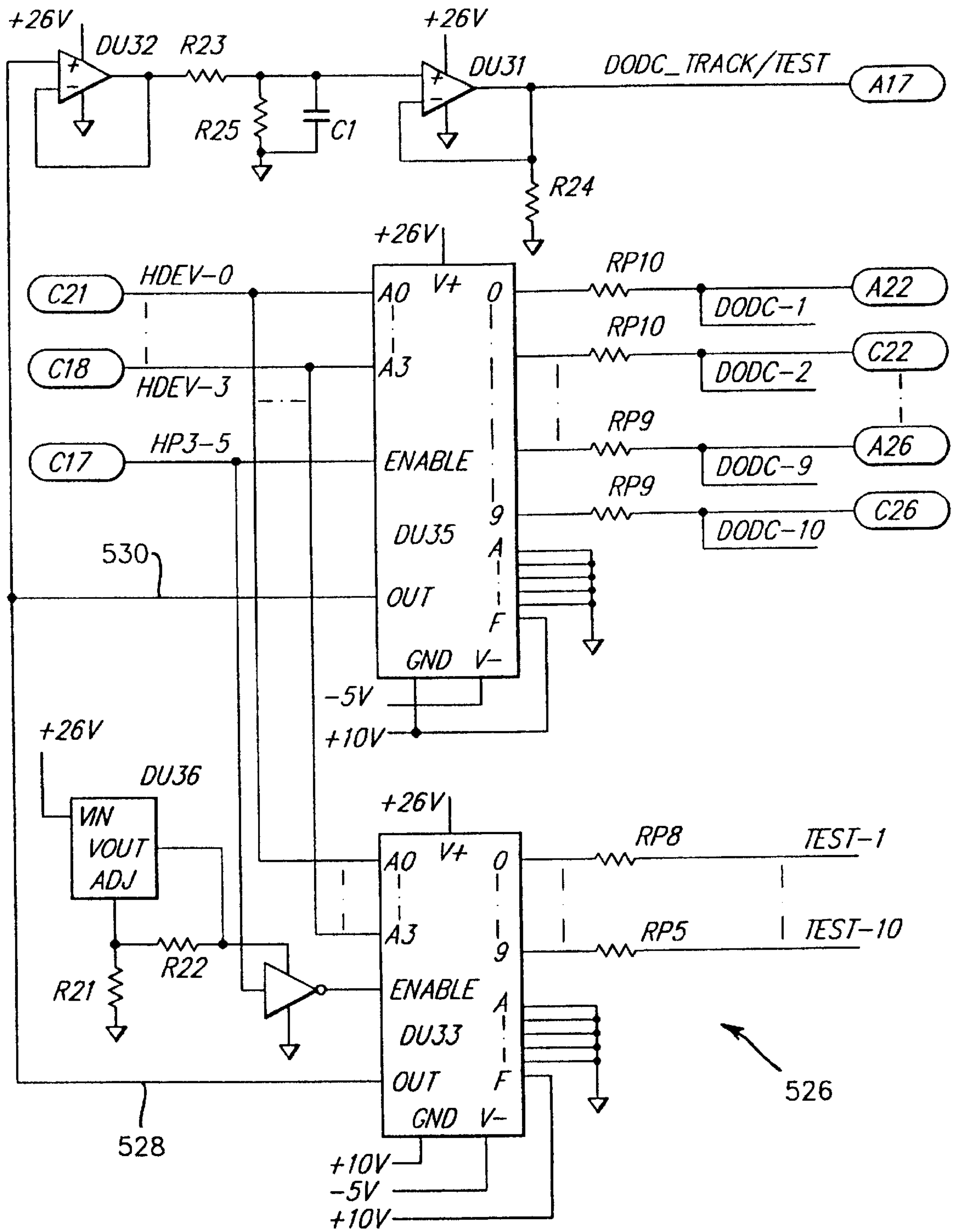

Referring to FIGS. 11A–11C, a schematic diagram for the digital output circuits 500–504 is shown. FIG. 11A provides a schematic diagram of the abort circuit 510, which was diagrammatically illustrated in FIG. 10A. Again, it should be noted that such an abort circuit is provided for each digital output channel of the field computer unit 12. In other words, in a field computer unit having ten digital output channels, a set of ten abort circuits would be provided for each of the three controllers 92–96, thereby providing a total of thirty abort circuits.

FIG. 11A shows that the switches 516–520 are each comprised of a MOSPET (IRFD120) transistor. Each of these transistors receive their gate signals from an opto-isolator, such as opto-isolator (PS2603) DU1 for transistor 516. The "SET_DODC-1" input signal for the opto-isolator DU1 generally corresponds to the "SET DODC-L" signal of FIG. 10A. Similarly, the "ABORT1-1" input signal corresponds to the "ABORT R-L" of FIG. 10A, and the "ABORT2-1" input signal corresponds to the "ABORT M-L" signal of FIG. 10A. The parallel connection of transistors 518–520 in FIG. 10A is demonstrated in FIG. 11A by the fact that the drain and source terminals of these two transistors are tied together. The source terminal of transistor 516 is also connected to the drain terminals of the transistors 518–520, and the drain terminal of transistor 516 is connected to the +26 volt power supply "DPS1" (shown in FIG. 11C) through fuse "DF1". In other words, the transistor 516 is connected in series with both transistors 518 and 520. Pull down resistor (100K) RP7 and diode (1N459A) 524 are connected to the source terminals of transistors 518–520 to provide the output line labeled "DODC-1" on the downstream side of diode 524. Thus, it should be appreciated that when transistor 516 is turned on by a High SET_DODC-1 signal and at least one of the transistors 518–520 are turned on by their respective gate signals, then the conductive states of these transistors will permit current to flow from the +26 volt power supply to the DODC-1 output line. Since the conduction of the transistor 516 is required to transmit electrical power to the field device 508, this transistor may be referred to as a power switch. In contrast, the transistors 518–520 may be referred to as abort switches, as these transistors operate in combination to inhibit or prevent electrical power from being transmitted to the field device when the power switch is closed (i.e., the transistor 516 is in a conductive or On state).

As indicated above, the digital output circuits 500–504 are designed to enable non-intrusive testing to be performed. In this regard, it should be noted that the abort circuit 510 includes a resistor (10K) RP1 connected in parallel across the drain and source terminals of the transistor 516, and a resistor (10K) RP3 connected in parallel across the drain and source terminals of the transistor 520. Additionally, FIG. 11A shows that the TEST-1 line 522 is connected to the node or junction which is provided between the source terminals of the transistors 518–520, the pull down resistor RP7 and the anode of diode 524. Accordingly, it should be appreciated that the resistors RP1, RP3 and RP7 provide a voltage divider network which will enable the transistors 516–520 to be selectively actuated and the change in voltage detected via the TEST-1 line. For example, when the transistor 516 is turned on, the voltage on the TEST-1 line will rise, as the resistor RP1 is effectively short-circuited by this transistor. Similarly, when either of the transistors 518–520 are turned on, the voltage on the TEST-1 line will rise, as the resistor RP3 is effectively short-circuited by the conducting transistor. Nevertheless, substantial current is not permitted to flow through the DODC-1 line unless the transistor 516 and one of the transistors 518–520 are switched to a conductive state.

FIG. 11B shows a feedback circuit 526 for the digital output circuit 500. The feedback circuit 526 includes a pair of multiplexor circuits DU33 and DU35 which are addressed by the controller 100 through the address lines HDEV-0 . . . HDEV-3 and the enable line HP3-5. The TEST lines for each of the digital output channels are connected as input signals to the multiplexor DU33, while the DODC signals for each of these channels are connected as input signals to the multiplexor DU35. The output lines 528–530 from the multiplexors DU33 and DU35, respectively, are coupled together, and the multiplexed feedback signals on these output lines are then processed through a pair of operational amplifiers (3140A) DU32 and DU31 which are connected in series. Accordingly, it should be appreciated that each of the digital output circuits 500–504 provide a serially multiplexed stream of feedback signals to their respective controllers 92–96.

Figure 12A:
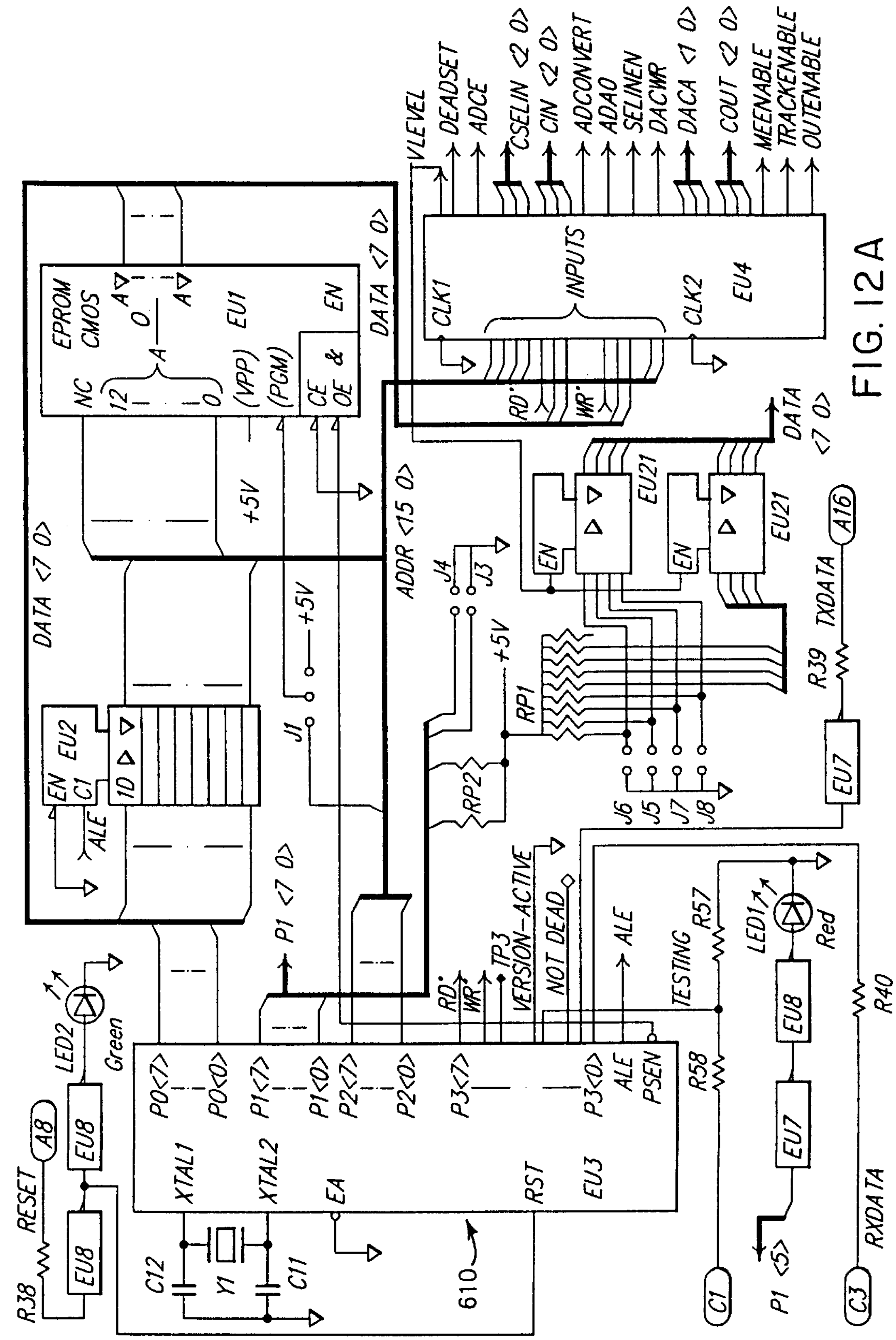
FIGS. 12A–12F comprise a schematic diagram for a smart analog output circuit according to the present invention.

Referring to FIGS. 12A–12F, a schematic diagram for the analog output circuits 600–604 is shown. FIG. 12A provides a schematic diagram of the microcomputer circuit shown as block 610 in FIG. 10B. The microcomputer circuit 610 includes a 16 MHZ microprocessor (80C31) EU3, a memory address latch circuit (HC573) EU2, an 8K×8 CMOS EPROM (57C64) EU1, and a programmable logic device (EP910) EU4. The microprocessor EU3 receives the output value for each of the analog output channels on the serial RXDATA line from the controller 100, and the microprocessor transmits status data to the controller on the serial TXDATA line. The EPROM EU1 is used to store the operating program for the analog output circuit 600. The PLD EU4 is used to generate various signals which control the functions of specific portions of the analog output circuit 600. For example, the "DACWR" and "DACA" signals from the PLD EU4 are transmitted to the digital to analog converter circuit 612 of FIG. 12B in order to cause the D/A converter to capture a digitally coded analog value on the data bus (DATA <7 0>) of the microprocessor EU3 and convert this coded value to a corresponding analog level.

The microcomputer circuit 610 also includes Green and Red LEDs to provide a visual indication of the health status of the analog output circuit 600 (sometimes referred to as the SAO board for "Smart Analog Output"). If the board is functioning properly, the Red LED will be OFF and the Green LED will be ON. However, the microprocessor of the controller will cause the Green LED to flash under certain conditions, such as when the communications between the analog output circuit 600 and its controller 100 have failed. Similarly, the Red LED may be caused to flash when the microprocessor circuit 610 is not functioning properly or it is trying to communicate with its controller 100. The Red LED will be turned ON under several possible conditions, such as if a non-intrusive test has failed, a channel on the SAO board has been aborted, or a track problem has been detected. Conversely, the Green LED will be turned OFF if a hardware component of the SAO board has failed or a failure of the controller 100 has occurred. Accordingly, it should be appreciated that these status LEDs are preferably put to multiple uses, so that a variety of different problems may be visually discerned during a field inspection from just two LEDs.

Figure 12B:
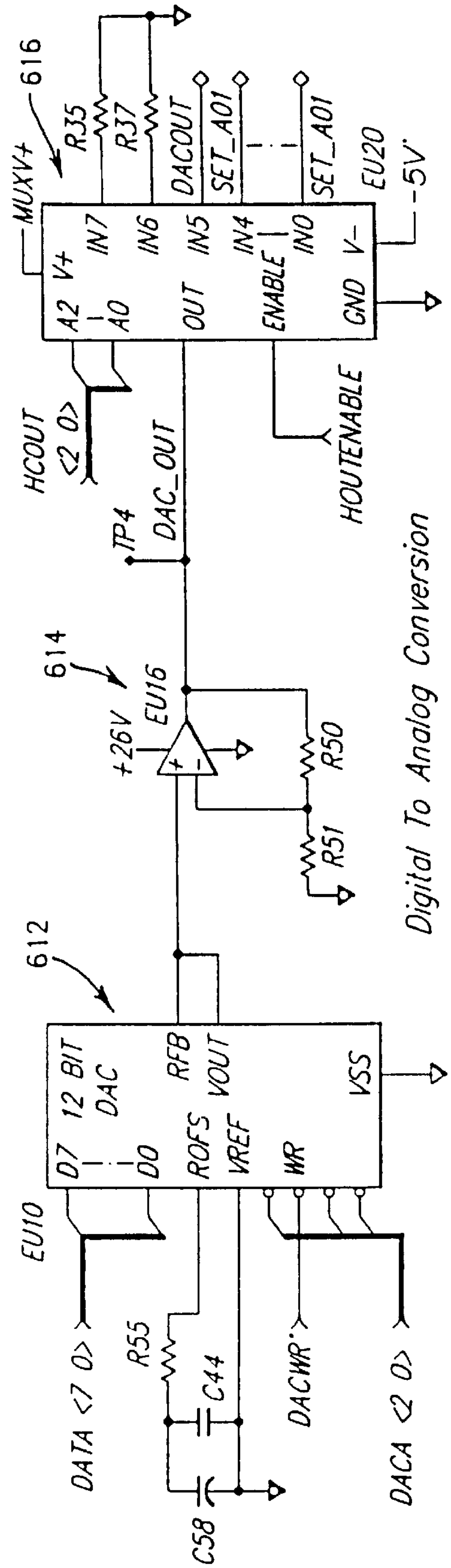

FIG. 12B shows the digital to analog converter circuit 612, amplifier circuit 614 and multiplexor circuit 616 discussed in connection with FIG. 10B. In this regard, it should be noted that the D/A converter 612 (AD7248) has a resolution of 12 bits, but it need not be designed for absolute accuracy. Rather, in accordance with the control methods of the present invention, the accuracy of the D/A converter 612 is not nearly as important as the ability to make small changes.

The amplifier circuit 614 is comprised of an operational amplifier EU34 (3140A). This single stage amplifier provides a "2.21" multiplier that boosts the 10 volt maximum output to a maximum of 22.1 volts. In this regard, it is preferred that a 1.21 k ohm resistor be employed in the feedback leg between the output and the inverting input of the operational amplifier. This provision prevents a differential input greater than 10 volts by limiting the amount of current that can be drawn through the non-inverting input, and thus preventing the device from being put into a positive feedback mode that could take several seconds to recover from. This provision also allows the amplifier circuit, in conjunction with the 1.21 k ohm resistor, to amplify its input by 2.21.

Figure 12F:
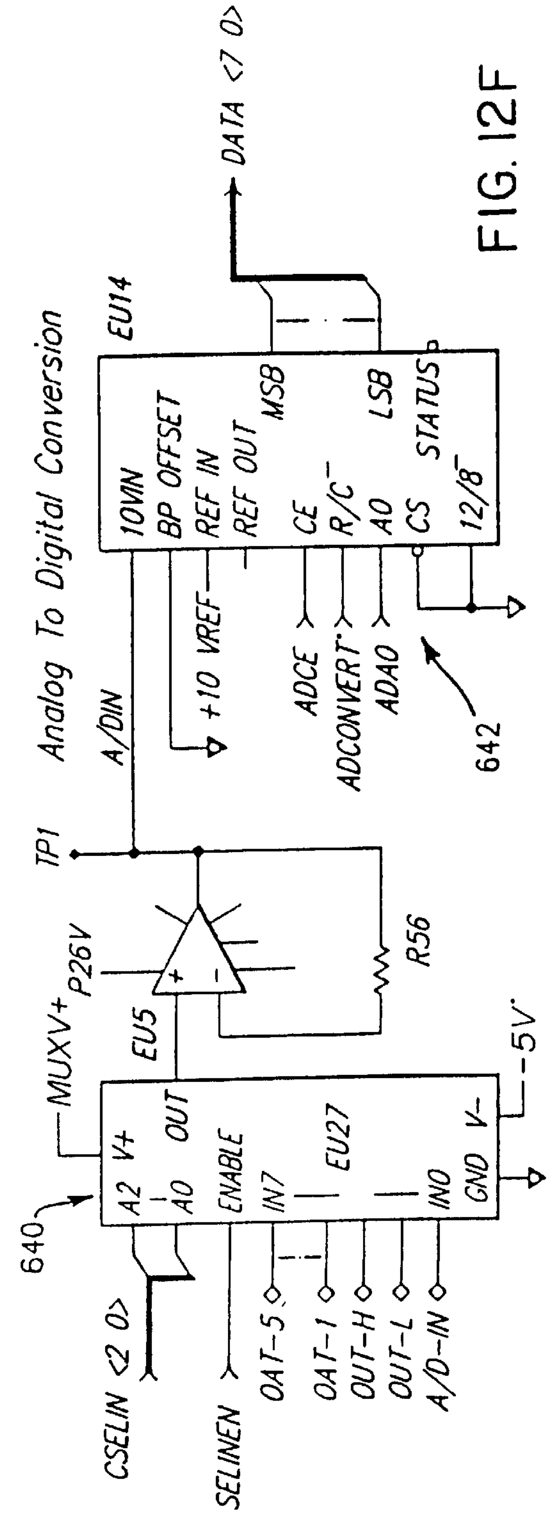
Figure 12C:
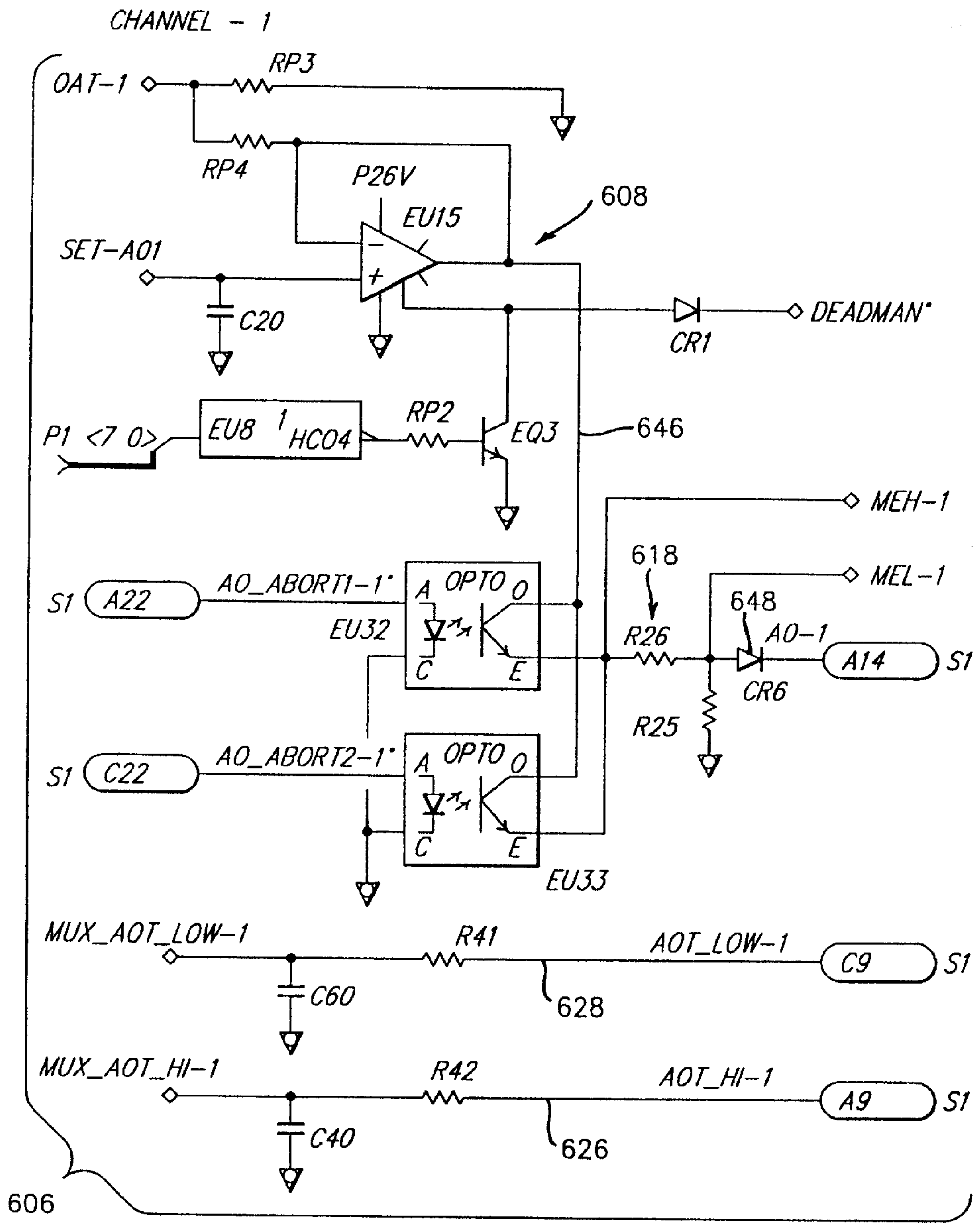
Figure 12D:
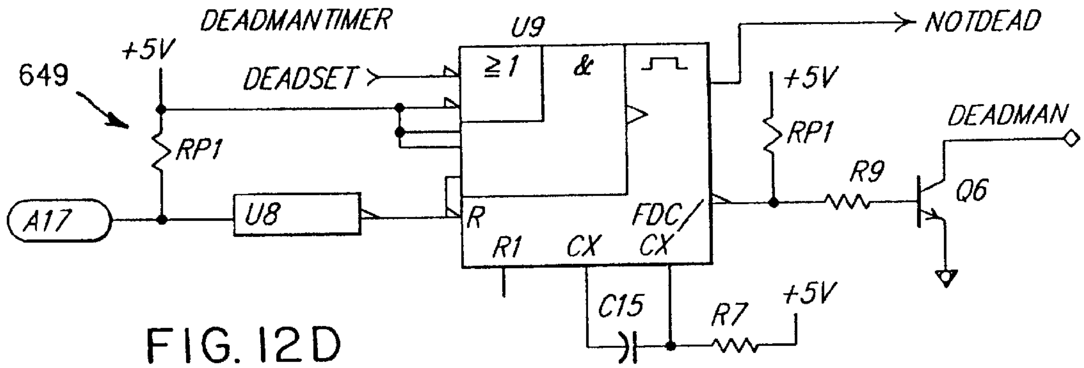

FIG. 12C illustrates the abort circuit 606 which was discussed in connection with FIG. 10B. In this regard, the operational amplifier (3140A) EU15 or 608 is responsive to the "SET-AO1" signal from the multiplexor 616. However, the abort circuit includes provisions to prevent electrical power from being transmitted to the field if either the microcomputer circuit 610 or the controller 100 fail to operate properly. Specifically, the operational amplifier EU15 may be disabled by the conduction of the transistor EQ3 via a Low signal on the appropriate pin of the "P1" bus of the microprocessor EU3. In other words, the analog output circuit 600 may pull its own analog output to zero. Additionally, the presence of a Low "DEADMAN" signal from the deadman timer circuit 649 of FIG. 12D will also cause the analog output from the operational amplifier EU15 to be pulled to zero. The timer (LS122) EU9 of the deadman timer circuit 649 is responsive to periodic "DEADSET" signal pulses from the controller 100 to maintain the DEADMAN signal in a High state. Thus, if a DEADSET pulse is not received within a predetermined period of time (e.g., 64 msec), then the analog output circuit 600 will automatically pull down all of its analog output lines to zero.

As in the case of the digital abort circuits 510, the analog abort circuit 606 includes opto-isolators (EU32–EU33) to electrically insulate the analog output circuit 600 from its neighboring analog output circuits 602–604. However, these opto-isolators (ILD31) are also capable of passing current to drive the field control device to which the analog output circuit is connected. Accordingly, the output line 646 from the operational amplifier EU15 is connected to the collector terminal of the transistor in each of the opto-isolators EU32–EU33. Additionally, it should be noted that the abort circuit 606 includes a diode 648 which separates the ME resistor 618 from the track resistor 624.

Figure 12E:
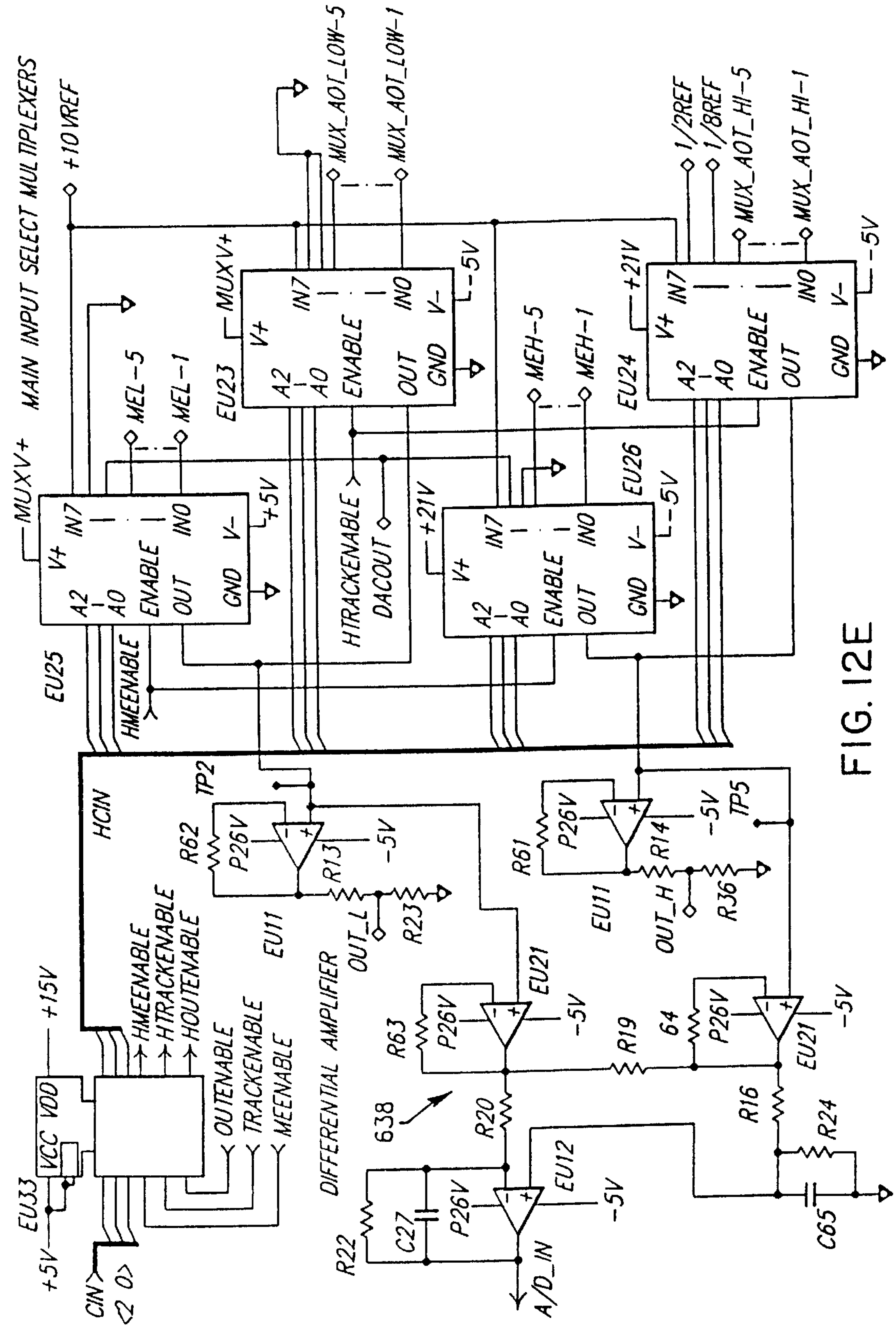

FIG. 12E indicates that the multiplexor circuit 634 of FIG. 10B is actually comprised of multiplexors EU24 and EU26. Similarly, the multiplexor circuit 636 of FIG. 10B is shown to be comprised of multiplexors EU23 and EU25. Accordingly, the differential amplifier circuit 638 is also comprised of a set of five operational amplifiers (OPA2107) EU11, (OPA2107) EU21 and (OPA602) EU12. The operational amplifiers EU11 provide the multiplexed "OUT-L" and "OUT-H" signals from the ME and track resistors that allow the measurement of these signals with respect to ground. The operational amplifiers EU21 buffer the output of the multiplexors as the first stage of the differential amplifier 638 formed by operational amplifiers EU21 and EU12. The "A/D_IN" signal produced by the differential amplifier 638 represents an amplified voltage difference between the outputs of the multiplexors (e.g., amplified by 4.545).

The differential amplifier circuit 638 provides a gain of 4.545 in order to convert the 2.2 volt maximum track differential to 10 volts. This amplification permits the entire range of the analog converter 642 to be utilized. Additionally, it should be noted that the operational amplifiers have negative and positive rails of −5 volts and +26 volts respectively. In this regard, the operational amplifiers operate within 5 volts of the negative rail and 3.0 volts of the positive rail. The operational amplifiers should also have a slew rate greater than 1 volt/msec, and as low a voltage offset as possible. In this way, the differential amplifier circuit 638 has the ability to operate relatively fast, perform well near the supply rails and reject common mode voltages across a wide range.

FIG. 12F completes the analog output circuit 600 by receiving the OUT-L, OUT-H and A/D_IN signals and further multiplexing these signals with the OAT-1 . . . OAT-5 signals. The analog output of the multiplexor 640 is processed through operational amplifier (OPA602) EU5, and then converted into a digital signal stream by A/D converter (ADS574) 642. The A/D converter 642 is in turn connected to the DATA <7 0> bus of the microprocessor EU3 of the analog output circuit 600.

Figure 13A:
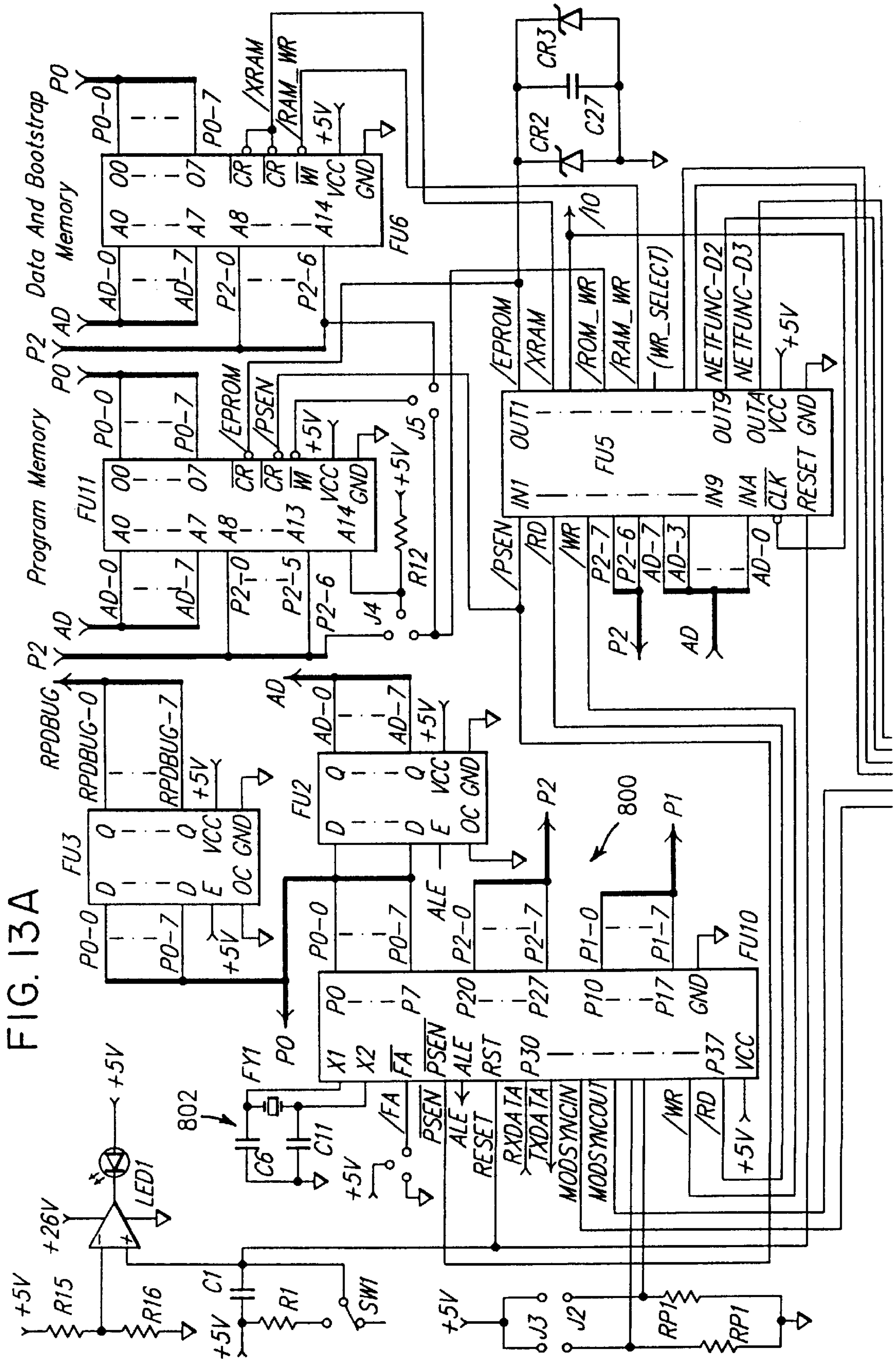
FIGS. 13A–13D comprise a schematic diagram for a network controller circuit according to the present invention.

Referring FIGS. 13A–13D, a schematic diagram for the network controller 16 is shown. As indicated above, the network controller 16 serves as the communication director for the entire fiber optic network, and it preferably has the capability to communicate at a rate of at least 500K baud. The network controller 16 is equipped with its own microcomputer circuit 800, as illustrated in FIG. 13A. The microcomputer circuit 800 includes a microprocessor (80C31BH-1) FU10, a 32K program memory FU11, a 32K data memory chip FU6, a PLD memory controller chip FU5 and latch chips FU2–FU3. In this respect, the microcomputer circuit 800 is similar in design to that shown for the controller 100 in FIG. 6A, and the same or similar components may be used in both circuit designs. A 16 MHz oscillator circuit 802 is also shown to be connected to the microprocessor FU10, which serves to point out that the network controller 16 operates under its own clock, even though the microprocessor FU10 receives a "MODSYNCIN" synchronization signal from the process control computer 14.

Figure 13B:
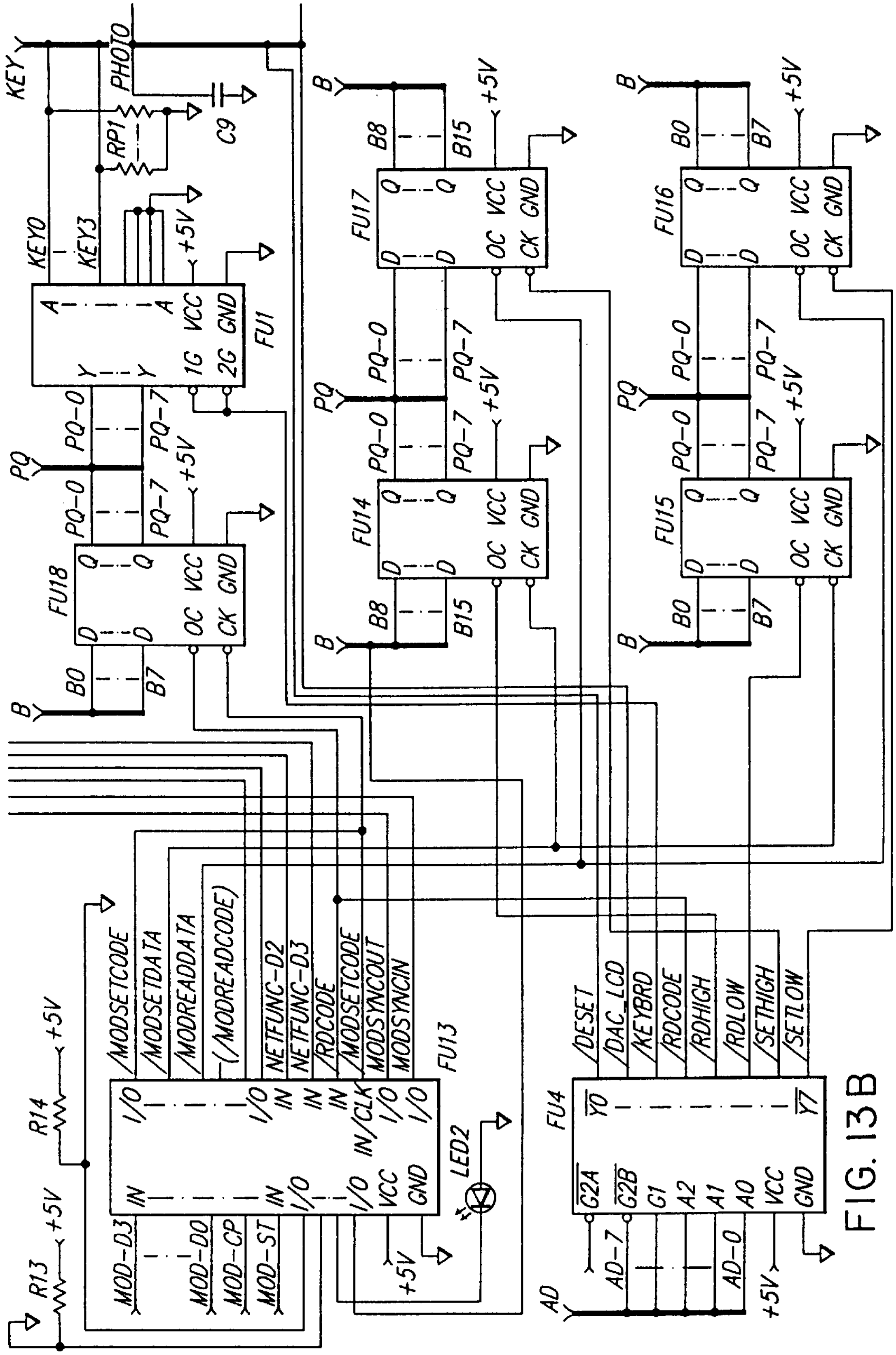

The network controller 16 is connected to its process control computer 14 via a 16-bit wide "B" bus, which is shown in FIG. 13B. The network controller 16 also receives a set of encoded control signals ("MOD-D0 . . . MOD-D3", "MOD-CP" and "MOD-ST") from the process control computer 14 which facilitate communication between these two computer systems. In this regard, these encoded control signals are connected to a decoder circuit (22V10) FU13, which deciphers these control signals and directs these control signals to the circuits indicated in FIGS. 13A–13B. Thus, for example, the "/MODSETDATA" signal is sent to a pair of three-state flip flop circuits (74HT574) FU14–FU15 in order to capture data presented on the "B" bus. Similarly, the "/MODREADATA" signal is sent to a pair of latch circuits FU16–FU17 in order to enable these latch circuits to pass data captured from the "P0" bus of the microprocessor FU10 to the "B" bus of the process control computer. The flip flop circuits FU14–FU17 also receive enable/clock signals from a 3 to 8 decoder circuit (74HC138) FU4, which is connected to the "AD" bus of the microprocessor FU10.

FIG. 13B also shows that a flip flop circuit FU18 provides a further input interface between the "B" bus from the process control computer 14 and the "P0" bus of the microprocessor FU10 of the network controller 16. In this regard, the process control computer transmits a SETCODE signal to the network controller 16 which is used to indicate to the network controller 16 what data elements were loaded into the flip flop circuits FU14–FU15 by the process control computer 14. Additionally, the process control computer 14 sends a predetermined set code value (e.g., 10hex) to flip-flop circuit FU18, which is used to indicate the start of a new process control cycle (e.g., a new second). During the anticipated time that this code should be transmitted, the network controller 16 repeatedly polls the flip-flop circuit FU18 in a tight loop in order to detect the start of a new process control cycle. When the new process control cycle set code is detected, then the microprocessor FU10 will read and store its own corresponding clock signal. Then, the microprocessor FU10 will change the appropriate register which stores the clock data by an amount which will enable the clock signal of the network controller 16 to be adjusted to that of the process control computer 14. Finally, FIG. 13B shows a decoder circuit (74HC541) FU1 which is connected to the keyboard of the debug panel 18 for the network controller 16 via signal lines "KEY0 . . . KEY3". Communication to the debug panel 18 is provided by the RPDBUG signals shown in FIG. 13A. Thus, it should be appreciated that the circuits illustrated in FIG. 13B provide a way to effectively make multiplexed use of the "P0" bus of the microprocessor FU10 for purposes of bi-directional communication with the process control computer 14 and bi-directional communication with the debug panel 18.

Figures 13C, 13D:
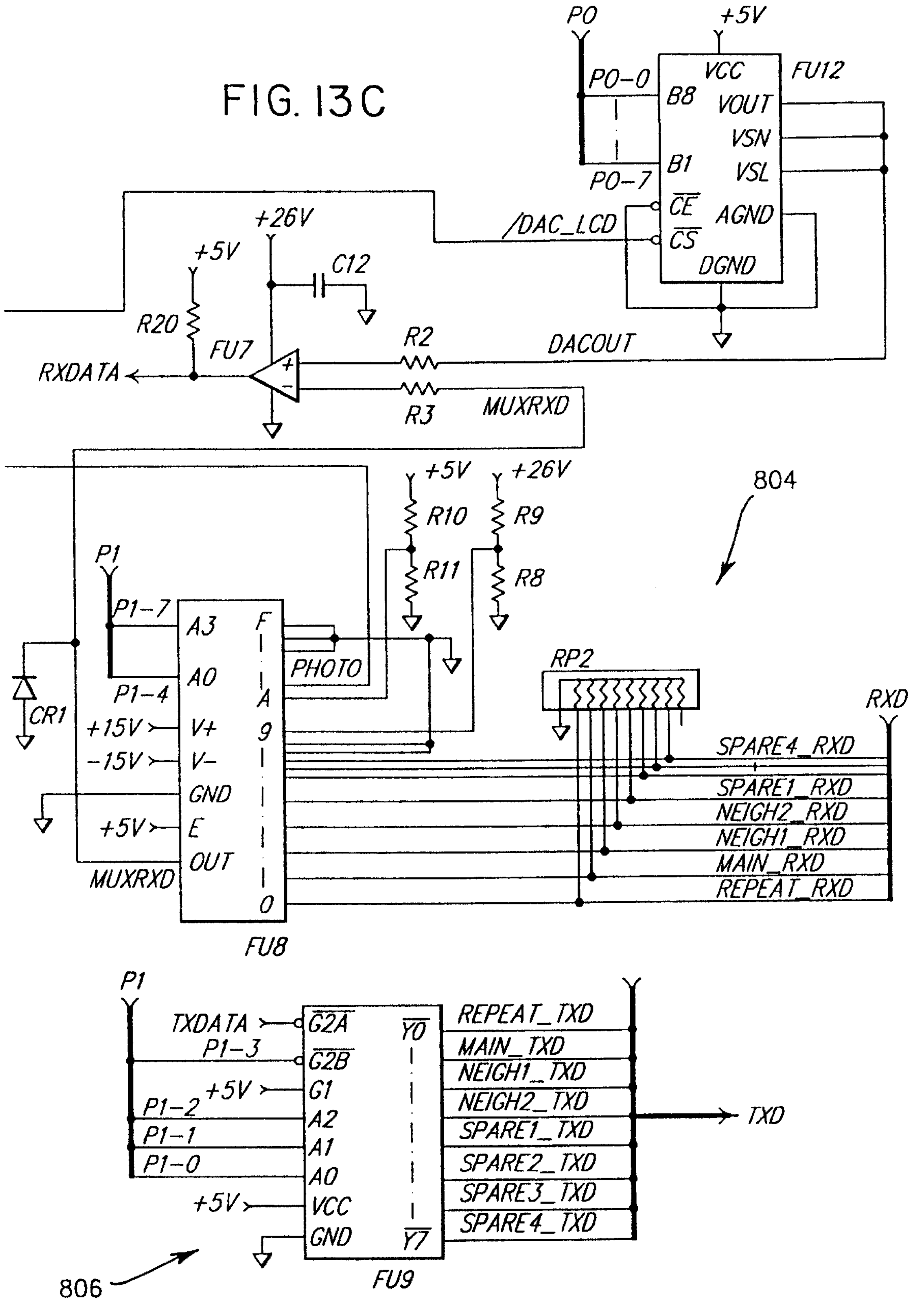

FIG. 13C shows a receiver circuit 804 for the network controller 16. The receiver circuit 804 generally comprises a multiplexor circuit FU8, a digital to analog converter circuit FU12 and a comparator circuit FU7. The multiplexor circuit FU8 is connected to an "RXD" bus, which is essentially a set of individual signal lines that extend from an edge connector on the network controller circuit board. These signal lines include the "MAIN_RXD" and the "REPEAT_RXD" signal lines which illustrate the network controller's ability to communicate in opposite directions. In this regard, the MAIN_RXD line is ultimately connected to both of the two fiber optic cables 34 shown in FIG. 1 through an interface circuit to be described below. Similarly, the REPEAT_RXD line is ultimately connected to both of the two fiber optic cables 36. In this way, both of the cables in each network ring are utilized to form one communication link. Additionally, the multiplexor FU8 also receives the signal lines labeled "NEIGH1_RXD" and "NEIGH2_RXD". One of these NEIGHbor lines could be used to receive high speed optical communication between the process control computers 14*a*–14*b*. The other of these NEIGHbor lines is also available to facilitate such communication when the process control computer 14 is comprised of three redundant process control computers. Alternatively, these NEIGHbor signal lines could be used to provide additional redundant communication links between the process control computers.

As in the case of many of the input signals for the controller 100, the digital to analog converter circuit FU12 and the comparator circuit FU7 operate in combination to produce an "RXDATA" signal which is connected to the microprocessor FU10. This arrangement permits a plurality of both analog and digital signals to be processed through the same circuitry, which ultimately generates a single input line to the microprocessor FU10.

FIG. 13D shows a transmitter circuit 806 for the network controller 16. Specifically, the transmitter circuit 806 is shown to be comprised of a decoder/demultiplexor circuit (74HC138) FU9. The decoder circuit FU9 is connected to the address bus "P1" of the microprocessor FU10, and the decoder circuit also receives the "TXDATA" signal from the microprocessor for transmitting signals to the fiber optic network. The decoder circuit FU9 produces signals which are complimentary to the "RXD" signals discussed in connection with FIG. 13C. Specifically, the "MAIN_TXD" signal is ultimately connected to one of the fiber optic cables 34, and the "REPEAT_RXD" signal is ultimately connected to one of the fiber optic cables 36. Similarly, one of the "NEIGH1_TXD"/"NEIGH2_TXD" signals could be used to provide a transmission link between the process control computers 14*a*–14*b*.

Referring to FIGS. 14A–14E, a schematic diagram of the breakout serial communication circuit 26 is shown. In this regard, the breakout circuit 26 has several circuit similarities to the network controller 16. Specifically, the microcomputer circuit 808 of the breakout circuit 26 (shown in FIG. 14A) is similar to the microcomputer circuit 800 for the network controller 16. The microcomputer circuit 808 includes a microprocessor (80C31BH-1) GU10, a 32K program memory GU13, a 32K data memory chip GU11, a PLD memory controller chip GU14 and latch chips GU3 and GU8. Additionally, the transmitter circuit 810 of the breakout circuit 26 (FIG. 14D) is similar to the transmitter circuit 806 of the network controller 16, and the receiver circuit 812 of the breakout circuit (FIG. 14D) is similar to the transmitter circuit 804 of the network controller.

Figure 14A:
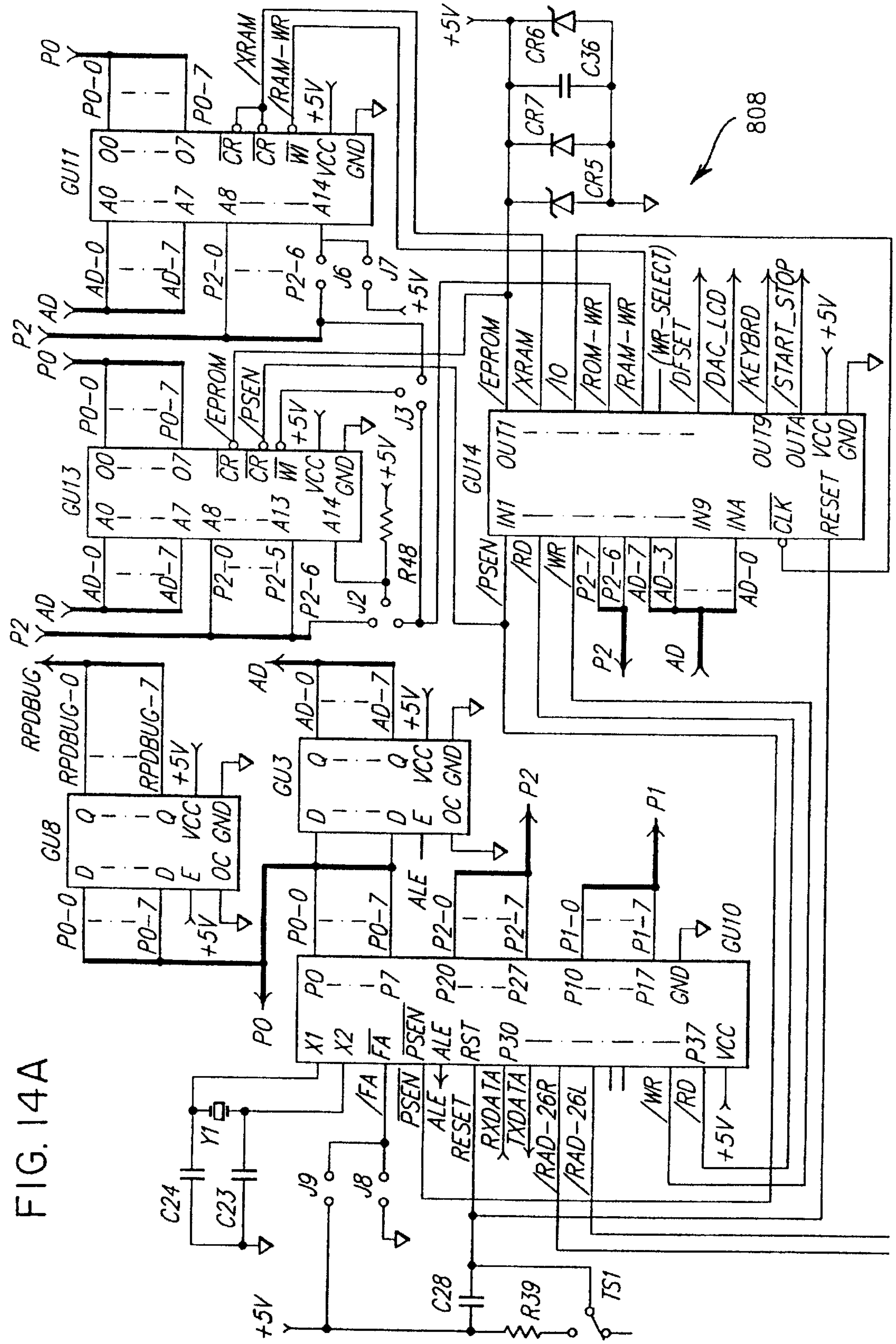
FIGS. 14A–14E comprise a schematic diagram of a breakout serial communication circuit shown in FIG. 4.
Figure 14B:
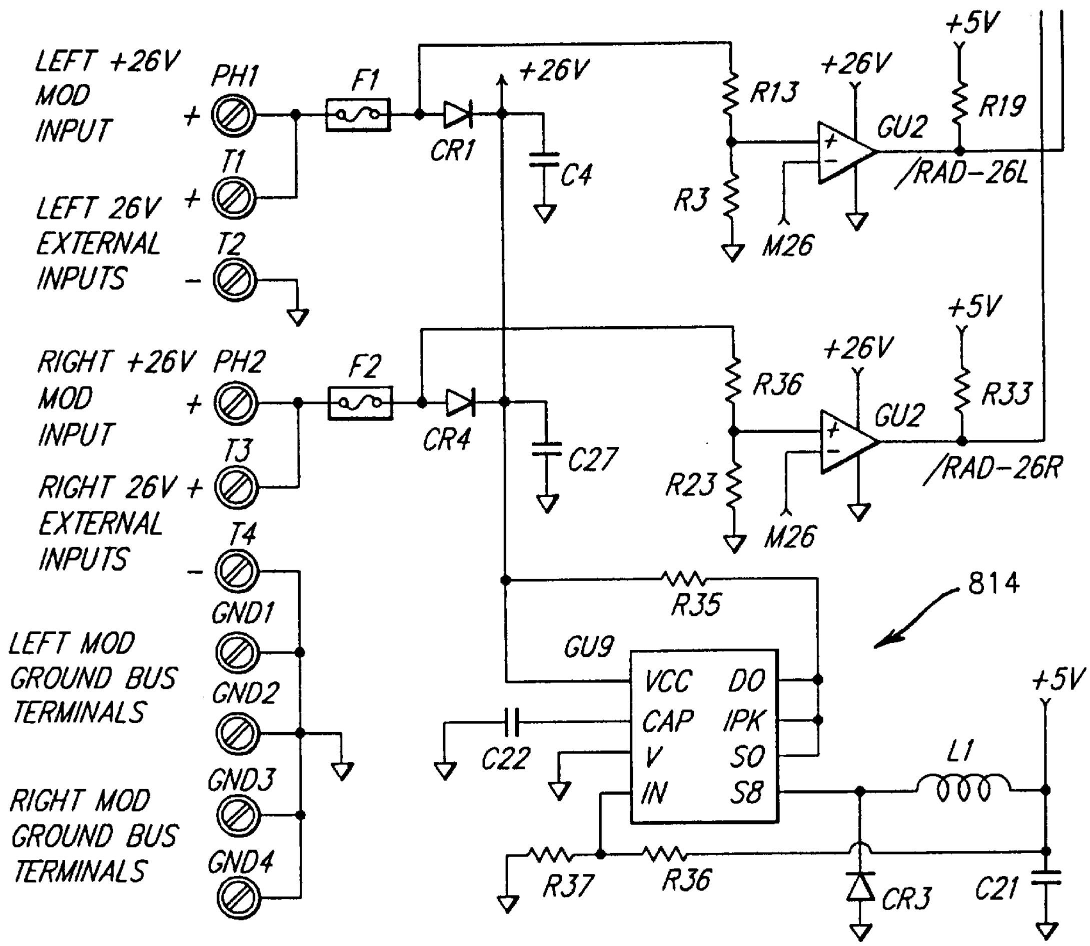
Figure 14C:
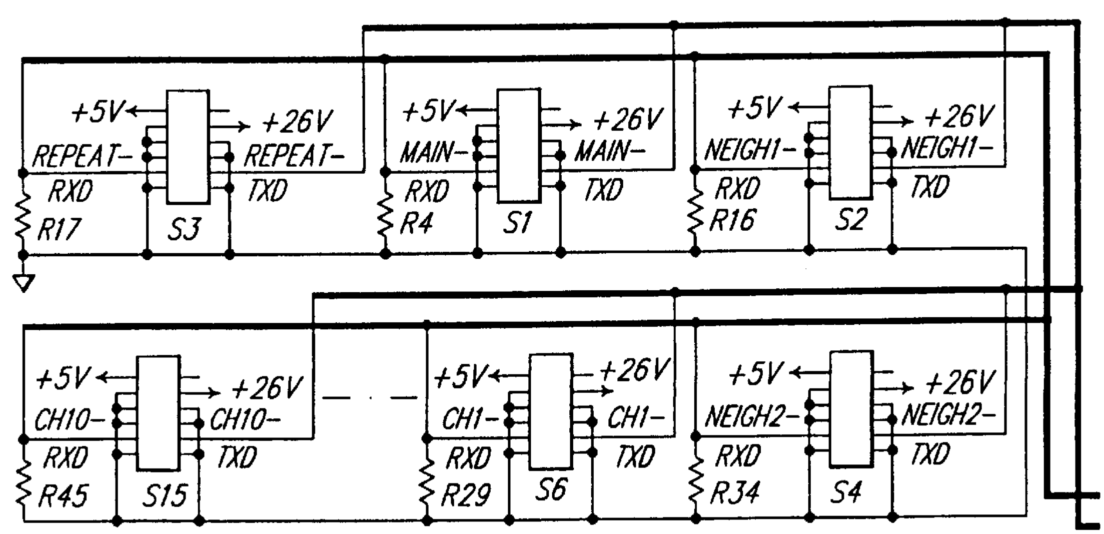
Figure 14D:
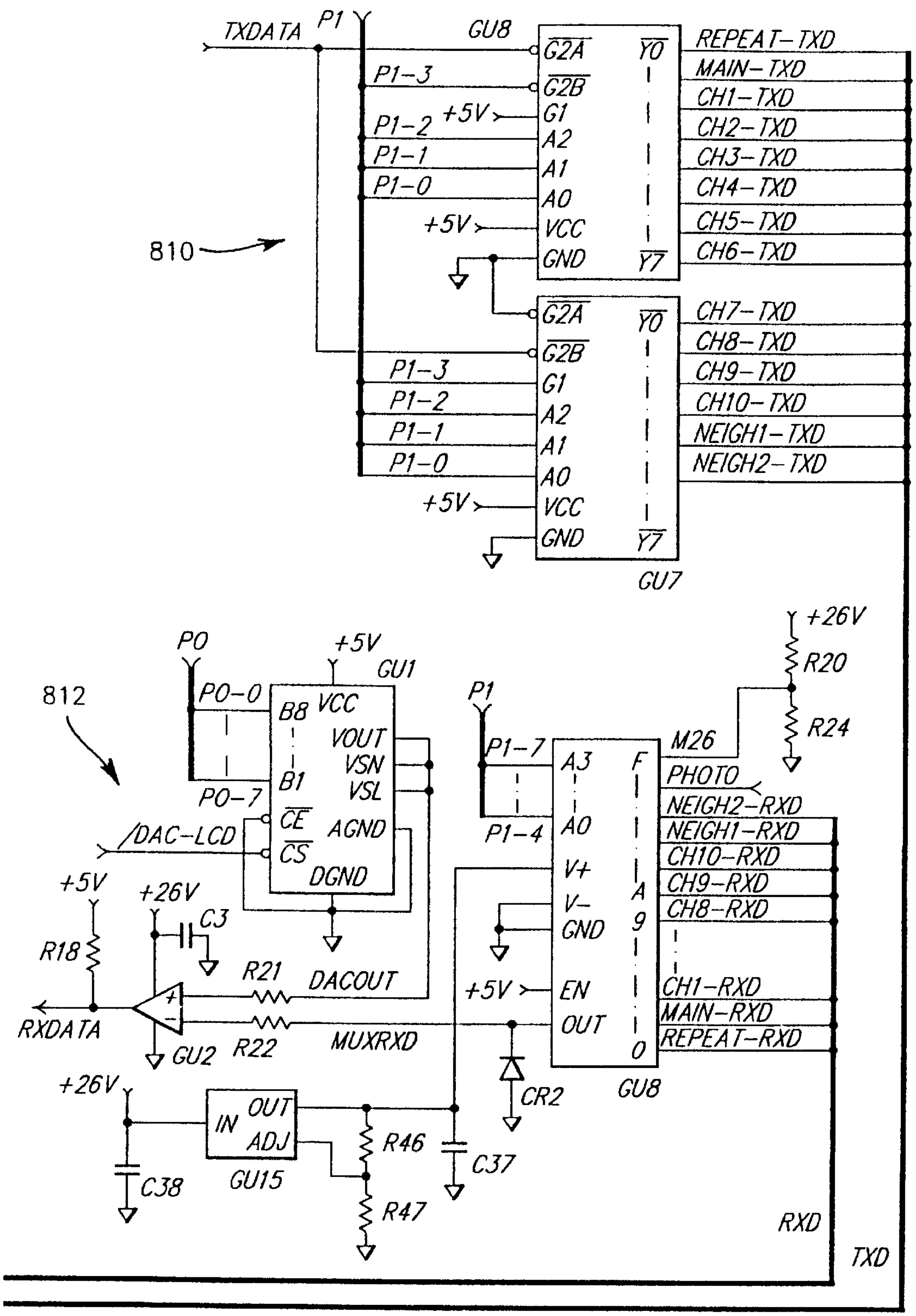

FIG. 14B shows a power supply circuit 814, which serves to illustrate that the breakout circuit 26 may receive its electrical power from the process control computer 14 (labeled "MOD") or from an external source. FIG. 14C shows the connectors "S1 . . . S15" for each of the communication signal lines available on the breakout circuit 26. These connectors are in turn coupled to fiber optic receiver/transmitter circuits, such as those shown in FIGS. 15A–15B respectively. Thus, for example, the MAIN_RXD and MAIN_TXD signals are coupled through connector S1, and the REPEAT_RXD and REPEAT_TXD signals are coupled through the connector S3. Additionally, as the name "breakout" implies, a set of connectors S6–S15 are provided to direct signals received by the breakout circuit 26 to specific communication channels that are associated with individual field computer units 12.

Accordingly, it should be appreciated that the breakout circuit 26 has the capability to multiplex or demultiplex communication signals for up to ten individual field computer units 12. Additionally, it should also be appreciated that the breakout circuit 26 may be configured to provide a "repeater" function, such as that shown for the breakout circuit 26*e* in FIG. 2. In this regard, the signals received on the MAIN_RXD line may be processed through the microprocessor GU10 and re-transmitted on the REPEAT_TXD line to the next breakout circuit, such as the breakout circuit 26*f* of FIG. 2. In this way, the breakout circuit 26*e* may be used as a signal re-transmitter.

Figure 14E:
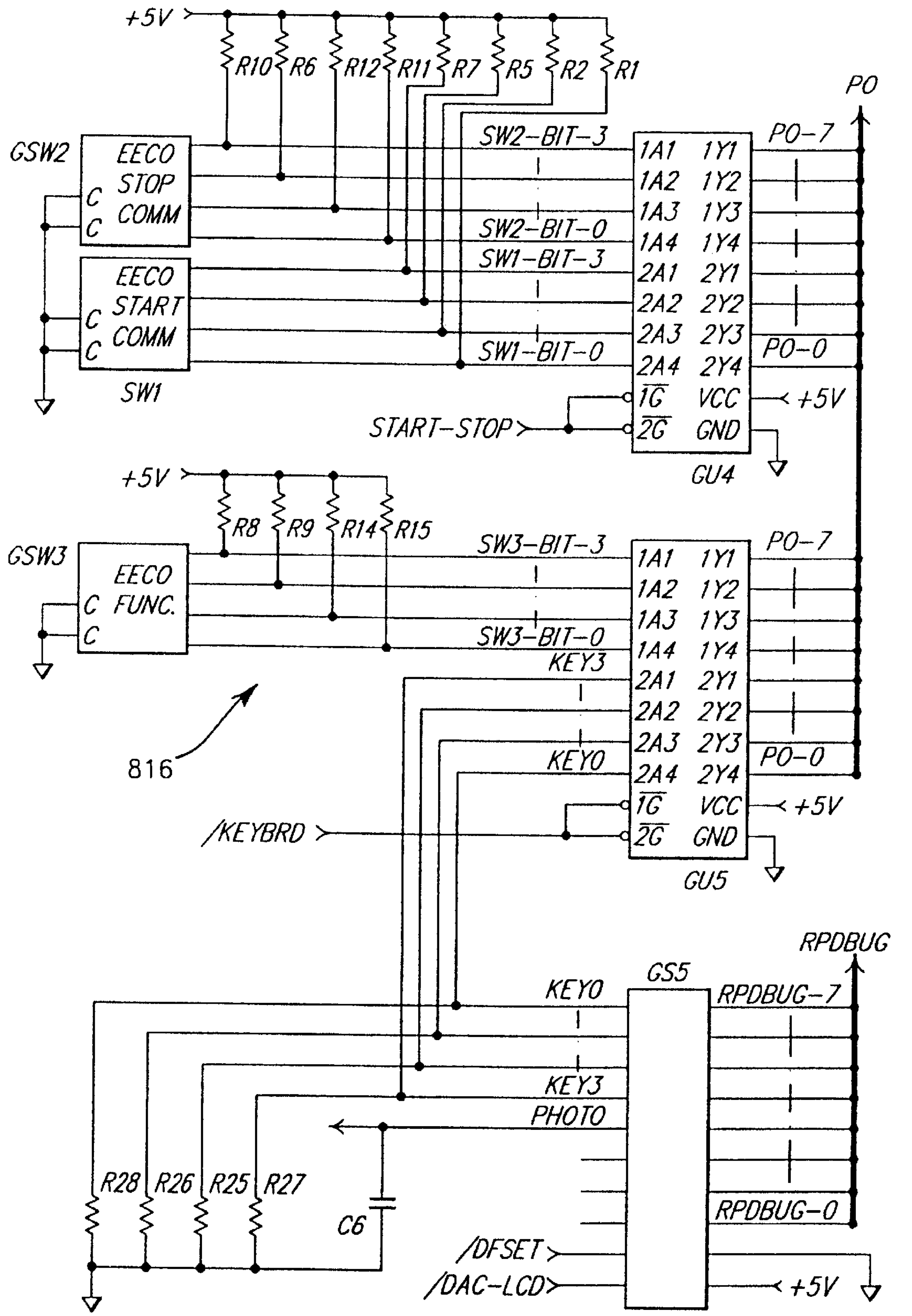

FIG. 14E shows a configuration circuit 816, which is used to control the signal directioning function of the breakout circuit 26. Specifically, a pair of switches "GSW1–GSW2" are provided to facilitate the multiplexing/demultiplexing of signals between the main/repeat ports 30–32 of the breakout circuit 26 and the communication channels "CH1 . . . CH10". In one form of the present invention, the switch GSW1 is used to determine a start channel and the switch GSW2 is used to determine a stop channel. Thus, the combination of these two range switches will enable the microprocessor GU10 to know which set of adjacent channels are actively connected to field computer units 12. In contrast, the setting of switch GSW3 informs the microprocessor GU10 whether the breakout circuit is connected on the primary level of signal distribution (e.g., breakout circuits 26*b* and 26*d* of FIG. 1) or whether the breakout circuit is connected on the secondary level of signal distribution (e.g., breakout circuits 26*a* and 26*c* of FIG. 1). The setting of switch GSW3 also informs the microprocessor GU10 as to whether the breakout circuit is being used as a repeater. Additionally, FIG. 14E also shows a connector "GS5" which is used to couple the debug panel 56 for the breakout circuit 26 to the microprocessor GU10 via the "RPDBUG" bus.

Figure 15A:
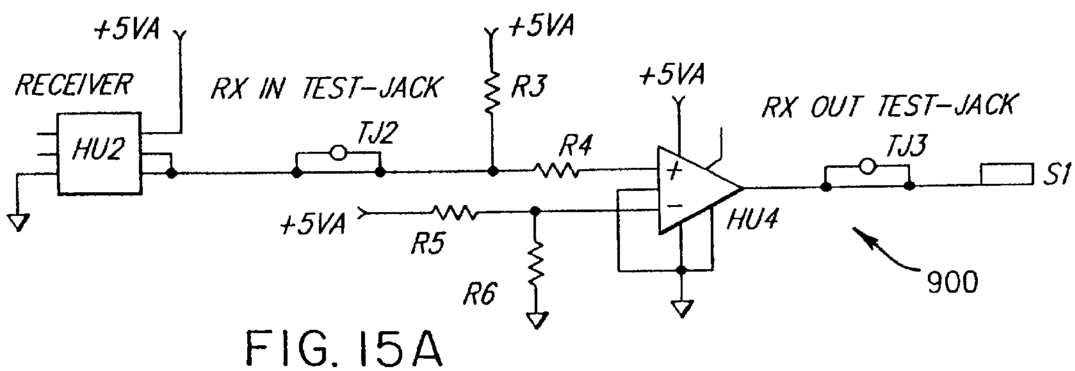
FIG. 15A comprises a schematic diagram of a fiber optic receiver circuit employed in the network shown in FIG. 1.
Figure 15B:
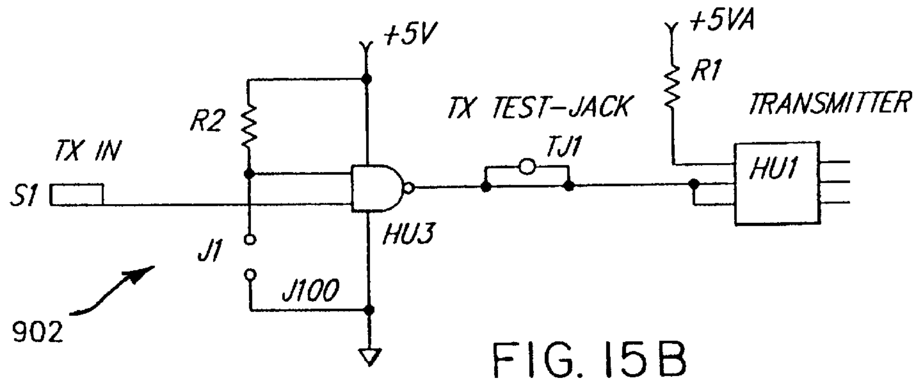
FIG. 15B comprises a schematic diagram of a fiber optic transmitter circuit employed in the network shown in FIG. 1.

Referring to FIGS. 15A–15B, a schematic diagram of two fiber optic interface circuits are shown. Specifically, FIG. 15A shows a receiver circuit 900, and FIG. 15B shows a transmitter circuit 902. The receiver circuit 900 includes an optical to electrical converter circuit "HU2" which feeds a high speed comparator circuit (LT1016) "HU4". The high speed comparator HU4 produces a "RX OUT" signal which has an electrically variable component that corresponds to the optically variable component of the optic input signal. When plastic optical fibers are employed to conduct communication signals, it is preferred that an HP-2522 converter be utilized for the converter HU2. However, when glass optical fibers are employed, it is preferred that an HP-2402 converter be employed for the converter HU2.

The transmitter circuit 902 of FIG. 15B includes a NAND gate (75451) HU3 which feeds an electrical to optical signal converter circuit HU1. When plastic optical fibers are employed to conduct communication signals, it is preferred that an HP-1522 converter be utilized for the converter HU1.

However, when glass optical fibers are employed, it is preferred that an HP-1404 converter be employed for the converter HU1.

Referring to FIGS. 16A–16G, a schematic diagram of the power supply circuit 50 is shown. The power supply circuit 50 is a 500 watt power supply that is capable of powering up to five field computer unit sides. In this regard, it is preferred that one power supply circuit be used to power only corresponding controllers 92–96 in each field computer unit 12. In other words, one of the power supply circuits 50 may be used to provide electrical power to the Left controller 92 in 1–5 field computer units. The power supply circuit 50 may also be used to provide power to one or more of the breakout circuits 26 as well. Additionally, the power supply circuit 50 is also used to charge the batteries 52 from which it may ultimately derive power in the event of an interruption in its A.C. input power. The batteries 52 are preferably a set of two 12 volt sealed batteries which are connected in series.

The power supply circuit is also preferably contained in its own enclosure, as shown in FIG. 1. An enclosure may also be provided to house a field computer unit 12, a set of power supply circuits 50 and a set of batteries 52. The enclosure for the power supply circuit 50 is preferably equipped with a set of LEDs which will indicate the status of various functional aspects of the power supply circuit 50. For example, one LED may be used to indicate that the power supply circuit 50 is receiving A.C. electrical power, while another LED may be used to indicate the battery 52 has sufficient power available. As will be discussed below, the power supply circuit 50 has the ability to test the battery 52 by conducting a load test.

Figure 16A:
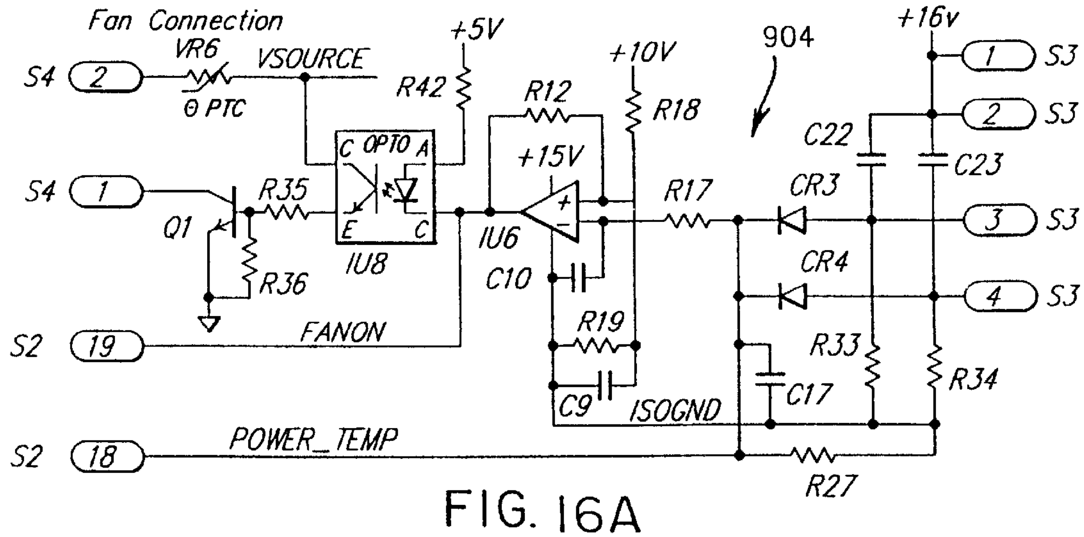
FIGS. 16A–16G comprise a schematic diagram of a power supply circuit for the triply redundant field computer unit.

FIG. 16A shows a fan controller circuit 904 which is responsive to the "FANON" signal from the controller 100. The FANON signal will cause the transistor in the opto-isolator circuit IU8 to conduct, and thereby transmit electrical power to a fan in the enclosure for the power supply circuit 50. Power to the fan may also be provided from the signal generated by a pair of temperature sensing devices (AD592), which are connected to pins 1–4 of the connector "S3". If the temperature being sensed in the power supply enclosure is sufficiently high, the temperature sensing devices (not shown) will turn on the fan (also not shown). The POWER-TEMP signal is transmitted back to the controller 100 to allow the controller 100 to monitor the temperature of the power supply and turn on the fan if necessary.

Figure 16B:
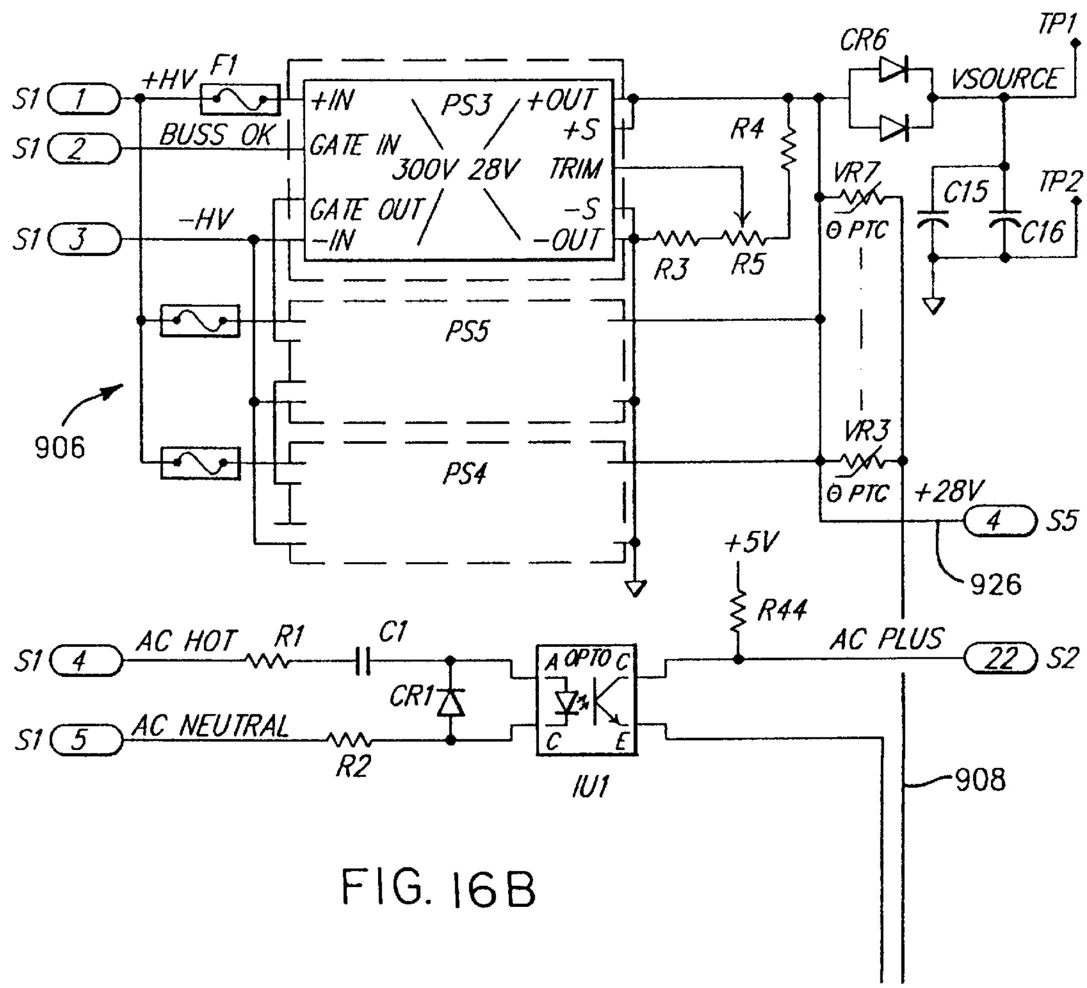

FIG. 16B shows a power converter circuit 906 which may receive either 120 VAC or 240 VAC electrical power. FIG. 16B also shows an opto-isolator circuit (H11G2) IU1, which is used to sense that A.C. power is available to the power supply circuit 50. While not shown in this schematic diagram, a suitable A.C. converter (e.g., a Vicor VI-FKE6-CMX circuit) is preferably employed to produce modulated D.C. power on the lines labeled "+HV" and "–HV". A set of three 200 watt power supply circuits (VI-200) "PS3–PS5" are connected in parallel to convert this high voltage input power to a regulated 28 volt D.C. output. A voltage divider circuit "R3–R5" is used to adjust the output voltage to precisely +28 volts. This voltage level is necessary to charge the batteries 52. The batteries 52 are charged through the bank of positive temperature coefficient (PTC) resistors "VR2 . . . VR7", which are used to limit current flow to the batteries. As the batteries 52 draw more current, the PTCs heat up and restrict the flow of current to the batteries.

Figure 16C:
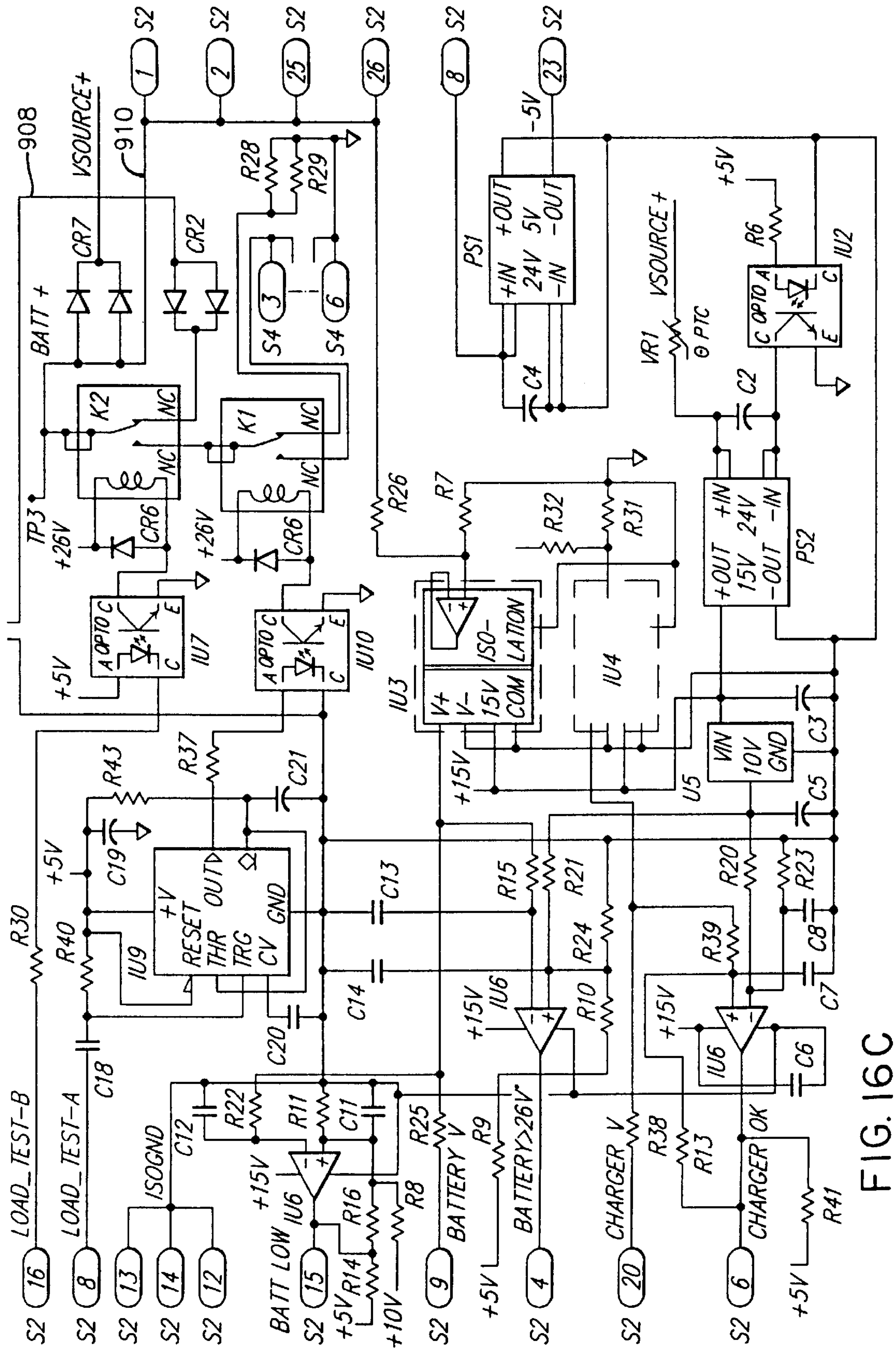

The charging voltage is transmitted on conductor line 908 to a relay "K2" on FIG. 16C, which is used to connect the batteries 52 to the charger circuit of FIG. 16B. In this regard, the positive terminal of one or more sets of batteries 52 is connected to conductor line 910 on the downstream side of the relay K2. The relay K2 is controlled by the "LOAD_TEST-B" signal, which is derived from the controller 100. The LOAD_TEST-B signal is used to cause the batteries 52 to be disconnected from the charging circuit in order to test the state of charge on the batteries. As will be seen below, this test is conducted under load conditions which will reflect the amount of current draw that could occur if the batteries were called upon to provide the primary power source for one or more field computer units 12.

In order to conduct this "load" test, the batteries 52 are alternately switched between a low current drawing load (e.g., 125 ohms) and a high current drawing load (e.g., 0.75 ohm). The low current load is provided by (5 watt) resistors R28–R29, while the high current load is provided across pins 3–6 of connector "S4". The high current load may be any resistive device capable of pulling the maximum allowable current from the batteries 52, such as a pair of Dale HLZ-165 1.5 ohm power resistors in parallel. A switch "K1" is used to alternately connect the batteries 52 to the high/low current loads during the testing procedure in response to a "LOAD_TEST-A" signal which is received indirectly from the controller 100. The LOAD_TEST signal resets a (555) timer circuit IU9, which is configured to generate a High signal for approximately 180 seconds. With the polarity shown for the opto-isolator circuits IU7 and IU10, the LOAD_TEST-A and LOAD_TEST-B signals may actually be the same signal from the controller 100. In other words, the batteries 52 will be charged while the LOAD_TEST-B signal is High, and the timer circuit IU9 will be held in a reset condition. However, when the LOAD_TEST-B signal is brought Low, the switch K2 will energize and connect the positive terminal of the batteries 52 to the switch K1. The timer circuit IU9 will then start counting and cause the batteries 52 to be switched to the high current load for approximately 60 seconds. Then, the batteries 52 may be switched to the low current load.

During the load test, the battery voltage "BATTERY V" will be measured by the controller 100 through isolation circuit (AD202) IU3. In this regard, the discharge voltage of a battery is both a function of the load and the amount of energy stored. Accordingly, the controller 100 will be able to determine the approximate amount of energy stored from the BATTERY V signal and the known resistance value of the high current load. In other words, the controller 100 will direct a load test where the power supply circuit 50 provides the controller with a high current load battery value during a time span of approximately 60 seconds. The low current load may also be used to fully discharge the batteries 52 if needed. The isolation circuit IU3, as well as the isolation circuit IU4, are used to permit the power supply circuit 50 to have two separate GND potentials. The GND potential which is isolated from the battery GND is referred to herein as ISOGND.

The power supply circuit 50 also generates several other signals which are related to the state of the circuit or the state of the batteries 52. For example, FIG. 16C shows that the power supply circuit 50 includes a comparator circuit (LM339) IU6, which generates a "BATT LOW" signal. As the name implies, the BATT LOW signal is indicative of whether the battery voltage is too low (e.g., <10 volts). Similarly, a "BATTERY >26V" signal is used to indicate that the battery voltage is too high (e.g., over 26.1 volts), via one of the comparator circuits IU6. The "CHARGER V" signal is used to provide the controller 100 with an indication of the voltage being applied to charge the batteries 52.

Assuming that this charging voltage is above 25 volts, one of the comparator circuits IU6 will generate a High "CHARGER OK" signal. Since the toggle point of this comparator is set to 4.17 volts by the regulator (AD587) IU5 and the resistors R20 and R23, the CHARGER V signal is divided down across resistors R32–R31.

Figure 16D:
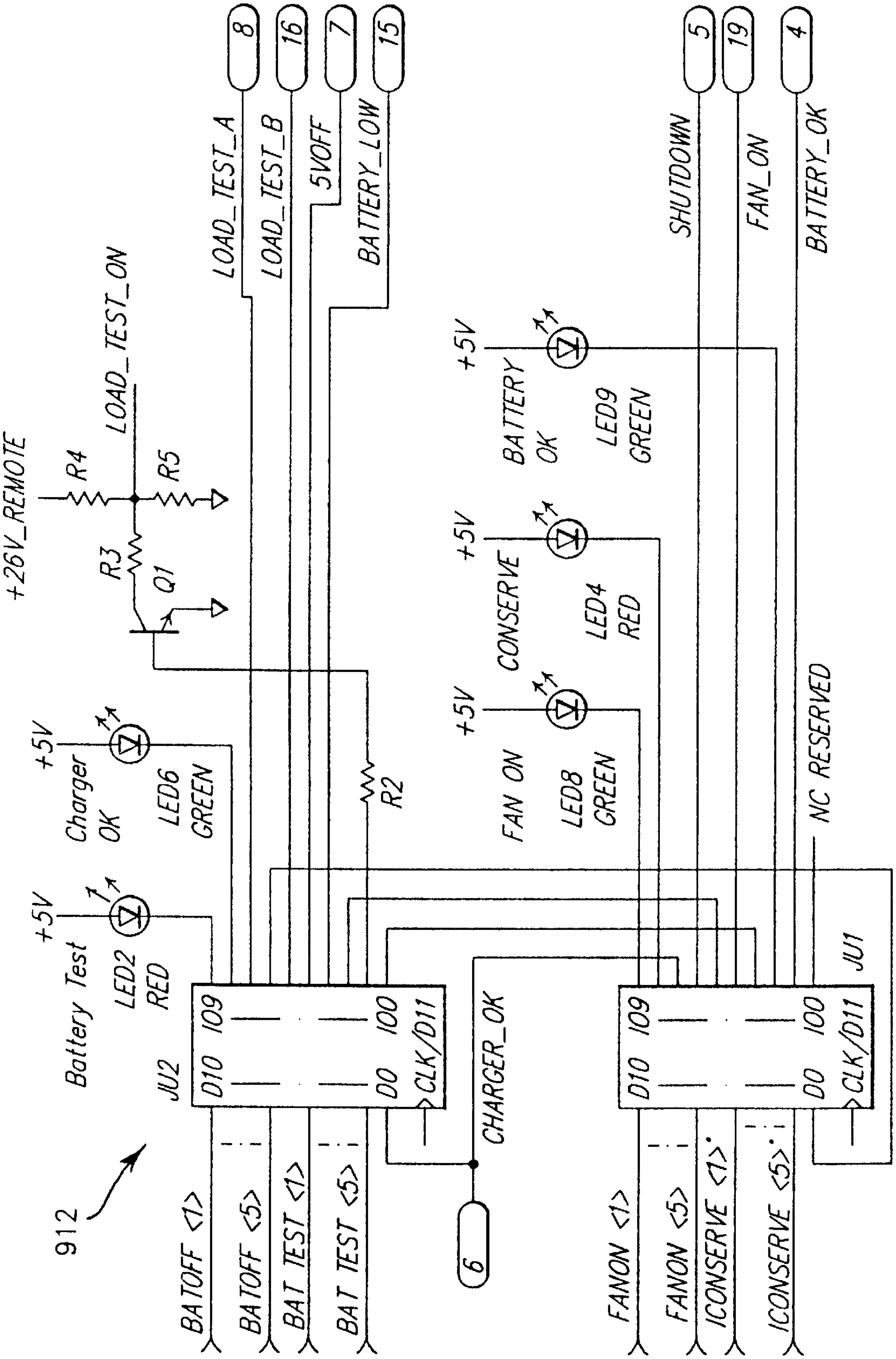

Turning to FIG. 16D, a control interface circuit 912 for a group of five power supply circuits 50 is shown. The control interface circuit 912 includes a pair of decoder circuits (22V10) JU1–JU2 for interpreting command signals from the controller 100, such as the replicated "FANON" and "ICONSERVE" signals. As will be seen from the discussion below, the ICONSERVE signal is used to turn off the supply of 26 volt power to the field computer units. The "BATOFF" signal is used to turn off the supply of 5 volt power to the field computer units. In this regard, it should be appreciated that the controller 100 may first direct the power supply circuit 50 to conserve battery power by turning off the 26 volt power source, and subsequently shut down the 5 volt power source after a suitable time has elapsed (as determined by the controller 100). The "BAT TEST" signal is used to generate a "LOAD_TEST_ON" signal which corresponds to the LOAD_TEST-A/LOAD_TEST-B signals.

Figure 16E:
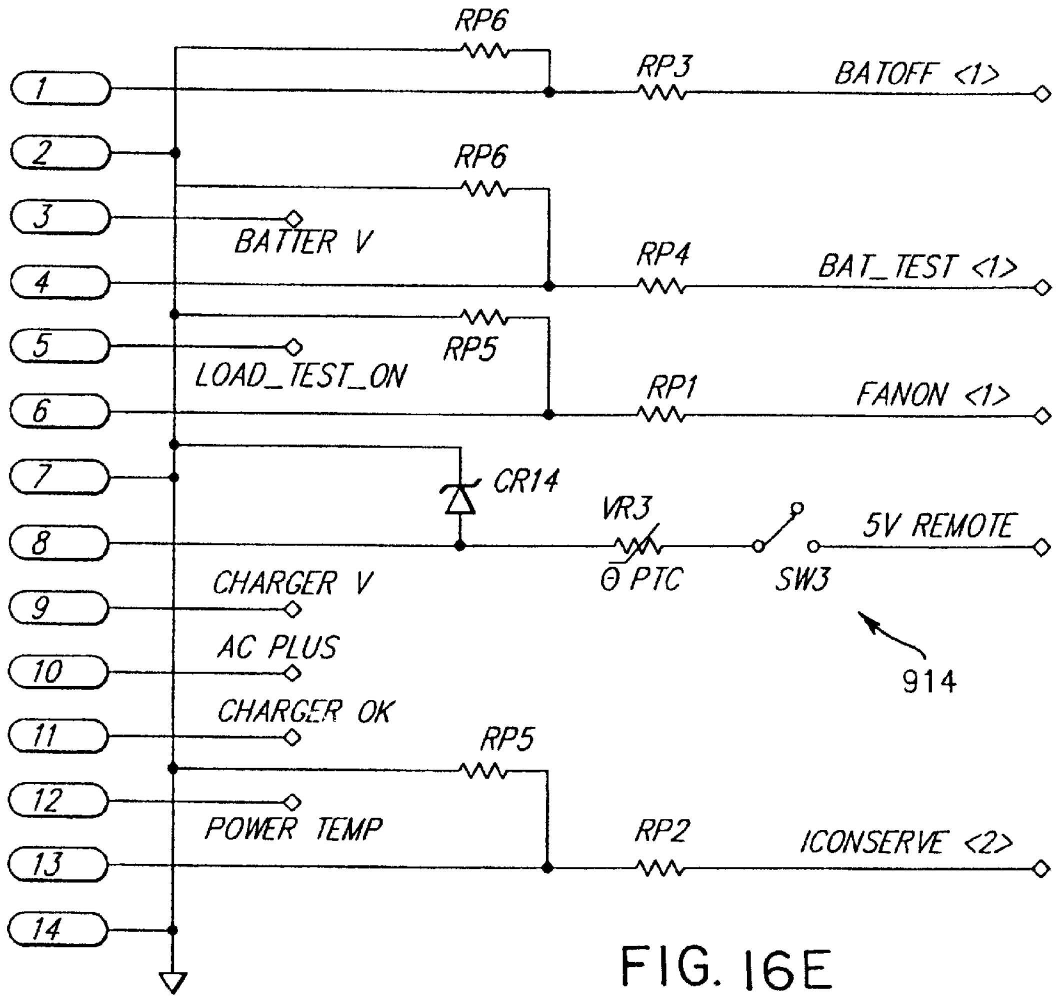
Figure 16F:
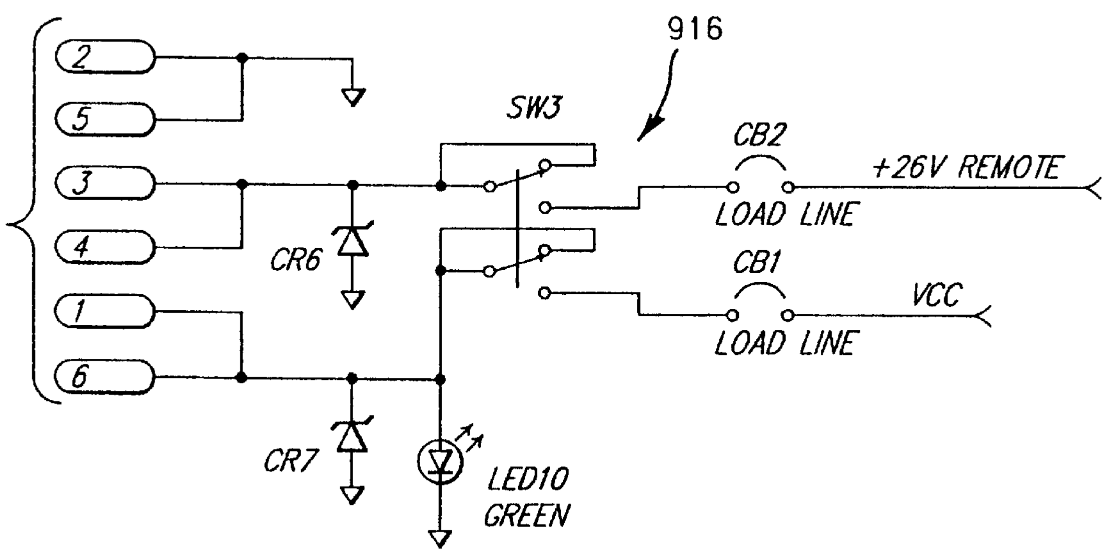

FIGS. 16E–16F show a set of connector circuits 914–916 which are replicated for each of the field computer units 12 that are powered by the power supply circuit 50. The connector circuit 914 simply shows the various command signals that are transmitted to each of the field computer units 12. Similarly, the connector circuit 916 shows the transmission of the 26 volt power source and a "VCC" power source to each of the field computer units 12 via fuses "CB1–CB2".

Figure 16G:
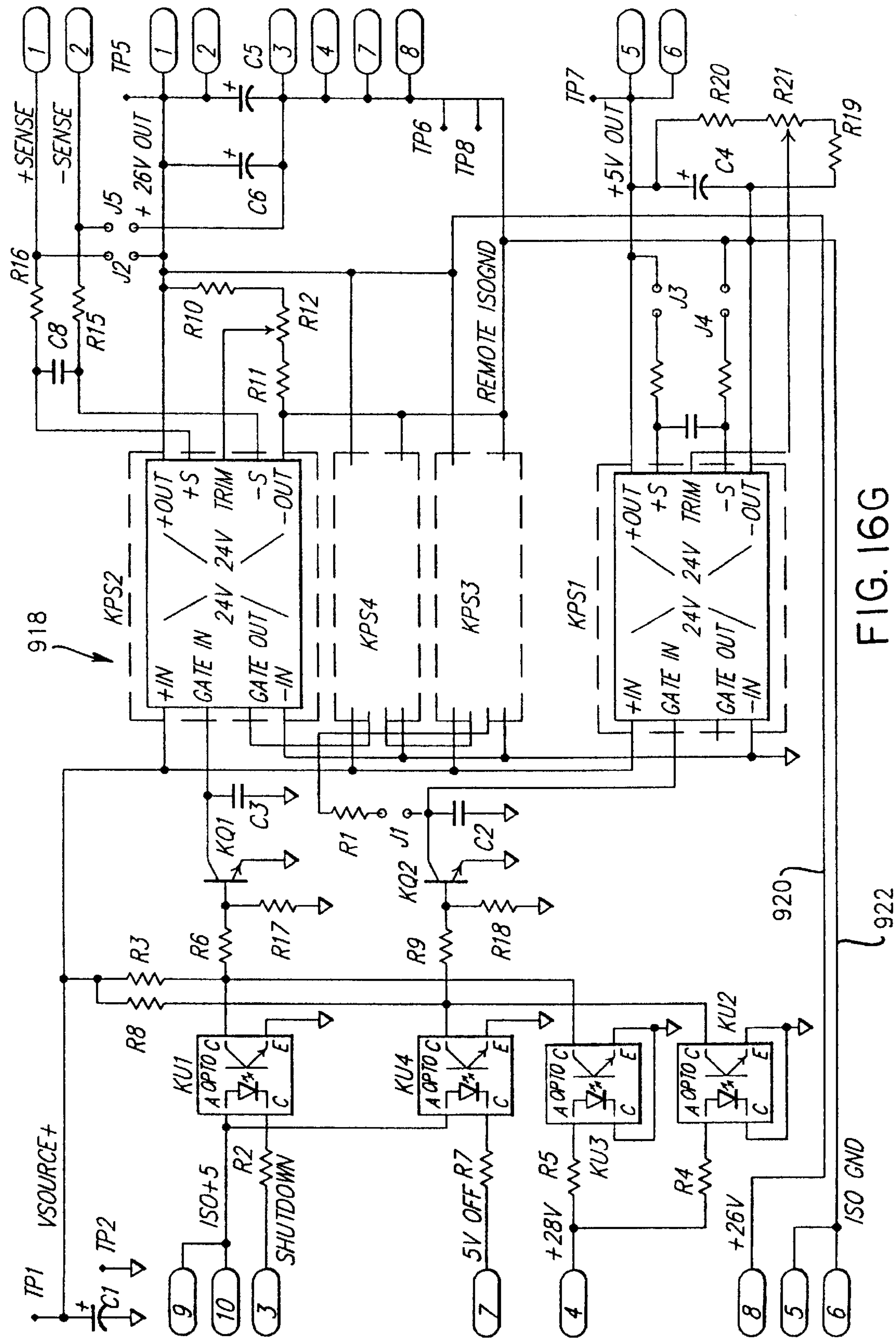

FIG. 16G shows an output power circuit 918 for the power supply circuit 50. The output power circuit 918 includes a power line labeled "VSOURCE" which corresponds to the +28 volt power source output from converters PS3–PS5 of FIG. 16B. The VSOURCE line feeds three 150 watt converter circuits (VI-200) "KPS2–KPS4" and a 100 watt converter circuit (VI-200) "KPS1". The converter circuits KPS2–KPS4 combine to produce a +26 volt power source across lines 920–922, while the converter circuit KPS1 produces a +5 volt power source across lines 922–924. It should be noted that jumpers KJ3–KJ4 are provided to connect the output of the +5v power source to the sense circuit of the power source.

A set of opto-couplers (MOC8021) "KU1–KU4" are used to control the on/off operation of the converter circuits KPS1–KPS4 in response to the "SHUTDOWN" and "5V OFF" command signals. Specifically, a High SHUTDOWN signal (which was derived from the ICONSERVE signal) will cause the opto-isolator circuit KU1 to become non-conductive, and thereby turn on transistor KQ1. This will cause the gate signal input to the converters KPS2–KPS4 to be driven low, and thereby shut these converters off. This will in turn remove the +26 volt power source from the field computer unit. A similar control procedure is also utilized to shut off the +5 volt power source through opto-isolator KU4 and transistor KQ2. Additionally, the opto-isolators KU2–KU3 are responsive to the +28 volt line 926 to simultaneously turn on the converters KPS1–KPS4 when the converter circuits PS3–PS5 of FIG. 16B are receiving power from the AC line.

Referring generally to FIGS. 17A–17I and FIGS. 18A–18T, a set of flow charts is shown to illustrate the arbitration methods performed at the field computer unit 12 according to the present invention. FIGS. 17A–17E relate to the arbitration of digital inputs, and FIGS. 17F–17I relate to the arbitration of digital outputs. Similarly, FIGS. 18A–18N relate to the arbitration of analog inputs, and FIGS. 18O–18T relate to the arbitration of analog outputs.

In order to put the field computer unit 12 software arbitration methods in perspective, the following observations may be made. These methods represent the procedures according to the present invention for how input and output values are selected in response to both agreements and disagreements between the values provided to each of the three controllers 92–96 contained in the field computer unit 12. In this regard, it is important to understand that these arbitration methods are performed by each of the controllers 92–96. It should also be understood that each of these arbitration methods are performed within each process control cycle (e.g., each second).

In general, the value data used in these arbitration methods must first be validated as an initial step. Then, if the value data (i.e., a AO, AI, DI or DO value) from at least two controllers agree, then the Leftmost value is selected. In other words, the AI or DI value determined at the Left controller 92 will be transmitted to the process control computer 14 if the Left controller 92 and the Middle controller 94 agree. Similarly, the AO or DO value determined at the Middle controller 94 will be transmitted to the field if the Middle controller 94 and the Right controller 96 agree. However, as each of the controllers 92–96 perform this arbitration process, it should be appreciated that it is possible that the controllers may transmit arbitrated values from different agreement combinations on a channel by channel basis for both input and output values. Such a situation could occur, for example, as a result of a communication failure to or from one of the controllers 92–96, so that the data values for that controller may not be shared with the other two controllers.

In the event that three valid data values exist, but none of the three controllers 92–96 are in agreement, then in accordance with the present invention a software selectable default condition is used for that value. In the case of input values, a choice may be made between a Select-High or Select-Low value to be sent to the process control computer 14. In the case of output values, a choice may be made between a Fail-Safe or a Fail-Last value to be sent to the field. One of the advantages of the present invention is that these software selectable default conditions may be rapidly changed in order to provide the most effective process control decisions possible in response to changing conditions in the field. In one form of the present invention, these default value conditions can be changed and are transmitted to the field computers units 12 with each process cycle signal communication for each input and output channel being processed by the field computer unit.

While these default value conditions are stored in each of the controllers 92–96 so that a communication interruption will not prevent the most current default value conditions from being applied, a procedure is nonetheless provided to ensure that the most appropriate default value conditions will be applied. For example, when a process is first started, the most appropriate output default value condition may be a Fail Safe value (e.g., a zero output). Whereas, after the process has been operating properly for some period of time, the most appropriate output default value condition may be the Fail-Last condition. In this regard, the Fail-Last condition applies the last arbitrated data value for the channel in question in the event of a loss of communication from the process control computer 14. When the Fail-Last condition is invoked for an analog output in response to a complete disagreement between valid data, then the value which is numerically nearest the last arbitrated data value will be selected. In the event that no valid data is available for either an input or an output value, then the last arbitrated data value should be used.

Turning to FIGS. 17A–17E, the flow charts for the arbitration of digital input data will now be described. Before proceeding to discuss these flow charts, it should be noted that each of the three controllers 92–96 independently perform this arbitration process. However, the Middle controller 94 will not send its arbitration results to the process control computer 14 unless an additional fiber-optic communication link is provided for this controller. Such a fiber-optic communication link should be utilized, for example, in the event that three process control computers 14 are provided.

Figure 17A:
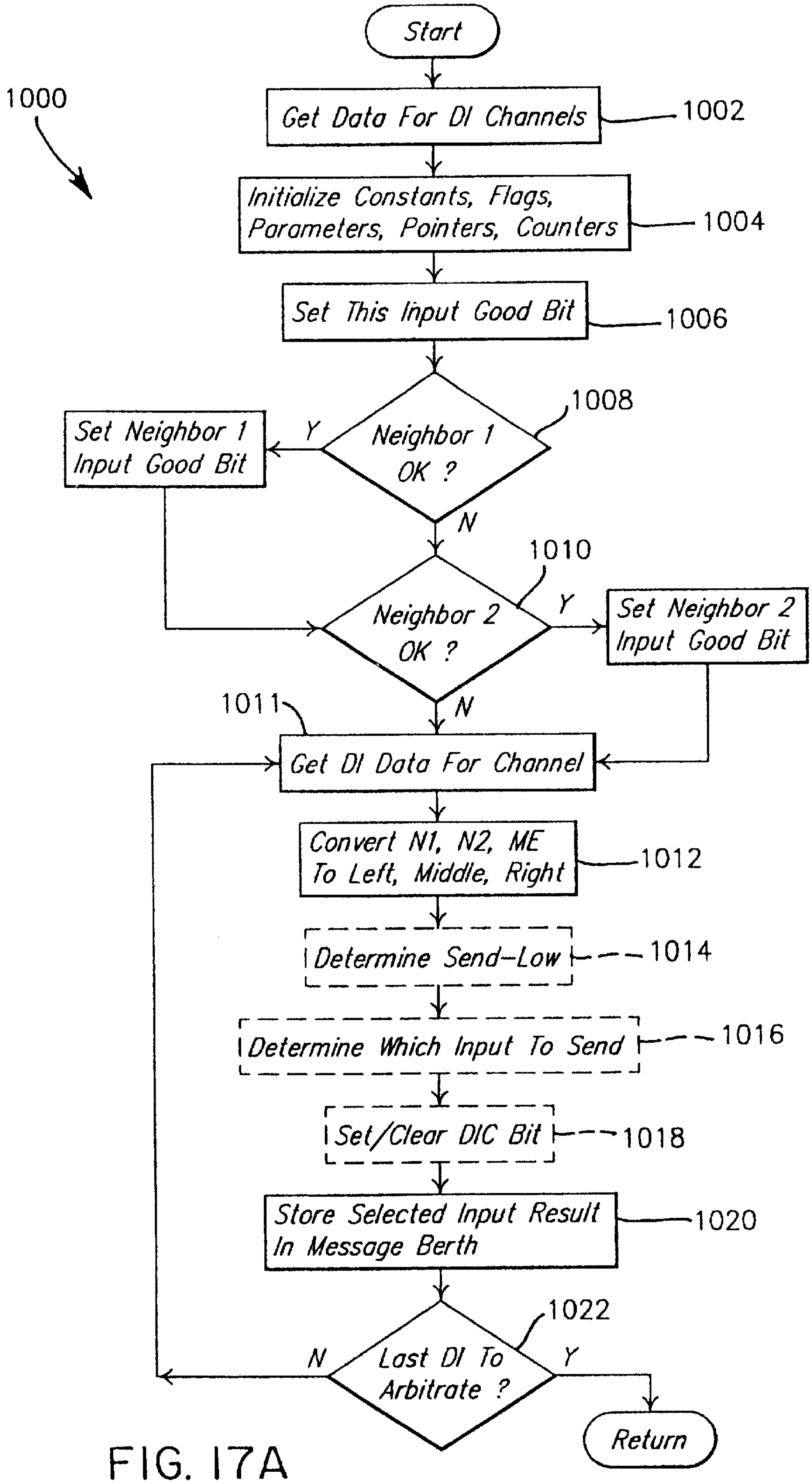
FIGS. 17A–17I comprise a set of flow charts which illustrate the arbitration methods according to the present invention for digital input and output values.

FIG. 17A shows an overall flow chart 1000 for the arbitration of digital input data. Block 1002 indicates that the data values for the first 10 digital input channels are loaded into memory. These data values were obtained from the multiplexor U9 of the controller 100 shown in FIG. 6I. Then, various constants, pointers and counters are initialized to set up the arbitration process (block 1004). Assuming that the digital input circuits are contained on the controller circuit board or the microprocessor U40 detects that a chassis mounted digital input circuit is plugged in, then a "good bit" is set to indicate that valid data is available (block 1006).

Diamonds 1008–1010 test whether valid neighbor to neighbor communication messages have been received at the controller (e.g., using a checksum calculation). In other words, the controller 92 will test to see if valid data passing messages have been received from the controllers 94–96, while the controller 94 will test to see if valid data passing messages have been received from the controllers 92 and 96. Next, the controller will "get" the valid digital input values for the first channel (block 1011). Then, the valid digital input values for this channel will be converted from "N1" (e.g., controller 94), "N2" (e.g., controller 96) and "ME" (e.g., controller 92) values, to Left, Middle and Right values for arbitration software purposes (block 1012).

Figure 17B:
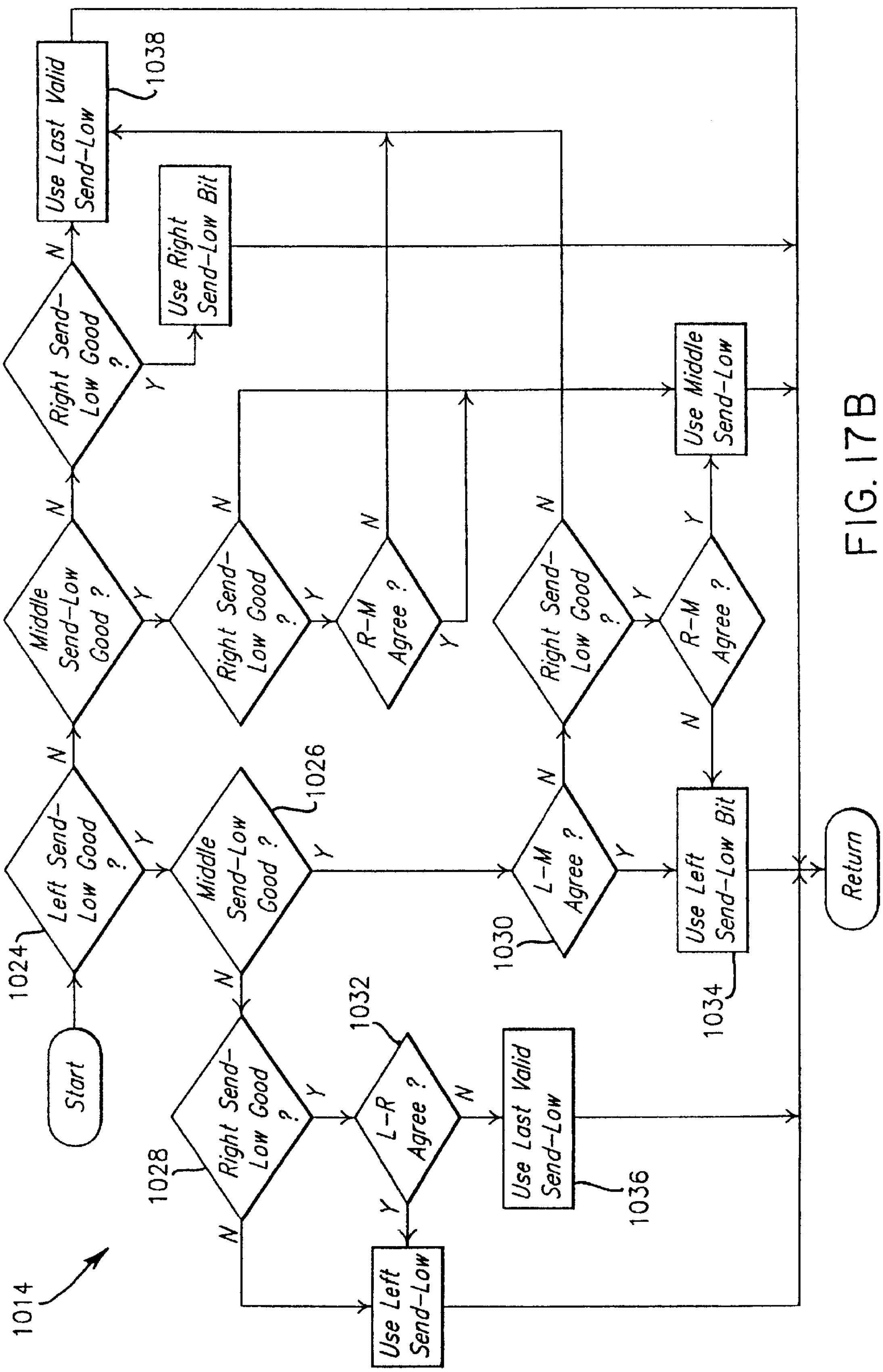
Figure 17C:
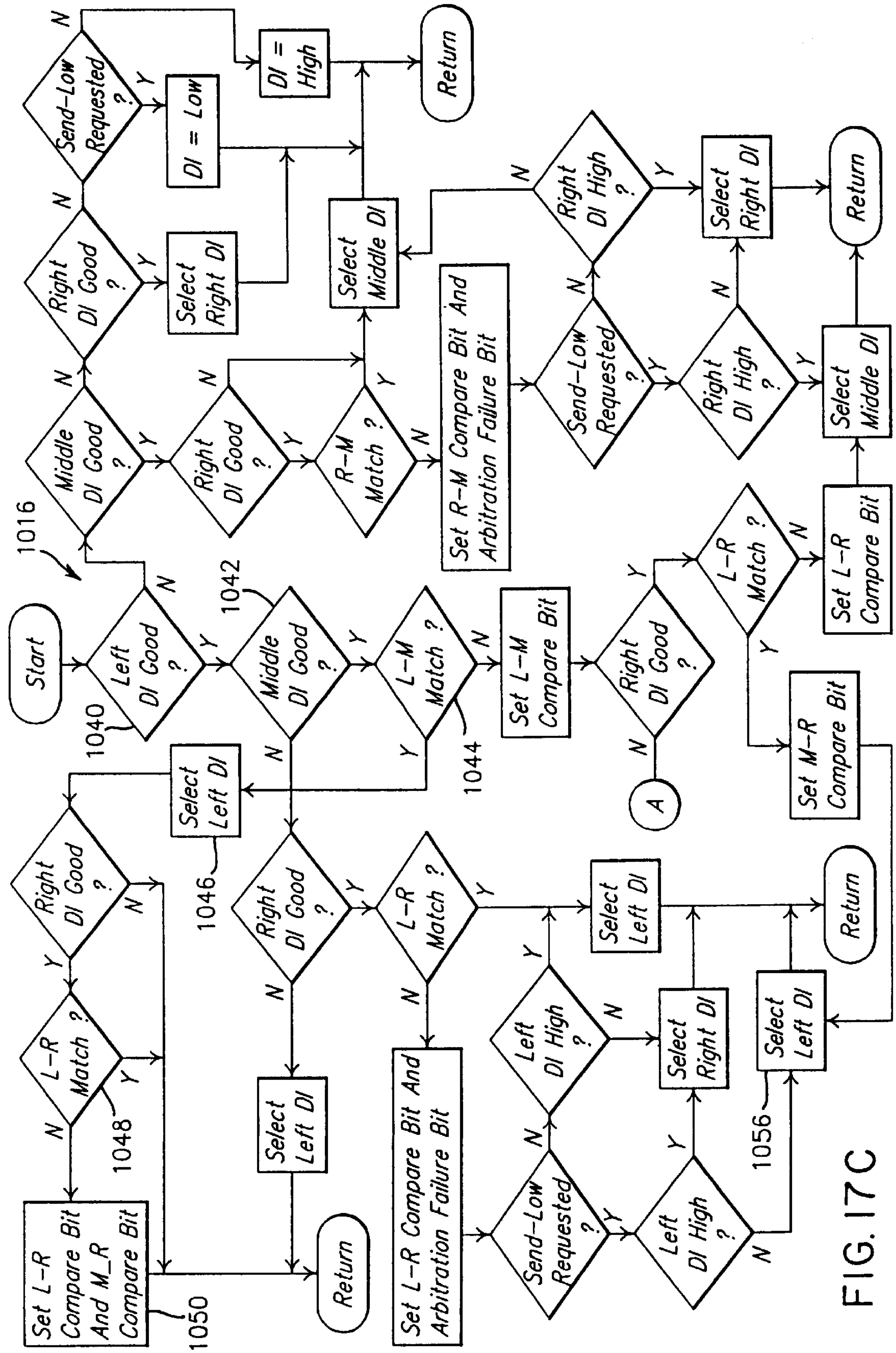
Figure 17D:
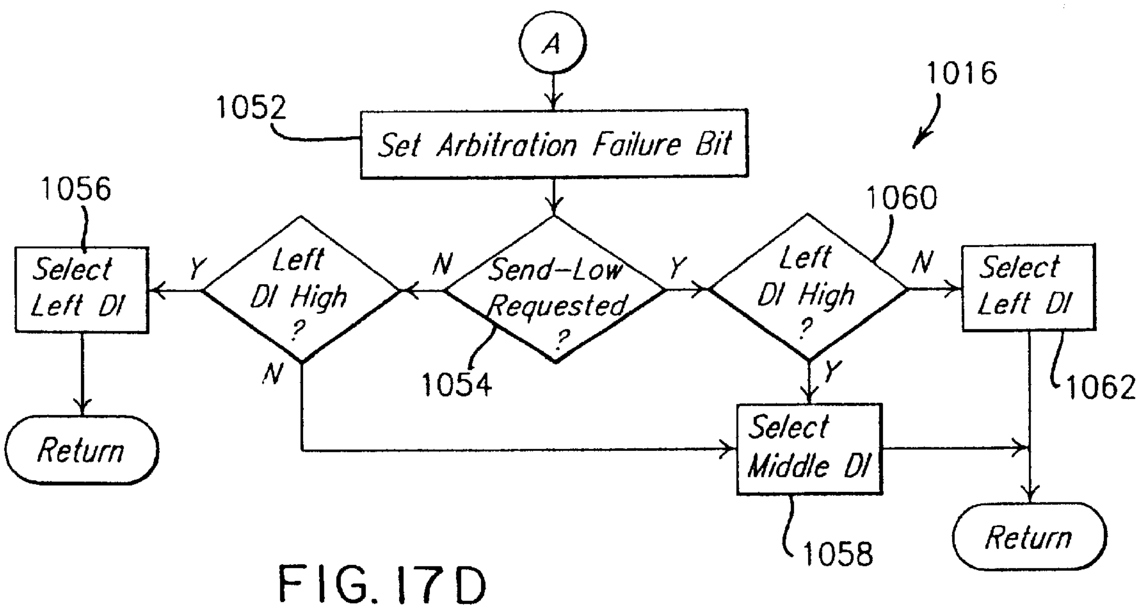
Figure 17E:
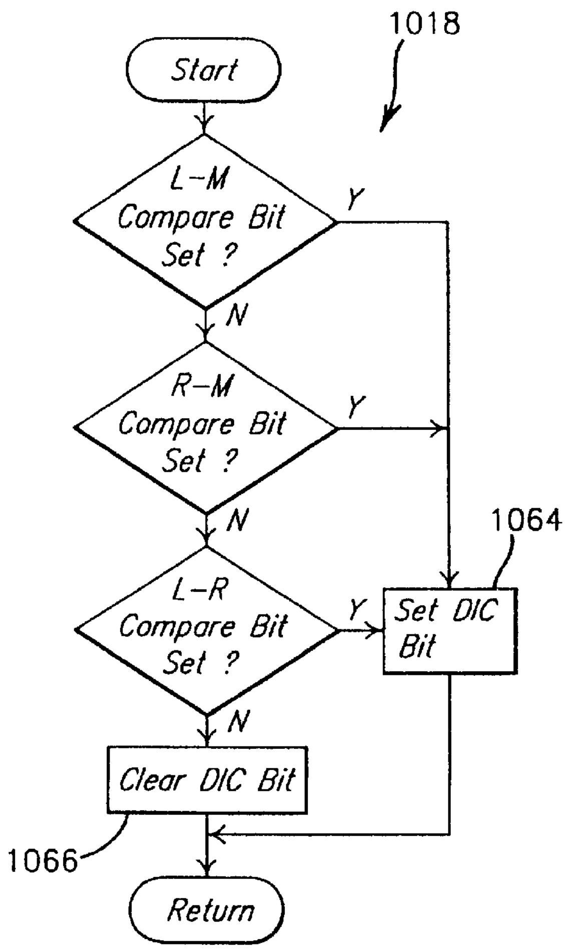

At this point, the flow chart 1000 shows a series of three broken-line boxes 1014–1018 which each represent a separate flow chart. Specifically, the "Determine Send-Low" block 1014 is shown in FIG. 17B, the "Determine Which Input to Send" block 1016 is shown in FIGS. 17C–17D, and the "Set/Clear DIC Bit" block 1018 is shown in FIG. 17E. Once the process steps shown in these flow charts are completed, then the arbitrated digital input value for the first channel is stored in a message buffer for transmission to the process control computer 14 (block 1020). The program then repeatedly loops back to get and arbitrate the next digital input channel until all of the digital input values have been arbitrated (block 1022). Again, it should be noted that this process is performed by each of the controllers 92–96, particularly where three process control computers 14 are provided. However, in the embodiment illustrated in FIG. 1, only the Left and Right controllers 92 and 96 transmit their arbitration result to their respective process control computers 14*a*–14*b*.

The flow chart 1014 of FIG. 17B is directed to determining whether a Low default value should be sent to the process control computer 14. In this regard, the flow chart 1014 checks to see if a valid Send Low bit is available for at least one of the Left, Middle and Right controllers 92–96 (e.g., diamonds 1024–1028). Then, the program checks to see if there is an agreement between the valid Send Low bit of two controllers (e.g., diamonds 1030–1032). If there is an agreement, then the Leftmost Send Low bit is used (e.g., block 1034). However, if there is a disagreement between valid Send Low bits when only two valid Send Low bits exist, then the state of the last valid Send-Low bit will be used (e.g., blocks 1036–1038).

The flow chart 1016 of FIGS. 17C–17D represents the primary arbitration routine for each of the digital input channels. While the process starts out testing the validity of the Left digital input (block 1040), it should be appreciated that the apparent bias toward the values of the Left controller 92 is not necessary, even though this selection promotes overall system and software uniformity. Assuming that the Left digital input value is valid, the Middle digital input value is checked for validity (block 1042). Then, assuming both values are good, and they match (block 1044), then the Left digital input value will be selected for transmission to the process control computer 14 (block 1046). In other words, if both the Left and Middle controllers 92–94 provide a High digital value, then the digital value stored in memory that represents the Left value will be sent to the data table of values which will ultimately be transmitted to the process control computer 14. Nevertheless, the process does not end at this point, as a Left-Right match determination is made (block 1048) if a valid digital input value is available from the Right controller 96. In the event that there is a disagreement (e.g., Left=High, Right=Low), then the Left-Right compare bit "DICLR" will be "set"; that is, the DICLR bit will be provided with a High/one value (block 1050). These specific compare bits may be counted and/or sent to the process control computer 14 with each process control cycle, so that an indication is available of continued disagreements. In this regard, the accumulated compare bits may be used to decide that a service call to the field should be made or that a particular digital input circuit board or controller 100 should be shut down in the appropriate circumstances.

The remaining portion of the flow chart 1016 generally follows the analysis discussed above. However, it should be noted that block 1052 indicates that an Arbitration Failure bit is set when there is a Left-Middle disagreement and the Right digital input value is not valid. At this point, diamond 1054 indicates that the program checks to see if the process control computer 14 has requested that a Low value be sent as the default value. If the answer is no, then the Left value will be selected if it is High (block 1056), and the Middle value will be selected if the Left value is Low (block 1058). This is because the Middle value must be High, as there was a disagreement with the "Low" Left value. If the Send-Low default value was requested, then the Left value will be checked first to see if it is High (block 1060). As blocks 1058 and 1062 indicate by implication, the Low value will ultimately be sent to the process control computer 14.

The flow chart 1018 of FIG. 17E is directed to determining the state of a general digital input compare bit "DIC". If a disagreement between any two valid digital input values has been detected from the state of the specific compare bits, then the DIC bit will be set (block 1064). Otherwise the DIC bit will be cleared (block 1066).

Referring to FIGS. 17F–17I, the arbitration method for the digital output values will now be described. In this regard, it will be seen that the flow charts of FIGS. 17F–17I generally follow the analysis discussed above for the arbitration of digital input values. Thus, for example, the flow chart 1068 of FIG. 17F corresponds to the flow chart 1000 of FIG. 17A, and the flow chart 1070 of FIG. 17G corresponds to the flow chart 1014 of FIG. 17B. However, in the case of flow chart 1070, the determination is made as to whether a "Fail-Last" request has been sent to the field computer unit 12 from the process control computer 14.

Figure 17I:
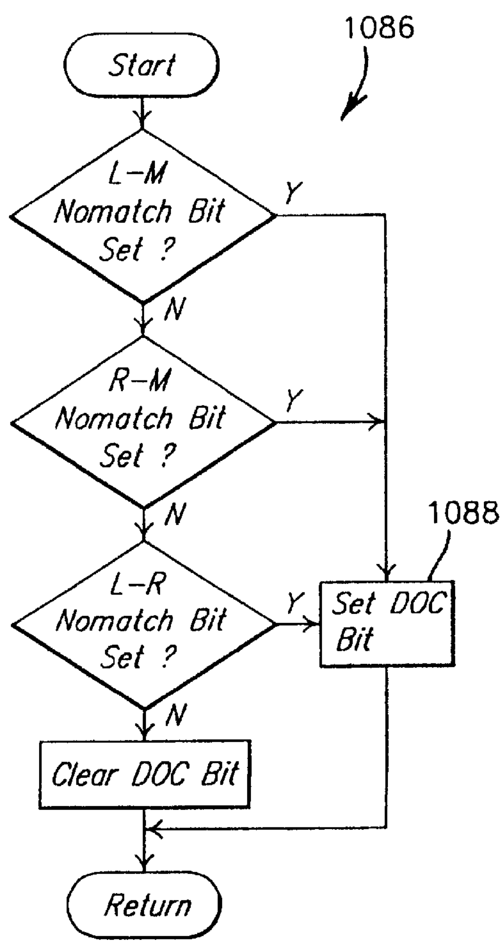
Figure 17F:
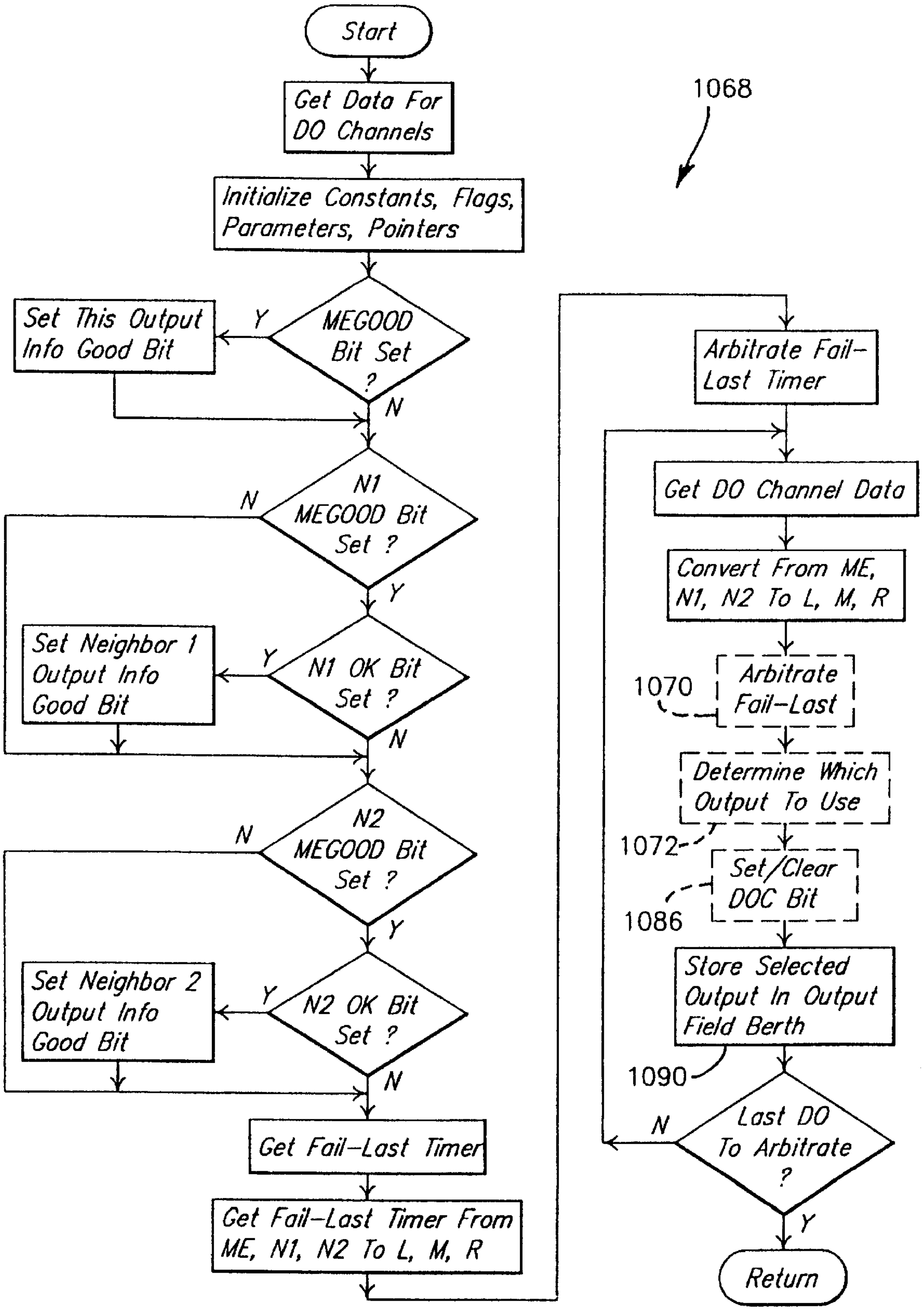
Figure 17G:
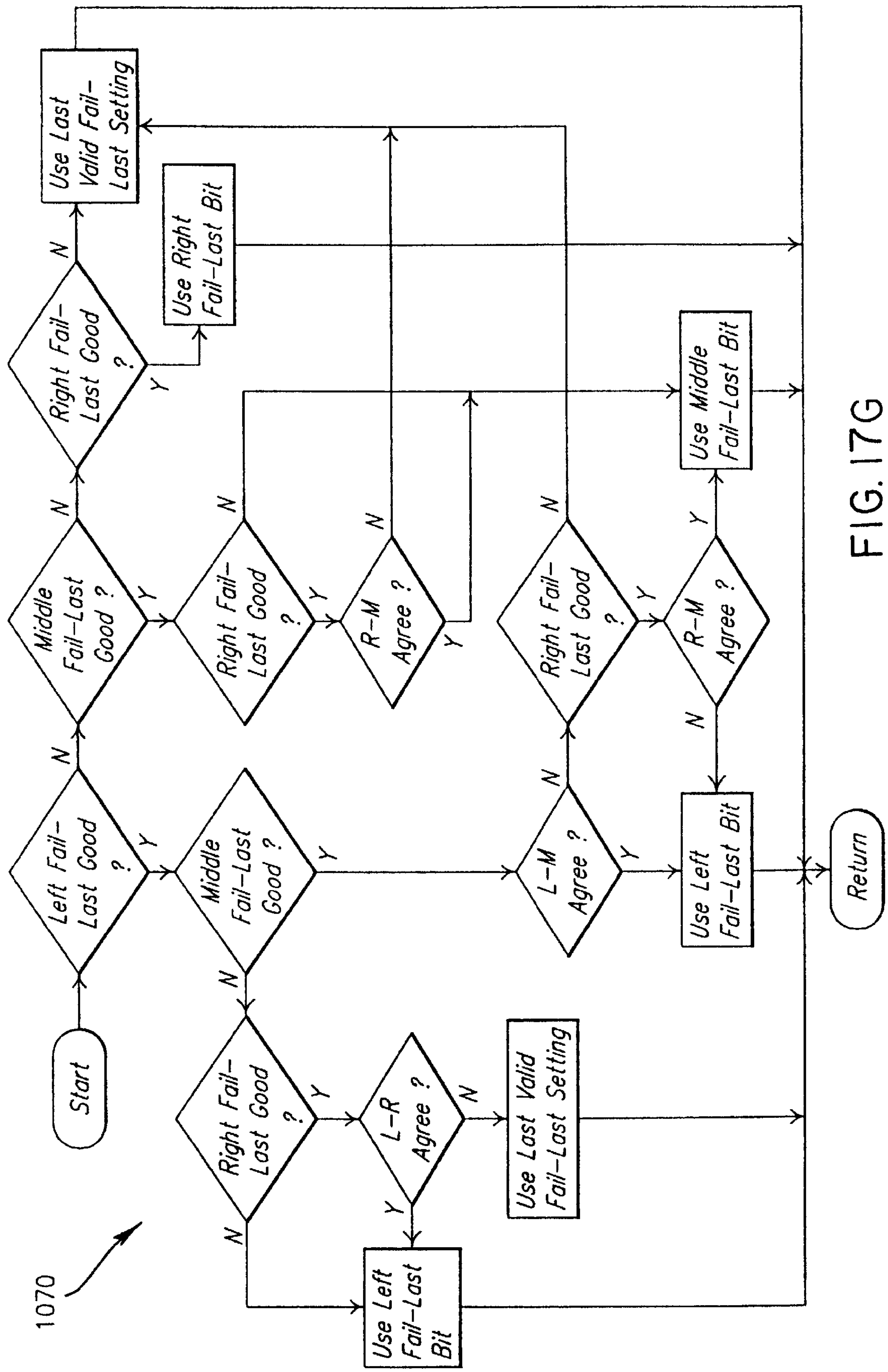
Figure 17H:
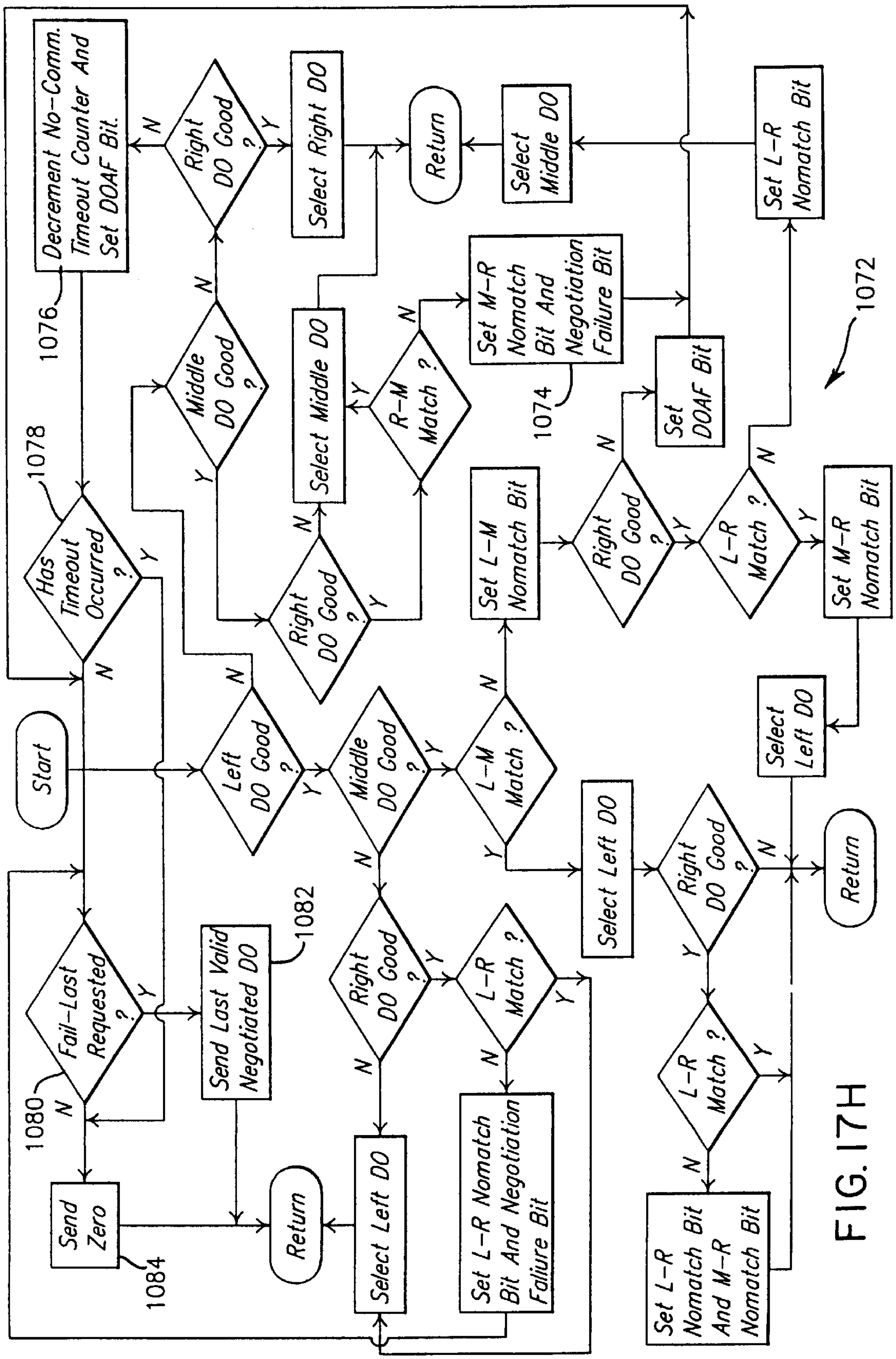

The flow chart 1072 of FIG. 17H provides the primary arbitration routine for each of the digital output channels. As the selection of digital outputs generally follows the analysis described in connection with the selection of digital inputs, only a few comments need to be made. Specifically, block 1074 indicates that a specific "Nomatch" bit (i.e., the Compare bit) and a "Negotiation Failure" bit (i.e., the "DOAF" bit) will both be set when the only two valid digital output values are not the same. Additionally, block 1076 indicates that the "DOAF" bit will be set in the event that none of the Left, Middle and Right digital output values are valid.

Block 1076 also indicates that the present invention provides a mechanism in response to a failure of communications. Specifically, a programmable "timeout counter" will be decremented from an initial value, which would otherwise prevent any change in output status to be made until communications have been re-established. In this regard, a desired timeout value may be transmitted from the process control computer 14, which would then be arbitrated by the controllers 92–96 for use as a fail safe timeout counter for all digital and analog outputs. For example, this timeout value may represent the number of seconds before moving from a fail-last status to a fail-safe status. Diamond 1078 is used to test whether a timeout has occurred (e.g., a zero counter value). If the timeout has not yet occurred, then diamond 1080 tests whether a Fail-Last default value has been requested. If the Fail-Last default value has been requested, then block 1082 indicates that the last arbitrated digital output value will be sent to the field (e.g., digital output circuit 500). If the Fail-Last default value has not been requested, then a Fail-Safe value (e.g., a Low, zero or de-energized state) will be sent to the field (block 1084). If a timeout condition has occurred, then diamond 1078 and block 1084 indicate that a Fail-Safe value is sent to the field.

The flow chart 1086 of FIG. 17I generally corresponds to the flow chart 1018 of FIG. 17E. However, block 1088 indicates that a general digital output compare bit "DOC" will be set if a disagreement was found between any two controller values for the particular digital output channel being processed. Finally, block 1090 of FIG. 17F indicates that the selected digital output value will be stored in a memory table location for subsequent transmission to the appropriate digital output circuit channel.

Figure 18A:
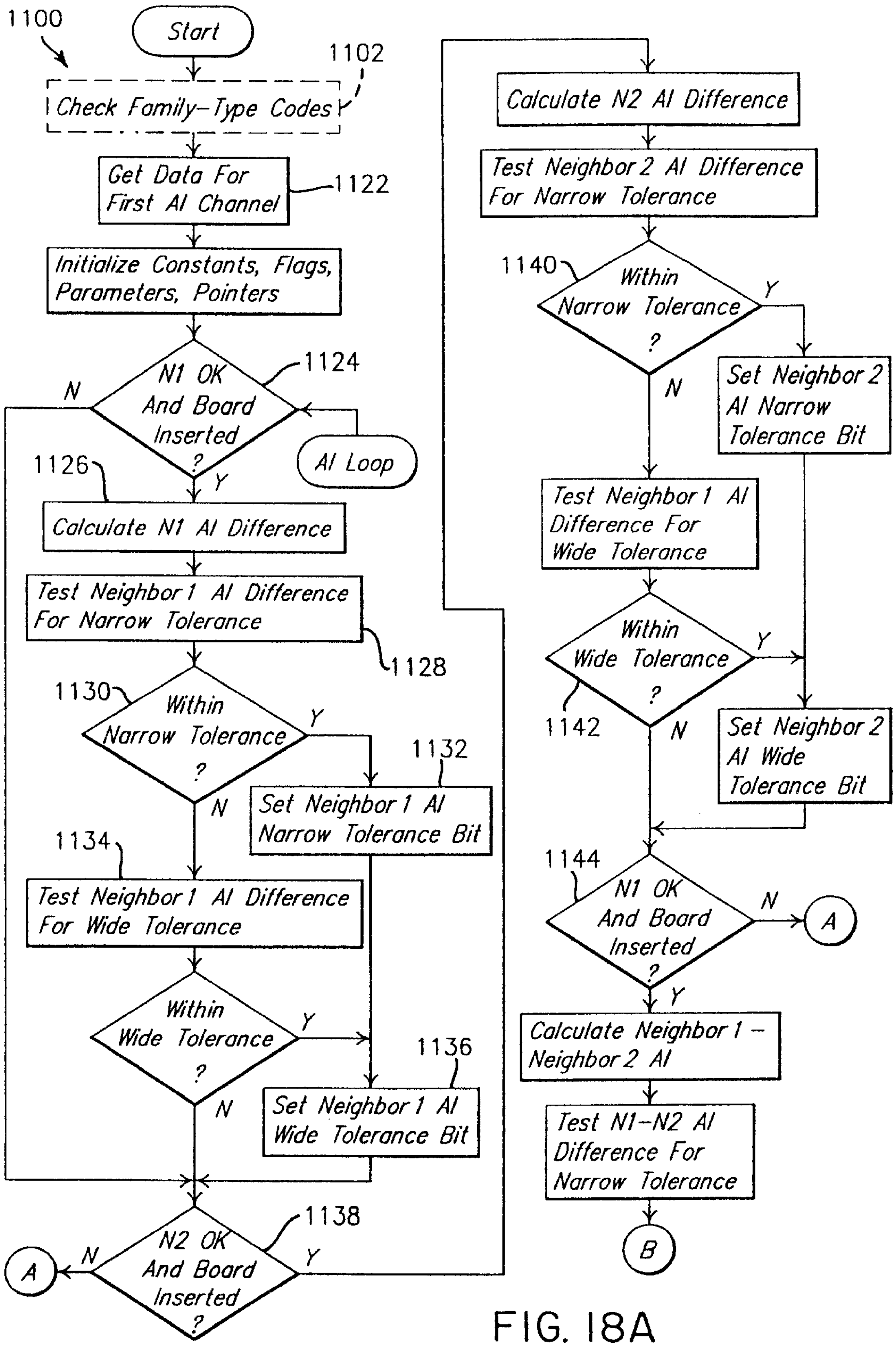
FIGS. 18A–18T comprise a set of flow charts which illustrate the arbitration methods according to the present invention for analog input and output values.
Figure 18B:
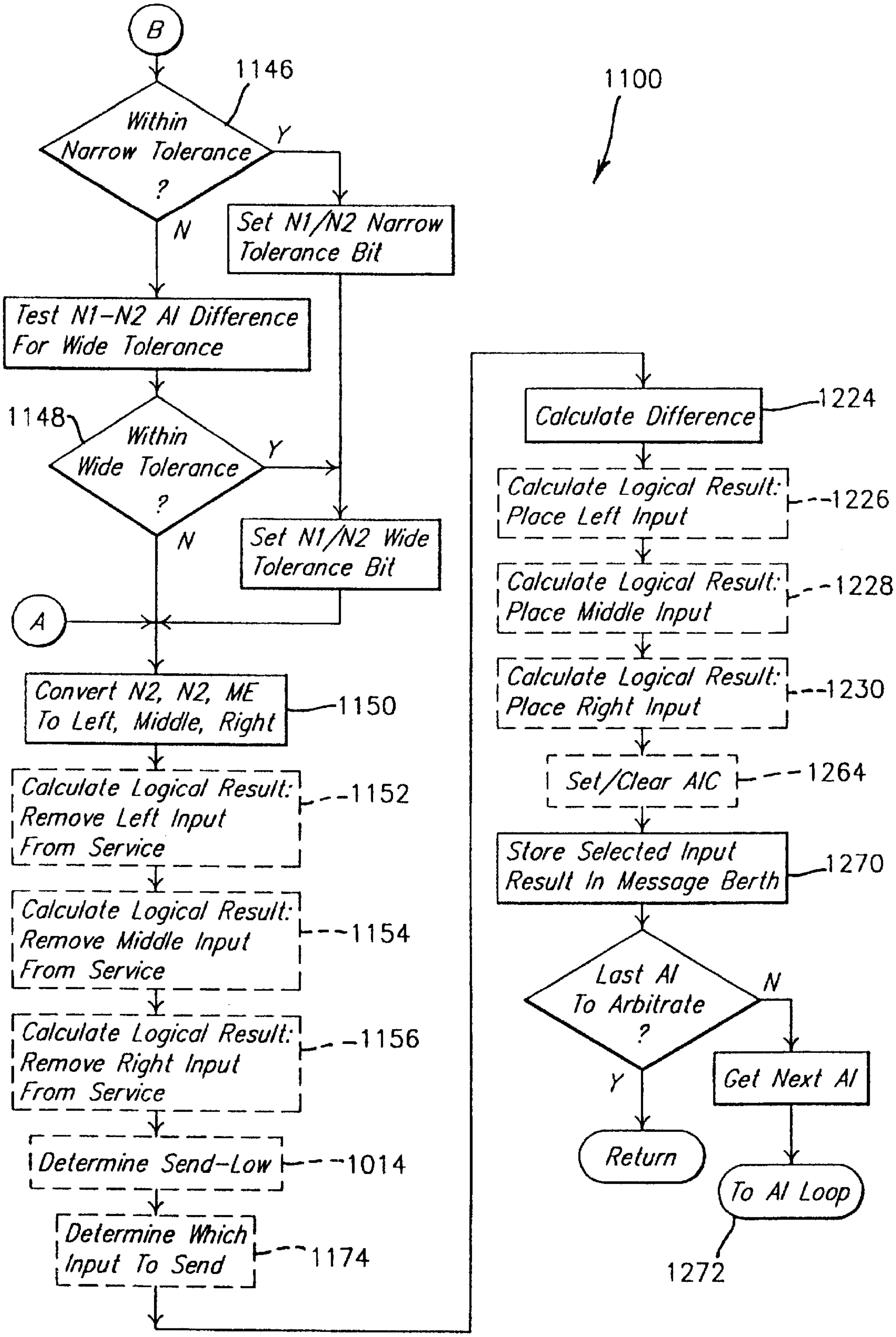
Figure 18C:
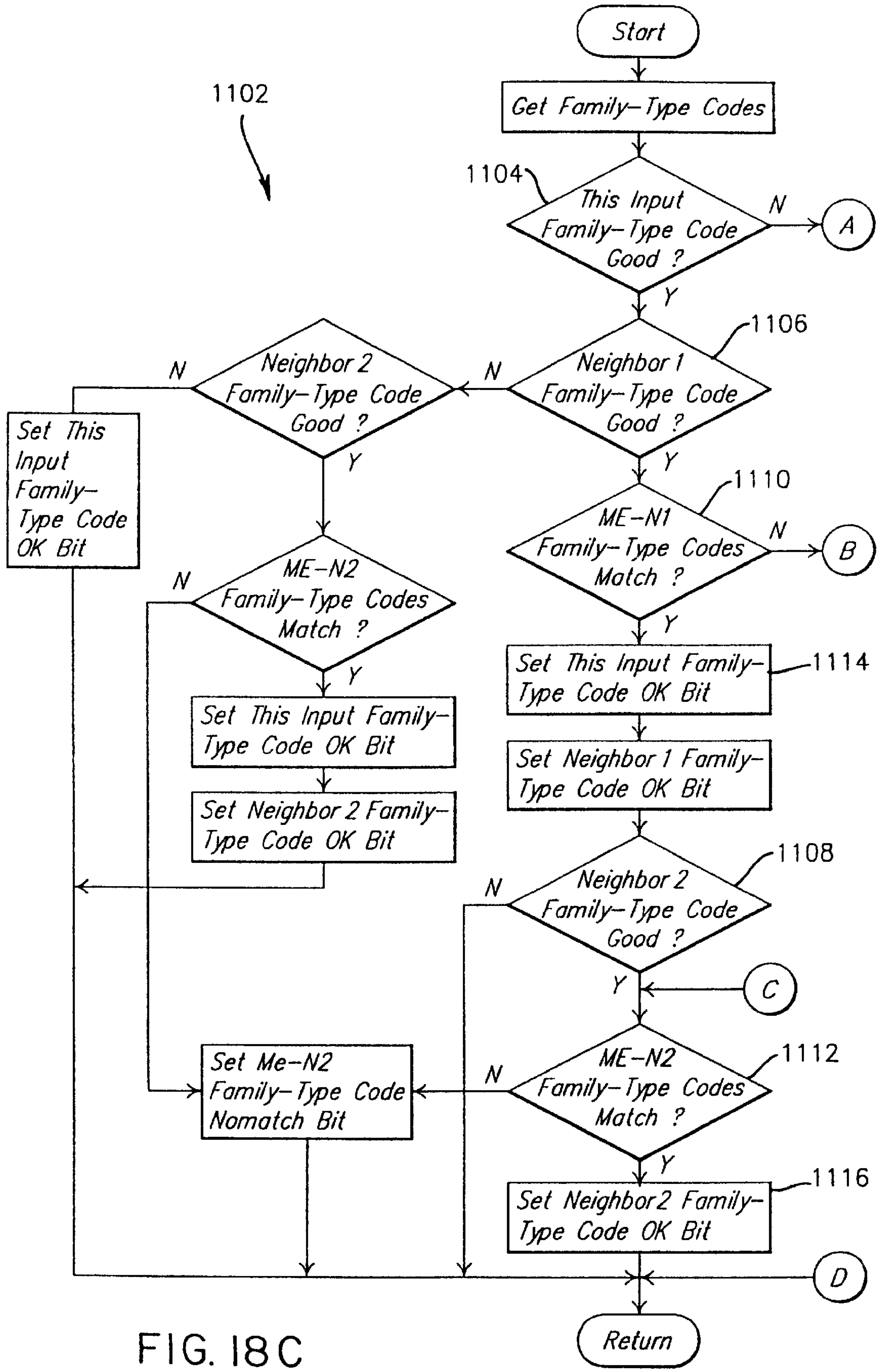
Figure 18D:
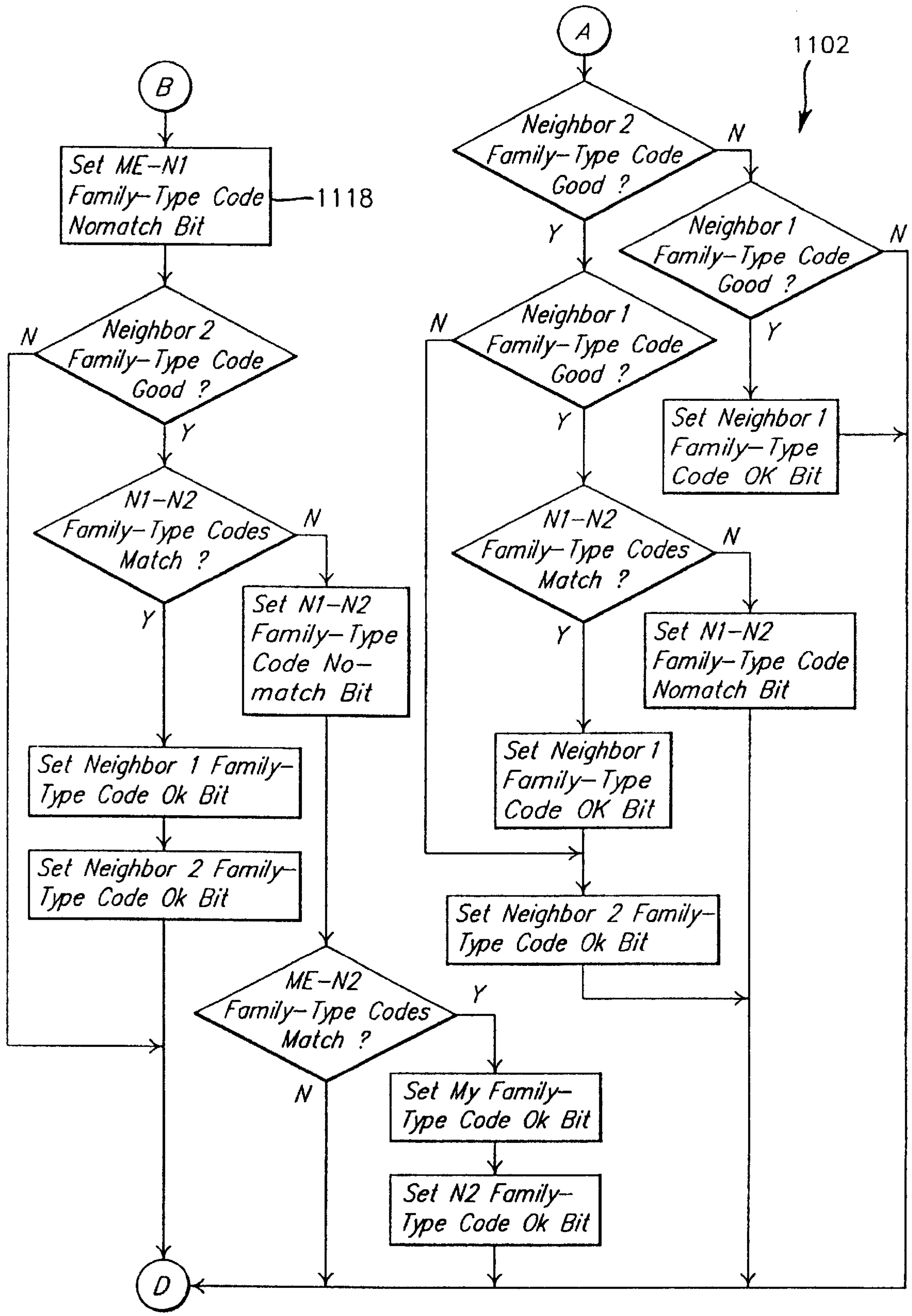
Figure 18E:
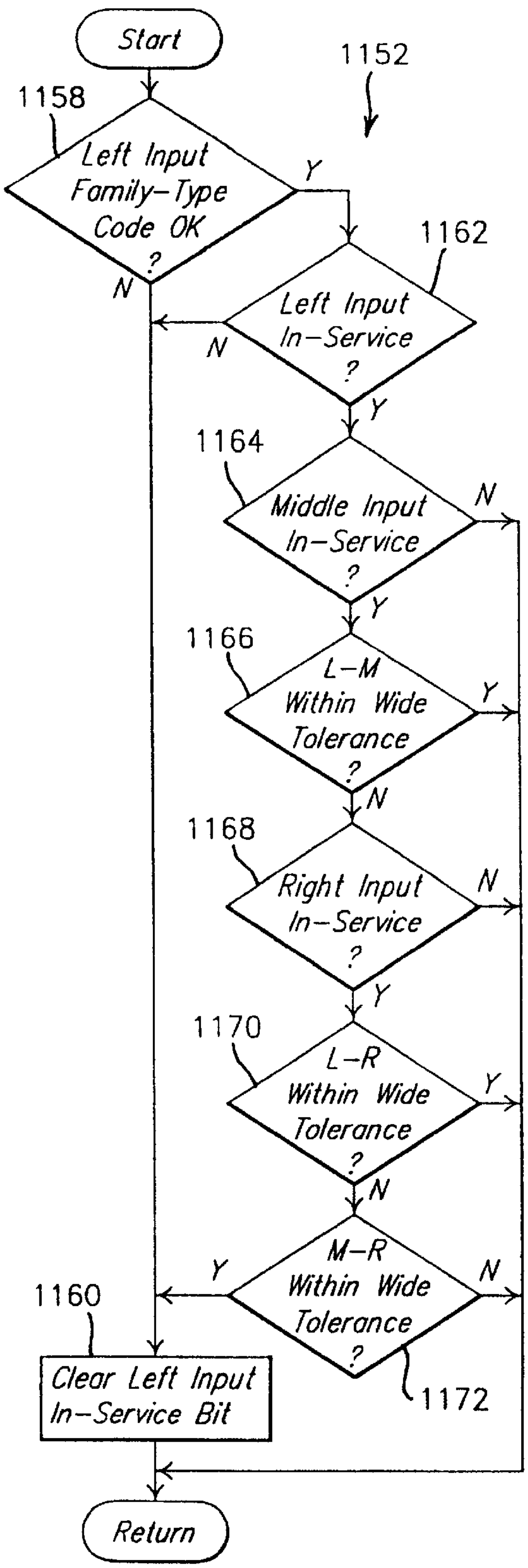
Figure 18F:
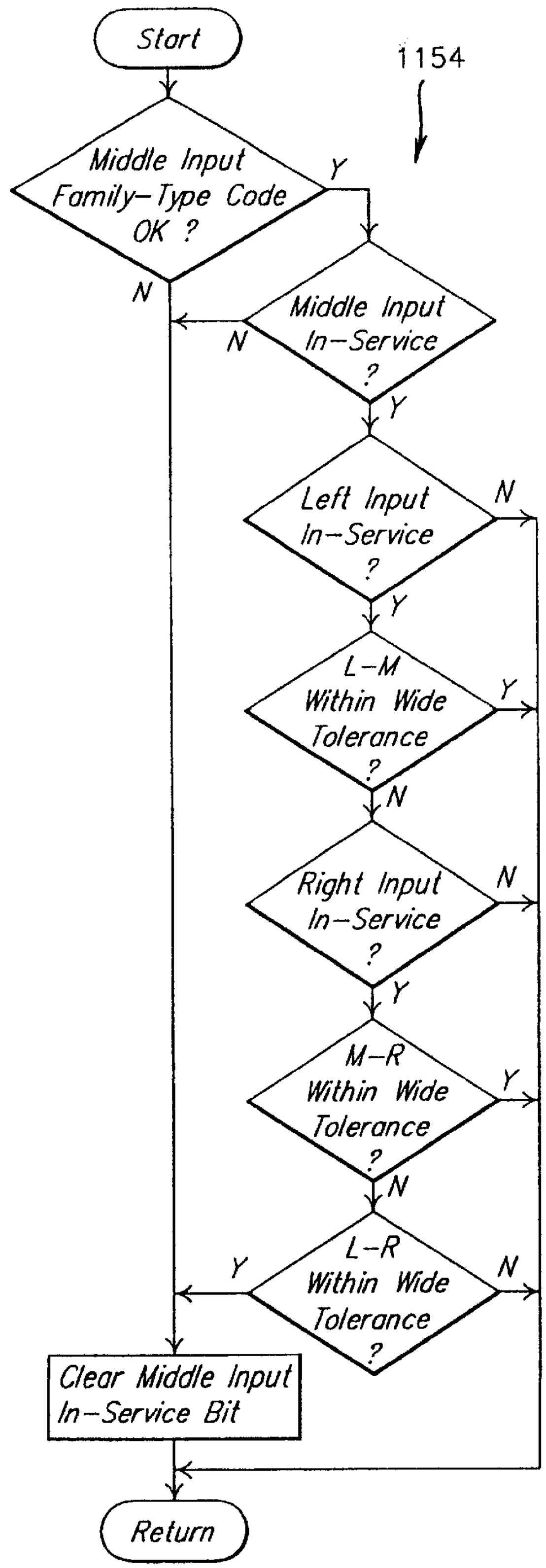
Figure 18G:
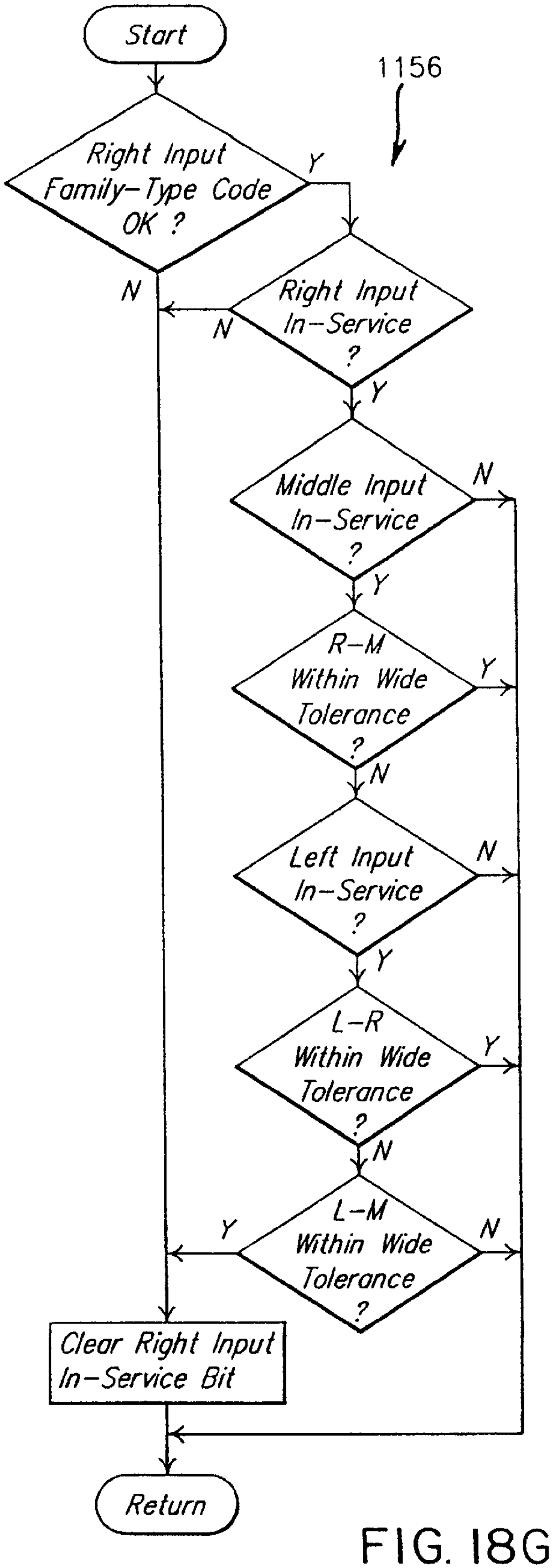
Figure 18N:
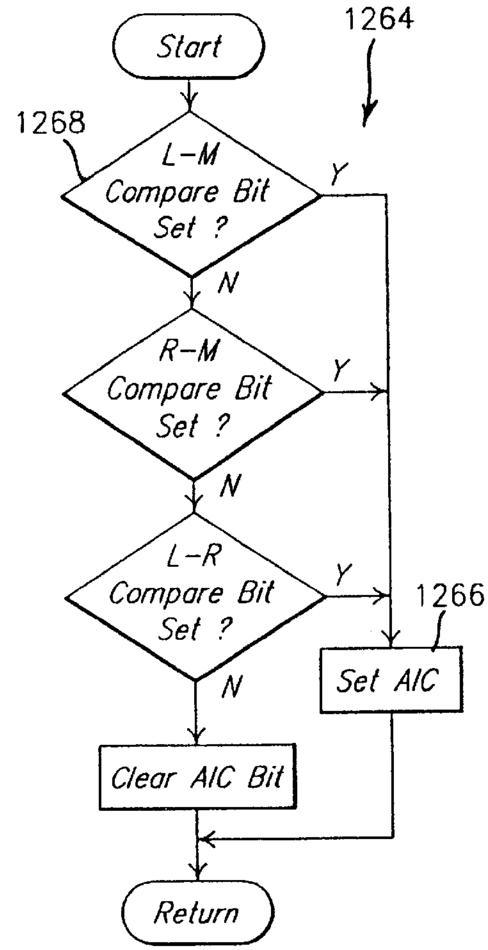

Turning to FIGS. 18A–18N, the flow charts for the arbitration of analog input data will now be described. In this regard, FIGS. 18A–18B combine to show an overall flow chart 1100 for the arbitration of analog input data. As an initial procedure, block 1102 indicates that the program checks the Family-Type codes from each of the three analog output circuits 600–604. The detailed process steps represented by block 1102 are shown in FIGS. 18C–18D. Specifically, the program routine starts by checking to see if valid Family-Type codes were received from each of the two sets of analog input circuits (e.g., diamonds 1104–1108). Then, the program determines whether or not there is a match between the Family-Type codes for the controller conducting the arbitration and the Family-Type codes for the other two controllers (e.g., diamonds 1110–1112). If a match is found, then a specific "OK" bit is set in each instance (e.g., blocks 1114–1116). However, if a particular match was not found, such as for the "ME" and "Neighbor1" codes, then a "Nomatch" bit may be set (block 1118 in FIG. 18D).

Now that the controller conducting the arbitration method knows how to process the analog input data, the program flow jumps back to block 1122 of FIG. 18A in order to obtain the data values from the three analog input circuits for the first channel. Diamond 1124 indicates that the program then conducts several tests relative to the Neighbor1 analog input circuit. Specifically, the controller conducting the arbitration checks to see if the Neighbor1 circuit board is inserted and if a complete communication message has been received from the controller for the Neighbor1 analog input circuit. In this regard, it should be noted that this may be achieved by looking to see if the "OK" bit has been set for the Family-Type codes of the ME and N1 boards.

Next, the difference between the analog value received by the controller conducting the arbitration and the analog value received from the Neighbor1 analog input circuit (through a Neighbor to Neighbor communication message) is determined (block 1126). This difference in analog values is then compared against a Narrow Tolerance threshold value (block 1130). The Narrow Tolerance value is dependent upon the particular type of analog input sensing hardware being used. For example, for a sensor providing a 4–20 ma current loop input value, the Narrow Tolerance value may be set to 0.6%. In other words, if the "ME" value was 10.0 ma and the Neighbor1 value was between 9.88–10.12 ma, then these values would be determined to be within Narrow Tolerance agreement. Substantially tighter Narrow Tolerance values may be employed with other analog input values which are quite stable, such as those derived from thermocouples.

Block 1132 indicates that the Neighbor1 Narrow Tolerance bit will be set in the event that there is Narrow Tolerance agreement. However, if the Neighbor1 value was outside of the Narrow Tolerance range, then a test will be made to determine if this value is at least within a Wide Tolerance value (block 1134). The Wide Tolerance value is a suitably less strict value, such as a value which is double that of the Narrow Tolerance value. As will be seen below, the Narrow Tolerance value test is used to initially qualify an input channel for arbitration, referred to herein as being "in service". In contrast, the Wide Tolerance test is used to permit a previously qualified input channel to remain in service. Assuming that the "ME" value and the Neighbor1 value are sufficiently in agreement, then the Wide Tolerance bit will be set (block 1136). Regardless of outcome of this decision, the program will then proceed to test the Neighbor2 value in the same way that the Neighbor1 value was tested (e.g., diamonds 1138–1142), assuming that the Neighbor2 analog input circuit board was inserted. Then, assuming that both the Neighbor1 and Neighbor2 analog input circuit boards were inserted and the necessary Neighbor to Neighbor communication messages were received, then the analog input values from these two circuits will be subjected to the Narrow Tolerance and Wide Tolerance value tests (e.g., diamonds 1144–1148). The ME, Neighbor1 and Neighbor2 values will then be converted to Left, Middle and Right values for software arbitration purposes (block 1150).

Next, a set of "in service" test routines is provided for each of the Left, Middle and Right analog input values, as indicated by blocks 1152–1156. Each of these routines are used to determine whether these values should remain in service. The significance of the "in service" designation is that a value must first be judged to be in service before it may be used in the primary arbitration routine. FIG. 18E provides a flow chart for the block 1152, FIG. 18F provides a flow chart for the block 1154 and FIG. 18G provides a flow chart for the block 1156. Due to the similarity between these three flow charts, only the flow chart 1152 for the Left analog input value will be discussed.

As will be seen from the flow chart 1152 of FIG. 18E, the program starts off with an assumption that the "In-Service" bit for the Left input value is already set. However, if the Family-Type code for the Left input value is wrong (diamond 1158), then the In-Service bit will be cleared (block 1160). Assuming that the Family-Type code is correct, then the program will check to see if the In-Service bit for the Left input value is presently set (diamond 1162). Assuming that the In-Service bit is set, then the In-Service bit for the Middle input value will be checked (diamond 1164). Assuming that the In-Service bit for the Middle input value is set, then the program will check to see if the L-M Wide Tolerance bit was set (diamond 1166). If the Wide Tolerance test was satisfied, then the Left In-Service bit will remain set. Otherwise, the Right input value will be tested in the same way, as indicated by diamonds 1168–1170. If the L-R Wide Tolerance bit was not set, then the M-R Wide Tolerance bit will be examined (diamond 1172). If the series of tests represented by diamonds 1166–1172 all fail, then the Left In-Service bit will be cleared (block 1160).

After the "in service" designation has been tested for each of the Left, Middle and Right values, then the flow chart 1100 of FIG. 18B proceeds to block 1014. In this regard, it should be noted that block 1014 references the same flow chart as that shown in FIG. 17B for digital inputs. Accordingly, it should be appreciated that the process of determining whether the process control computer 14 has requested a Low input value in the event of a default condition is the same for both digital inputs and analog inputs.

Figure 18H:
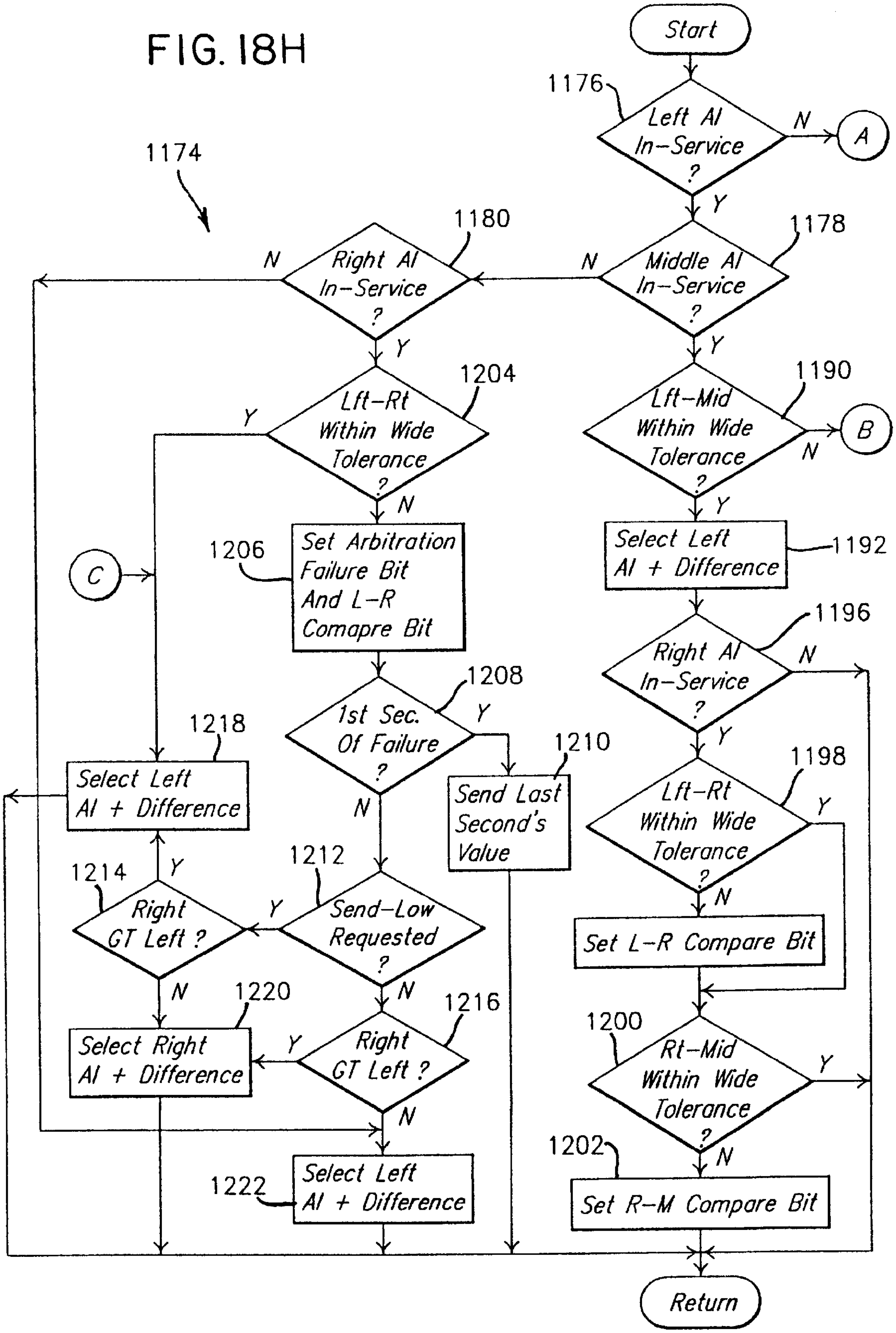
Figure 18I:
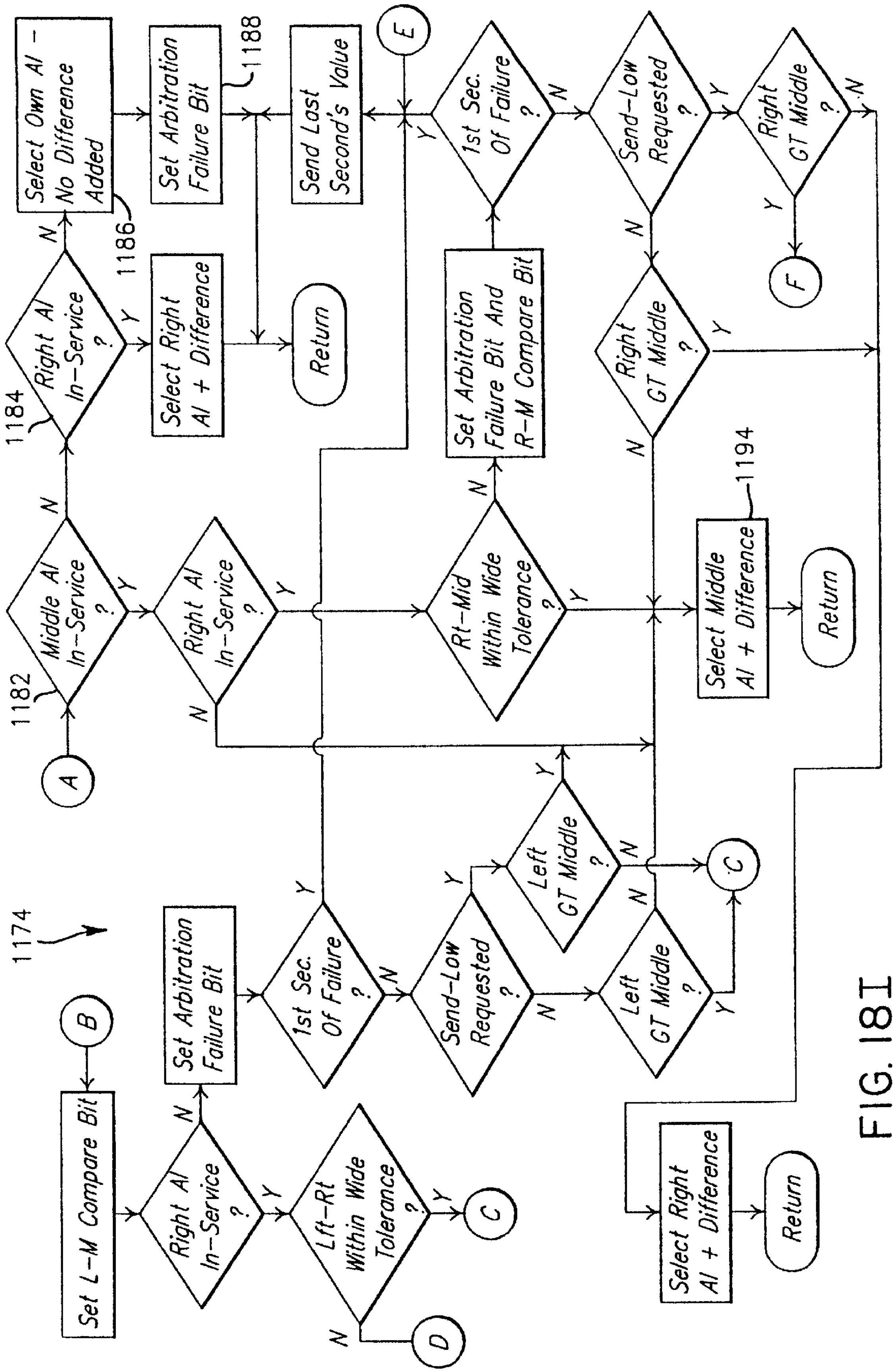
Figure 18J:
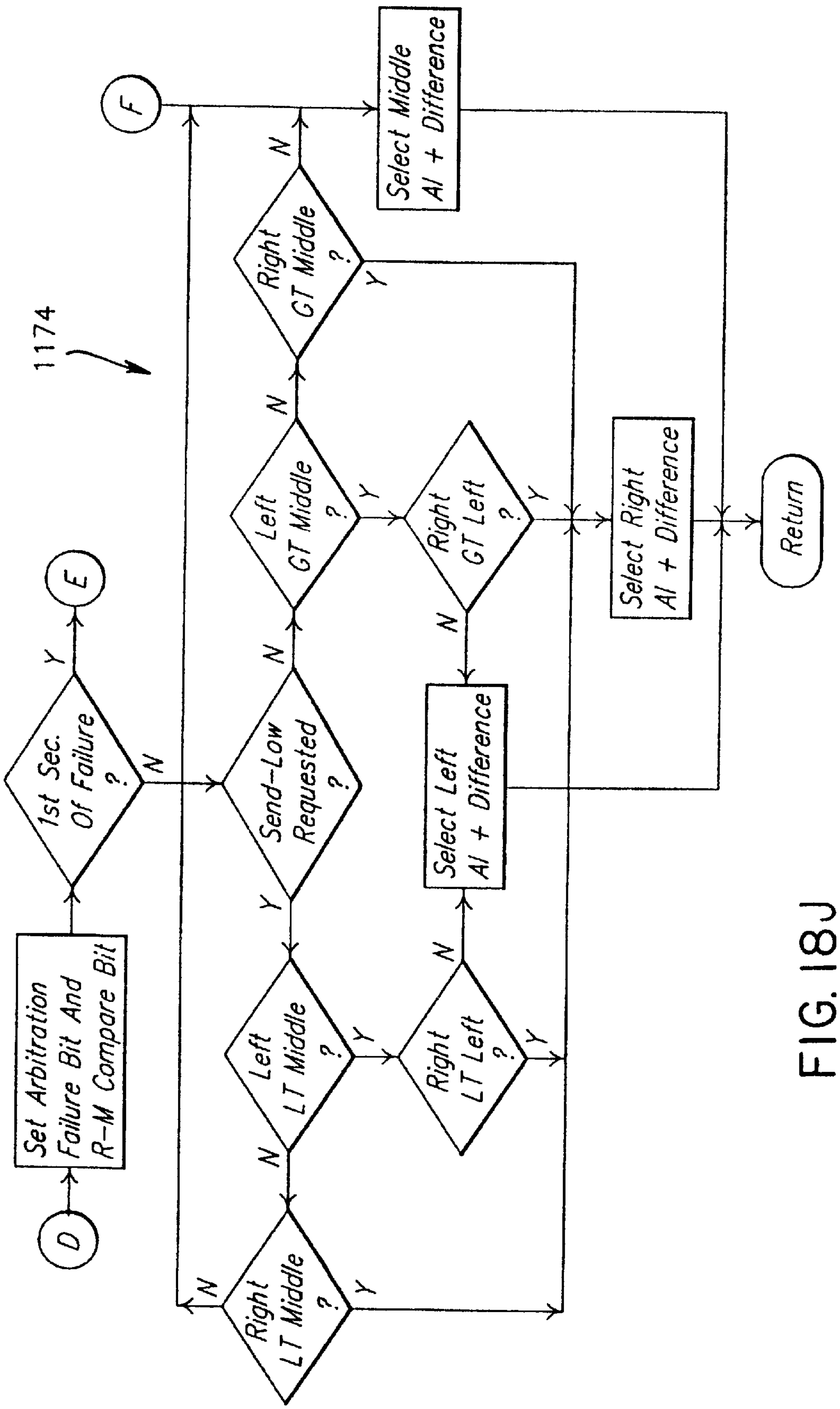

The analog input arbitration process then proceeds to the primary selection routine, which is indicated by block 1174 in FIG. 18B. The flow chart represented by block 1174 is collectively shown in FIGS. 18H–18J. The program will first check to see if any of the Left, Middle or Right values are in service (e.g., diamonds 1176–1180 in FIG. 18H and diamonds 1182–1184 in FIG. 18I). If none of these values are in service for the analog input channel being processed, then the controller performing the arbitration will select its own value (block 1186) and the Arbitration Failure bit will be set (block 1188). However, if both the Left and Middle values were found to be in service (from their respective In Service bit settings), then these two values would be subjected to the Wide Tolerance value test (diamond 1190). Assuming that the Left and Middle values were in sufficient agreement, then the Left value would be selected (block 1192).

Importantly, block 1192 also indicates that a value labeled "Difference" is added to or subtracted from the Left value selected. The summation of the value selected with the Difference value is used to avoid a process bump in the event of a failure, as explained below. If the Left analog input value was selected during the last process cycle, then the Difference value will be zero and the Left value from the present process cycle will be sent to the process control computer 14 without modification. However, if the Left value was found to be out of service during the present cycle, and the Middle value was selected for transmission to the process control computer 14 (e.g., block 1194 in FIG. 18I), the Difference value provides an "offset" that may be added to or subtracted from the Middle value before transmission of the resulting value to the process control computer 14.

Thus, assuming for example that the Left in service value for the last process control cycle was 10.00 ma and the Middle in service value was 10.05 in the same process cycle, then a valid of 10.00 ma would still be transmitted to the process control computer 14. However, if the Left value in the next process control cycle was unavailable and the Middle in service value was selected for this cycle, then the 0.05 Difference value from the last process control cycle would be subtracted from the present Middle in service value by the controller performing the arbitration. In other words, if the present Middle in service value was 10.12, then 0.05 from this amount and the analog input value for this channel would be transmitted to the process control computer 14 as 10.07 ma. As each of the controllers 92–96 perform the arbitration process shown in FIGS. 18H–18J, it should be understood that these controllers will know the specific Difference value that should be added or subtracted from the present Middle in service value selected prior to transmission of this analog input value to the process control computer 14. Alternatively, it should be appreciated that the Difference value could be transmitted to the process control computer 14 to permit interpretation of the analog input values to be made by the process control computer.

Even though the Left value has been selected, the arbitration process does not end at this point. As illustrated by diamond 1196, the program proceeds to determine if the Right value is currently in service. Assuming that the Right value is in service, then the Wide Tolerance test is checked for both the Left-Right and Right-Middle value combinations (diamonds 1198–1200). If either of these tests fail, then the appropriate compare bit could be set, such as the specific R-M compare bit (block 1202). In this way, the process control computer 14 could ultimately be apprised of disagreements between in service analog input values. The number of these disagreements may be counted to enable a suitable response to be taken in the event of a continued disagreement, such as alerting an operator or even shutting down an affected controller 100 in the appropriate circumstances.

In the event that one of the three analog input values are not in service, such as the Middle value, then the program will proceed to a comparison between the two remaining in service values (e.g., block 1204). If these two in service values are in Wide Tolerance disagreement, then the Arbitration Failure bit will be set (block 1206). Additionally, block 1206 indicates that the specific compare bit affected could also be set. If this disagreement represents a new failure (block 1208), then the arbitration analog input value for the Last process control cycle will be sent to the process control computer 14 (block 1210). However, if this failure was present in the immediately preceding process control cycle, then the program will check to see if the process control computer 14 has requested a Low default value (diamond 1212). In either event, the program will test to see which one of the two in service values is greater than the other (diamonds 1214–1216). If the Low value was requested, then blocks 1218–1220 indicate that the lower value of the two in service values will be sent. Similarly, blocks 1220–1222 indicate that the higher of the two in service values will be sent when the Select-Low bit for this analog input has not been set. In any event, it should be appreciated from blocks 1218–1222 that the Difference value may also be factored in during the arbitration process or it could be sent to the process control computer 14 along with the analog input value selected. As the remaining portions of FIGS. 18I–18J carry out a similar decision tree analysis as that described above for those times in which the Left and/or Middle values are not in service, no further discussion of these flow charts is necessary.

Referring again to FIG. 18B, a block 1224 indicates that a set of Difference values is calculated for use during the next process control cycle. Specifically, the difference between the actual value selected and each of the Left, Middle and Right values is calculated and stored. In the event that the Left value was selected, then the Difference value would be zero. However, in the example set forth above, the Difference value for the Left-Middle combination would be 0.05 ma. A similar Difference value is also calculated for the Left-Right and Middle-Right combinations, assuming that these values were also in service at the time.

Figure 18K:
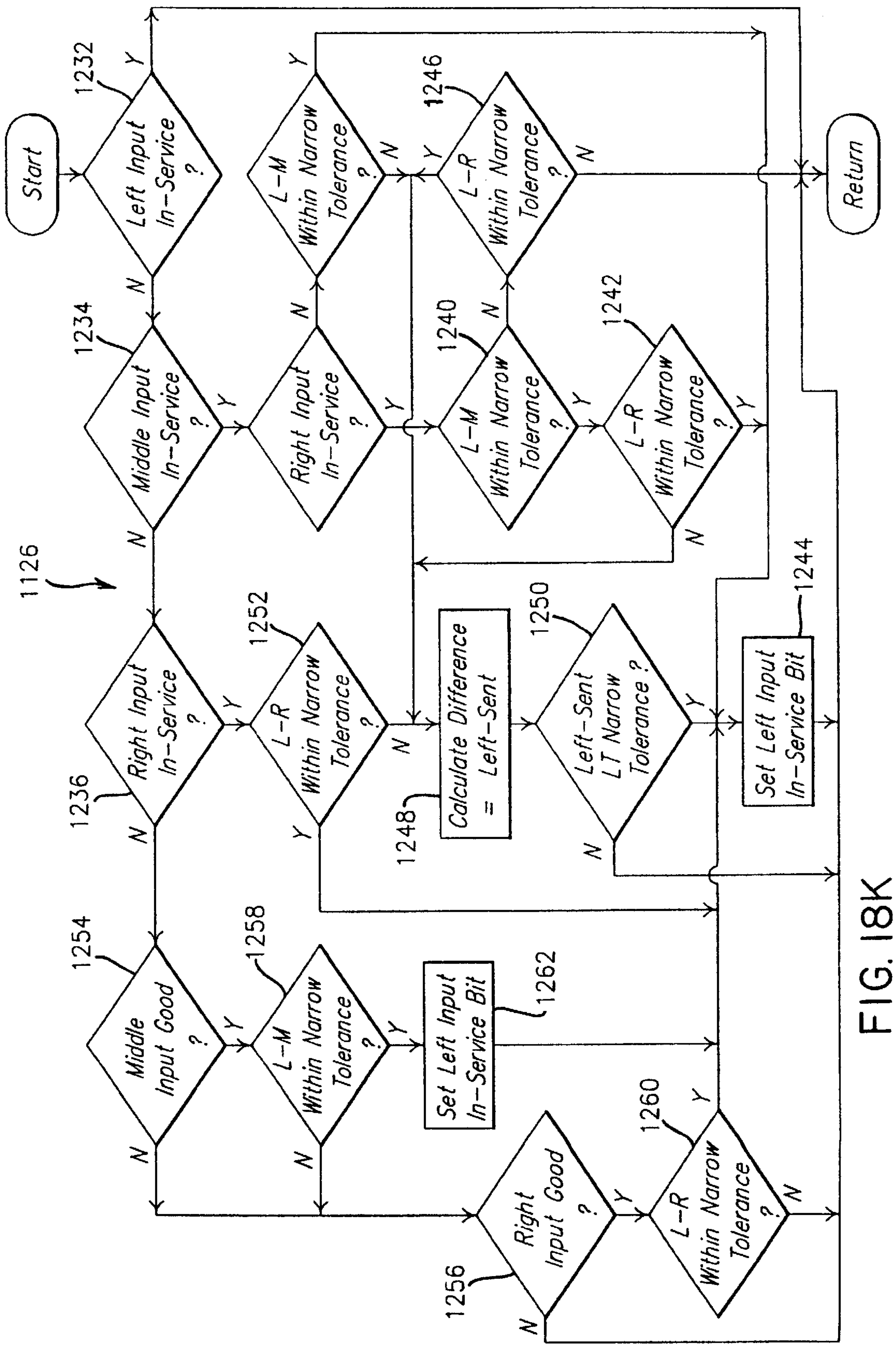
Figure 18L:
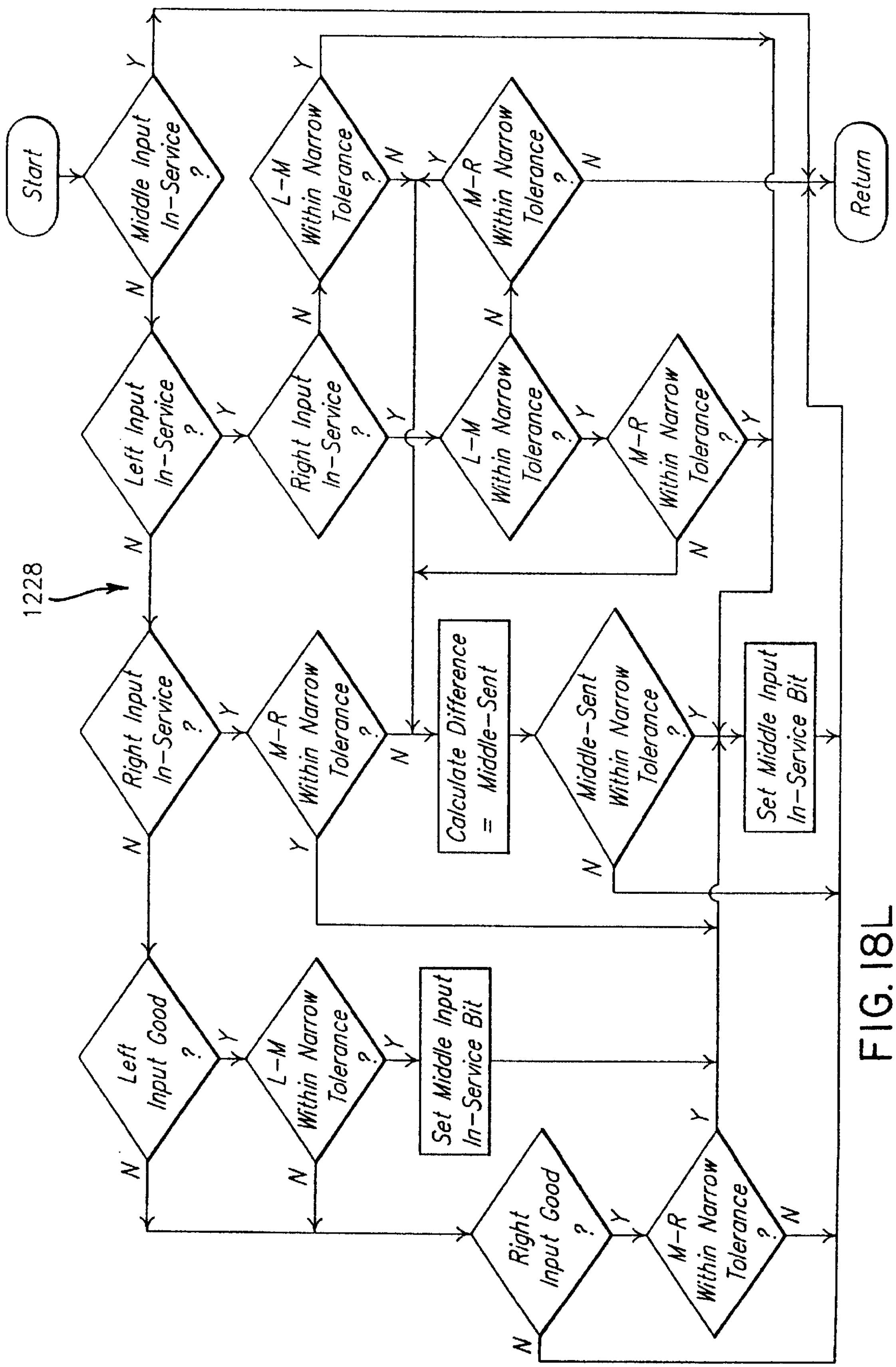
Figure 18M:
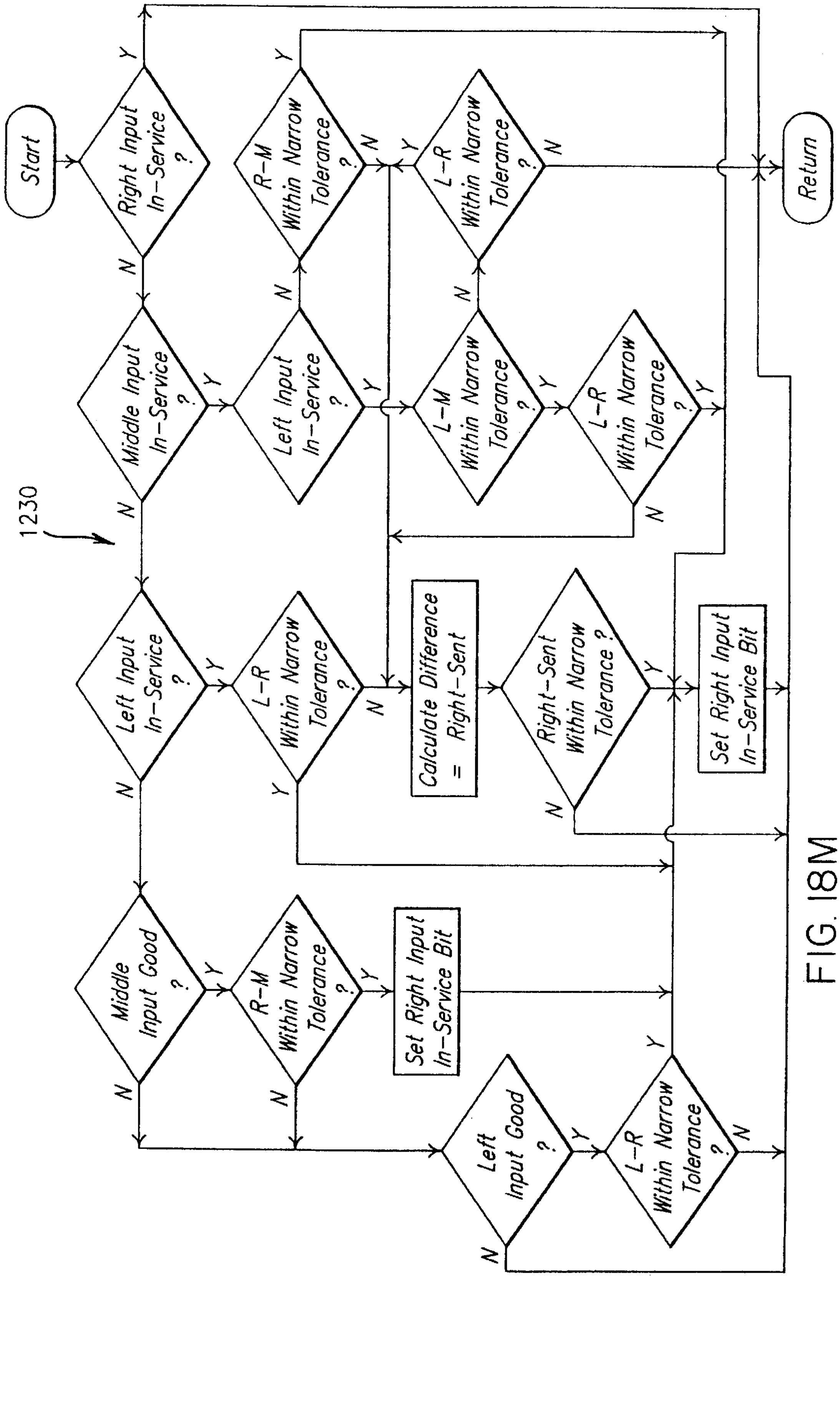

Next, a set of "in service" test routines is provided for each of the Left, Middle and Right analog input values, as indicated by blocks 1226–1230. Each of these routines are used to determine whether these values should be put in service for the next process control cycle. FIG. 18K provides a flow chart for the block 1226, FIG. 18L provides a flow chart for the block 1226 and FIG. 18M provides a flow chart for the block 1230. Due to the similarity between these three flow charts, only the flow chart 1226 for the Left analog input value will be discussed.

Diamond 1232 indicates that the Left value will simply remain in service if it is already in service. However, in the event that the Left value was found to be out of service, then diamonds 1234–1238 indicate that the Middle and Right values will be checked for their respective in service availability. If both the Middle and Right values are in service, each of these values is compared against the Left value to determine if there is Narrow Tolerance agreement (diamonds 1240–1242). If both Narrow Tolerance tests are successful, then the In-Service bit for the Left value will be set for use in the next process control cycle (block 1244). However, if the Left-Middle Narrow Tolerance test fails and the Left-Right Narrow Tolerance test passes (diamond 1246), then the difference between the Left value and the input sent to the process control computer will be calculated (block 1248). Then, diamond 1250 will test whether the Left-Sent value is less than the Narrow Tolerance threshold. If the Left-Sent value was less than the Narrow Tolerance threshold, then the Left In-Service bit will be set. Otherwise, the Left value will remain out of service.

In the event that the Left and Right values were found to be in service, and the Middle value was out of service, then the Left-Right Narrow Tolerance test need only be passed in order for the Left In-Service bit to be set (diamond 1252). In the event that none of the Left, Middle or Right values were found to be in service, then the program will check to see if one of the Middle and Right values were at least "good" (diamonds 1254–1256). In this regard, a good value is one where the analog input board was plugged in and a complete neighbor to neighbor message was received. If either the Left-Middle or the Left-Right combinations pass the Narrow Tolerance test (diamonds 1258–1260), then the Left In-Service bit will be set (e.g., block 1262).

Once this procedure is completed for each of the Left, Middle and Right analog input values, then the flow chart of block 1264 is executed, as shown in FIG. 18N. In this regard, the general analog input compare bit "AIC" will be set if any of the specific analog input compare bits have been set (block 1266). Thus, for example, if the comparison between the Left and Middle values failed the Wide Tolerance test (diamond 1268), then the AIC bit would be set.

Finally, as indicated by block 1270 in FIG. 18B, the arbitrated analog input value is stored in a data table which will be transmitted to the process control computer 14. Then, the program will proceed to arbitrate the next analog input channel in a loop which is indicated by ellipse 1272. This AI loop will be repeated until all of the analog input channels are arbitrated for the first set of redundant analog input circuit boards. Then, the entire arbitration process will be repeated until all of the analog input channels have been arbitrated (e.g., 4 sets of 5 analog input channels being arbitrated at a time).

Figure 180:
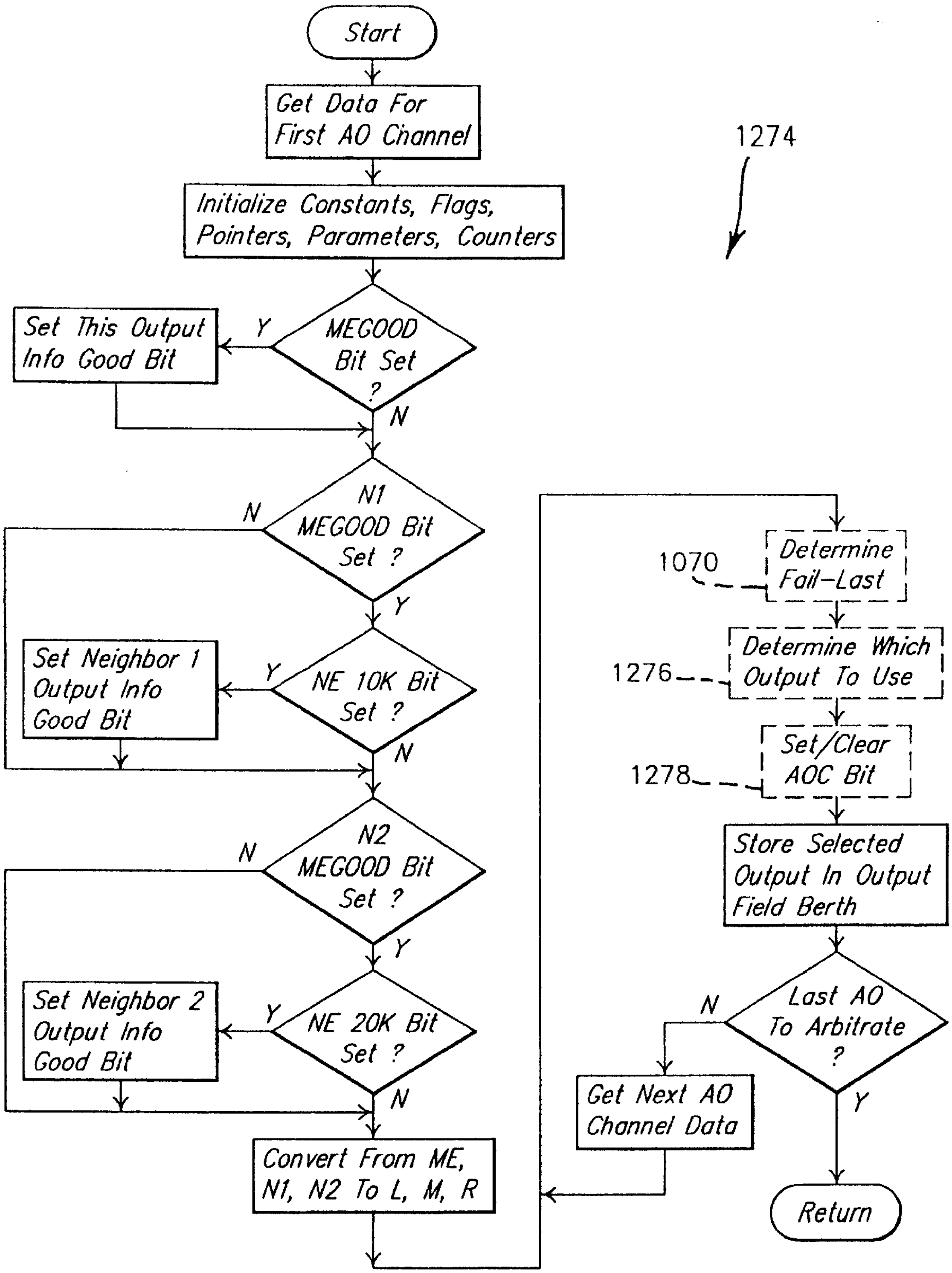
Figure 18P:
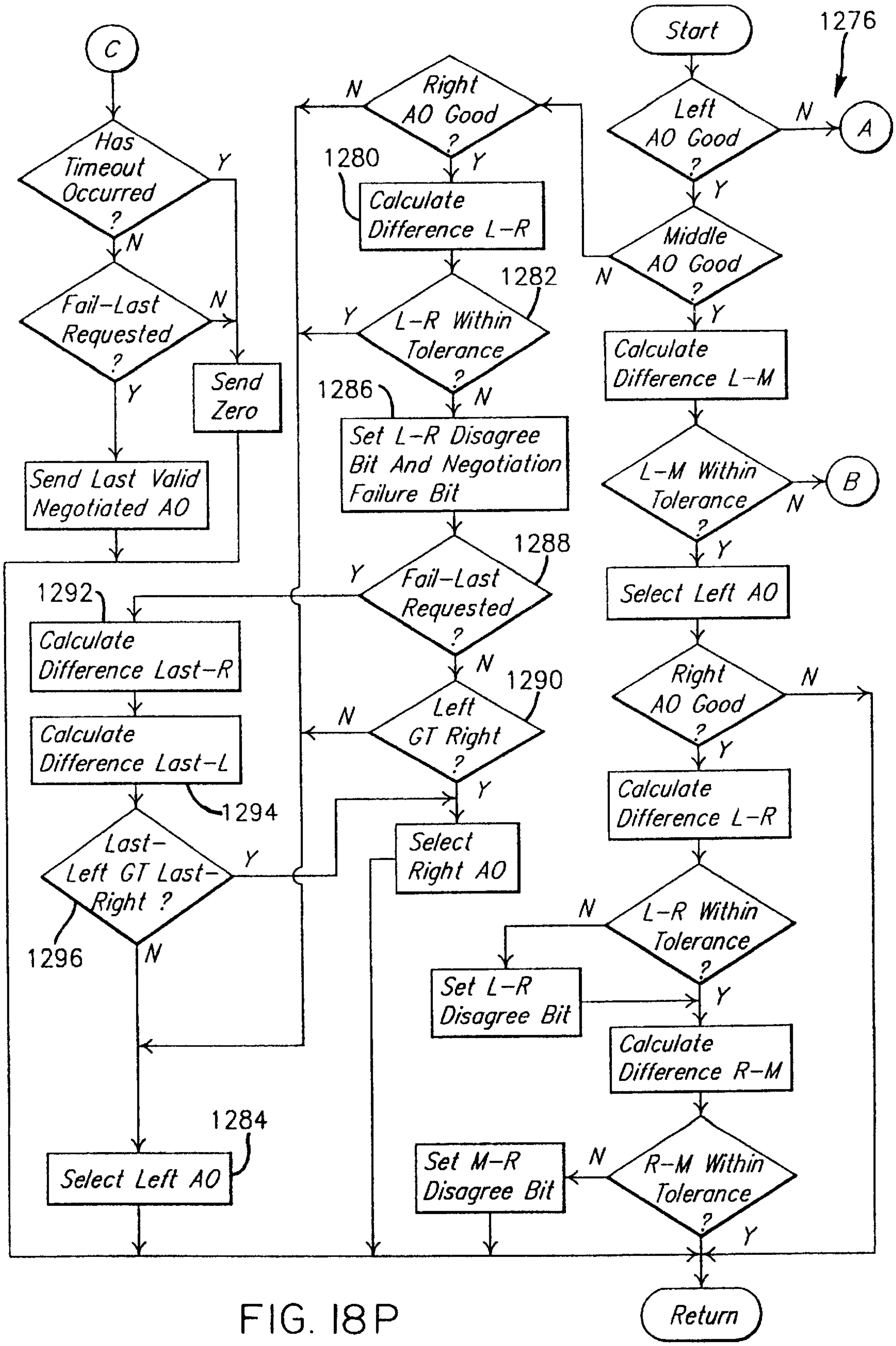
Figure 18Q:
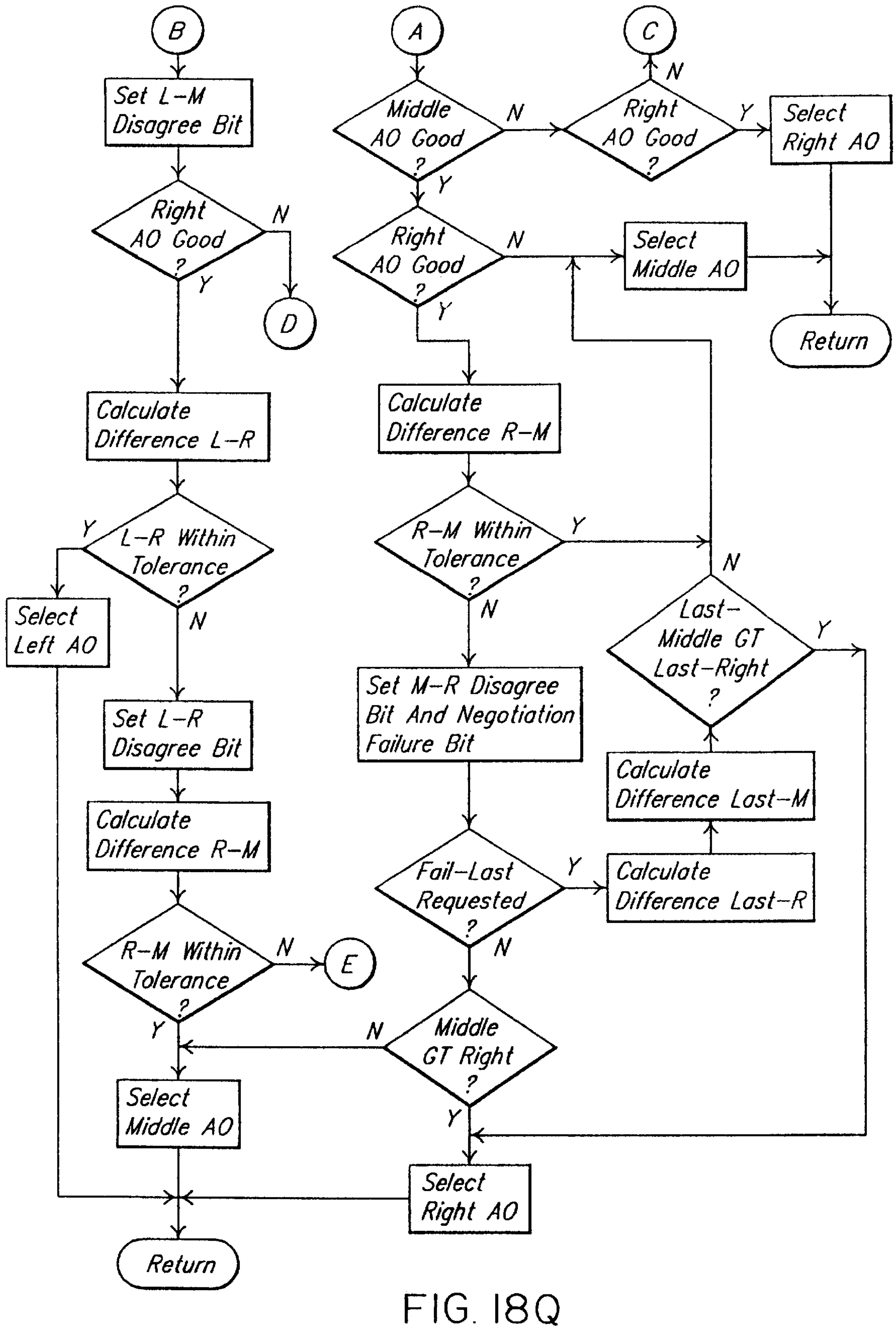
Figure 18R:
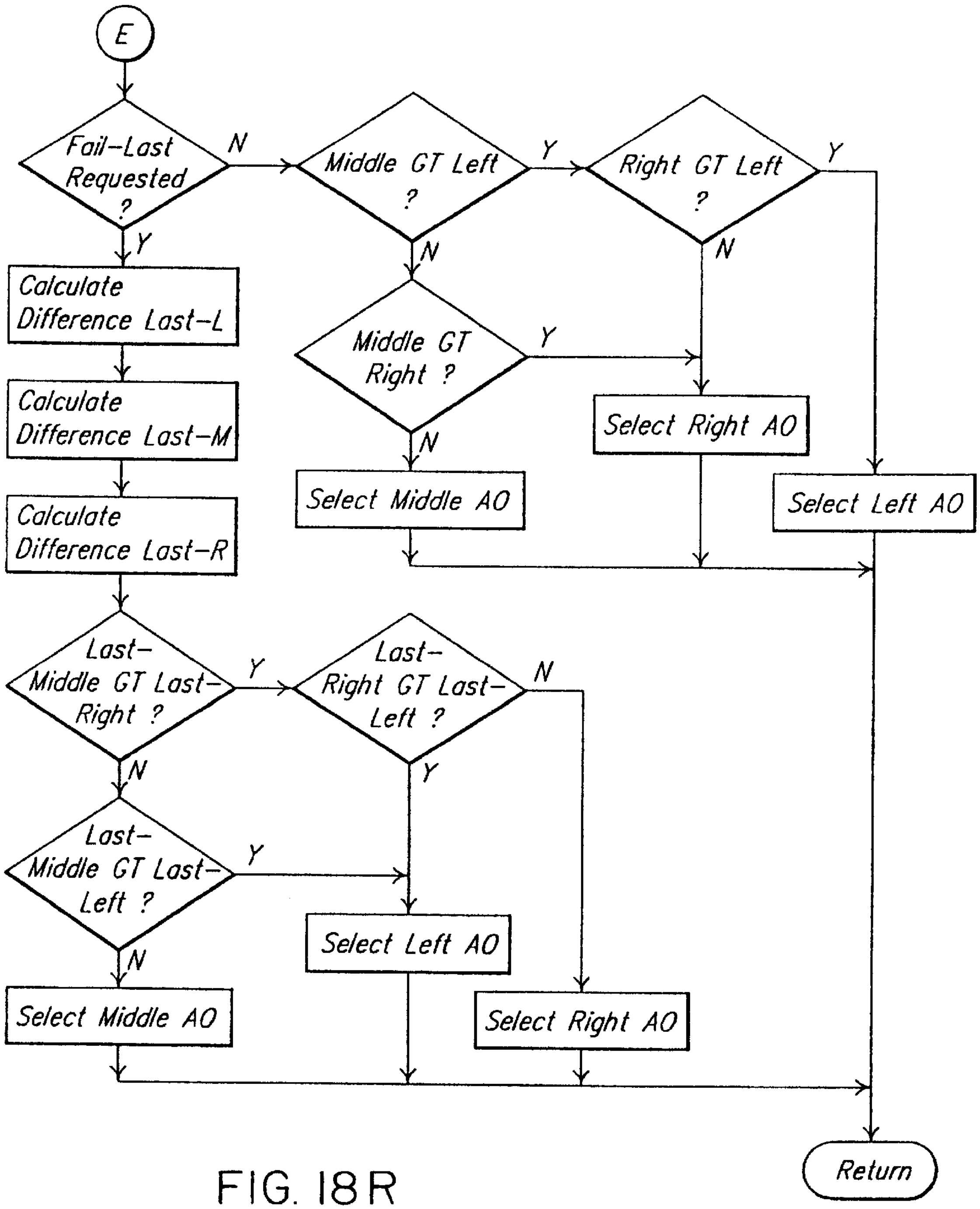
Figure 18S:
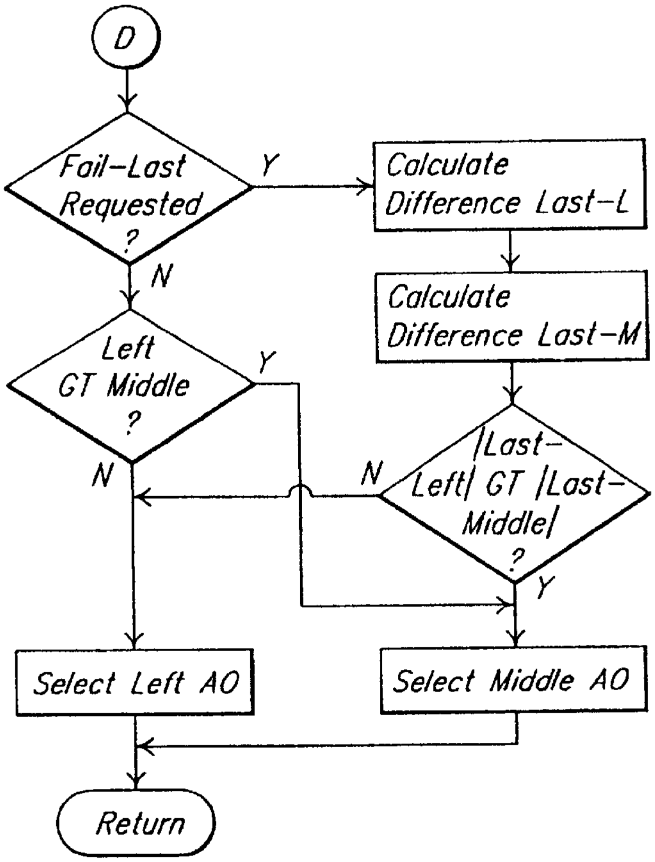
Figure 18T:
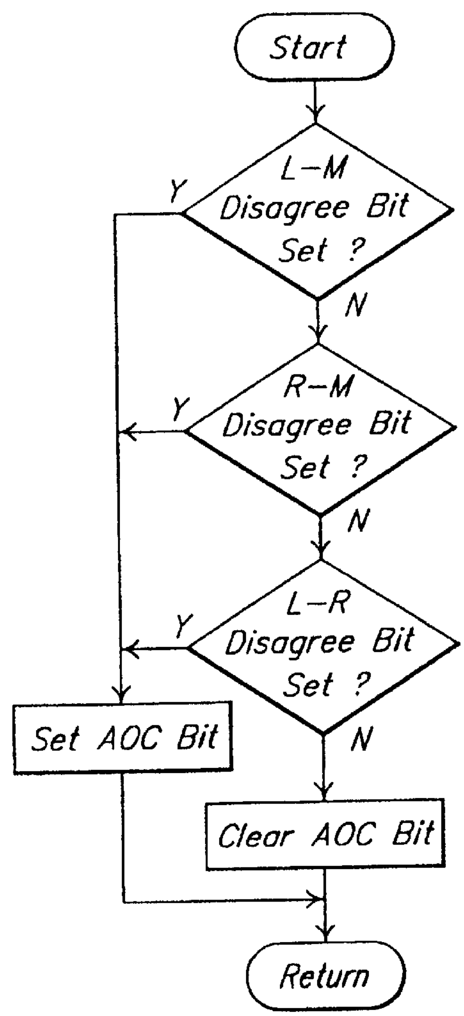

Referring now to FIGS. 18O–18T, the process of arbitrating analog outputs will now be described. FIG. 180 shows an overall flow chart 1274 for the analog output process. As flow chart 1274 follows the analysis employed by the flow chart 1068 of FIG. 17E for digital outputs, the flow chart 1274 needs only to be briefly discussed. For example, it should be noted that the "Determine Fail-Safe/Fail-Last" block 1070 is the same for both digital and analog outputs. The substantive difference between the analog and digital overall flow charts is ultimately contained in the "Determine which Output to Use" block 1276 and the "Set/Clear AOC bit" block 1278. FIGS. 18P–18S illustrate the flow chart for block 1276, while FIG. 18T illustrates the flow chart for block 1278.

Referring first to FIGS. 18P–18S, the flow chart 1276 is shown to generally follow the analysis discussed above for selecting digital outputs (flow chart 1072 of FIG. 17G). However, instead of matching digital output values, valid pairs of analog outputs are compared relative to an Output Tolerance value. Specifically, the difference between two analog output values is calculated (e.g., block 1280), and then a determination is made as to whether this difference is beyond the Output Tolerance value (e.g., block 1282). The Output Tolerance value is preferably selected to be 0.1% of full scale.

If the output Tolerance test is successful, then the Leftmost value is selected (e.g., block 1284). However, if the Output Tolerance test fails, then the specific Disagreement bit will be set and the general Negotiation failure bit "AOAF" will be set (block 1286). The program will then proceed to determine if a Fail-Last request has been made by the process control computer 14 (diamond 1288). If the Fail-Last request has not been made, then the lowest of the two valid analog output values will be sent to the field (diamond 1290). This lowest of the two valid analog output values provides a Fail-Safe selection for the analog output channel.

In the event that a Fail-Last value was requested by the process control computer 14, then the program will proceed to find out which of the two valid analog output values was closest to the last arbitrated value. For example, as block 1292 indicates, the difference between the Right analog output value and the Last arbitrated output value will be calculated. Similarly, block 1294 indicates that the difference between the Left analog output value and the Last arbitrated output value will be calculated. Then, diamond 1296 will compare these two value differences and the lowest difference will be used to pick the Left or Right value as the case may be.

Finally, the flow chart 1278 of FIG. 18T is used to set or clear the general analog output compare bit "AOC". In this regard, the diamonds 1298–1302 and block 1304 indicate that the AOC bit will be set if any specific comparison bits were found to be set. Otherwise, the AOC bit will be cleared if no disagreements have been found (block 1306).

It should also be noted that the analog output track "AOT" values and the digital output track "DOT" values may be arbitrated in a similar manner to that described in connection with the arbitration of analog output and digital output values described herein. Indeed, even the clock signal received by the controllers 92 and 96 may be arbitrated as well in a similar manner. In this regard, the clock signal arbitration preferably follows the analysis set forth in FIG. 17C to determine which clock signal should be selected.

Figure 19C:
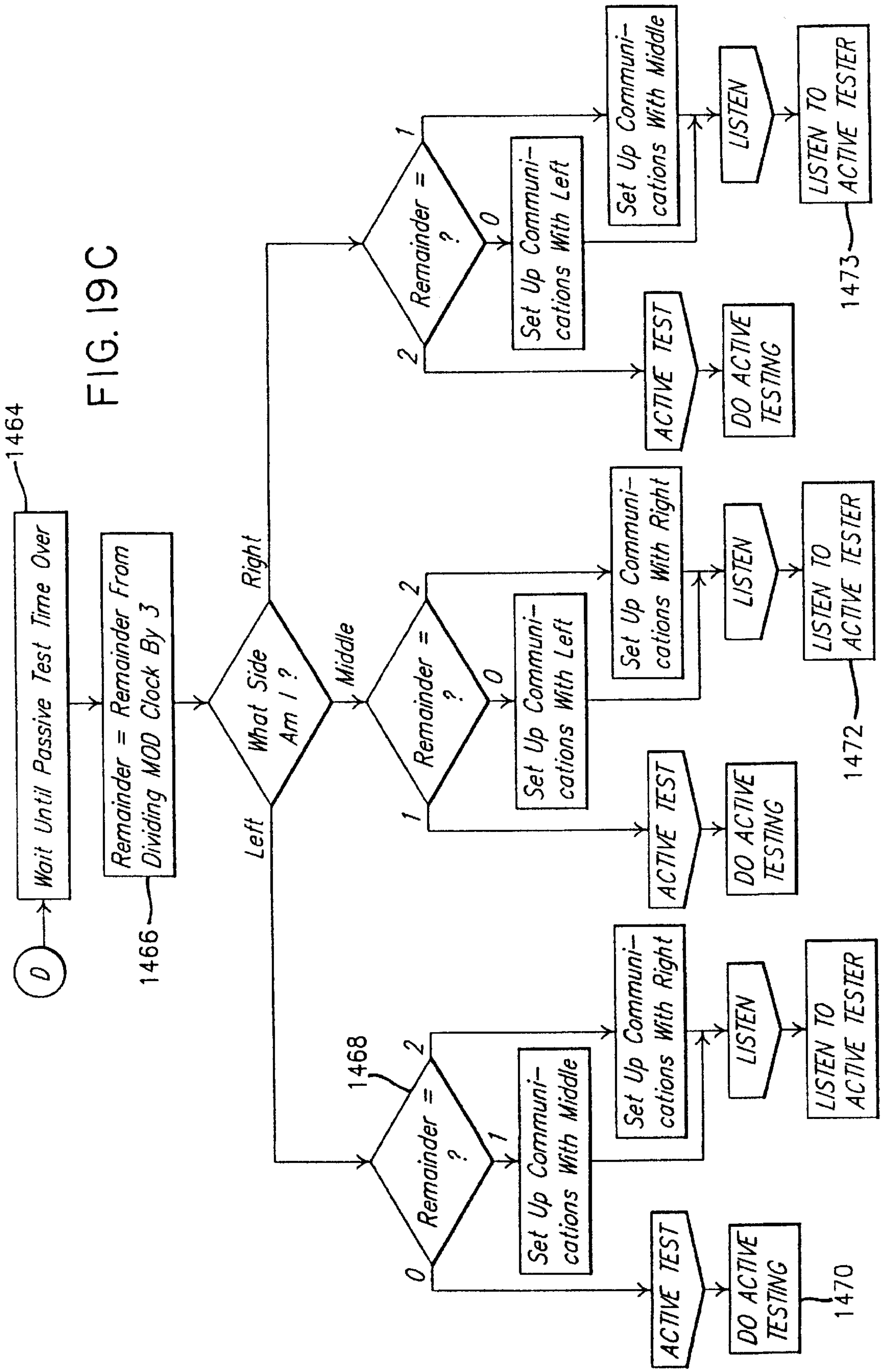

Referring to FIGS. 19A–19M, a set of flow charts is shown to illustrate the method non-intrusively testing the digital output circuits 500–504 according to the present invention. This testing method includes both passive and active testing procedures. FIGS. 19A–19C combine to provide an overall flow chart 1400 for the non-intrusive testing process. As indicated by blocks 1402–1406 and diamonds 1408–1416, a series of health checks are made before any testing of the digital output circuits is permitted. In this regard, no errors must be found from the immediately preceding process cycle for the digital output circuit to be tested, and the controller 100 conducting the test must be able to communicate with its neighboring controllers. In the event that any of the conditions represented by diamonds 1408–1416 are not met, then the continuation of flow chart 1400 in FIG. 19B indicates that the appropriate error codes are set.

Figure 19D:
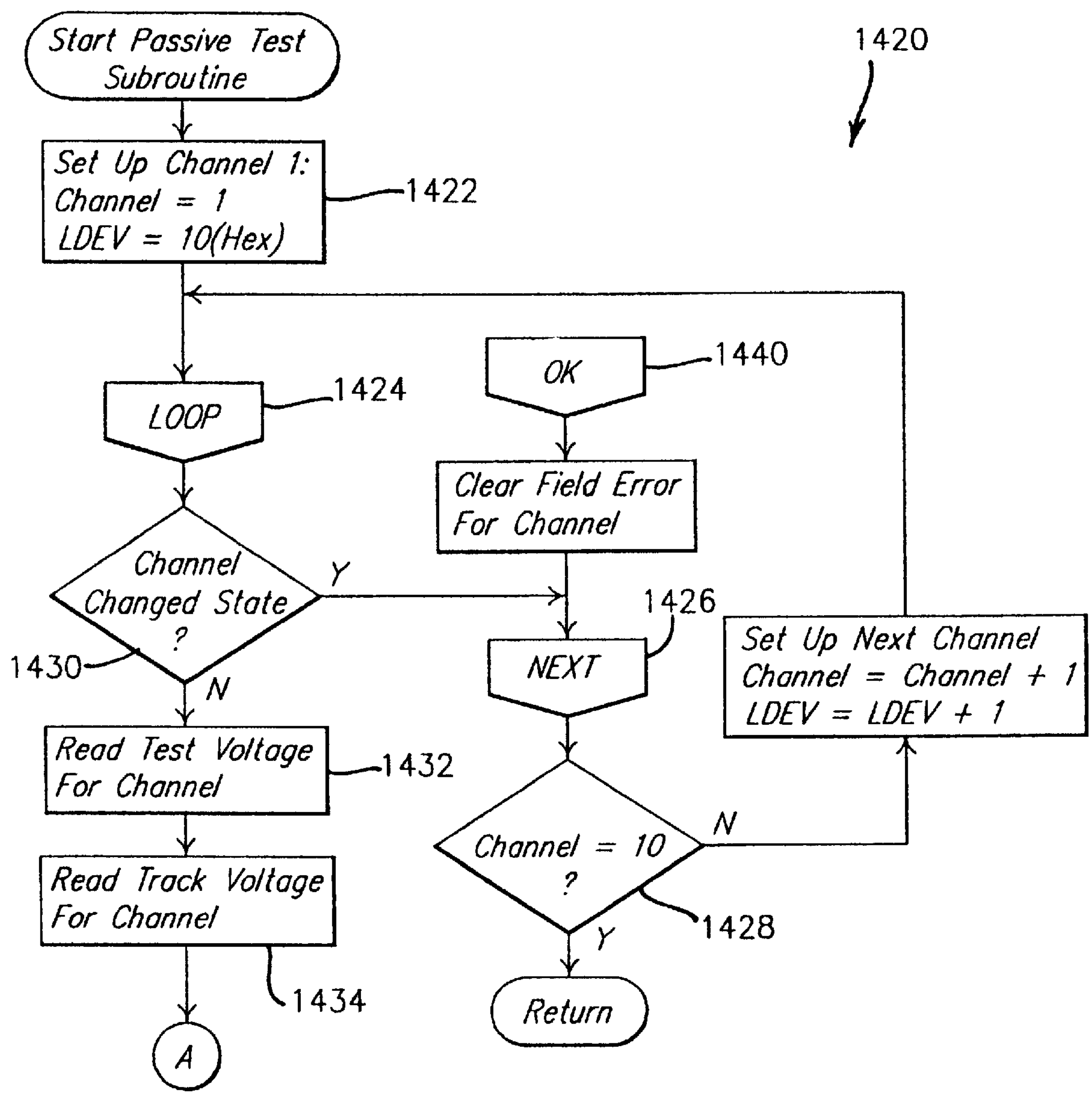
Figure 19E:
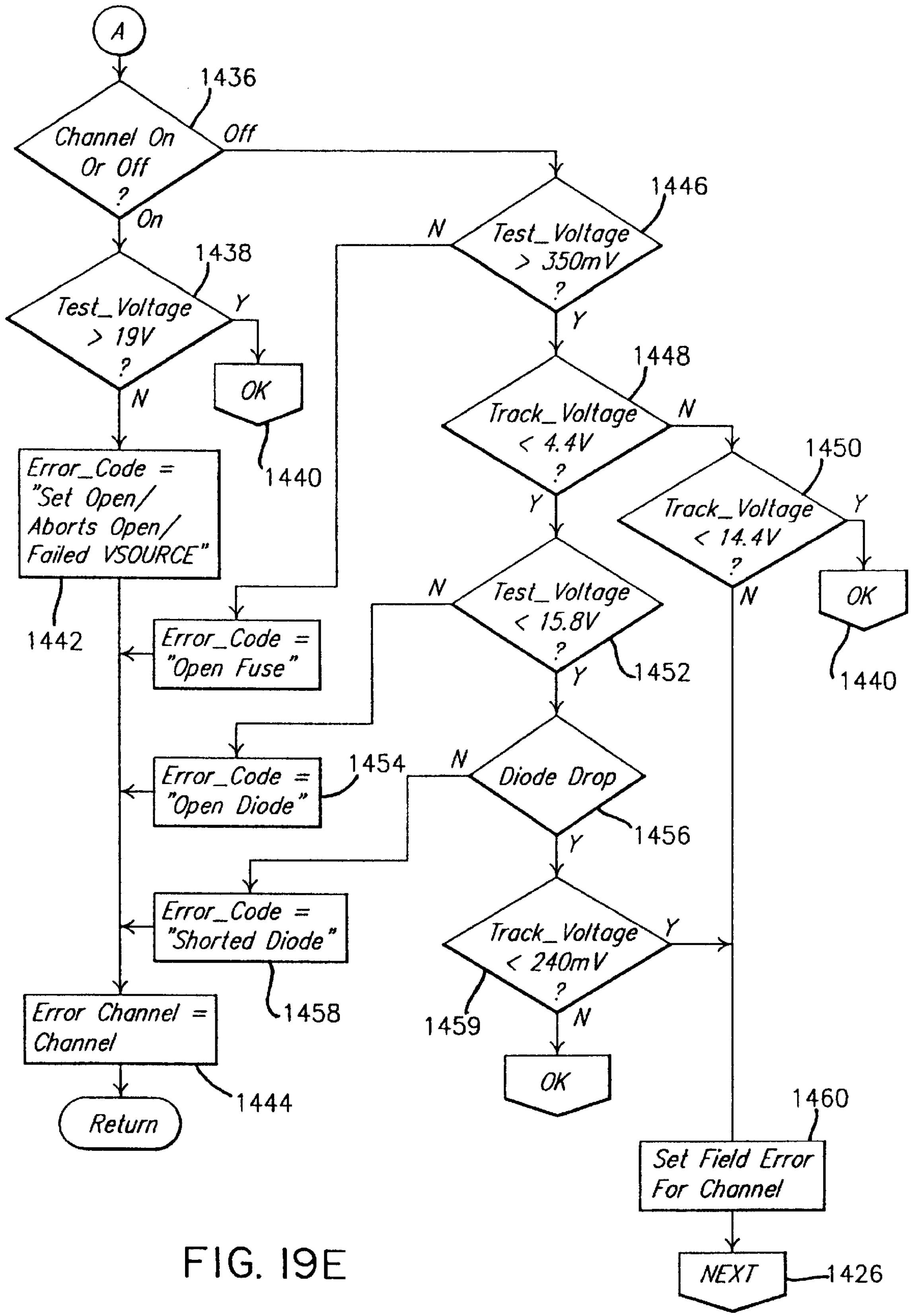

Assuming that the digital output circuit is permitted to be tested, then diamond 1418 indicates that the digital output circuits for the neighboring controllers will be checked for errors. If any errors are found, then the passive testing procedure of block 1420 will be bypassed. FIGS. 19D–19E combine to provide the flow chart for the passive testing procedure. While the passive testing procedure could be conducted on the digital output circuit of only one of the controllers 92–96 at a given time, it should be appreciated that each of the controllers 92–96 could conduct the passive testing procedure simultaneously. This is because active cooperation between neighboring controllers is not required during the passive testing procedure.

As indicated by block 1422, polygons 1424–1426 and diamond 1428, the passive test will begin with Channel 1, and then loop through all ten channels if no errors are encountered. Diamond 1430 indicates that the program will detect whether or not the channel being tested has changed states. If the channel has changed states, then the program will proceed to test the next channel. However, during the initial pass through the loop, the, answer will be no, and the test and track voltages will be read (blocks 1432–1434).

Diamond 1436 indicates that the controller 100 will determine whether the channel being tested is On or Off from the arbitrated command value. If the channel is commanded On, the controller will check to see that the test voltage (e.g., TEST-1) was greater than a predetermined threshold level (e.g., 19 volts). If the test voltage was greater than this level, then this portion of the test will have been successfully passed, and program will loop back to test the next channel through the OK polygon 1440. If the test voltage was too low, then the appropriate errors codes will be set, as a number of different errors could have occurred (e.g., a blown fuse or a set switch open). Once an error is detected, the passive test is ended in this embodiment. However, it should be appreciated that the other channels could be subjected to passive testing in the appropriate application.

If the channel is commanded to be in an Off condition, then the controller 100 will check to see if the test voltage is greater than a predetermined Low test level (e.g., 350 milli-volts) through diamond 1446. If the test voltage is below this level, then an open fuse condition will be detected for the fuse in the abort circuit under examination (e.g., fuse DF1 of FIG. 11A), and the appropriate error code will be set. Assuming that the test voltage exceeds the predetermined Low test level, then the controller 100 will check to see if the track voltage is below a Low track level (e.g., 4.4 volts) through diamond 1448. If the track voltage is above this Low level, then the controller 100 checks to see if the track voltage is less than a predetermined high track voltage (e.g. 14.4 volts) through diamond 1450. If the track voltage is above this High level, then an error is present. However, the exact source of the error cannot be determined, so the test is continued with another channel. In this regard, the active testing procedure to be described below will need to be employed to help identify the source of the error.

In the event that the track voltage is below the Low voltage level, then further checks are performed in order to determine if there, nevertheless, is still an error that could be detected. In other words, the track voltage should be below the predetermined Low level when the channel is off, but there still may be a hidden problem that could be uncovered. In this regard, the test voltage will be examined to see if there is an error related to the diode 524 of the abort circuit (diamond 1452). If the test voltage is greater than a predetermined High test voltage (e.g., 15.8 volts), then an open diode condition will be determined by the controller, and the appropriate error codes will be set (block 1454). In this regard, it should be noted that these error codes may be used by the controller 100 to request an abort of the channel by its neighboring controllers. Additionally, the controller which is conducting the test may also signal the presence of an error in its digital output circuit to the process control computer 14 in the next message sent to the process control computer. The process control computer 14 could also request that the field computer unit 12 transmit specific error code or status bits for analysis through a health and welfare process. In this regard, it should be noted that the process control computer 14 could be connected to another computer which would perform the health and welfare analysis.

If the test voltage was found to be less than its predetermined high voltage level, then the controller 100 will test for the presence of a voltage drop across the diode 524 by comparing the test and track voltages (diamond 1456). If a voltage drop was not found, then the controller 100 will determine the presence of a shorted diode condition, and set the appropriate error code (block 1458). If a voltage drop was found, then the controller 100 will check to see if the track voltage is below a predetermined Minimum level (e.g., 240 milli-volts) through diamond 1459. If the track voltage is below this Minimum level, then the controller 100 will determine that the passive test was successful for this channel. If the track voltage is above the minimum level, then the controller 100 will determine that an error in the field has occurred, and the appropriate error code will be sent (block 1460). It should be understood that each of the High, Low and Minimum threshold values are determined by the +26 volt power supply level and the resistance values set for the resistors RP1, RP3 and RP7 in the abort circuit 510 shown in FIG. 11A.

From the above discussion, it should be appreciated that the controller 100 is able to passively test each of the channels of its digital output board, in that none of the digital output channels have to be intentionally set on or off as part of the test procedure. In this regard, block 1462 of FIG. 19A points out that the controller 100 must reserve a certain period of time in which to passively detect and analyze the functioning of its digital output circuit through the test and track signals. Additionally, it should be appreciated that the passive test according to the present invention also has the capability to determine the type of errors that may be encountered, including an error associated with the output control device in the field.

Referring specifically to FIG. 19B, the controller 100 will wait until the time has expired for the passive testing procedure (e.g., 10 milli-seconds) before proceeding to the active test procedure (block 1464). A decision is then made as to which one of the controllers 92–96 will conduct the active test procedure. In one form of the present invention, it is preferred that a different controller 92–96 undergo active testing each process control cycle. This is accomplished by dividing the "second" clock value of the process control computer 14 by the number of controllers contained in the field computer unit 12 (i.e., 3), as shown in block 1466. The remainder is used to determine which controller will undergo active testing. For example, at a reading of 12 seconds, the remainder value is 0. Therefore, as indicated by diamond 1468, the Left controller 92 will conduct the active test procedure (polygon 1470) during this process control cycle. Additionally, the result of diamond 1468 indicates that the other two controllers 94–96 will enter a listening mode (polygons 1472–1473).

Figure 19F:
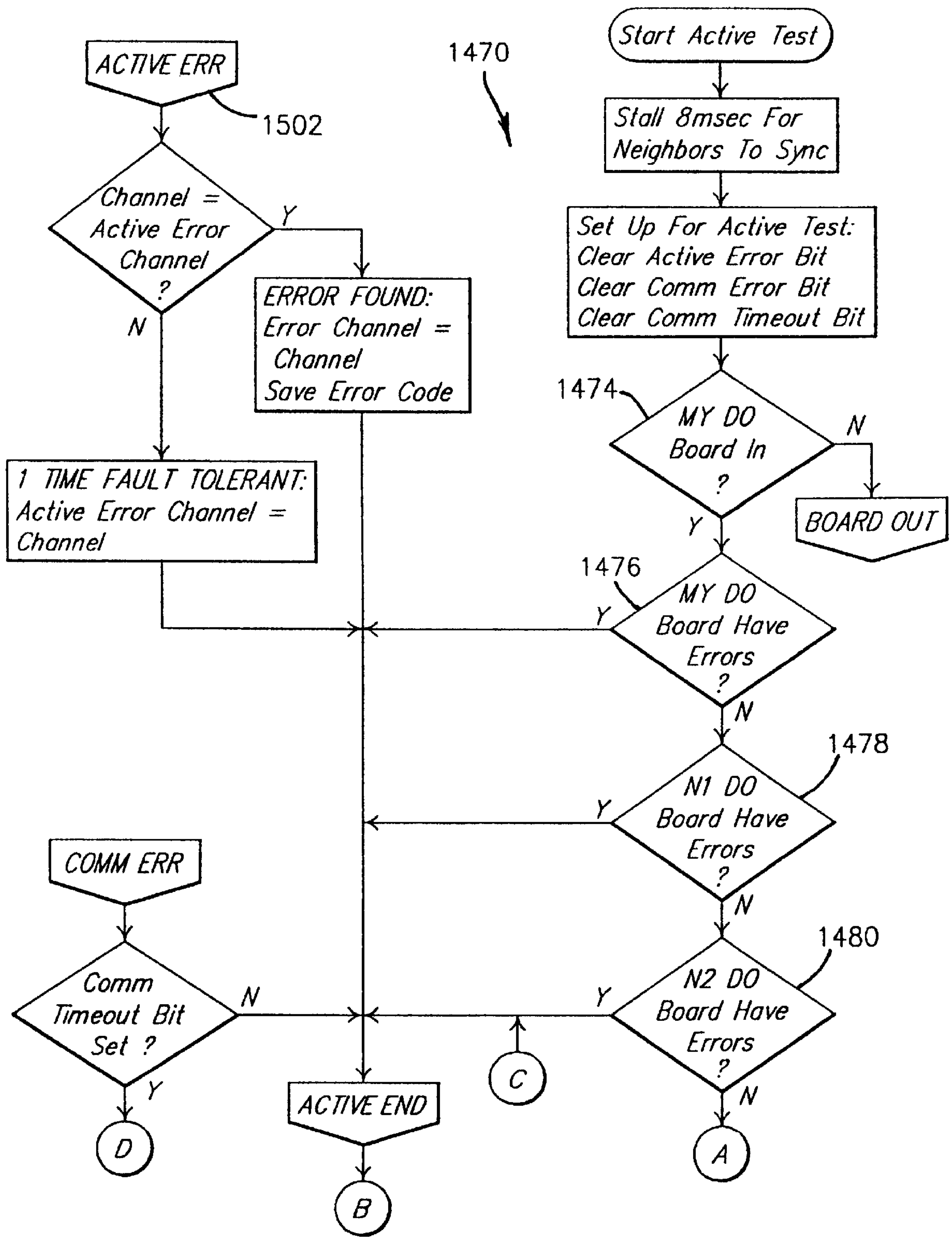
Figure 19G:
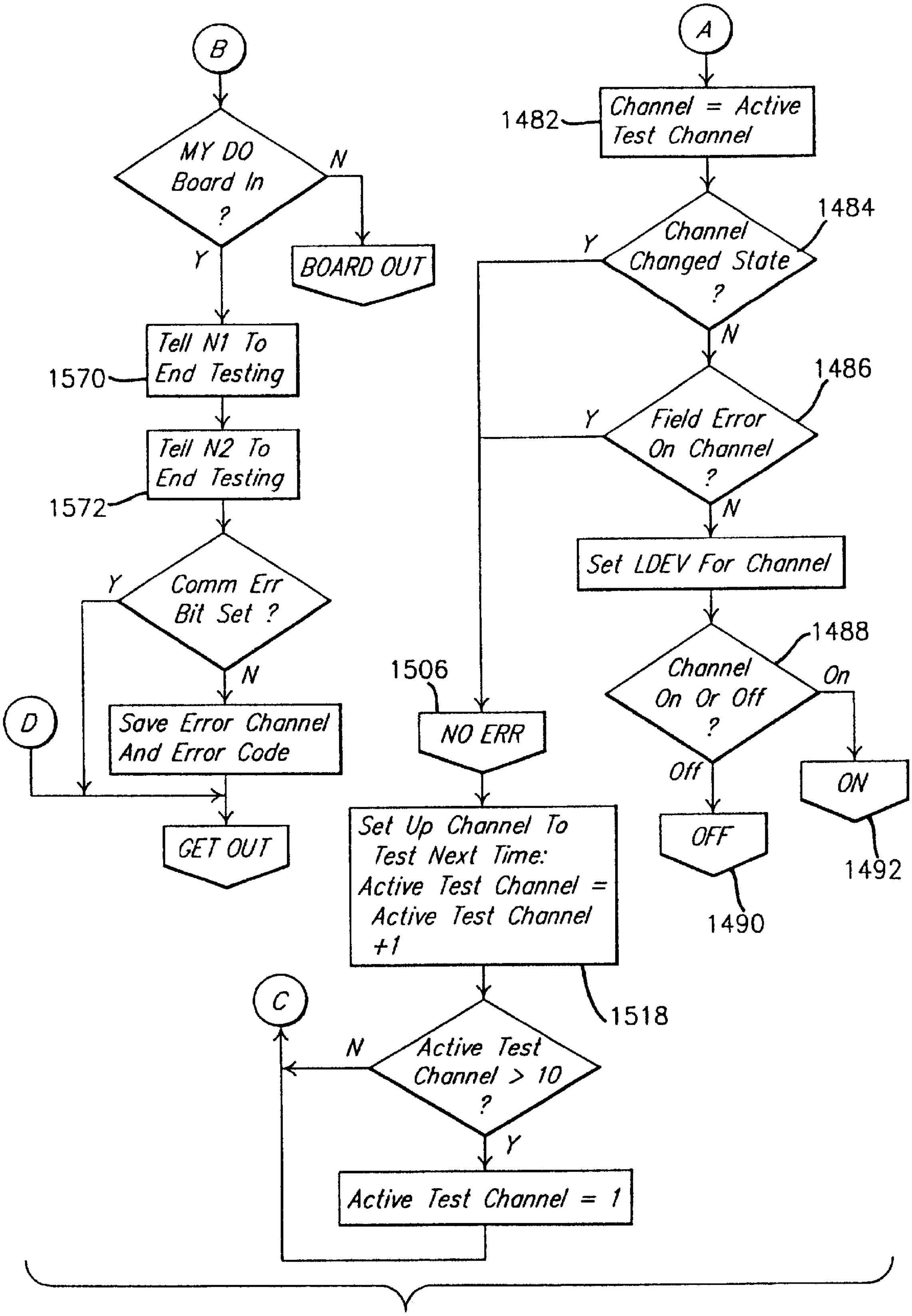

FIGS. 19F–19G combine to provide an overall flow chart 1470 for the active test procedure. In this regard, the first channel of the Left controller 92 will be used to illustrate the operation of the active test procedure. Assuming that the digital output circuit board 500 for the controller 92 is in place and no errors are found on any of the digital output circuits 500–504 (diamonds 1474–1482), then the block 1482 indicates that one of the digital output channels will be selected for the active test procedure. In this particular embodiment, only one of the digital output channels will be tested during a single process control cycle. Accordingly, it should be appreciated that it will take 30 seconds to actively test all 10 of the digital output channels in the digital output circuits 500–504, where the process control cycle is set for a period of 1 second. In the event that the state of the channel in line for testing has not changed (diamond 1484) and a field error has not been found from passive testing of this channel (diamond 1486), then a determination will be made as to whether this channel is On or Off (diamond 1488). If the channel is Off, then the active-Off test will be performed (polygon 1490). Conversely, if the channel is On, then the active-On test will be performed (polygon 1492).

Figure 19H:
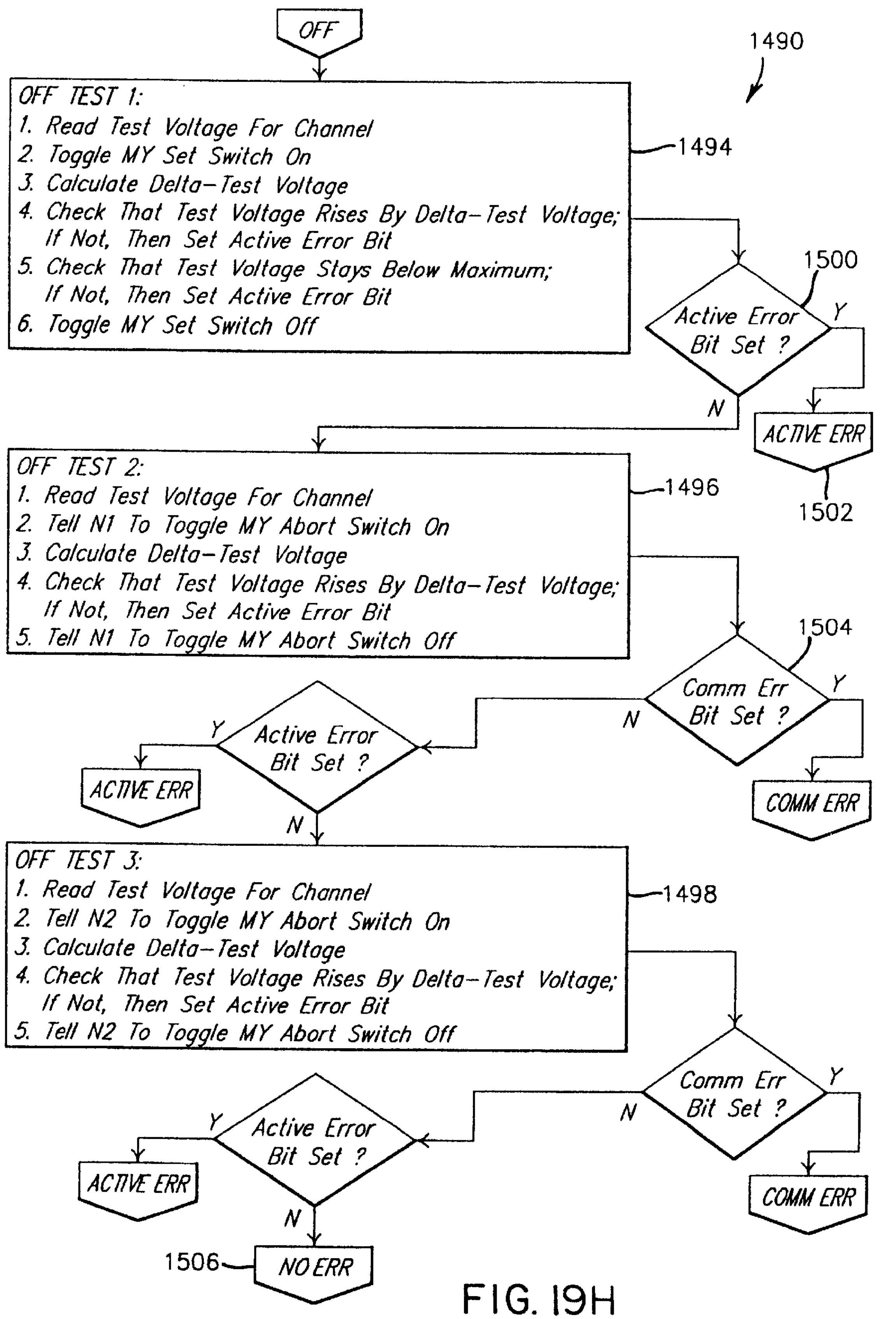

The flow chart 1490 for the active-Off test is shown in FIG. 19H. As illustrated by flow chart 1490, the active-Off test is comprised of a series of three separate tests (blocks 1494–1498), which will all be completed assuming that no errors are found. In the first test (block 1494), the SET_DODC-1 signal will be set High by the controller 92 in order to turn on the transistor 516 of FIG. 11A. While not specifically stated in block 1494, the transistors 518–520 will both be off, as the abort switches are programmed to open automatically when the channel is Off. Accordingly, the conduction of transistor 516 will not cause the abort circuit 510 to drive the field device 508. As the resistor is shorted across the conducting transistor 516, the TEST-1 voltage signal should rise by an amount determined by the resistance divider network in the abort circuit 510. Accordingly, as indicated by block 1494, the controller 92 will check to see that a sufficient voltage increase (delta-test) was achieved, and that the TEST-1 voltage stays below its maximum allowable value. If this test was unsuccessful, then an Active Test Error bit will be set. Regardless of the outcome, the SET_DODC-1 signal will be toggled back to its off state. Diamond 1500 indicates that the controller 100 will check to see if the Active Error bit was set, and if it was, then program flow will be turned over to the active error procedure 1502 of FIG. 19F.

Assuming that no errors were encountered, then the second active-Off test will be performed (block 1496). Under this test, the controller 100 will request that its neighbor1 controller (e.g., controller 94) set the ABORT1-1 signal High in order to turn on transistor 518. However, as the SET_DODC-1 signal will remain Low, the abort circuit 510 will not be able to drive the field device 508. Nevertheless, the TEST-1 signal voltage should rise, as resistor RP3 is effectively shorted by the conducting transistor 518. The controller 100 will check to see if the appropriate voltage level increase was achieved, and set the Active Test Error bit if this increase was not achieved. The controller 92 will then request its neighboring controller to toggle the ABORT1-1 signal back to a Low state. Diamond 1504 indicates that the controller 92 will then check to see if this message was received via the Communication Error bit.

Assuming that no errors were encountered, then the third active-Off test will be performed (1498). This test is the mirror image of the second active-Off test, except that the ABORT2-1 signal will be toggled by the remaining neighboring controller (e.g., controller 96). If no errors were encountered, then program control will loop back to the flow chart of FIG. 19G in order to test the next digital output channel in the next process control cycle (polygon 1506).

Figure 19I:
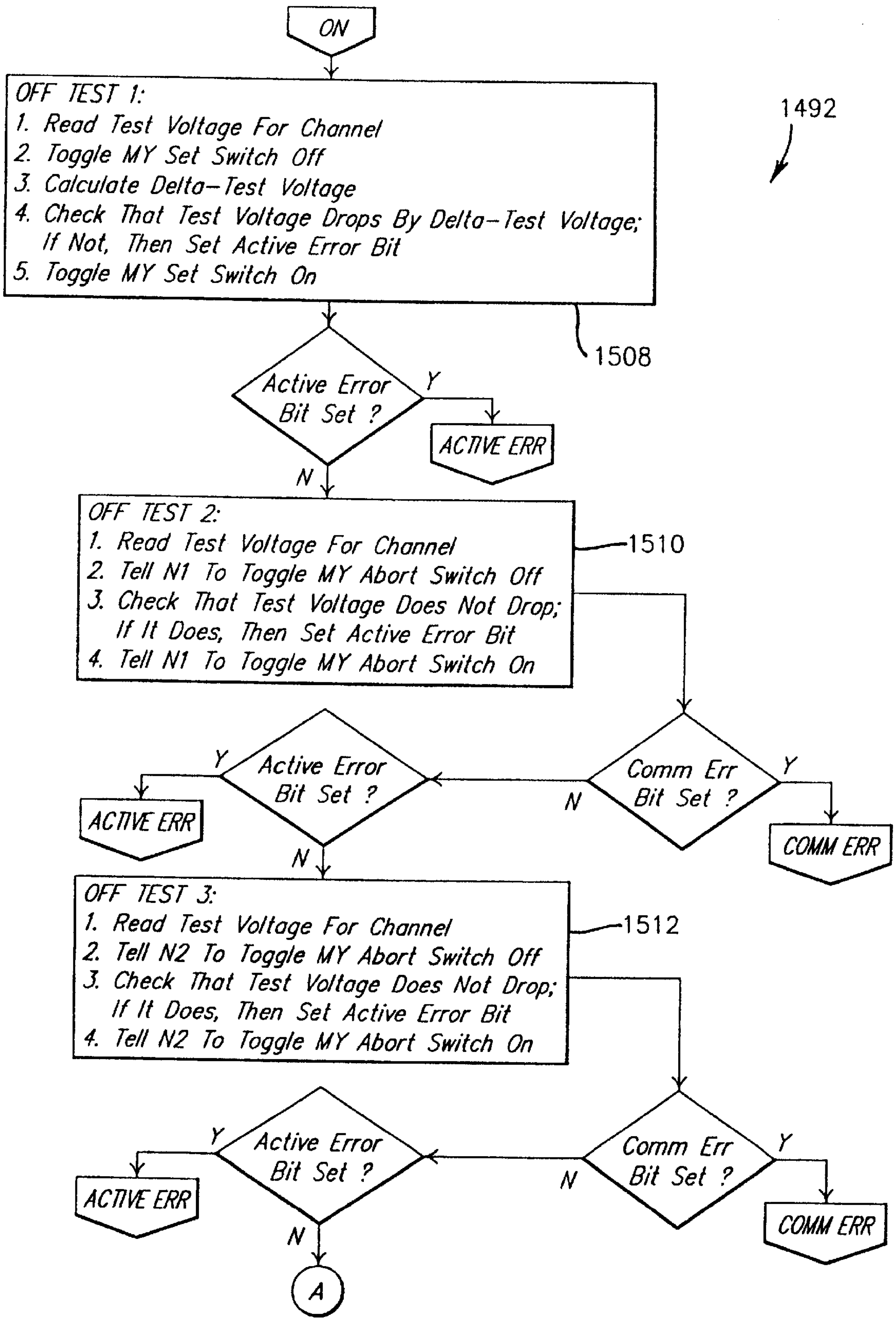
Figure 19J:
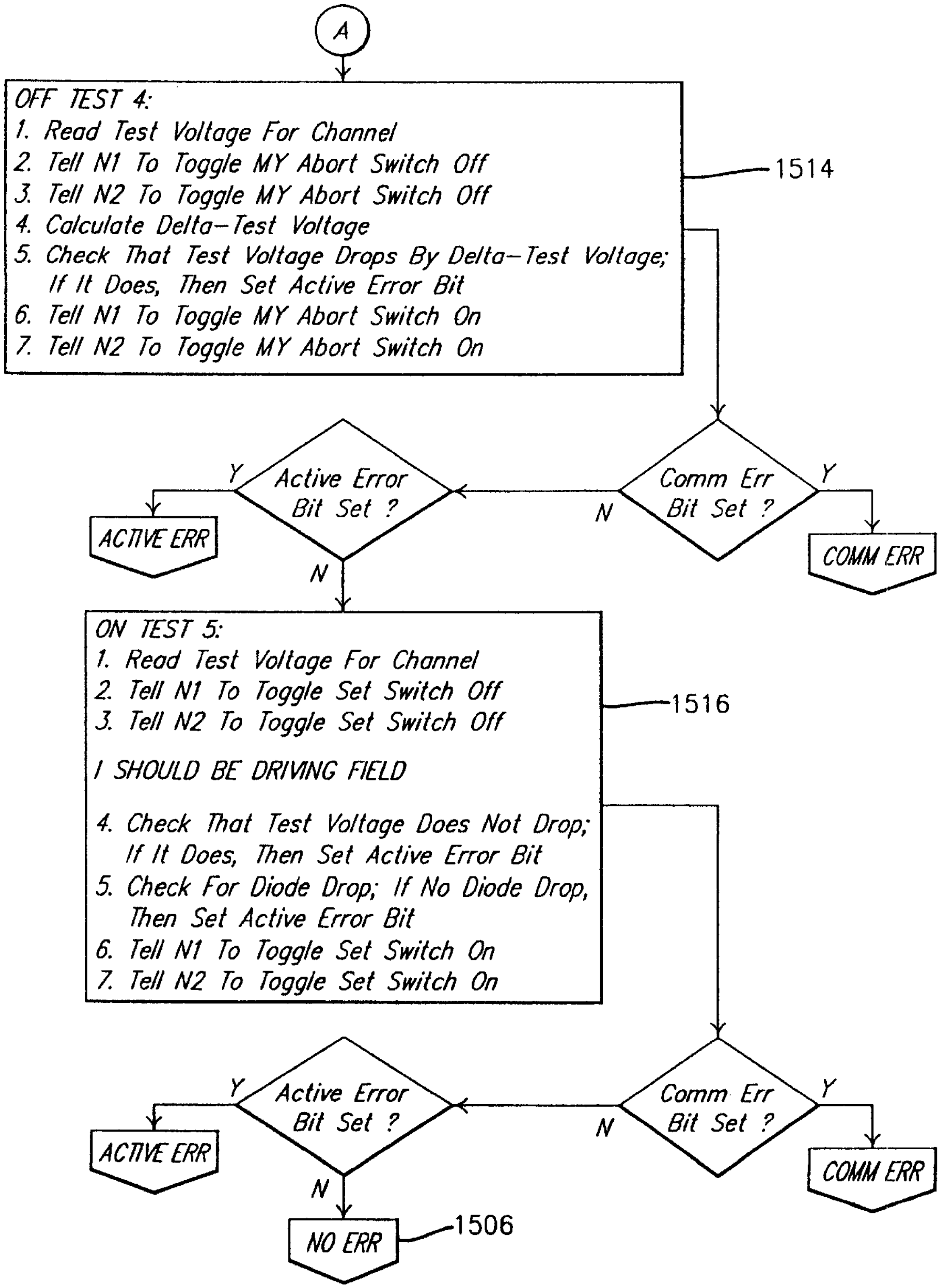
Figure 19K:
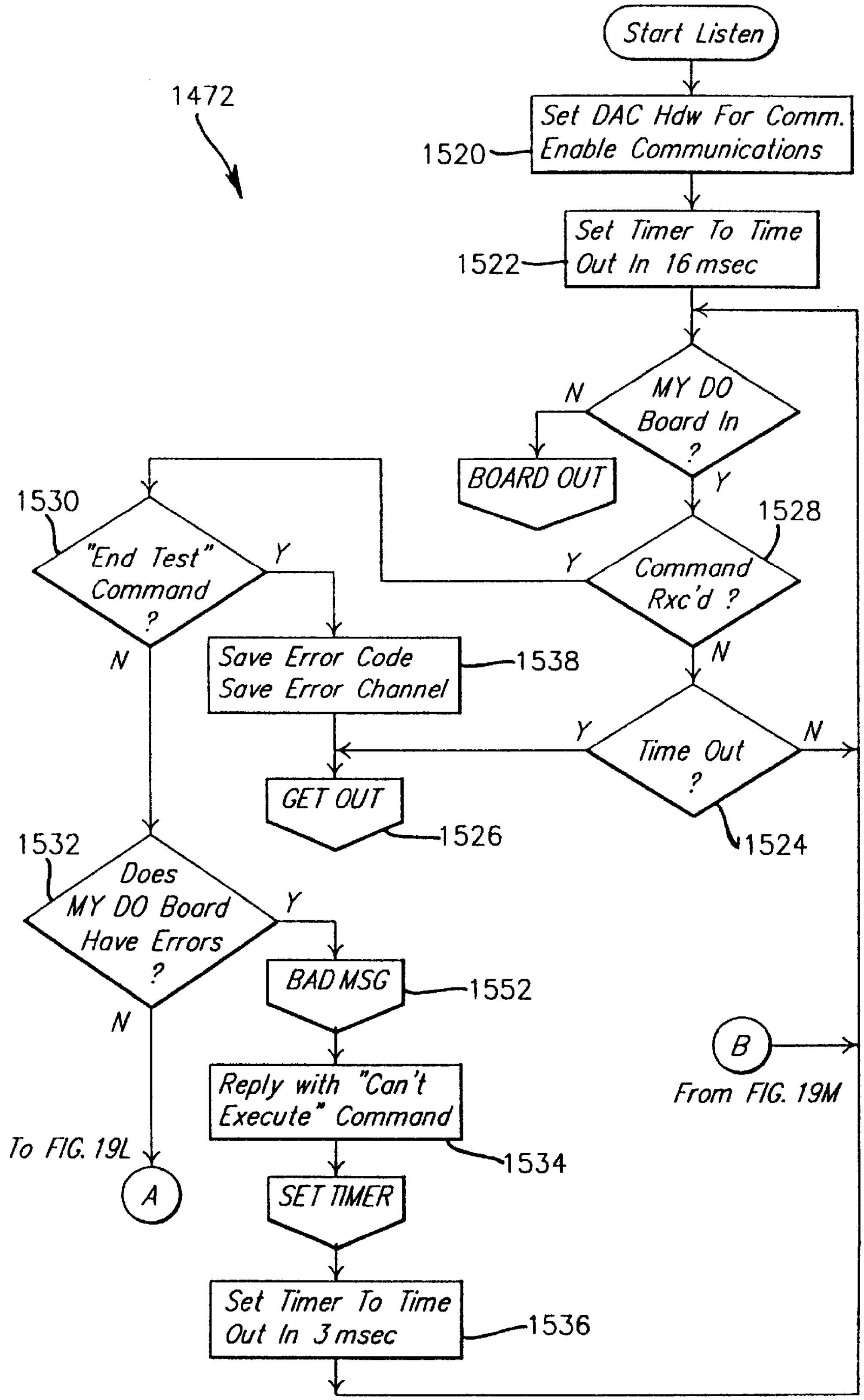
Figure 19L:
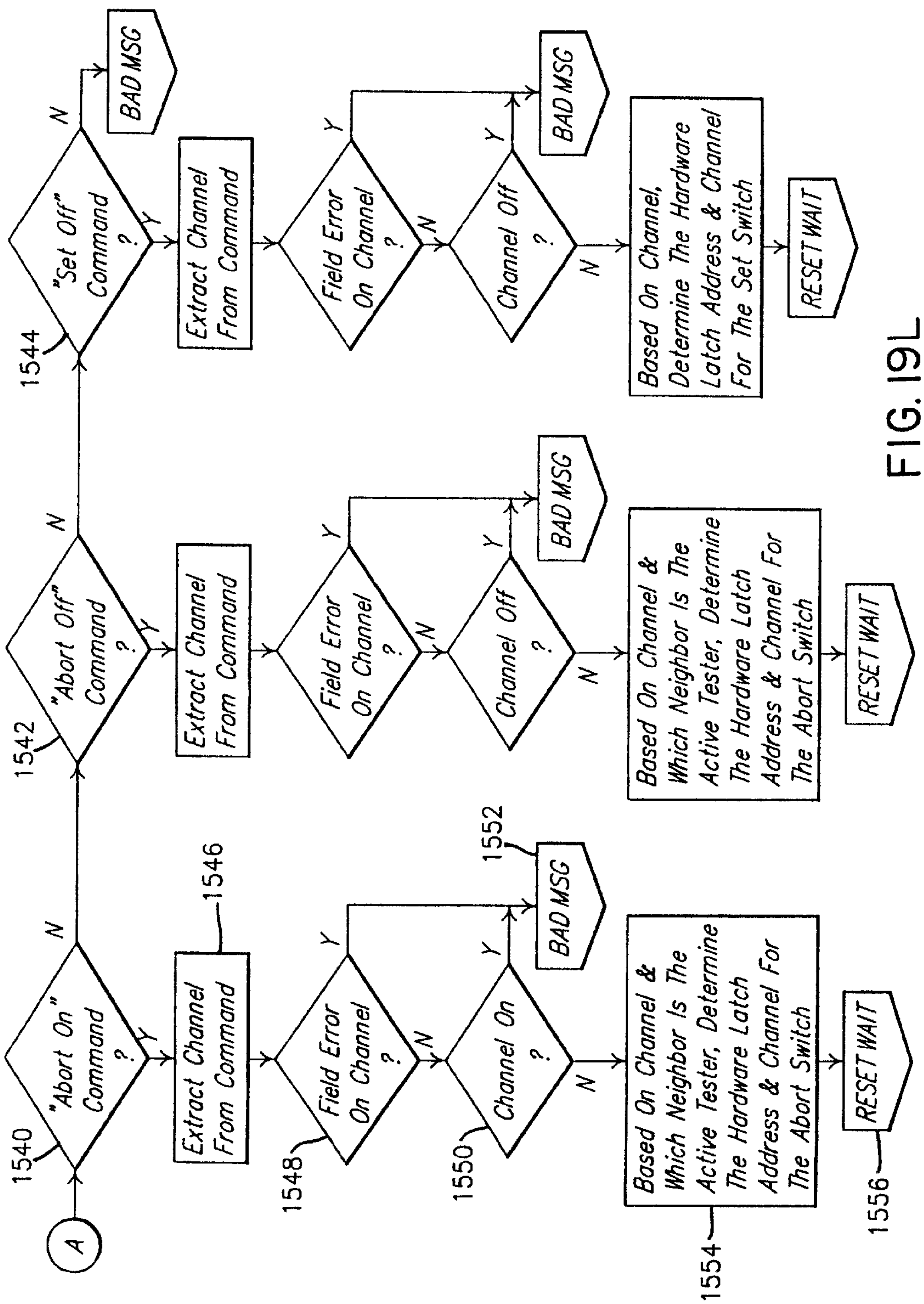

Turning to FIGS. 19I–19J, the flow chart for the active-On test 1492 is shown. The active-On test is comprised of a series of five test procedures (blocks 1508–1516). In test block 1508, the SET_DODC-1 signal is set Low, while the ABORT1-1 and ABORT2-1 signal remain High. Accordingly, the controller 92 checks to see that the TEST-1 voltage level drops by the delta-voltage amount. The SET_DODC-1 signal is then toggled back to its High state. In test block 1510, the ABORT1-1 signal is toggled Low (through a request to the neighbor1 controller), while both of the ABORT2-1 and SET_DODC-1 signals are High. Accordingly, the controller 92 checks to see that the TEST-1 signal has not experienced a voltage drop. If a voltage drop is found, then a failure has occurred relative to the transistor 520, the opto-isolator DU3 or the ABORT2-1 signal, as a properly conducting transistor 520 would cause the TEST-1 signal to maintain its voltage level. The third active-On test (block 1512) repeats the second active-On test, except that the ABORT2-1 signal will be toggled Low.

In the fourth active-On test (block 1514), the controller 92 requests both of its neighboring controllers 94–96 to set the ABORT1-1 and ABORT2-1 signals low. Then, the controller 92 will check to see that TEST-1 signal voltage drops by the predetermined delta-voltage value. During this time, the other two controllers 94–96 will continue to drive the field device. Finally, in the fifth active-On test, the controller 92 will request its neighboring controllers 94–96 to switch their SET_DODC-1 signals Low for the channel being tested. When this happens, it should be understood that the abort circuit 510 alone will be driving the field device 508. Accordingly, the controller 92 will check to see that the TEST-1 voltage level does not drop, in order to make sure that the abort circuit 510 is capable of driving the field device 510 by itself if necessary. Additionally, the presence of a voltage drop across the diode 524 will also be checked for, in order to be certain that the diode is functioning properly. Assuming no errors were found, then program control will be passed to the no error procedure 1506, which will set up the next channel to test (block 1518).

During the active-Off and active-On tests, it should be understood that the neighboring controllers 94–96 need to cooperate with the controller 92 by acting on the requests to change their ABORT1-1, ABORT2-1 and SET_DODC-1 signals. This cooperation is achieved through the listening mode procedure 1472 shown in FIGS. 19K–19M. As these neighbor to neighbor communications are outside of the input and output data exchanges which are performed at specific times once each process control cycle, the successive approximation digital to analog converter circuit shown in FIGS. 6J–6K must be set up at each of the controllers 94–96 to receive signal change requests from the controller 92 (block 1520). An internal timer will then be set up by each of the controllers 94–96 within which signal change requests or commands must be received (block 1522). If the appropriate commands are not received in this time (diamond 1524), then the get out procedure 1526 of FIG. 19B will be performed.

Diamonds 1528–1530 indicate that the controller 92 may signal the controllers 94–96 to end the active test process. If the command received was not an end test command, the neighboring controllers 94–96 will check to see if any errors were encountered on their respective digital output circuits 502–504 during passive testing (block 1532). If any error was encountered, then the neighboring controller detecting its own error will signal back to the controller 92 that it cannot execute the requested command (1534), and set the amount of time that it expects a further message from the controller 92 (block 1536). As the existence of any board error will terminate active testing, the controller 92 will preferably respond with the end test command. In such a case, the Error code representing the type of error will be stored, as will an identification as to which channel the error was detected during passive testing (block 1534).

Assuming that no errors were found, then the neighboring controllers 94–96 will determine whether the controller 92 has requested a specific change in the ABORT signal (diamonds 1540–1542) or a change in the SET signal (diamond 1544). For example, in the case of the "Abort On" command, then the neighboring controllers 94–96 will extract the channel to be affected from the command message (block 1546), and check to see if there is a field error (diamond 1548). Assuming that an error has not been detected for the field device 508 of the channel being tested, then each of the controllers 94–96 will check to see if the channel is On (diamond 1550). If the channel is On, then the abort transistor (e.g., transistor 518) will already be on. Accordingly, the controller receiving an Abort On command at this juncture will determine that a bad message has been received (polygon 1552), and send a reply message to the controller 92 that this command cannot be executed (block 1536). However, assuming that the channel was Off, then the controllers 94–96 will determine which abort switch has been commanded to be changed to an Off state (block 1554). Then, the Reset Wait routine 1556 of FIG. 19M will be performed.

Figure 19M:
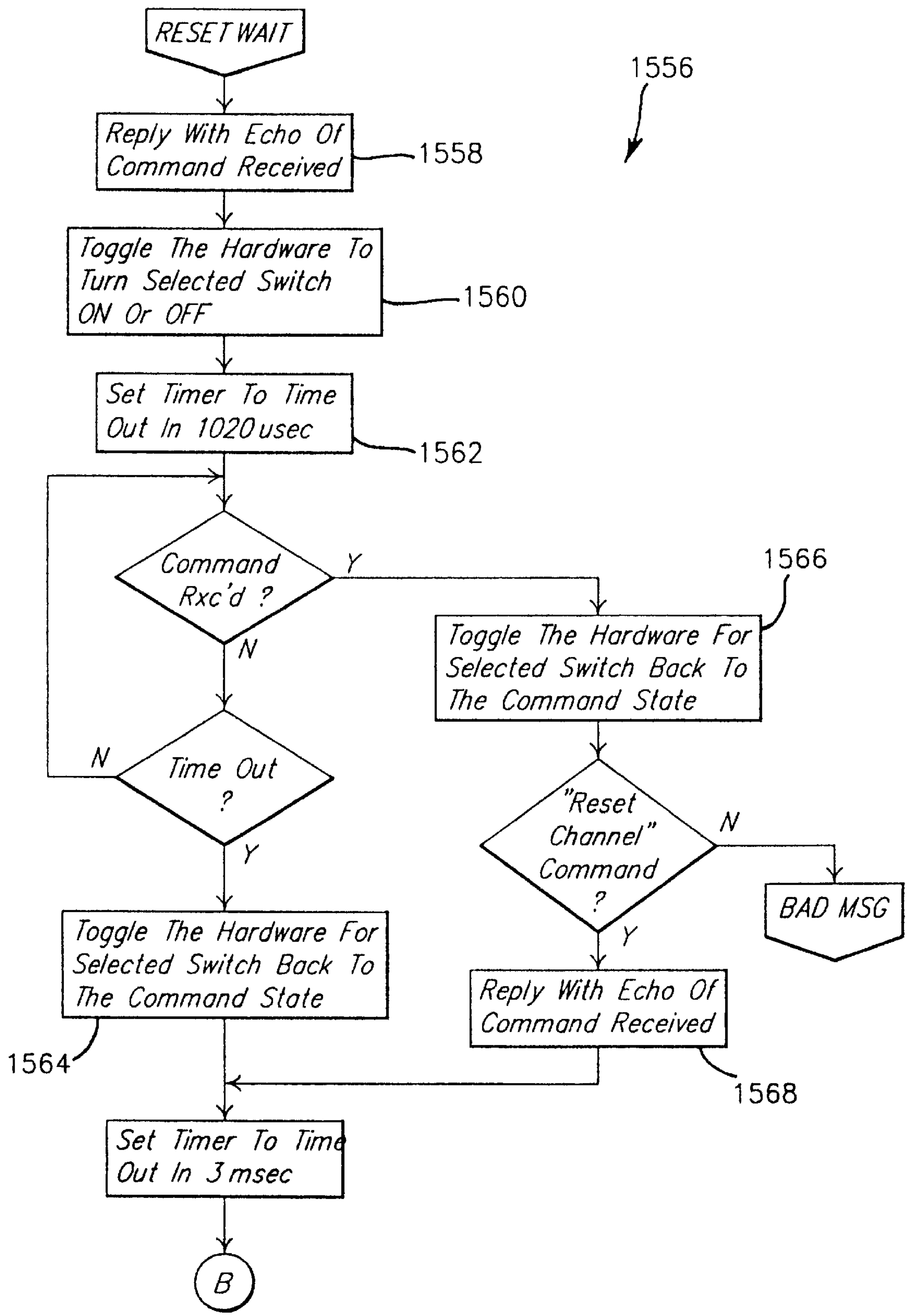

The Reset Wait routine 1556 of FIG. 19M begins with the neighboring controllers 94–96 sending a reply message to the controller 92 which echoes back the command received (block 1558). This echoing procedure enables the controller 92 to know that its message was properly received. Then, the controllers 94–96 will turn On or Off the specific switch commanded by the controller 92 (block 1560), and set a timer to permit an automatic toggling back of this switch to its previous state (block 1562). If a toggle-back message from the controller 92 is not received before the timer reaches zero (or the predetermined time out value), then the affected neighboring controller will automatically toggle this switch back to its previous state (block 1564). Otherwise, the controllers 94–96 will reset their respective switches (block 1566), and reply with an echo message to the controller 92 (block 1568). Ultimately, as shown in FIG. 19G, the controller 92 will send a message to its neighboring controllers to end the active testing procedure (blocks 1570–1572).

As indicated above, each of the analog output circuits 600–604 enable tests to be conducted of their abort and drive capabilities. These tests are considered to be non-intrusive, because they will not disturb the analog output values being supplied to the field. The non-intrusive testing will be conducted on all 5 channels of one analog output circuit 600–604 at a time, and such testing preferably takes place only when all of the controllers 92–96 and their respective analog output circuits are fully functioning. While one analog output circuit is undergoing this non-intrusive testing, at least one of the other two neighboring analog output circuits will generate the electrical current necessary to maintain the desired output power to the field.

Figure 20A:
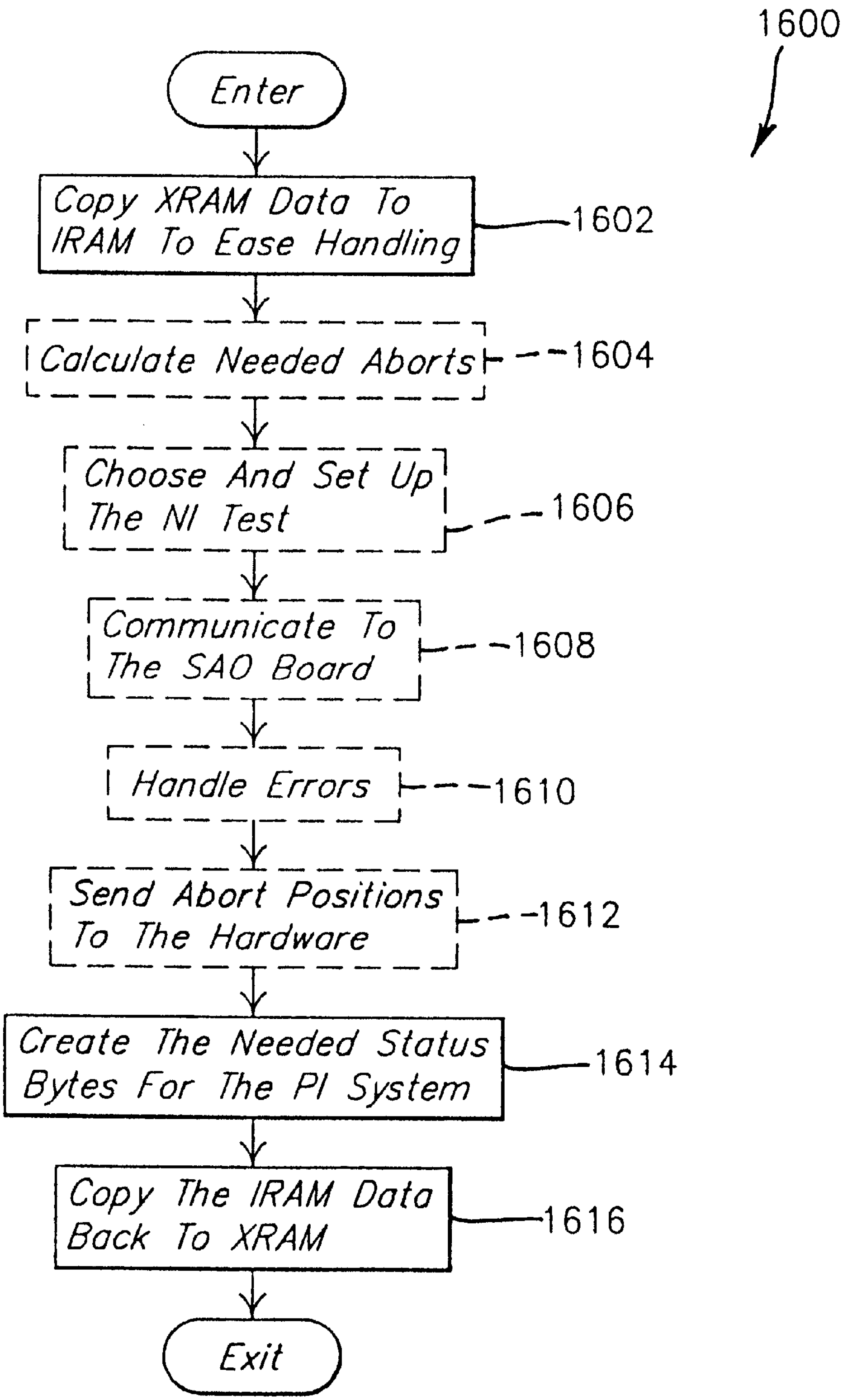
FIGS. 20A–20V comprise a set of flow charts which illustrate the method of setting the analog abort switches and conducting non-intrusive testing of the analog output circuits shown in FIG. 10B by a field I/O computer controller.
Figure 20B:
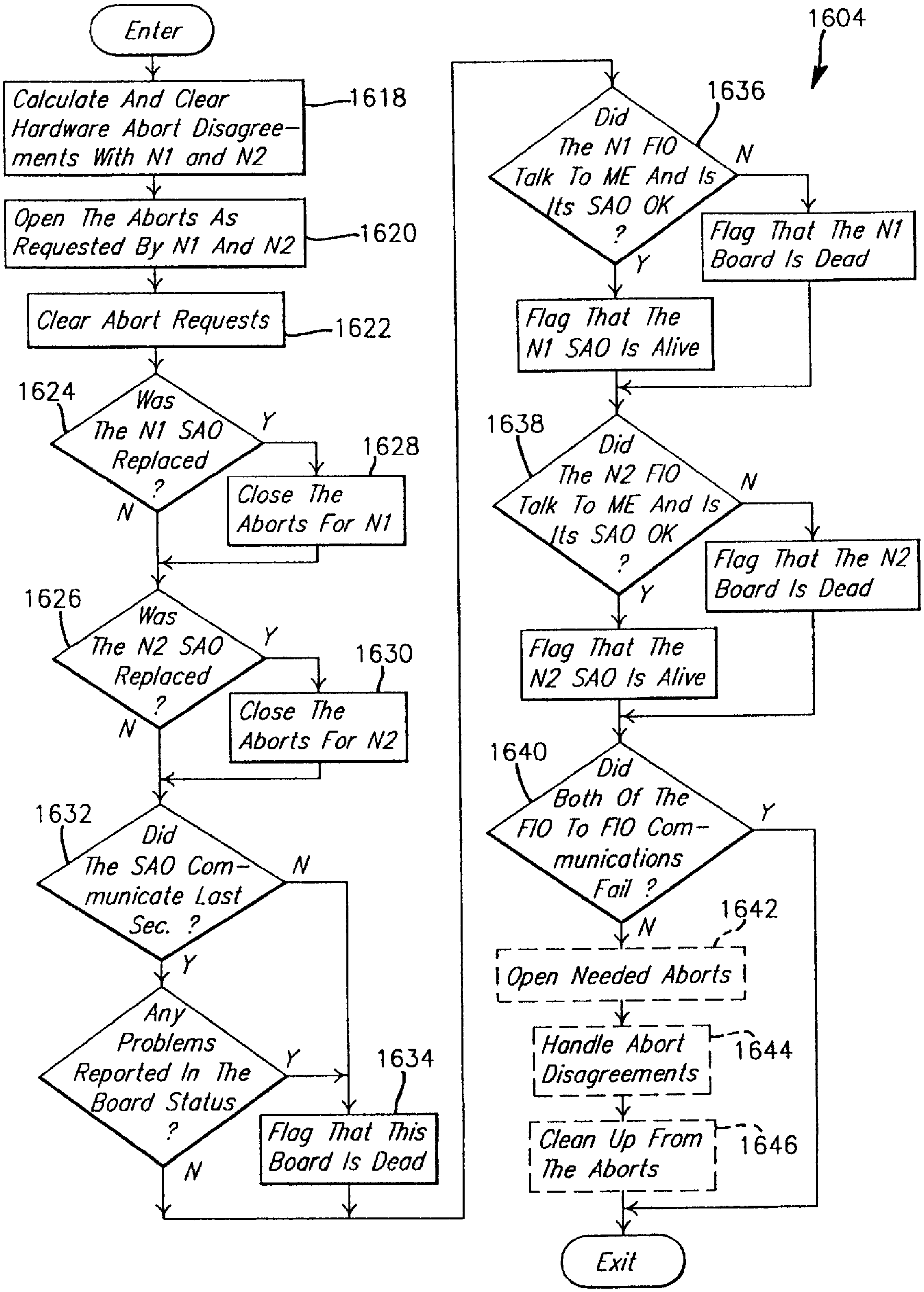
Figure 20C:
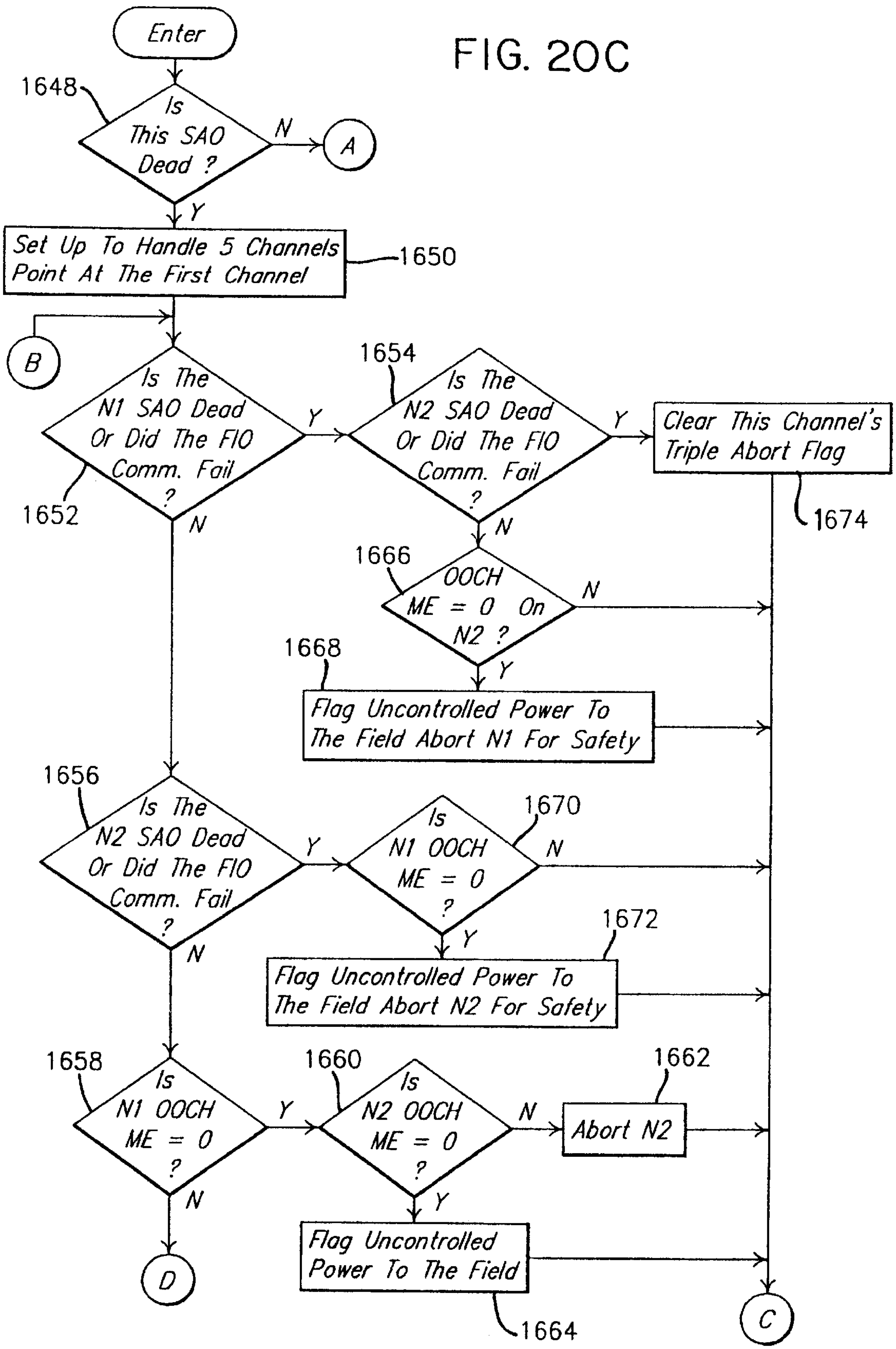
Figure 20D:
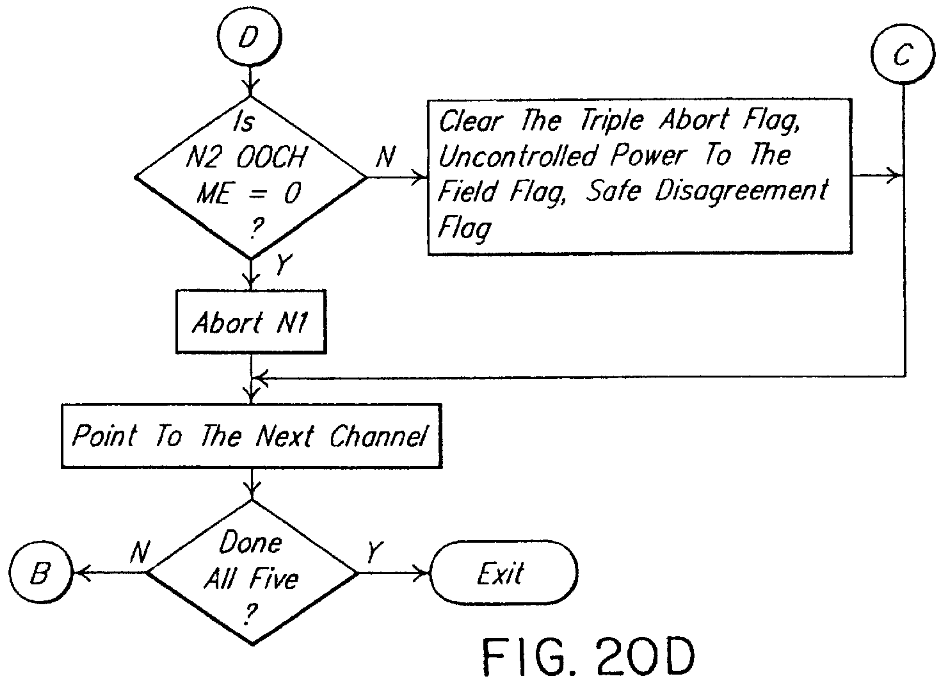
Figure 20E:
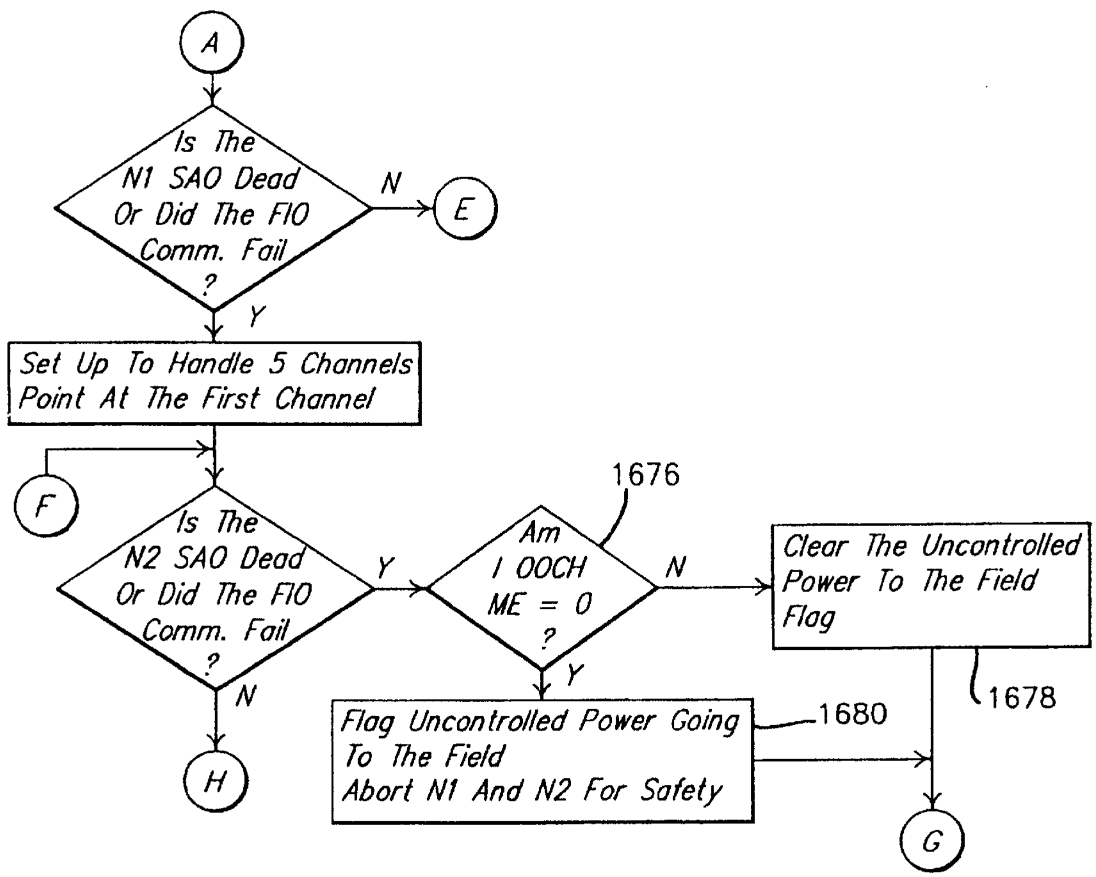
Figure 20F:
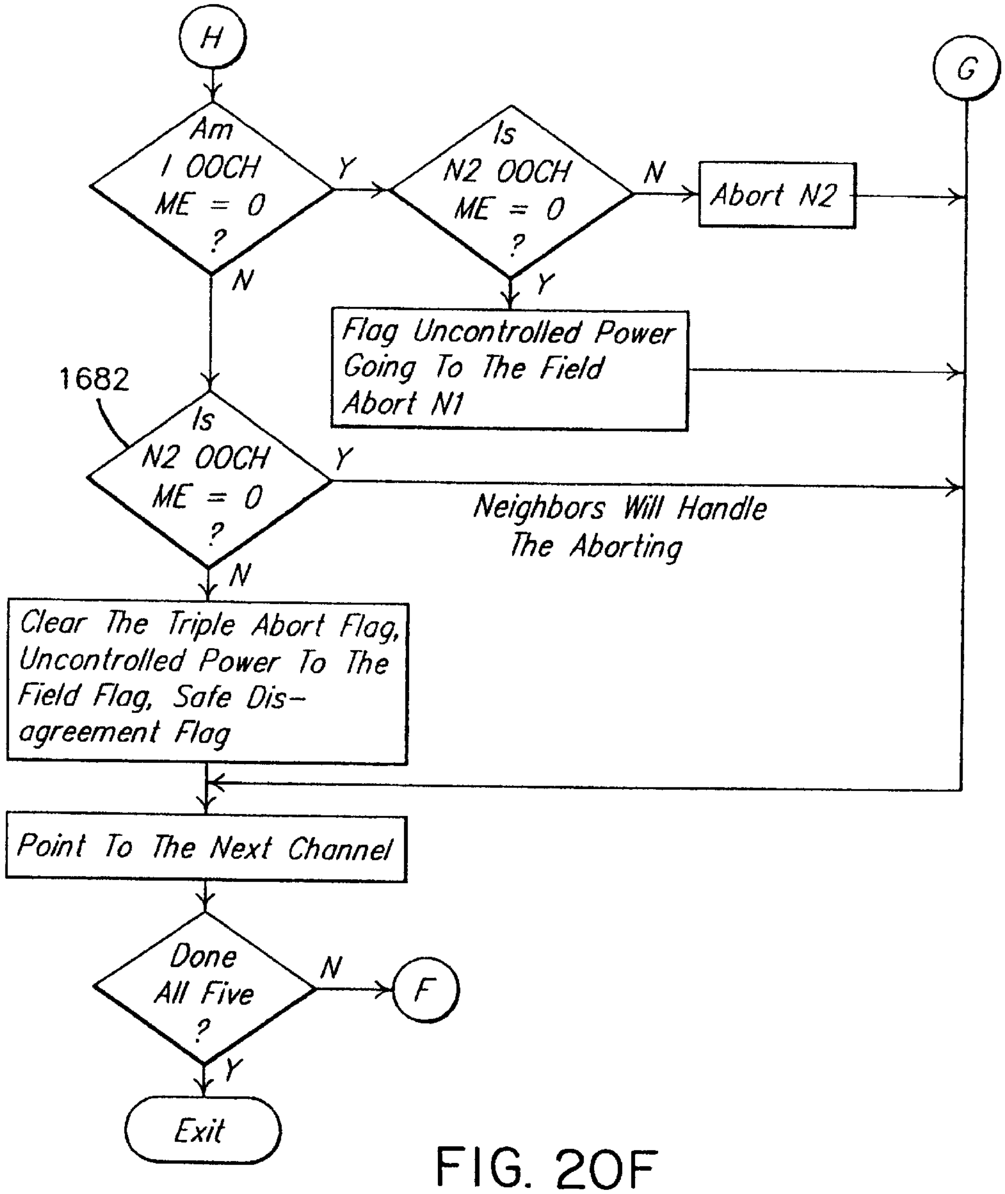
Figure 20G:
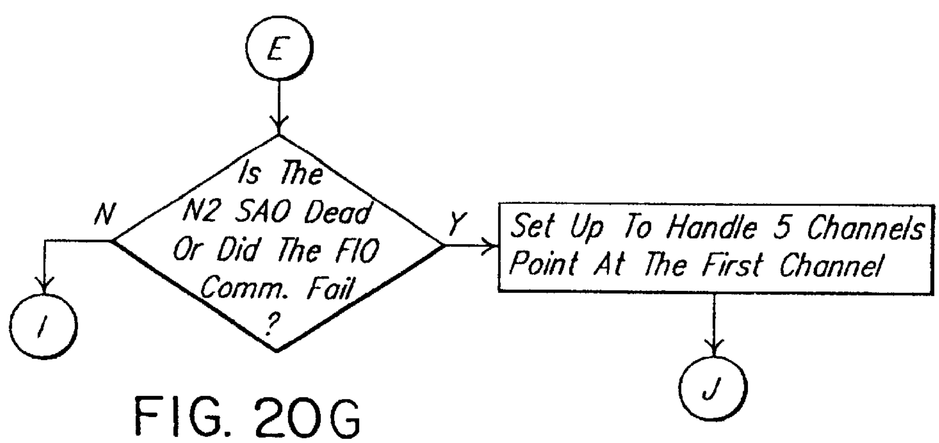
Figure 20H:
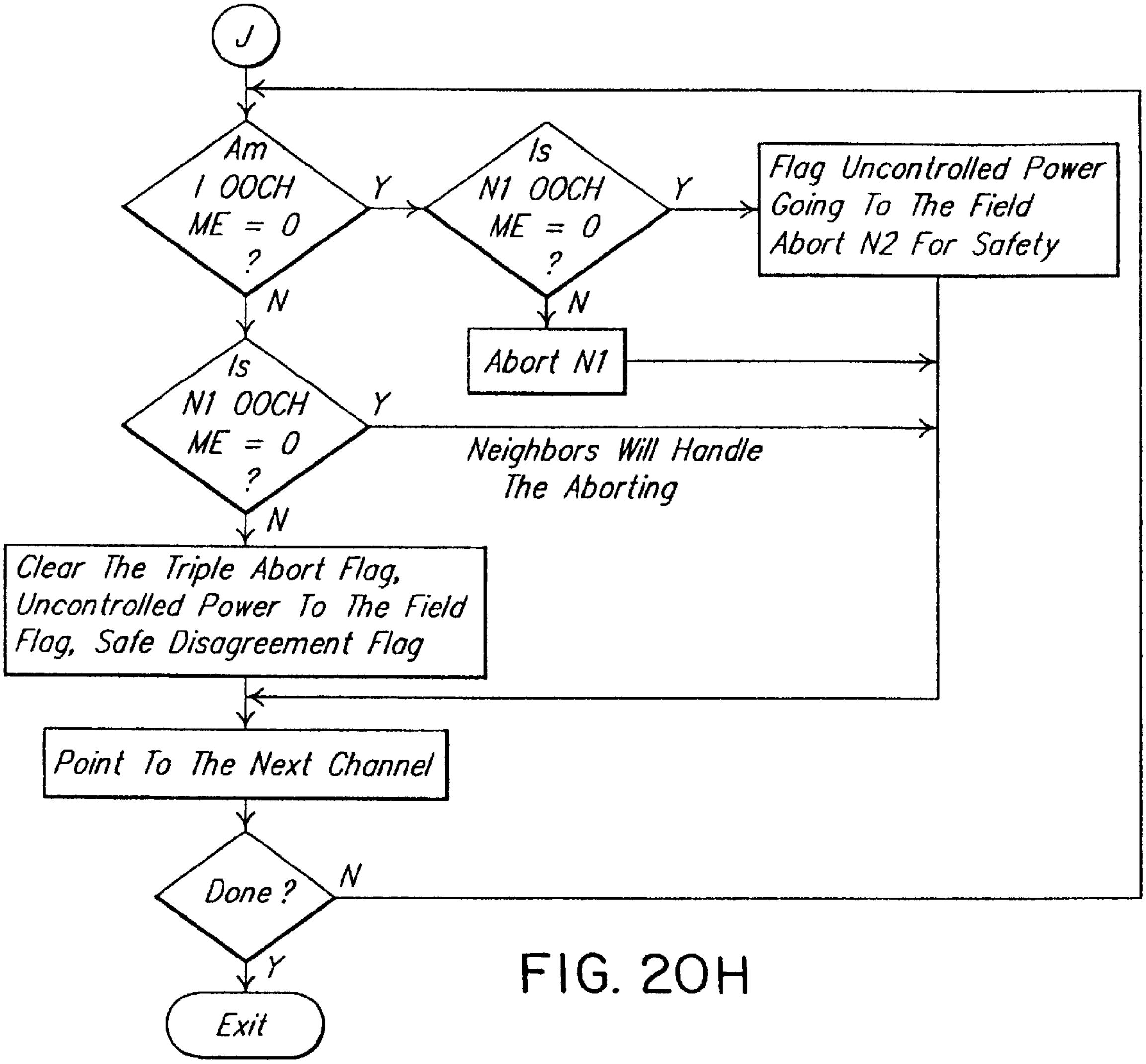
Figure 20I:
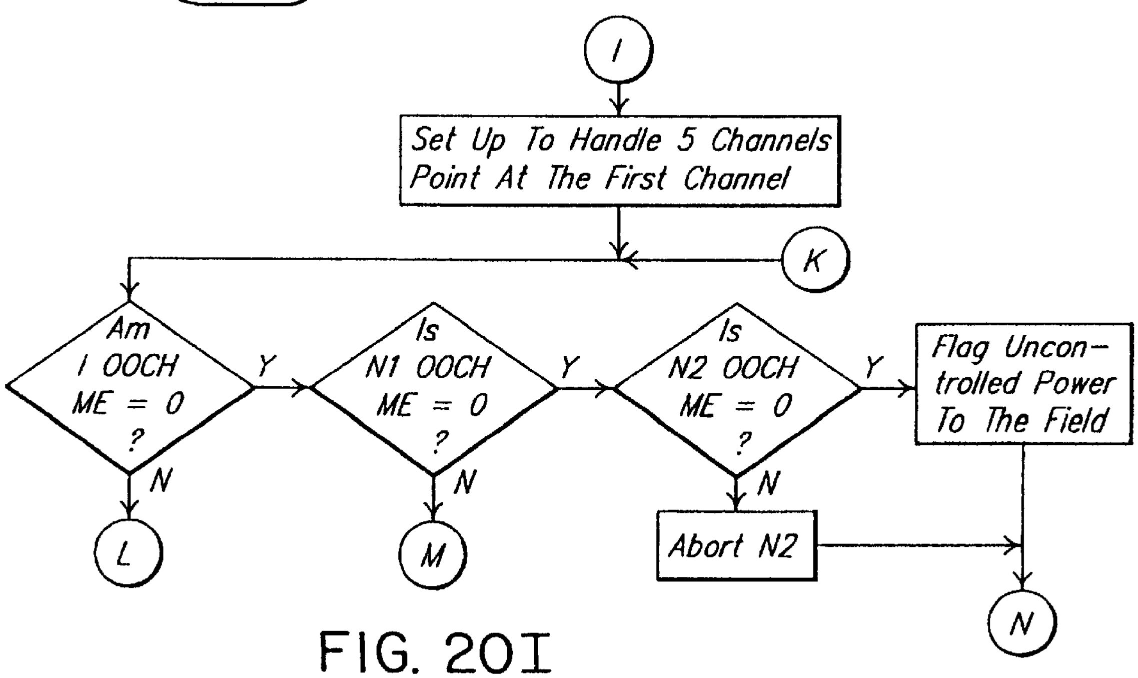
Figure 20J:
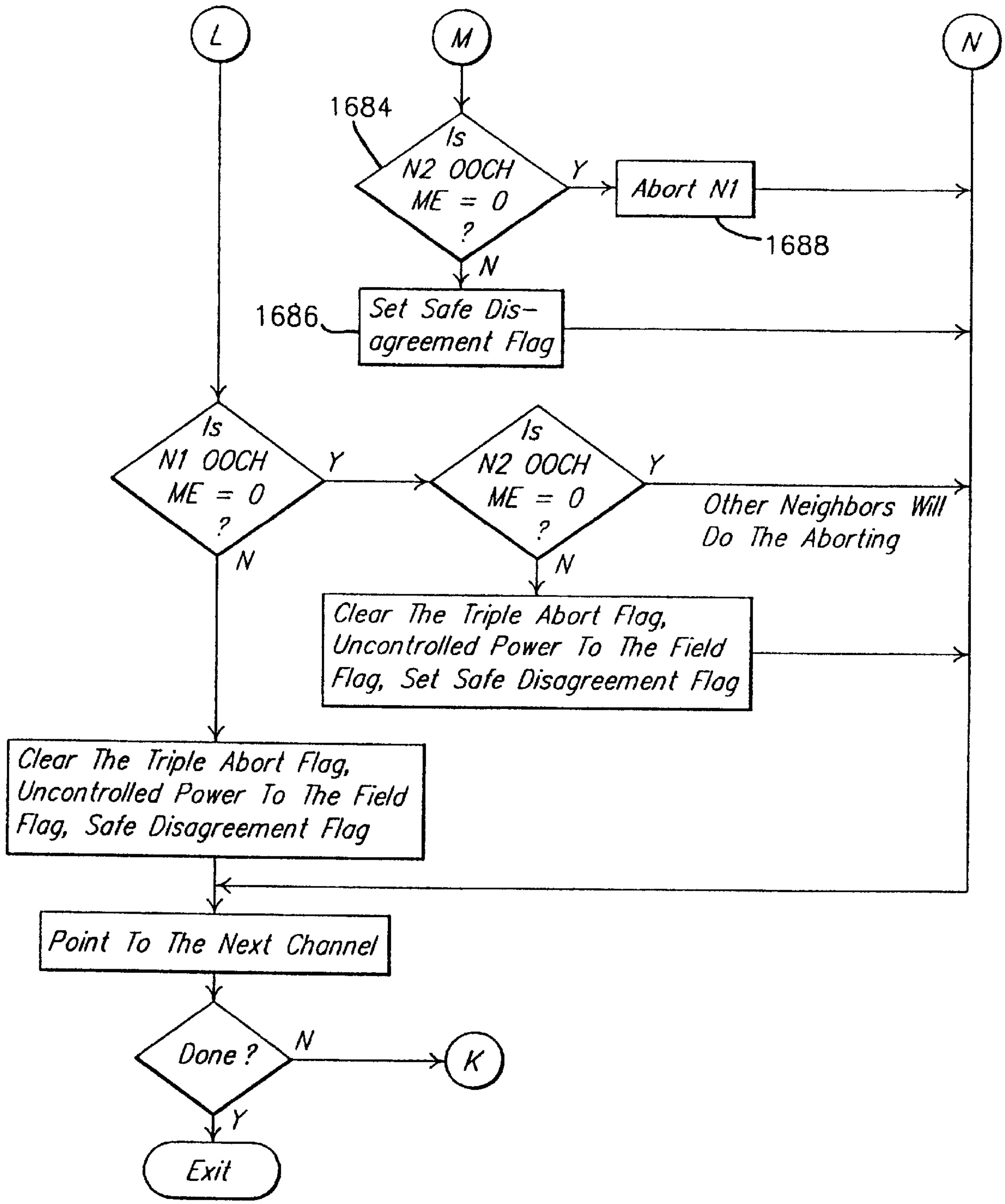
Figure 20K:
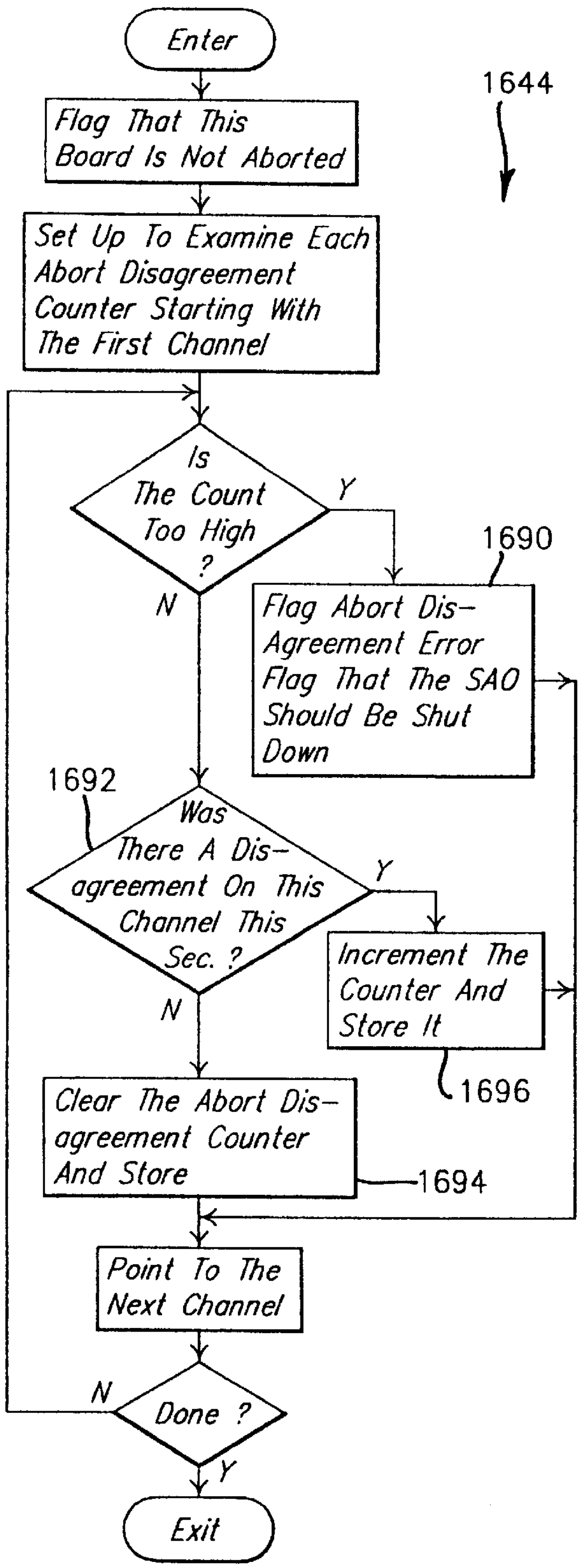
Figure 20L:
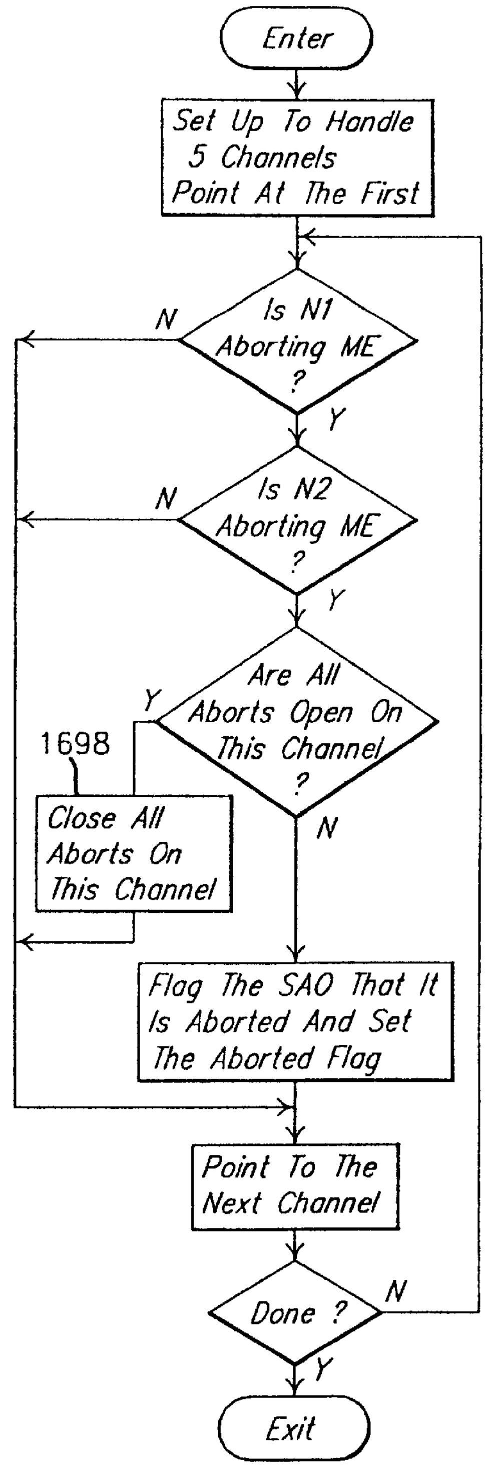
Figure 20M:
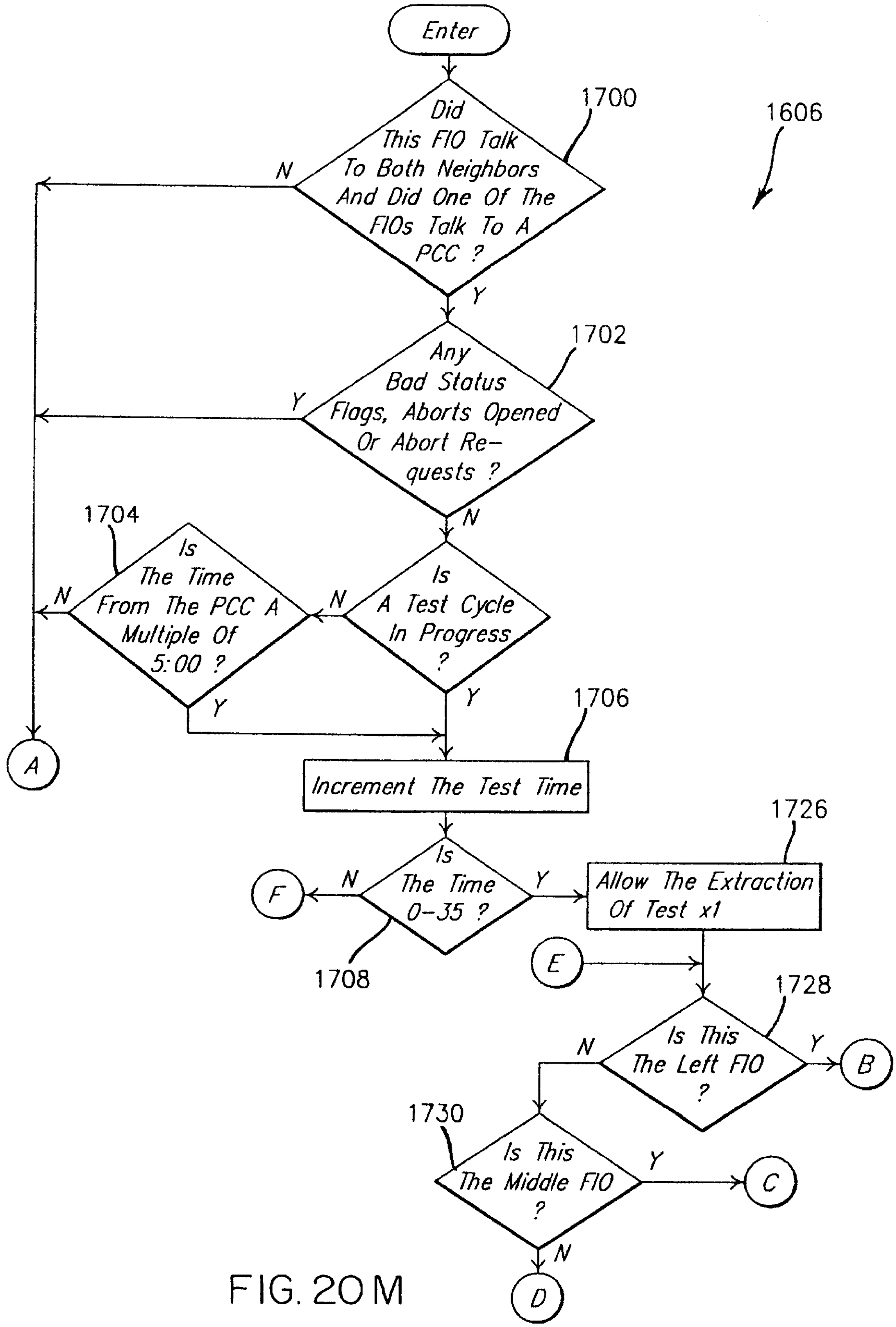
Figure 20N:
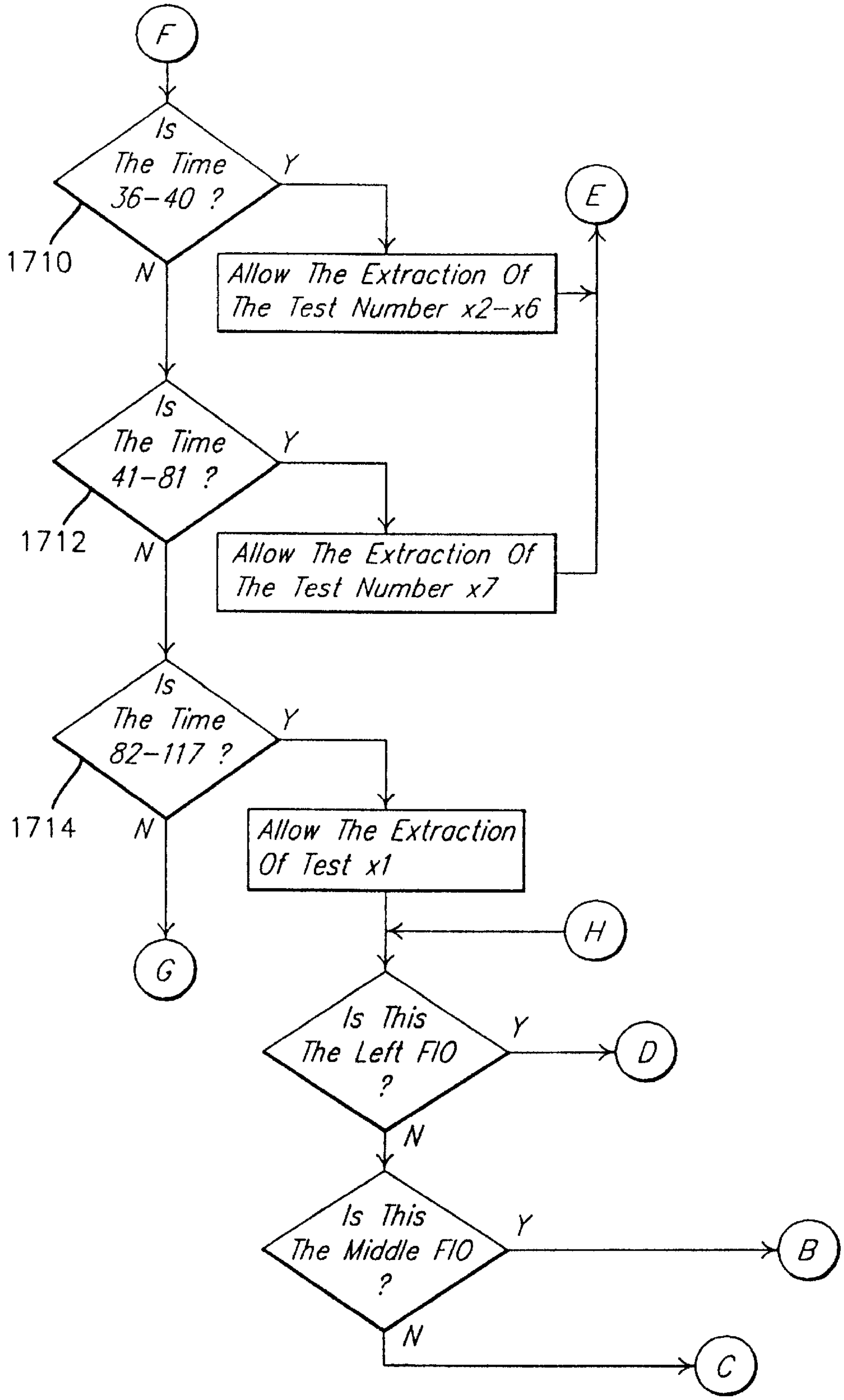
Figure 20:
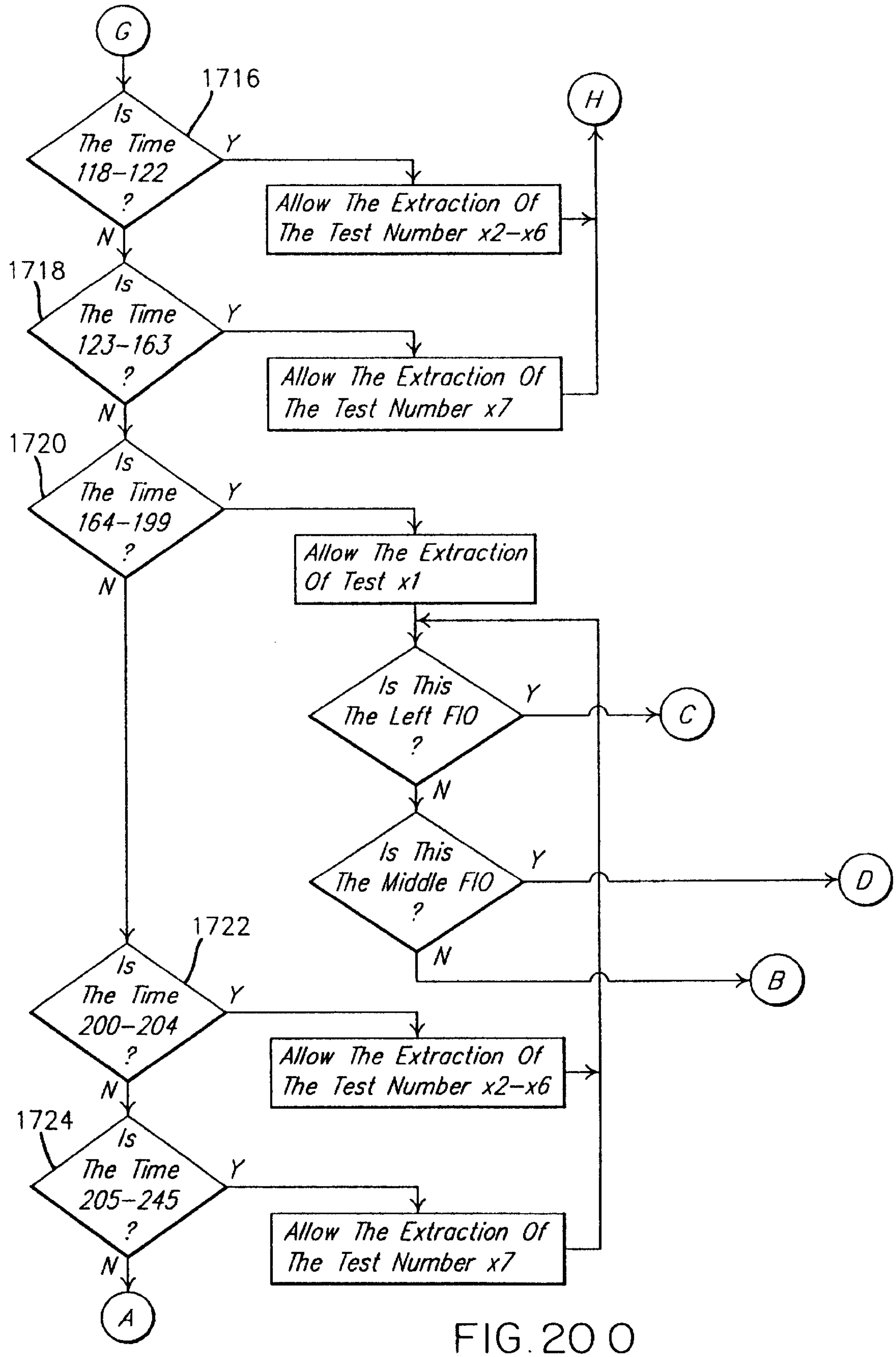
Figure 20:
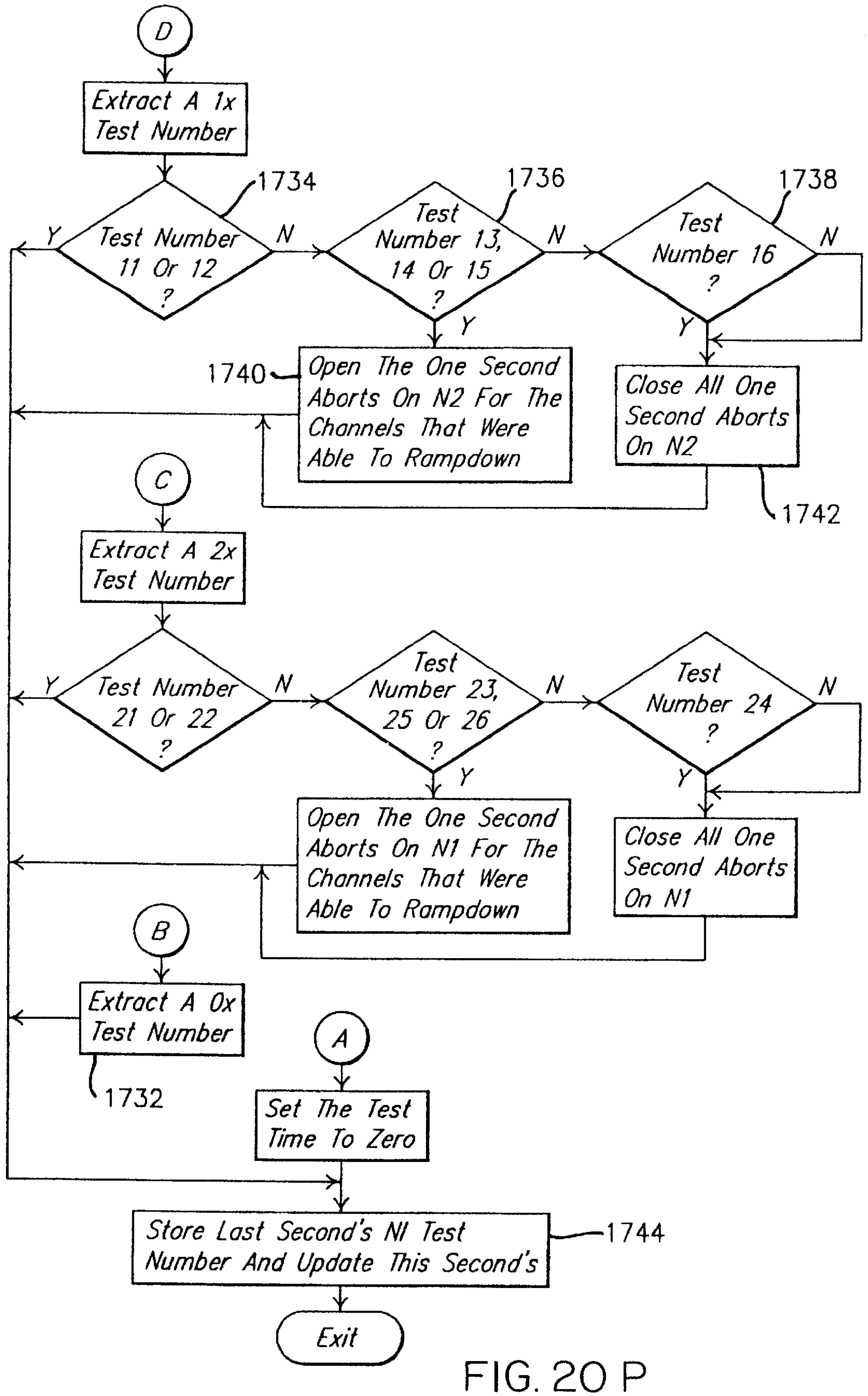
Figure 20Q:
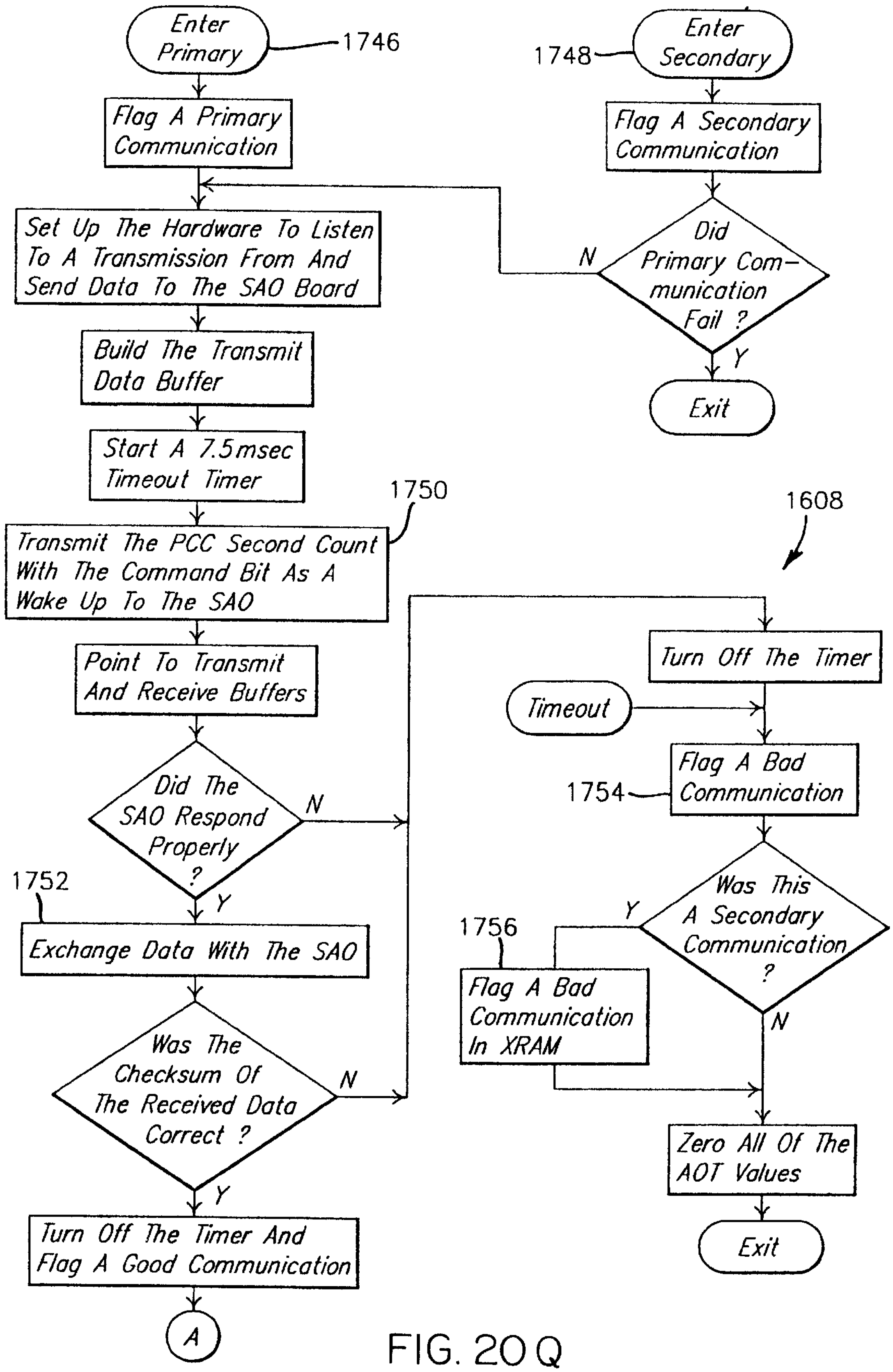
Figure 20R:
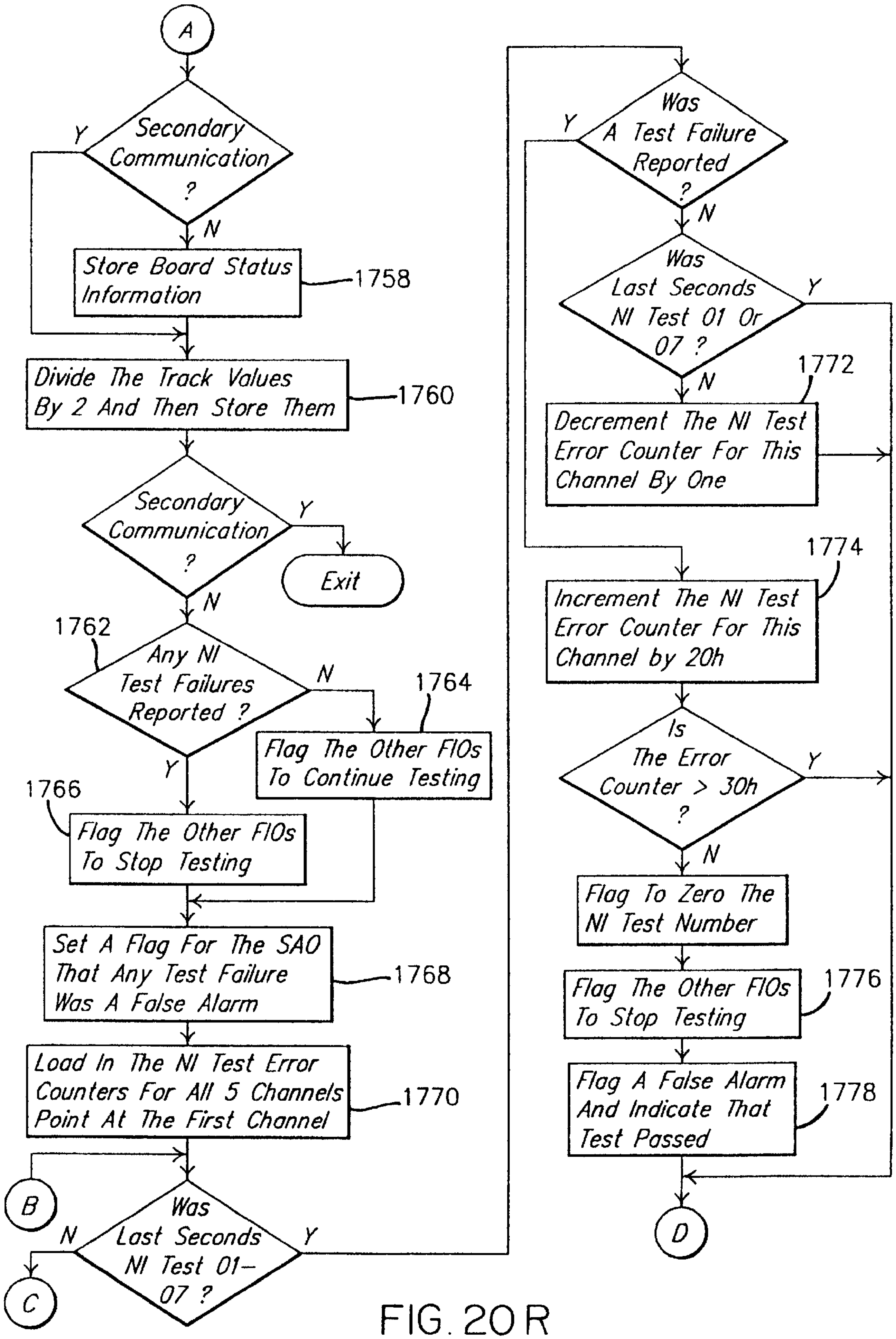
Figure 20:
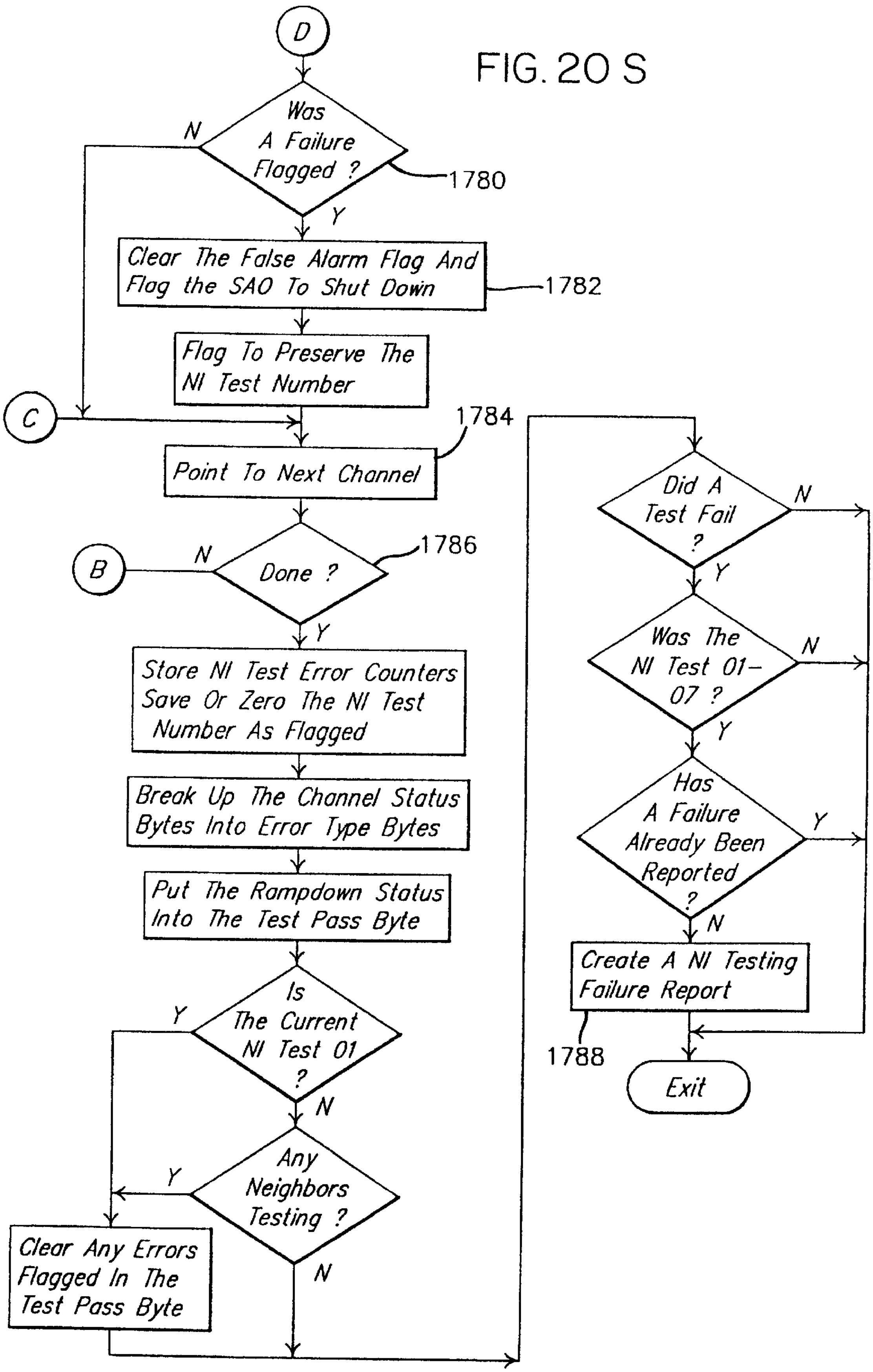
Figure 20T:
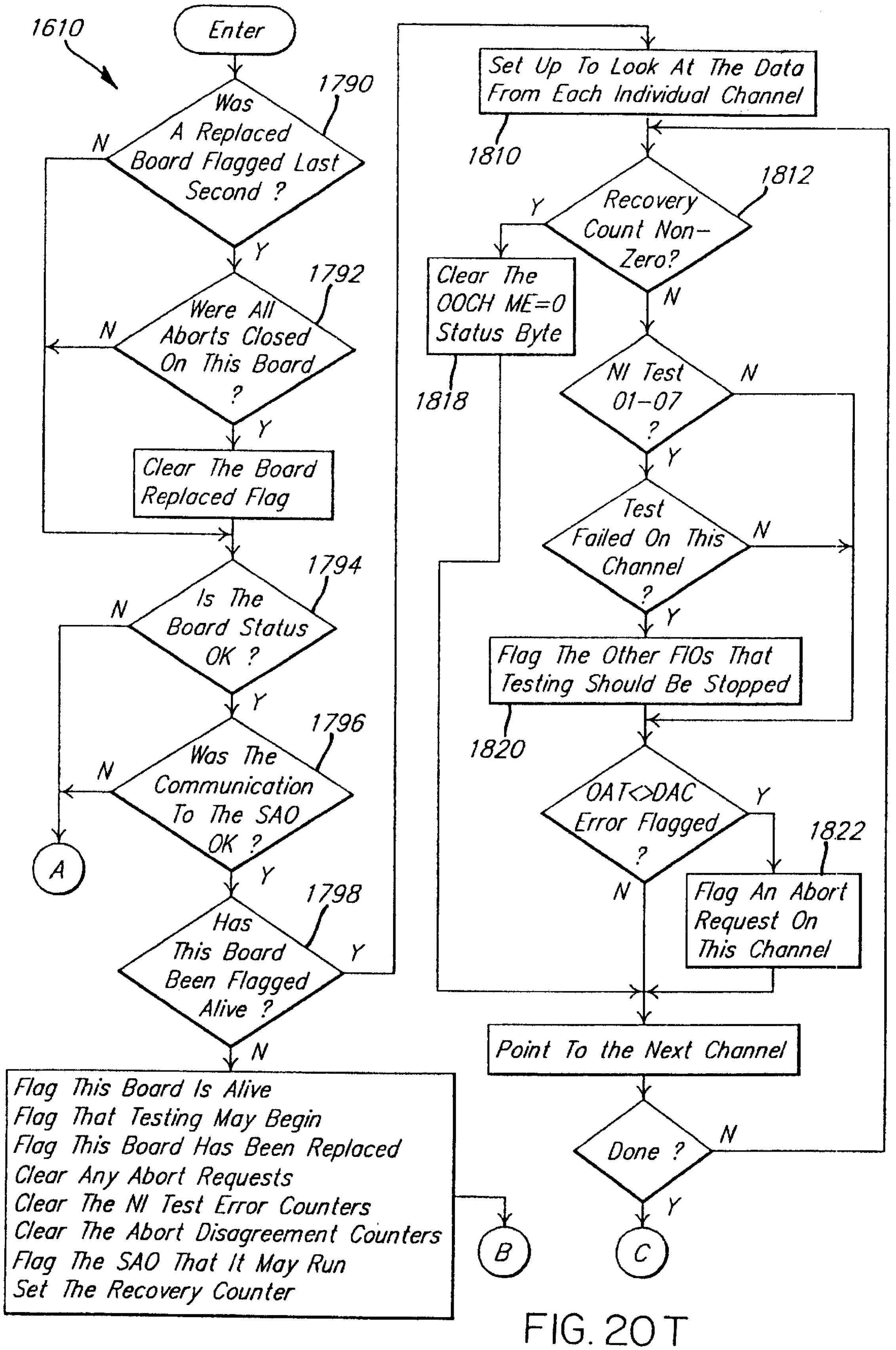
Figure 20U:
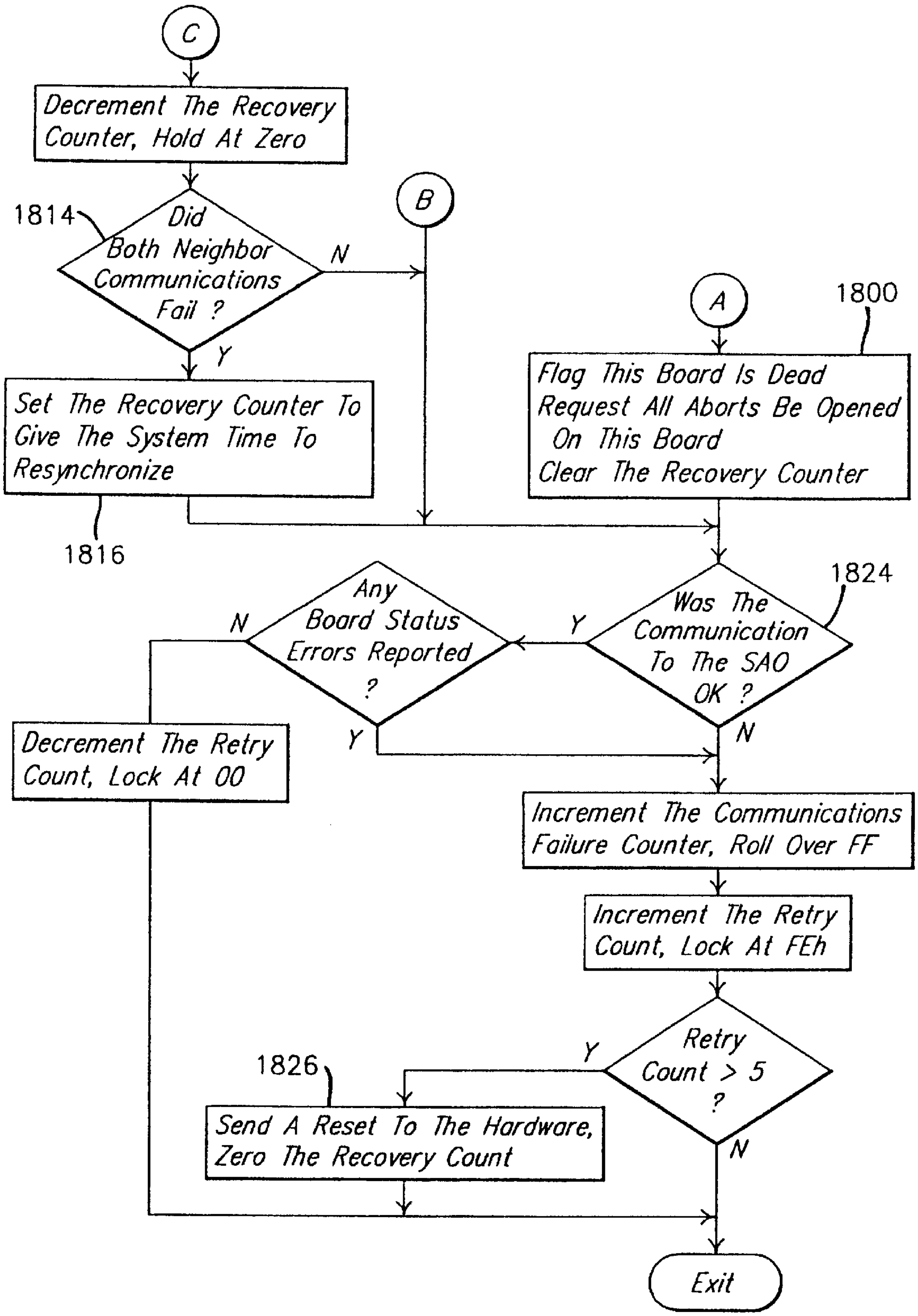
Figure 20V:
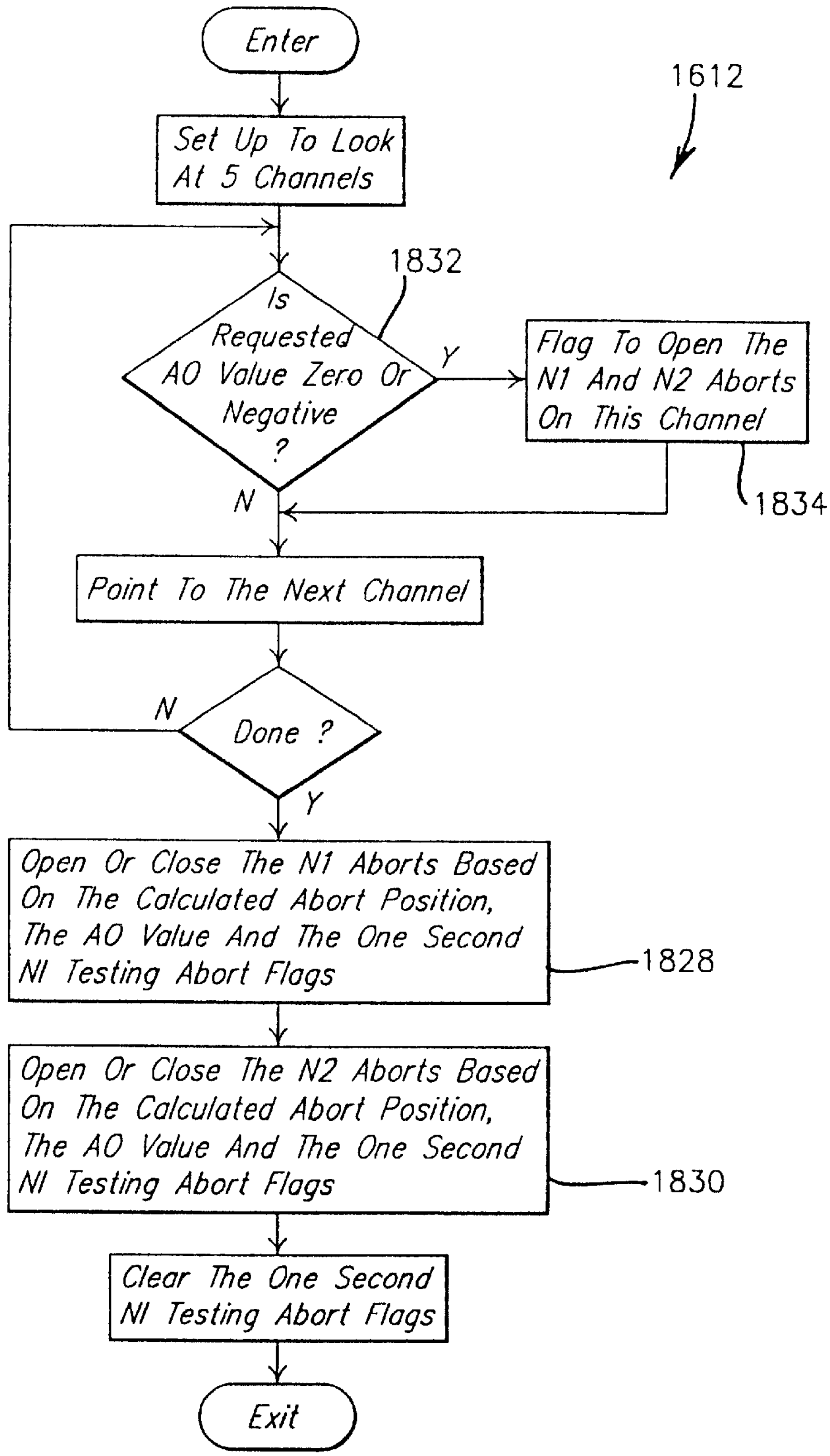

FIGS. 20A–20V provide a set of flow charts for the software on the controllers 92–96 which makes abort determinations and directs the non-intrusive testing of the analog output circuits 600–604 according to the present invention. In this regard, FIG. 20A shows an overall or main flow chart 1600 for this controller software. For ease of description, operations represented by this software will be discussed using controller 92 as the example. However, it should be appreciated that these operations are performed concurrently by each of the controllers 92–96. Block 1602 indicates the necessary data for abort decisions and non-intrusive testing is copied from the external RAM memory (U42 of FIG. 6A) to the internal RAM of the controller's microprocessor (U40 of FIG. 6A). Then, the controller 92 will sequentially perform a set of routines, as indicated by the broken-line blocks 1604–1612. The Calculate Needed Aborts routine 1604 is shown in FIGS. 20B–20L. The Choose and Set Up the Non-Intrusive ("NI") Test routine 1606 is shown in FIGS. 20M–20P. The Communicate to the Smart Analog Output ("SAO") Board routine 1608 is shown in FIGS. 20Q–20S. The Handle Errors routine 1610 is shown in FIGS. 20T–20U. The Send Abort Positions to the Hardware routine 1612 is shown in FIG. 20V. Once all of these routines are completed, then the necessary status bytes needed by the Process Information ("PI") system are created (block 1614). Finally, the IRAM data is copied back to the XRAM (block 1616).

Referring to FIGS. 20B–20L, a set of flow charts for the Calculated Needed Aborts routine 1604 is shown. In this regard, FIG. 20B provides an overall flow chart for this routine. Block 1618 indicates that the data transferred from the N1 and N2 output communications will first be examined to see if there are any hardware abort disagreements. A hardware abort disagreement arises when the ME controller 92 has aborted a particular channel and neither of the neighboring controllers N1–N2 have done the same. If this condition exists, the disagreeing abort switch will be closed. In any event, any abort request from a neighboring controller is honored by opening the abort switch for the channel of the SAO identified by the request data (block 1620). The controller 92 will then clear out the abort requests and start to process its own independent abort determinations for the next process control cycle (block 1622).

Diamonds 1624–1626 are used to determine if either of the neighboring SAO boards were replaced, and if so, then blocks 1628–1630 indicate that the abort switches for a replaced SAO will be closed in order to permit it to operate. Next, the controller 92 will check to see if its SAO board sent a communication during the last process control cycle (diamond 1632). If a communication was not sent or a problem was reported, then a flag will be set to indicate that this SAO board is considered "dead" (block 1634). A similar procedure is then performed for both of the neighboring SAO boards through the messages provided from the controllers 94–96 (diamonds 1636–1638). Then, in the event that both of the neighboring controllers 94–96 failed to communicate with the controller 92, then no abort switches will be opened by the controller 92 at this point (diamond 1640). This is to permit the outputs determined by the Fail Safe/Last mechanism to reach the field even though none of the controllers 92–96 are able to communicate with each other.

Assuming that the controller 92 is able to communicate with at least one of its neighbors, then the Open Needed Aborts routine 1642 will be performed. The Open Needed Aborts routine 1642 is shown in FIGS. 20C–20J. The controller 92 will then perform the Handle Abort Disagreements routine 1644 of FIG. 20K. Finally, the controller 92 will perform the Clean Up from the Aborts routine 1646 of FIG. 20L.

Referring to FIGS. 20C–20J, the Open Needed Aborts 1642 routine will now be discussed. Diamond 1648 indicates that an initial check is made as to whether the SAO board for the controller 92 was flagged as being dead. If this SAO board is considered alive or operational, then program control will jump to point "A" on FIG. 20E. However, even if this SAO board is considered dead, the controller 92 will still set up to process abort decisions for all five analog output channels, and point to the first of these channels (block 1650). Diamonds 1652–1656 indicate that a check will be made to see if either of the neighboring SAO boards were flagged as dead.

Assuming that both of the neighboring SAO boards are operational, then diamonds 1658–1660 are used to detect for the presence of an "OOCH ME=0" flag from each of the neighboring SAO boards, as relayed by the controllers 94–96. The "OOCH" term of this status signal stands for "Out Of Control High". As indicated above, if any of the SAO boards detect more power going to the field than there should be (e.g., more than 2% of the maximum allowable value), then any SAO board detecting such an occurrence will attempt to ramp itself down to zero. If it is able to ramp itself out of the contribution of power being transmitted to the field (i.e., ME=0) and the OOCH condition still exists, then it will set the Out Of Control High ME=0 flag for communication to neighboring controllers through a message from its own controller. Thus, for example, if the "N1 OOCH ME=0" signal is received by the controller 92, and the "N2 OOCH ME=0" flag is not set, then block 1662 indicates that the controller 92 will open the abort switch for the first channel on the controller designated as N2 (e.g., controller 96). This action is taken because it is clear at this point that the SAO board for the controller designated as N1 (e.g., controller 94) is not the source of the problem. However, if both the "N1 OOCH ME=0" and "N2 OOCH ME=0" signals were received by the controller 92, then a flag will be set to indicate to the process control computer 14 that uncontrolled power is being transmitted to the field for this analog output channel (block 1664).

In the event that the answer to diamond 1652 is YES and the answer to diamond 1654 is NO, then the controller 92 will look for the "N2 OOCH ME=0" flag (diamond 1666). If this signal is present, then the controller 92 will set the uncontrolled power to the field flag (block 1668). Additionally, as extra measure, the controller 92 will re-open the abort switch for this channel of the SAO board for the controller designated as N1. This is because (although the abort switch should have been opened) it could nevertheless be possible that the N1 SAO board could erroneously be sending too much power to the field, even though the N1 controller could not communicate with the controller 92, and the N2 SAO appears to be able to drive the load. Diamond 1670 and block 1672 indicate that this procedure is followed in the event that the N1 SAO is functioning properly and the N2 SAO board is considered dead (or its controller did not communicate with controller 92 in this process control cycle). In the event that diamonds 1652 and 1654 are both answered YES, then this channel's Triple Abort flag will be cleared (block 1674). This flag is used to enable all abort switches to be closed in order to prevent a total loss of power to the field.

FIG. 20D shows that this process is continued and repeated until all of the five analog channels have been processed. Additionally, FIGS. 20E–J combine to demonstrate that this process is performed in a similar manner when the SAO board for the controller 92 is functional and the neighboring SAO boards may or may not be functional. Thus, for example, diamond 1676 indicates that the controller 92 will test for the presence of its own "OOCH ME=0" flag when its neighbors have failed to communicate or their SAO boards are considered dead. In this example, block 1678 indicates that the proper amount of power is being transmitted to the field for the SAO board for controller 92 has not ramped itself down to a non-contribution level (e.g., a zero output). In contrast, if this SAO has ramped itself out, then the uncontrolled power to the field flag will be set and the N1 and N2 abort switches for this channel will be opened by the controller 92 to assure that they are outputting no power (block 1680).

Additionally, it should be noted that a YES answer to diamond 1682 in FIG. 20F indicates that the neighboring controllers 94–96 will independently handle the necessary abort decisions (e.g., open the abort switches for SAO board of controller 92), if such action is warranted by the process described above. Furthermore, a NO answer to diamond 1684 of FIG. 20J shows that the Safe Disagreement flag will be set (block 1686). This is a situation where all of the SAO boards are functioning, communication has been received from both the N1 and N2 controllers, the SAO board for controller 92 has set the "OOCH ME=0", and the other two SAO boards have not set their respective "OOCH ME=0" flags. In this situation, the Safe Disagreement flag is set because the three SAO boards are functioning, so it is possible to employ majority decision making to determine whether an abort should be opened. The Safe Disagreement flag is used to indicate to the Abort Disagreement routine of FIG. 20K that a problem has occurred. However, if the answer to diamond 1684 is YES, then the controller 92 will open the N1 abort switch for this channel (block 1688). This is because two SAO boards (ME and N2) have independently noticed the output to the field was too high and independently pulled their outputs down to a non-contribution level, but the SAO board for the N1 controller has not.

Referring to FIG. 20K, a flow chart for the Handle Abort Disagreements routine 1644 of FIG. 20B is shown. This routine examines a counter which is set up for each analog output channel to record the number of Safe Disagreements between this controller's SAO board "OOCH ME=0" flag and the other two functioning SAO boards. If this count gets too high (e.g., 32 decimal) on any one of the five analog output channels, then an abort disagreement error flag will be set (block 1690). This error flag will cause the controller 92 to shut down its own SAO board, because the disagreement with the neighboring boards indicates that this board would not be capable of driving the output if it had to (i.e., the output would be too low). Diamond 1692 and blocks 1694–1696 indicate that only continuous disagreements will be accumulated to eliminate undue transient conditions.

Referring to FIG. 20L, a flow chart for the Clean Up from the Aborts routine 1646 of FIG. 20B is shown. This routine is used to respond to a situation where the controller 92 is informed that both of its neighboring controllers 94–96 have opened the abort switches on one of the channels for the SAO board of the controller 92. If the controller 92 had also opened the abort switches on this channel, both of the abort switches for this channel will be closed by the controller 92, so that at least one of neighboring SAO boards will be able to transmit power to the field (block 1698). If the controller 92 had not opened the aborts on the channel, the SAO board would be told to shut down since one of its channels was aborted and the board would have to be removed for repair.

Referring to FIGS. 20M–20P, a preferred form of the non-intrusive testing method according to the present invention is shown. In this regard, these flow charts represent the Choose and Set Up the NI Test routine 1606 of FIG. 20A. Diamond 1700 shows that this testing will only be initiated if the controller conducting the test is able to communicate with both of its neighbors, and at least one of the controllers was able to communicate with the process control computer 14 within the last process cycle. Similarly, diamond 1702 indicates that if any errors were encountered, then the non-intrusive test procedure will be by-passed until such errors are corrected.

As indicated by diamond 1704, the non-intrusive testing is timed to begin at exact multiples of 5 minutes, according to a clock signal of the process control computer 14. In this regard, each of the field computer units 12 will receive a synchronization pulse from both the Left and Right process control computers 14*a*–14*b* each second. The controllers 92–96 then adjust their clocks accordingly. The non-intrusive testing then uses that clock to follow a specifically timed schedule. As it takes approximately 1.5 minutes for one of the analog output circuits to complete the testing routine, the 5 minute interval allows sufficient time to complete non-intrusive testing for all of the analog output circuits 600–604. In this regard, the Table below identifies the preferred timed operations for the non-intrusive testing. The "Displayed Time" listed on the Table is the time which is visually presented on the debug panel 18 of the process control computers 14*a*–14*b*. Each of the test numbers identified in this Table correspond to specific test procedure identified in FIGS. 20J–20M.

| Time | Displayed Time | Action |
|---|---|---|
| 00:00–00:35 | 00:00–00:23 | Left Test #1 |
| 00:36 | 00:24 | Test #2 |
| 00:37 | 00:25 | Test #3 |
| 00:38 | 00:26 | Test #4 |
| 00:39 | 00:27 | Test #5 |
| 00:40 | 00:28 | Test #6 |
| 00:41–01:21 | 00:29–01:15 | Test #7 |
| 01:22–01:57 | 01:16–01:39 | Middle Test #1 |
| 01:58 | 01:3A | Test #2 |
| 01:59 | 01:3B | Test #3 |
| 02:00 | 02:00 | Test #4 |
| 02:01 | 02:01 | Test #5 |
| 02:02 | 02:02 | Test #6 |
| 02:03–02:43 | 02:03–02:2B | Test #7 |
| 02:44–03:19 | 02:2C–03:13 | Right Test #1 |
| 03:20 | 03:14 | Test #2 |
| 03:21 | 03:15 | Test #3 |
| 03:22 | 03:16 | Test #4 |
| 03:23 | 03:17 | Test #5 |
| 03:24 | 03:18 | Test #6 |
| 03:25–04:05 | 03:19–04:05 | Test #7 |

While each of these seven tests will discussed below, these tests may be identified as follows. Test #1 may be referred to as the "Rampdown" test, as the controller conducting the test (controller 92 in this example) will slowly reduce its contribution to the analog output current to 0% of the commanded output value. The SAO boards for the N1 and N2 controllers will react by increasing their output current to maintain the proper output upon each reduction. The SAO board for the N1 controller is preferably instructed to contribute the majority of the output. This operation generally takes several seconds. If a failure is reported during this step, the probable cause of the failure will be due to a shorting of the blocking diode 648 (shown on FIG. 12C).

Test #2 may be referred to as the "Generate Test Voltage" test, as the SAO board for controller 92 will be instructed to output a voltage which is not large enough to affect the current being transmitted to the field. In other words, the test voltage level should be set lower than the threshold of the blocking diode 648 (e.g., 400 mV). If a failure is reported during this step, then the probable cause of the failure will be due to the inability of the operational amplifier 608 to output the desired test voltage level.

Test #3 may be referred to as the "ME Aborted Test", as the DN1 and DN2 abort switches will be commanded to be opened. The SAO board for the controller 92 will measure its output on the high side of the ME resistor 618 with respect to ground to determined if in fact the output is zero volts. In this regard, it should be noted that in all of these tests, it is preferred that each of the five channels are tested simultaneously. Accordingly, under Test #3, all of the analog output channels on the SAO board for the controller 92 will be aborted.

Test #4 may be referred to as the "N2 Abort Switch" test, as the DN2 abort switch will be closed while the DN1 abort switch is opened. The SAO board for the controller 92 will then measure its output on the high side of the ME resistor 618 with respect to ground to determine if the abort test voltage (e.g., 400 mV) is present at the output for each of its channels.

Test #5 is a test of the deadman circuitry. It begins by repeating Test #3 to assure the aborts DN1 and DN2 have been opened. Then, the deadman circuitry is activated, a voltage is output to detect the activation of the deadman, and then a determination is made whether the deadman was activated. Test #6 is a repeat of Test #4, except that the DN2 abort switch is open while the DN1 abort switch is closed.

Test #7 may be referred to as the "ME 100% Load" test, as the SAO board for the controller 92 will ultimately be commanded to drive 100% of the commanded output value to the field. Accordingly, the DN1 and DN2 abort switches will be closed and the SAO boards for the N1 and N2 controllers will slowly ramp down to 0%. The SAO board for the controller 92 will then measure the output for each channel across the ME resistors 624 to make sure that the SAO board has the ability to drive the required output value without any help from either of its neighbors.

Returning to FIG. 20M, the block 1706 indicates that the test time will be incremented by one second each instance that this procedure is repeated. This time count or value will then be evaluated through a series of diamonds 1708–1724 in view of the fact that the seven tests for each of the three controllers 92–96 follow the time chart set forth in the Table above. Additionally, it should be noted that a two digit nomenclature is used in the flow charts of FIGS. 20M–20P to identify the non-intrusive ("NI") tests of the present invention. The first digit refers to the identity of the controller conducting the NI test, whereas the second digit refers to the specific test number. In this regard, the first digit is either "0", "1", "2" or "x". The "0" digit refers to the ME controller, which is controller 92 in this example. The "1" and "2" digits refer to the N1 and N2 controllers respectively. The "x" digit is essentially a wild card that could refer to any of the controllers 92–96. Additionally, the "x" designation may also be used as wild card for the test number digit as well.

Thus, if the test time is between 0–35 seconds, the controller will allow the extraction of the first test (i.e., Test #1), as indicated by the "x1" nomenclature (block 1726). Next the controller conducting the NI test procedure will then check to see if it is the Left or the Middle controller (diamonds 1728–1730). In this example, the answer to diamond 1728 will be YES, and the program will go to block 1732 of FIG. 20P. Block 1732 permits the SAO board for controller 92 to extract a "Ox" test number, which at this point in the procedure "x" was previously identified as Test #1. As this NI test procedure will also be conducted independently, but concurrently in the other controllers 94–96, the program will jump to points "C" or "D" of FIG. 20P, respectively, for each of these controllers. In this regard, it should be appreciated that the points "C" and "D" provide entry points for other parts of the NI test program. Thus, for example, the diamonds 1734–1738 are used to direct program flow to different procedures depending upon which test is currently being extracted. In the case of Tests #3–#5, the Right controller 96 must open the abort switches for its neighbor N2 (i.e., controller 92), provided that the channels of the controller 92 were able to ramp down as required under Test #1 (block 1740). In the case of Test #6, the Right controller will close the abort switch for each of the channels on the SAO board for the controller 92 (block 1742).

Finally, block 1744 indicates that the last second's NI test number and this second's test number will be stored. Then, during the next process control cycle, which in this example is a one second period, the NI test procedure of FIGS. 20M–20P will be repeated. In this way, each of the controllers 92–96 will direct the NI tests performed on the SAO boards. Additionally, it should be appreciated that these controllers will also cooperate with each other by toggling abort switches and ramping down/up as required by the specific test number being conducted. This cooperation is provided through the time chart set forth above, as each of the controllers independently performs the same test procedure program. In other words, it is not necessary for one controller to request or command another controller to take the necessary action. Rather, each of the controllers 92–96 will look at the time and take the appropriate action, unless one of the problem conditions set forth in diamonds 1700–1702 is detected.

Referring to FIGS. 20Q–20S, the flow chart for the communicate to the SAO Board routine 1608 of FIG. 20A is shown. This routine is used to facilitate bi-directional communication between a controller and its SAO board. In this regard, a first data exchange between the controller and its SAO board is referred to as "Primary" communication (e.g., NI test directions and output values). Conversely, any subsequent data exchange between the SAO board and its controller is referred to as a "Secondary" communication (e.g., track values). Accordingly, FIG. 20Q shows two entry points, one for Primary communication (oval 1746) and one for Secondary communication (oval 1748).

FIG. 20Q shows several communication set up blocks which are consecutively performed. In this regard, it should be noted that set up block 1750 provides an initial wake up message to the SAO board, to which the SAO board must respond within a specific timeout period. If the SAO board responds properly, then data will be exchanged with the SAO board (block 1752). If the validity check failed (e.g., an incorrect checksum), then the appropriate bad communication flags will be set (blocks 1754–1756). Additionally, all of the analog output track ("AOT") values will be zeroed to prevent old data from remaining in the data tables, and thereby prevent a technician from misinterpreting the old data.

FIG. 20R indicates the appropriate status information and values will be stored depending on whether the message was a Primary or Secondary communication (blocks 1758–1760). Additionally, diamond 1762 is used to check for any failures in the Non-Intrusive testing. The controller, such as controller 92, will respond by setting a flag which will be transmitted to its neighboring controllers to either stop or continue the NI test procedure (blocks 1764–1766). Regardless of this outcome, a flag will be set for the SAO board of the controller 92 to indicate that any test failure is a false alarm (block 1768). As will be seen below, this flag may be cleared during a later part of this procedure.

The controller 92 will then begin to examine the NI test error counters for each of the five analog output channels (block 1770). If the NI test conducted in the last second was not Test #1 or Test #7, then the NI test counter will be incremented or decremented depending upon whether a test failure was reported by the SAO board (blocks 1772–1774). If a test failure was reported and the test error counter exceeds a predetermined limit (e.g., 30 hex), then a flag will be sent to the neighboring controllers to stop testing and the false alarm flag will be cleared (blocks 1776–1778). In this regard, it should be appreciated that the NI test procedure will permit a transient error to be reported before deciding to halt the NI test procedure.

FIG. 20S shows that the controller 92 will again check for a failure of an NI test (diamond 1780). This is done because the "test failure" flag will be cleared if an NI test failure occurred, but the test error counter did not exceed the predetermined limit. If such an failure is detected, then the false alarm flag will be cleared and the SAO board for controller 92 will be instructed to shut down (block 1782). This procedure will then be repeated for each of the analog output channels (block 1784 and diamond 1786). An NI testing report is also generated when a new error is detected (block 1788).

Referring to FIGS. 20T–20U, the flow chart for the Handle Errors routine 1610 of FIG. 20A is shown. This routine begins with a check to see if an SAO board was replaced during the last process control cycle, and then it proceeds to check for other health indicia (diamonds 1790–1798). If the status report indicates a failure or the controller was not able to receive a communication from its SAO board, then the SAO board will be flagged as dead, and the controller will request its neighboring controllers to open the abort switches for this SAO board (block 1800 on FIG. 20U). However, if the SAO board was flagged as being alive for the last process control cycle, then the error handling routine will look at the data from each of the analog input channels (block 1810).

Diamond 1812 examines the value of a "Recovery" counter, which is used to give the system time to re-synchronize when the controller 92 is unable to communicate with either of its neighboring controllers (see diamond 1814 and block 1816 of FIG. 20U). If the Recovery count is not zero, then the "OOCH ME=0" status byte will be cleared in order to prevent an abort from being opened as the system is synchronized (block 1818). If a test failure is detected on any of the analog output channels, then the NI testing will be stopped (block 1820). If an "OAT<>DAC"

error has been flagged, then an abort request will be transmitted to the neighboring controllers 94–96 for the particular channel under inspection (block 1822). This is because the "OAT<>DAC" error means that the SAO board's operational amplifier 608 on this channel is not functioning properly.

FIG. 20U also shows that a "Retry" counter is employed to handle a situation where the communication from the controller to its SAO board is imperfect (diamond 1824). If the Retry counter is greater than a predetermined value (e.g., 5), then the controller will cause a hardware reset of the SAO board in an attempt to correct the problem (block 1826). In other words, the bad communication flag from block 1754 of FIG. 20Q will be used to permit the controller to track the existence of a communication problem with its SAO board, and after a sufficient number of tries, then the controller will reset the microprocessor EU3 of the SAO board in an attempt to restore valid communication.

Referring to FIG. 20V, the flow chart for the Send Abort Positions to the Hardware routine 1612 of FIG. 20A is shown. This routine examines the abort decision information for each of the analog output channels and responds by opening or closing each of the abort switches for its neighboring SAO boards (blocks 1828–1830). It should also be noted that the controller will look at the arbitrated analog output value to be sent to the field (diamond 1832). If the output value is zero for any of the analog output channels, then the controller 92 will send a flag to its neighboring controllers to open the abort switches on its SAO board for those channels (1834).

Figure 21A:
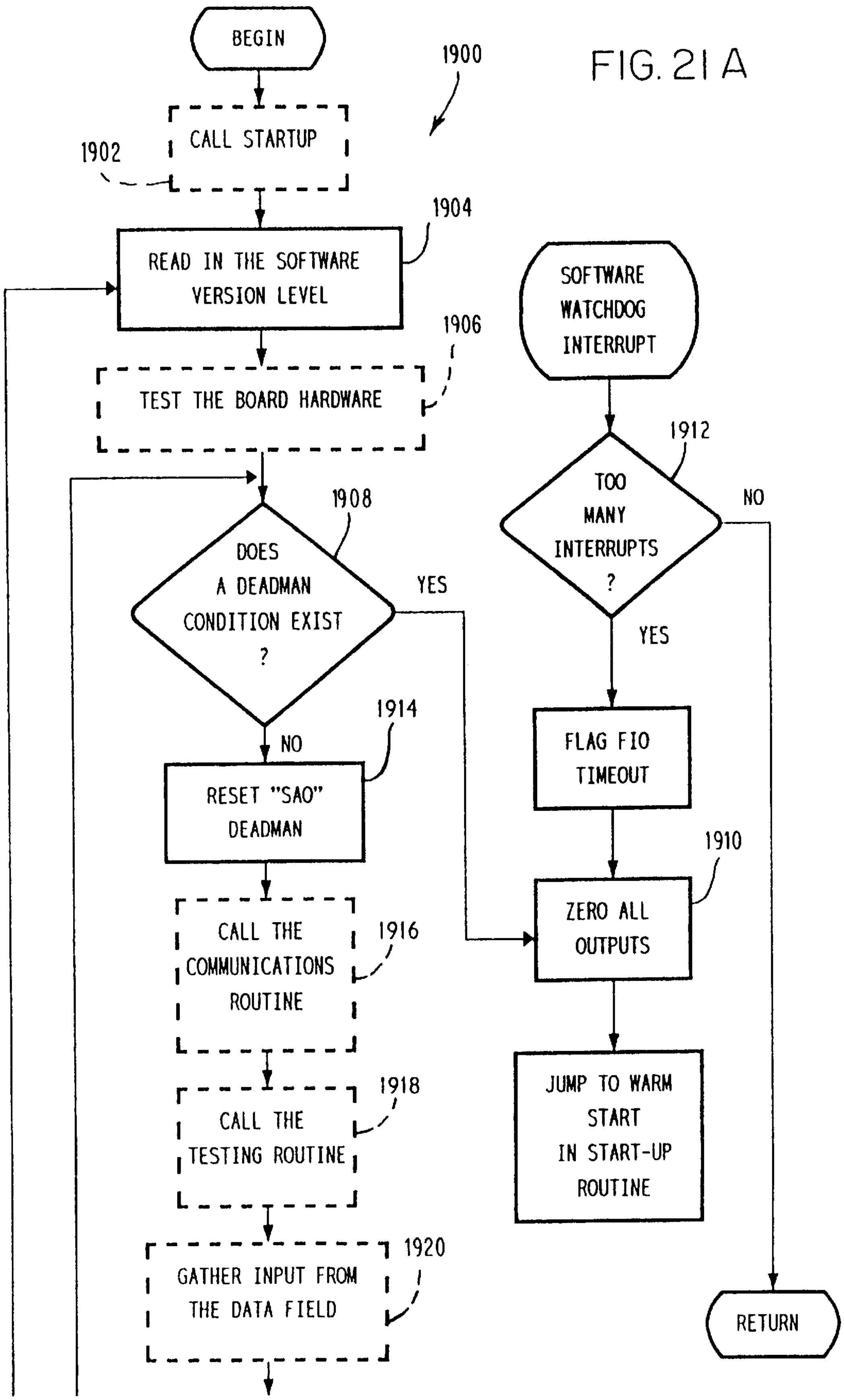
FIGS. 21A–21S comprise a set of flow charts for the software which controls the operations of each of the smart analog output circuits shown in FIG. 10B.
Figure 21B:
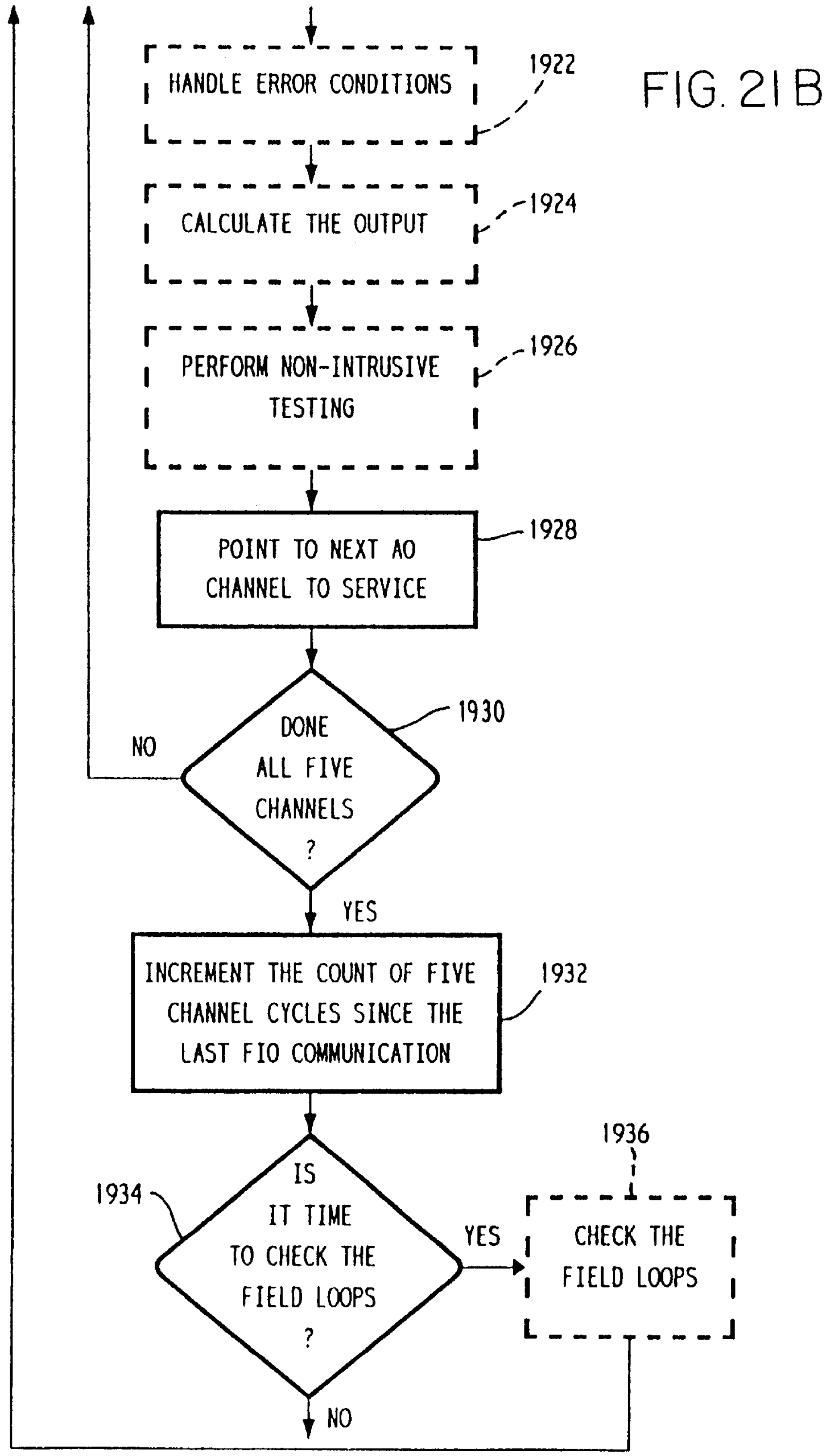
Figure 21C:
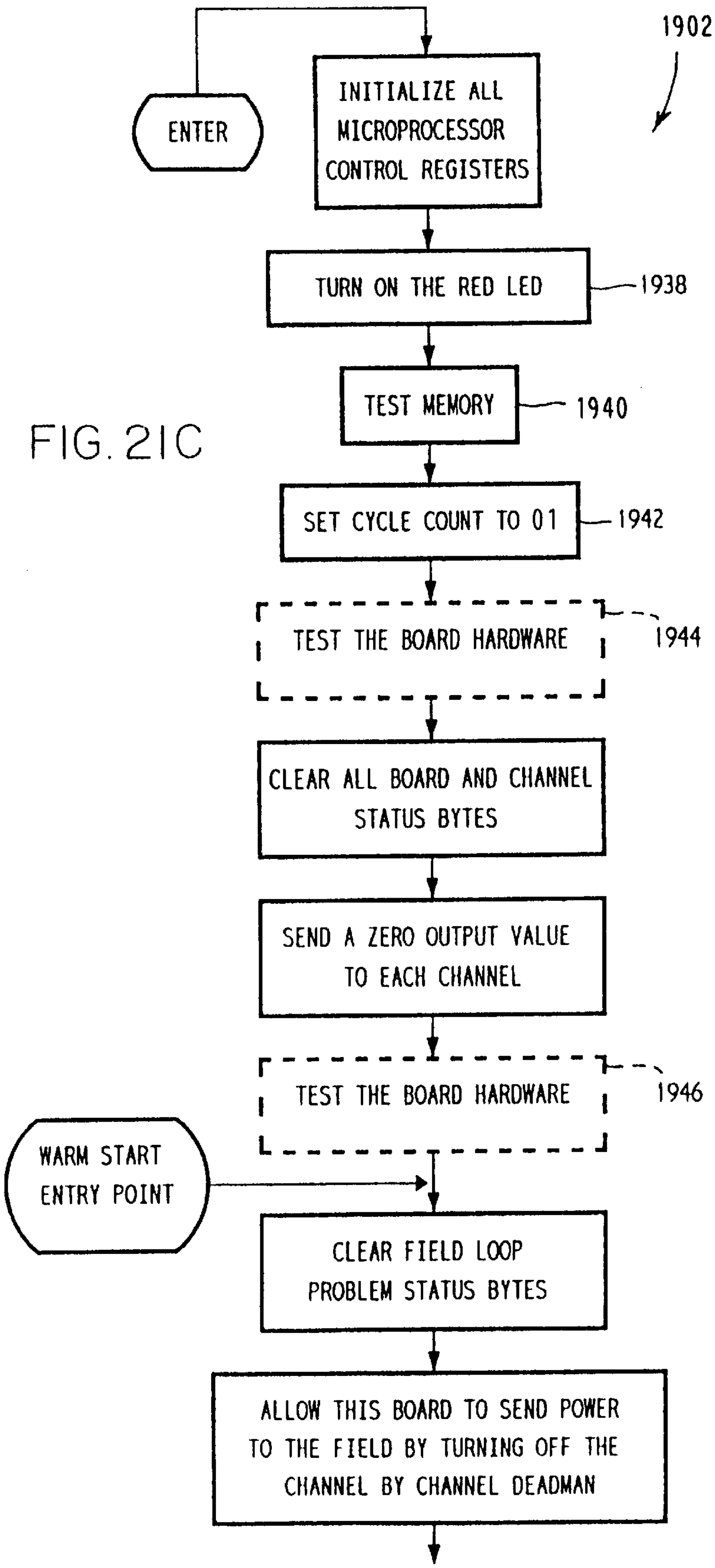
Figure 21D:
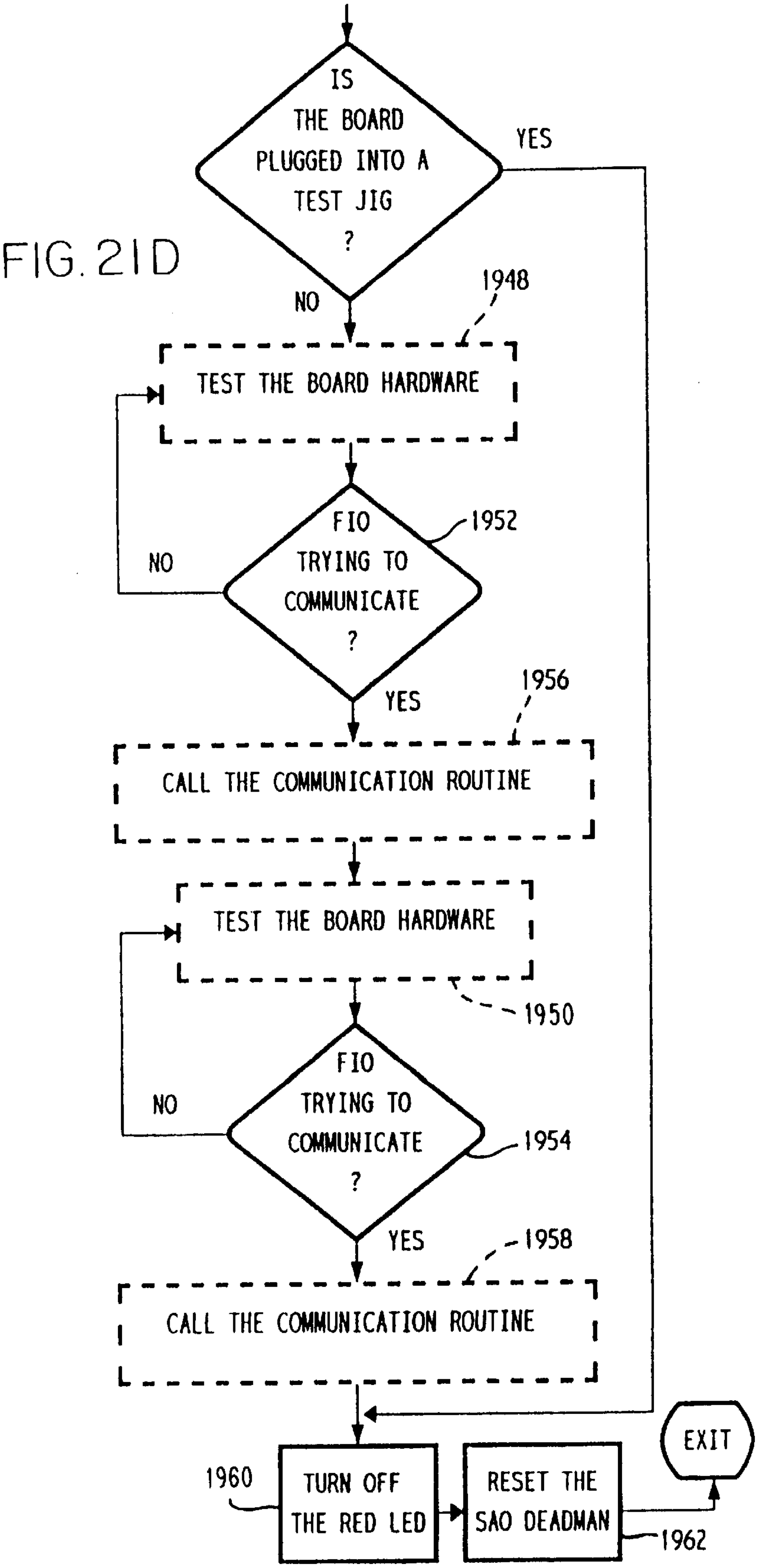
Figure 21E:
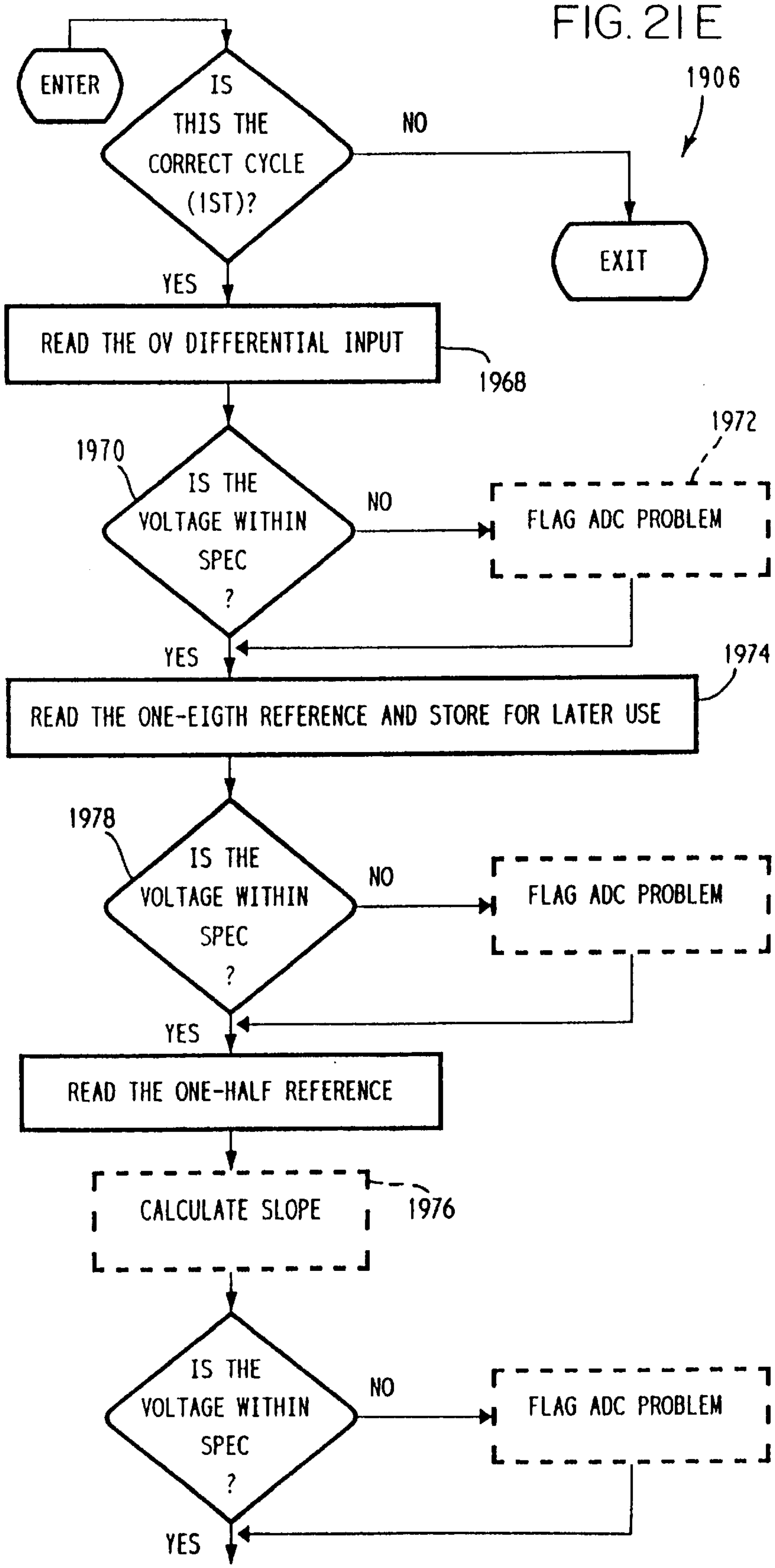
Figure 21F:
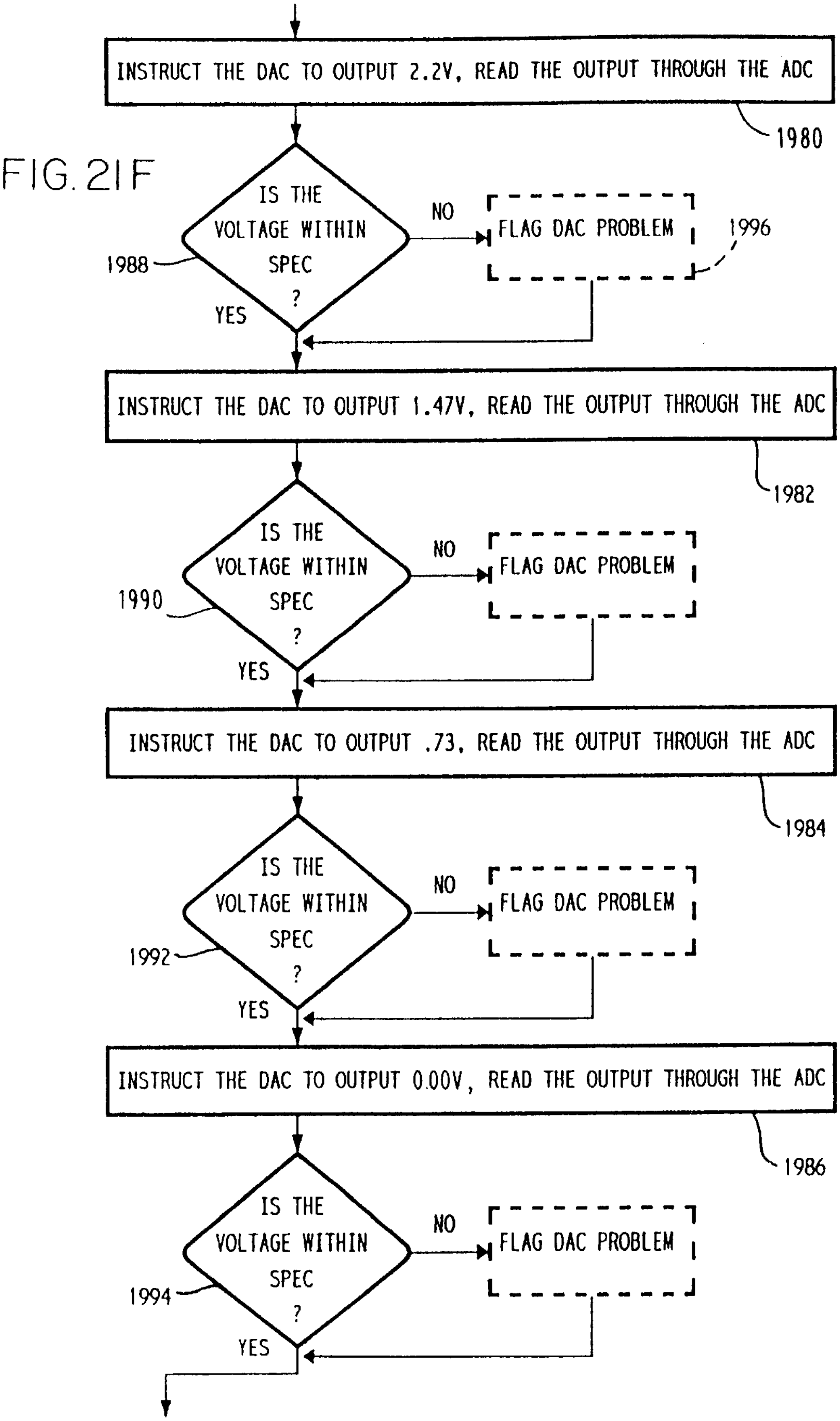
Figure 21G:
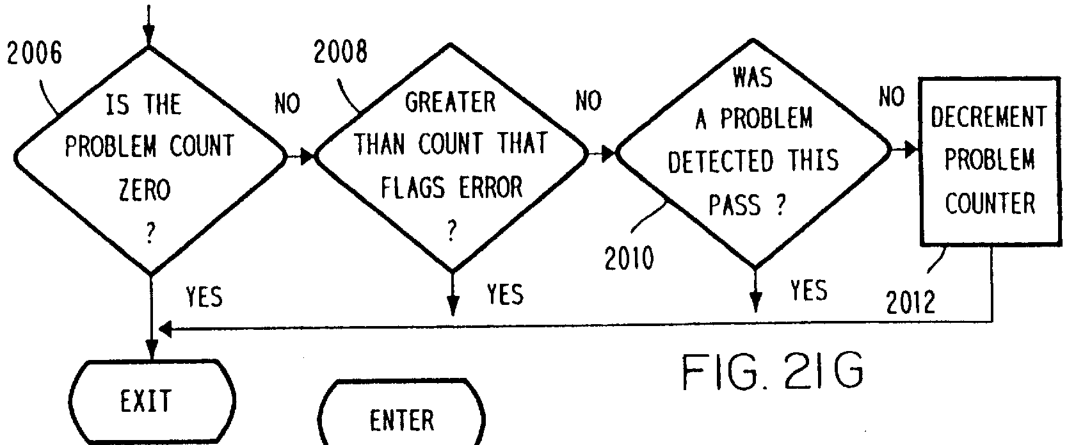
Figure 21H:
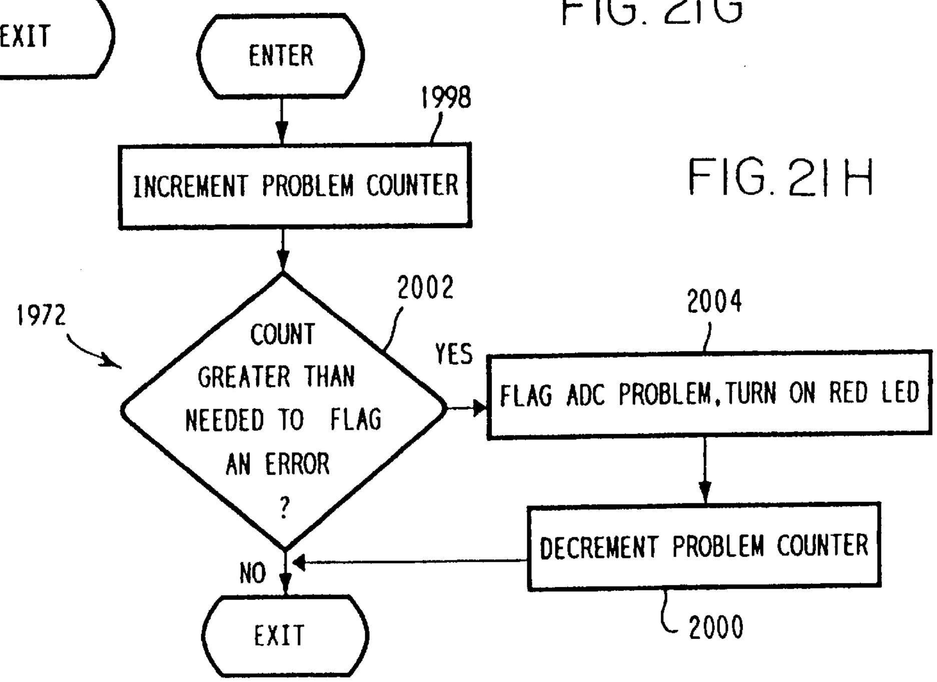
Figure 21I:
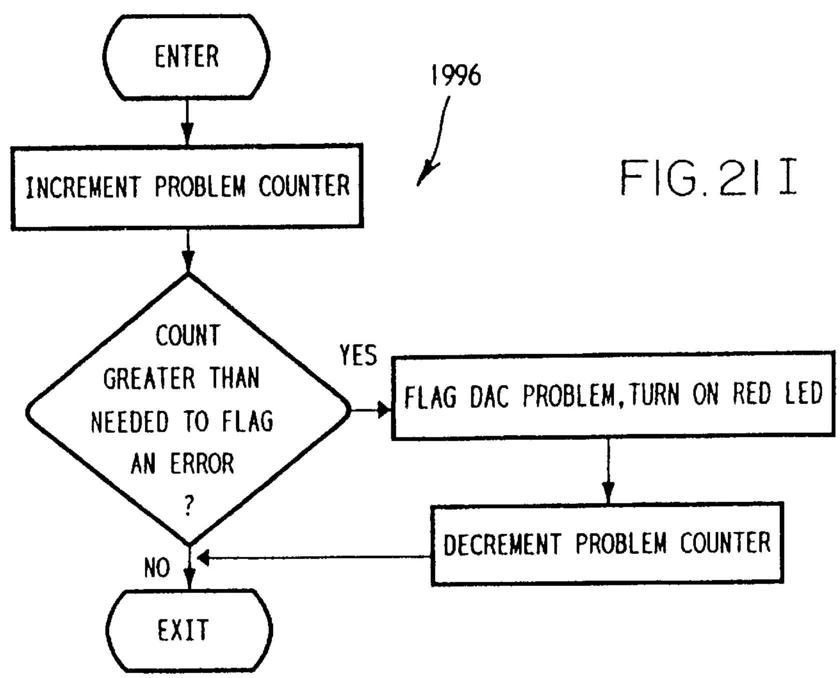
Figure 21J:
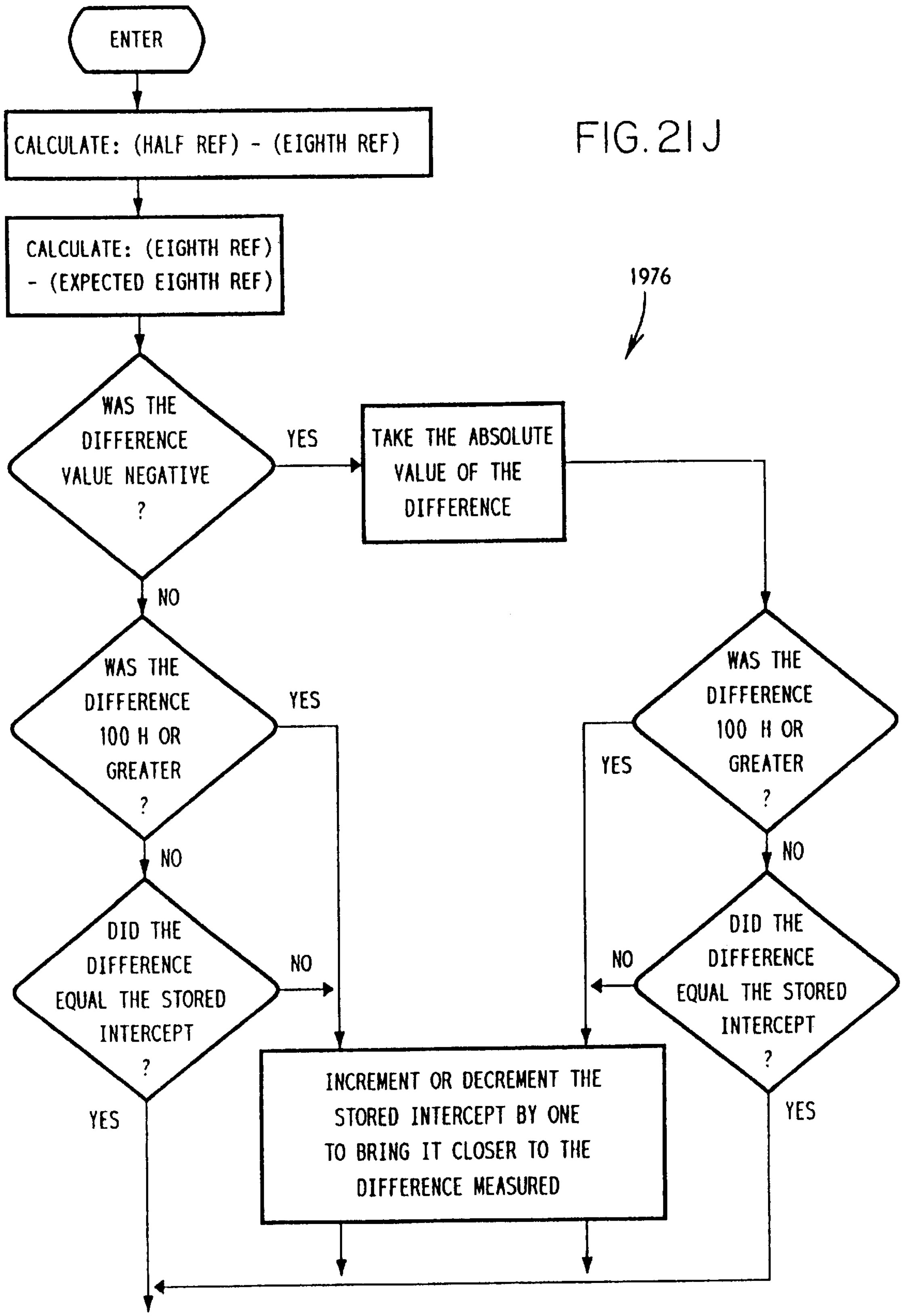
Figure 21M:
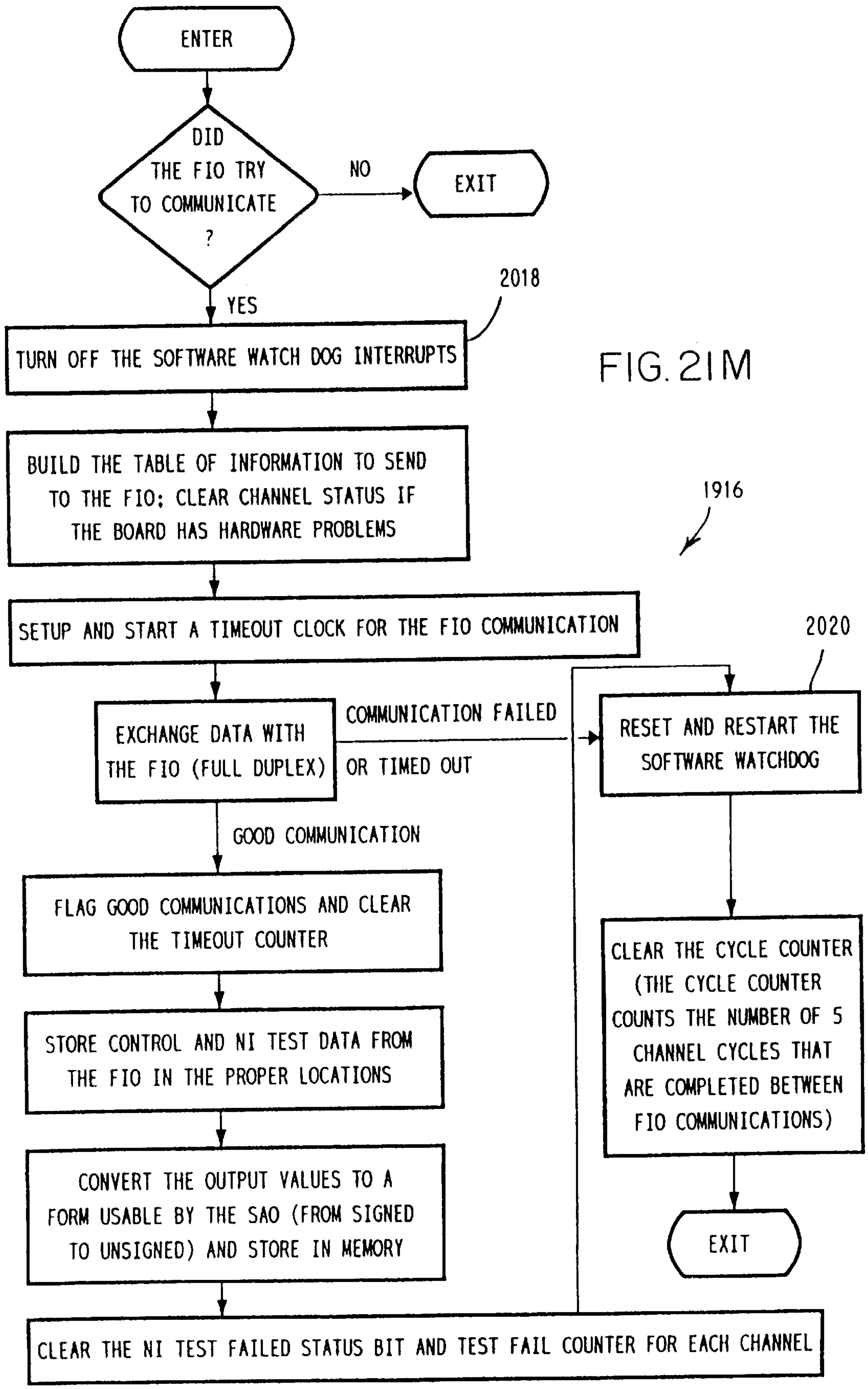
Figure 21N:
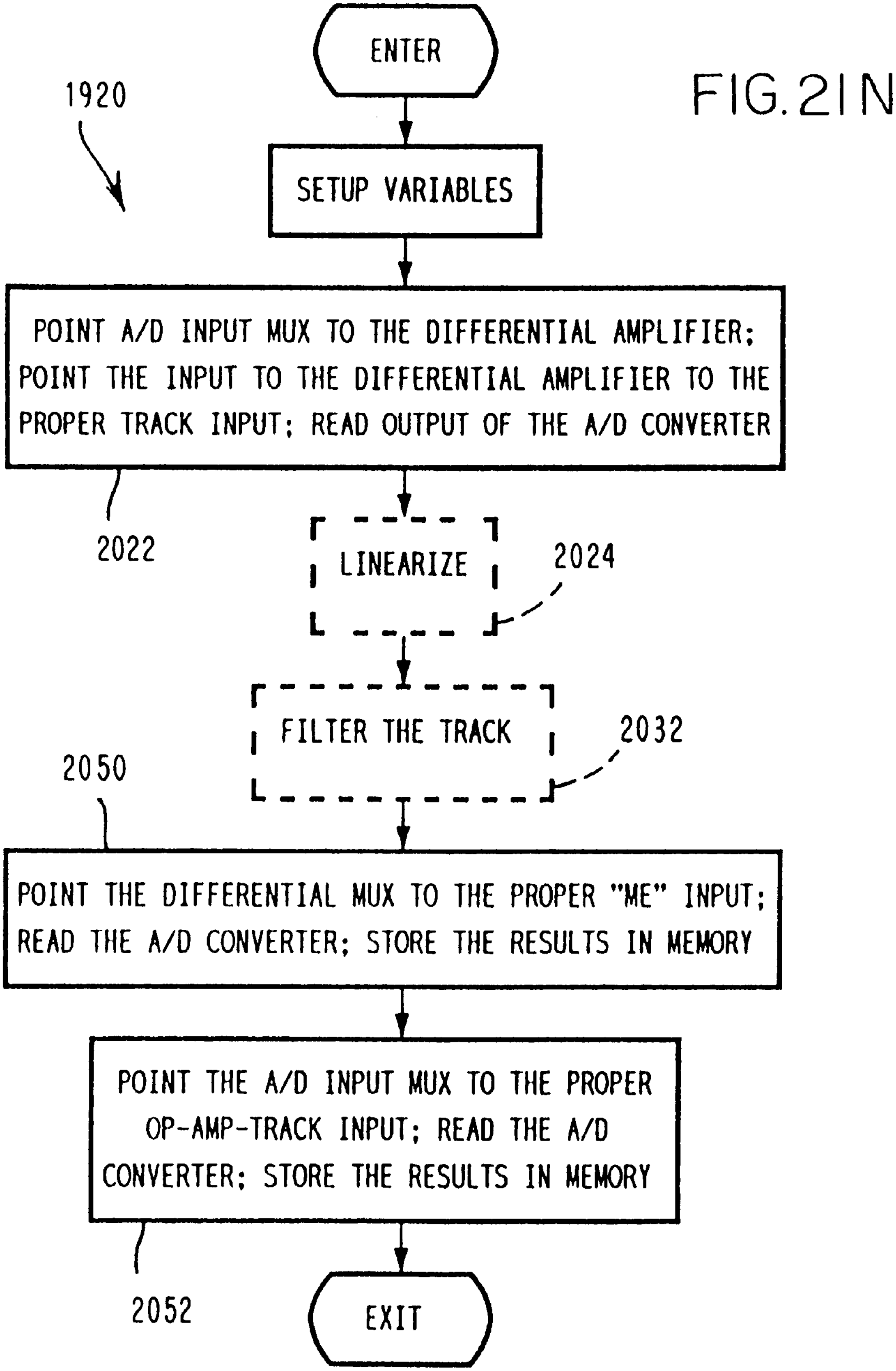
Figure 210:
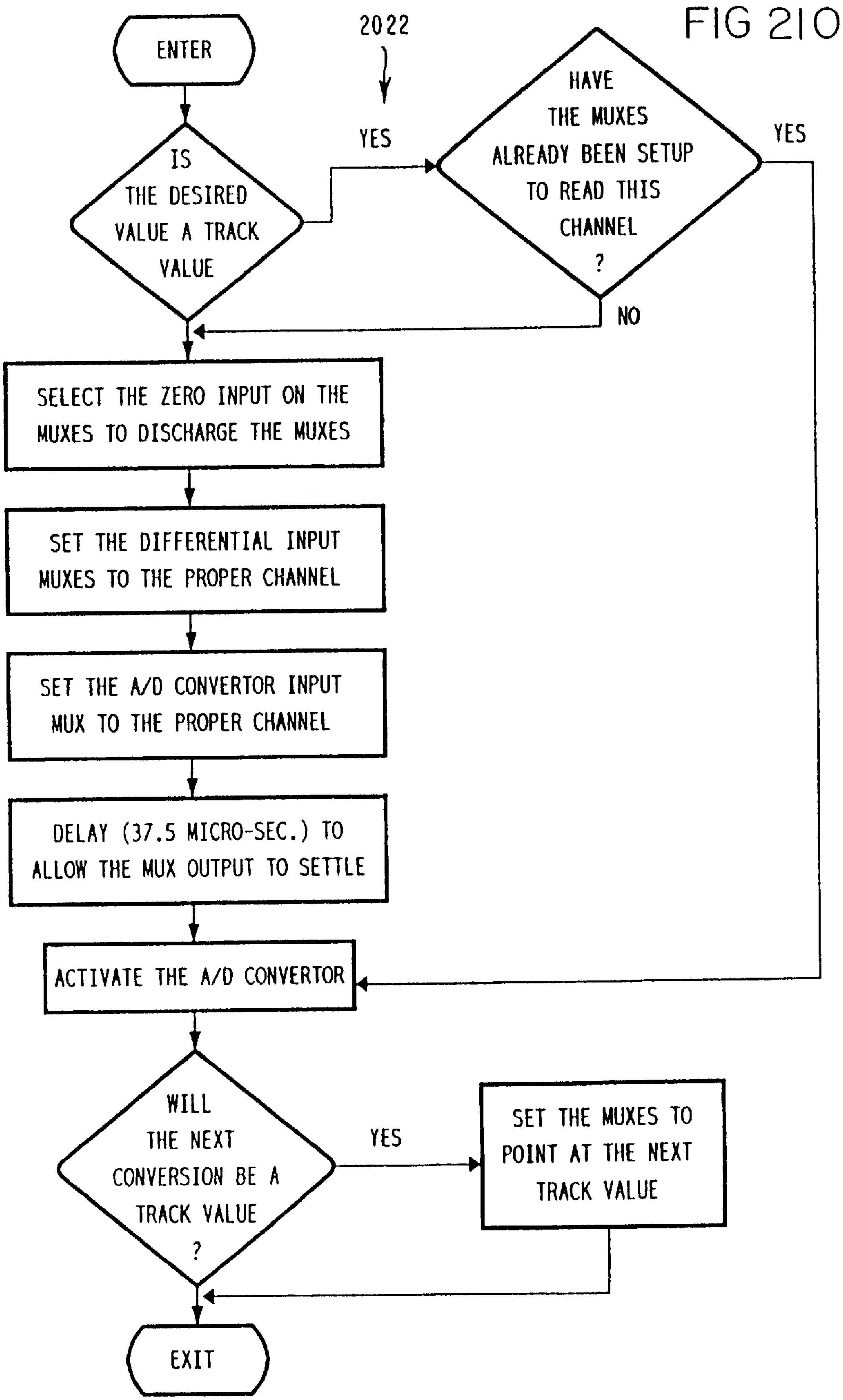
Figure 21P:
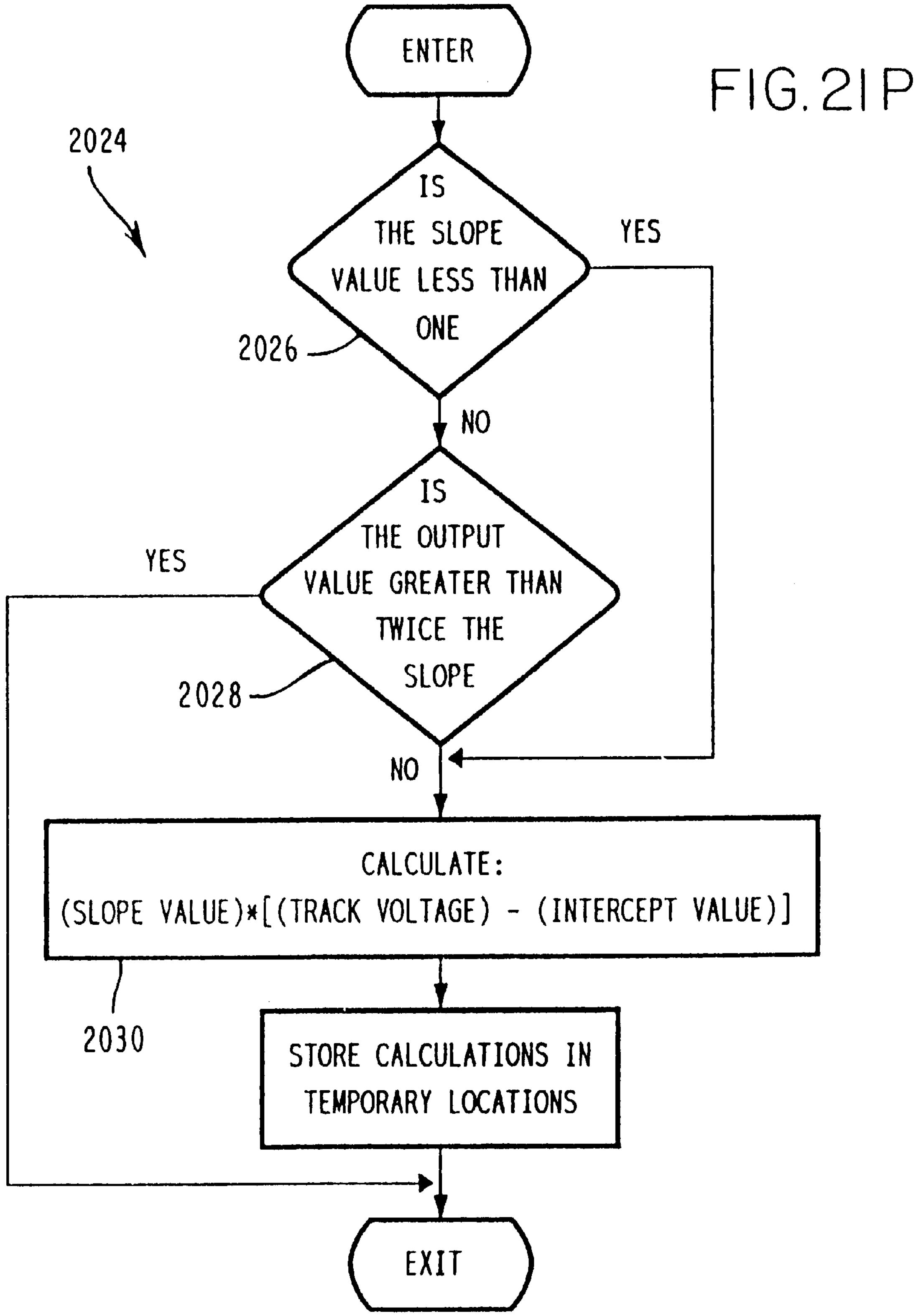
Figure 21Q:
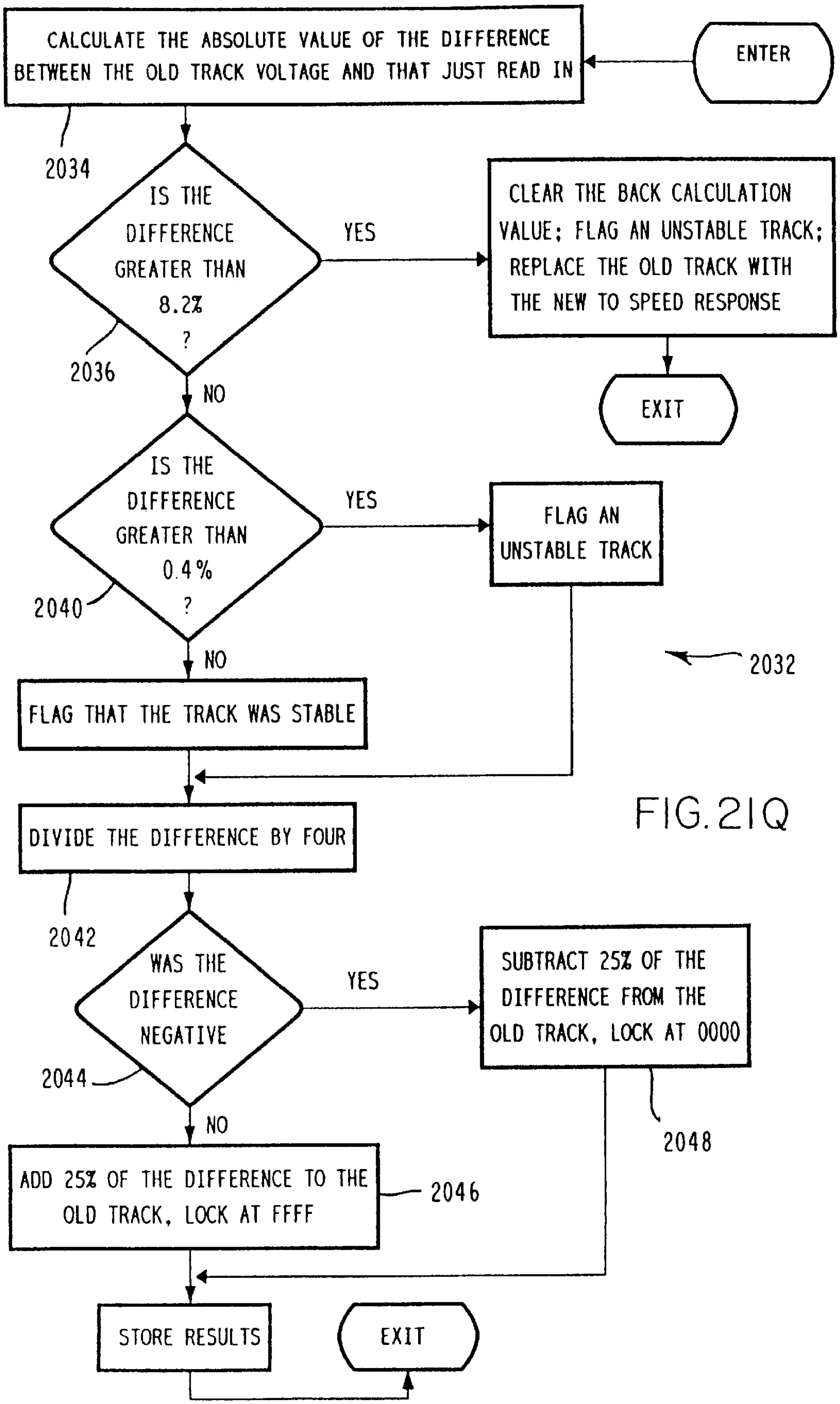
Figure 21R:
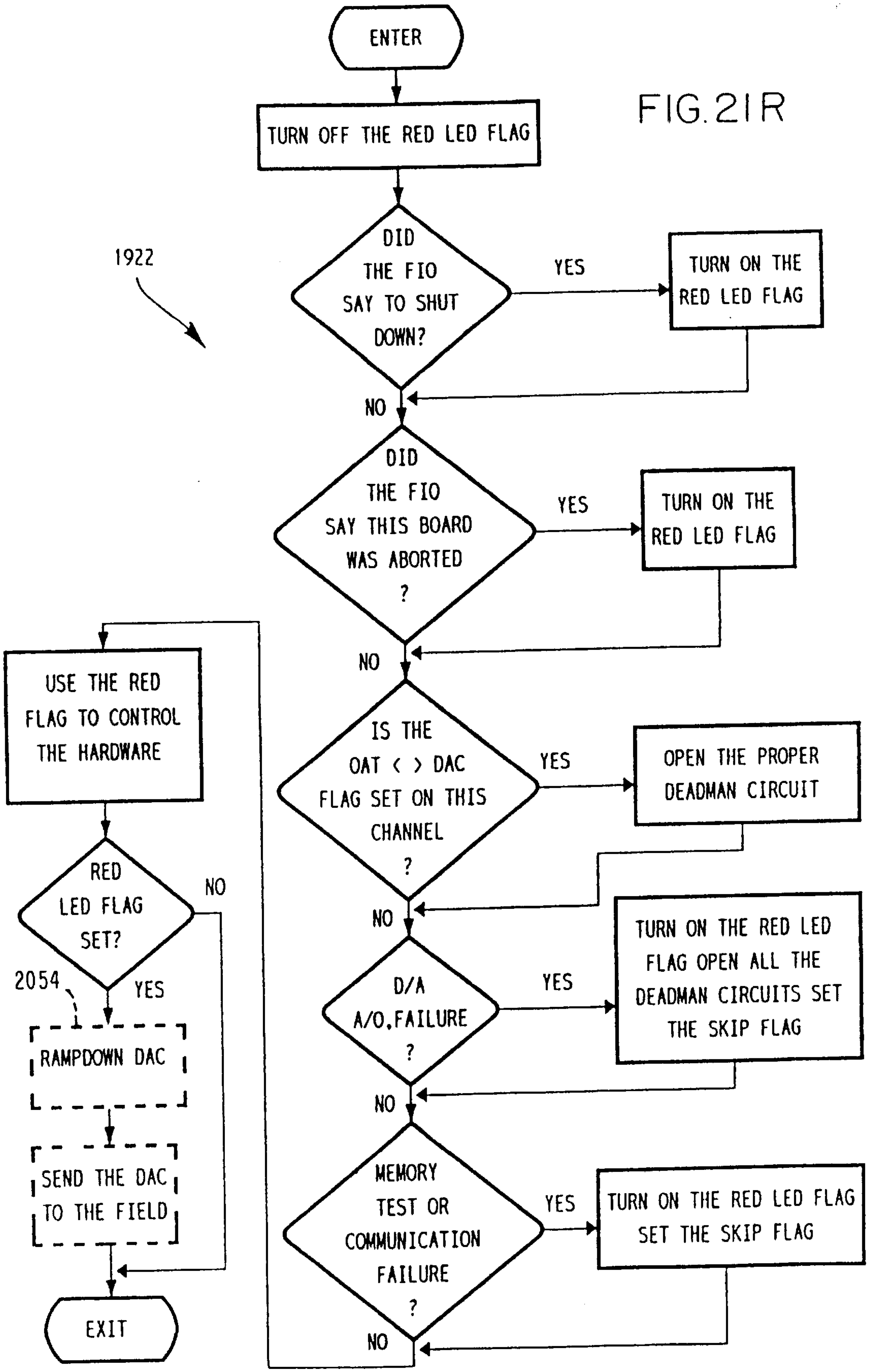
Figure 21S:
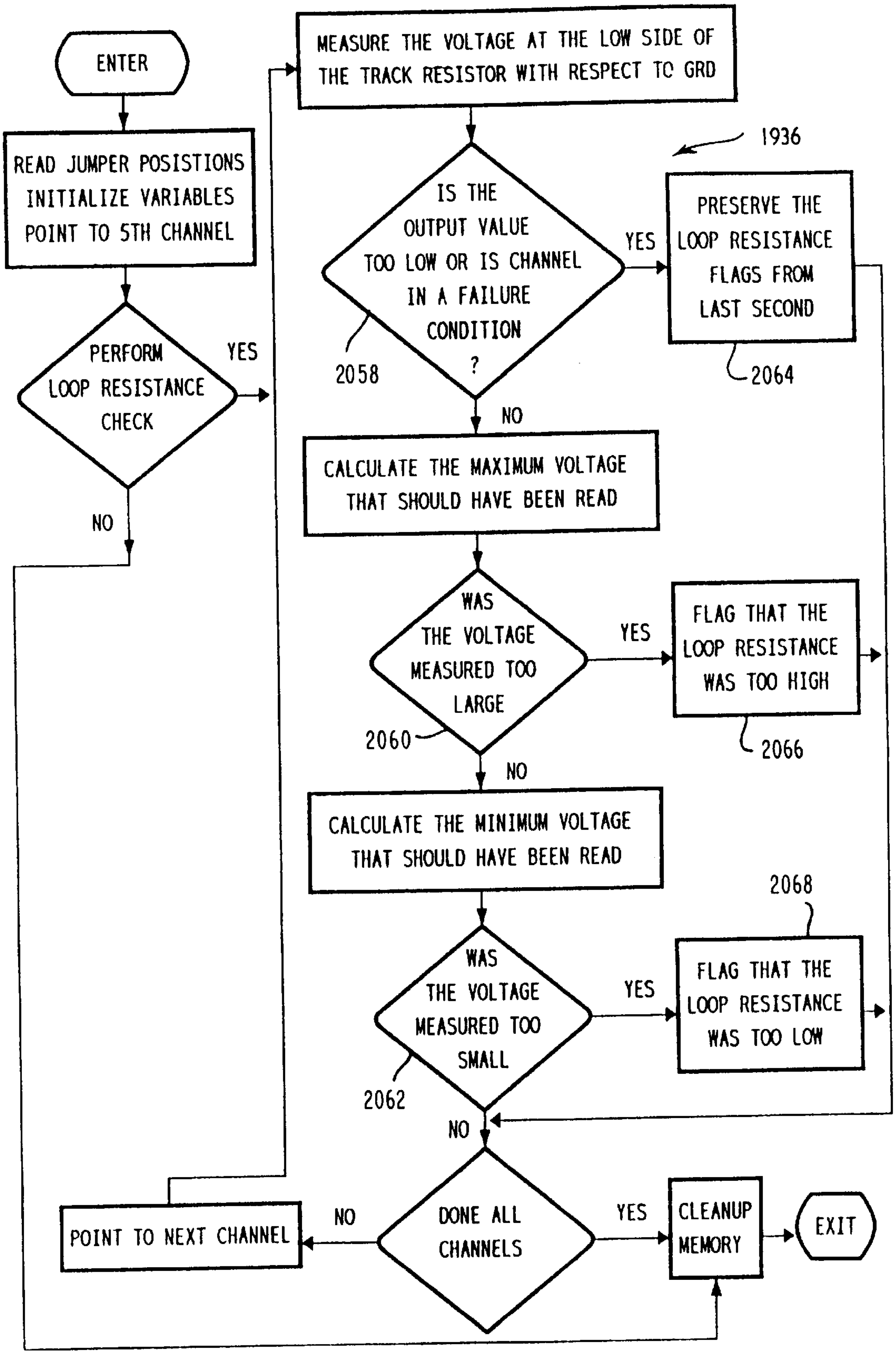

Referring now to FIGS. 21A–21S, a set of flow charts is shown for the software resident on the SAO boards. Additional flow charts for the SAO board software will also be discussed in connection with FIGS. 22A–22S and 23A–23I. FIGS. 21A–21B provide an overall or main flow chart 1900 for the SAO board software. As should be appreciated from the discussions above this software is contained in the program memory circuit EU1 of each of the SAO circuit boards 600–604.

The flow chart 1900 begins with a call to a startup routine 1902, which is shown in FIGS. 21C–21D. The microprocessor EU3 of the SAO board will preferably read the software version level from memory (block 1904), and proceed to test the hardware components for the SAO board (block 1906). This hardware test routine is shown in FIGS. 21E–21K. The SAO microprocessor will then check to see if a Deadman condition exists (diamond 1908). A Deadman condition could exist if the controller 100 shuts down, the microprocessor on the SAO board shuts down, or if the SAO board puts itself into a Deadman condition for diagnostic testing purposes. If a Deadman condition exists, then all of the analog output channels will be zeroed (block 1910) and the program will jump to the warm start point in the startup routine 1902 of FIG. 21C, unless the SAO board is currently testing its ability to disable the operational amplifier 608. While not shown in FIG. 21A for simplicity, a check may be made at this point to determine if the SAO board is currently testing this Deadman capability. This Deadman test will be described below in connection with FIGS. 23E–23G. If the SAO board is testing the Deadman capability, then the Deadman test will be repeatedly conducted (e.g., 30 times) before returning to an appropriate location in flow chart 1900, such as block 1904.

FIG. 21A also shows that the SAO board may be re-started if too many interrupts are received from an internal timer of the SAO microprocessor (diamond 1912). These timed interrupts provide a way to permit the SAO microprocessor to determine whether a communication from the controller for this SAO board has been received within a reasonable period of time.

Assuming that the SAO board is "alive", the SAO microprocessor will strobe the "DEADSET" signal (block 1914), and call the communications routine (block 1916). The communications routine is shown in FIG. 21M. After this communications routine, then a Testing routine will be called (block 1918). The Testing routine 1918 is shown in FIG. 21L. A routine will then be performed to gather feedback data from the field (block 1920). This Read Data routine is shown in FIGS. 21N–21Q. Next, a Handle Error Conditions routine 1922 of FIG. 21R will be performed. The program will then proceed to a Calculate the Output routine 1924, which is shown collectively in FIGS. 22A–22S. Thereafter, the non-intrusive testing routine 1926 will be performed. This NI testing routine is shown collectively in FIGS. 23A–23I.

Once all of these steps are performed, then the SAO microprocessor will point to the next channel to be serviced (block 1928) and repeat the procedure until all five analog output channels are done (diamond 1930). The SAO microprocessor will then update its record of "five channel cycles" since the last communication from its controller, such as controller 92 (block 1932), and then determine if it is the appropriate time to check the field loops (diamond 1934). The routine for checking the field loops (e.g., measuring the field loop resistance values) is shown in FIG. 21S (block 1936). In either case, the main program for the SAO board will ultimately loop back to the beginning in order for the program to be continuously repeated. Thus, it should be appreciated that the field loops will be measured and the hardware tested each process control cycle (e.g., one second).

Referring to FIGS. 21C–21D, the flow chart for the startup routine 1902 is shown. The Red LED will be turned on to indicate that the SAO board hardware is not ready to send power to the field, as a series of tests will be conducted (block 1938). In this regard, the first test relates to the data memory for the SAO board (block 1940). This test is similar to the memory test described below for the controller's data memory. Then, due to the fact that the SAO board is entering a cold start, a counter which keeps track of the number of process cycles executed by the SAO board will be set to "01" to allow the hardware test routine to function properly (block 1942).

Then as shown in FIGS. 21C–21D, a hardware test routine will be performed at four different points during the startup routine (blocks 1944–1950). This hardware test routine is shown collectively in FIGS. 21E–21K. In this regard, it should be noted that the repeated testing of the hardware components for the SAO board is not necessary. Rather, this testing routine is performed during spare times as an extra measure to increase the confidence level in the ultimate operation of the SAO board. Thus, for the example, the hardware test routine will be performed in between times that the controller is trying to communicate with the SAO board (diamonds 1952–1954). As indicated above, the controller will communicate twice with the SAO board (blocks 1956–1958) in order to send timing information, output values, and assure the controller/SAO communication link is functioning properly. Ultimately, the Red LED will be turned off (block 1960) and the Deadman timer will be reset (1962).

Turning to FIGS. 21E–21G, an overall flow chart 1906 for the hardware test routine is shown. Assuming that this is the first cycle for the SAO board, then the SAO microprocessor will read the "0 volt" input to the differential amplifier 638 via the multiplexors EU23–EU26 shown in FIG. 12F (block 1968). Then, a check will be made to determine whether or not the voltage being read is within specifications (diamond 1970). If this voltage is outside of the proper specification level, then a routine will be performed to flag an analog to digital problem (block 1972). The flag ADC problem routine is shown in FIG. 21H. The SAO microprocessor will then read the "⅛ reference" signal shown on FIG. 12B as an input to multiplexor EU24 (block 1974). This voltage signal level (e.g., 0.275 volts) will be stored for use during the Calculate Slope routine of FIGS. 21J–21K (block 1976). Then a check will be made to determine whether or not this voltage signal is within specifications (diamond 1978). In this regard, the value which is produced by the differential amplifier 638 for the "⅛ reference" signal will be tested against a predetermined range (e.g., 1.25 volts±0.078 volts). A similar procedure is also implemented for the "½ reference" signal (e.g., 1.10 volts).

Then, as shown in FIG. 21F, the SAO microprocessor will cause the digital to analog converter ("DAC") 612 to output a series of different voltage levels (blocks 1980–1986), and then it will check the actual output from the DAC through the analog to digital converter ("ADC") 642 (diamonds 1988–1994). If any of these voltage levels were determined to be outside of specifications, then the "Flag DAC Problem" routine 1996 will be performed. As shown in FIGS. 21H and 21I, both the Flag ADC Problem routine 1972 and the Flag DAC Problem routine 1996 increment or decrement a problem counter (blocks 1998–2000) as needed. Additionally, either or both of these Flag routines may cause the Red LED to turn ON if the problem count exceeds a predefined limit (diamond 2002 and block 2004). Then, as shown in FIG. 21G, this problem counter will be evaluated (diamonds 2006–2010), and the problem counter will be decremented if a problem was not detected during this pass through the hardware test routine (block 2012). Once this problem counter is greater than a decimal 2, then the Red LED will be turned On, and the SAO board shut down. A similar procedure could also be implemented to test the operational amplifier 608, as was performed for the DAC test. Thus, for example, the DAC 612 could be instructed to output a predetermined voltage (e.g., 2.2 v), and then the OUT-H and OUT-L signals could be read to see if these signals were within specifications.

Referring to FIGS. 21J–21K, a self-explanatory flow chart for the Calculate Slope routine 1976 is shown. As will be seen from the flow chart, this routine evaluates the slope of an artificial line created between the ½ and ⅛ reference signal levels, and operates to adjust stored slope and intercept values by one (each pass through the routine) until there is equality with the measured values. The values created by this routine are used to correct the field measurements for offset and gain errors introduced by the analog circuitry.

Referring to FIG. 21L, a flow chart of the Testing routine 1918 of FIG. 21A is shown. This routine detects whether the SAO board is plugged into a test jig rather than the field computer unit 12 itself (diamond 2014). If the SAO board is plugged into the test jig, then a set of predefined output values will be used to test the operation of the SAO board (block 2016).

Referring to FIG. 21M, a flow chart for the Communications routine 1916 of FIG. 21A is shown. While this flow chart is also self-explanatory, is should be noted that the watchdog interrupts referred in diamond 1912 of FIG. 21A will be turned off (block 2018) and subsequently reset during this routine (2020).

Referring to FIG. 21N, a flow chart of the Read Data routine 1920 of FIG. 21A is shown. The ADC converter control block 2022 of this routine is shown as its own flow chart in FIG. 21O. In this regard, it should be appreciated that the SAO microprocessor needs to command a specific input signal selection for the differential input multiplexors EU25–EU26 and the convertor input multiplexors EU23–EU24. The Read Data routine will then proceed to the Linearize routine 2024 of FIG. 21P. As shown in FIG. 21P, the slope value determined from the Calculate Slope routine will be evaluated (diamond 2026). If the slope value is greater than one, then this slope value will be compared with the commanded output value (diamond 2028). If the output value is greater than twice the slope, then the Linearize routine will be ended because linearization of the data will result in an overflow in the mathematics. Otherwise, a calculation will be made, as shown in block 2030. The purpose of this calculation is to correct the measured voltages for offset and gain errors introduced by the analog circuitry.

Once the Linearize routine 2024 is completed, the Read Data routine 1920 will proceed to the Filter the Track routine 2032 of FIG. 21Q. This routine begins with comparing the newly measured track value and the track value stored from the calculation performed on this channel in the last 5 channel cycle (block 2034 and diamond 2036). If the absolute value of the difference between the new and old track values exceeds a first predetermined amount, then the old track value will be completely replaced with the new track value to speed the response of the SAO board in its effort to achieve the commanded output value (block 2038). If the absolute value of this difference in track value is less than the first predetermined amount, then a check will be made to see if this difference is less than a second, smaller predetermined amount (diamond 2040). The result of this decision will determine whether the Unstable Track flag will be set. In any event, the difference value will be divided by four (block 2042), and a portion of this divided difference value will be added to or subtracted from the old track value depending upon whether the difference value was positive or negative (diamond 2044 and blocks 2046–2048). This proportionate change in the stored track value filters out most noise found on the track signal.

The Read Data routine 21N will then point the multiplexors EU25–EU26 at the ME resistor High/Low values, and read and store these values (block 2050). A similar operation will then be performed for the OAT values via multiplexor 640 (block 2052).

Referring to FIG. 21R, a flow chart for the Handle Error Conditions routine 1922 of FIG. 21B is shown. This self-explanatory flow chart demonstrates how the Red LED flag will be set and used to cause the DAC to rampdown (block 2054). In this regard, the Rampdown DAC routine 2054 will be discussed in connection with FIG. 22I. Similarly, the Send the DAC to the Field routine 2056 will be discussed in connection with FIG. 22O.

Referring to FIG. 21S, a flow chart for the Check the Field Loops routine 1936 of FIG. 21B is shown. As will be seen from this flow chart, the SAO microprocessor will measure the actual output signal for each of the analog output channels and perform the checks identified on the magnitude of this signal (diamonds 2058–2062). If the signal being sent to the field is outside of any of these test bounds, then the appropriate flag will be set or preserved for further processing (blocks 2064–2068). These tests assume that the field load is modeled by a resistor in series with an inductor, and that the load being driven is between 50 and 470 ohms (±30 ohms). Thus, for example, diamonds 2060 and 2062 compare the measurement from the low side of the track resistor with respect to ground with the maximum and minimum acceptable voltages for this output value. However, it should be noted that the loop resistance check will not be performed if the output value (block 2058) for the channel is below 2 mA, because the present hardware prevents the signal from being read reliably when the output value is below this magnitude.

It should also be noted that a 100 ohm PTC resistor is preferably connected in series between the low side of the track resistor 624 and the field loop. Thus, the maximum and minimum acceptable measurements at full scale (e.g., 22 mA) can be calculated from the following formulas:

$$Vmax=(Rmax+Rptc)*(22\text{ mA}),$$

where

Rmax=470 ohm $$Vmin=(Rmim+Rptc)*(22\text{ mA}),$$

where

Rmim=50 ohm

Using these formulas, it should be appreciated that the maximum and minimum voltage levels employed by diamonds 2060–2062 may be calculated for any desired output value (in mA). Thus, the test employed by the field loop routine 1936 are specifically tailored to the output value commanded by the controller for the SAO board.

Figure 22B:
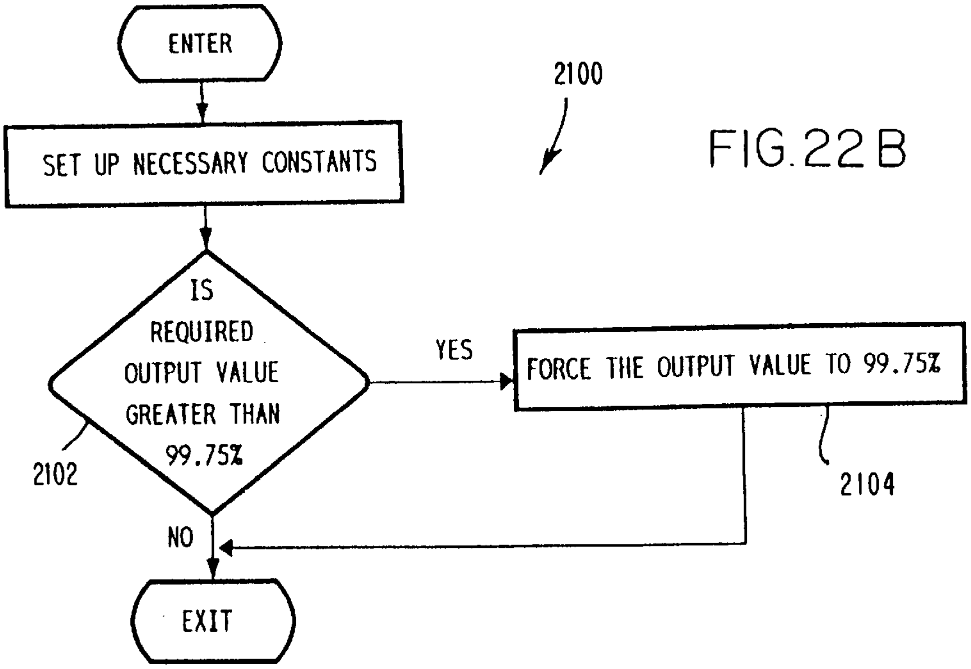
FIGS. 22A–22R comprise a set of flow charts which illustrate the output control routine shown in FIG. 21B.

Referring to FIG. 22A, an overall flow chart for the Calculate the Output routine 1924 of FIG. 21B is shown. This output control routine provides an intelligent PI control loop as will be seen from the description below. The Output control routine includes a setup routine 2100, which is shown in FIG. 22B. In this regard, FIG. 22B shows that an initial evaluation of the commanded output value will be made (diamond 2102). If the output value is nearly 100% of the maximum allowable value, then the output for the channel being processed will be forced to a level just below this maximum value (block 2104). This is done so that an output above the 99.75% level can be seen and no more than 22 ma of current will be transmitted to the field.

Figure 22C:
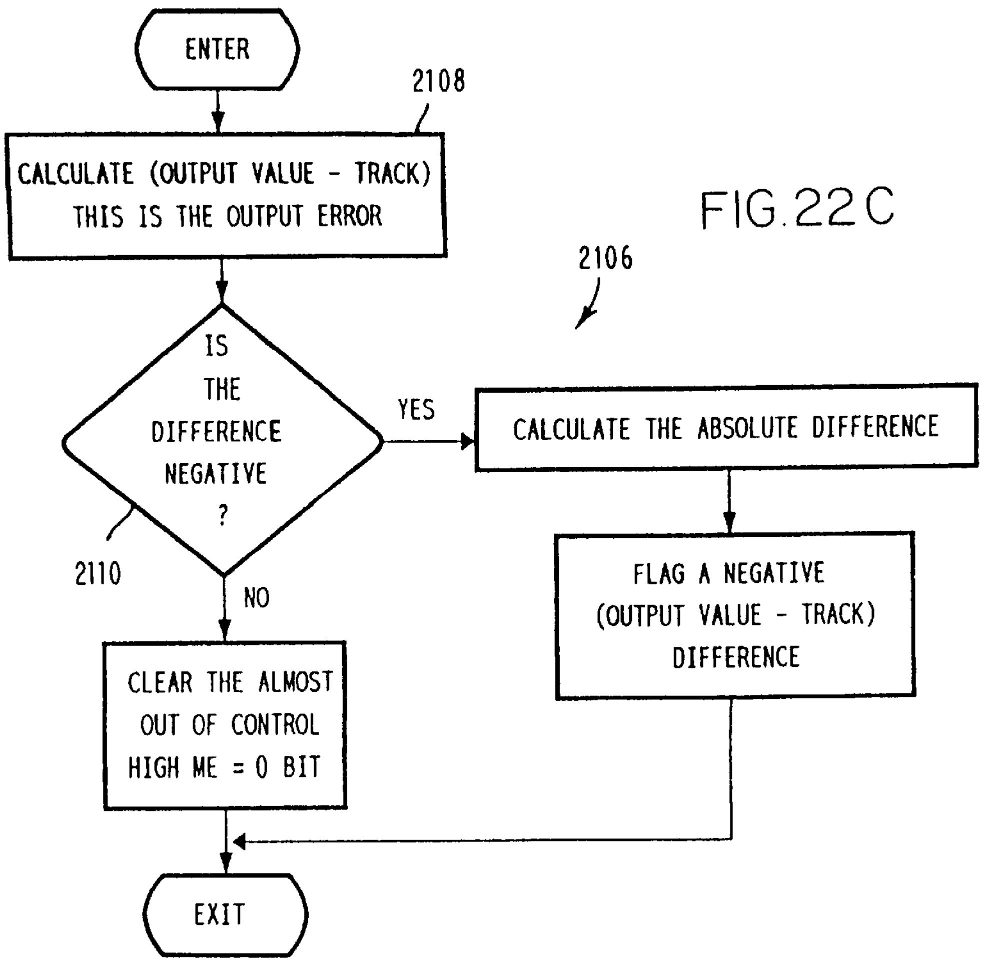
Figure 22:
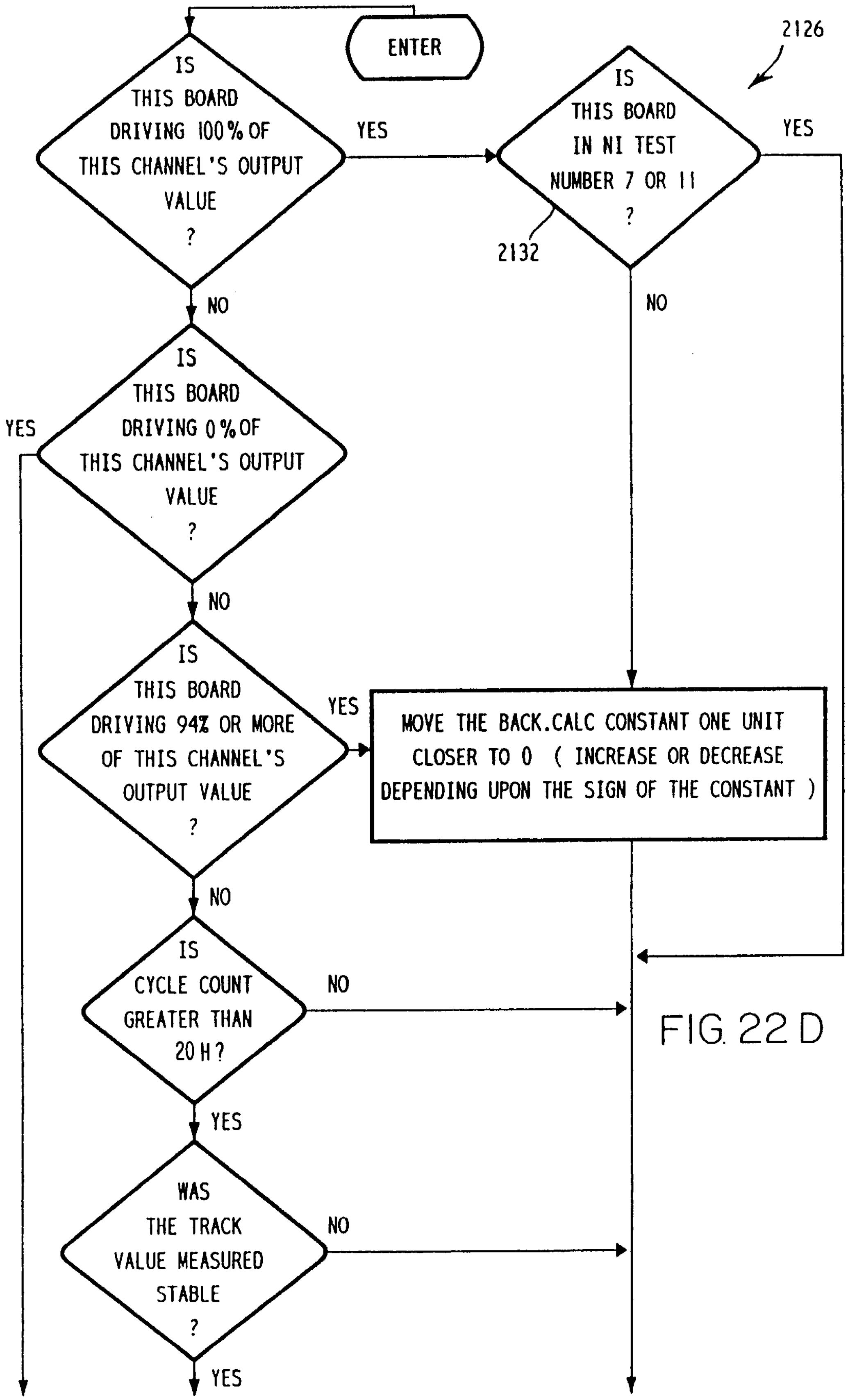

The Output control routine also includes a Calculation routine 2106, which is shown in more detail in FIG. 22C. Once output error is calculated (block 2108), which is the difference between the output value and the measured track value, then it will be determined whether an increase or decrease in the analog output must occur (diamond 2110), and the appropriate status indicators will be set.

Referring again to FIG. 22A, an evaluation will then be made as to whether the remainder of the Output control routine should be skipped (diamond 2112). In this regard, the Output control routine may be skipped when a problem has been detected on the board by the Handle Error Conditions routine. Assuming that the Output control routine is to be performed, then a check will be made to see if the red LED is ON (diamond 2114). If the red LED is ON, then a determination will be made as to whether the calculated output error is too large (diamond 2116). If the error is too large (e.g., 3.5%), then a flag will be set to indicate that this SAO board is controlling the field (block 2118), and the Out of Control routine 2120 will be performed. Otherwise, the opposite indication will be flagged, the SAO board will back off its output to zero (block 2122), and the In Control routine 2124 will be performed.

As should be appreciated from the procedure described thus far, the three SAO boards 600–604 will effectively compete with one another to drive the load in accordance with the present invention. However, when any of the SAO boards detect that one of the other SAO boards is controlling the output, it will start backing off to a non-contribution level. In this way, only one of the three SAO boards 600–604 operates to drive the load at any one time, unless one of the other SAO boards determines that its contribution is necessary to achieve the commanded output value.

Figure 22E:
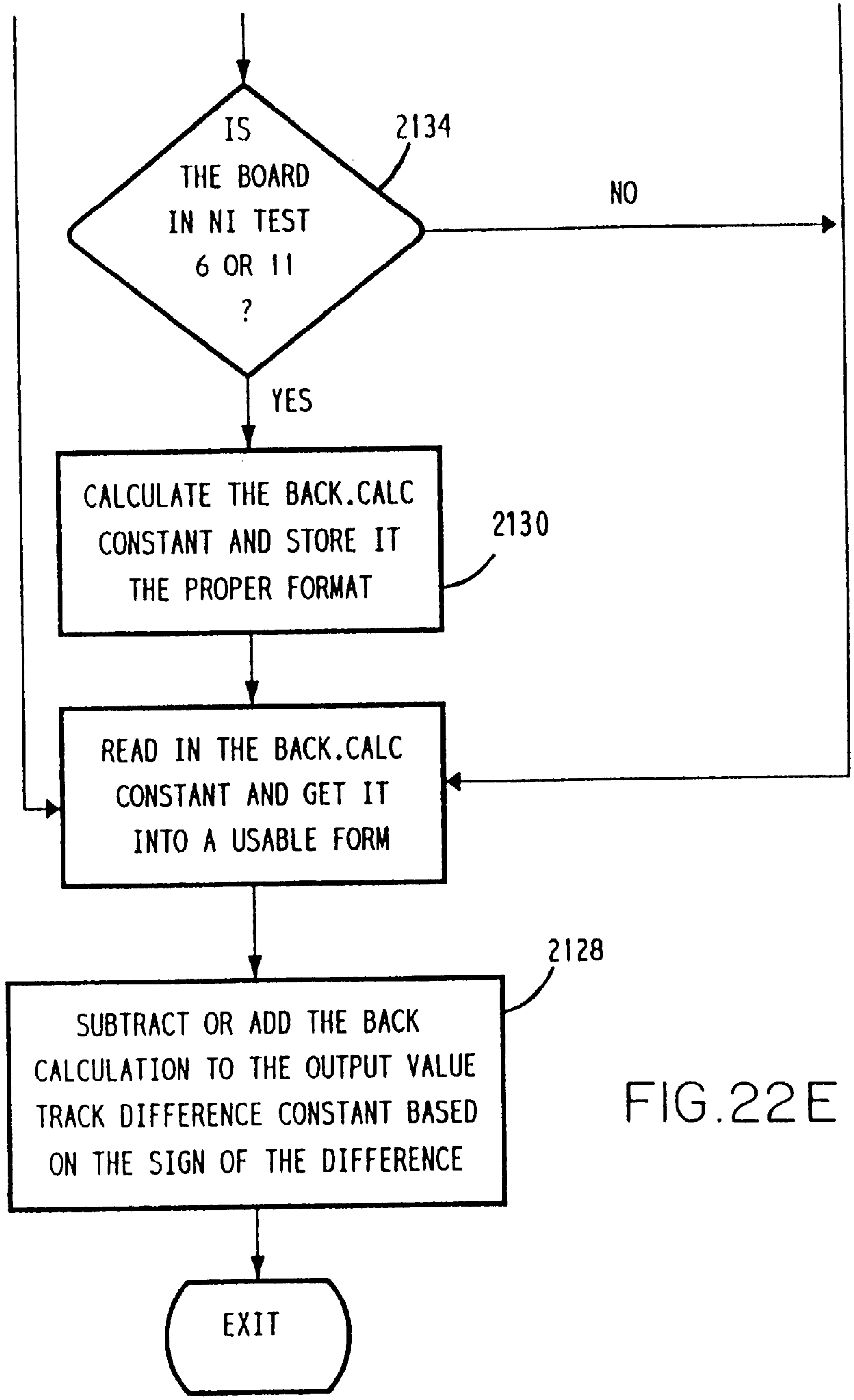

If the red LED is OFF, then a Back Calculation routine 2126 will be performed. This Back Calculation routine is shown in FIGS. 22D–22E. As will be seen from FIGS. 22D–22E, the Back Calculation routine is used to set a “Back.Calc” constant, and subtract or add this constant to the output error (block 2128). The Back.Calc constant is used in the PI control loop to account for any differences in the track measurements (due to any hardware differences between the SAO boards), and thereby allow the smoothest exchange of output contribution. The Back.Calc constant is the difference between the output value and the track value (block 2130). In this regard, it will be appreciated that the Back.Calc calculation will depend upon factors such as which NI test is being performed (e.g., diamonds 2132–2134), because these are the cycles where the SAO boards must exchange responsibilities. In other words, the driving board must lower its output to zero and another board must drive the output.

Figure 22F:
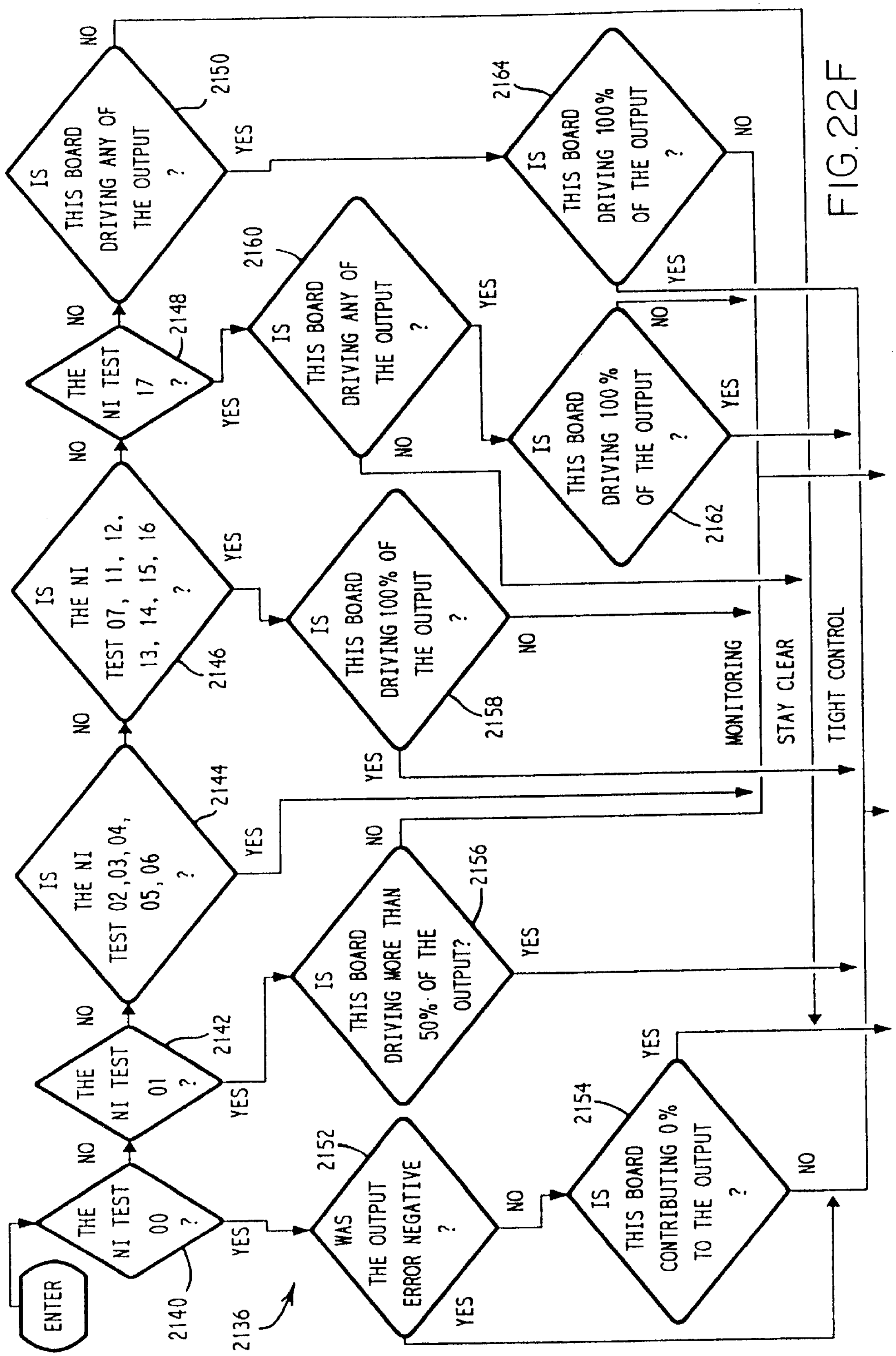

Once the Back Calculation routine 2126 is performed, an “Output In Control?” routine 2136 will be executed by the SAO microprocessor. The Output In Control routine 2136 is in the form of a question, because it will exit into either the In Control routine 2124 or the Out of Control routine 2120 depending upon the conditions being evaluated during its execution. The Output In Control routine 2136 is shown collectively in FIGS. 22F–22H. In this regard, FIG. 22F shows that a series of evaluations will be made to determine if an NI test is being conducted (diamond 2140), and if so, then identify which test is currently being conducted (diamonds 2140–2148). The answers to these questions and answers to their depending questions (i.e., diamonds 2152–2164) will determine which mode the SAO board is in. Specifically, FIG. 22F identifies three modes of operation, namely “Tight Control”, “Monitoring” and “Stay Clear”. The use of the operating modes will become apparent from a review of FIGS. 22F–22H and the description below.

Figure 22G:
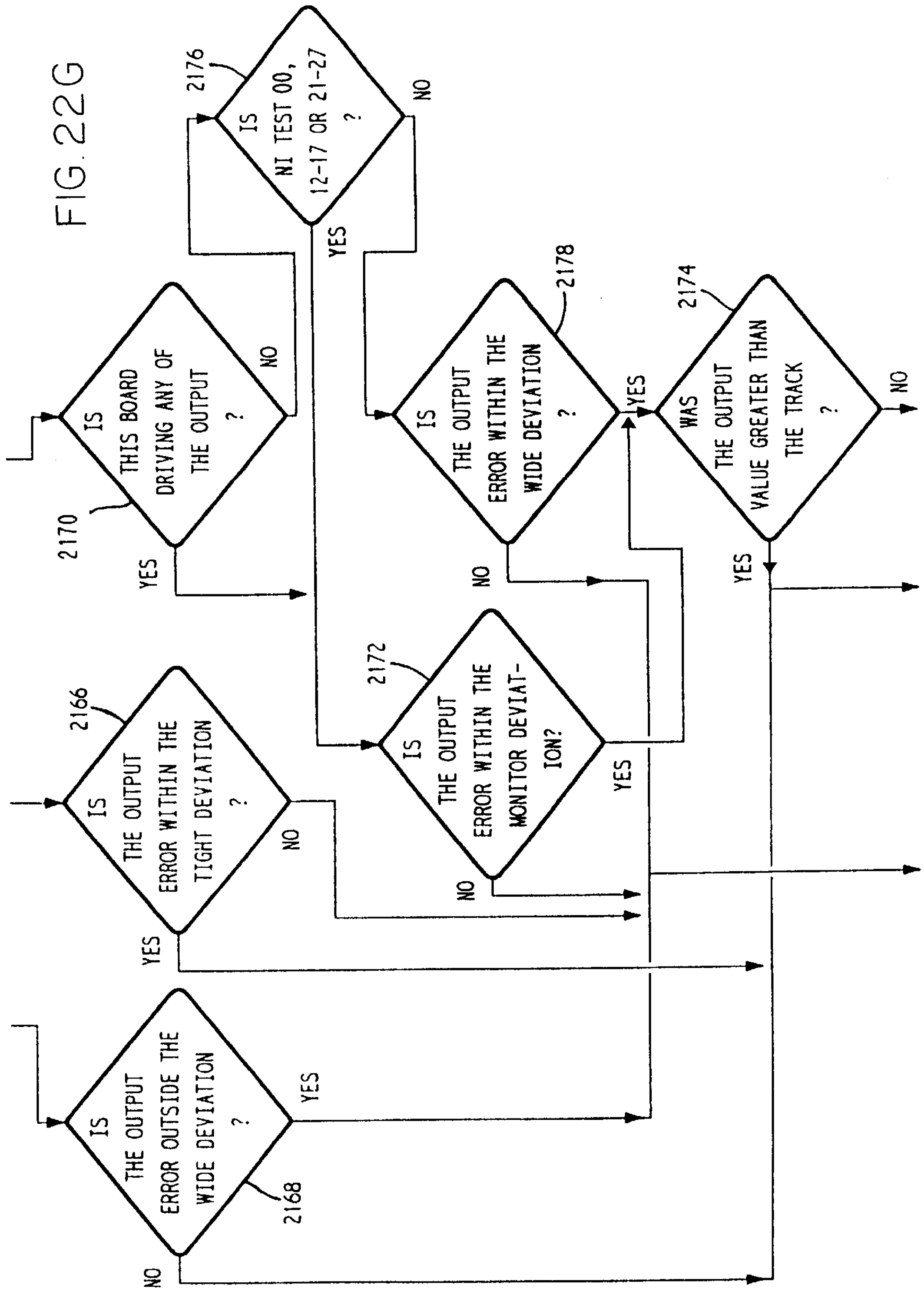
Figure 22H:
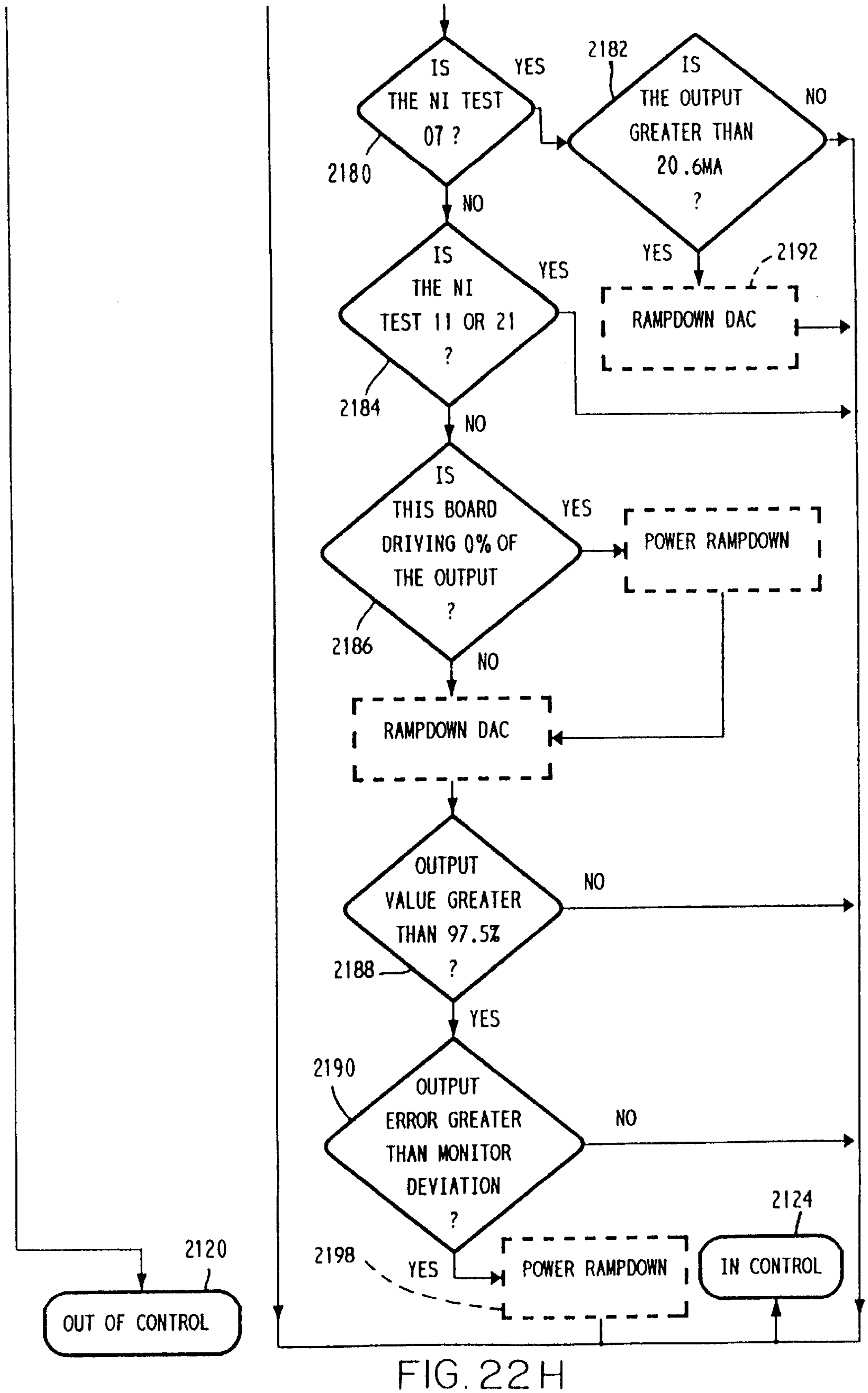
Figure 22:
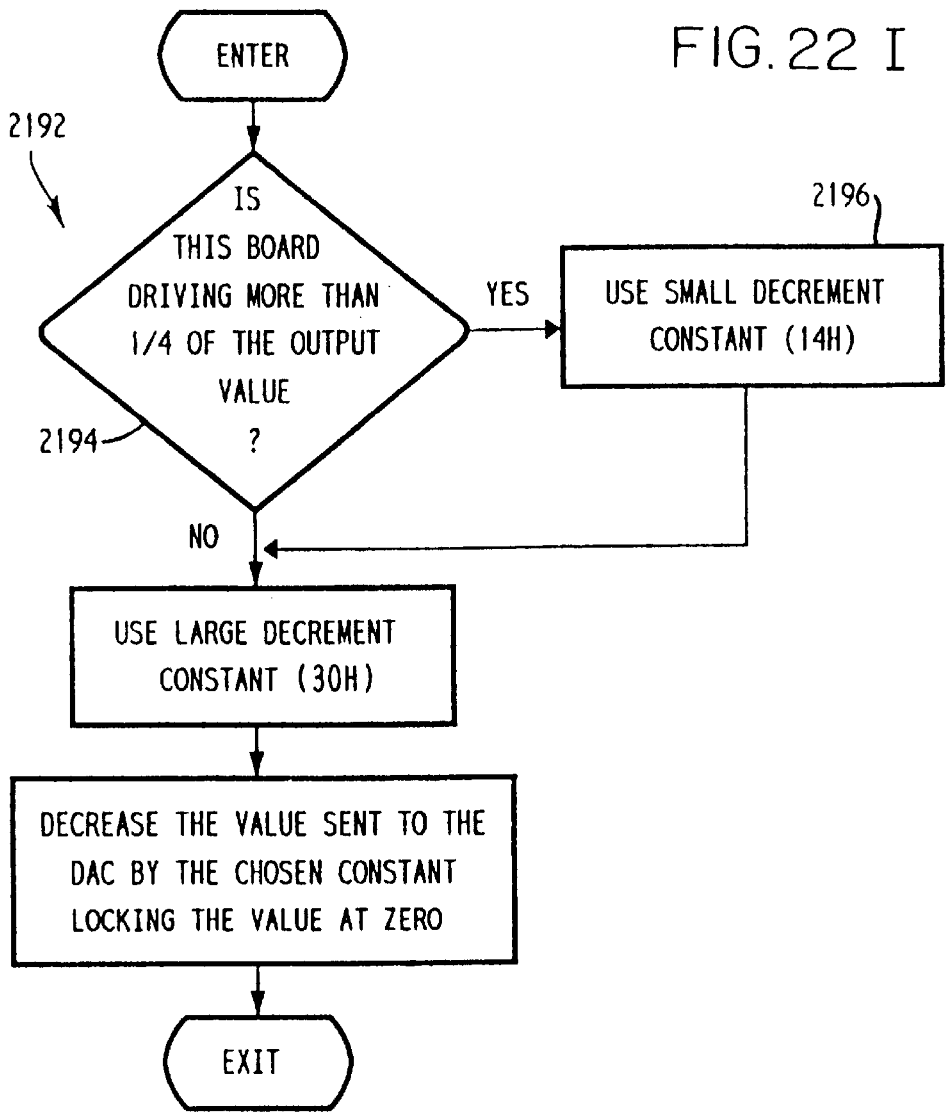
Figure 22:
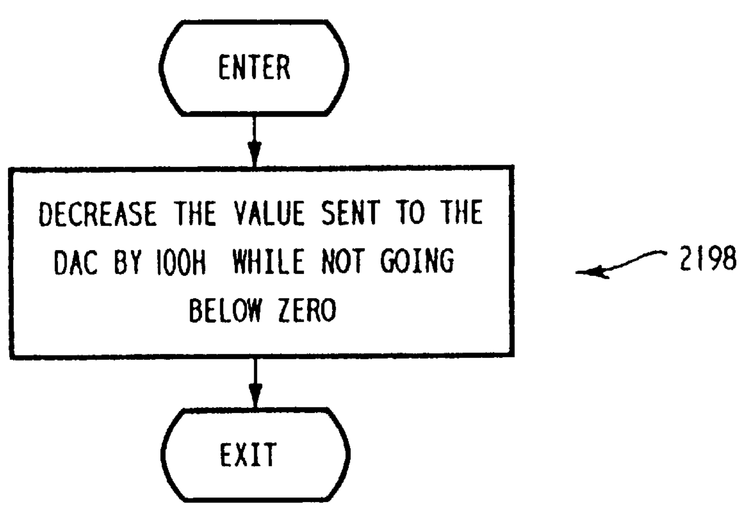

If the NI test is “00”, it should be understood that no NI test is actually being conducted. As indicated by diamonds 2152–2154, the Tight Control mode is assumed when the SAO board’s contribution to the field output is other than 0% of the commanded output value. Diamond 2166 of FIG. 22G shows that an evaluation will be made in the Tight Control mode to determine if the output error (the output value—track difference) is within a tight deviation range (e.g., 0.05% of 22 ma). If the output is outside of this tight deviation range, then the Out of Control routine 2120 will be performed, as shown in FIG. 22H. Otherwise, the In Control routine 2124 will be performed.

If the SAO board was not contributing anything to the output (diamond 2154), then the Stay Clear mode will be assumed. In the Stay Clear mode, a check will be made to see if the output error is outside of a wide deviation range, such as 1.6% (diamond 2168). If the output error is within the wide deviation range, then the In Control routine 2124 will be performed. Otherwise, the Out of Control routine 2120 will be performed.

If the NI test is Test #1 (diamond 2142), then a determination will be made to see if the SAO board is driving more than 50% of the commanded output value (diamond 2156). If the answer is YES, then the Tight Control evaluation of diamond 2166 will be performed. Otherwise, the SAO board will assume the Monitoring mode. In the Monitoring mode, a determination will first be made to see if the SAO board is driving any of the output (diamond 2170). If the answer is YES, then a check will be made to see if the output error is within a monitor deviation, such as 0.10% (diamond 2172). If the answer to this question is NO, then the Out of Control routine 2120 will be performed. However, if the answer to this question is YES, then a determination will be made as to whether the output value was greater than the track value measured (diamond 2174). The determination of diamond 2174 will also be made if the NI test is "01–07" and the output is within the wide deviation (diamonds 2176–2178).

If the output value was greater than the track value (diamond 2174), then the In Control routine 2124 will be performed. Otherwise, a series of questions will be posed (diamonds 2180–2190) before entering the In Control routine 2124. Thus, for example, if the NI test is Test #07 and the output has not achieved more than 93.75% of the maximum possible output, then the Rampdown DAC routine 2192 will be performed. This action prevents more than 22 ma from being sent to the field, as it should be noted that block 2174 established that the track is already greater than the output value.

The Rampdown DAC routine 2192 is shown in the flow chart of FIG. 22I. In this regard, the flow chart indicates that the output will be ramped down in relatively small or large increments, depending upon whether the SAO board is driving more than 25% of the output value (diamond 2194). For example, when the small decrement constant is employed (block 2196), the output may be ramped down on the order of 0.1%/call to this routine. While the controllers 92–96 operate on a specific process control timing cycle, this is not strictly the case for the SAO circuit boards 600–604, as the SAO microprocessors will repeatedly execute their programs (as shown in FIGS. 21A–21B) as quickly as possible. In other words, each SAO board may execute all of its programs on the order of 50–100 times per process control cycle (e.g., one second) of the controllers 92–96.

FIG. 22H also shows that a Power Rampdown routine 2198 may be employed if the series of questions is resolved to the point where it is determined that the output error is greater than the monitor deviation (diamond 2190). The Power Rampdown DAC routine 2198 is shown in the brief flow chart of FIG. 22J. In this regard, it will be appreciated that a very rapid decrement rate will be employed due to the fact that the output has been detected to be beyond the acceptable monitor deviation limit.

FIG. 22F also shows that the Tight Control mode will be assumed whenever it is determined that the ME SAO board is driving 100% of the desired output value (diamonds 2158, 2162–2164). Otherwise, if the answer to any of the diamonds 2158, 2162–2164 is NO, then the Monitoring mode will be assumed. Similarly, if it is determined that ME SAO board is not driving any of the output (diamonds 2150 and 2160), then the Stay Clear mode will be assumed.

Figure 22K:
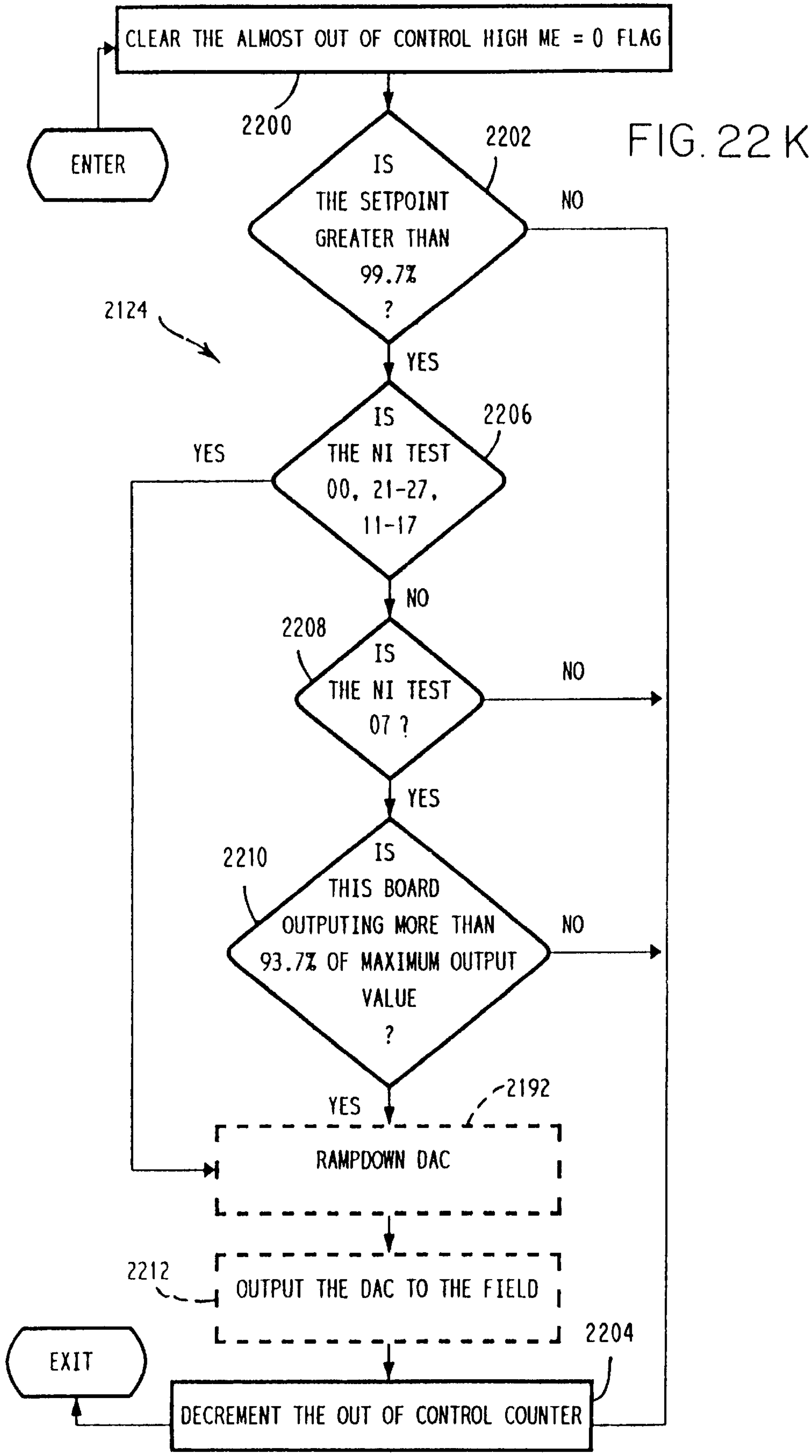
Figure 22:
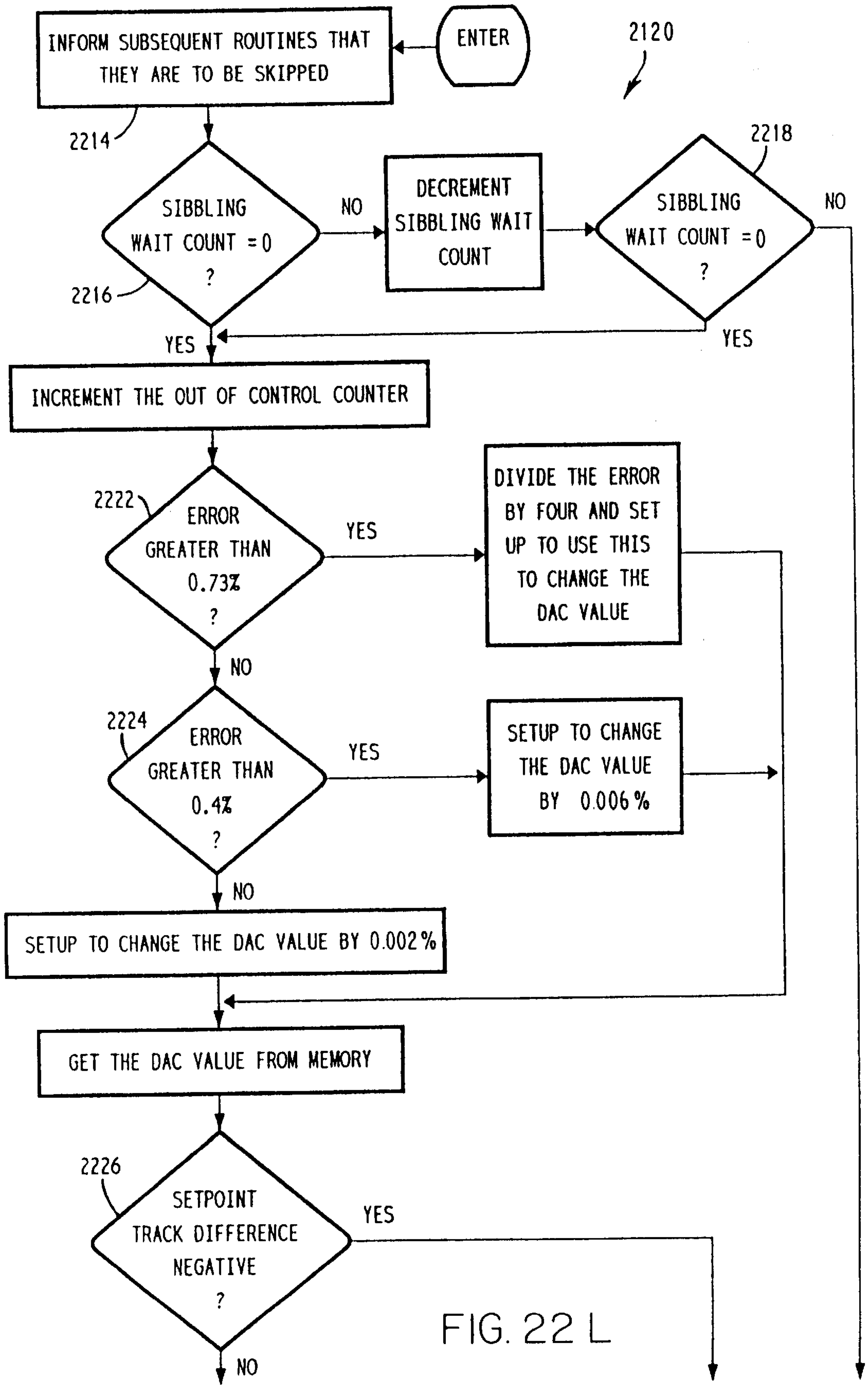
Figure 22:
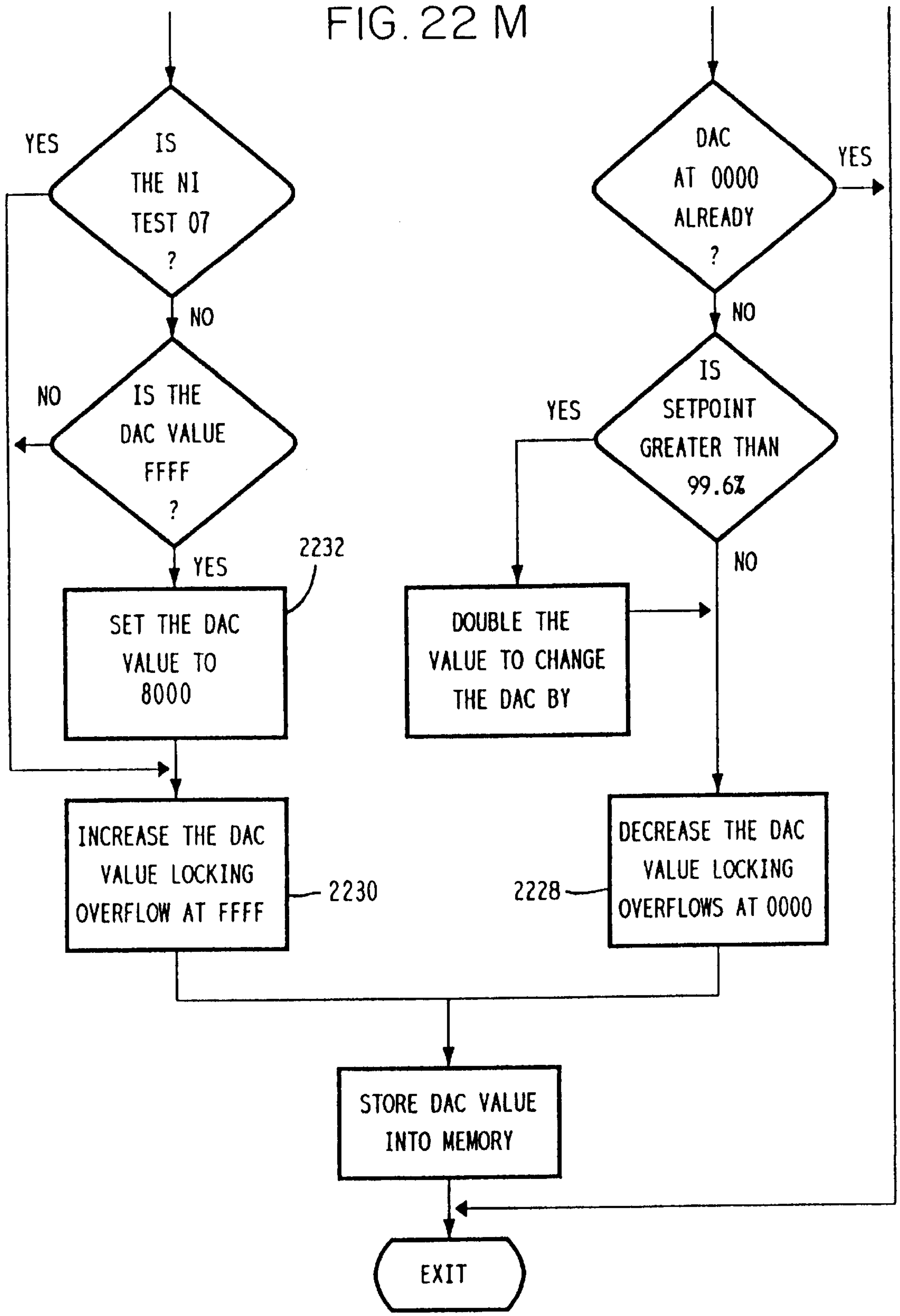
Figure 22:
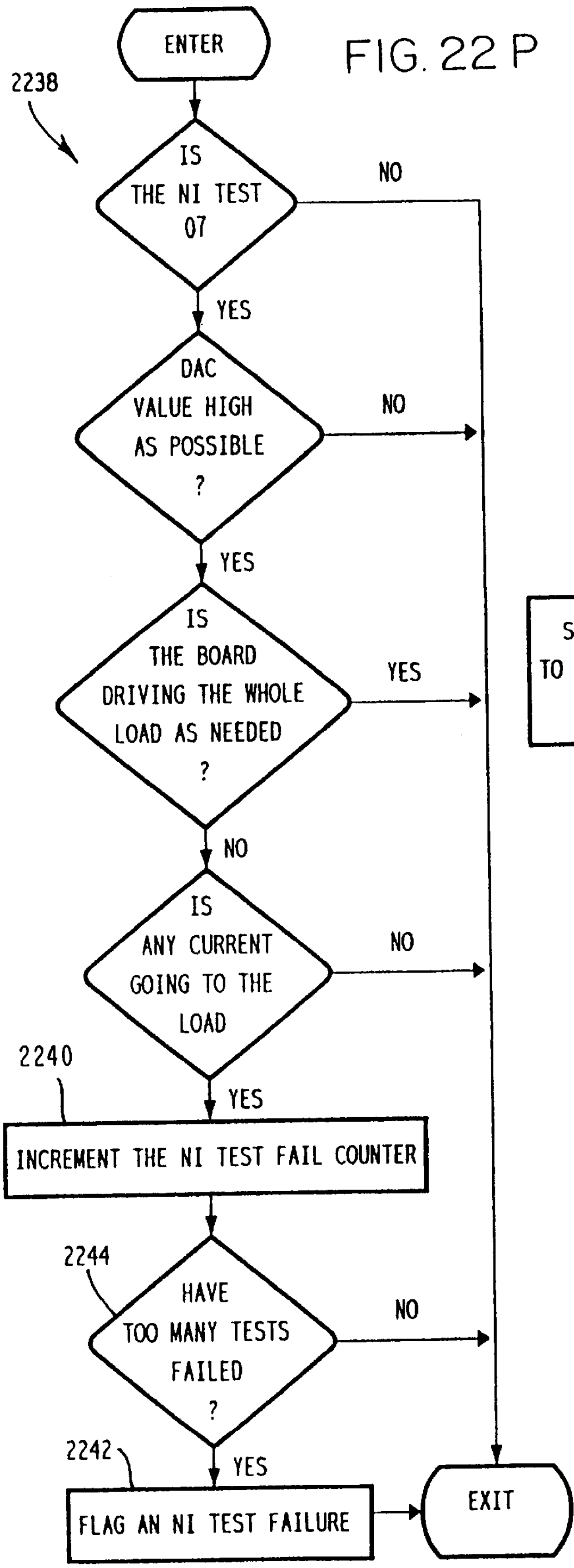
Figure 22:
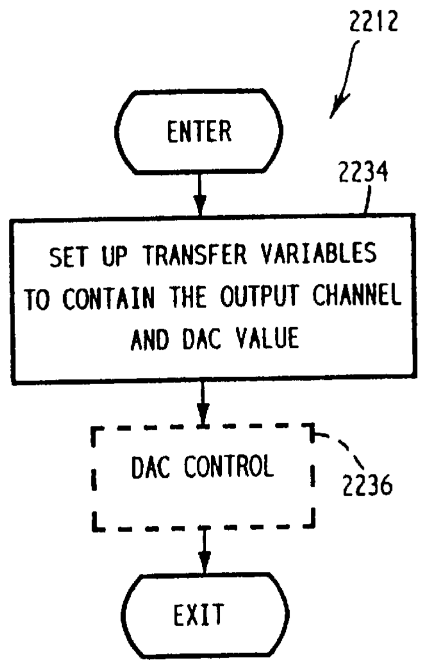
Figure 22O:
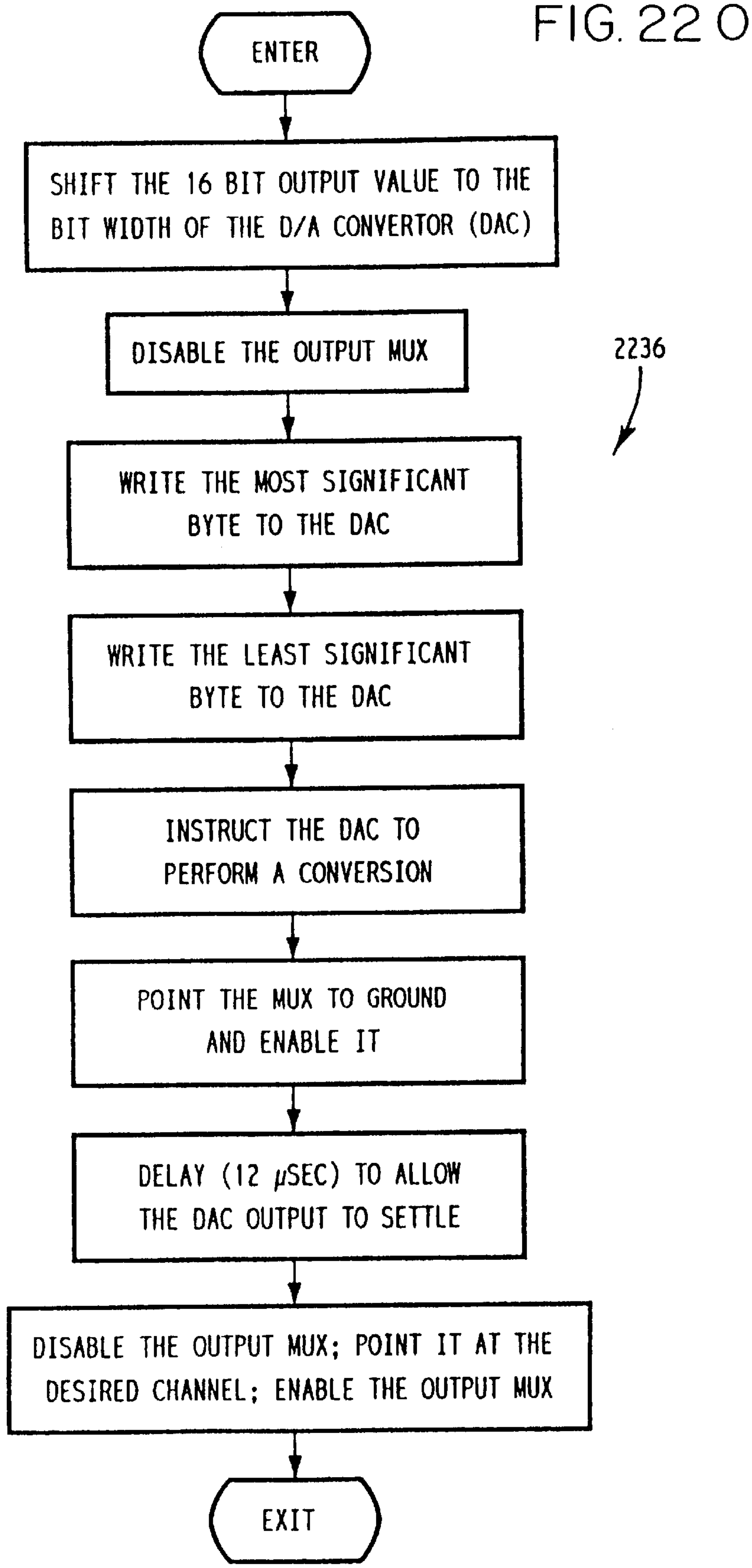

Referring to FIG. 22K, a flow chart for the In Control routine 2124 is shown. This routine begins by clearing the "Almost Out of Control High ME=0" flag (block 2200). The clearing of this flag is used to signify that an OOCH ME=0 condition will not be signalled the next time the Out of Control counter reached a preset limit. Then an evaluation will be made as to whether the output value is greater than 99.7% of the maximum allowable output value (diamond 2202). If the output value is essentially less than this maximum value, then the program flow will skip down to the end of this routine, where an Out of Control counter will be decremented (block 2204). However, if the output value is at its maximum value, then three additional evaluations may be made (diamonds 2206–2210). If the NI test is one of the test numbers Test #01 through Test #06, then the Out of Control counter will be decremented. However, if the NI test is one of those listed in diamond 2206, then the Rampdown DAC routine 2192 will be performed. Similarly, if the NI test is Test #07 and the SAO board is outputting more than 93.7% of the maximum output value (diamonds 2208–2210), then the Rampdown DAC routine 2192 will be performed.

In the event that the Rampdown DAC routine 2192 routine is implemented at this point, then the Send the Output to the Field routine 2212 will be immediately executed. The Send the Output to the Field routine 2212 will be discussed in connection with FIG. 22N. The Send the Output to the Field routine 2212 is also shown on FIG. 22A as the next routine to be executed in any event once the In Control routine 2124 is completed. Nevertheless, if it is determined that the output of this SAO board should be decreased, then it is preferred that it should be permitted to begin backing off at the earliest opportunity.

Referring to FIGS. 22L–22M, a flow chart for the Out of Control routine 2120 is shown. This routine is used to change the DAC output value in response to a number of factors, such as the magnitude of the error detected. In the first place, block 2214 indicates that this routine will cause subsequent routines are to be skipped. This is because NI testing should not be performed if the output is not correct. Then, a sibling wait counter will be evaluated (diamonds 2216–2218). The sibling wait counter is used to delay reaction to an output error and enable one of the neighboring SAO boards to react instead. Then, the Out of Control counter will be incremented (block 2220). Next, the magnitude of the output error will be evaluated in order to determine the rate at which the DAC output value should be changed (diamonds 2222–2224).

As shown in FIG. 22L, the program will branch depending upon whether the output error was negative (diamond 2226). If this difference was negative, then the DAC value will be decreased accordingly (FIG. 22M, block 2228). Otherwise, the DAC value will be increased to the appropriate value (block 2230). Thus, for example, the DAC value will be set to a 10 v output amount in block 2232 to prevent a futile attempt to send 20 v to the field if the device will not allow the track to reach the output value at maximum voltage out. This action lowers the bump if a disconnected field wire is attached.

Referring to FIG. 22N, a brief flow chart of the Send the Output to the Field routine 2212 is shown. After a setup step (block 2234), this routine simply calls the DAC Control routine 2236 to write the two byte value into the digital to analog converter circuit. The DAC Control routine is shown in the self explanatory flow chart of FIG. 220.

Referring to again to FIG. 22A, the next routine to be executed is shown to be the Check for a Test #07 Error routine 2238. This routine is shown in the flow chart of FIG. 22P. As shown in FIG. 22P, a series of evaluations are made to determine if the NI Test Fail counter should be incremented (block 2240), and ultimately flag an NI Test Failure (block 2242) if too many tests have failed (diamond 2244). In this regard, it will be recalled that during Test #07, the ME SAO board must be driving the entire output by itself for each of its channels. Thus, if the SAO board is not driving the entire output by itself, its output voltage is at the maximum, and current is going to the field, then the NI Test Failure counter will provide a period of time to reach the required goal. However, if the goal of driving the output by itself cannot be reached within a reasonable period of time (e.g., the NI Test Failure counter has exceeded 30), then an error condition will be flagged.

Figure 22Q:
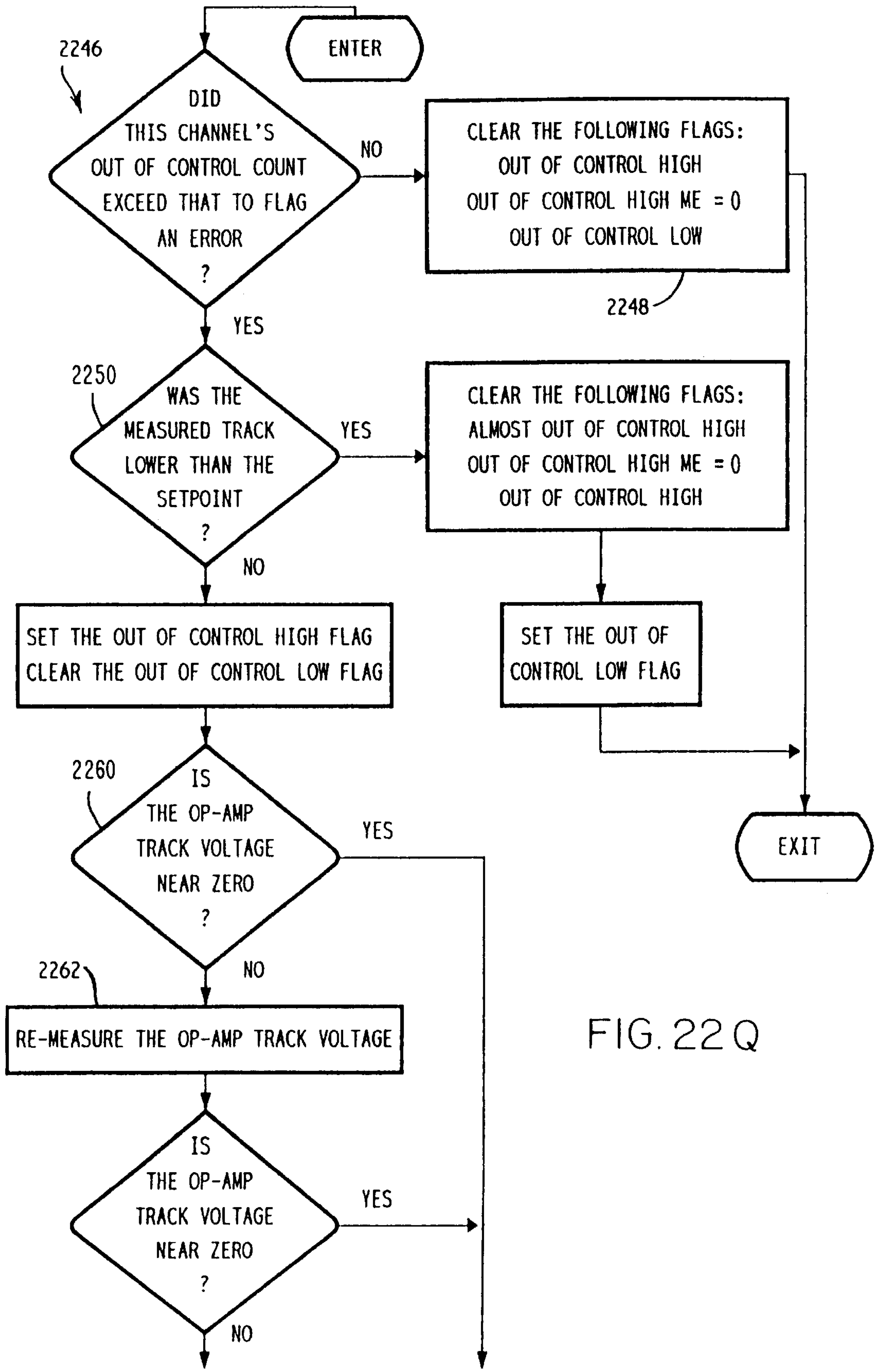
Figure 22R:
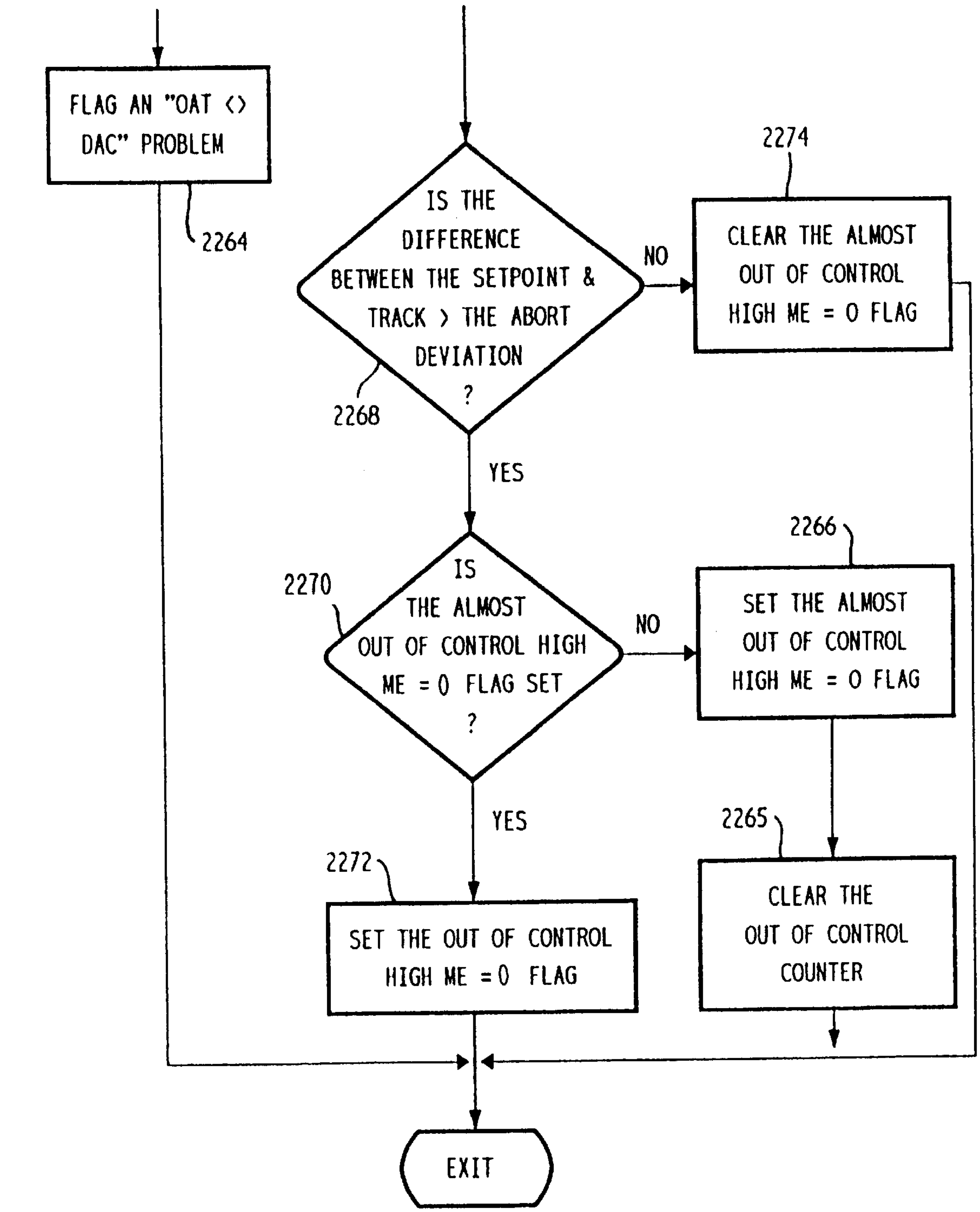

FIG. 22A shows that the final routine to be executed is the Handle Output Problems routine 2246. The Handle Output Problems routine 2246 is shown in FIGS. 22Q–22R. As will be seen from these figures, this routine is used to set or clear a number or different flags depending upon the conditions specified. Thus, for example, if the Out of Control count for the channel being evaluated has not exceeded a predetermined amount (e.g., 53), then three different flags will be cleared (diamond 2248). If the Out of Control count exceeded a predetermined amount, then an evaluation will be made as to whether the track measurement was lower than the output value (diamond 2252). If the answer is YES, then the "Almost Out of Control High", the "Out of Control High" and the "Out of Control High ME=0" flags will be cleared (block 2254). Additionally, the "Out of Control Low" flag will be set, as the output to the field is lower than it should be.

In contrast, if the error is on the high side (block 2250 generates a NO), then the "Out of Control High" flag will be set and the "Out of Control Low" flag will be cleared (block 2258). Then, the operational amplifier track signal OAT will be evaluated to see if it is near zero (diamond 2260). If it is not near zero, then the OAT signal will be re-measured, as the DAC was commanded previously to reduce its output (block 2262). If this additional measurement does not show the desired response, then the "OAT<>DAC" flag will be set (block 2264).

FIG. 22R shows that the "Almost out of Control High Me=0" flag will first be set (block 2266) and the Out of Control count will be zeroed (block 2265) if the difference between the output value and the track measurement is greater than an abort deviation value, such as 2% (diamonds 2268–2270).

Then during the next pass through this routine that the error count has exceeded a predetermined amount, the "Out of Control High ME=0" flag will be set (block 2272) if the "Almost Out of Control High ME=0" flag has not been cleared (block 2274). Forcing this delay in the setting of the OOCHME=0 bit prevents false errors from being reported.

Referring now to FIGS. 23A–23I, a set of flow charts is shown for the NI Testing routine 1926 of FIG. 21B. Diamond 2300 indicates that this NI Testing routine may be skipped, such as when an error has been detected by the Handle Error Conditions routine. Diamond 2302 indicates that the NI Testing routine will not be performed during those one-second periods when the Test #00 insignia is utilized. Additionally, diamonds 2304–2306 indicate that the NI Testing routine will not be performed when an error is encountered on the channel to be tested or when the controller for this SAO board commands an output value which is less than a minimum value (e.g., 4 mA). While NI testing could be performed when the commanded output value is near zero, it is preferred that NI testing be deferred, as the abort switches for any zero output channel will be opened and it will not be possible to conduct a complete test (e.g., Test #7).

In the event that this SAO board or one of the other SAO boards is being tested (diamond 2308), then this SAO board will look to see which test is being conducted. In this regard, it should be appreciated that this SAO board (e.g., SAO circuit board 600) does need to take any action for Tests #12–16 or #21–26, as any necessary action will be taken by its controller (e.g., controller 92). In the event that Test #11 is being conducted (diamond 2310), then the NI Testing routine will cause this SAO board to assume the necessary output being shed by its neighboring SAO board designated as N1 (e.g., SAO board 602). However, it should be noted at this point that the NI Testing routine 1926 does not specifically test for Test #21. This is due to the fact that the NI Testing routine being performed by the N1 SAO board will have the N2 SAO board designated as its neighbor N1. In other words, the NI Testing routine 1926 builds in a preference for which SAO board should begin to assume the output being shed by another SAO board. Specifically, in this instance, the preference is made for the SAO board which has most recently completed Test #7, as this particular test evaluates the SAO board's ability to assume the entire output.

In the event that the NI test being conducted is not Test #11, then the sibling wait counter will be cleared to permit immediate action if necessary (block 2312). Then, it will be determined if the NI test being conducted is Test #17 or Test #27 (diamond 2314 of FIG. 23B). If the answer is NO, then the NI Test routine 1926 will be ended for this call. However, if one of these two NI tests are being conducted, then the sibling wait counter will be loaded with a value which will permit the SAO board under test time to ramp up its output (block 2316). Then, a determination will be made as to whether this SAO board is driving any of the output (diamond 2318), the appropriate rampdown rate will be chosen (blocks 2192 and 2198) as the result, and the output value will sent to the field (block 2212). If the DAC output is not zero, then a flag will be set to indicate that this SAO board has not finished ramping down (block 2320).

If this SAO board is currently being tested (diamond 2308), then a flag will be set to indicate that all lower NI routines in this SAO cycle should be skipped (block 2322). Then, if Test #07 is being conducted (diamond 2324) or if Test #11 is being conducted, a determination will be made as to whether this SAO board is driving any power (diamond 2326) by examining the voltage across the ME resistor and the appropriate flag will be set (block 2328). Then, the contribution to the field will be evaluated (diamonds 2330–2336) by examining the voltage drop across the ME resistor. If this SAO board is driving 100% of the output, the DAC output is at its maximum and the track output is at the proper value, then the NI test will be successfully completed (diamond 2338). Otherwise, additional determinations will need to be made and the appropriate action taken during this pass through the NI Testing routine 1926. For example, if this SAO board is driving more than 25% of the output value (diamond 2334), but less than 100% of the output value (diamond 2336), then 0.05% will be added to the value supplied to the DAC (block 2340). Then, the NI Testing routine 1926 will exit at this point until it is called upon again to evaluate the contribution that this SAO board is making to the output. If the DAC output is at its maximum, and this board is not driving 100% of the output, the test failure counter is increased.

Figure 23A:
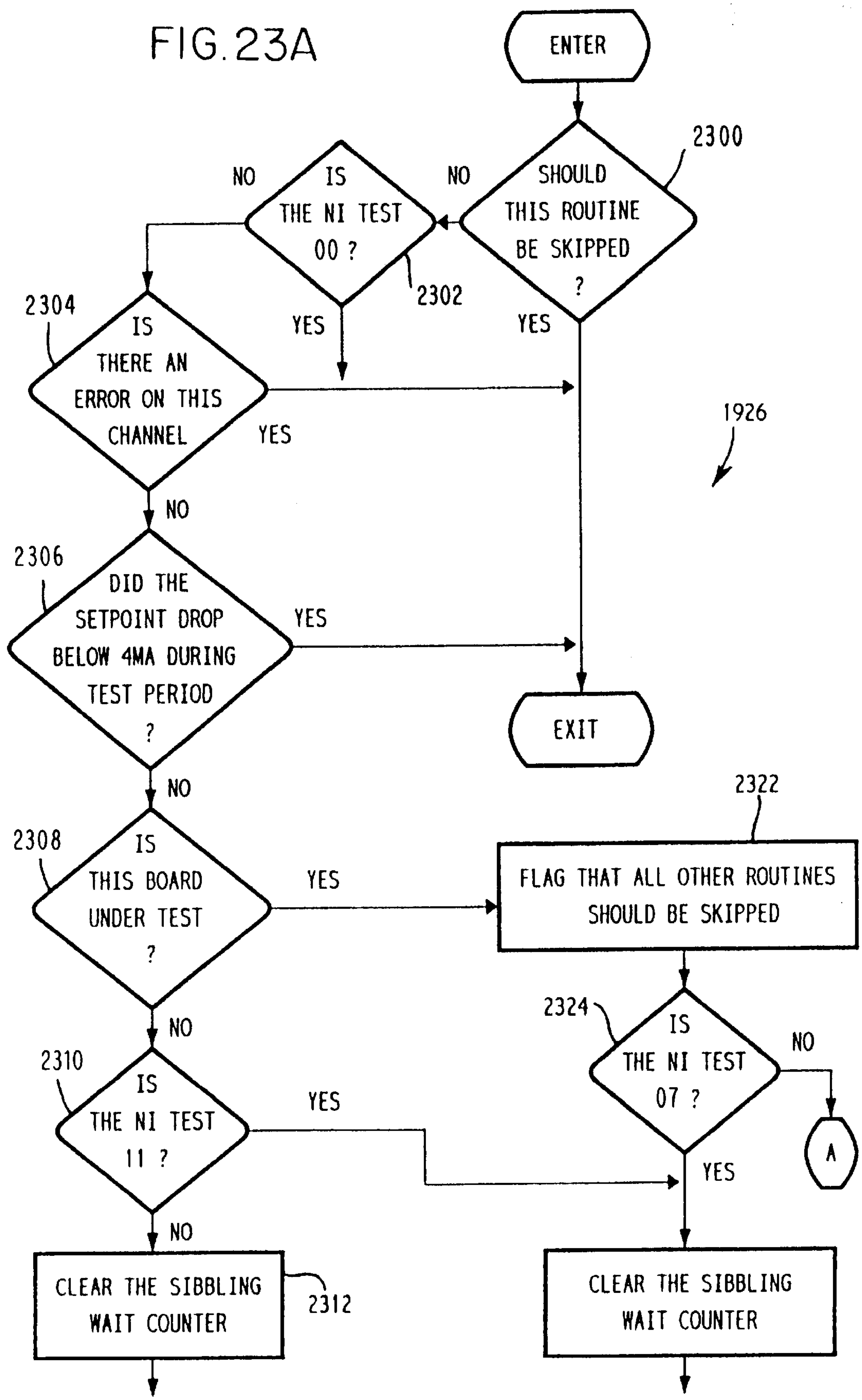
FIGS. 23A–23I comprise a set of flow charts which illustrate the non-intrusive testing method performed by the analog output circuits.
Figure 23B:
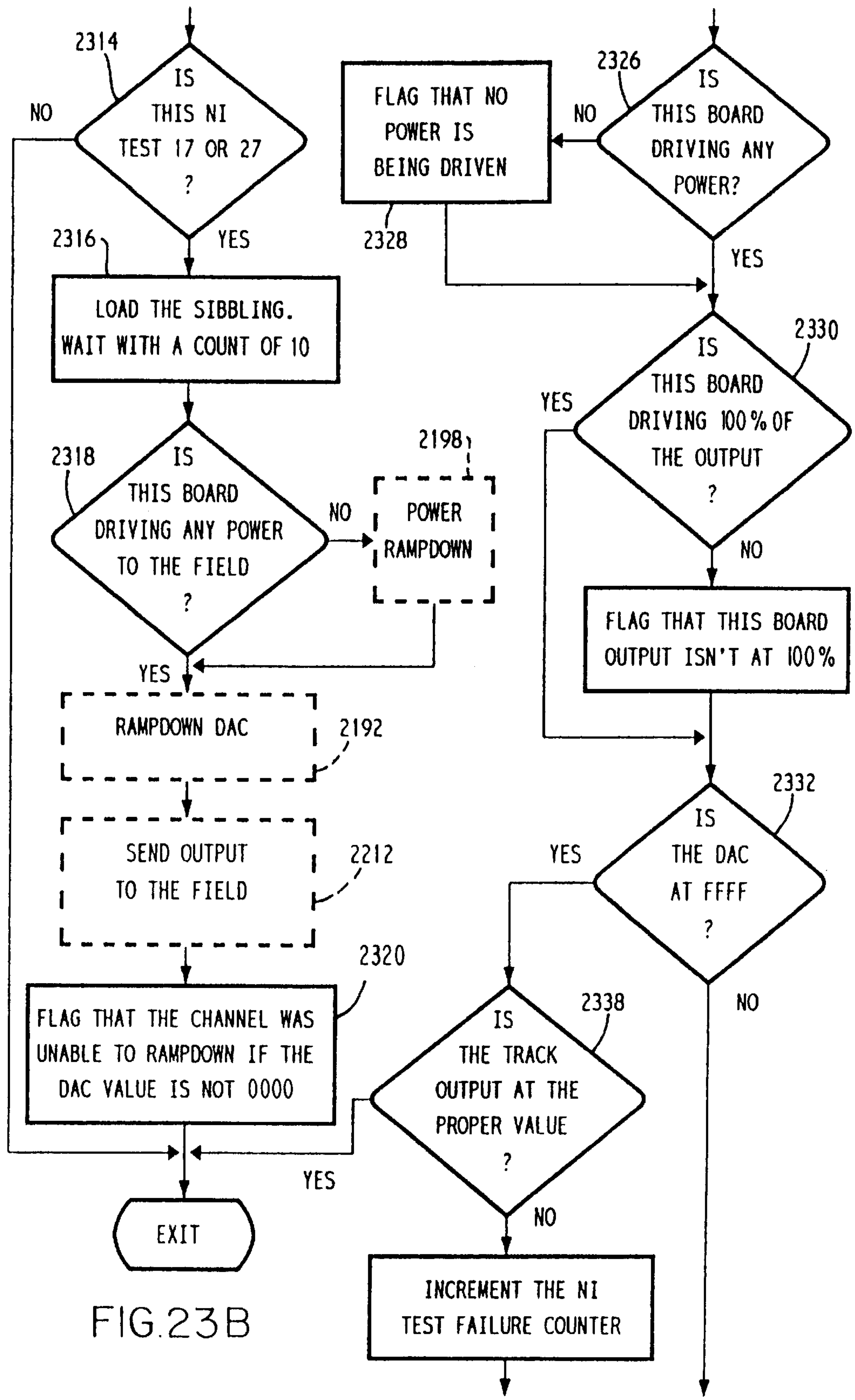
Figure 23C:
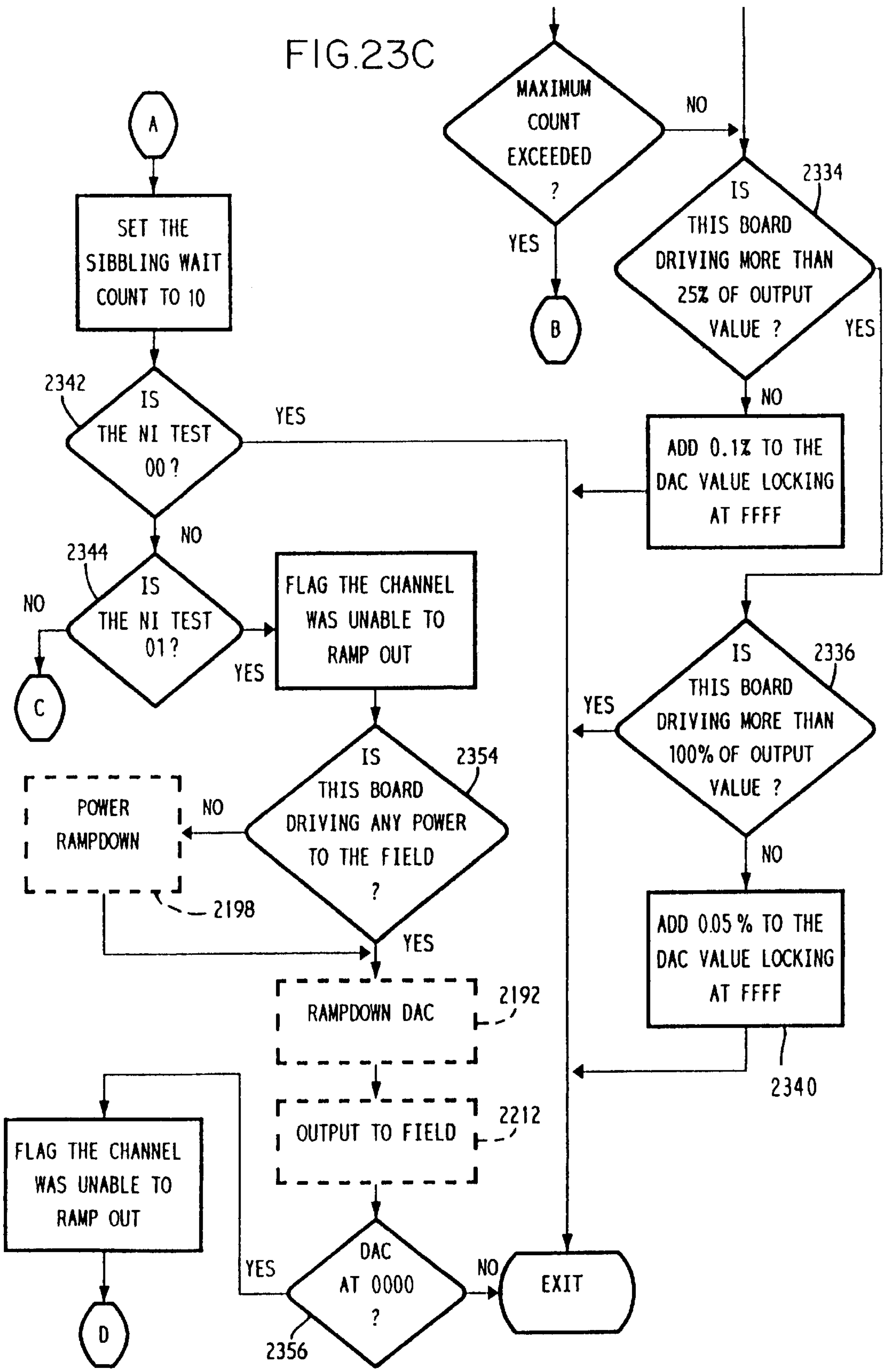
Figure 23D:
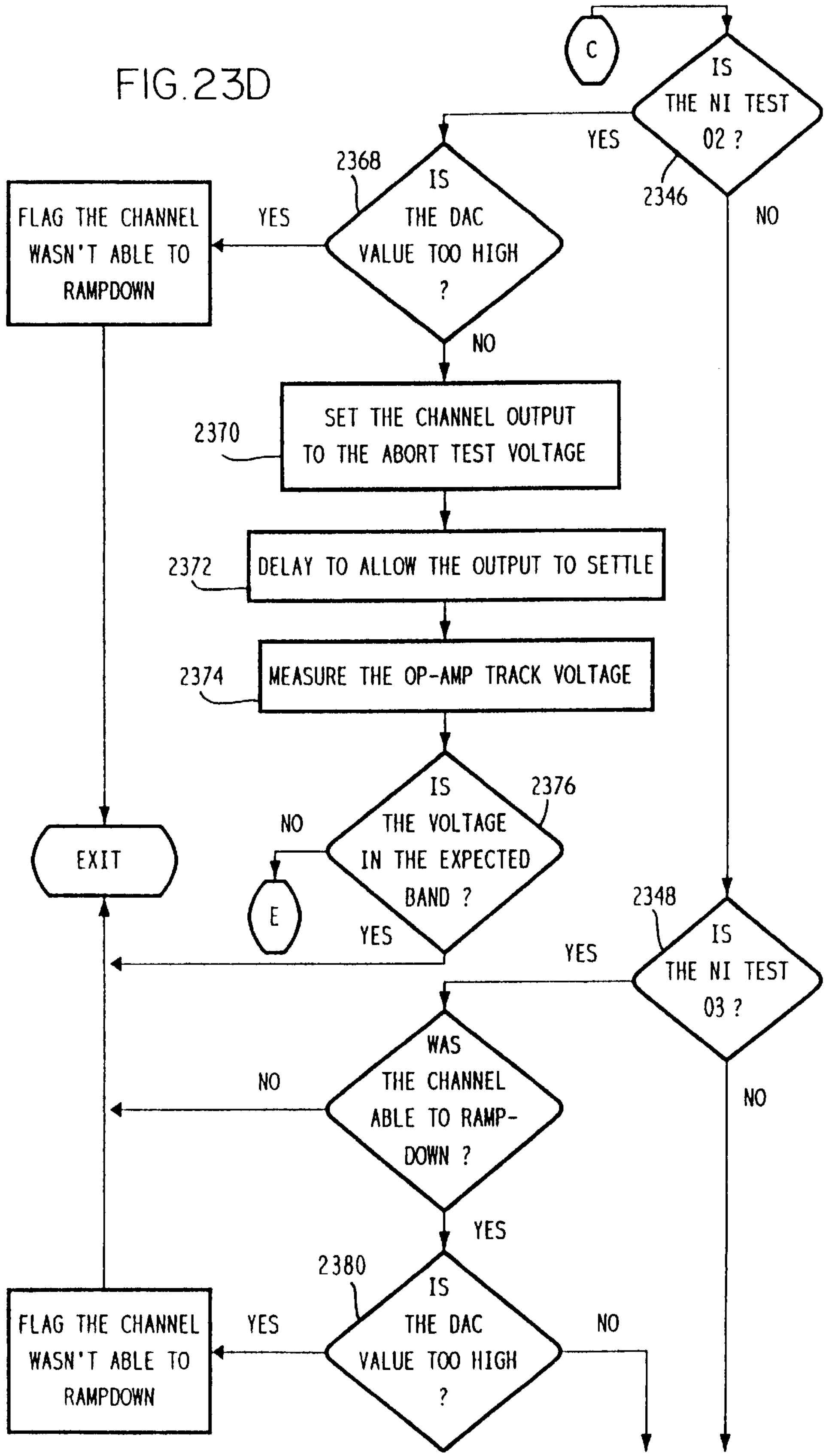
Figure 23E:
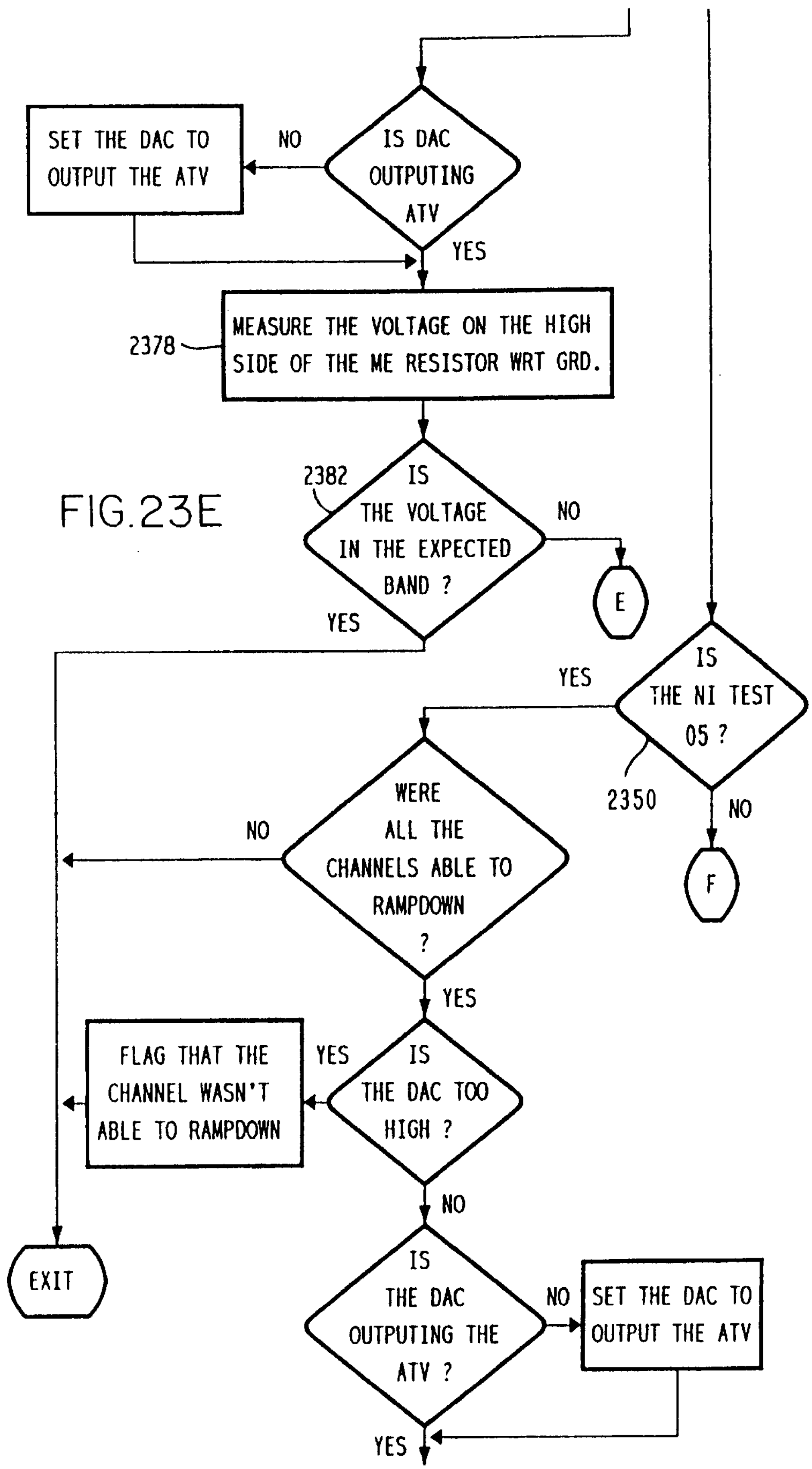
Figure 23F:
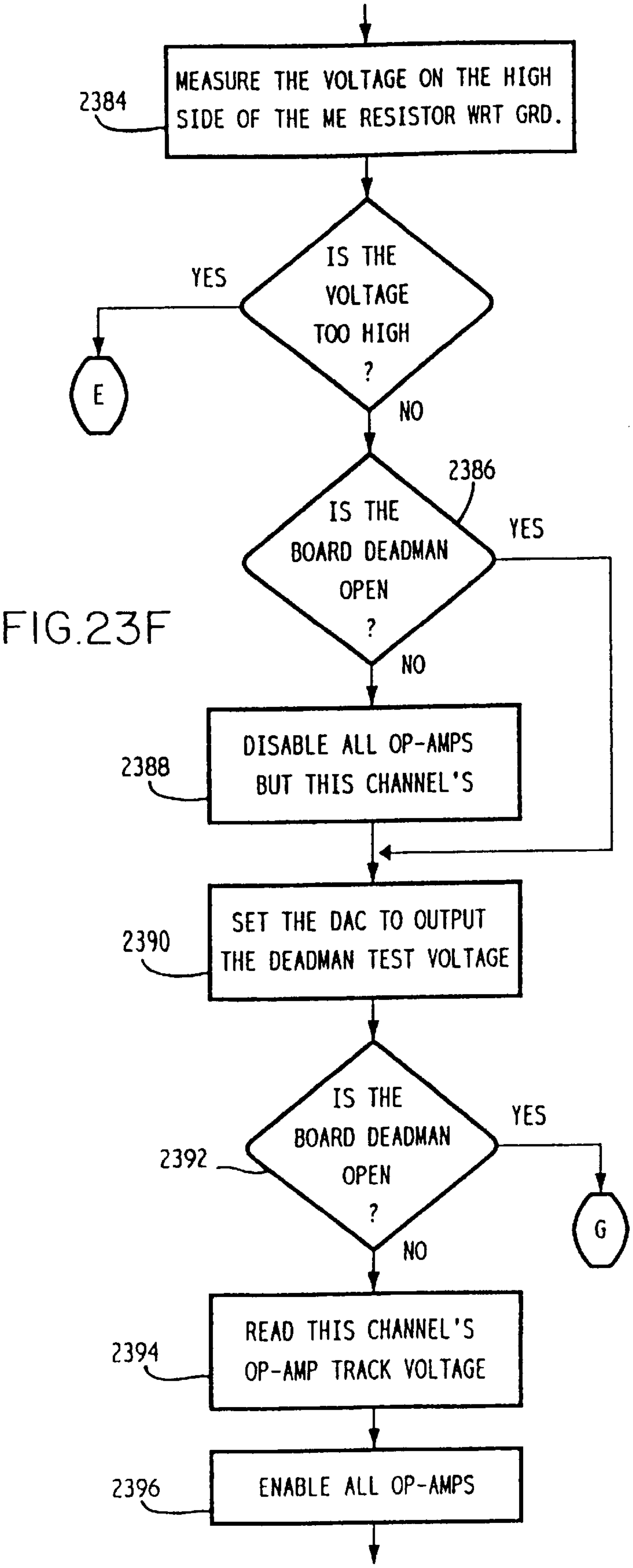
Figure 23G:
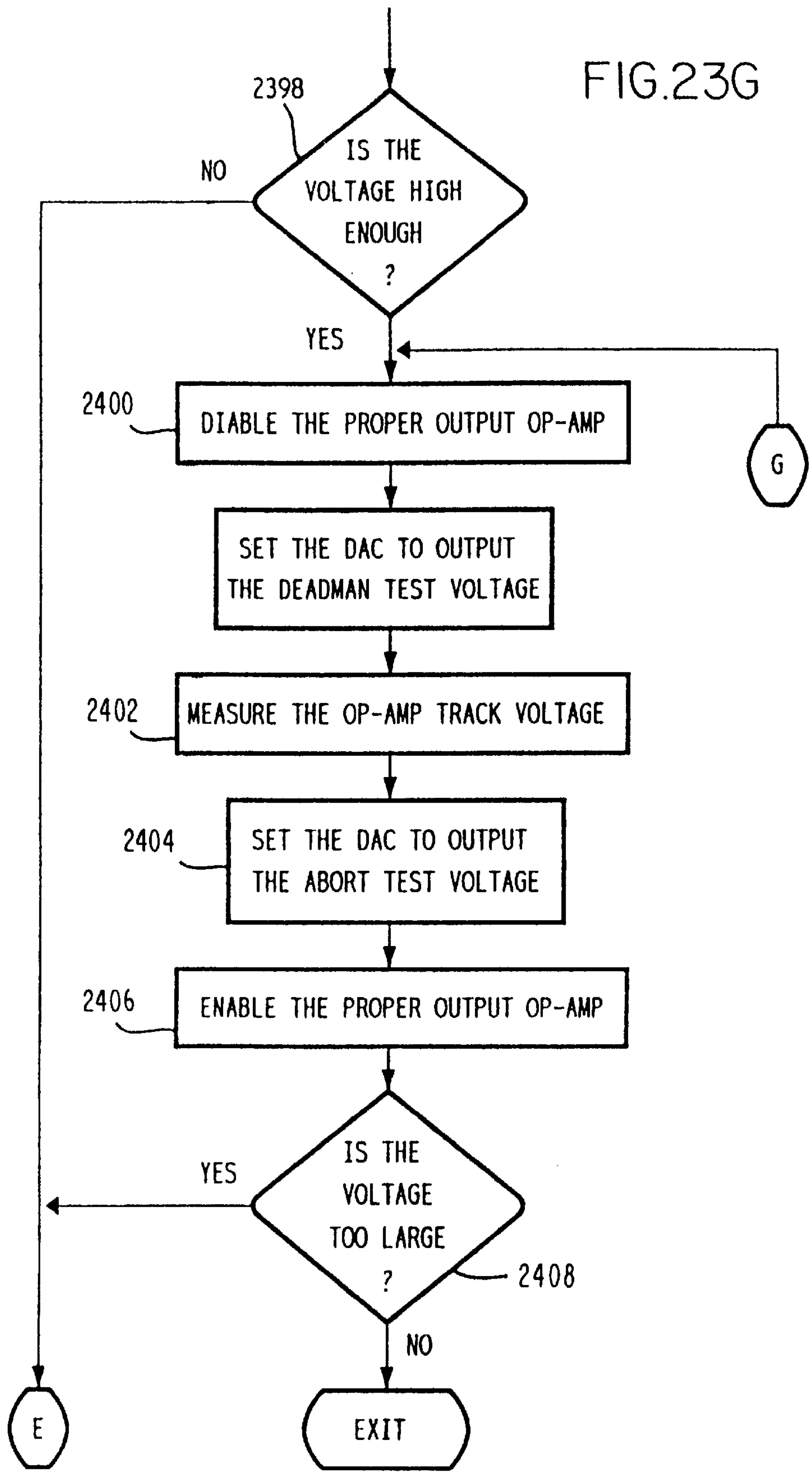
Figure 23H:
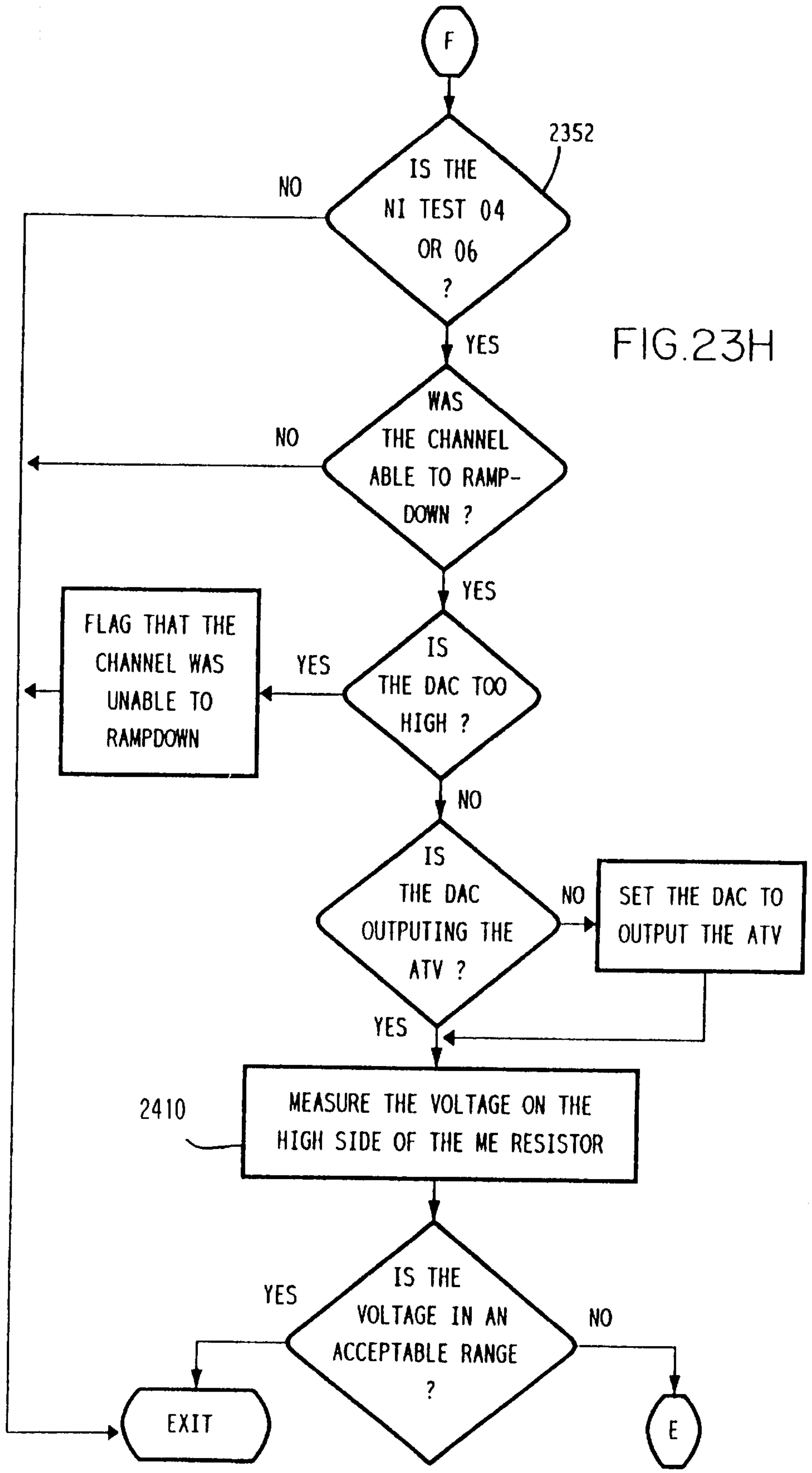

If the answer to diamond 2324 on FIG. 23A was NO, then the NI Testing routine 1926 will jump to point "A" on FIG. 23C to begin checking to see which of other the NI tests are being conducted (diamonds 2342–2344 on FIG. 23C, diamonds 2346–2348 on FIG. 23D, diamond 2350 on FIG. 23E, and diamond 2352 on FIG. 23H). As will be appreciated from a review of FIGS. 23C–23I, the NI Testing routine follows a specific regimen for each of the NI tests. Thus, for example, in the case of Test #01, the SAO board will attempt to ramp itself down until a zero output is achieved (diamonds 2354–2356). Once a zero output is achieved, the NI Testing routine 1926 will jump to point "D" on FIG. 23I. If the rampdown is unsuccessful, the controller is flagged not to test this channel and subsequent tests in the cycle will locate the problems on the neighboring boards.

Figure 23I:
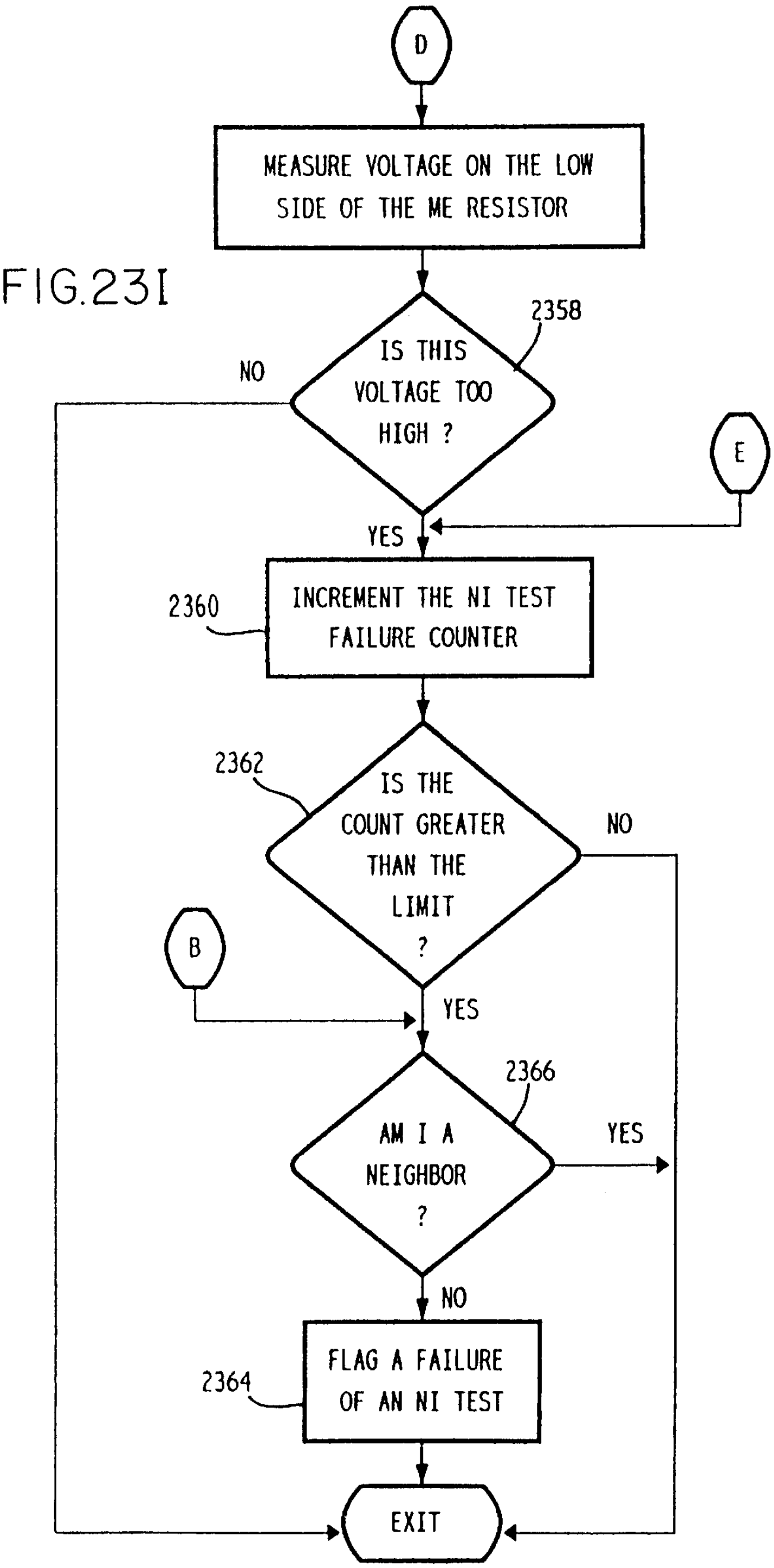

As indicated in FIG. 23I, a check will be made to see if the voltage measured on the low side of the ME resistor with respect to ground is too high for a DAC output of zero (diamond 2358). If the voltage is too high (e.g., 0.037), the diode has been shorted and the NI Test Failure counter will be incremented (block 2360). Then, the NI Test Failure counter itself will be checked to see if the present count has exceeded its predetermined limit, such as 40 failures (diamond 2362). This failure count is set relatively high in comparison to the failure count maintained by the controllers (e.g., only 1 failure is permitted at the controller level), in light of the fact that the SAO boards are repeatedly executing their programs many times relative to the process control cycle timing employed by the controllers 92–96. If the count limit has been exceeded, then a flag will be set to indicate that an NI test failure has occurred (block 2364). However, as indicated by diamond 2366 and the additional entry points "B" and "E", the NI test failure flag will only be set if this SAO board was conducting the NI test, as opposed to one of its neighboring SAO boards.

In the case of Test #02, FIG. 23D shows that the DAC output will be evaluated to determine if the SAO board was able to ramp down this channel (diamond 2368). Assuming that this channel was able to ramp down to zero, then the SAO microprocessor will set the channel output to the abort test voltage (block 2370), allow time for the output to settle (block 2372), and measure the operational amplifier track ("OAT") voltage signal (block 2374). Then, a determination will be made as to whether the OAT voltage level for this channel is in the expected or acceptable band, such as 150–700 mV (diamond 2376). If the answer is YES, then Test #02 will be successfully completed for this particular channel. However, if the answer is NO, then the NI Testing routine 1926 will jump to point "E" on FIG. 23I, where the NI Test Failure counter will be incremented. In any event, it should be appreciated that each of the analog output channels will be serviced in turn each time the NI Testing routine 1926 is called from the main SAO program 1900.

In the case of Test #03, FIG. 23E shows that the NI Testing routine 1926 will ultimately measure the voltage on the high side of the ME resistor with respect to ground (block 2378), provided that this channel was able to ramp down to zero (diamond 2380) and determine if it is low enough (e.g., 150 mv) (diamond 2382). If the voltage is not sufficiently low, then one or both of the abort switches have not opened. In this regard, it should be noted that the opening of the DN1 and DN2 abort switches will be performed independently by the N1 and N2 controllers, respectively, according to the time chart discussed above.

In the case of Test #5, FIGS. 23E–23G show that two tests are actually conducted. First, the operation of the abort switches DN1 and DN2 are again tested through a ME resistor measurement while the ATV signal is being produced (block 2384). Then, assuming that this test was successful, the ability to disable the operational amplifier will be tested. This test is accomplished by first checking to see if the SAO board Deadman is "open" (diamond 2386). This check is made by causing the microprocessor 610 to read the "NOT DEAD" signal from the Deadman Timer 649 of FIG. 12D. If the answer is Yes, then the operational amplifier 608 should be disabled. If the answer is NO, then all of the operational amplifier's 608 on the SAO conducting the test will be disabled (block 2388). The DAC will then be commanded to output the Deadman Test Voltage, such as 3 v (block 2390). The NOT DEAD signal will be checked again (diamond 2392), and then OAT signal will be read for the channel being tested if the Deadman is not open (block 2394). In this case, all of the SAO board operational amplifiers 608 will be re-enabled (block 2396), and then the OAT voltage will be checked to see if it is high enough (diamond 2398). Assuming that the OAT was high enough (e.g., the Deadman Test Voltage level), or if the Deadman was not already opened, then the operational amplifiers will be disabled (block 2400). Next, the OAT voltage will be measured (block 2402). Thereafter, the DAC will be re-set to the ATV level (block 2404), and the operational amplifiers will be re-enabled (block 2406). After this step, then the voltage from the Deadman voltage input will be evaluated to see if was possible to disable the operational amplifier (diamond 2408).

In the case of Tests #04 and #06 (diamond 2352), FIG. 23H shows that a voltage measurement will be made on the high side of the ME resistor (block 2410). Again, it should be appreciated that the necessary steps of opening and closing the abort switches DN1 and DN2 are handled by the neighboring controllers in accordance with the time chart set forth above.

From the above description of the preferred embodiment, it should be appreciated that the field computer units 12 operate in accordance with a predetermined process control cycle. In other words, all of the signal communication and input/output processing functions of the field computer units are performed within a single process control cycle, such as a one second interval. While the clock signals for each of the network controllers 16 and the field computer unit controllers 92–96 are all adjusted during this process control cycle to maintain the clock signals within a given tolerance, an adjustable timeline is generally provided to facilitate cooperation between these interface system components. For example, in one form of the present invention, the synchronization message is sent by the network controllers 16 to each of the field computer units 12 at the beginning of a new process control cycle. The field computer units 12 will in turn be looking for this two byte message within a given period of time (e.g., 1.5 milli-seconds). After the network controllers 16 determine the necessary communication paths, they will send the appropriate digital and analog output values to each of the field computer units. Then, the controllers 92–96 will exchange this information in order to perform the independent arbitration methods described above. However, in the event that communication from the network controllers 16 is not received by a field computer unit or communication is not received by one of the controllers 92–96 from its neighboring controllers, these components will nevertheless proceed to perform their tasks after a suitable period of time. Thus, for example, the previously supplied Fail-Last and Fail-Safe instructions may be implemented according to the output arbitration methods discussed above.

Additionally, the action timeline should also permitted the non-intrusive testing of digital and analog outputs to be performed periodically as set forth above. The timeline may also be constructed to permit further testing of system components. For example, it may be advantageous to test the RAM memory U42 in each of the controllers 92–96 within an available time slot. This test may be accomplished by first writing a specific value (e.g., 55 hex) into each storage location of an unused section of the RAM memory, and then reading each location to verify the integrity of this section of memory. Then, a portion of the input or output data table may be moved to this verified section of RAM memory, and the memory section from which this data was taken could be verified in the same manner. However, it is preferred that a different value is written into this used section of memory (e.g., AAhex). The data could then be replaced once it was determined that there were no memory errors. In this way, the entire RAM memory U42 may be periodically tested. If a memory error was found, then this memory section could be tested again and/or a general "problem" status bit could be set to inform the process control computer 14 of the presence of a error. As with the other errors discussed above, the process control computer may request the status of a specific error bit which would identify an error in the RAM memory U42.

Referring generally to FIGS. 24A–27M, a set of flow charts are shown to illustrate the methods of downloading updated software according to the present invention. In this regard, the present invention advantageously provides the ability to download updated software throughout the process control interface system 10 without having to interrupt the physical process being controlled. More specifically, the present invention permits updated or new software to be selectively transmitted from one of the network controllers 16 to each of the breakout circuits 26 in the interface system 10, and to each of the field computer 25 units 12 in the interface system.

Thus, the software contained in each of the major components of the distributed process control interface system 10 according to the present invention may be individually updated or collectively updated in groups. In other words, it may be beneficial to update the software for each of the field computer units 12 at one time and update the software for each of the breakout circuits 26 at another time. Conversely, it may be appropriate to update the software throughout the interface system 10, starting with the breakout circuits 26 and ending with the field computer units 12.

Importantly, each of these updating operations may be carried out while process control operations are continuing. For example, while one of the process control computers 14*a*–14*b* is being used for process control, the other process control computer may switch over to perform one or more downloading operations. Another advantage of the method and system according to the present invention is the ability to download updated software into a plurality of breakout circuits 26 or field computer units 12 during the same downloading operation. Thus, for example, when a successful downloading procedure has been verified for each of the field computer units, then the redundant controller 92–96 in each of the field computer units 12 which received the new software may startup using this software in the same process control cycle.

In one form of the present invention, it is preferred that a successful download operation be verified for all interface system components to which the new software was addressed before any of these system components is permitted to startup on the new software. In other words, if the Left controllers 92 in all of the field computer units 12 verified a completely accurate reception of the new software, then they will all be permitted to startup on the new software. Otherwise, they will all be commanded to start back up using the old software which was previously contained in these controllers 92. At this point, the downloading procedure may be tried again, or the hardware for the controller(s) that were unable to verify the correctness of the new software could be checked.

Once the updated software has been verified for all of the Left controllers 92, then these controllers may be commanded to transmit a copy of this software to the Middle controllers 94 in each of the field computer units 12. In this regard, it should be appreciated that the serial communication links between the controllers 92–96 in the field computer units 12 enable one of the controllers 92–96 to transfer a copy of updated software into one or both of the other controllers. Alternatively, it should be appreciated that once the Left and Middle controllers 92–94 are operating with updated software, then the Right controller 96 could receive a copy of this updated software from its process control computer (e.g., process control computer 14*b*). In other words, the process control computer 14*a* could return to its process control operations, and the process control computer 14*b* switched over to a downloading operation.

Of course, both of the process control computers 14*a*–14*b* could be shut down from a process control standpoint, so that both the Left controller 92 and the Right controller 96 in each of the field computer units could receive the identical updated software. However, this could require an interruption in the physical process being controlled. In any event, it should be appreciated that the only downloading function that could be implemented with both of the process control computers 14*a*–14*b* running process control operations, is the transfer of updated software from either the Left controller 92 or the Right controller 96 to the Middle controller 94, as the process control computers 14*a*–14*b* do not need to be involved in this procedure in accordance with the present invention.

Figure 24A:
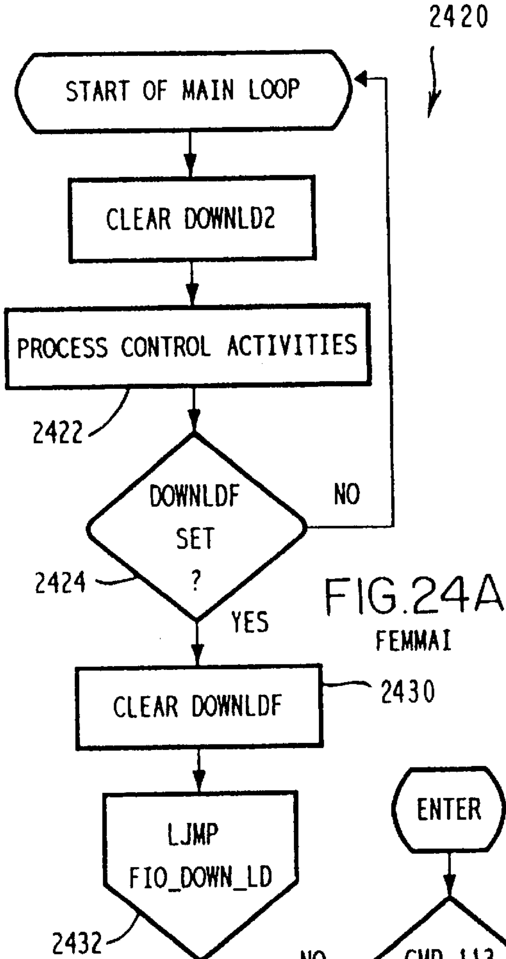

Referring specifically to FIG. 24A, an abbreviated flow chart of the field computer unit main "Femmai" 2420 is shown. Flow chart 2420 indicates that each of the field computer units 12 will generally be conducting the process control activities discussed above (block 2422), unless a "DOWNLDF" bit has been set in response to a download command (diamond 2424). The setting of the DOWNLDF bit is actually accomplished in the serial port interrupt routine 2426 shown in FIG. 24B. In this particular application, the field download command is simply identified as command "113" (diamond 2428). Prior to the clearing of the DOWNLDF bit (block 2430), the value of this bit will be placed in a neighbor communication message in order to inform the neighboring controllers that this controller is receiving new software. This action will prevent the neighboring controllers from attempting to reset the controller receiving updated software. It should also be noted that the field communication routine "Fcomm" of FIG. 24C is used to receive download commands from the process control computer 14.

Figure 24D:
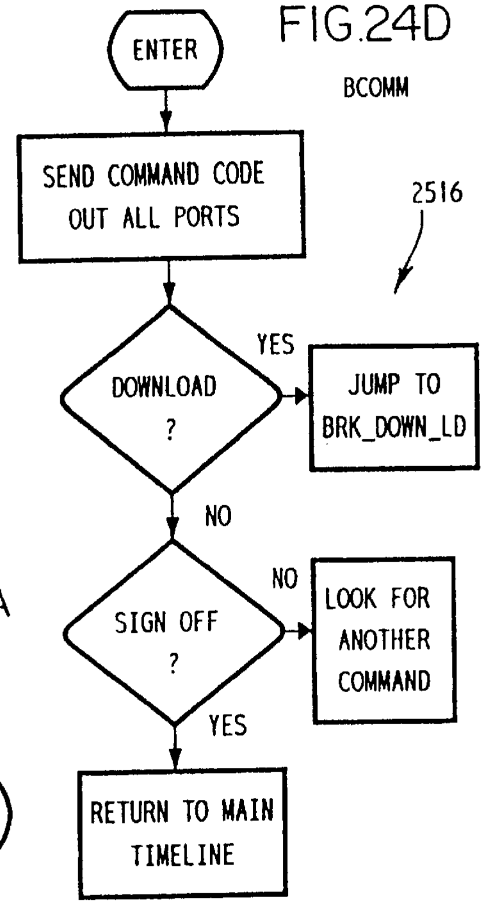
Figure 24B:
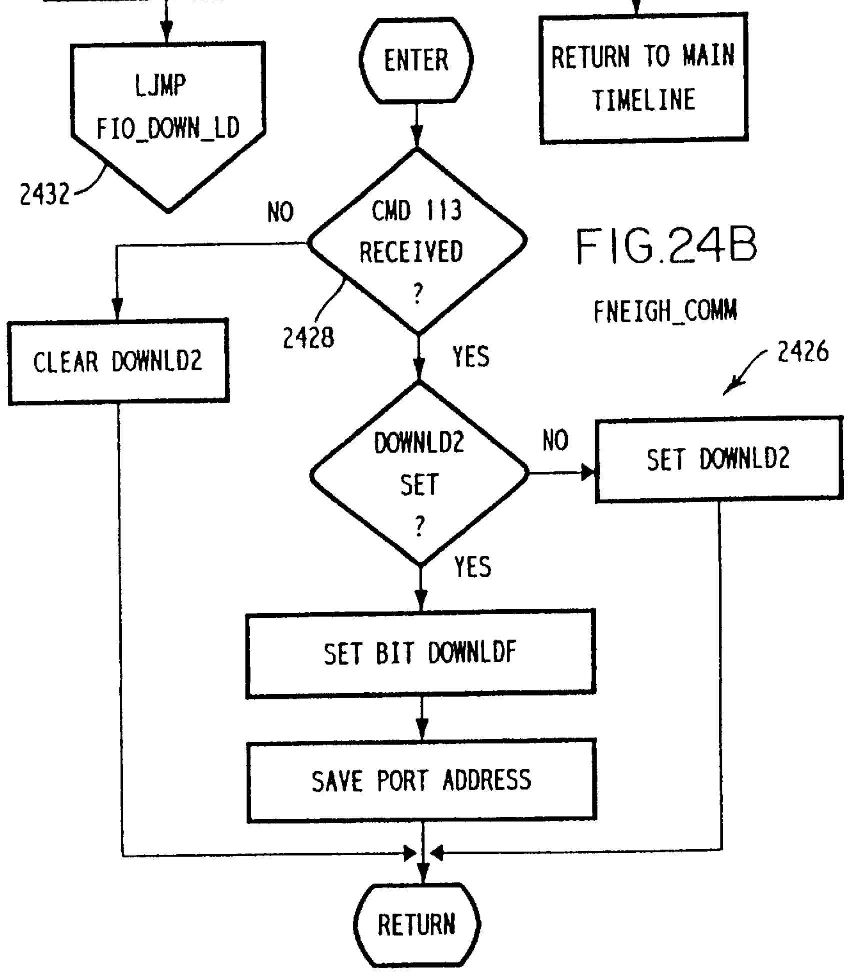
Figure 24C:
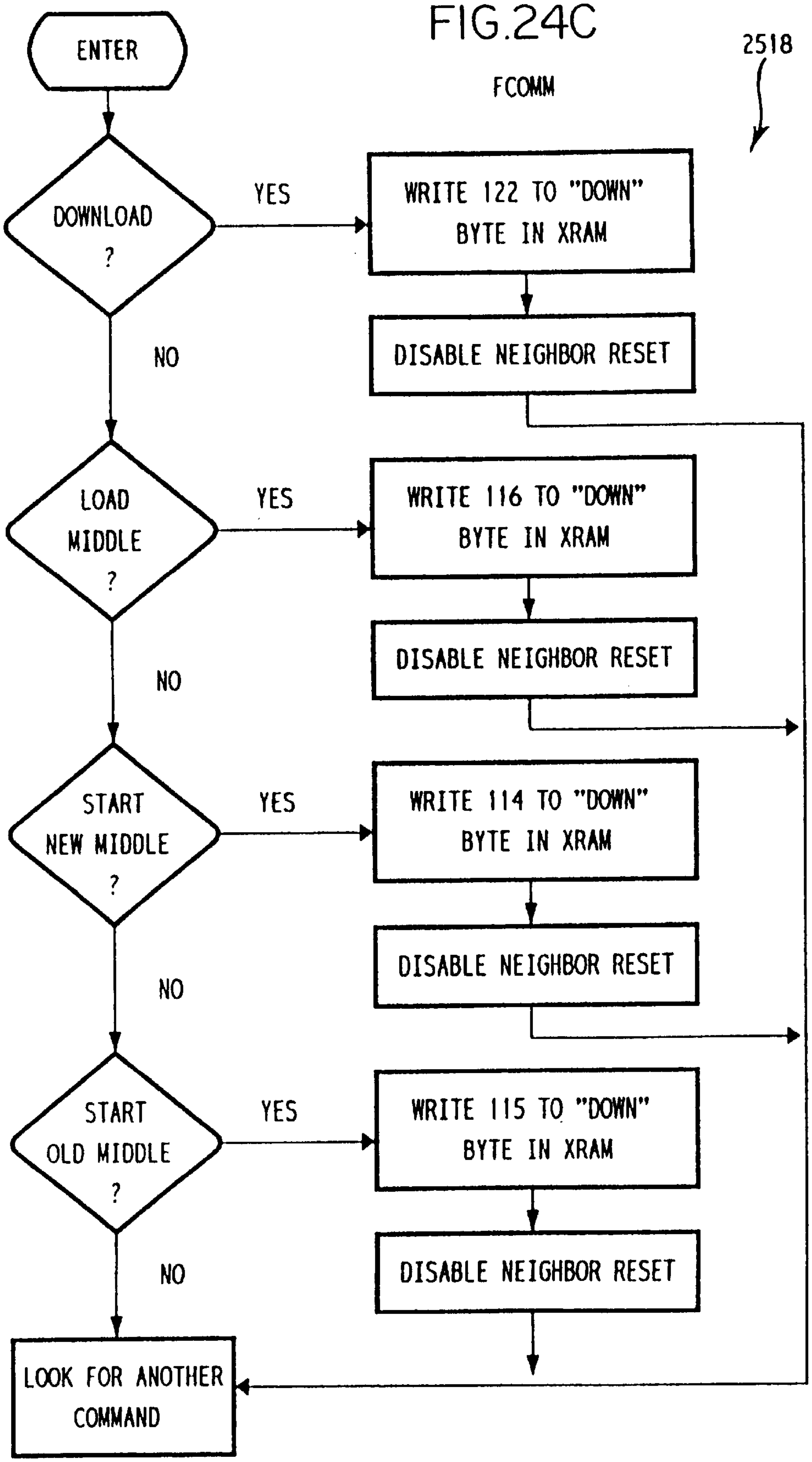
Figure 24E:
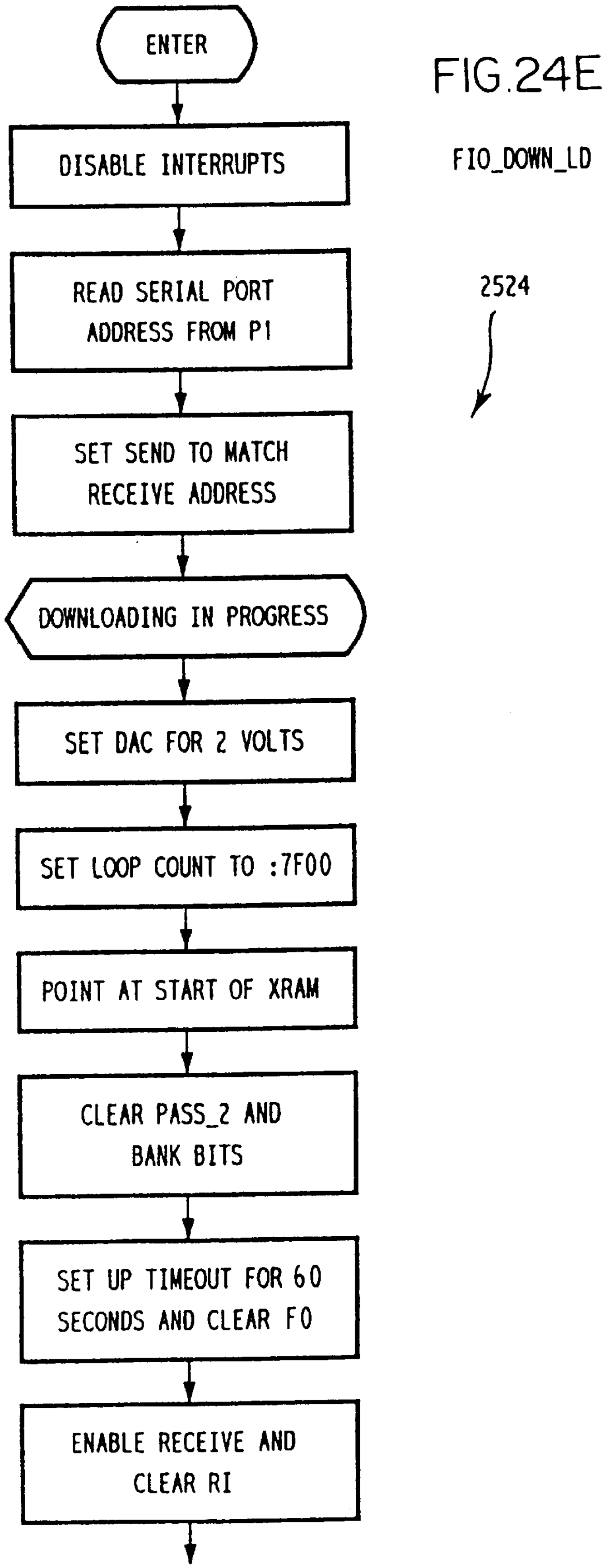
Figure 24F:
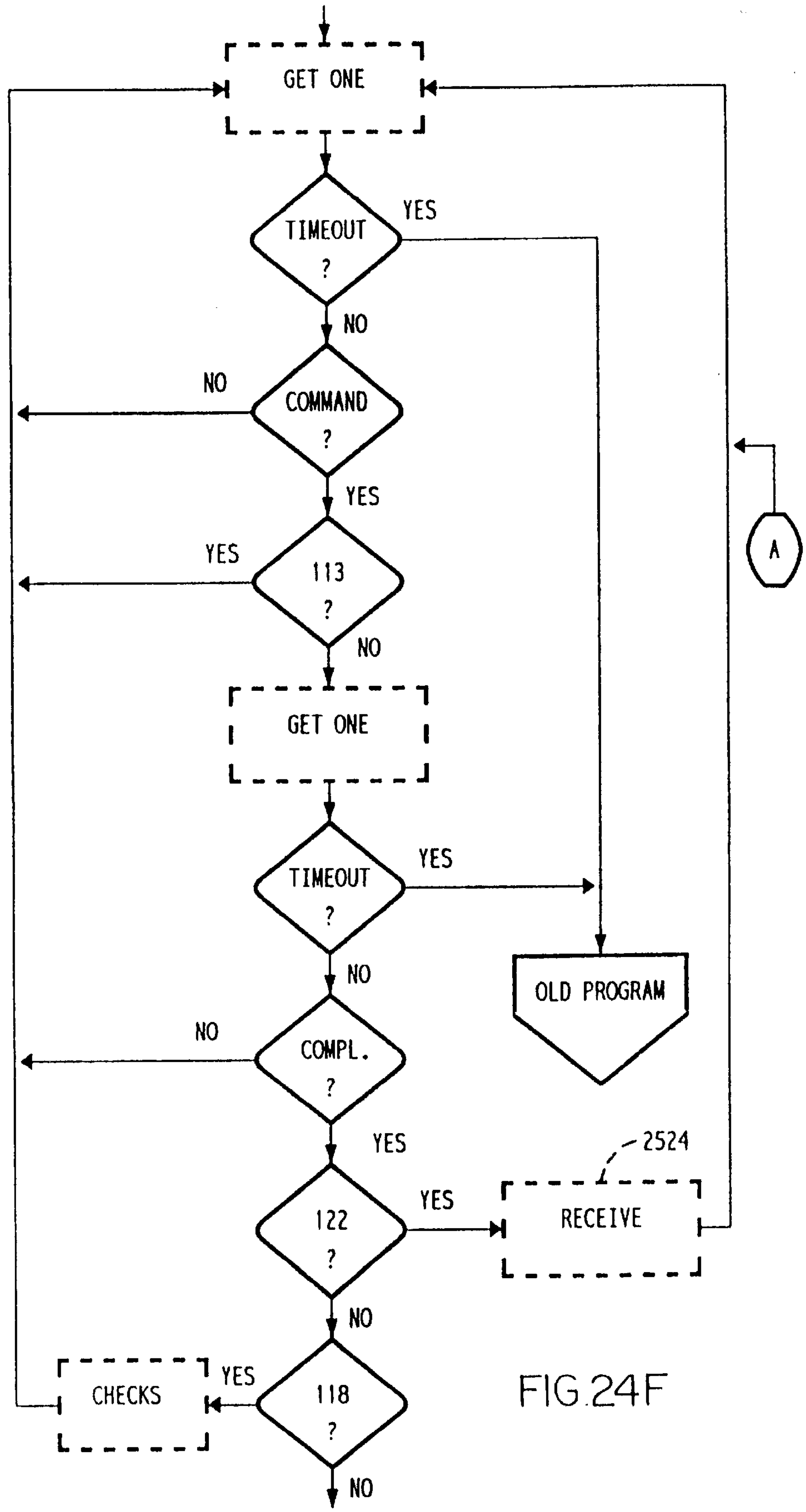
Figure 24G:
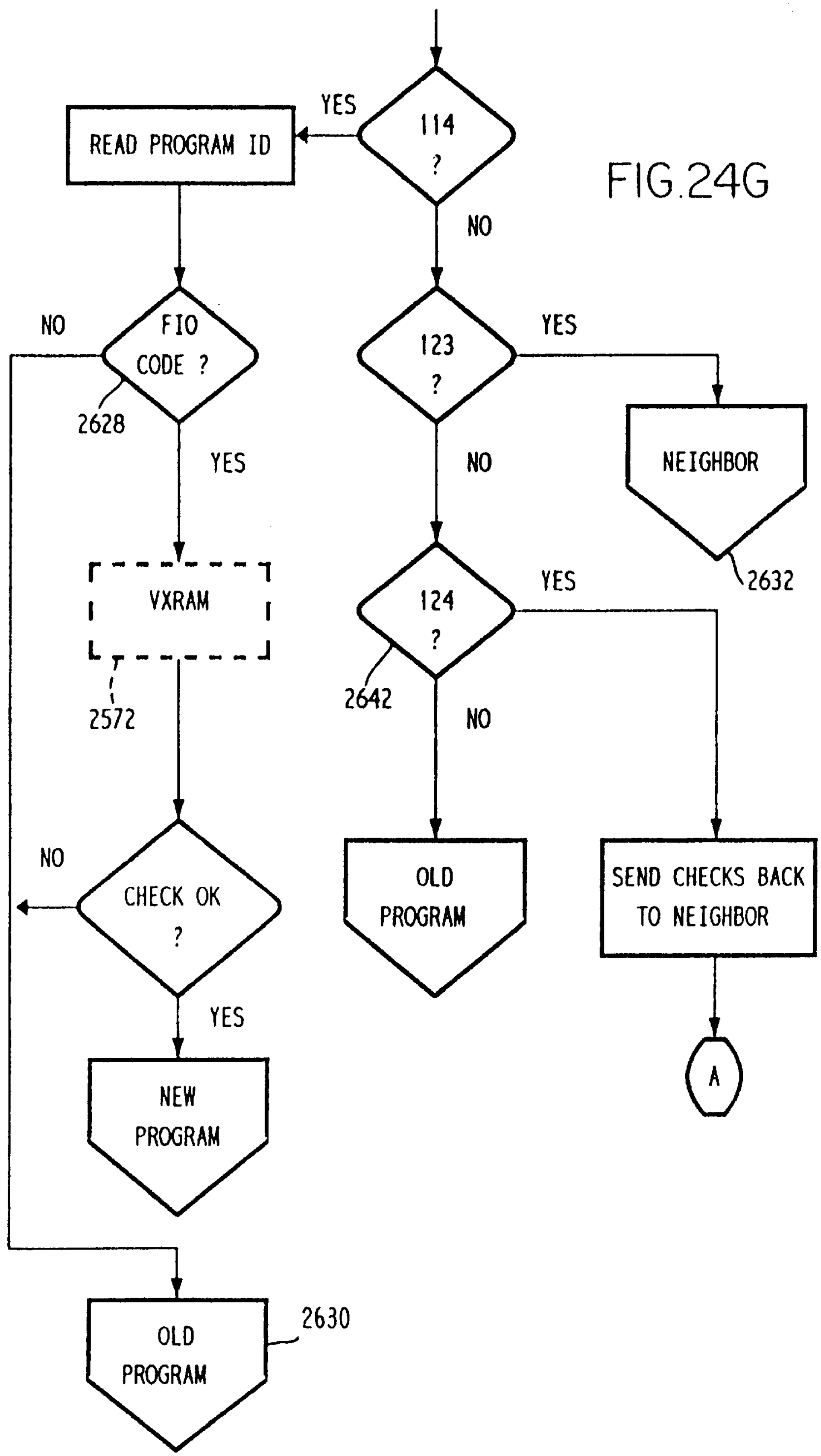

Assuming that the process control computer 14 has issued the download command, then the field computer unit 12 will jump to the "FIO_DOWN_LD" routine shown in FIGS. 24E–24G (block 2432). The FIO_Down_LD routine 2432 is sometimes referred to herein as the FIO Download routine. As will be apparent from this flow chart, the FIO_DOWN_LD routine provides a main routine for a series of subroutines, which are shown in FIGS. 26G–26P and 27I–27M. These sub-routines enable the field computer unit to receive and verify the downloaded software, assuming that this software is intended for the field computer unit. However, before discussing the these flow charts further, the transmission of downloading commands will first be examined.

Figure 25A:
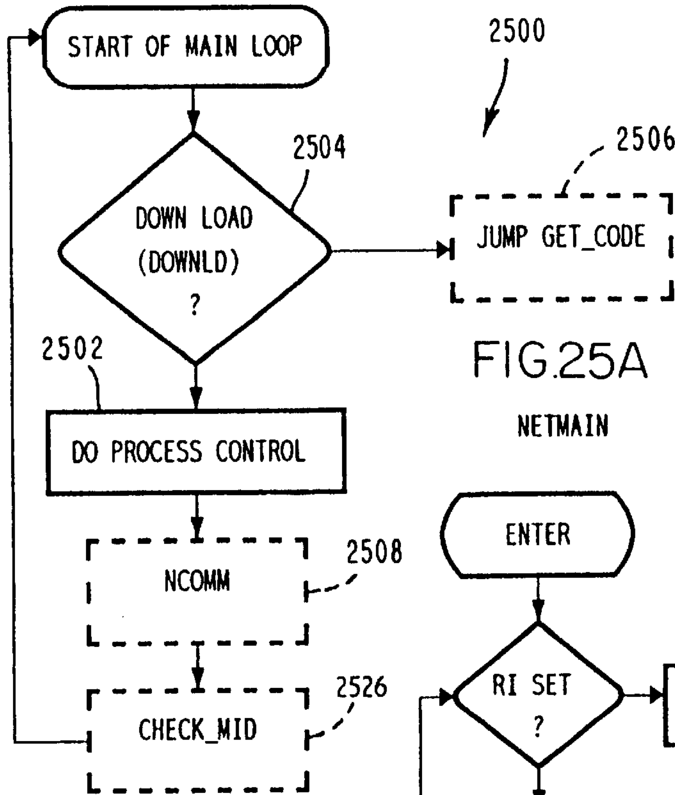

Referring to FIG. 25A, an abbreviated flow chart of the Netmain program or routine 2500 is shown. In this regard, the Netmain program 2500 represents a main program for the network controller 16. This Netmain program follows a normal process control timeline, such as indicated by the "Do Process Control" block 2502. Nevertheless, at an early point in the main loop of the Netmain program, it is determined whether a downloading operation has been requested (diamond 2504). This request is determined by checking for the presence of a "DOWNLD" bit, which is set in the flow chart shown in FIG. 25B. If the DOWNLD bit is set, then the Netmain program will jump to the GET_CODE routine 2506 shown generally in FIGS. 25C–25E. Otherwise, normal process control functions, such as transferring data received from the field computer units 12 to the process control computer 14, will be performed, assuming that the process control computer has not been taken off its process control regimen.

Thereafter, the NCOMM routine 2508 will be performed. This routine is shown through the flow chart of FIG. 25P. As indicated by this flow chart, the NCOMM routine relates to the loading of updated software into the Middle controller 94 of the field computer units 12. More specifically, the NCOMM routine will check to see if a command has been entered to load the Middle controllers 94 with updated software (diamond 2510). As will be appreciated from the description below of the CBTDEC routine of FIG. 25B, the request for a Middle download may be entered by an operator through the debug panel 18. If a Middle download request has been made, then a specific command will be sent downstream by the network controller (block 2512) to all of the field computer units 12 through a Send Command routine 2514 shown in FIG. 25Q. While it is preferred that all of the Middle controllers 94 be updated together, it should be appreciated that in the appropriate application it may be permit a selection of some but not all Middle controllers 94.

The Middle download command will be received and acted upon by the BCOMM routine 2516 of FIG. 24D, which is contained in each of the breakout circuits 26 connected to one of the process control computer 14*a*–14*b*. The BCOMM routine 2516 will pass the Middle download command to all of its output ports to eventually be acted upon by the FCOMM routine 2518 in each of the field computer units 12. The FCOMM routine is shown in FIG. 24C. The FCOMM routine 2518 writes the Middle download command into XRAM, where it is read by the SIDE_LOAD routine 2520 of FIGS. 26Q–26R. The SIDE_LOAD routine 2520 in the Left controller 92 or the Right controller 96 determines the port address of the Middle controller 94, sends the Middle download command to the Middle controller, and listens for an answer. The NEIGHBOR subroutine 2522 of FIG. 26S in the Middle controller 94 receives this command, sets its serial port to receive from the neighboring controller that sent the command, and then jumps out of its process control time line to the FIO_DOWN_LD routine 2524 of FIGS. 24E–24G to receive the new software.

Figure 26A:
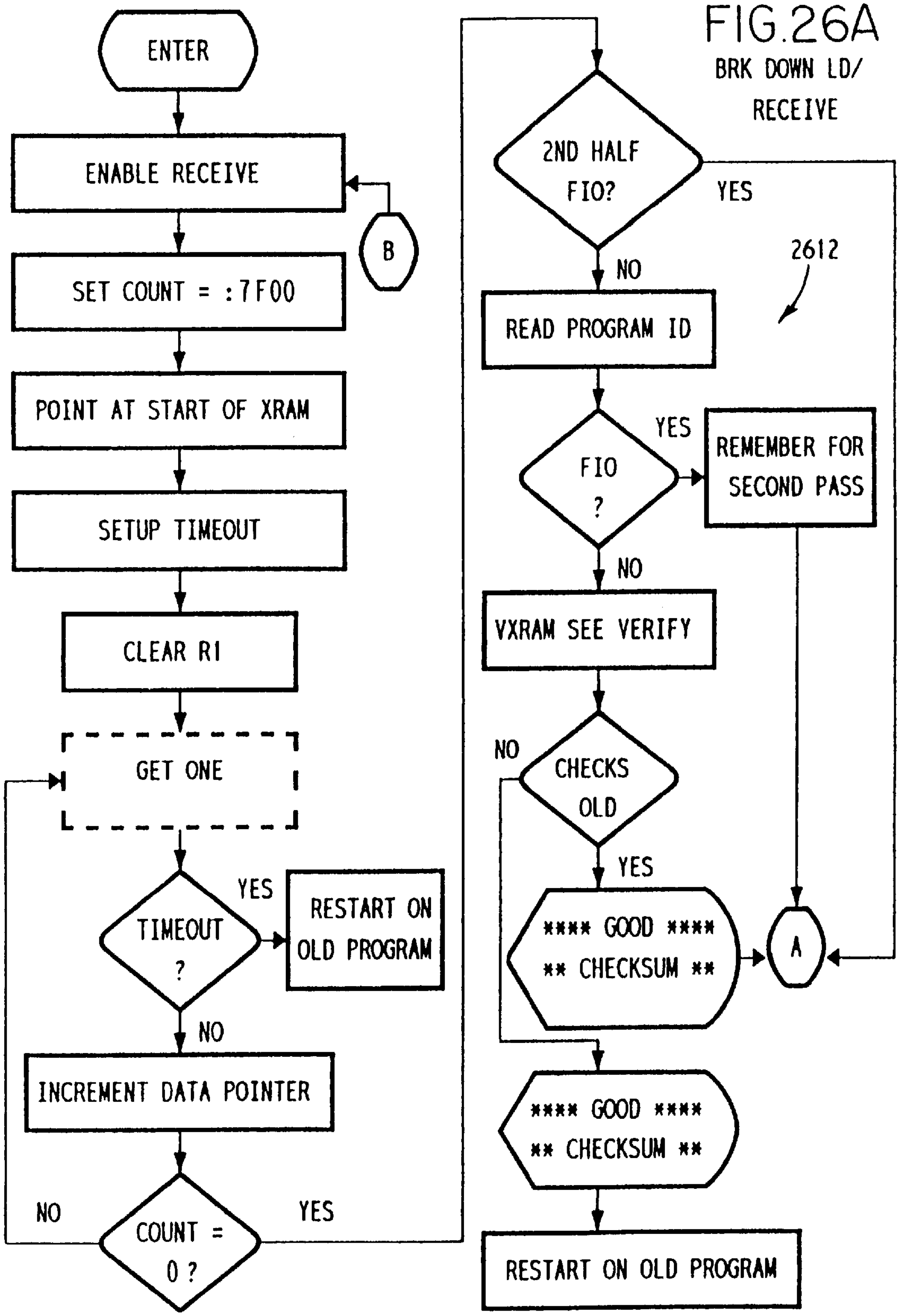
Figure 26B:
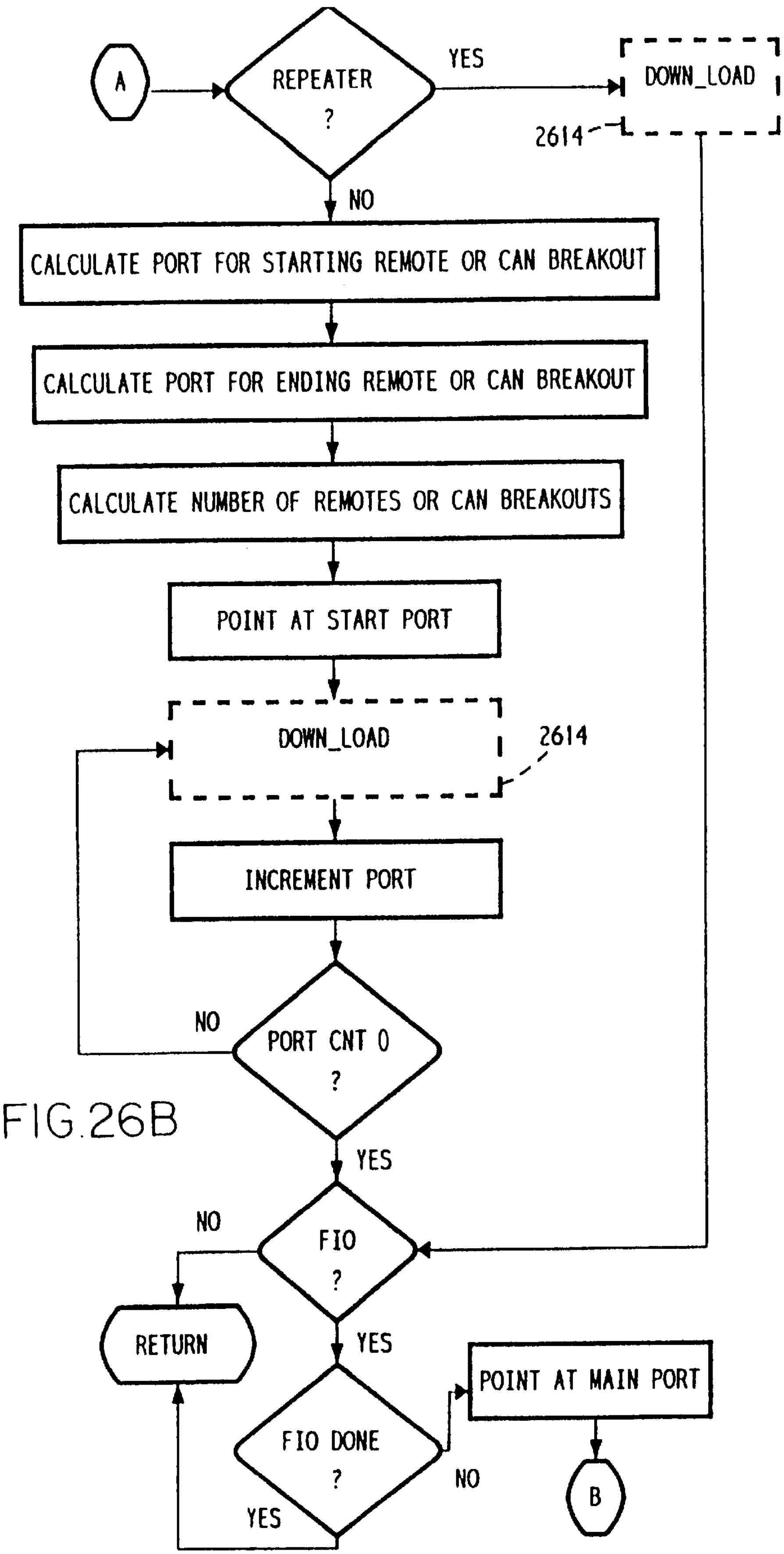
Figure 26C:
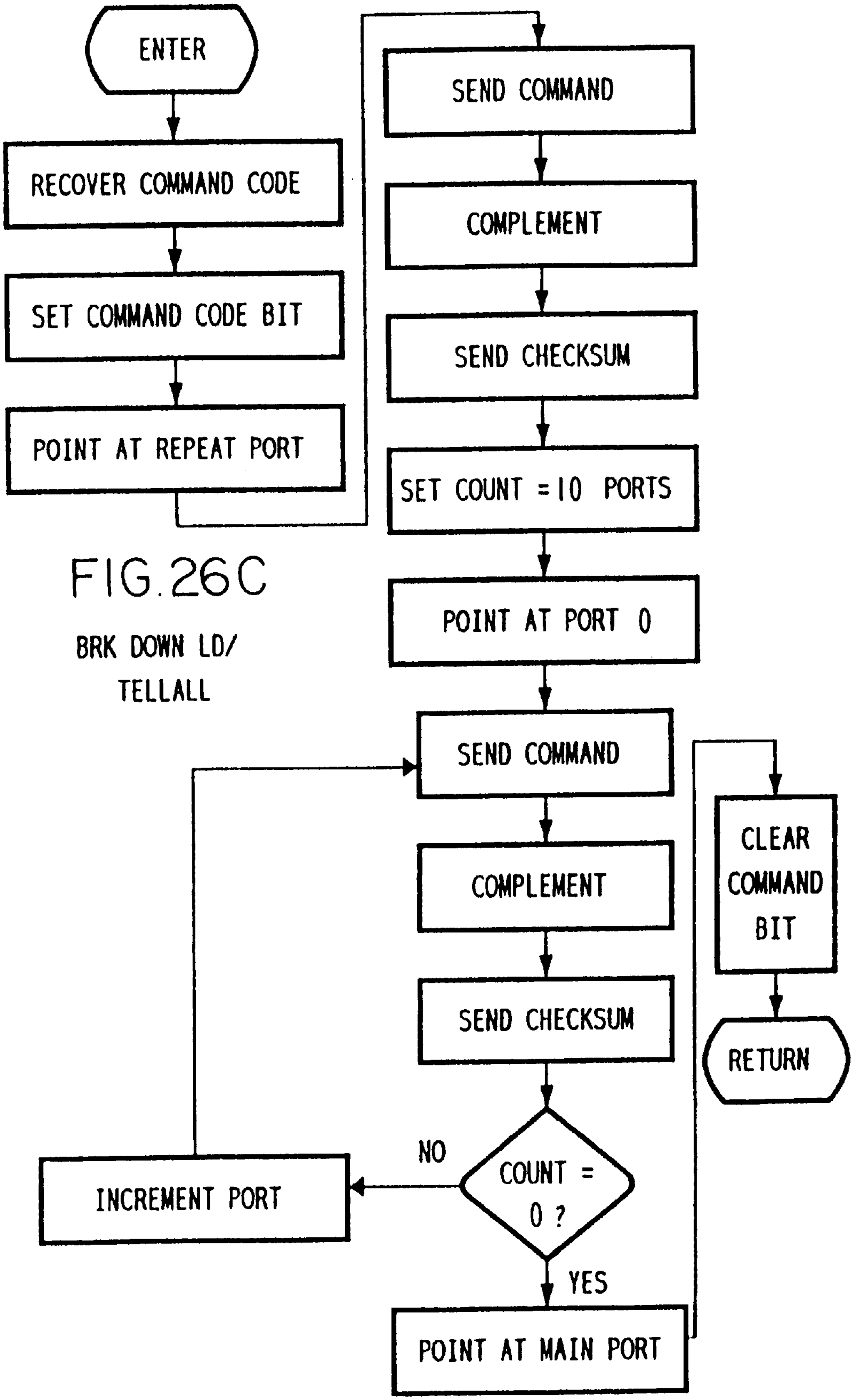
Figure 26D:
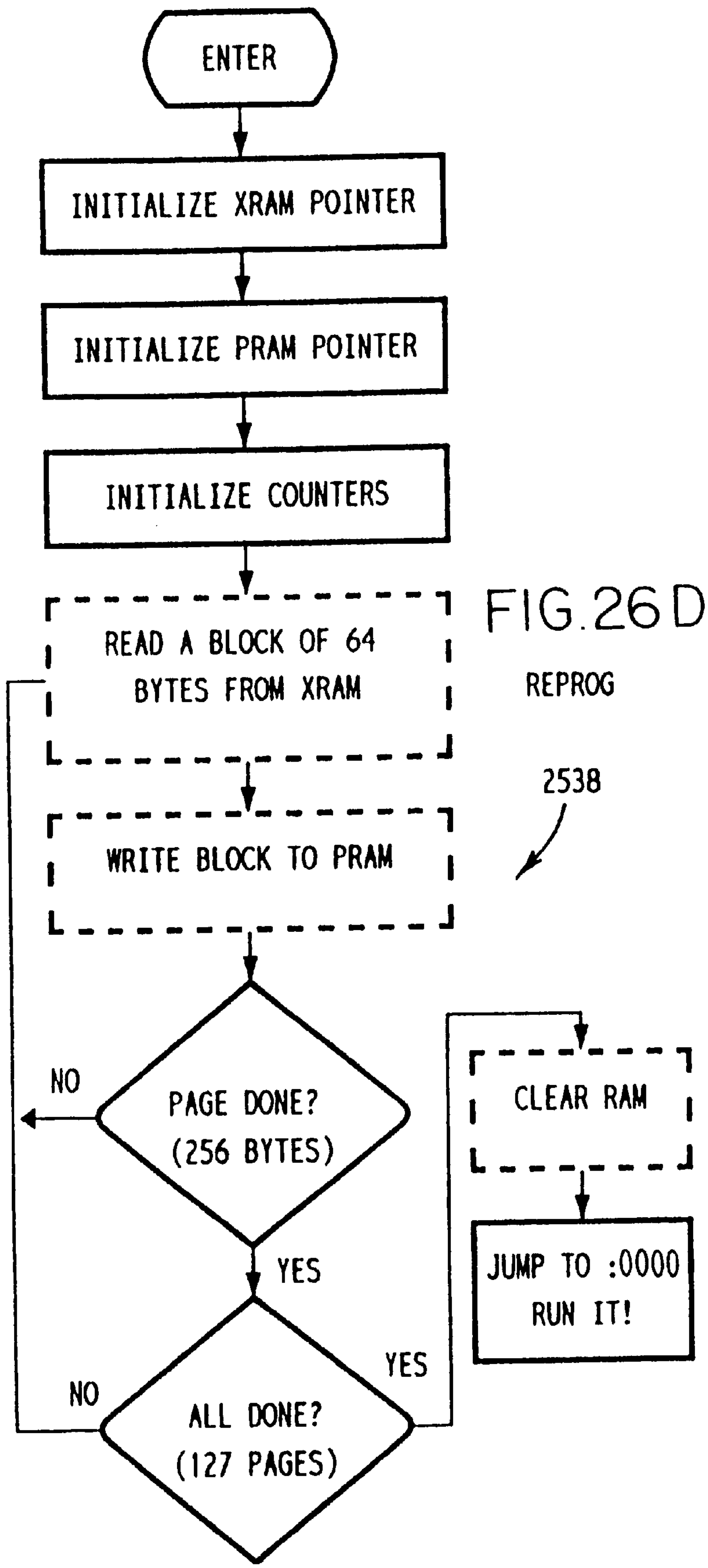
Figure 26E:
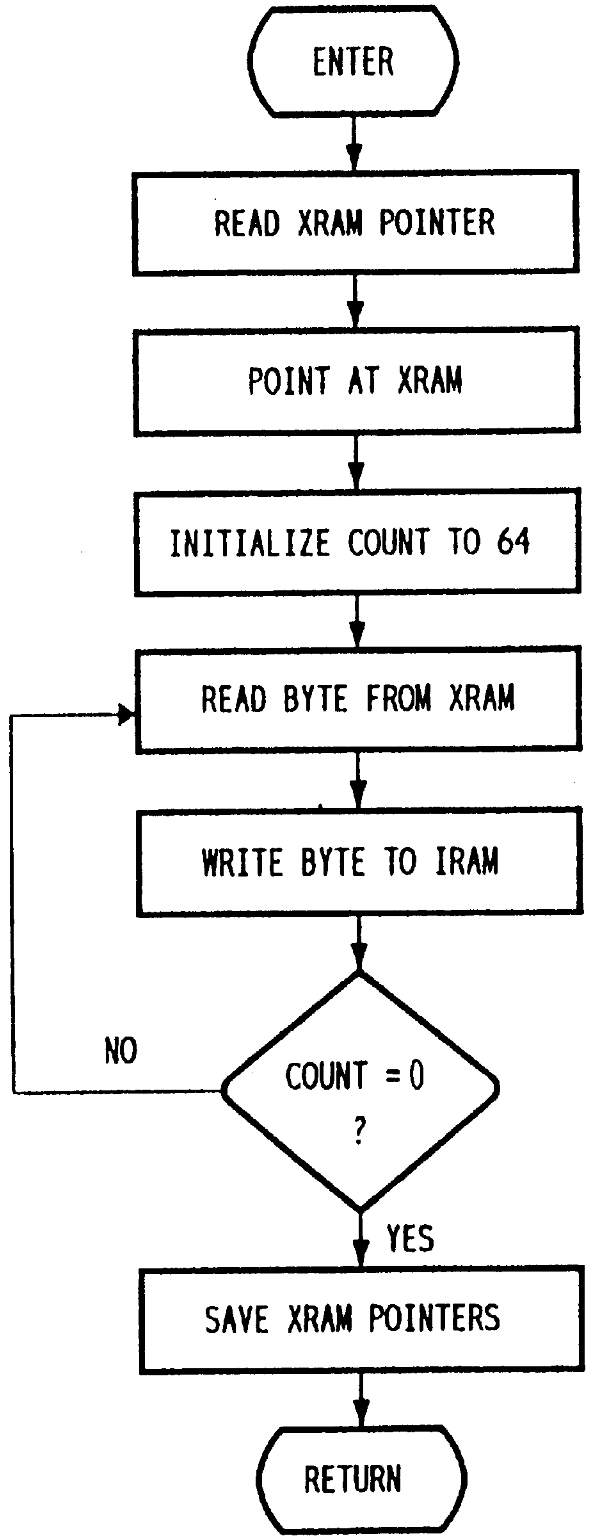
Figure 26F:
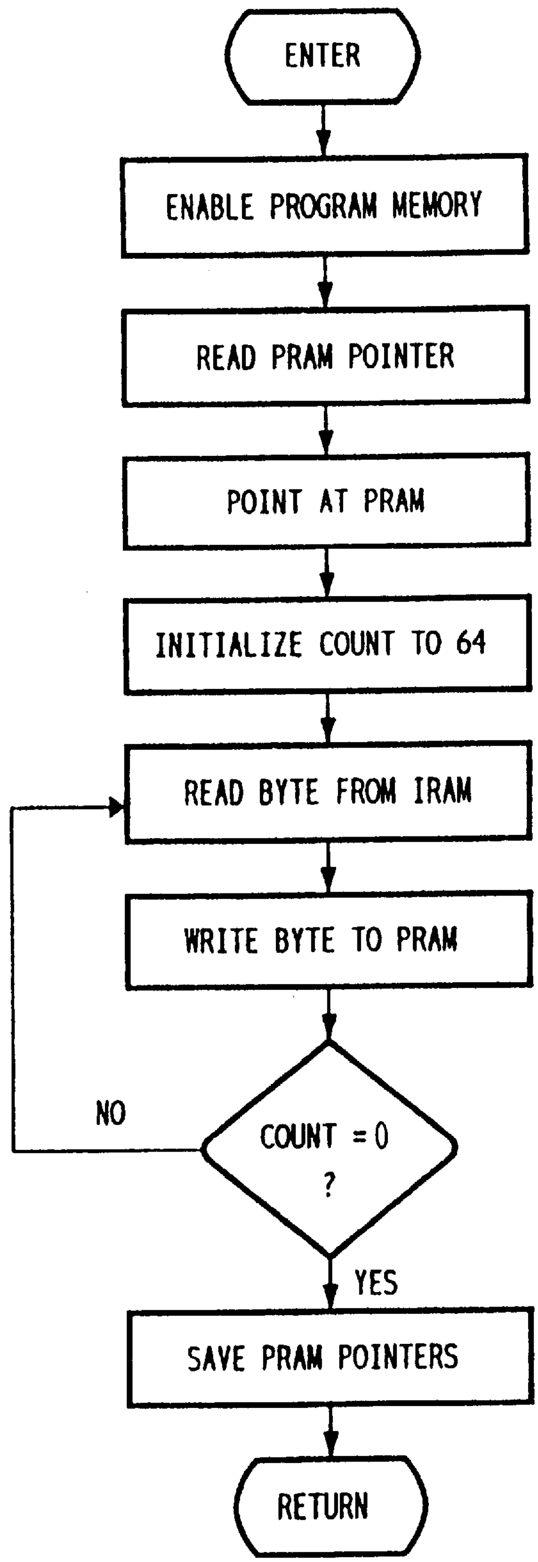
Figure 26G:
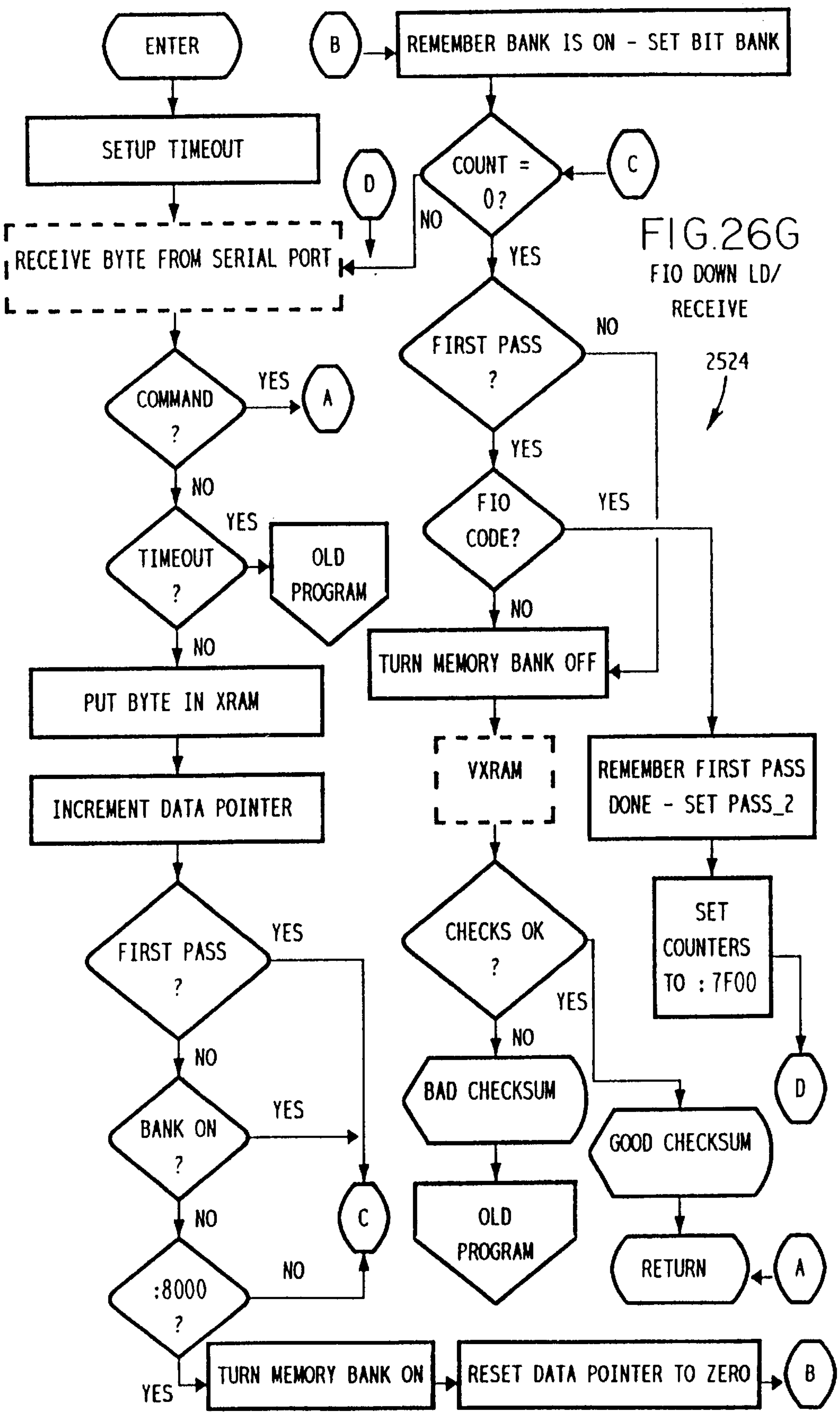
Figure 26H:
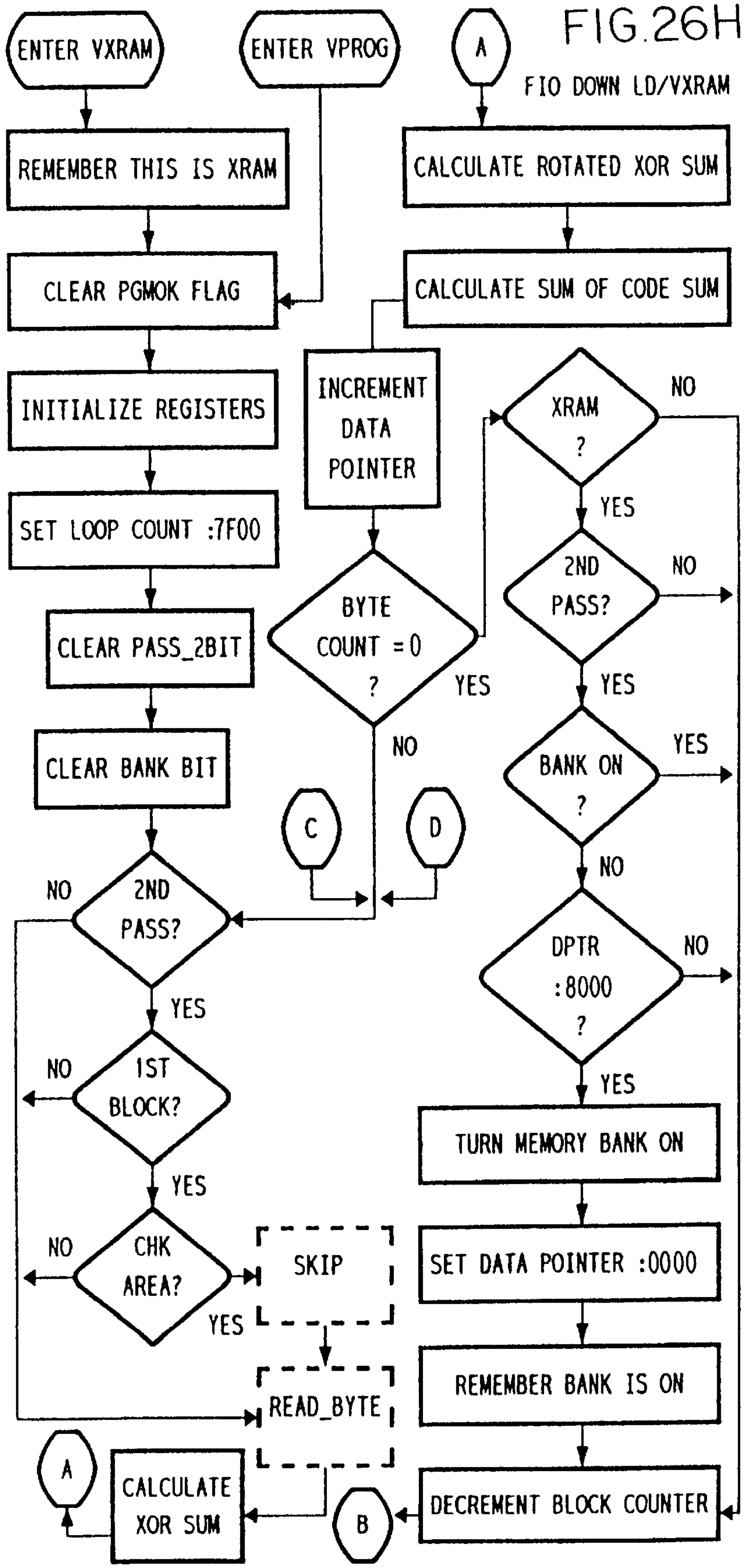
Figure 26I:
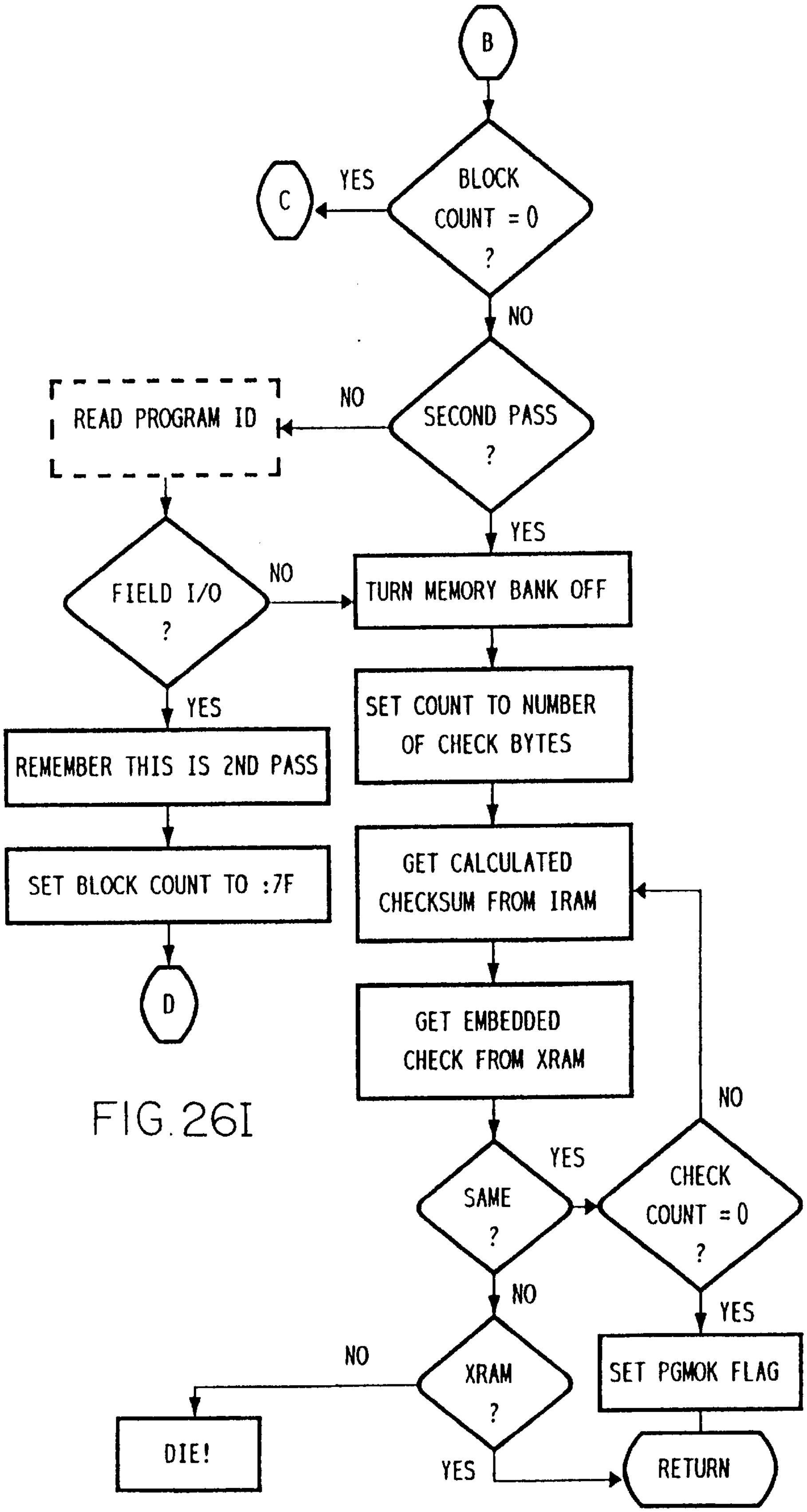
Figure 26J:
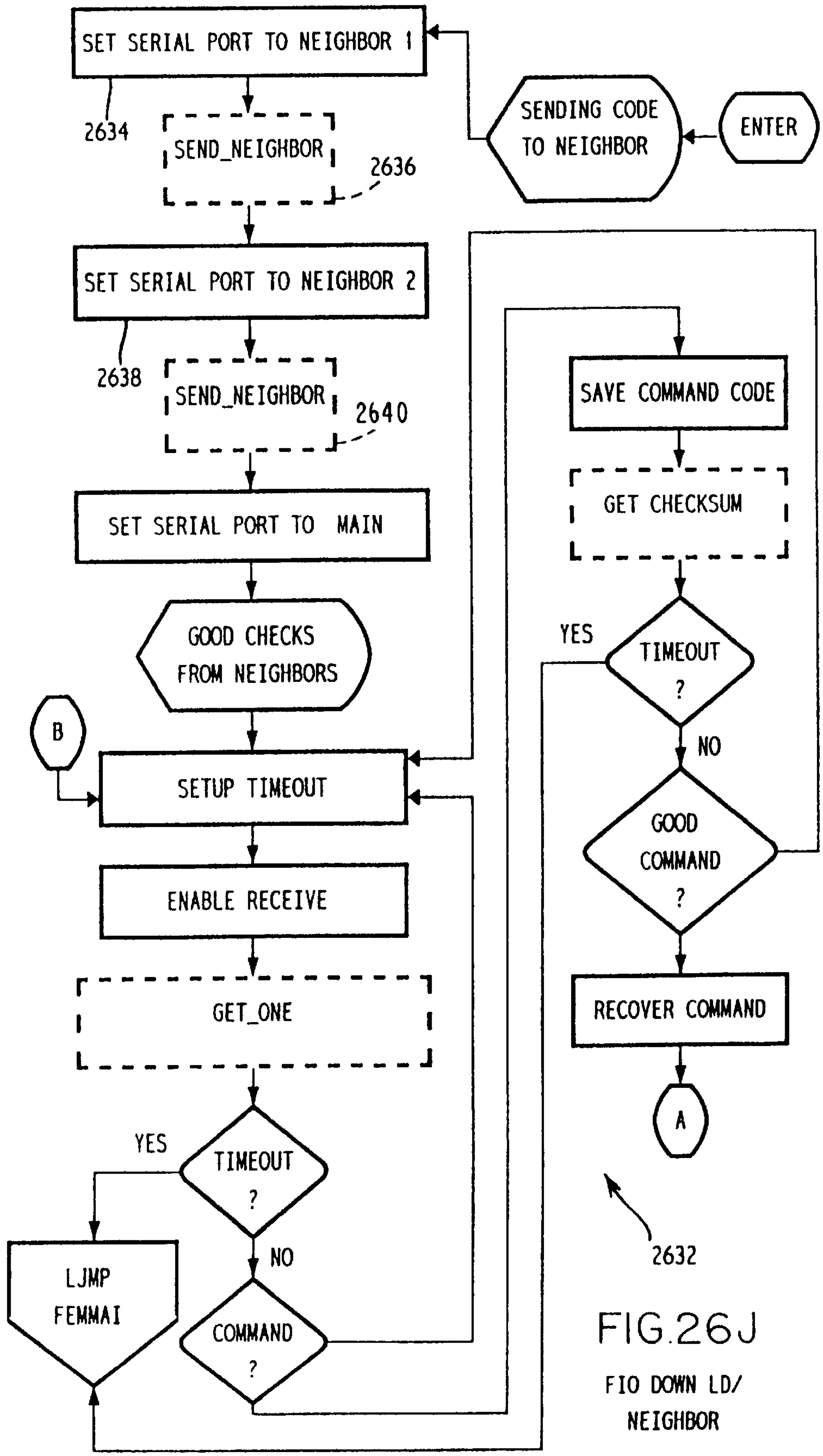
Figure 26K:
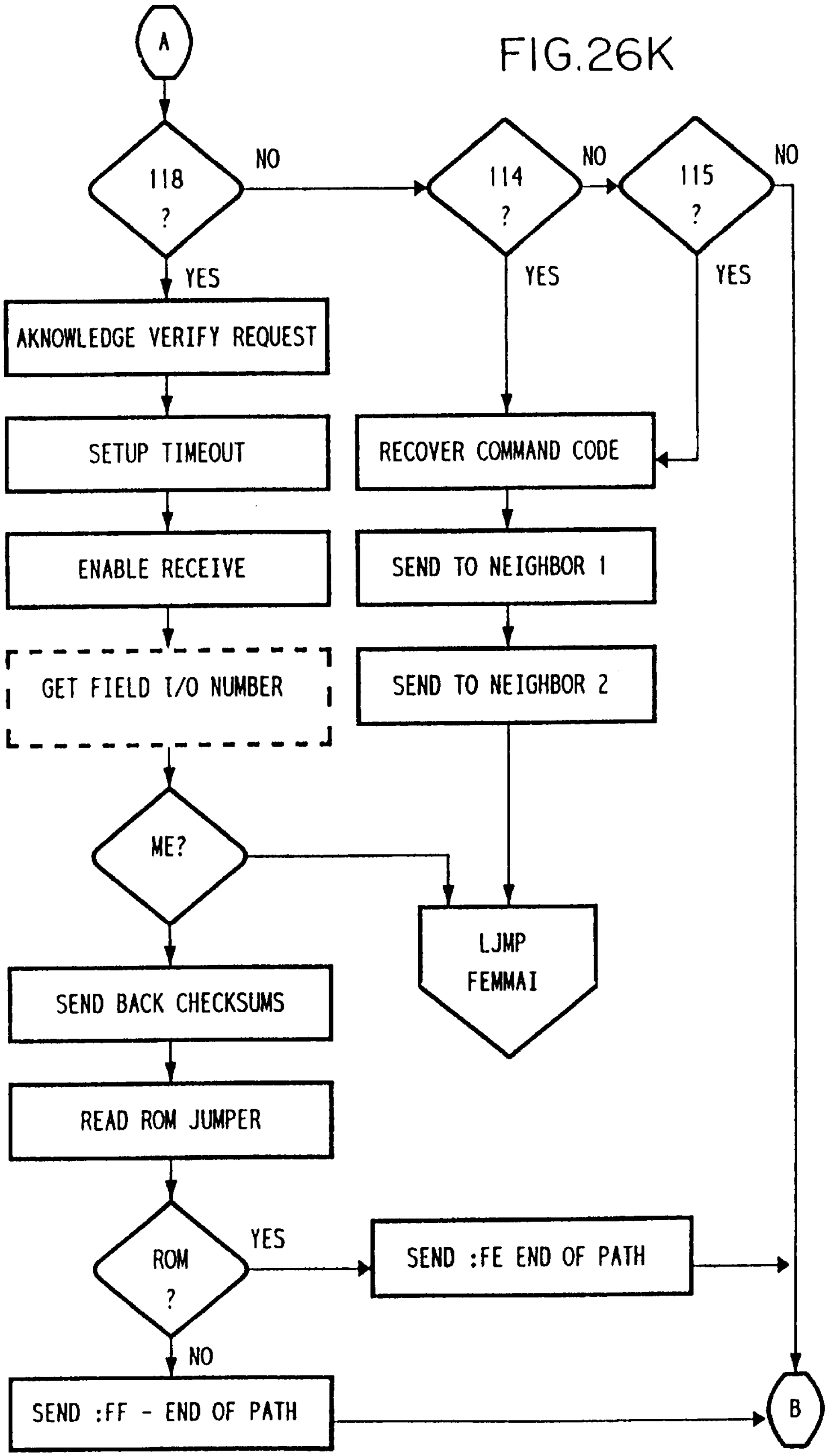
Figure 26L:
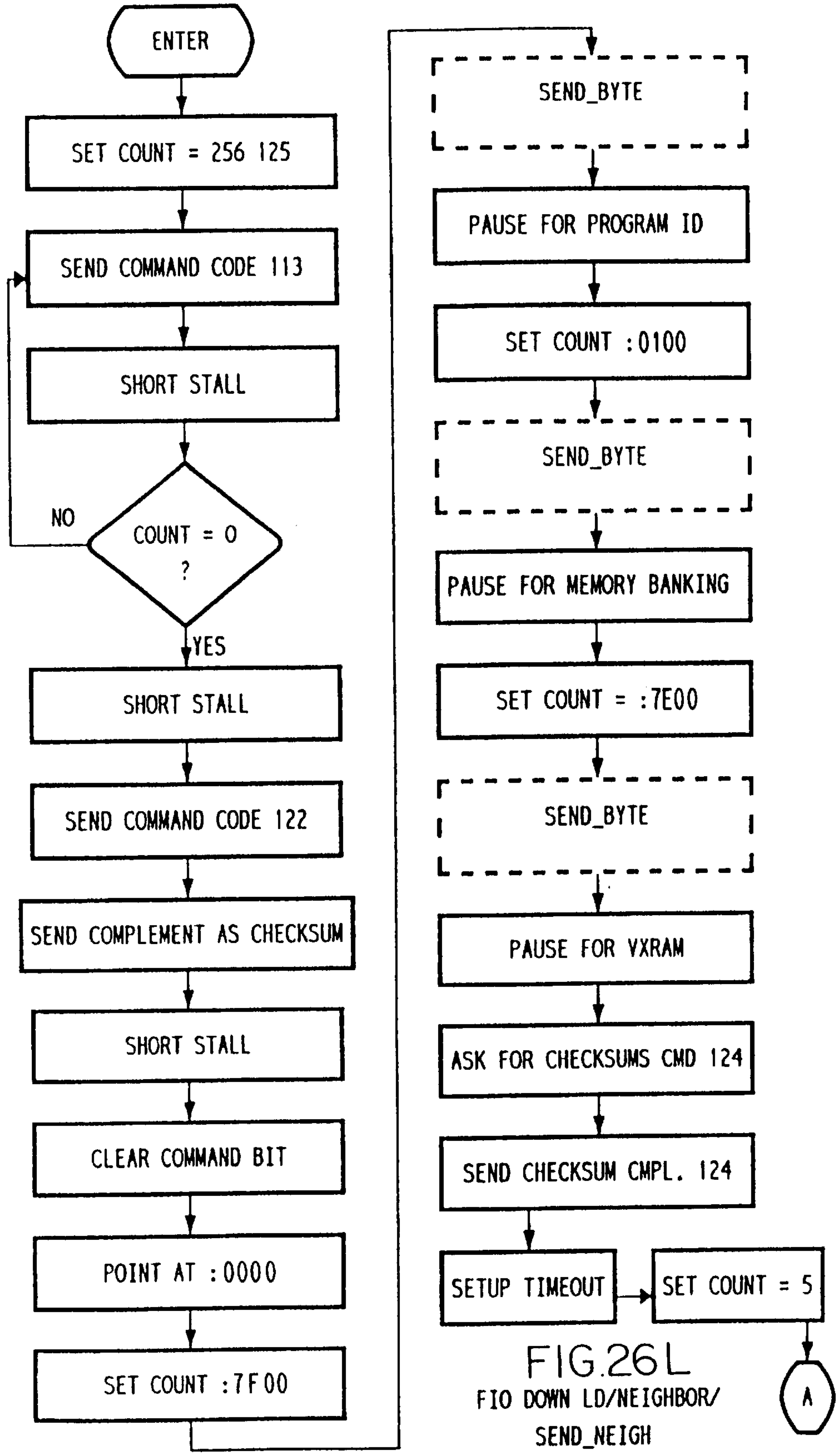
Figure 26M:
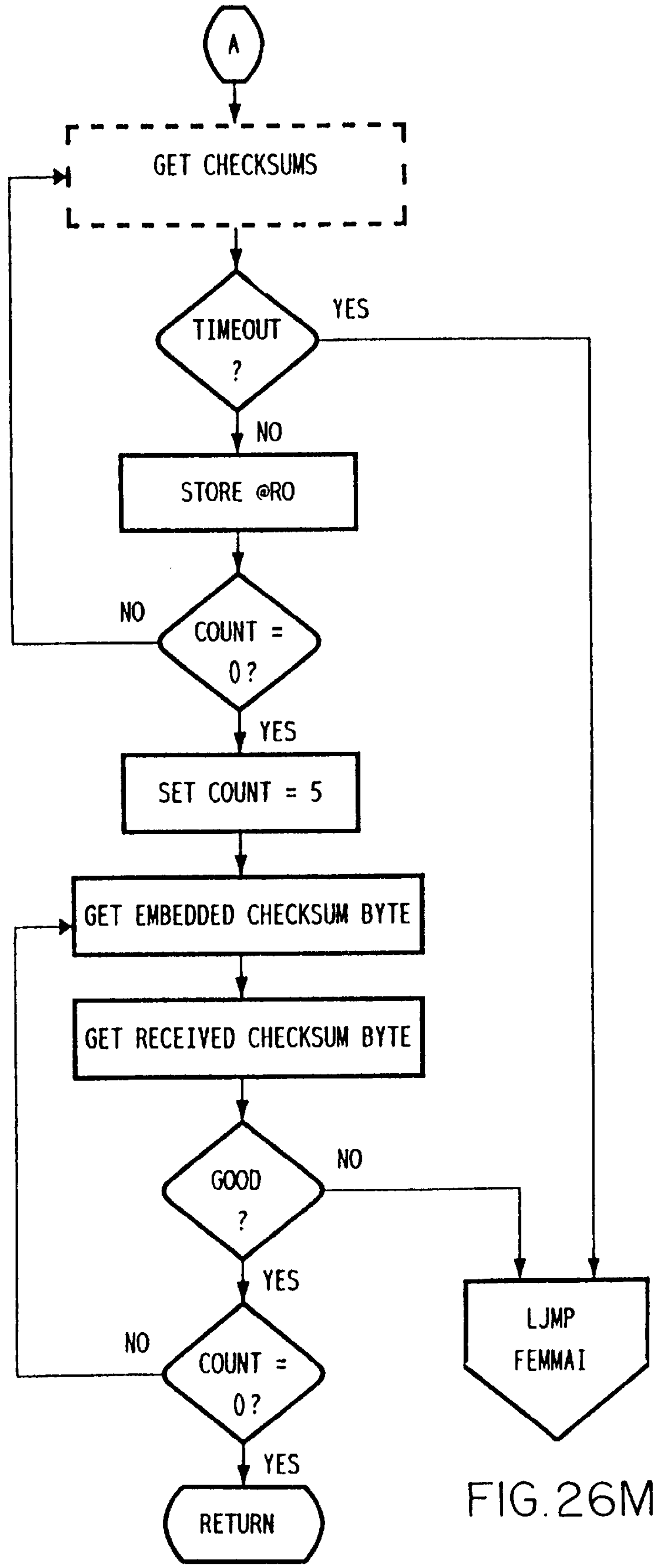
Figure 26N:
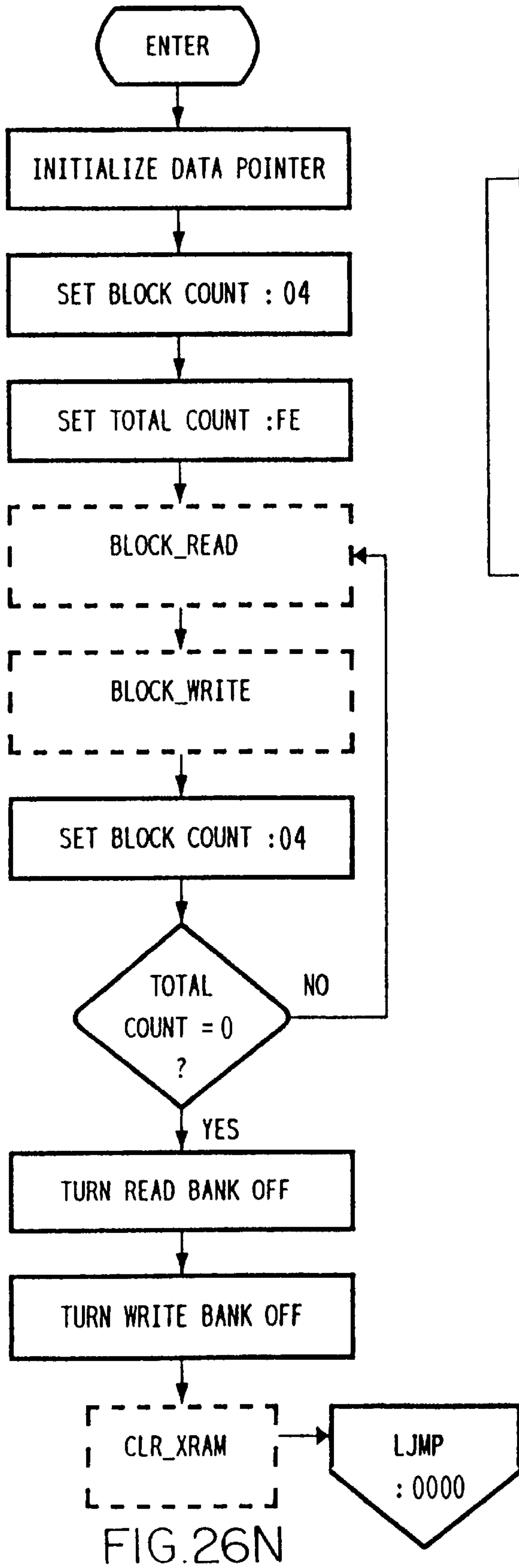
Figure 27L:
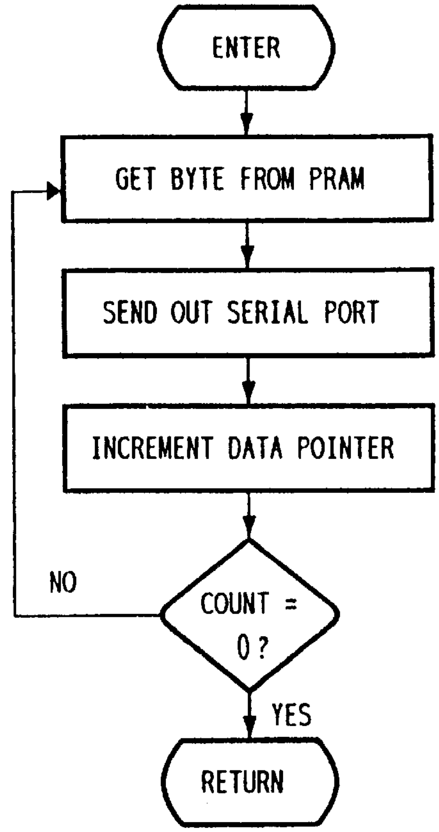
Figure 27M:
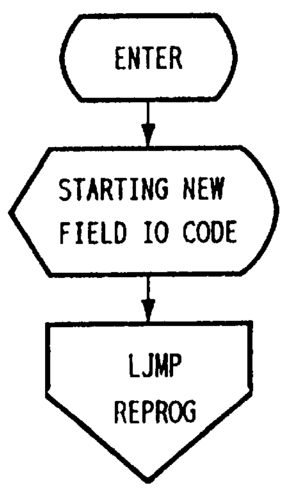
Figure 26O:
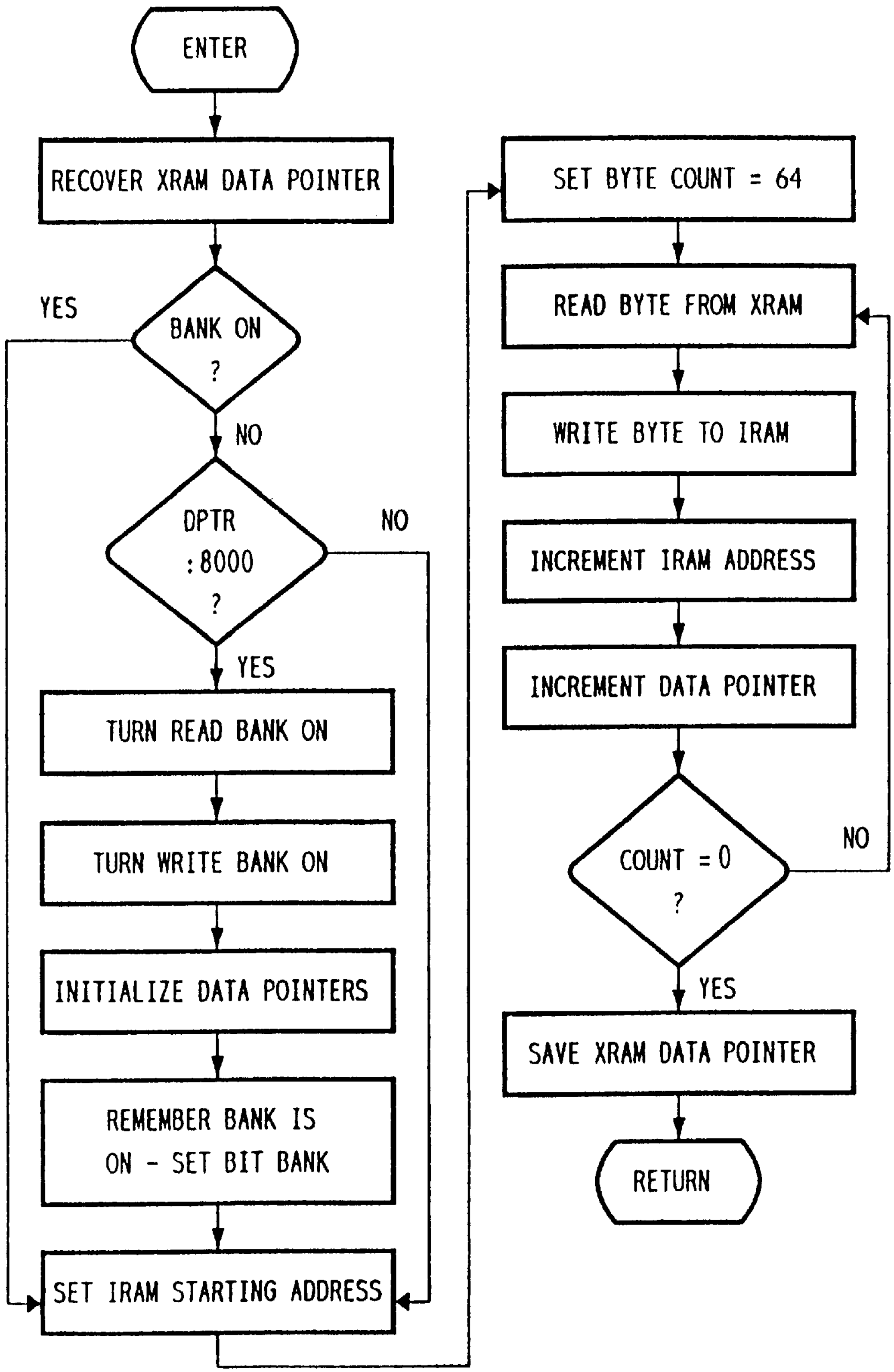
Figure 26P:
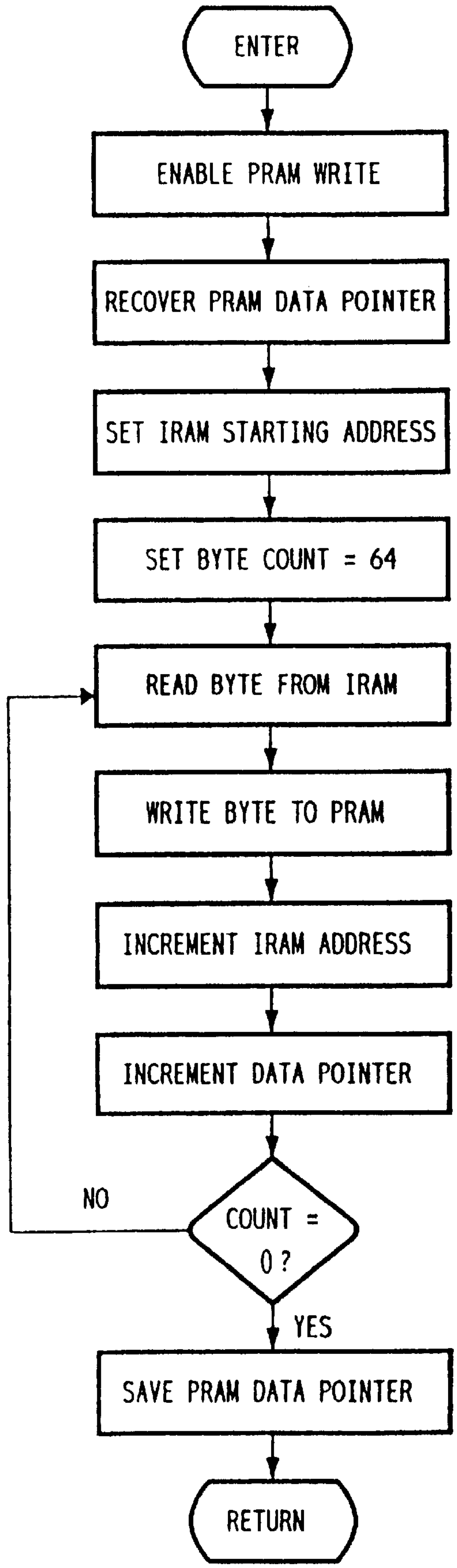
Figure 26Q:
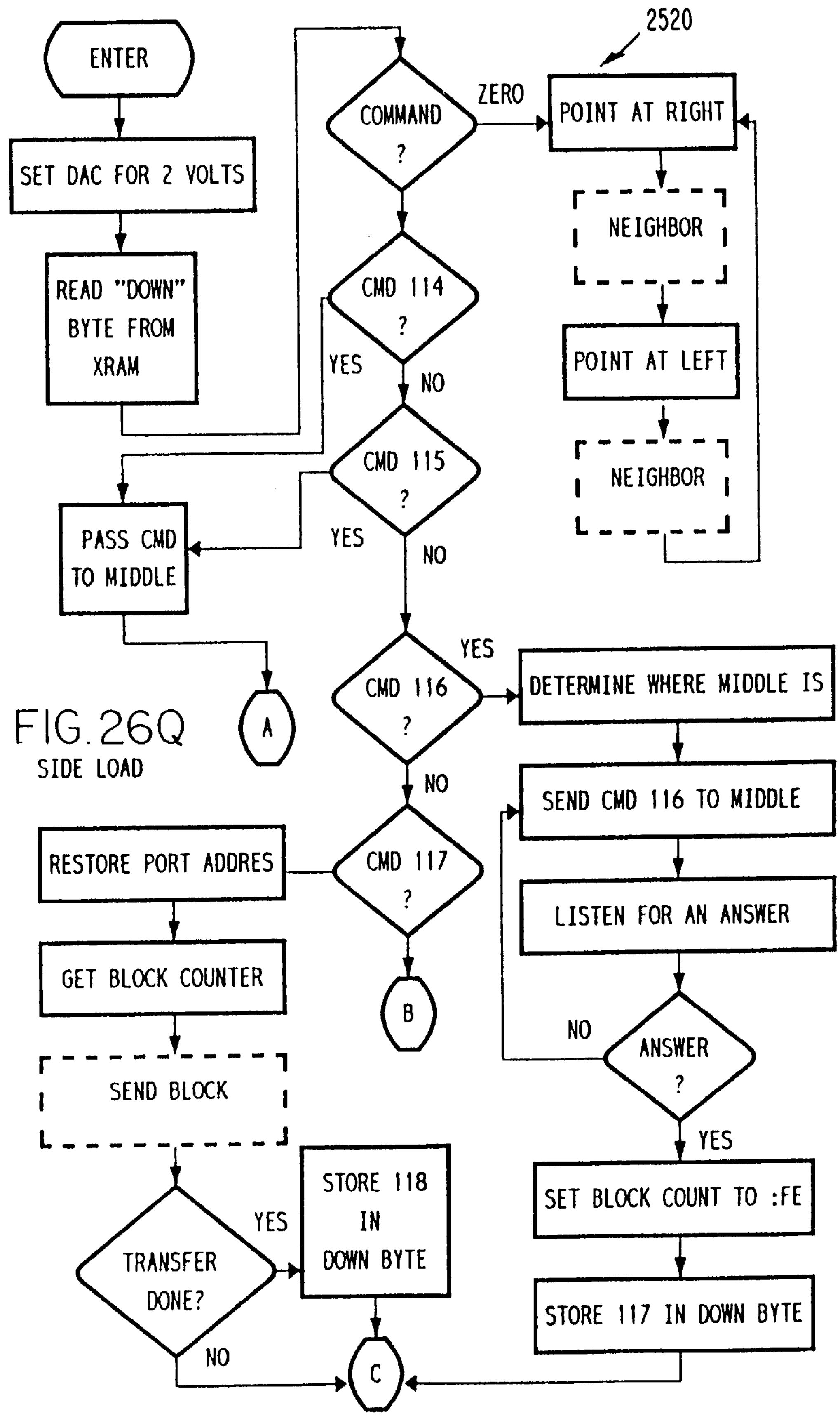
Figure 26R:
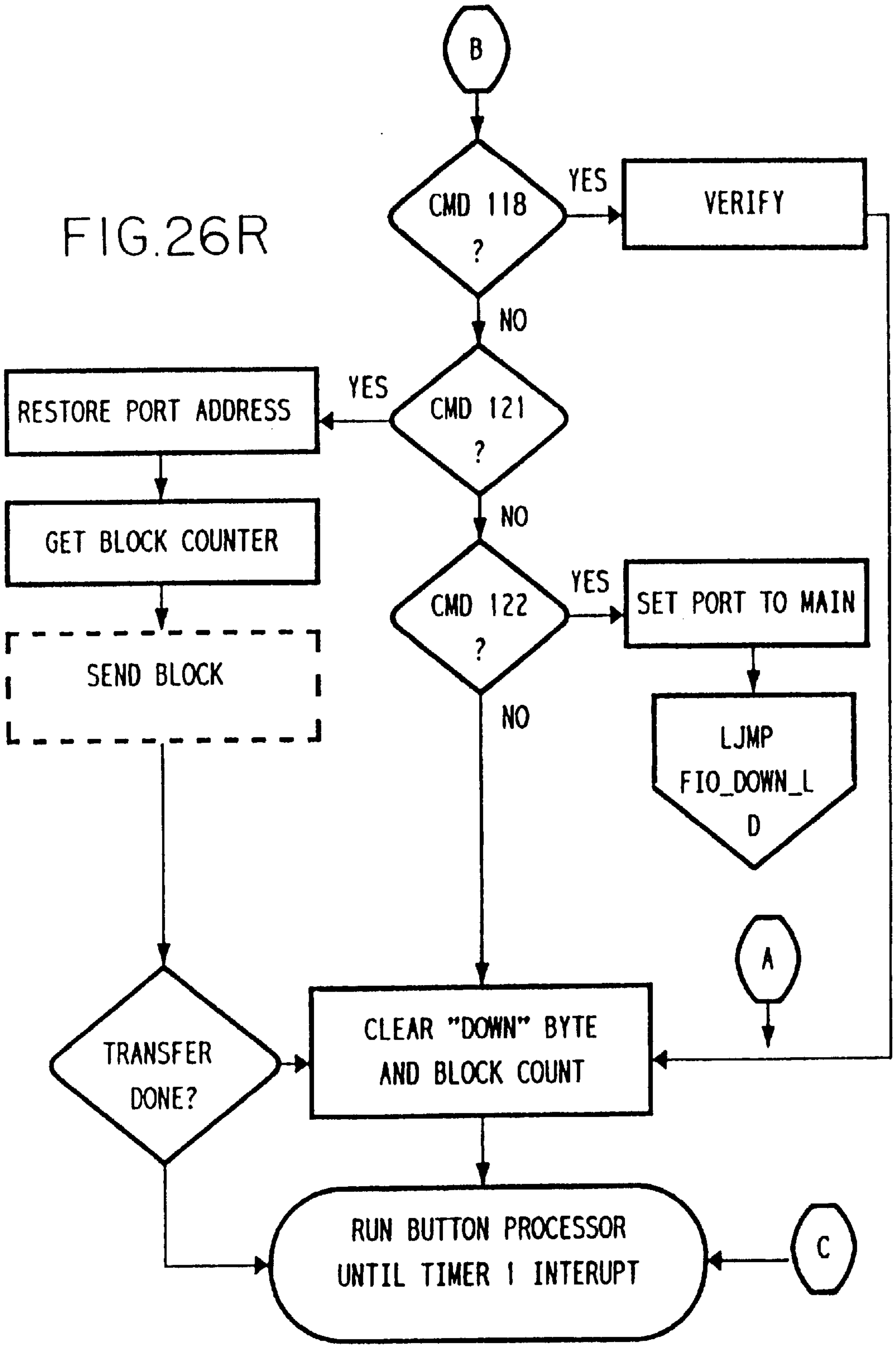
Figure 26S:
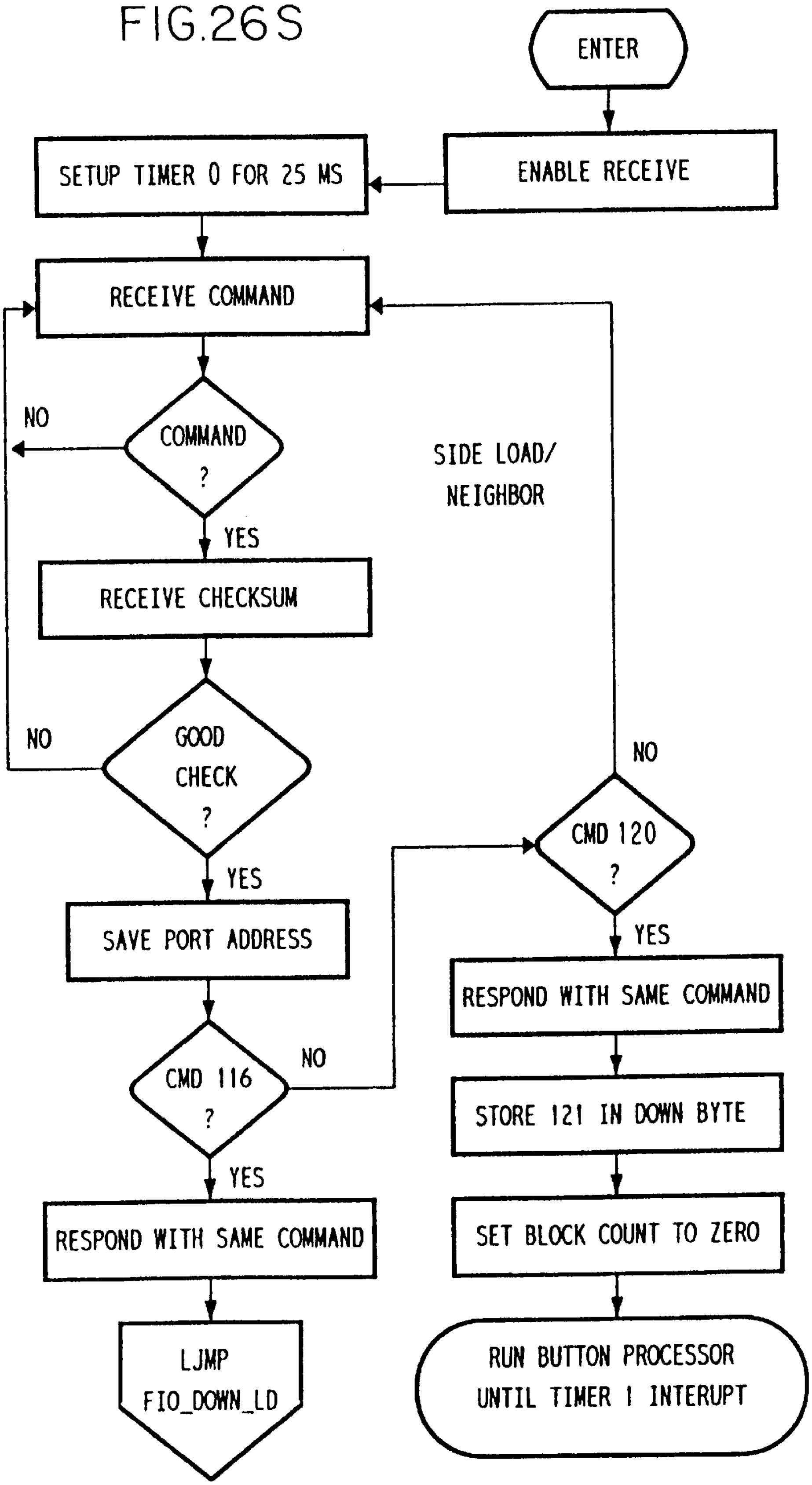
Figure 26T:
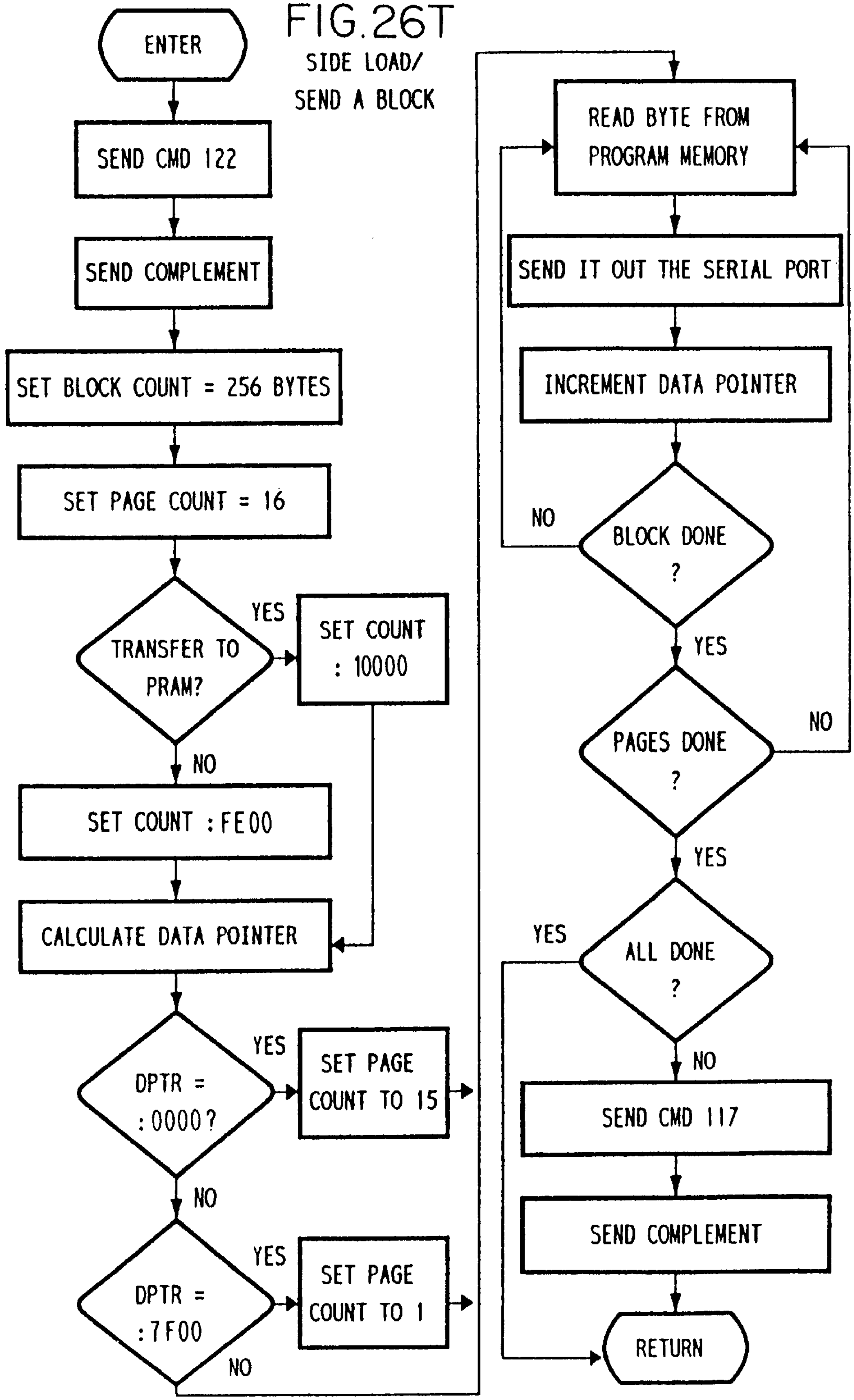
Figure 26U:
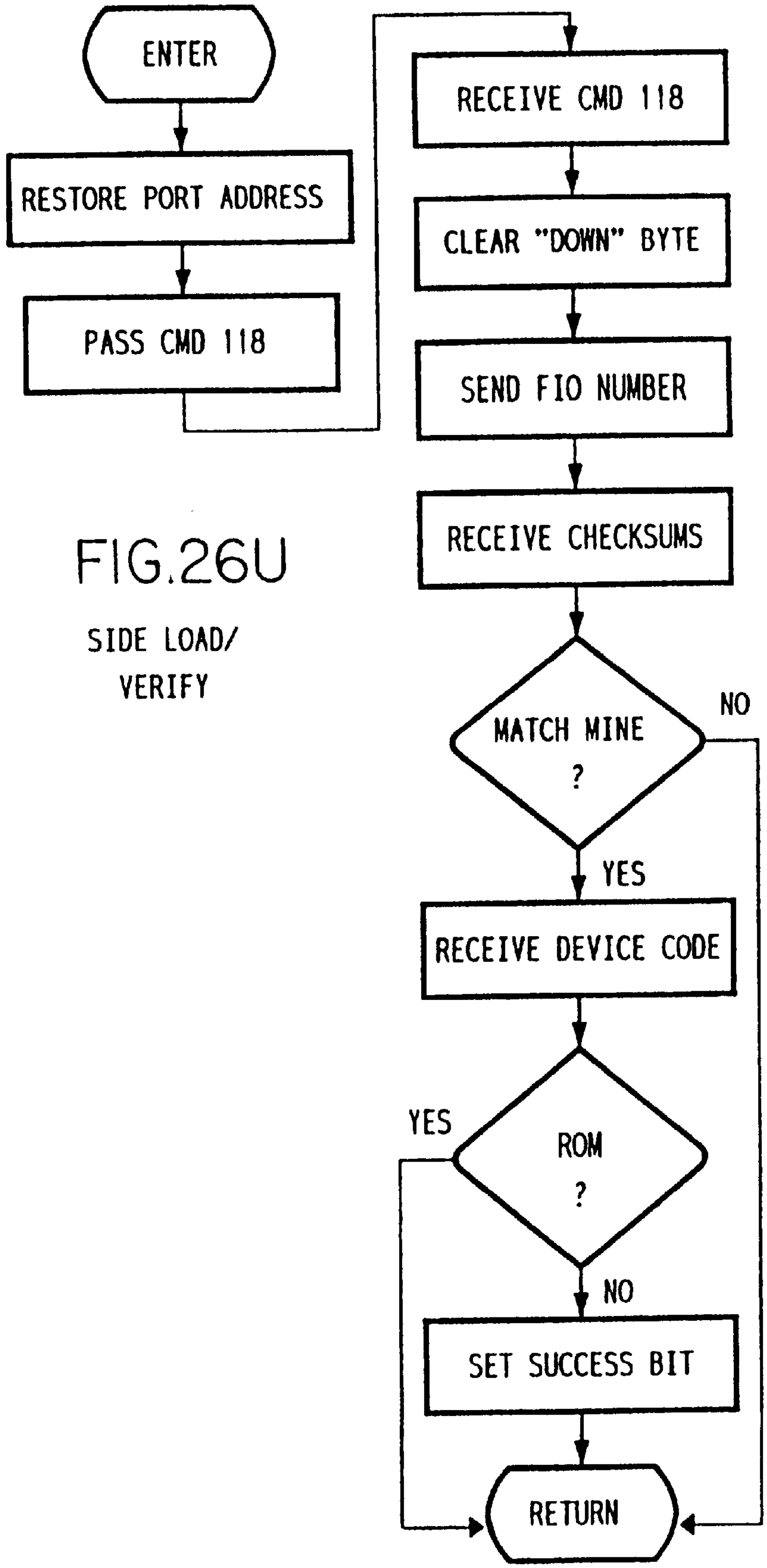

In the meantime, the NCOMM routine 2508 will enable the CHECK_MID routine 2526 of FIGS. 26R–26S (block 2528 in FIG. 26P) and initialize a waiting period for the CHECK_MID routine to be executed (block 2530). The CHECK_MID routine 2526 is also shown as a block in the Netmain loop of FIG. 26A. The CHECK_MID routine 2526 is used to verify that a copy of the updated software from either the Left controller 92 or the Right controller 96 has been successfully transferred to the Middle controller 94. In this regard, the Middle controller 94 will perform checksum calculations and comparisons, and upon successful completion, it will respond to the sending controller with its checksums. These checksums may be comprised of "exclusive or", "rotated exclusive or" and "sum of code" checksums. These checksums will be compared with the checksums which are embedded in the software code sent to the Middle controller 94. The sending controller will compare the checksum from the Middle controller 94, and if they agree with its own checksums, then a bit will be set in a byte which will be transmitted to the network controller 16 during normal input communication.

Once all of the Good Checksum messages have been received by the network controller 16, then a similar confirmation message will be displayed on the debug panel 18 of the network controller 16. The display of the Good Checksum message on the debug panel 18 will enable the operator to know that the Middle controller 94 may be started up on the new software. In this regard, the operator may then depress the buttons on the debug panel 18 which will cause a "Transplant" command to be sent to each of the field computer units 12 via the NCOMM routine 2508 of FIG. 26P. However, if a checksum error has been detected, then a "Cold Feet" command will automatically be sent to all of the field computer units via the NCOMM routine 2508. The Cold Feet command will cause the Middle controllers 94 to start up (i.e., be reset) using the old or prior software. A suitable message to this effect will also be displayed on the debug panel 18.

Figure 25F:
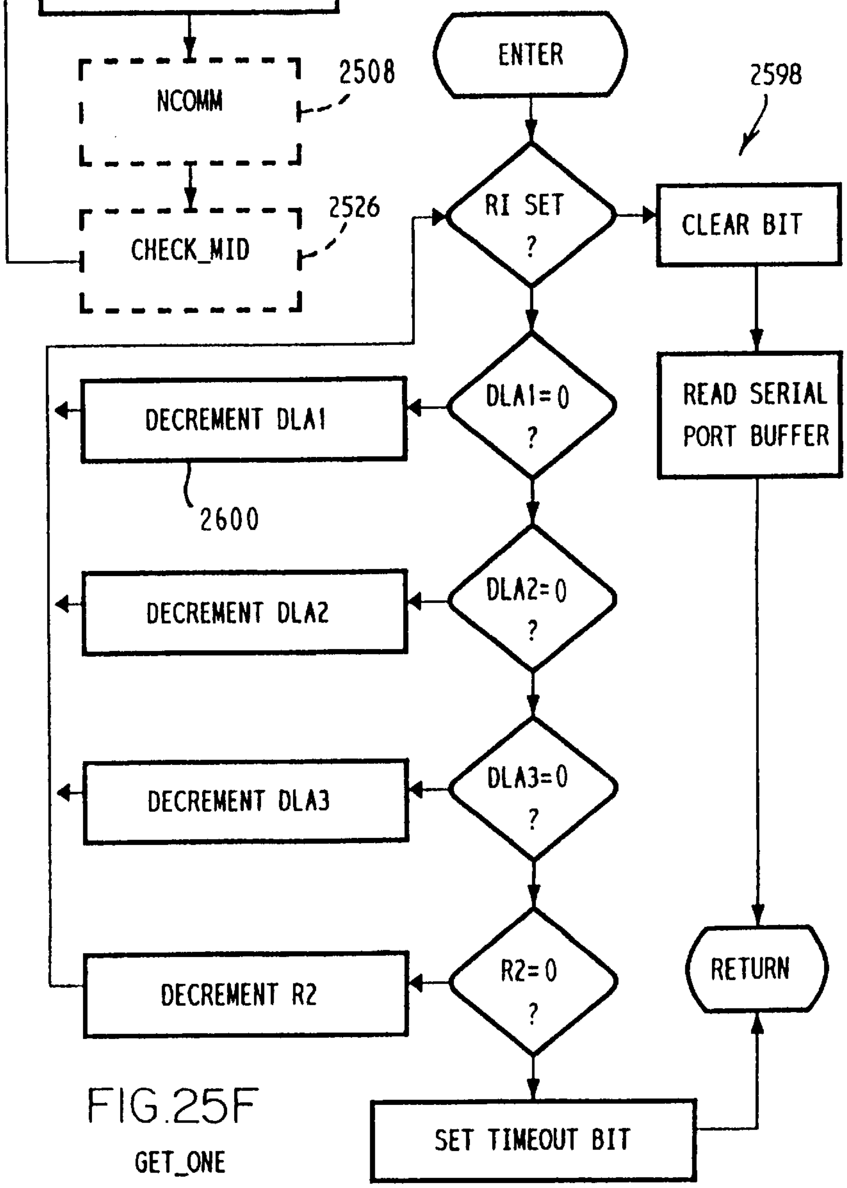
Figure 25B:
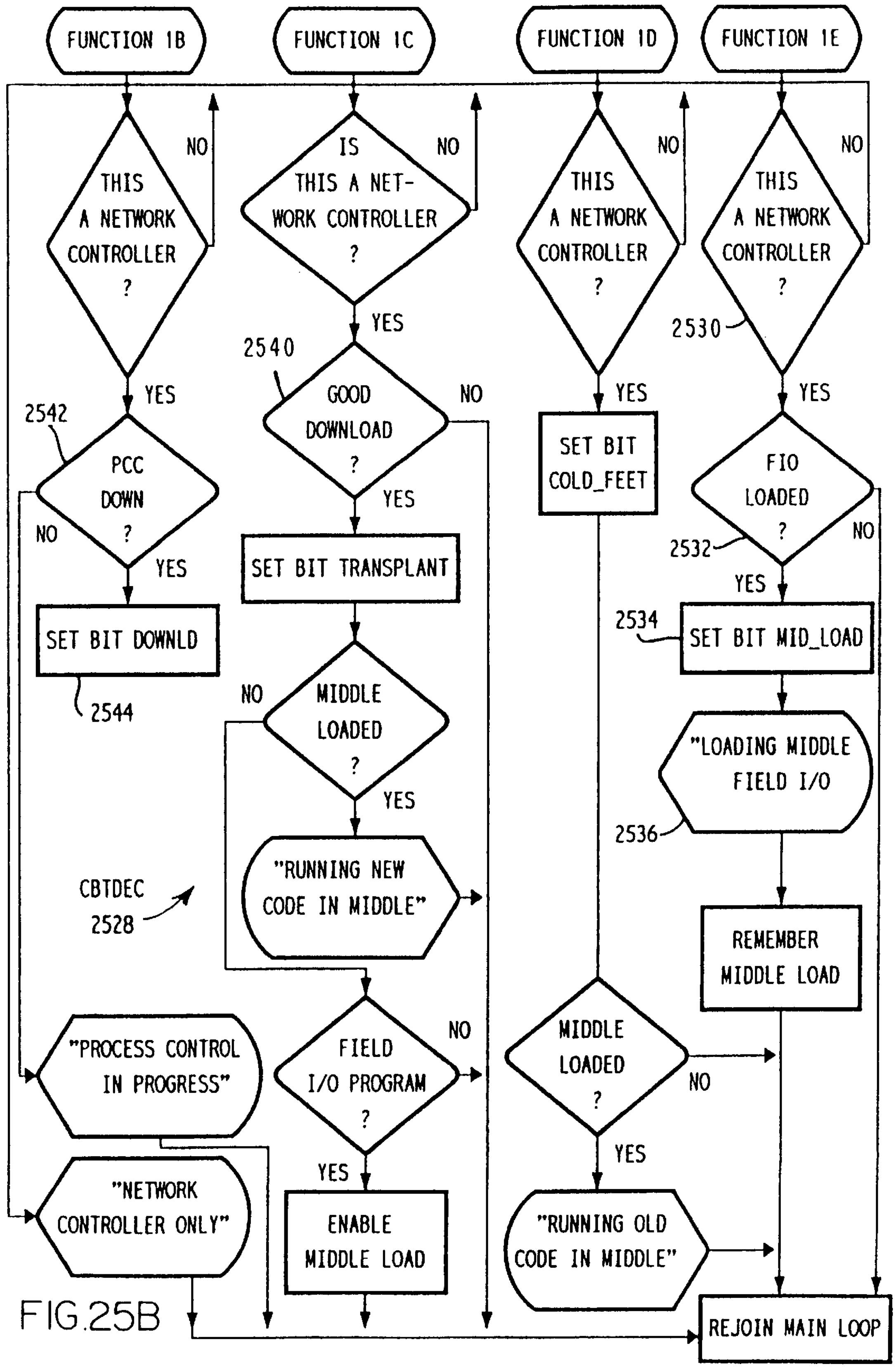
Figure 25C:
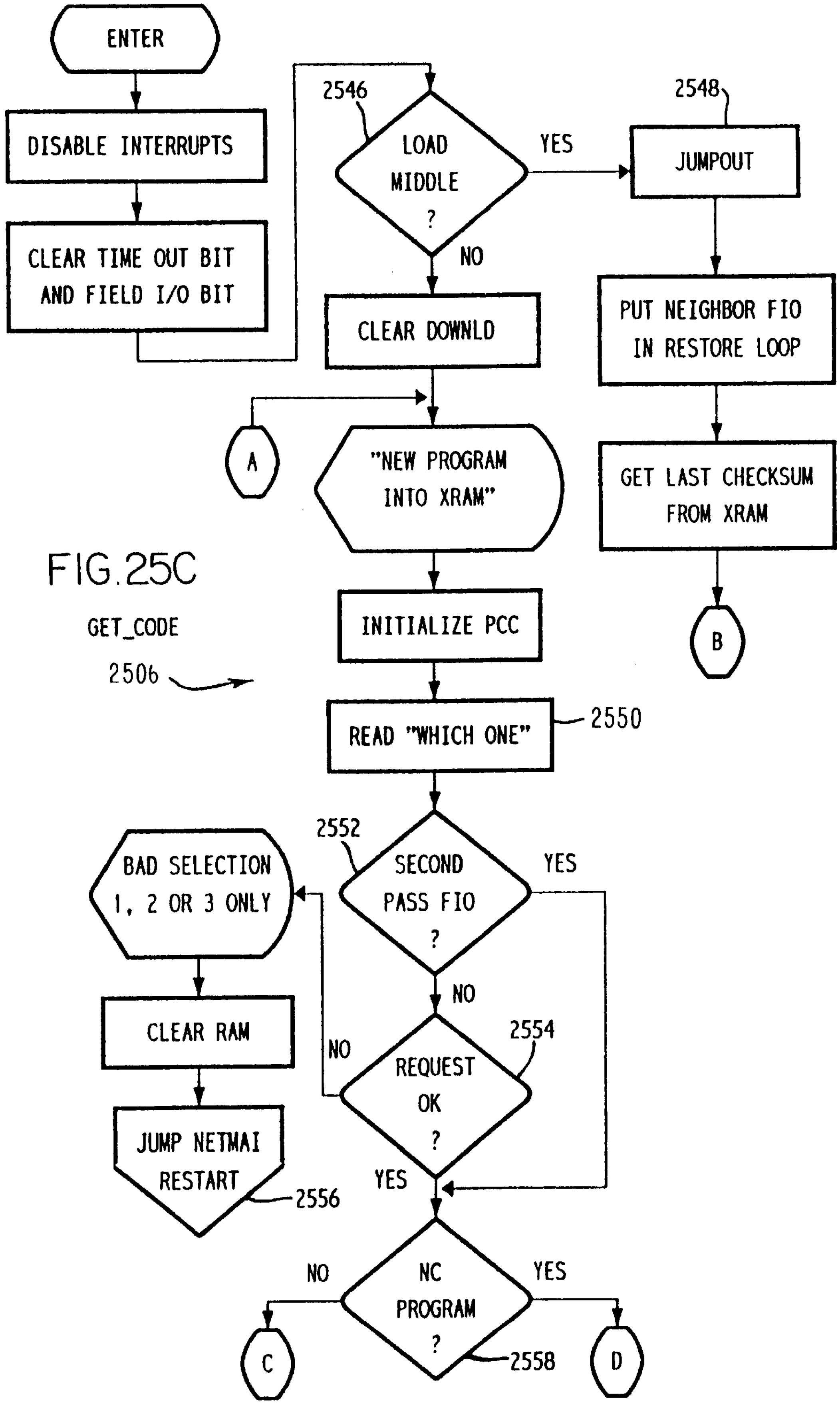
Figure 25D:
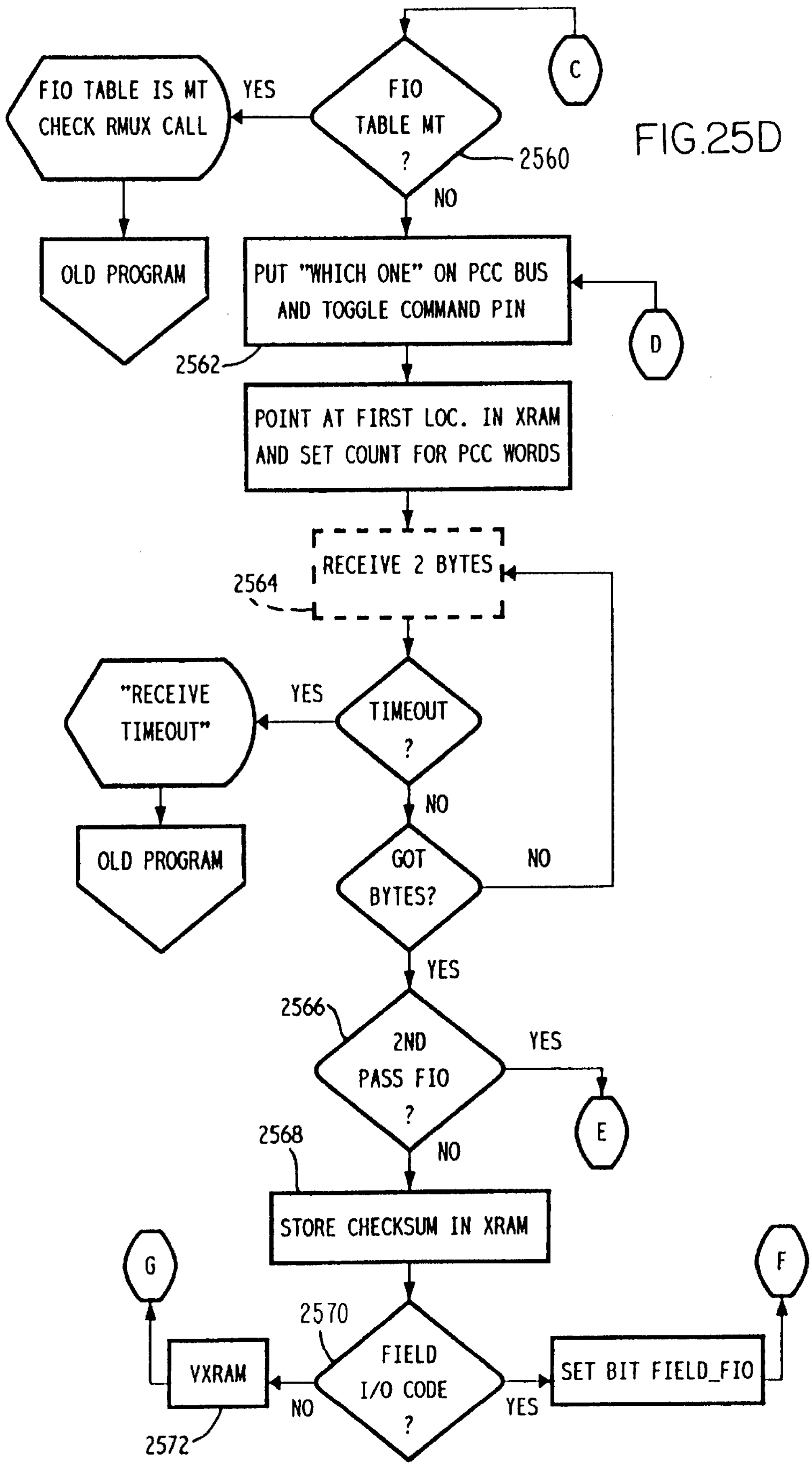

The relevant portion of the common button decoder "CBTDEC" routine 2528 is shown in FIG. 25B. The CBTDEC routine 2528 is referred to as being common in that it is preferably contained in each of the interface system components that contain a debug panel (i.e., the network controllers 16, the breakout circuits 26 and the field computer units 12). This is why the CBTDEC routine 2528 contains a determination as to whether this component is a network controller 16 for each of the functions listed (e.g., diamond 2530). Each of the functions identified in the CBTDEC routine refer to a specific downloading operation. Thus, for example, the Function 1E is used to initiate the downloading of updated software into the Middle controllers 94. As indicated by diamond 2532, the interface system 10 will only permit the Middle download command to be transmitted after at least one of the Left or Right controllers has successfully received updated software. Once the operator has depressed the appropriate debug panel buttons, then the MID_LOAD bit will be set (block 2534). One or more messages may then be displayed on the debug panel, such as "Loading Middle Field I/O" (display block 2536).

Function 1D is used to automatically cause the Cold Feet command to be sent to all of the components to whom new software code was addressed. In this regard, the downloaded software code will be ignored, and the components will startup on the old software code.

Similarly, Function 1C is used to enable the operator to cause the Transplant command to be sent to all of the devices to whom new software code was addressed. The Transplant command can also be sent via the NCOMM routine 2508 to start the Middle controller 94 on the new software code if the network controller 16 is executing its process control time line. Once this command is received, then the REPROG routine 2538 of FIG. 26D will be executed. The REPROG routine 2538 will cause the newly downloaded software to be copied from data memory (e.g., XRAM) into program memory. It should be noted that the CBTDEC routine 2528 will not permit the Transplant command to be sent if the checksum verifications have indicated the presence of an error (diamond 2540).

Function 1B is used to move new software from one of the process control computers 14*a*–14*b* to the XRAM circuit contained in its network controller 16. The selection of Function 1B will cause the command code "113" to be transmitted from the network controller 16. In this regard, diamond 2542 indicates that this function will not be performed if this process control computer is currently being used for process control. The downstream devices or interface system components which receive the new software code is determined from the "start and stop" switches on the breakout circuits 26. Since the breakout circuits 26 do not know what type of device or devices they are connected to downstream, it is preferred that all of these devices will receive new code intended for the breakout circuits when that option is selected. In this regard, the preferred procedure is for the new "overheads" software code to have an embedded program ID that may be used downstream to determine whether the receiving device should use the new software code. While the network controller 16 will initially know which devices are connected to it downstream from a call to the process control computer, it should be appreciated that the network controller 16 could poll the fiber optic network prior to the downloading operation to determine which devices are currently connected to it.

Verification of downloaded breakout circuit software code and field computer unit software code is accomplished at the network controller 16 by polling the known field computer units 12 on the fiber optic network. In this regard, it should be noted that each of the breakout circuits will preferably verify new breakout circuit software received before transmitting this software to any devices to which they are connected. Thus, for example if the breakout circuit 26*f* of FIG. 2 detects that it has not received a complete or accurate transmission, it will not send this software to the breakout circuit 26*g*. In one form of the present invention, the breakout circuits will not attempt to verify the accuracy of new field computer unit software, as the breakout circuits 26 are not provided with sufficient free memory to check this software. More specifically, new field computer unit software is transmitted in two packets (e.g., 32 K each), whereas new breakout circuit software only requires a single transmission (e.g., 32 K). However, it should be understood that the memory capacity of the breakout circuits 26 could be increased in the appropriate application.

When the network controller 16 receives the checksums that agree with the checksums of the transmitted program, from all of the known field computer units 12, it will present the operator with a choice of starting on the new software code or on the old software code via a message prompt on the debug panel 18. However, if the network controller 16 receives a bad checksum or times out while requesting a checksum message from any of the known field computer units 12, then all of these devices will be sent the Cold Feet command code to automatically cause a start up on the old software. Indeed, even if all of the known field computer units 12 sent good checksum messages, it is preferred that the interface system automatically cause a start up on the old software, if the operator does not respond to the prompted choice within a predetermined timeout period. In any event, if the time-out timer expires during the verification process, then the downloading operation will automatically terminate with a "Time-Out" message being displayed on the debug panel 18.

Once the DOWNLD bit has been set via Function 1B of the CBTDEC routine 2528 (block 2544), this bit will be detected by the Netmain routine 2500 of FIG. 25A. This will in turn cause the network controller 16 to jump to the GET_CODE routine 2506 of FIGS. 25C–25E. The GET_CODE routine 2506 detects what devices have been selected for software updating and reacts accordingly. As indicated by diamond 2546, the Middle controller 94 in the field computer units 12 may be downloaded through the GET_CODE routine 2506. However, this procedure is only implemented when both of the process control computers 14*a*–14*b* are "down" with respect to process control operations. In this case, the GET_CODE routine calls the JUMPOUT routine 2548 shown in FIG. 25H. The JUMPOUT routine 2548 will cause a one second burst of back to back download commands to be transmitted out the main port of the network controller 16. These consecutive download commands will cause the breakout circuits 26 and/or one side of the field computer units 12 to jump out of their process control time line, and sit in a tight receive loop (with a time-out timer running) looking for further instructions upstream. From this point, the downloading and verification process will be automatically performed.

Assuming that the Middle controller 94 is not involved with the downloading process at this point, then the network controller will then receive new software from the process control computer 14. In one form of the present invention, this software is preferably sent in the following four blocks or packets: (1) network controller software (e.g., 32 K), (2) breakout circuit software (e.g., 32 K), and (3) field computer unit software (e.g., two passes of 32 K each). In this regard, the read "Which One" block 2550 refers to the numbers (1), (2) or (3) for these software transfers. As the field computer unit software requires two transmissions or passes, the diamond 2552 indicates that the network controller 16 will check whether or not it is receiving the second pass of the number (3) software transfer. If any other number is detected, then the transfer request will be interpreted as a bad selection (diamond 2554), and the network controller 16 will revert to the Netmain routine (block 2556).

Assuming that the software transfer request is acceptable, then the network controller will determine if the software being transferred is network controller software (diamond 2558). If the software is not network controller software, then the FIO table will be check to see if it is empty "MT" (diamond 2560 on FIG. 25D). In this regard, it should be noted that the term FIO stands for Field Input/Output, and it is simply another way of referring to the field computer units. Assuming that the FIO table is not empty, or the software is network software, then the network controller 16 will request the next 32 K packet of software (block 2562). The network controller 16 will then look for the next command code from the process control computer 14 (block 2564). The command code is received in two bytes, as indicated in FIG. 25G.

Figure 250:
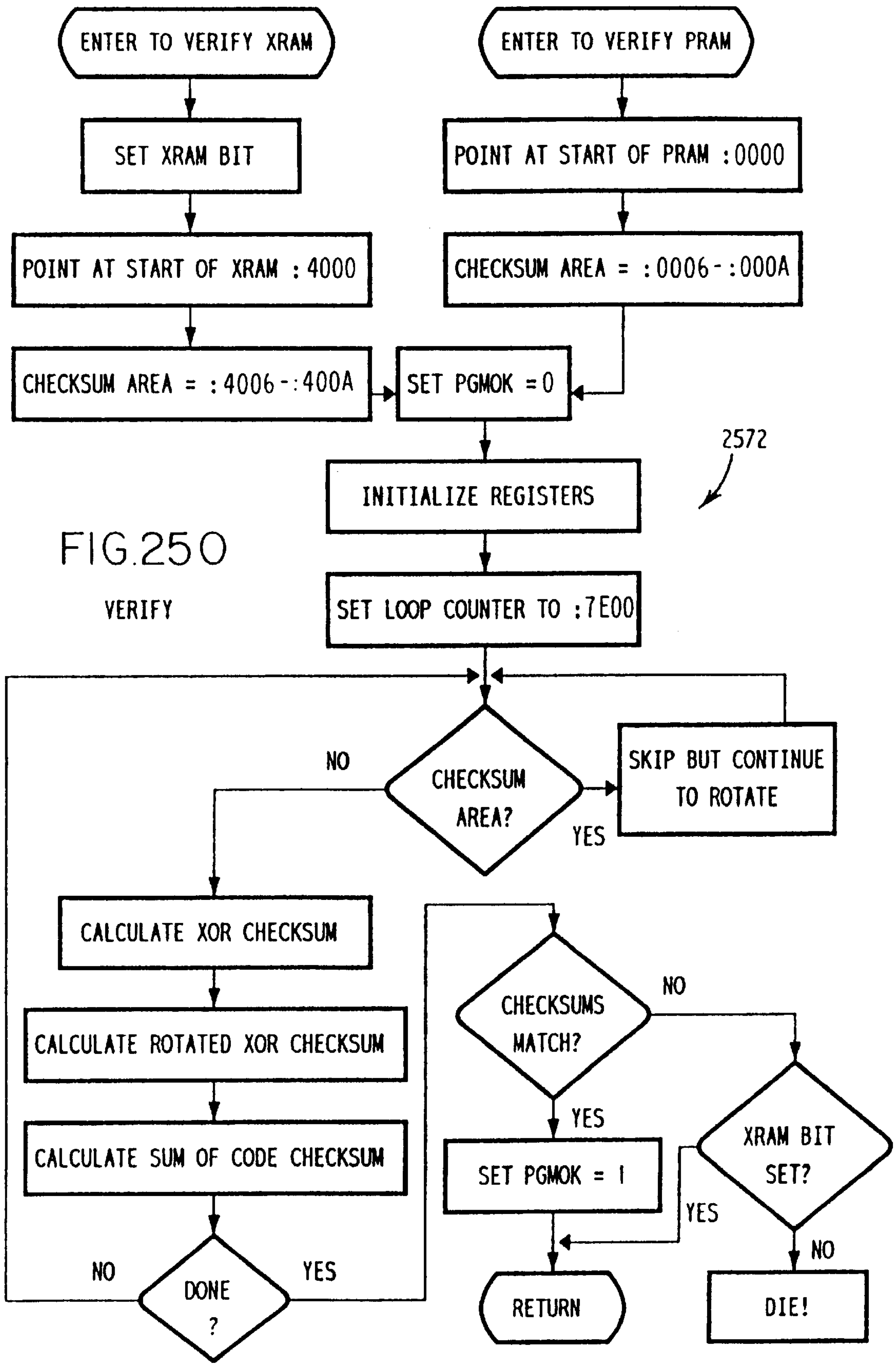

Assuming that this is not the second pass for FIO software (diamond 2566), then the checksums will be stored in XRAM (block 2568). At this point, the network controller 16 will check if this software is FIO software (diamond 2570), and verify the accuracy of the transmission if the software is not FIO software (block 2572). In this regard, FIG. 250 shows the flow chart of the Verify routine 2572. If the checksums did not match those embedded in the software (diamond 2574), then a "Bad Checksum" message will be displayed on the debug panel 18, and the network controller 16 will revert to the exiting "Old" program (block 2576).

If the checksums matched those embedded in the transferred software, then the network controller 16 will check if this packet is network controller software (diamond 2578). If the software is not network controller software, then the network controller 16 will call the Jumpout routine 2548 of FIG. 25H, and then put downstream devices in a receive loop (block 2580). The network controller 16 will then request the next software transfer (block 2582). The network controller 16 will then check if the received software is FIO software (diamond 2584). If the software is FIO software, then a check will be made to see if this is the first or second pass (diamond 2586). If it is the first pass, then the network controller 16 will bump the "Which One" number to (4) to set up the second pass (block 2588). If this was the second pass, then the network controller will call the Verify Downloaded Program routine 2590 shown in FIGS. 25K–25N. Assuming that the Verify Downloaded Program routine 2590 did not terminate with a revert to Old Program block, then the a message will be displayed on the debug panel 18 (block 2592), which will permit the operator a choice of implementing the New Program (block 2594) or reverting to the Old Program (block 2596).

Figure 25E:
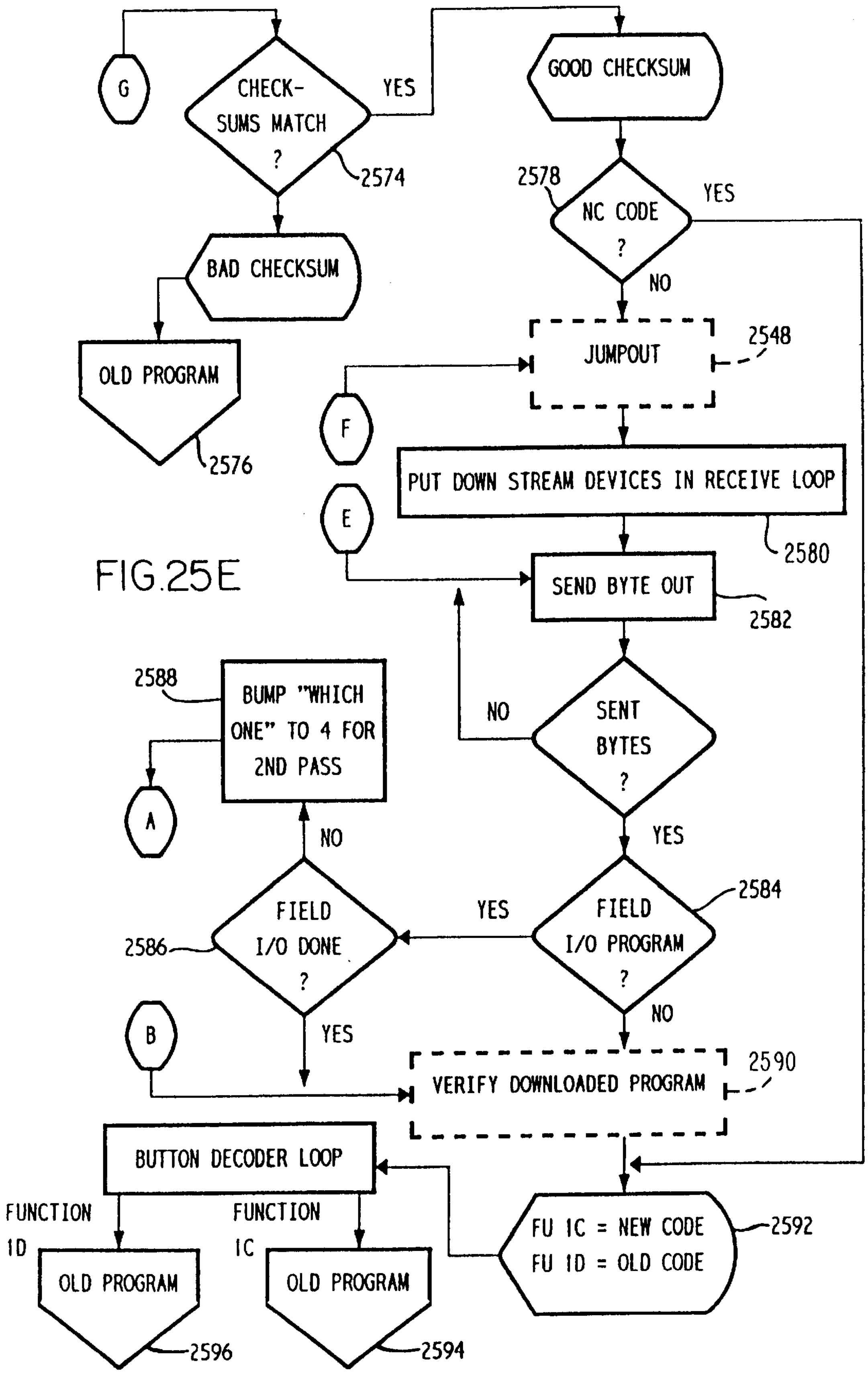
Figure 25I:
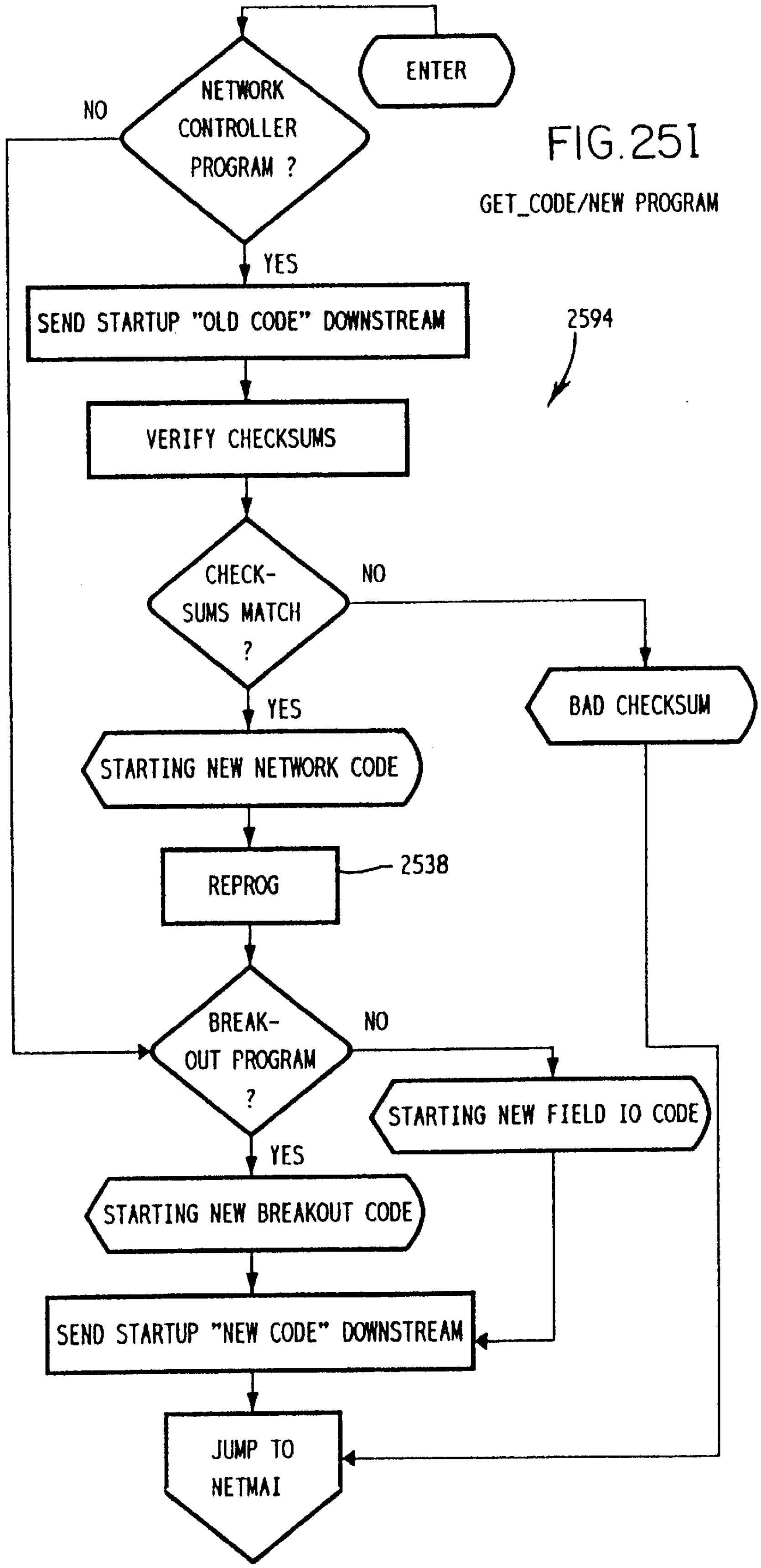
Figure 25J:
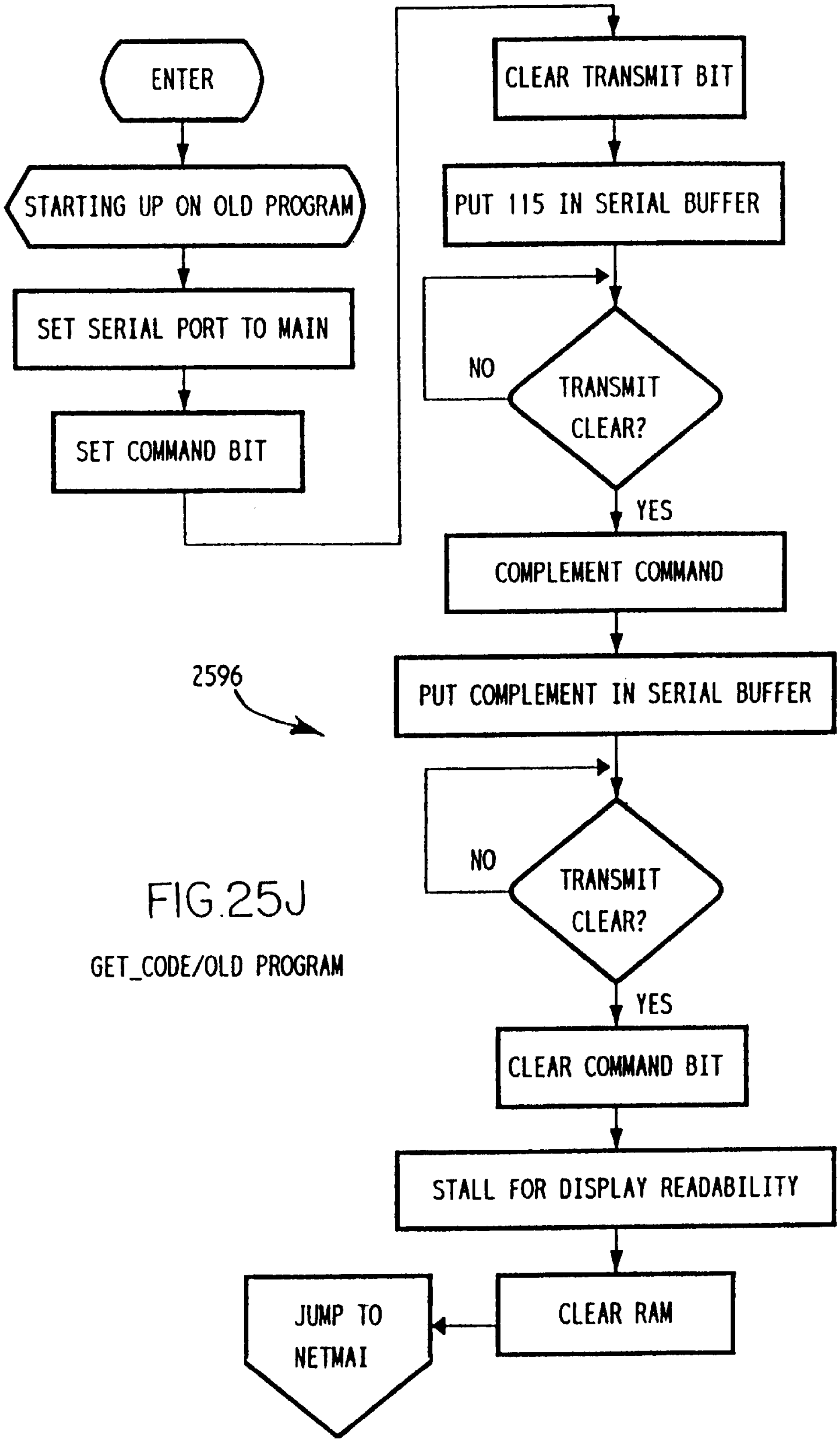
Figure 25K:
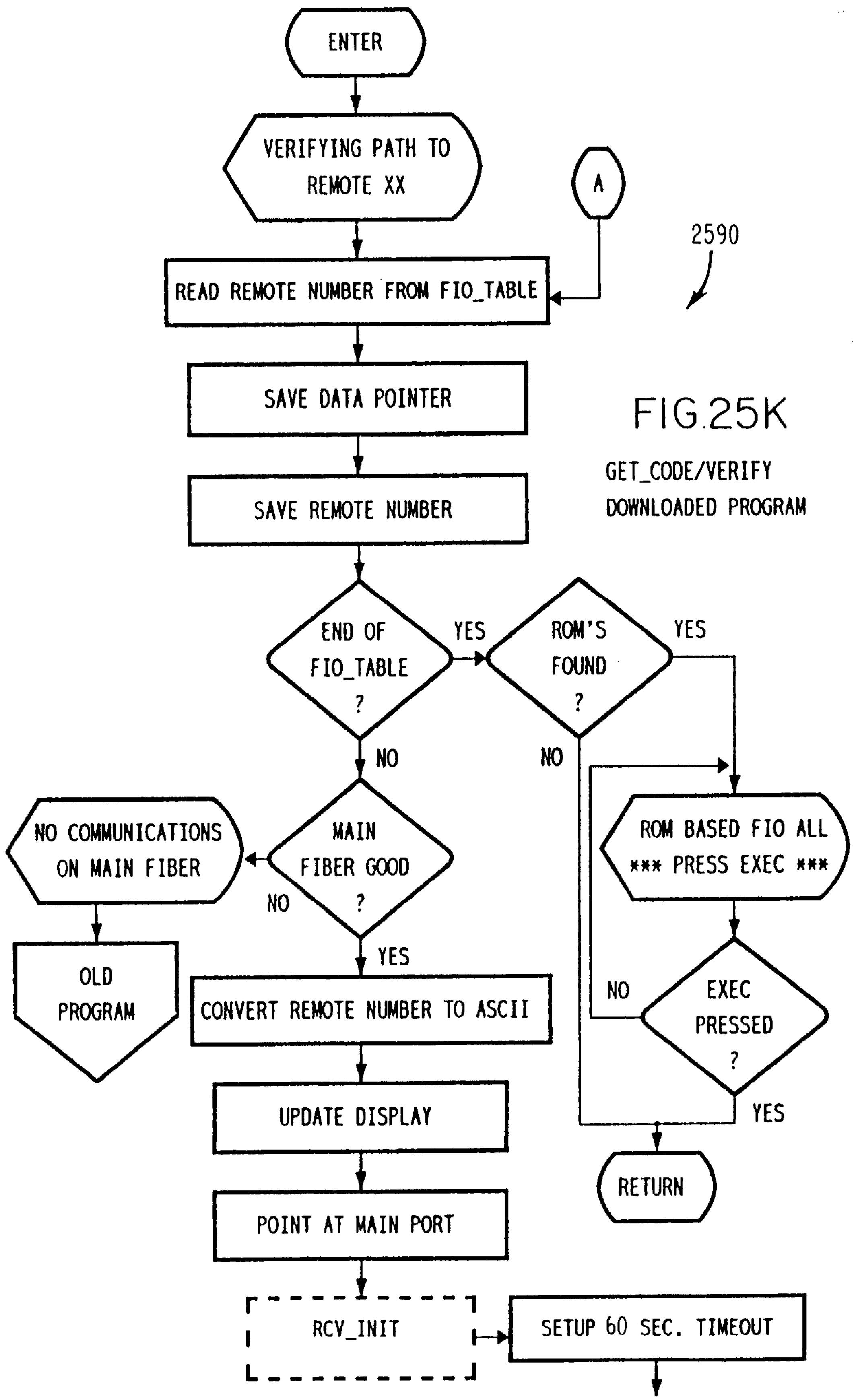
Figure 25L:
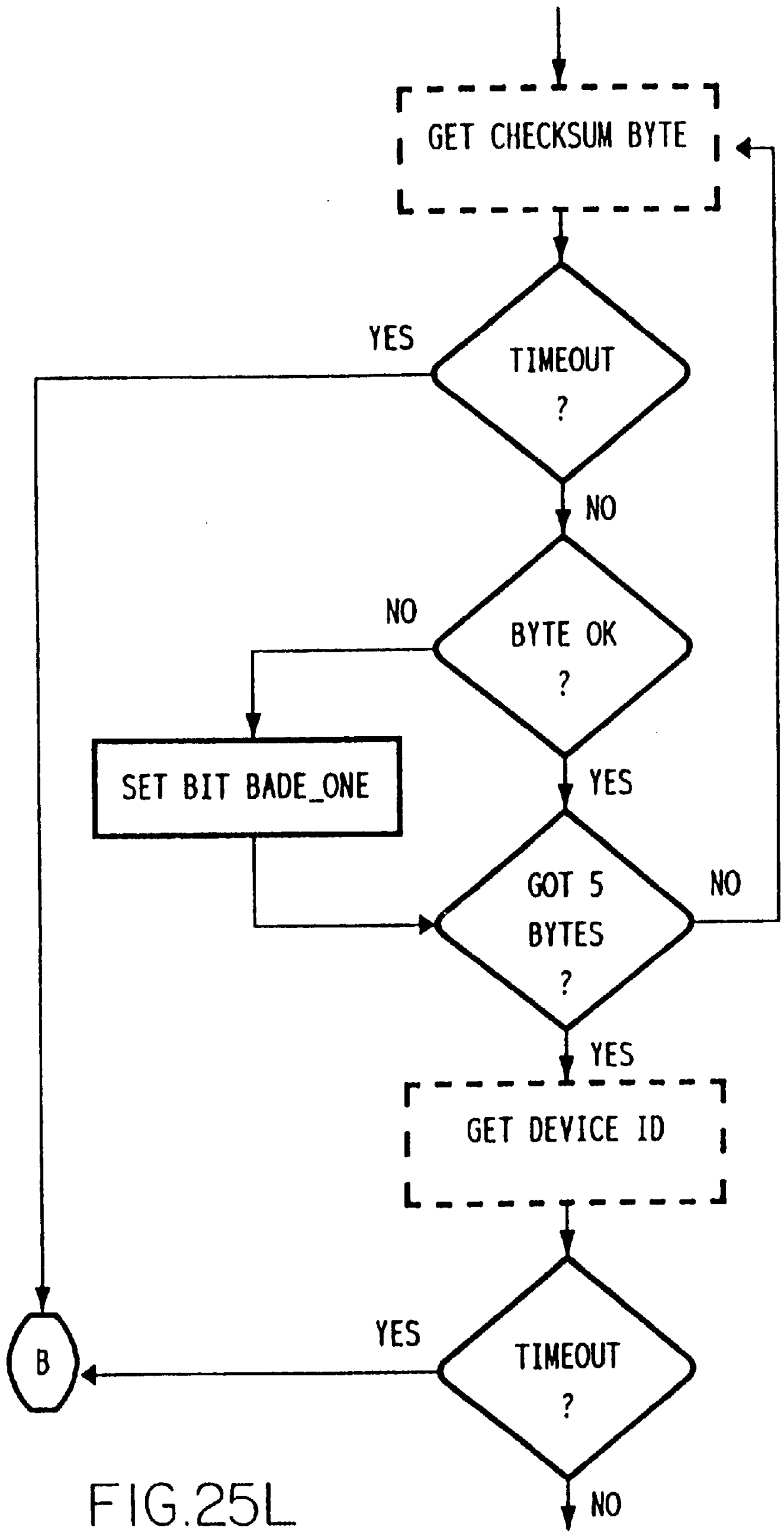
Figure 25M:
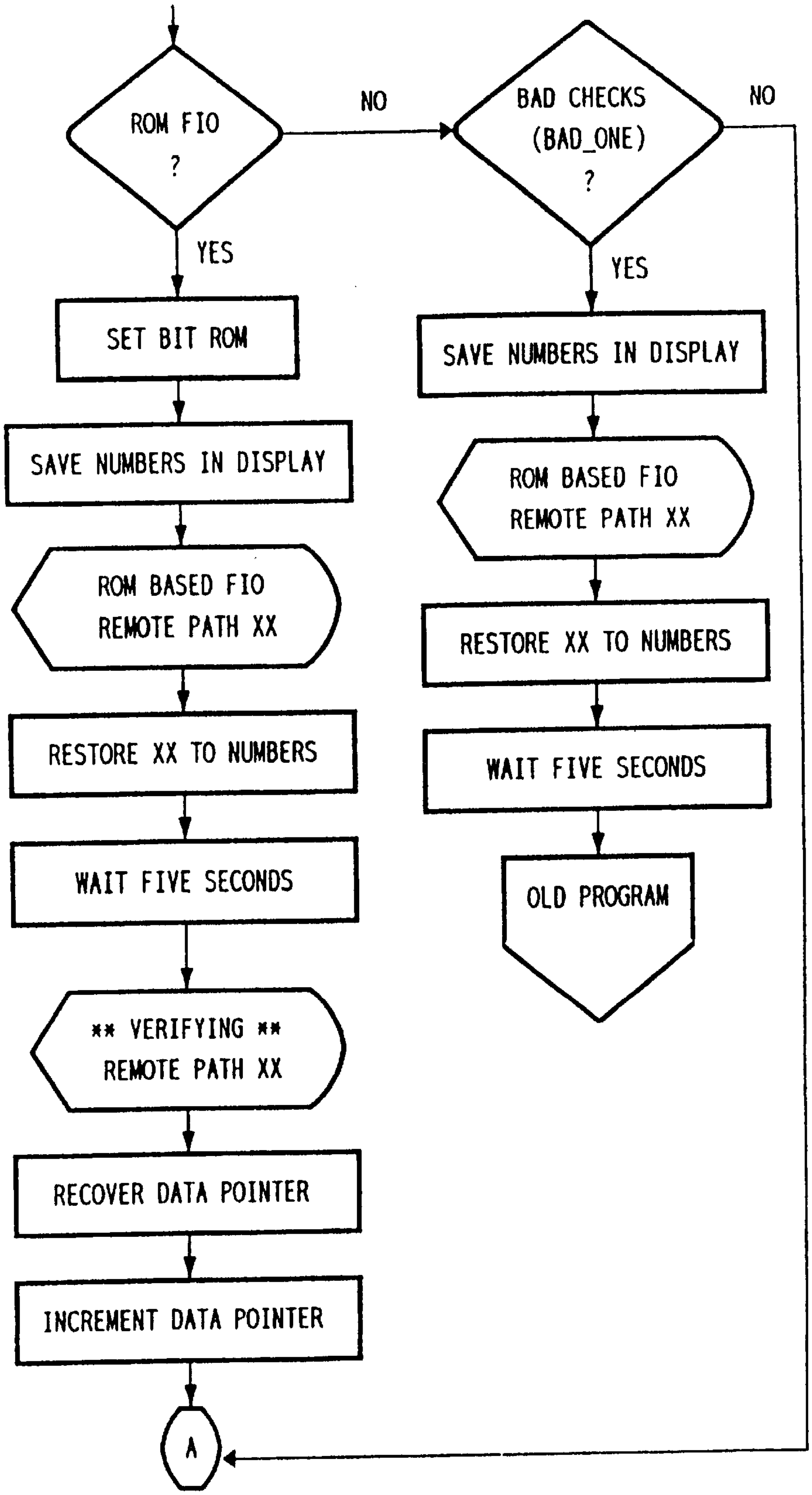
Figure 25N:
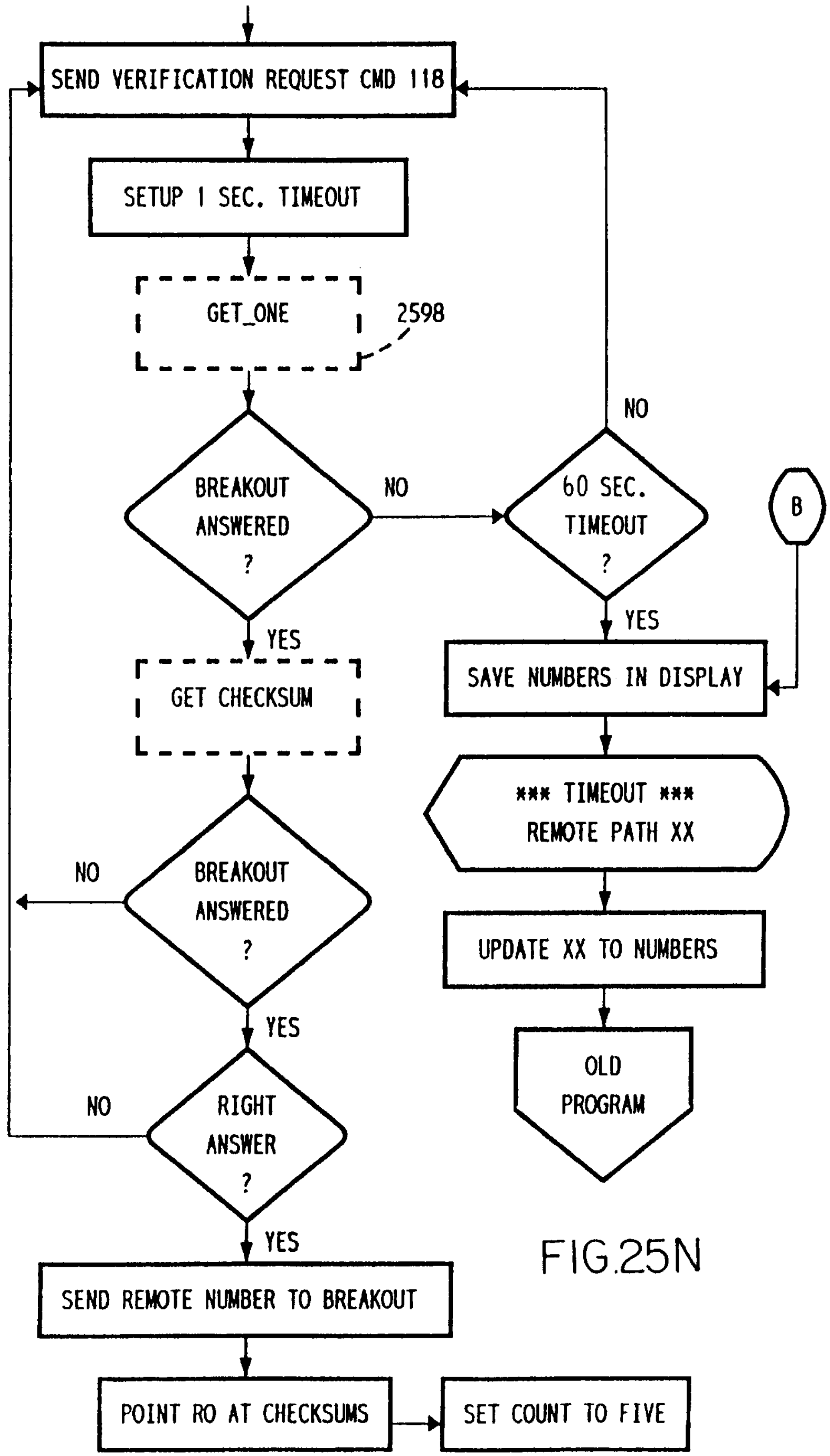

FIG. 25I shows the New Program routine 2594, while FIG. 25J shows the Old Program routine 2596. In this regard, it should be noted that the New Program routine 2594 calls the Reprog routine 2538 shown in FIGS. 26D–26F. As shown in FIG. 25E, the New Program routine 2594 will be executed in response to the selection of Function 1C on FIG. 25B. In this regard, the selection of Function 1C will cause the transmission of command code "114" from the network controller 16. FIG. 25E also shows that the Old Program routine 2596 will be executed in response to the selection of Function 1D on FIG. 25B. The selection of Function 1D will cause the transmission of command code "115" from the network controller 16.

It should be noted that the Verify Downloaded Program routine 2590 calls the Get One routine 2598, which is shown in FIG. 25F. The Get One routine 2598 is simply a way of providing relatively large delays, such as for a one second timeout. As shown in FIG. 25F, the Get One routine controls the decrementing of several counters (e.g., block 2600).

Figure 25P:
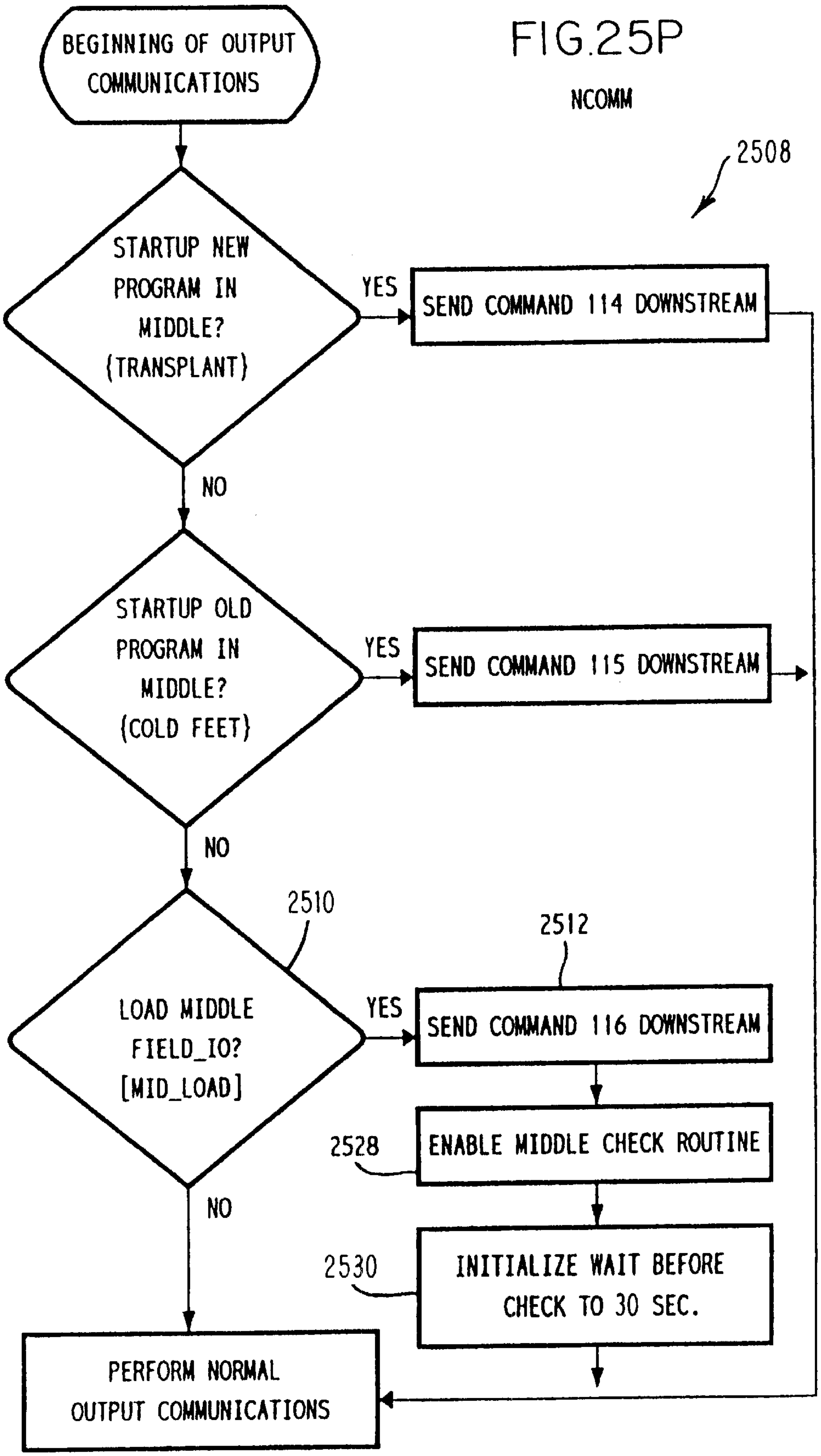
Figure 25Q:
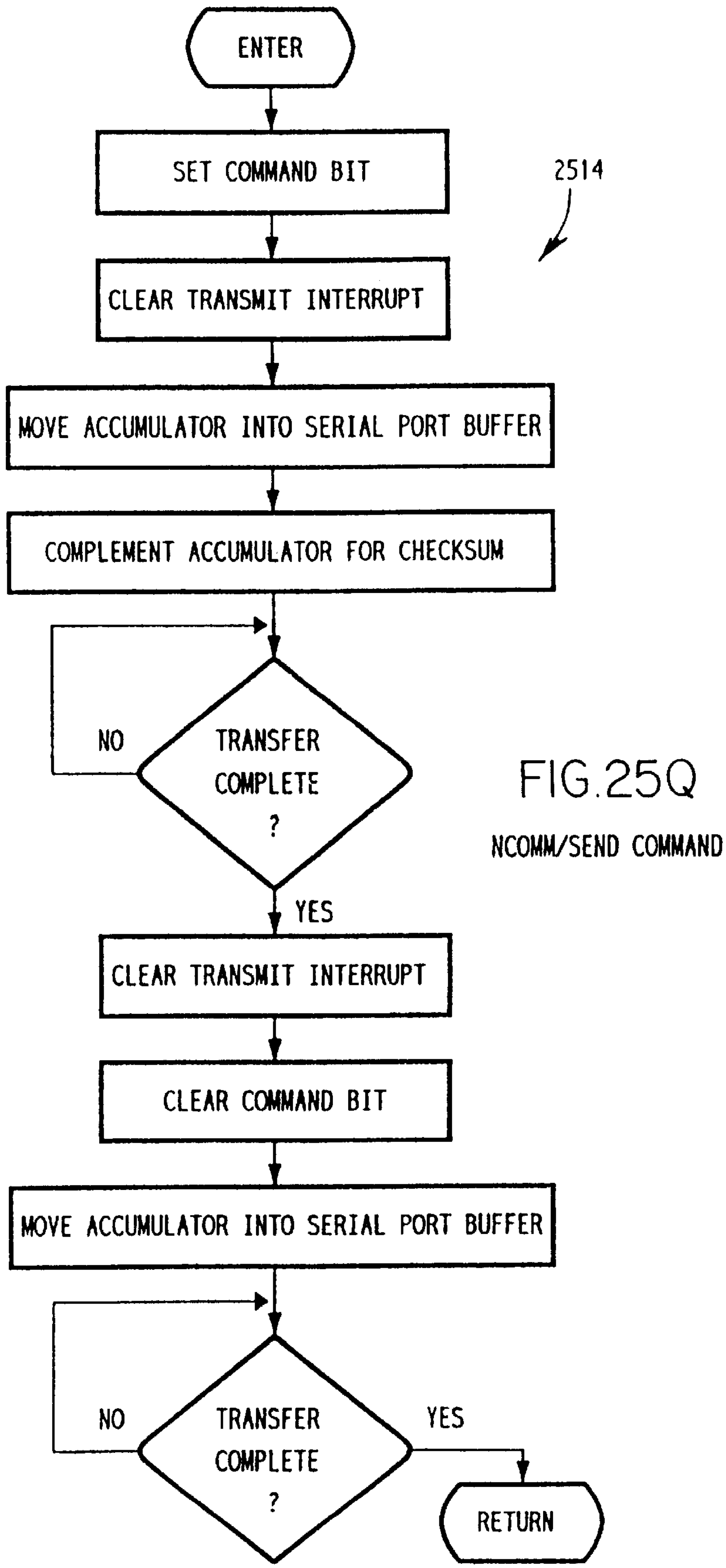
Figure 25R:
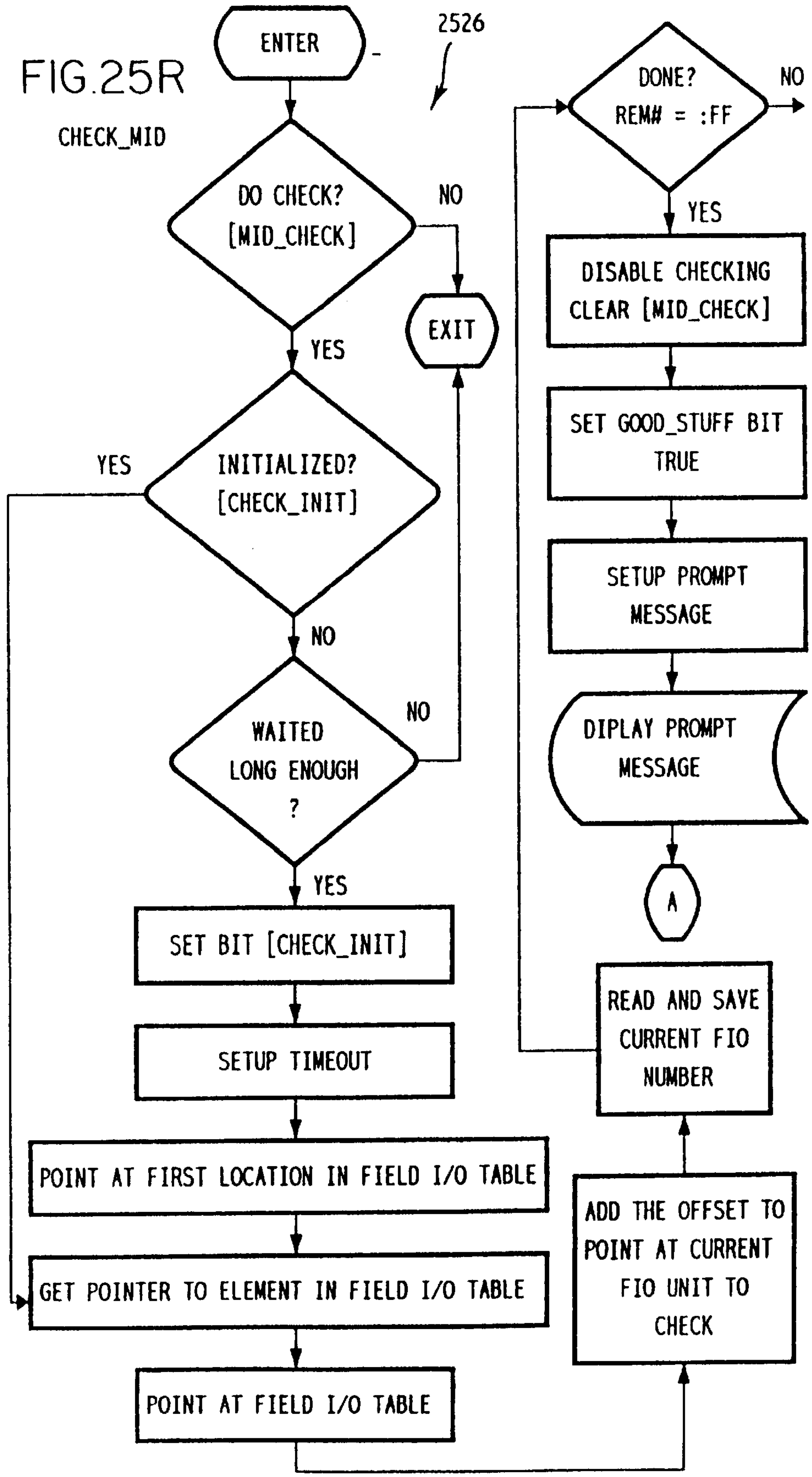
Figure 25S:
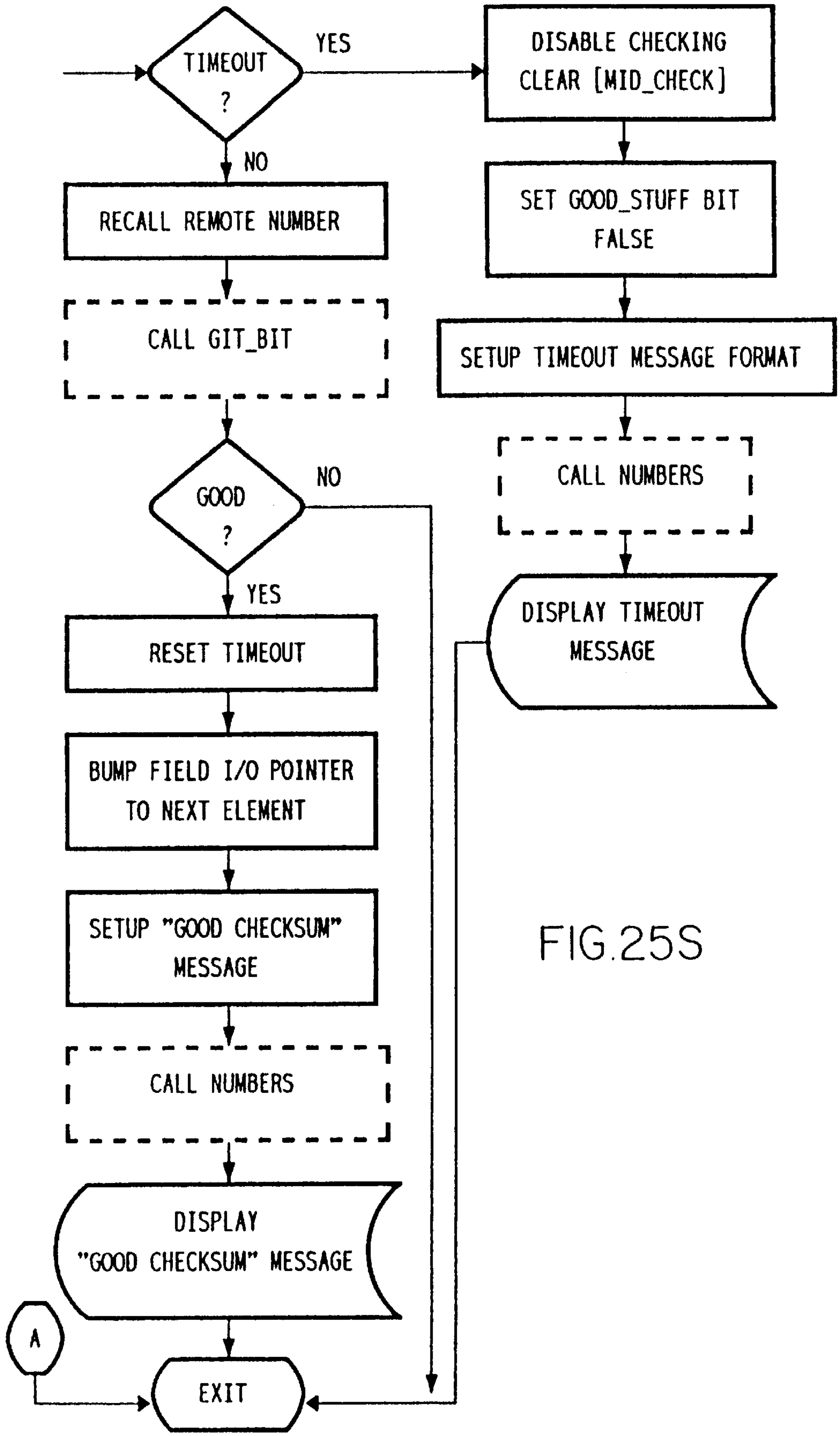
Figure 25T:
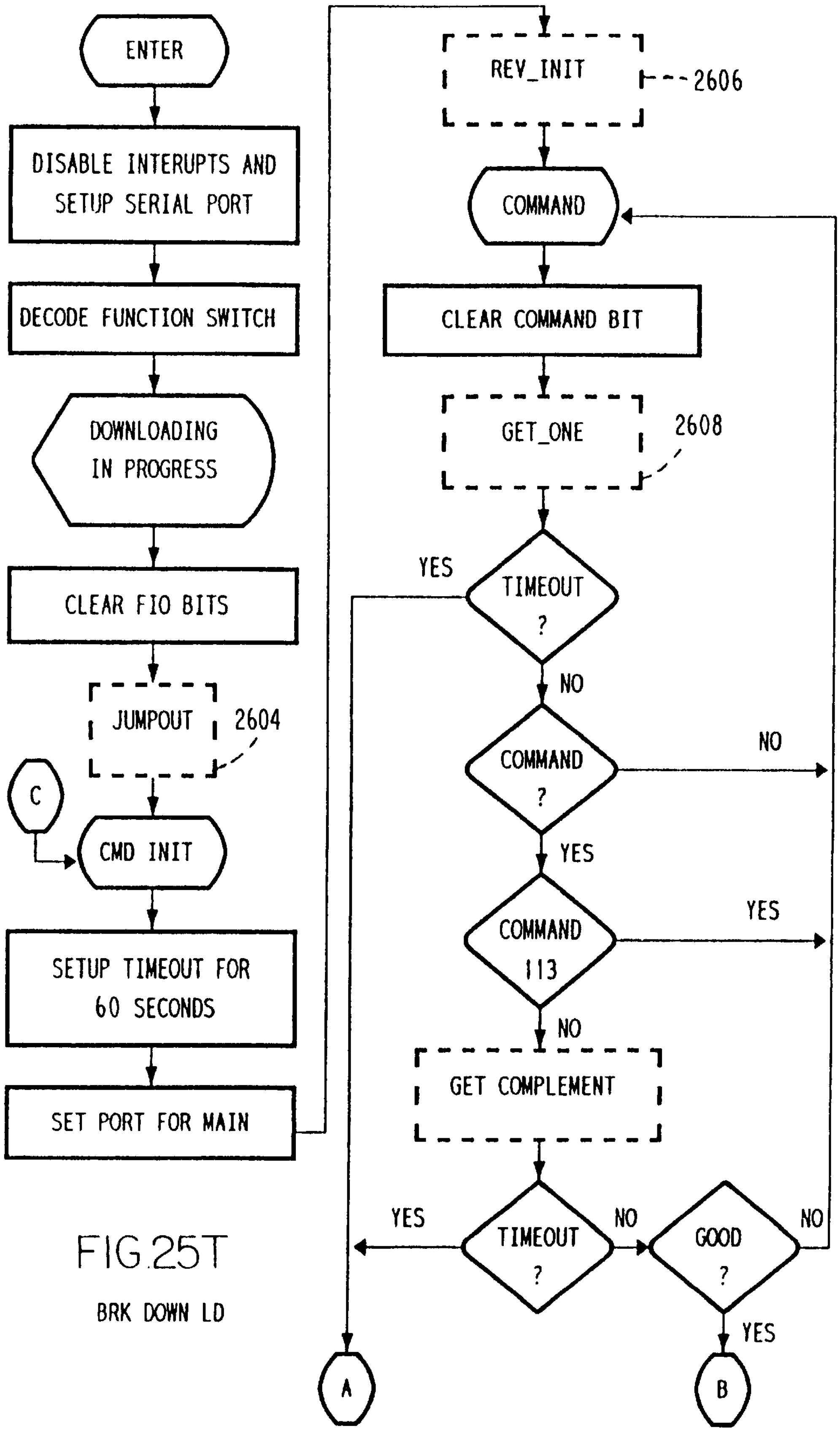
Figure 25U:
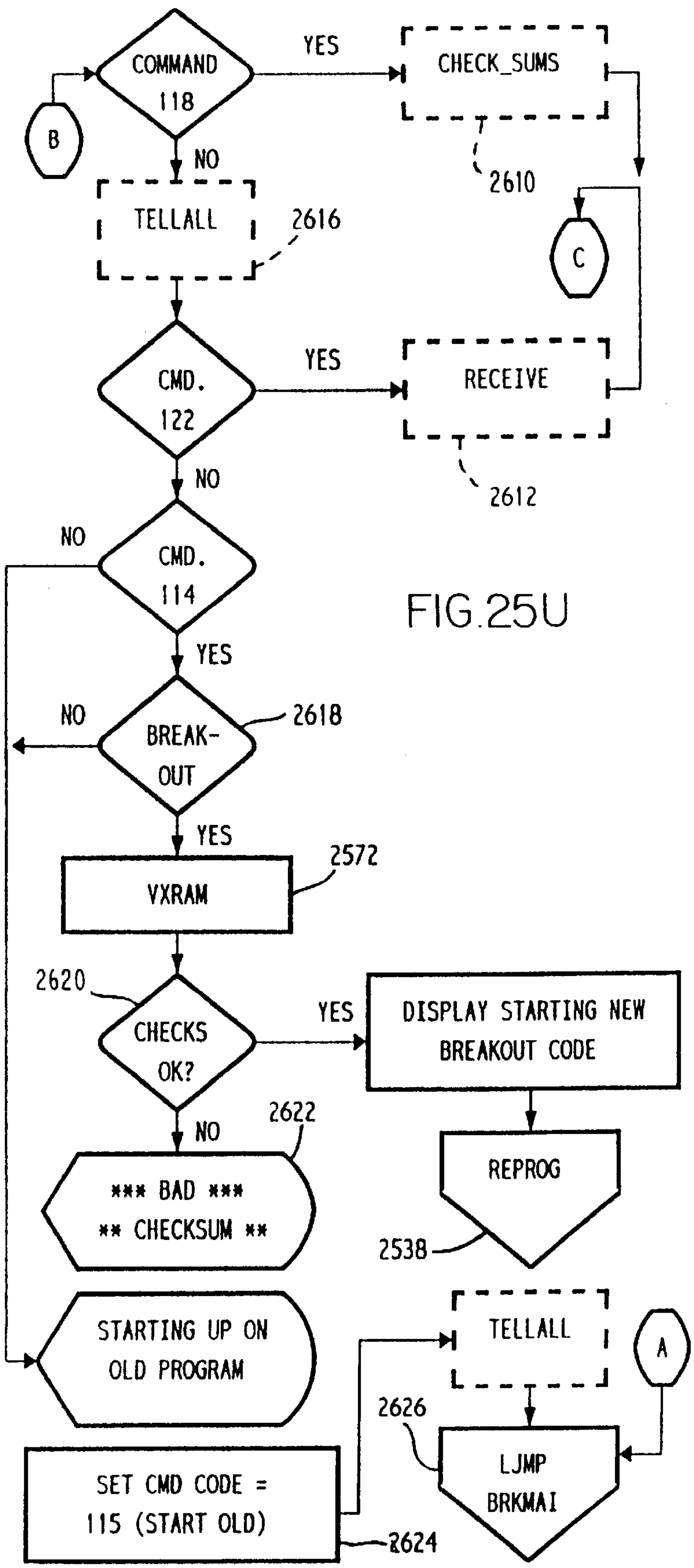
Figure 25V:
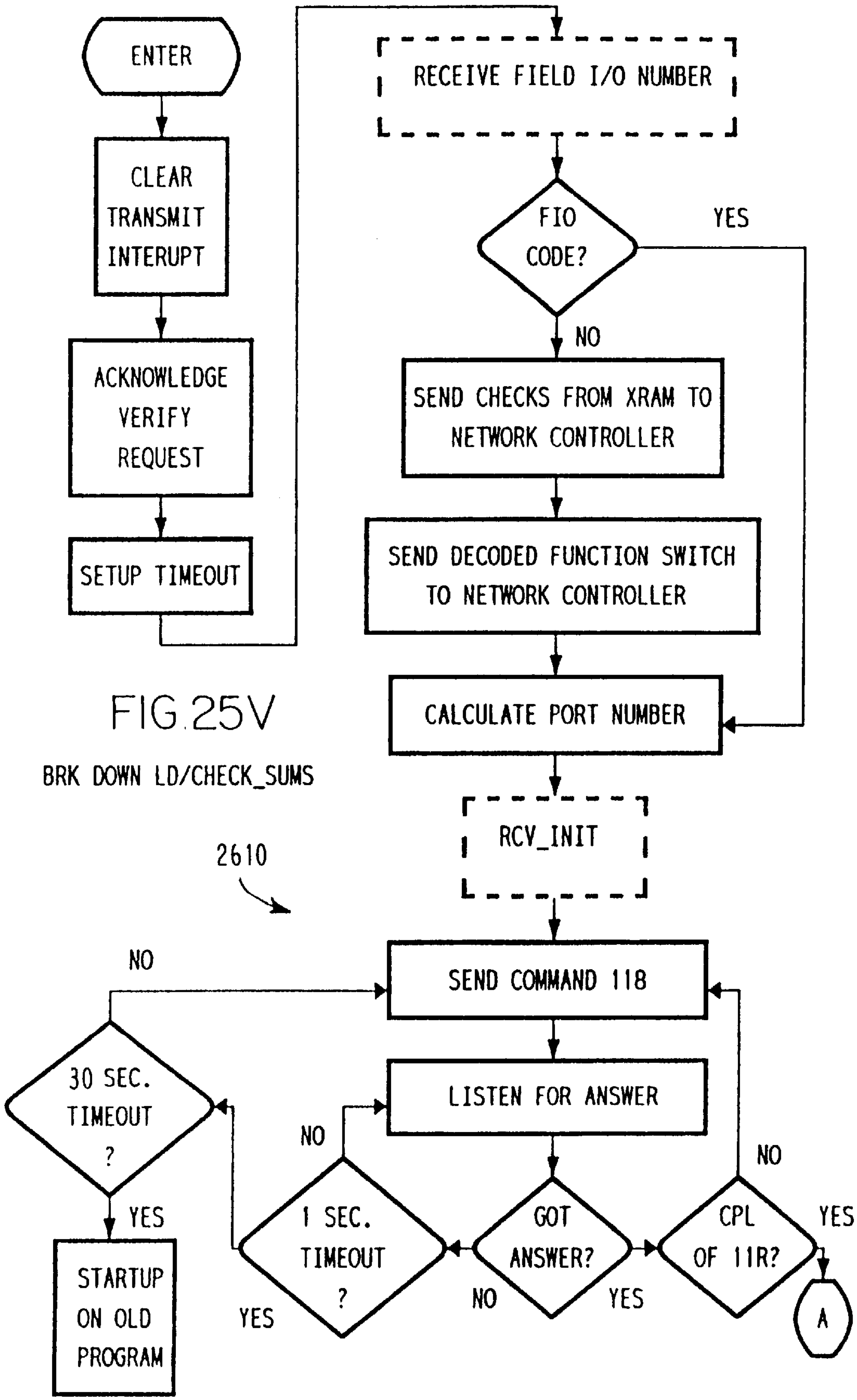
Figure 25W:
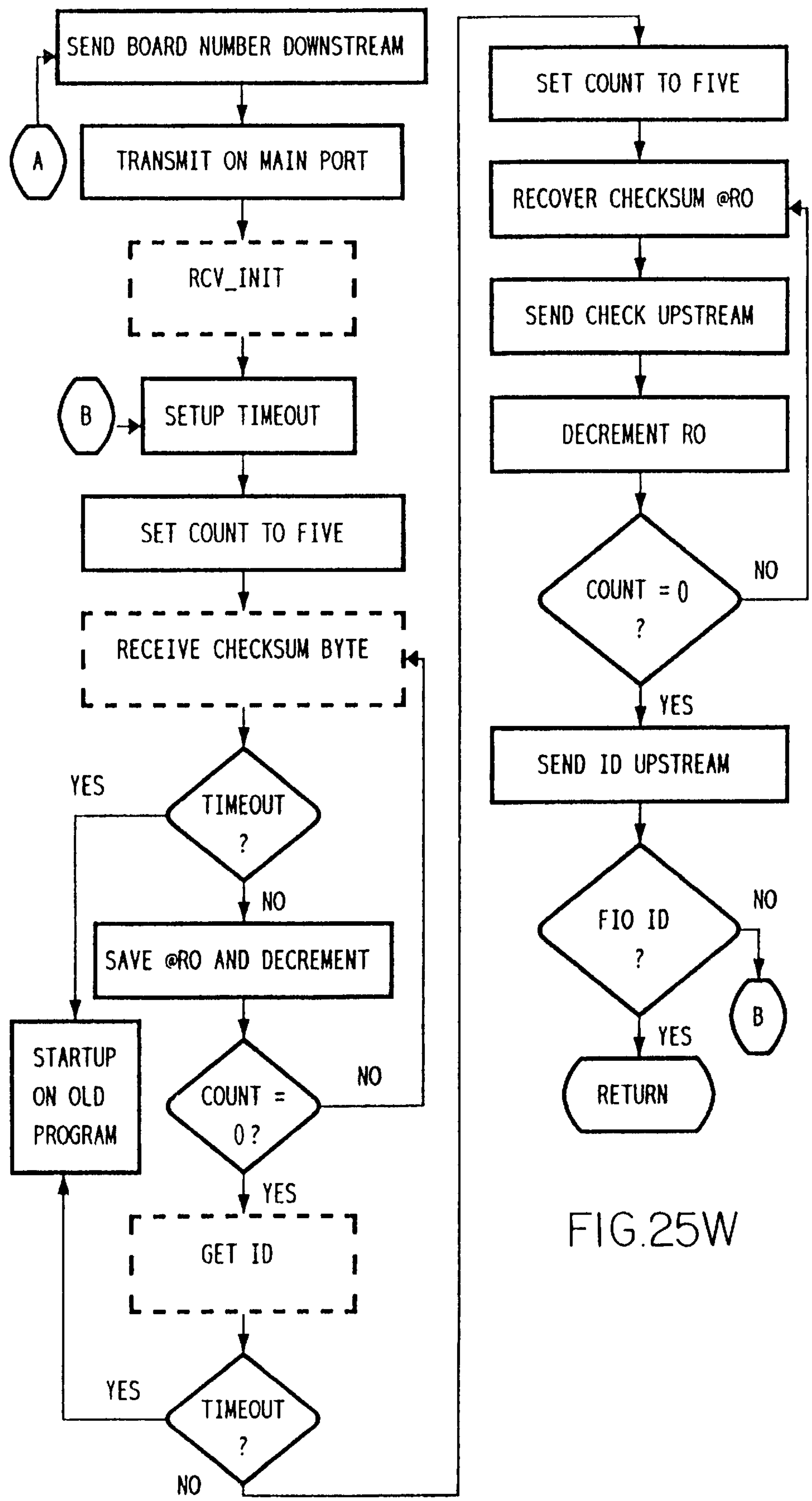
Figure 25X:
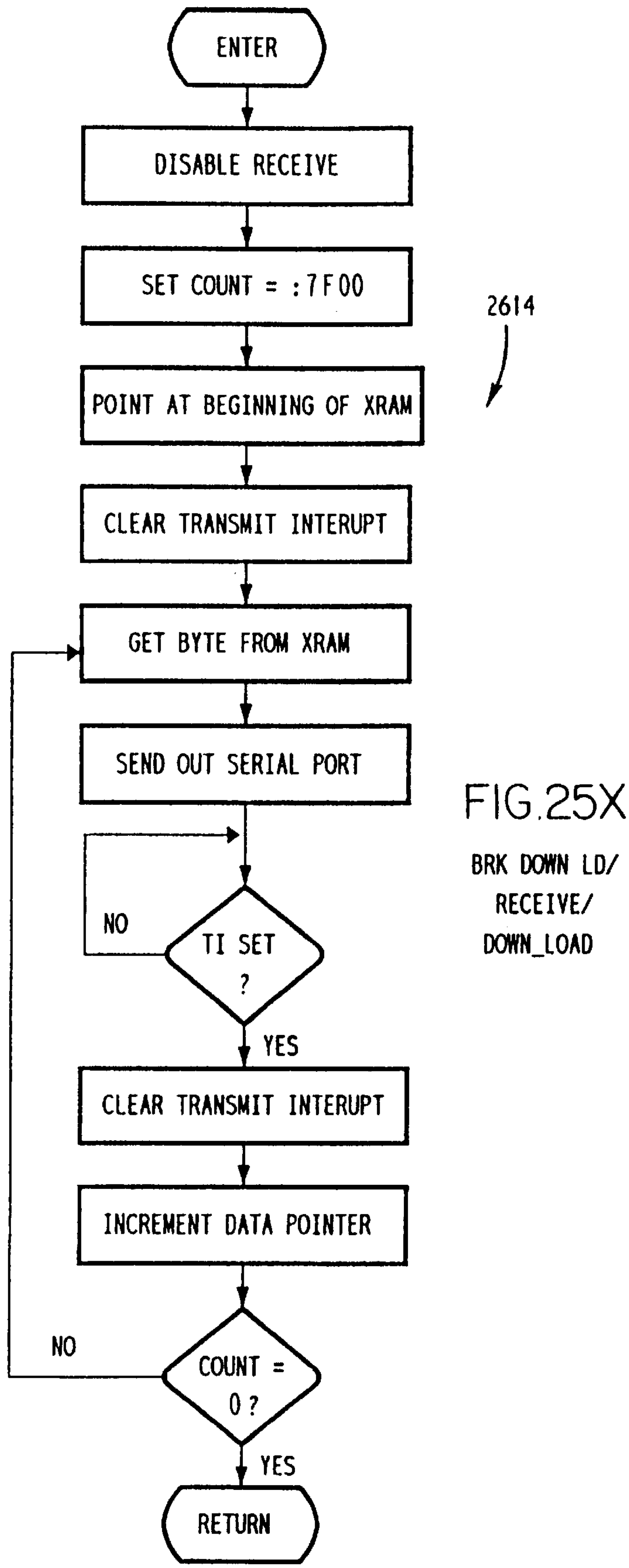
Figure 25Y:
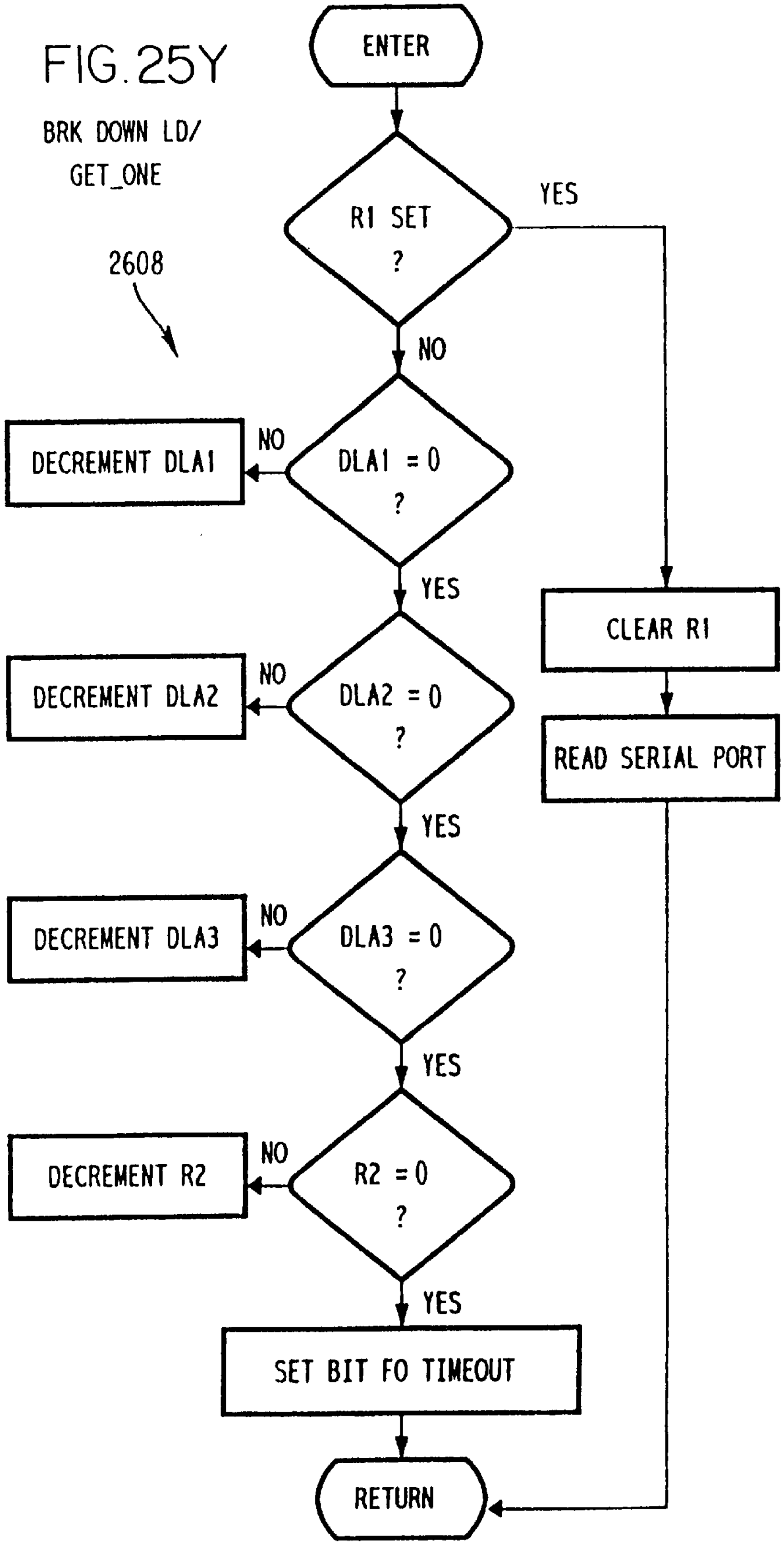
Figure 25Z:
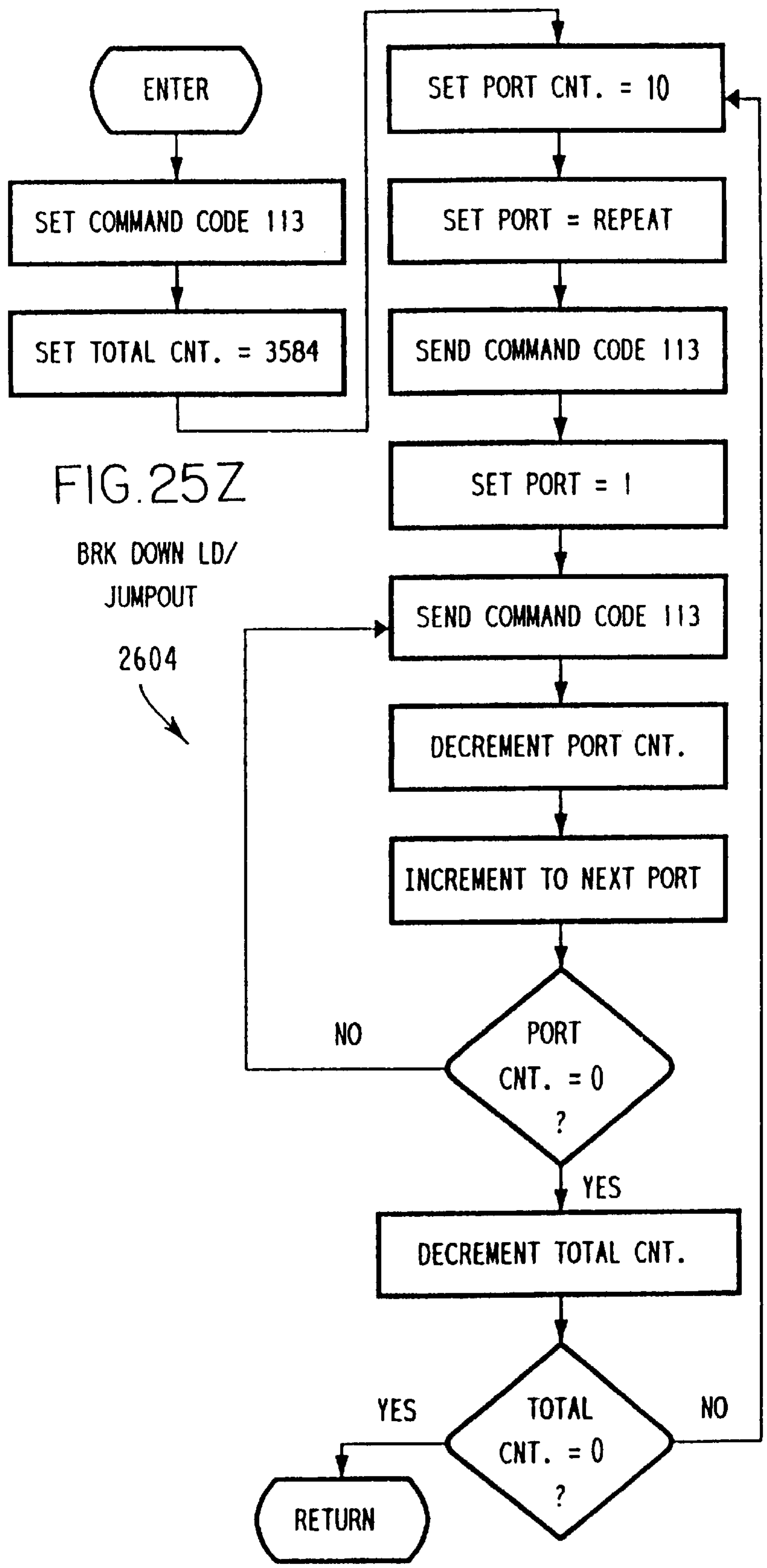

Turning now to the downloading process at the breakout circuits 26, the BCOMM routine 2516 of FIG. 24D will call the Breakout Download routine 2602 of FIGS. 25T–25U. As shown in FIGS. 25T–25U, the Breakout Download routine 2602 will call various subroutines, such as the Jumpout routine 2604 of FIG. 25Z, the Rcv_Init routine 2606 of FIG. 27D, and the Get_One routine 2608 of FIG. 25Y. The Breakout Download routine 2602 is also responsive to various commands received from process control computer 14 through the network controller 16. For example, in response to command "118", the Breakout Download routine 2602 will call the Check_Sums subroutine 2610 of FIGS. 25V–25W. Command code "118" is a request from the sending device which will cause the receiving device to send back the checksums received with the transmitted software. This will permit the sending device to compare these checksums with the embedded checksums in its program memory. Similarly, in response to command "122", the Breakout Download routine 2602 will call the Receive subroutine 2612 of FIGS. 26A–26B. The Receive routine 2612 will in turn call the Download subroutine 2614 of FIG. 25X. The Breakout Download routine 2604 will also call the Tellall subroutine 2616 of FIG. 26C, which will pass the command code to downstream devices.

If the software is determined to be Breakout circuit software (diamond 2618), then the Breakout Download routine 2602 will call the verify routine VXRAM 2572 of FIG. 250. If the checksums are correct (diamond 2620), then the Reprog routine 2538 of FIG. 26D will be executed. Otherwise, a Bad Checksum message will be displayed (block 2622), and the breakout circuits will ultimately revert to the existing software through a timeout implementation. FIG. 25U also shows that the Breakout Download routine 2602 will also respond to the command "115", which is used to cause a start up on the exiting software code (block 2624). In this regard, the Tellall subroutine 2616 will be called to pass this command downstream, and then a jump will be made back to the main program for the breakout circuits 26 (block 2626).

Referring again to FIGS. 24E–24G, it will be appreciated that the FIO Download routine 2524 has a number of similarities to the Breakout Download routine 2602 of FIGS. 25T–25U. Thus, for example, the FIO Download routine 2524 will call the Receive routine 2524 of FIG. 26G in response to command "122". Additionally, the receipt of command "114" will cause the field computer units 12 to determine if the downloaded code is FIO software (diamond 2628). If the software received is not FIO software, then the Old Program subroutine 2630 of FIG. 27I will be called. Otherwise, the verify routine 2572 of FIG. 250 will be called.

It should also be noted that the FIO Download routine 2524 will call the Neighbor subroutine 2632 in response to command "123". The Neighbor subroutine 2632 is shown in FIGS. 26J–26K. The Neighbor subroutine 2632 is used to transfer new software from one controller 100 to both of the neighboring controllers in the same field computer unit 12. In this regard, the Neighbor subroutine 2632 causes the serial port to be pointed at the Neighbor1 controller (block 2634), and a burst of command code "113" signals is sent to get the neighboring controller out of its process control time line (block 2636). The serial port is then pointed at the Neighbor2 controller (block 2638), and the command code "113" signals are sent to this controller (block 2640). An enable data mode command code "122" is also sent to these controllers. Upon receiving the command code "122", the neighboring controllers will branch to the Receive subroutine 2524, and then perform the checksum test with the Verify routine 2572.

FIG. 24G also shows that the FIO Download routine 2524 will check for command code "124" (diamond 2642). This command code is a request for the neighboring controller which received new software to send the checksums back to the sending controller. In this regard, it should be noted that the sending controller will wait a sufficient period of time for the neighboring controller to receive and verify the software before transmitting command code "124". If the checksums match the embedded checksums in the sending controller's program, then the process will be repeated for the other neighboring controller. If the checksums do not match, then the downloading process is terminated by the sending controller jumping to the start of its main program.

Figure 26V:
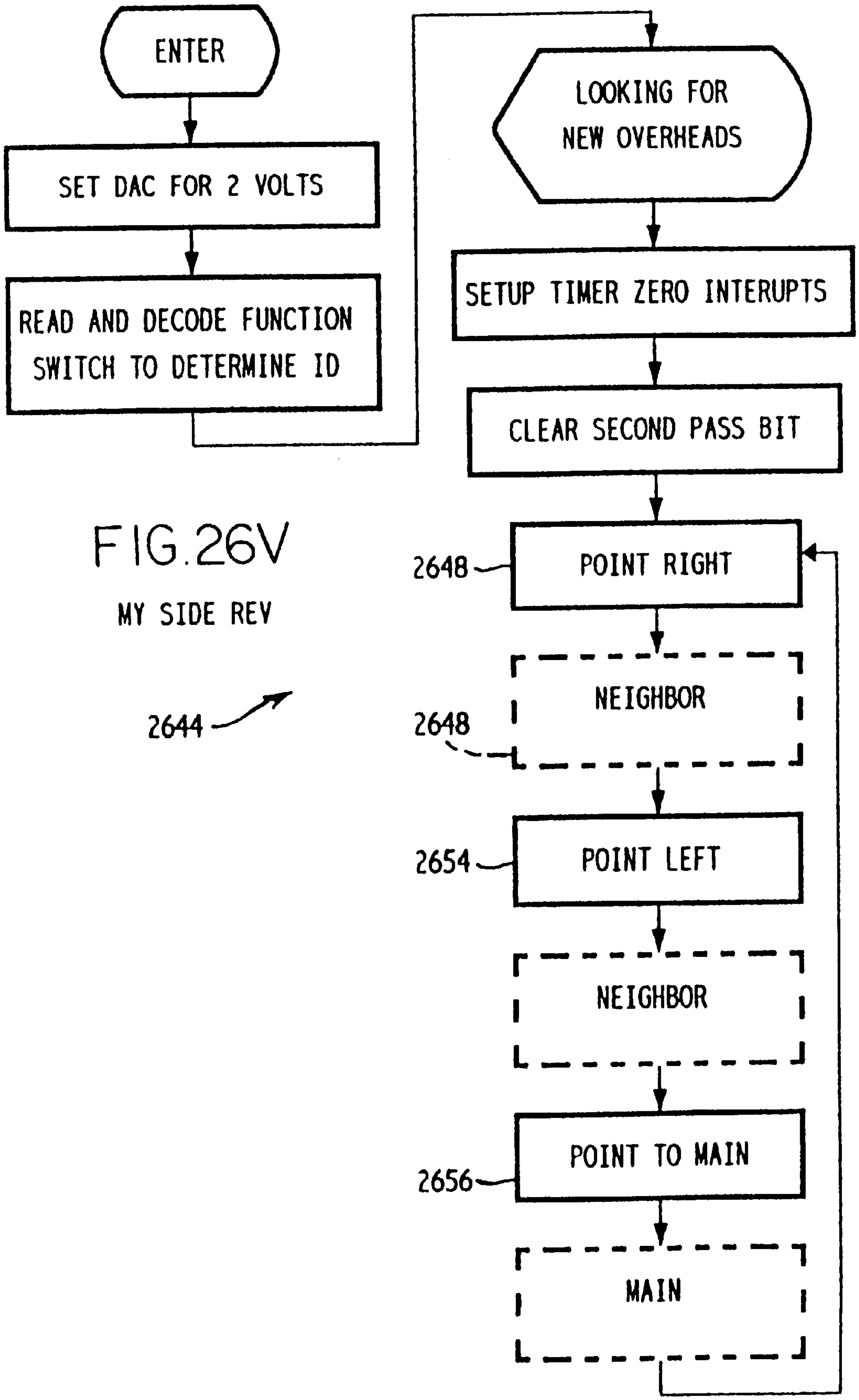
Figure 26W:
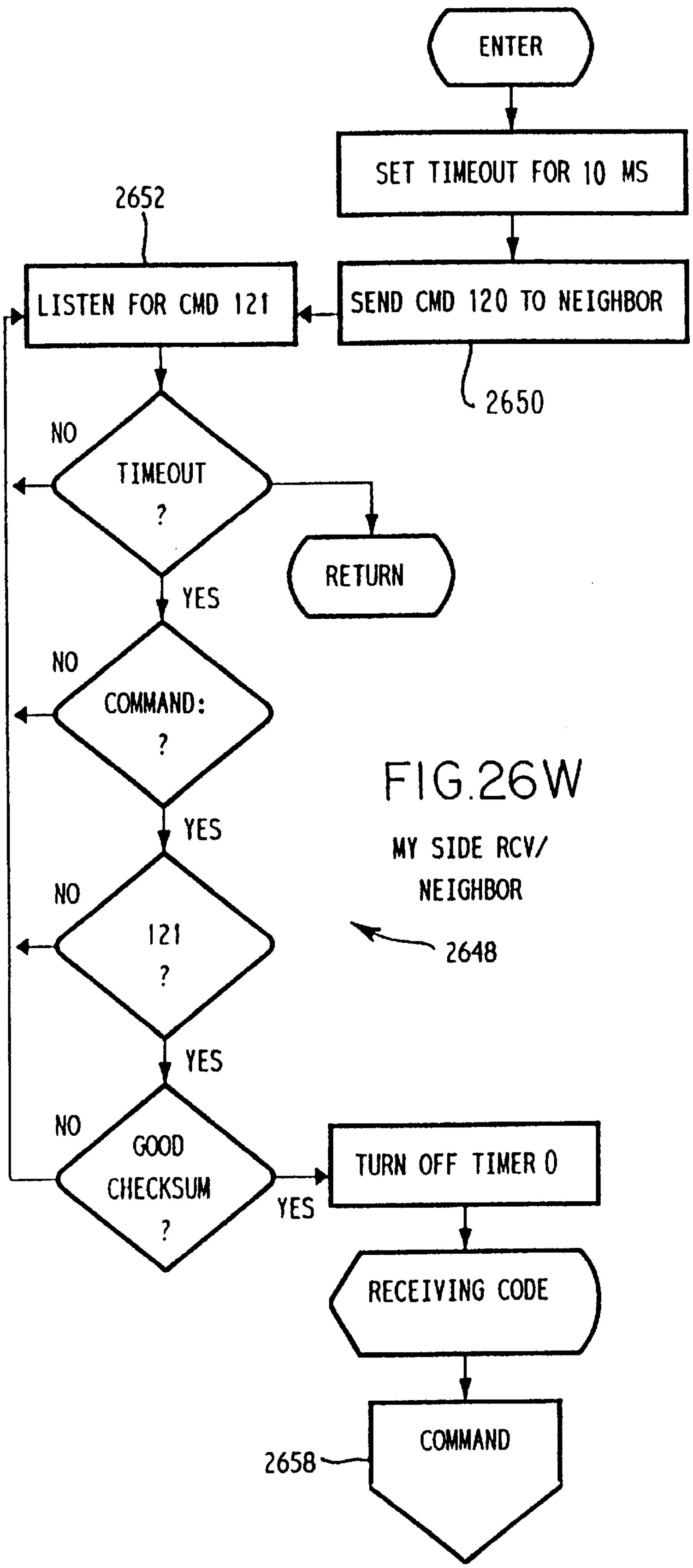

Referring to FIG. 26V, a flow chart of the My Side Receive-routine 2644 is shown. Due to the fact that the programs for the field computer units 12 are stored in RAM, the My Side Receive routine 2644 is used for loading the overheads software into a controller 100 which has just been installed in a field computer unit. The My Side Receive routine 2644 begins with a search for a program source. In this regard, the new controller will point to its Neighbor1 controller (block 2646), and then call the Neighbor subroutine 2648 of FIG. 26W. The Neighbor subroutine 2648 will send a command code "120" signal to this neighboring controller (block 2650), and then it listens for a command code "121" signal reply (block 2652). If the new controller does not receive the expected reply within the timeout period set, then it will repeat the process with the Neighbor2 controller (block 2654). Again, if the expected reply is not received, then the new controller will point to the main serial port (block 2656) in order to receive its program software from the interface network. If the new controller detects a command code "113" while it is pointing at its main port, then it will jump to the FIO Download routine 2524 to receive its software as explained above.

Figure 26X:
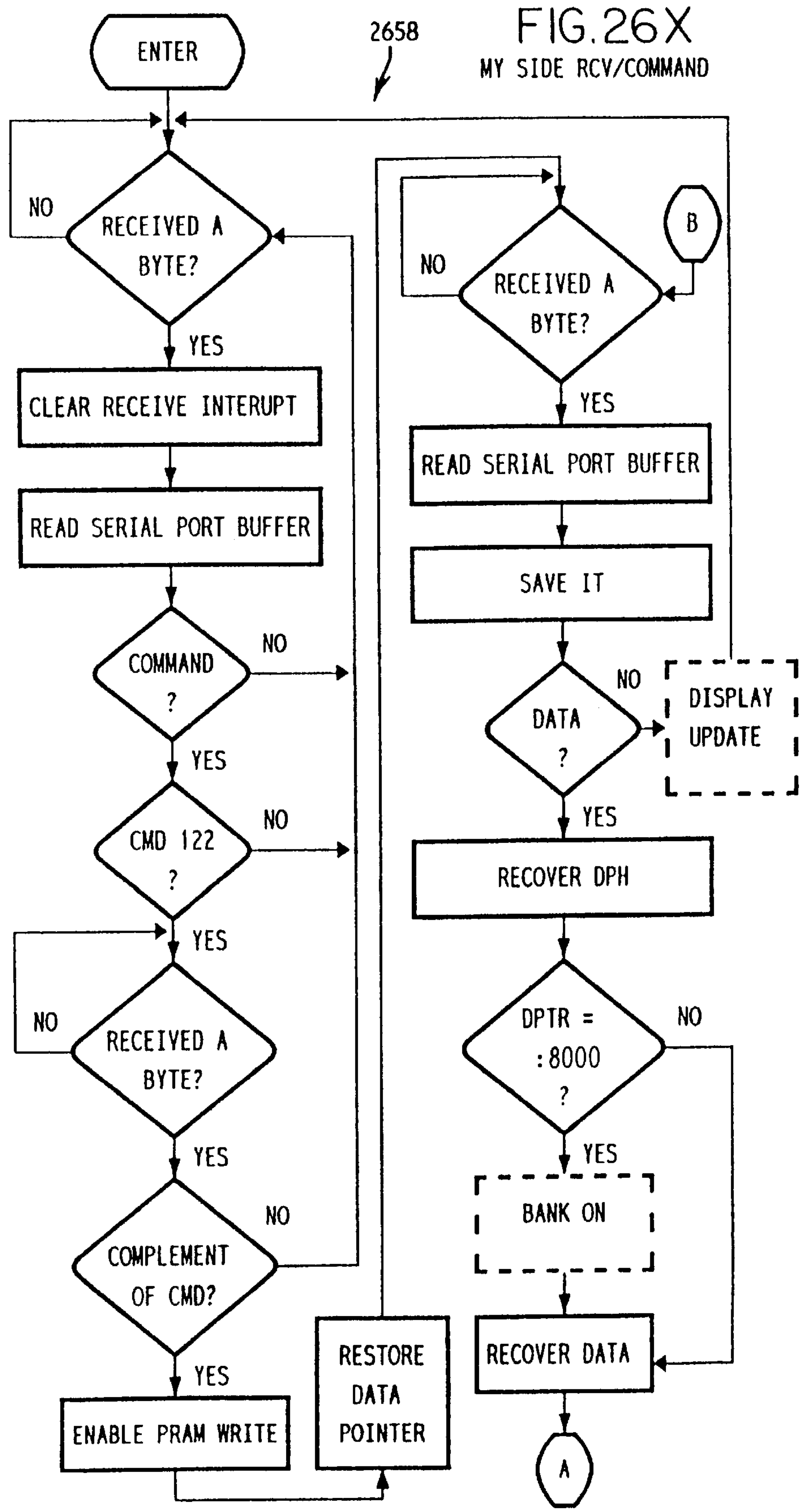
Figure 26Y:
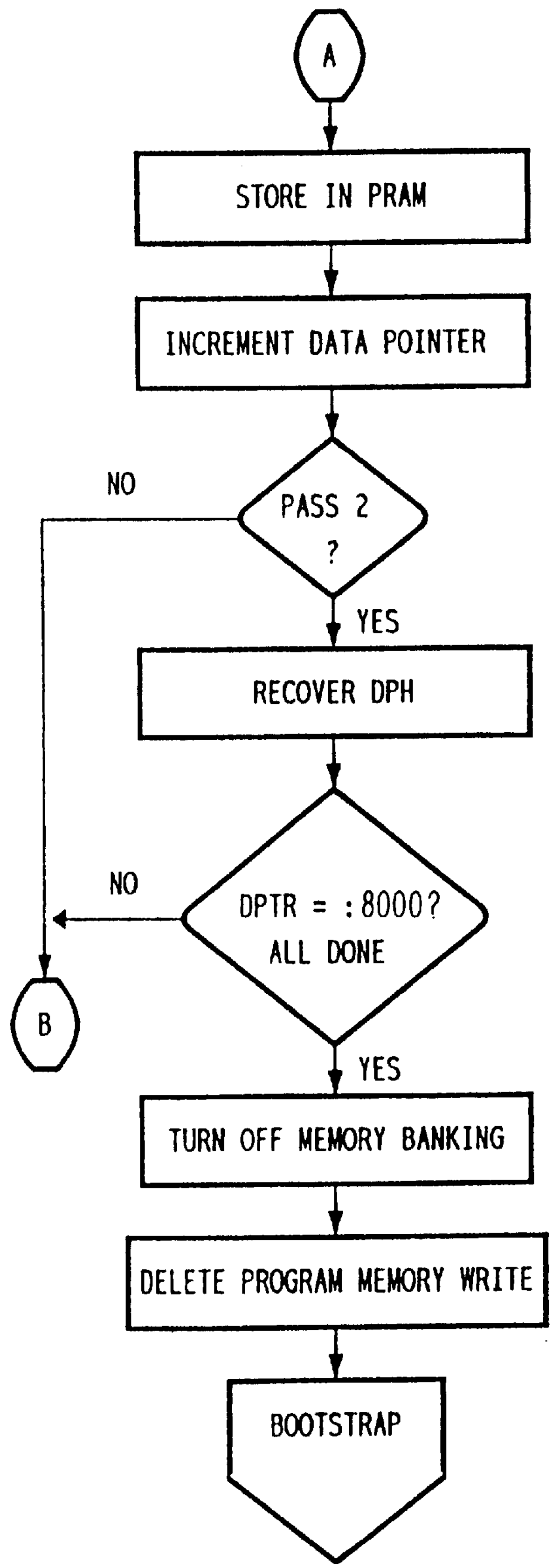
Figure 26Z:
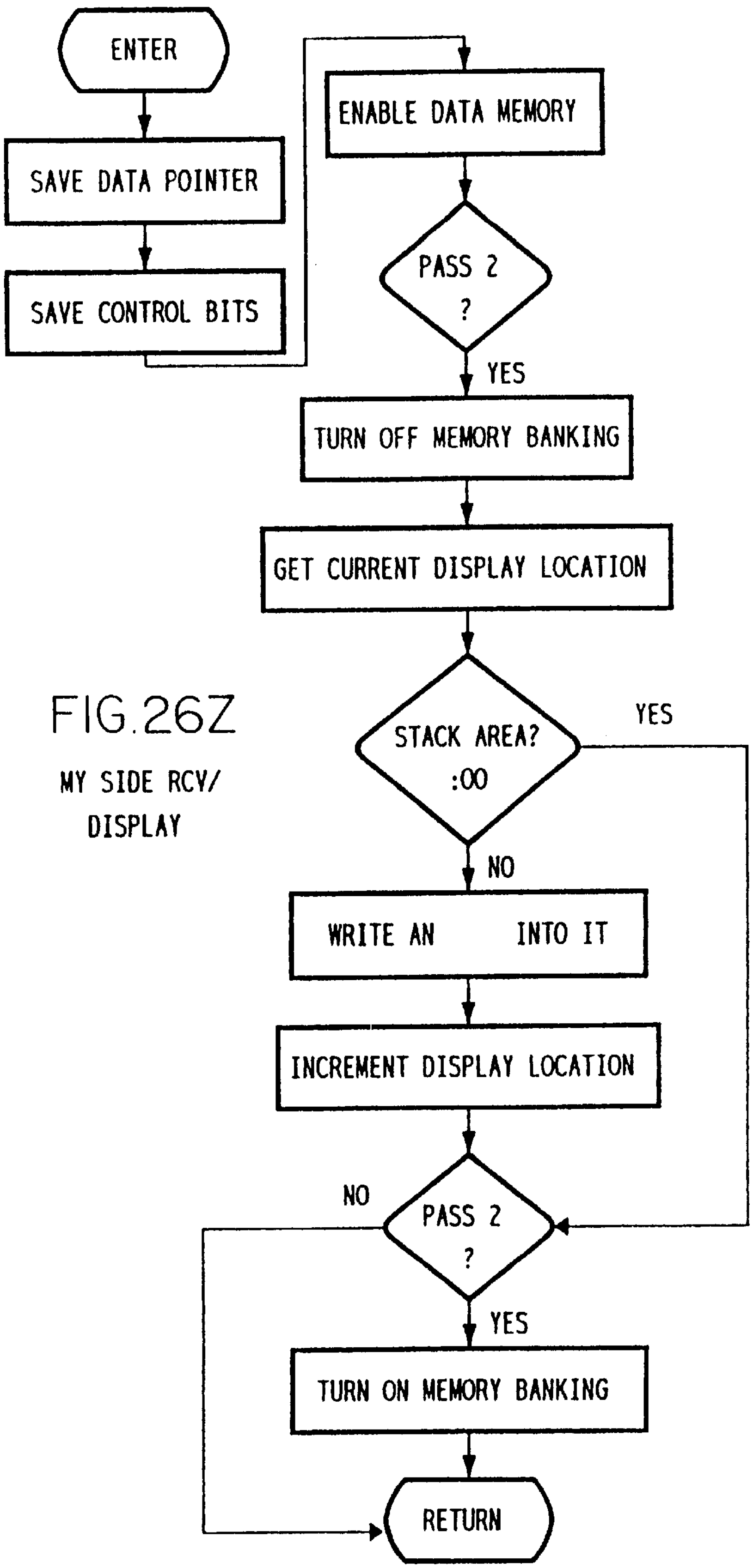
Figure 27A:
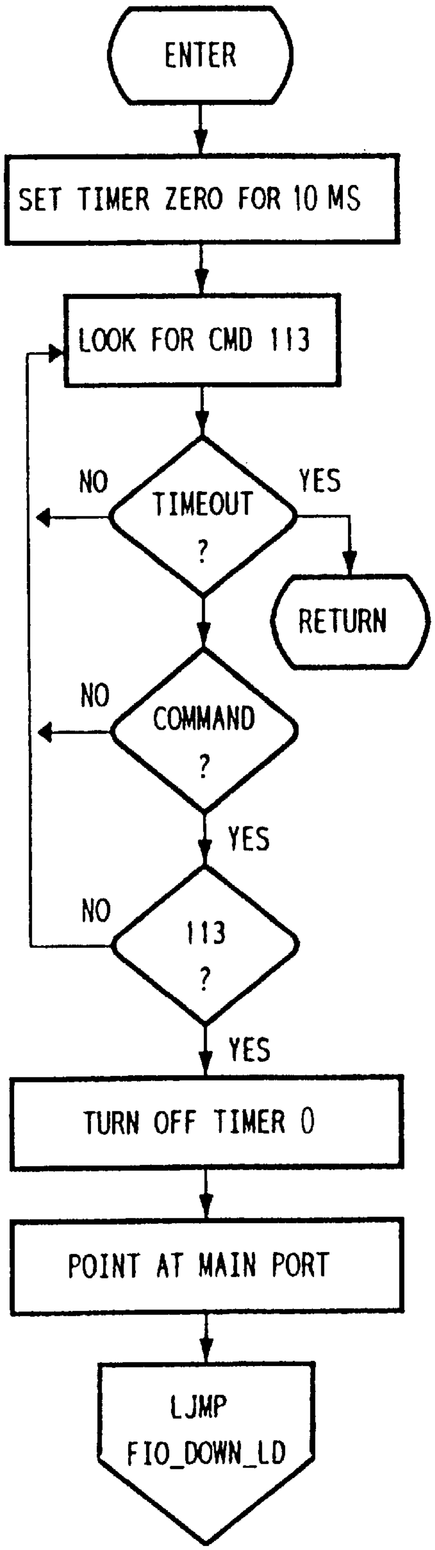
Figure 27B:
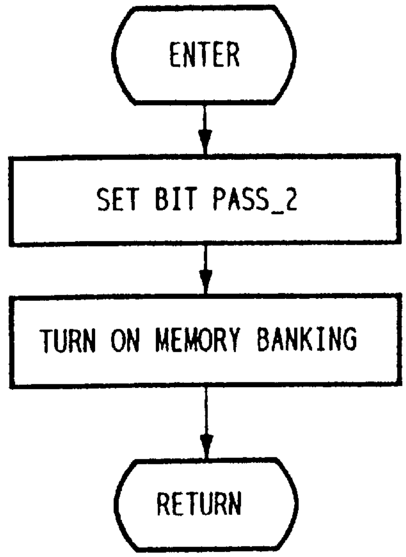
Figure 27C:
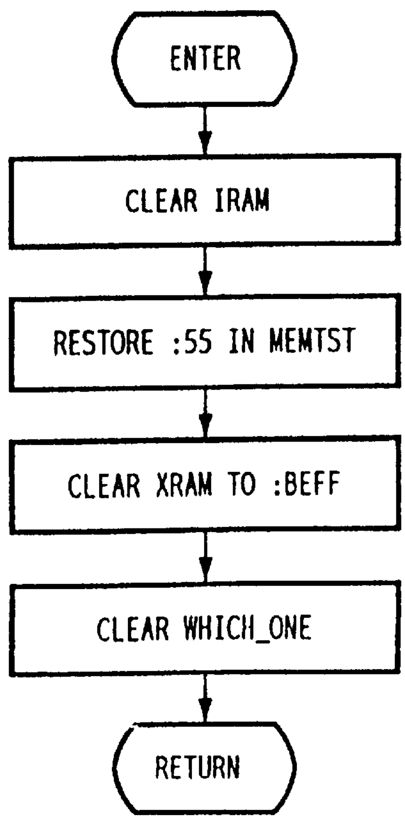
Figure 27D:
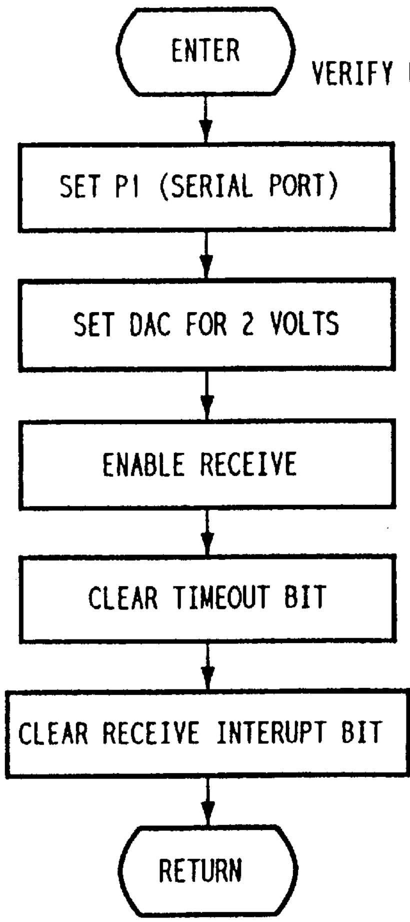
Figure 27F:
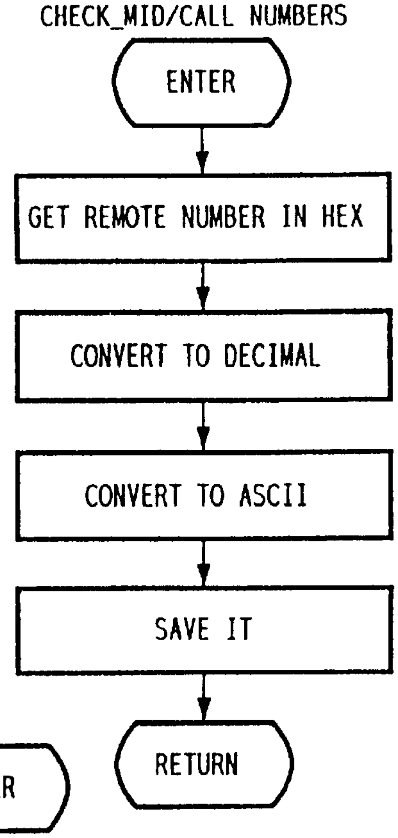
Figure 27E:
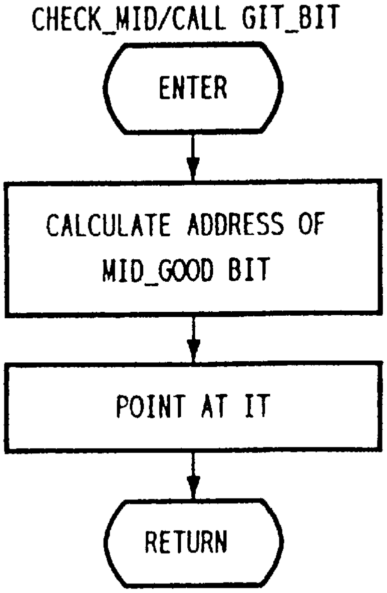
Figure 27G:
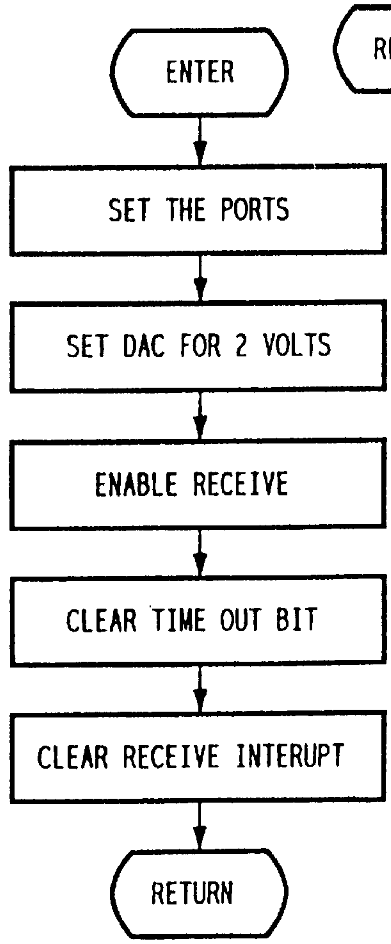

If the new controller does receive the expected command code "121", then the Command subroutine 2658 of FIGS. 26X–26Y will be called to receive the overheads software. If the neighboring controller in module Side_Load of FIGS. 26Q–26R receives the command code "120", it will remember which port address this request came from, answer with the command code "121", and write this command code into the "DOWN" byte in XRAM. On the next invocation of the Side_Load routine, the sending neighbor will send the command code "122" to the new controller in order to put this controller into a data receiving mode, and send a block of program memory from its own program memory "PRAM". In this method of program transfer, the new software in written directly into the program memory of the receiving controller, and verification is not attempted until the program begins to run. If the transfer is unsuccessful, then the entire My Side Receive routine will be repeated again.

The present invention has been described in an illustrative manner. In this regard, it is evident that those skilled in the art once given the benefit of the foregoing disclosure, may now make modifications to the specific embodiments described herein without departing from the spirit of the present invention. Such modifications are to be considered within the scope of the present invention which is limited solely by the scope and spirit of the appended claims.

What is claimed is:

1. A method of controlling a device with an electrical control signal provided by an actively redundant computer system having a set of at least three redundant computers, each of said redundant computers having a first respective neighboring redundant computer and a second respective neighboring redundant computer within said set, comprising the steps of:

using said redundant computers to derive at least three independent electrical control signals, each of which is capable of independently providing the electrical control signal which controls said device according to a predetermined control scheme;

concurrently transmitting each independent electrical control signal to said device via a common output line to derive, based on a contribution from all said at least three independent electrical control signals, the electrical control signal which controls said device;

detecting the presence of a predetermined error condition associated with any of said redundant computers at its first respective neighboring redundant computer and at its second respective neighboring redundant computer;

requesting a reset condition for said any of said redundant computers when its first respective neighboring redundant computer detects said predetermined error condition;

requesting a reset condition for said any of said redundant computers when its second respective neighboring redundant computer detects said predetermined error condition; and causing said reset condition in said any of said redundant computers when said first respective neighboring redundant computer and said second respective neighboring redundant computer detect said predetermined error condition.

2. The method according to claim 1, wherein said any of said redundant computers for which said predetermined error condition is detected by said first respective neighboring redundant computer and by said second respective neighboring redundant computer is temporarily reset.

3. The method according to claim 2, wherein said any of said redundant computers which has been temporarily reset is permanently disabled when said predetermined error condition is detected again by said first respective neighboring redundant computer and by said second respective neighboring redundant computer after a predetermined period of time has elapsed.

4. The method according to claim 2, wherein said predetermined error condition is a failure to communicate.

5. A computer-implemented process controller for controlling a device with an electrical control signal, comprising:

a set of at least three redundant computers, each of said redundant computers having a first respective neighboring redundant computer and a second respective neighboring redundant computer within said set;

means for generating an independent electrical control signal in each redundant computer wherein each independent electrical control signal is capable of providing the electrical control signal which controls said device according to a predetermined control scheme;

means for concurrently transmitting each independent electrical control signal to said device via a common output line to derive, based on a contribution from all said at least three independent electrical control signals, the electrical control signal which controls said device;

means for detecting the presence of a predetermined error condition associated with any of said redundant computers at its first respective neighboring redundant computer and at its second respective neighboring redundant computer;

means for requesting a reset condition for said any of said redundant computers when its first respective neighboring redundant computer detects said predetermined error condition;

means for requesting a reset condition for said any of said redundant computers when its second respective neighboring redundant computer detects said predetermined error condition; and means for causing said reset condition in said any of said redundant computers when said first respective neighboring redundant computer and said second respective neighboring redundant computer detect said predetermined error condition.

6. The process controller according to claim 5, wherein said means for causing said reset condition in any of said redundant computers further comprises means for temporarily resetting said redundant computer.

7. The process controller according to claim 6, wherein said means for causing said reset condition any of said redundant computers further comprises means for permanently disabling said redundant computer which has been temporarily reset when said predetermined error condition is detected again by said first respective neighboring redundant computer and by said second respective neighboring redundant computer after a predetermined period of time has elapsed.

8. The process controller according to claim 7, wherein said predetermined error condition is a failure to communicate.

* * * * *